US012432412B2

(12) United States Patent
Domm et al.

(10) Patent No.: US 12,432,412 B2

(45) **Date of Patent: *Sep. 30, 2025**

(54) USER INTERFACES FOR A MEDIA BROWSING APPLICATION

(71) Applicant: Apple Inc., Cupertino, CA (US)

(72) Inventors: Drew R. Domm, Los Angeles, CA (US); Matthew J. Cielak, Seattle, WA (US); Fredric Vinna, San Francisco, CA (US); Fernando A. Albuquerque, San Jose, CA (US); Christopher J. Ellingford, Alameda, CA (US); Christine E. Tran, Los Altos, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/602,342

(22) Filed: Mar. 12, 2024

(65) Prior Publication Data

US 2024/0267583 A1 Aug. 8, 2024

Related U.S. Application Data

(63) Continuation of application No. 16/827,910, filed on Mar. 24, 2020, now Pat. No. 11,962,836.

(Continued)

(51) Int. Cl.

*H04N 21/43* (2011.01)

*H04H 20/38* (2008.01)

(Continued)

(52) U.S. Cl.

CPC ........ *H04N 21/4312* (2013.01); *H04H 20/38* (2013.01); *H04N 21/47205* (2013.01)

(58) Field of Classification Search

None

See application file for complete search history.

(56) References Cited

U.S. PATENT DOCUMENTS 2,718,550 A 9/1955 Hoyt et al.

4,672,677 A 6/1987 Yamakawa (Continued)

FOREIGN PATENT DOCUMENTS

AU 2009255409 B2 7/2012

AU 2016100476 A4 5/2016

(Continued)

OTHER PUBLICATIONS

Advisory Action received for U.S. Appl. No. 15/167,801, mailed on Feb. 16, 2018, 4 pages.

(Continued)

*Primary Examiner* — Mushfikh I Alam

(74) *Attorney, Agent, or Firm* — Kubota & Basol LLP

(57) ABSTRACT

In some embodiments, an electronic device presents a plurality of representations of content items in a unified media browsing application. In some embodiments, an electronic device presents information on representations of content items. In some embodiments, an electronic device display content in a unified media browsing application. In some embodiments, an electronic device links to an account for a primary content provider. In some embodiments, an electronic device restricts access to content based on the geographic location of the device. In some embodiments, an electronic device presents playback menus during playback of content in a unified media browsing application. In some embodiments, an electronic device displays user interfaces specific to respective content items. In some embodiments, an electronic device displays content items.

24 Claims, 288 Drawing Sheets

Related U.S. Application Data

(60) Provisional application No. 62/855,842, filed on May 31, 2019, provisional application No. 62/822,948, filed on Mar. 24, 2019.

(51) Int. Cl.
*H04N 21/431* (2011.01)
*H04N 21/472* (2011.01)

(56) References Cited

U.S. PATENT DOCUMENTS

| | | | |
|---|---|---|---|
| 5,029,223 | A | 7/1991 | Fujisaki |
| 5,483,261 | A | 1/1996 | Yasutake |
| 5,488,204 | A | 1/1996 | Mead et al. |
| 5,537,153 | A | 7/1996 | Shigihara |
| 5,585,866 | A | 12/1996 | Miller et al. |
| 5,596,373 | A | 1/1997 | White et al. |
| 5,621,456 | A | 4/1997 | Florin et al. |
| 5,677,708 | A | 10/1997 | Matthews et al. |
| 5,818,439 | A | 10/1998 | Nagasaka et al. |
| 5,825,352 | A | 10/1998 | Bisset et al. |
| 5,835,079 | A | 11/1998 | Shieh |
| 5,880,411 | A | 3/1999 | Gillespie et al. |
| 5,886,690 | A | 3/1999 | Pond et al. |
| 5,926,230 | A | 7/1999 | Niijima et al. |
| 6,021,320 | A | 2/2000 | Bickford et al. |
| 6,028,600 | A | 2/2000 | Rosin et al. |
| 6,049,333 | A | 4/2000 | Lajoie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,405,371 | B1 | 6/2002 | Oosterhout et al. |
| 6,487,722 | B1 | 11/2002 | Okura et al. |
| 6,570,557 | B1 | 5/2003 | Westerman et al. |
| 6,628,304 | B2 | 9/2003 | Mitchell et al. |
| 6,677,932 | B1 | 1/2004 | Westerman |
| 6,690,387 | B2 | 2/2004 | Zimmerman et al. |
| 6,745,391 | B1 | 6/2004 | Macrae et al. |
| 6,909,837 | B1 | 6/2005 | Unger |
| 6,928,433 | B2 | 8/2005 | Goodman et al. |
| 7,015,894 | B2 | 3/2006 | Morohoshi |
| 7,039,879 | B2 | 5/2006 | Bergsten et al. |
| 7,103,906 | B1 | 9/2006 | Katz et al. |
| 7,134,089 | B2 | 11/2006 | Celik et al. |
| 7,184,064 | B2 | 2/2007 | Zimmerman et al. |
| 7,213,255 | B2 | 5/2007 | Markel et al. |
| 7,293,275 | B1 | 11/2007 | Krieger et al. |
| 7,324,953 | B1 | 1/2008 | Murphy |
| 7,330,192 | B2 | 2/2008 | Brunner et al. |
| 7,596,761 | B2 | 9/2009 | Lemay et al. |
| 7,614,008 | B2 | 11/2009 | Ording |
| 7,631,278 | B2 | 12/2009 | Miksovsky et al. |
| 7,633,076 | B2 | 12/2009 | Huppi et al. |
| 7,636,897 | B2 | 12/2009 | Koralski et al. |
| 7,649,526 | B2 | 1/2010 | Ording et al. |
| 7,650,569 | B1 | 1/2010 | Allen et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,665,022 | B1 | 2/2010 | Bednarz, Jr. |
| 7,694,231 | B2 | 4/2010 | Kocienda et al. |
| 7,712,051 | B2 | 5/2010 | Chadzelek et al. |
| 7,783,892 | B2 | 8/2010 | Russell et al. |
| 7,810,043 | B2 | 10/2010 | Ostojic et al. |
| 7,814,023 | B1 | 10/2010 | Rao et al. |
| 7,827,483 | B2 | 11/2010 | Unbedacht et al. |
| 7,836,475 | B2 | 11/2010 | Angiolillo et al. |
| 7,844,914 | B2 | 11/2010 | Andre et al. |
| 7,849,487 | B1 | 12/2010 | Vosseller |
| 7,856,605 | B2 | 12/2010 | Ording et al. |
| 7,917,477 | B2 | 3/2011 | Hutson et al. |
| 7,956,846 | B2 | 6/2011 | Ording et al. |
| 7,957,762 | B2 | 6/2011 | Herz et al. |
| 7,970,379 | B2 | 6/2011 | White et al. |
| 8,006,002 | B2 | 8/2011 | Kalayjian et al. |
| 8,026,805 | B1 | 9/2011 | Rowe |
| 8,082,523 | B2 | 12/2011 | Forstall et al. |
| 8,094,132 | B1 | 1/2012 | Frischling et al. |
| 8,115,731 | B2 | 2/2012 | Varanda |
| 8,145,617 | B1 | 3/2012 | Verstak et al. |
| 8,170,931 | B2 | 5/2012 | Ross et al. |
| 8,205,240 | B2 | 6/2012 | Ansari et al. |
| 8,239,784 | B2 | 8/2012 | Hotelling et al. |
| 8,279,180 | B2 | 10/2012 | Hotelling et al. |
| 8,291,452 | B1 | 10/2012 | Yong et al. |
| 8,299,889 | B2 | 10/2012 | Kumar et al. |
| 8,301,484 | B1 | 10/2012 | Kumar |
| 8,312,484 | B1 | 11/2012 | Mccarty et al. |
| 8,312,486 | B1 | 11/2012 | Briggs et al. |
| 8,316,394 | B2 | 11/2012 | Yates |
| 8,325,160 | B2 | 12/2012 | St. Pierre et al. |
| 8,346,798 | B2 | 1/2013 | Spiegelman et al. |
| 8,370,874 | B1 | 2/2013 | Chang et al. |
| 8,381,135 | B2 | 2/2013 | Hotelling et al. |
| 8,386,588 | B1 | 2/2013 | Cooley |
| 8,407,737 | B1 | 3/2013 | Ellis |
| 8,416,217 | B1 | 4/2013 | Eriksson et al. |
| 8,418,202 | B2 | 4/2013 | Ahmad-Taylor |
| 8,424,048 | B1 | 4/2013 | Lyren et al. |
| 8,479,122 | B2 | 7/2013 | Hotelling et al. |
| 8,495,499 | B1 | 7/2013 | Denise |
| 8,509,599 | B2 | 8/2013 | Itakura |
| 8,516,063 | B2 | 8/2013 | Fletcher |
| 8,516,525 | B1 | 8/2013 | Jerding et al. |
| 8,560,398 | B1 | 10/2013 | Few et al. |
| 8,584,165 | B1 | 11/2013 | Kane et al. |
| 8,607,163 | B2 | 12/2013 | Plummer |
| 8,607,268 | B2 | 12/2013 | Migos |
| 8,613,015 | B2 | 12/2013 | Gordon et al. |
| 8,613,023 | B2 | 12/2013 | Narahara et al. |
| 8,625,974 | B1 | 1/2014 | Pinson |
| 8,674,958 | B1 | 3/2014 | Kravets et al. |
| 8,683,362 | B2 | 3/2014 | Shiplacoff et al. |
| 8,683,517 | B2 | 3/2014 | Carpenter et al. |
| 8,730,190 | B2 | 5/2014 | Moloney |
| 8,742,885 | B2 | 6/2014 | Brodersen et al. |
| 8,754,862 | B2 | 6/2014 | Zaliva |
| 8,762,852 | B2 | 6/2014 | Davis et al. |
| 8,769,408 | B2 | 7/2014 | Madden et al. |
| 8,782,706 | B2 | 7/2014 | Ellis |
| 8,850,471 | B2 | 9/2014 | Kilar et al. |
| 8,850,490 | B1 | 9/2014 | Thomas et al. |
| 8,869,207 | B1 | 10/2014 | Earle |
| 8,887,202 | B2 | 11/2014 | Hunter et al. |
| 8,930,839 | B2 | 1/2015 | He et al. |
| 8,952,987 | B2 | 2/2015 | Momeyer et al. |
| 8,963,847 | B2 | 2/2015 | Hunt |
| 8,983,950 | B2 | 3/2015 | Askey et al. |
| 8,988,356 | B2 | 3/2015 | Tseng |
| 8,990,857 | B2 | 3/2015 | Yong et al. |
| 9,007,322 | B1 | 4/2015 | Young |
| 9,066,146 | B2 | 6/2015 | Suh et al. |
| 9,081,421 | B1 | 7/2015 | Lai et al. |
| 9,092,057 | B2 | 7/2015 | Varela et al. |
| 9,116,569 | B2 | 8/2015 | Stacy et al. |
| 9,118,967 | B2 | 8/2015 | Sirpal et al. |
| 9,129,656 | B2 | 9/2015 | Prather et al. |
| 9,141,200 | B2 | 9/2015 | Bernstein et al. |
| 9,196,309 | B2 | 11/2015 | Schultz et al. |
| 9,214,290 | B2 | 12/2015 | Xie et al. |
| 9,215,273 | B2 | 12/2015 | Jonnala et al. |
| 9,219,634 | B1 | 12/2015 | Morse et al. |
| 9,235,317 | B2 | 1/2016 | Matas et al. |
| 9,241,121 | B2 | 1/2016 | Rudolph |
| 9,244,600 | B2 | 1/2016 | Mcintosh et al. |
| 9,247,014 | B1 | 1/2016 | Rao |
| 9,247,174 | B2 | 1/2016 | Sirpal et al. |
| 9,285,977 | B1 | 3/2016 | Greenberg et al. |
| 9,319,727 | B2 | 4/2016 | Phipps et al. |
| 9,348,458 | B2 | 5/2016 | Hotelling et al. |
| 9,357,250 | B1 | 5/2016 | Newman et al. |
| 9,380,343 | B2 | 6/2016 | Webster et al. |
| 9,414,108 | B2 | 8/2016 | Sirpal et al. |
| 9,454,288 | B2 | 9/2016 | Raffle et al. |

(56) References Cited

U.S. PATENT DOCUMENTS 9,509,798 B1 11/2016 Thomas et al.
9,514,476 B2 12/2016 Kay et al.
9,532,111 B1 12/2016 Christie et al.
9,538,310 B2 1/2017 Fjeldsoe-nielsen et al.
9,542,060 B1 1/2017 Brenner et al.
9,560,399 B2 1/2017 Kaya et al.
9,575,944 B2 2/2017 Neil et al.
9,591,339 B1 3/2017 Christie et al.
9,600,159 B2 3/2017 Lawson et al.
9,602,566 B1 3/2017 Lewis et al.
9,639,241 B2 5/2017 Penha et al.
9,652,118 B2 5/2017 Hill et al.
9,652,448 B2 5/2017 Pasquero et al.
9,658,740 B2 5/2017 Chaudhri
9,774,917 B1 9/2017 Christie et al.
9,792,018 B2 10/2017 Van Os et al.
9,807,462 B2 10/2017 Wood
9,864,508 B2 1/2018 Dixon et al.
9,864,509 B2 1/2018 Howard et al.
9,871,905 B1 1/2018 Habiger et al.
9,913,142 B2 3/2018 Folse et al.
9,933,937 B2 4/2018 Lemay et al.
9,940,454 B2 4/2018 Richardson et al.
9,973,800 B2 5/2018 Yellin et al.
9,992,025 B2 6/2018 Mahaffey et al.
10,019,142 B2 7/2018 Van Os et al.
10,025,499 B2 7/2018 Howard et al.
10,079,872 B1 9/2018 Thomas et al.
10,091,558 B2 10/2018 Christie et al.
10,114,631 B2 10/2018 Shin
10,116,996 B1 10/2018 Christie et al.
10,126,904 B2 11/2018 Agnetta et al.
10,168,871 B2 1/2019 Wallters et al.
10,200,761 B1 2/2019 Christie et al.
10,205,985 B2 2/2019 Lue-Sang et al.
10,209,866 B2 2/2019 Johnston et al.
10,237,599 B1 3/2019 Gravino et al.
10,275,148 B2 4/2019 Matas et al.
10,282,088 B2 5/2019 Kim et al.
10,303,422 B1 5/2019 Woo et al.
10,405,015 B2 9/2019 Kite et al.
10,521,188 B1 12/2019 Christie et al.
10,551,995 B1 2/2020 Ho et al.
10,552,470 B2 2/2020 Todd et al.
10,564,823 B1 2/2020 Dennis et al.
10,601,808 B1 3/2020 Nijim et al.
10,606,539 B2 3/2020 Bernstein et al.
10,616,155 B2 * 4/2020 Choi .................... H04L 51/216
10,631,042 B2 4/2020 Zerr et al.
10,650,052 B2 5/2020 Van Os et al.
10,795,490 B2 10/2020 Chaudhri et al.
10,827,007 B2 11/2020 Kode et al.
11,062,358 B1 7/2021 Lewis et al.
11,461,397 B2 10/2022 Van Os et al.
11,706,263 B2 7/2023 Warrick et al.
11,843,838 B2 12/2023 Ellingford et al.
11,863,837 B2 1/2024 Payne
2002/0015024 A1 2/2002 Westerman et al.
2002/0026637 A1 2/2002 Markel et al.
2002/0029170 A1 3/2002 Gasser et al.
2002/0042920 A1 4/2002 Thomas et al.
2002/0060750 A1 5/2002 Istvan et al.
2002/0085045 A1 7/2002 Vong et al.
2002/0100063 A1 7/2002 Herigstad et al.
2002/0112239 A1 8/2002 Goldman
2002/0113816 A1 8/2002 Mitchell et al.
2002/0144269 A1 10/2002 Connelly
2002/0171686 A1 11/2002 Kamen et al.
2002/0178446 A1 11/2002 Sie et al.
2003/0001907 A1 1/2003 Bergsten et al.
2003/0005445 A1 1/2003 Schein et al.
2003/0009757 A1 1/2003 Kikinis
2003/0011641 A1 1/2003 Totman et al.
2003/0013483 A1 1/2003 Ausems et al.
2003/0044162 A1 3/2003 Angel
2003/0088872 A1 5/2003 Maissel et al.
2003/0093790 A1 5/2003 Logan et al.
2003/0126600 A1 7/2003 Heuvelman
2003/0149628 A1 8/2003 Abbosh et al.
2003/0158950 A1 8/2003 Sako
2003/0167471 A1 9/2003 Roth et al.
2003/0177075 A1 9/2003 Burke
2003/0177498 A1 9/2003 Ellis et al.
2003/0192060 A1 10/2003 Levy
2003/0221191 A1 11/2003 Khusheim
2003/0228130 A1 12/2003 Tanikawa et al.
2003/0234804 A1 12/2003 Parker et al.
2004/0019497 A1 1/2004 Volk et al.
2004/0046801 A1 3/2004 Lin et al.
2004/0070573 A1 4/2004 Graham
2004/0088328 A1 5/2004 Cook et al.
2004/0090463 A1 5/2004 Celik et al.
2004/0093262 A1 5/2004 Weston et al.
2004/0133909 A1 7/2004 Ma
2004/0139401 A1 7/2004 Unbedacht et al.
2004/0161151 A1 8/2004 Iwayama et al.
2004/0168184 A1 8/2004 Steenkamp et al.
2004/0193421 A1 9/2004 Blass
2004/0252120 A1 12/2004 Hunleth et al.
2004/0254883 A1 12/2004 Kondrk et al.
2004/0254958 A1 12/2004 Volk
2004/0267715 A1 12/2004 Polson et al.
2004/0268417 A1 12/2004 Gray et al.
2005/0012599 A1 1/2005 Dematteo
2005/0024545 A1 2/2005 Borden
2005/0055710 A1 3/2005 Aoki et al.
2005/0063670 A1 3/2005 Arai
2005/0071761 A1 3/2005 Kontio
2005/0071785 A1 3/2005 Chadzelek et al.
2005/0076363 A1 4/2005 Dukes et al.
2005/0091254 A1 4/2005 Stabb et al.
2005/0091597 A1 4/2005 Ackley
2005/0134625 A1 6/2005 Kubota
2005/0162398 A1 7/2005 Eliasson et al.
2005/0162402 A1 7/2005 Watanachote
2005/0186988 A1 8/2005 Lim et al.
2005/0190059 A1 9/2005 Wehrenberg
2005/0223335 A1 10/2005 Ichikawa
2005/0235316 A1 10/2005 Ahmad-taylor
2005/0257166 A1 11/2005 Tu
2005/0283358 A1 12/2005 Stephanick et al.
2006/0017692 A1 1/2006 Wehrenberg et al.
2006/0020904 A1 1/2006 Aaltonen et al.
2006/0026521 A1 2/2006 Hotelling et al.
2006/0029374 A1 2/2006 Park
2006/0031872 A1 2/2006 Hsiao et al.
2006/0033724 A1 2/2006 Chaudhri et al.
2006/0053449 A1 3/2006 Gutta
2006/0053470 A1 3/2006 Colter et al.
2006/0069998 A1 3/2006 Artman et al.
2006/0071905 A1 4/2006 Varanda
2006/0080352 A1 4/2006 Boubez et al.
2006/0097991 A1 5/2006 Hotelling et al.
2006/0107304 A1 5/2006 Cleron et al.
2006/0112346 A1 5/2006 Miksovsky et al.
2006/0112352 A1 * 5/2006 Tseng .................... H04N 21/47
715/810
2006/0117267 A1 6/2006 Koralski et al.
2006/0120624 A1 6/2006 Jojic et al.
2006/0195479 A1 8/2006 Spiegelman et al.
2006/0195512 A1 8/2006 Rogers et al.
2006/0197753 A1 9/2006 Hotelling
2006/0200842 A1 9/2006 Chapman et al.
2006/0224987 A1 10/2006 Caffarelli
2006/0236847 A1 10/2006 Withop
2006/0248113 A1 11/2006 Leffert et al.
2006/0265637 A1 11/2006 Marriott et al.
2006/0271968 A1 11/2006 Zellner
2006/0282856 A1 12/2006 Errico et al.
2006/0288848 A1 12/2006 Gould et al.
2006/0294545 A1 12/2006 Morris et al.
2007/0005569 A1 1/2007 Hurst-hiller et al.
2007/0009229 A1 1/2007 Liu

(56) References Cited

U.S. PATENT DOCUMENTS

2007/0011702 A1* 1/2007 Vaysman ........... H04N 21/4828 348/E7.071
2007/0024594 A1 2/2007 Sakata et al.
2007/0028267 A1 2/2007 Ostojic et al.
2007/0038957 A1 2/2007 White
2007/0073596 A1 3/2007 Alexander et al.
2007/0092204 A1 4/2007 Wagner et al.
2007/0094602 A1 4/2007 Murabayashi
2007/0150802 A1 6/2007 Wan et al.
2007/0150918 A1 6/2007 Carpenter et al.
2007/0154163 A1 7/2007 Cordray
2007/0157220 A1* 7/2007 Cordray ................ H04H 60/65 386/E5.07
2007/0157249 A1 7/2007 Cordray et al.
2007/0168413 A1 7/2007 Barletta et al.
2007/0186254 A1 8/2007 Tsutsui et al.
2007/0199035 A1 8/2007 Schwartz et al.
2007/0204057 A1 8/2007 Shaver et al.
2007/0220580 A1 9/2007 Putterman et al.
2007/0229465 A1 10/2007 Sakai et al.
2007/0233880 A1 10/2007 Nieh et al.
2007/0244902 A1 10/2007 Seide et al.
2007/0248317 A1 10/2007 Bahn
2008/0046928 A1 2/2008 Poling et al.
2008/0046931 A1* 2/2008 Corbett ........... H04N 21/42204 725/52
2008/0059884 A1 3/2008 Ellis et al.
2008/0065989 A1 3/2008 Conroy et al.
2008/0066010 A1 3/2008 Brodersen et al.
2008/0077562 A1 3/2008 Schleppe
2008/0092168 A1 4/2008 Logan et al.
2008/0092173 A1 4/2008 Shannon et al.
2008/0111822 A1 5/2008 Horowitz et al.
2008/0120668 A1 5/2008 Yau
2008/0127281 A1 5/2008 Van et al.
2008/0155475 A1 6/2008 Duhig
2008/0163053 A1 7/2008 Hwang et al.
2008/0189740 A1 8/2008 Carpenter et al.
2008/0189742 A1 8/2008 Ellis et al.
2008/0208844 A1 8/2008 Jenkins
2008/0216020 A1 9/2008 Plummer
2008/0222677 A1 9/2008 Woo et al.
2008/0235331 A1 9/2008 Melamed et al.
2008/0235588 A1 9/2008 Gonze et al.
2008/0243817 A1 10/2008 Chan et al.
2008/0250312 A1 10/2008 Curtis
2008/0260252 A1 10/2008 Borgaonkar et al.
2008/0270886 A1 10/2008 Gossweiler et al.
2008/0276278 A1 11/2008 Krieger et al.
2008/0276279 A1 11/2008 Gossweiler et al.
2008/0301260 A1 12/2008 Goldeen et al.
2008/0301579 A1 12/2008 Jonasson et al.
2008/0301734 A1 12/2008 Goldeen et al.
2008/0307343 A1 12/2008 Robert et al.
2008/0307458 A1 12/2008 Kim et al.
2008/0307459 A1 12/2008 Migos
2008/0320391 A1 12/2008 Lemay et al.
2008/0320532 A1 12/2008 Lee
2009/0055385 A1 2/2009 Jeon et al.
2009/0055873 A1 2/2009 Kim et al.
2009/0063521 A1 3/2009 Bull et al.
2009/0063975 A1 3/2009 Rottler et al.
2009/0089837 A1 4/2009 Momosaki
2009/0094662 A1 4/2009 Chang et al.
2009/0106110 A1 4/2009 Stannard et al.
2009/0119754 A1 5/2009 Schubert
2009/0158325 A1 6/2009 Johnson
2009/0158326 A1 6/2009 Hunt et al.
2009/0161868 A1 6/2009 Chaudhry
2009/0164944 A1 6/2009 Webster et al.
2009/0165054 A1 6/2009 Rudolph
2009/0174679 A1 7/2009 Westerman
2009/0177301 A1 7/2009 Hayes
2009/0177989 A1 7/2009 Ma et al.
2009/0178083 A1 7/2009 Carr et al.
2009/0228491 A1 9/2009 Malik
2009/0228807 A1 9/2009 Lemay
2009/0228919 A1* 9/2009 Zott .................. H04N 7/17318 725/51
2009/0239587 A1 9/2009 Negron et al.
2009/0256807 A1 10/2009 Nurmi
2009/0259957 A1 10/2009 Slocum et al.
2009/0278916 A1 11/2009 Ito
2009/0282444 A1 11/2009 Laksono et al.
2009/0288079 A1 11/2009 Zuber et al.
2009/0313100 A1 12/2009 Ingleshwar
2009/0322962 A1 12/2009 Weeks
2009/0327952 A1 12/2009 Karas et al.
2010/0003007 A1 1/2010 Itakura
2010/0009629 A1 1/2010 Jung et al.
2010/0009719 A1 1/2010 Oh et al.
2010/0017713 A1 1/2010 Igarashi
2010/0031162 A1 2/2010 Wiser et al.
2010/0046608 A1 2/2010 Mccrossan et al.
2010/0053220 A1 3/2010 Ozawa et al.
2010/0053432 A1 3/2010 Cheng et al.
2010/0057696 A1 3/2010 Miyazawa et al.
2010/0064313 A1 3/2010 Beyabani
2010/0080163 A1 4/2010 Krishnamoorthi et al.
2010/0083181 A1 4/2010 Matsushima et al.
2010/0095240 A1 4/2010 Shiplacoff et al.
2010/0100899 A1 4/2010 Bradbury et al.
2010/0104269 A1 4/2010 Prestenback et al.
2010/0115060 A1 5/2010 Julia et al.
2010/0115592 A1 5/2010 Belz et al.
2010/0121714 A1 5/2010 Bryant et al.
2010/0146422 A1 6/2010 Seong et al.
2010/0146442 A1 6/2010 Nagasaka et al.
2010/0153881 A1 6/2010 Dinn
2010/0153999 A1 6/2010 Yates
2010/0159898 A1 6/2010 Krzyzanowski et al.
2010/0162172 A1 6/2010 Aroner
2010/0175079 A1 7/2010 Braun et al.
2010/0194998 A1 8/2010 Lee et al.
2010/0198822 A1 8/2010 Glennon et al.
2010/0205628 A1 8/2010 Davis et al.
2010/0211636 A1 8/2010 Starkenburg et al.
2010/0211884 A1 8/2010 Kashyap et al.
2010/0223646 A1 9/2010 Goldeen et al.
2010/0229194 A1 9/2010 Blanchard et al.
2010/0235744 A1 9/2010 Schultz et al.
2010/0251304 A1 9/2010 Donoghue et al.
2010/0257005 A1 10/2010 Phenner et al.
2010/0269145 A1 10/2010 Ingrassia et al.
2010/0275143 A1 10/2010 Fu et al.
2010/0277337 A1 11/2010 Brodersen et al.
2010/0293190 A1 11/2010 Kaiser et al.
2010/0293586 A1 11/2010 Simoes et al.
2010/0299606 A1 11/2010 Morita
2010/0312824 A1 12/2010 Smith et al.
2010/0325660 A1 12/2010 Holden
2010/0333142 A1 12/2010 Busse et al.
2010/0333143 A1 12/2010 Civanlar et al.
2011/0004831 A1 1/2011 Steinberg et al.
2011/0033168 A1 2/2011 Iyer
2011/0047513 A1 2/2011 Onogi et al.
2011/0052146 A1 3/2011 Murthy et al.
2011/0054649 A1 3/2011 Sarkis et al.
2011/0055762 A1 3/2011 Jung et al.
2011/0055870 A1 3/2011 Yum et al.
2011/0071977 A1 3/2011 Nakajima et al.
2011/0078739 A1 3/2011 Grad
2011/0080935 A1 4/2011 Kim et al.
2011/0087992 A1 4/2011 Wang et al.
2011/0090402 A1 4/2011 Huntington et al.
2011/0093415 A1 4/2011 Rhee et al.
2011/0099519 A1 4/2011 Ma et al.
2011/0107220 A1 5/2011 Perlman
2011/0119710 A1 5/2011 Jang et al.
2011/0119715 A1 5/2011 Chang et al.
2011/0122315 A1* 5/2011 Schweiger ......... H04N 21/2365 348/E5.009
2011/0126102 A1 5/2011 Archer
2011/0131607 A1 6/2011 Thomas et al.

(56) References Cited

U.S. PATENT DOCUMENTS

2011/0154194 A1 6/2011 Mathai et al.
2011/0154305 A1 6/2011 Leroux et al.
2011/0157029 A1 6/2011 Tseng
2011/0162022 A1 6/2011 Xia
2011/0163971 A1 7/2011 Wagner et al.
2011/0167339 A1 7/2011 Lemay
2011/0175930 A1 7/2011 Hwang et al.
2011/0179388 A1 7/2011 Fleizach et al.
2011/0179453 A1 7/2011 Poniatowski
2011/0197153 A1 8/2011 King et al.
2011/0209177 A1 8/2011 Sela et al.
2011/0218948 A1 9/2011 De et al.
2011/0231280 A1 9/2011 Farah
2011/0231823 A1 9/2011 Fryc et al.
2011/0231872 A1 9/2011 Gharachorloo et al.
2011/0231878 A1 9/2011 Hunter et al.
2011/0246332 A1 10/2011 Alcodray et al.
2011/0255840 A1 10/2011 Bornsen
2011/0281517 A1 11/2011 Ukkadam
2011/0283304 A1 11/2011 Roberts et al.
2011/0283333 A1 11/2011 Ukkadam
2011/0289064 A1 11/2011 Lebeau et al.
2011/0289317 A1 11/2011 Darapu et al.
2011/0289419 A1 11/2011 Yu et al.
2011/0289421 A1 11/2011 Jordan et al.
2011/0289452 A1 11/2011 Jordan et al.
2011/0289531 A1 11/2011 Moonka et al.
2011/0289534 A1 11/2011 Jordan et al.
2011/0296351 A1 12/2011 Ewing et al.
2011/0302532 A1 12/2011 Missig
2011/0307631 A1 12/2011 Park et al.
2011/0312278 A1 12/2011 Matsushita et al.
2011/0314497 A1 12/2011 Warrick et al.
2011/0321072 A1 12/2011 Patterson et al.
2012/0019674 A1 1/2012 Ohnishi et al.
2012/0036552 A1 2/2012 Dare et al.
2012/0042245 A1 2/2012 Askey et al.
2012/0042343 A1 2/2012 Laligand et al.
2012/0053887 A1 3/2012 Nurmi
2012/0054178 A1 3/2012 Tran et al.
2012/0054642 A1 3/2012 Balsiger et al.
2012/0054679 A1 3/2012 Ma et al.
2012/0054797 A1 3/2012 Skog et al.
2012/0059910 A1 3/2012 Cassidy
2012/0060092 A1 3/2012 Hill et al.
2012/0064204 A1 3/2012 Davila et al.
2012/0084136 A1 4/2012 Seth et al.
2012/0093481 A1 4/2012 Mcdowell et al.
2012/0096011 A1 4/2012 Kay et al.
2012/0102573 A1 4/2012 Spooner et al.
2012/0105367 A1 5/2012 Son et al.
2012/0110616 A1 5/2012 Kilar et al.
2012/0110621 A1 5/2012 Gossweiler, III
2012/0114303 A1 5/2012 Chung et al.
2012/0117584 A1 5/2012 Gordon
2012/0124615 A1 5/2012 Lee
2012/0131615 A1 5/2012 Kobayashi et al.
2012/0139938 A1 6/2012 Khedouri et al.
2012/0141095 A1 6/2012 Schwesinger et al.
2012/0144003 A1 6/2012 Rosenbaum et al.
2012/0158524 A1 6/2012 Hintz et al.
2012/0159543 A1* 6/2012 Jin .................. H04N 21/25841 725/39
2012/0166998 A1 6/2012 Cotterill et al.
2012/0173991 A1 7/2012 Roberts et al.
2012/0174157 A1 7/2012 Stinson et al.
2012/0198020 A1 8/2012 Parker et al.
2012/0198336 A1 8/2012 Novotny et al.
2012/0210366 A1 8/2012 Wong et al.
2012/0215684 A1 8/2012 Kidron
2012/0216113 A1 8/2012 Li
2012/0216117 A1 8/2012 Arriola et al.
2012/0216296 A1 8/2012 Kidron
2012/0221498 A1 8/2012 Kaszynski et al.
2012/0222056 A1 8/2012 Donoghue et al.
2012/0233640 A1 9/2012 Odryna et al.
2012/0242704 A1 9/2012 Bamford et al.
2012/0260291 A1* 10/2012 Wood .................. H04N 21/482 725/45
2012/0260293 A1 10/2012 Young et al.
2012/0262371 A1 10/2012 Lee et al.
2012/0262407 A1 10/2012 Hinckley et al.
2012/0266069 A1 10/2012 Moshiri et al.
2012/0272261 A1 10/2012 Reynolds et al.
2012/0284753 A1 11/2012 Roberts et al.
2012/0290933 A1 11/2012 Rajaraman et al.
2012/0291079 A1 11/2012 Gordon et al.
2012/0308143 A1 12/2012 Bellegarda et al.
2012/0311443 A1 12/2012 Chaudhri et al.
2012/0311638 A1 12/2012 Reyna et al.
2012/0317482 A1 12/2012 Barraclough et al.
2012/0323938 A1 12/2012 Skeen et al.
2012/0324504 A1 12/2012 Archer et al.
2012/0327125 A1 12/2012 Kutliroff et al.
2013/0007656 A1 1/2013 Li et al.
2013/0014150 A1 1/2013 Seo et al.
2013/0014159 A1 1/2013 Wiser et al.
2013/0021288 A1 1/2013 Kaerkkaeinen et al.
2013/0024895 A1 1/2013 Yong et al.
2013/0031585 A1 1/2013 Itagaki et al.
2013/0033643 A1 2/2013 Kim et al.
2013/0042271 A1 2/2013 Yellin et al.
2013/0061234 A1 3/2013 Piira et al.
2013/0061267 A1 3/2013 Cansino et al.
2013/0067366 A1 3/2013 Almosnino
2013/0073403 A1 3/2013 Tuchman et al.
2013/0076681 A1 3/2013 Sirpal et al.
2013/0080968 A1 3/2013 Hanson et al.
2013/0083076 A1 4/2013 Liu et al.
2013/0097009 A1 4/2013 Akadiri
2013/0110978 A1 5/2013 Gordon et al.
2013/0124998 A1* 5/2013 Pendergast ............. G11B 27/34 715/723
2013/0132874 A1 5/2013 He et al.
2013/0132966 A1 5/2013 Chanda et al.
2013/0151300 A1 6/2013 Le et al.
2013/0173034 A1 7/2013 Reimann et al.
2013/0174193 A1 7/2013 Yu et al.
2013/0179812 A1 7/2013 Bianrosa et al.
2013/0179995 A1 7/2013 Basile et al.
2013/0198686 A1 8/2013 Kawai et al.
2013/0205312 A1 8/2013 Huang
2013/0212531 A1 8/2013 Yoshida
2013/0227482 A1 8/2013 Thorsander et al.
2013/0247105 A1 9/2013 Jovanovski et al.
2013/0254308 A1* 9/2013 Rose ................ H04N 21/26258 709/206
2013/0262431 A1 10/2013 Garner et al.
2013/0262558 A1 10/2013 Wood et al.
2013/0262619 A1 10/2013 Goodwin et al.
2013/0262633 A1 10/2013 Goodwin et al.
2013/0263189 A1 10/2013 Garner
2013/0283154 A1 10/2013 Sasakura
2013/0283168 A1 10/2013 Brown et al.
2013/0283301 A1 10/2013 Avedissian et al.
2013/0283317 A1 10/2013 Guntupalli et al.
2013/0283318 A1* 10/2013 Wannamaker ... H04N 21/23424 725/56
2013/0285937 A1 10/2013 Billings et al.
2013/0290233 A1 10/2013 Ferren et al.
2013/0290848 A1 10/2013 Billings et al.
2013/0291018 A1 10/2013 Billings et al.
2013/0291037 A1 10/2013 Im et al.
2013/0294755 A1 11/2013 Arme et al.
2013/0312044 A1 11/2013 Itagaki
2013/0326499 A1 12/2013 Mowatt et al.
2013/0326554 A1 12/2013 Shkedi
2013/0326561 A1 12/2013 Pandey
2013/0332838 A1 12/2013 Naggar et al.
2013/0332871 A1 12/2013 Bucur et al.
2013/0332960 A1 12/2013 Young et al.
2013/0339877 A1 12/2013 Skeen et al.
2013/0340006 A1 12/2013 Kwan
2013/0346564 A1 12/2013 Warrick et al.

(56) References Cited

U.S. PATENT DOCUMENTS

2013/0347044 A1 12/2013 Lee et al.
2014/0006635 A1 1/2014 Braness et al.
2014/0006795 A1 1/2014 Han et al.
2014/0006951 A1 1/2014 Hunter
2014/0012859 A1 1/2014 Heilprin et al.
2014/0013283 A1 1/2014 Matas et al.
2014/0020017 A1 1/2014 Stern et al.
2014/0024341 A1 1/2014 Johan
2014/0028780 A1 1/2014 Croen et al.
2014/0033245 A1 1/2014 Barton et al.
2014/0049692 A1 2/2014 Sirpal et al.
2014/0052683 A1 2/2014 Kirkham et al.
2014/0053116 A1 2/2014 Smith et al.
2014/0053195 A1 2/2014 Sirpal et al.
2014/0059605 A1 2/2014 Sirpal et al.
2014/0059615 A1 2/2014 Sirpal et al.
2014/0059625 A1 2/2014 Dourado et al.
2014/0059635 A1 2/2014 Sirpal et al.
2014/0067425 A1 3/2014 Dudar et al.
2014/0068654 A1 3/2014 Marlow et al.
2014/0071068 A1 3/2014 Shih et al.
2014/0074454 A1 3/2014 Brown et al.
2014/0075313 A1 3/2014 Bachman et al.
2014/0075316 A1 3/2014 Li
2014/0075394 A1 3/2014 Nawle et al.
2014/0075574 A1 3/2014 Zheng et al.
2014/0082497 A1 3/2014 Chalouhi et al.
2014/0082660 A1 3/2014 Zhang et al.
2014/0088952 A1 3/2014 Fife et al.
2014/0089816 A1 3/2014 Dipersia et al.
2014/0098102 A1 4/2014 Raffle et al.
2014/0101706 A1 4/2014 Kardatzke
2014/0104646 A1 4/2014 Nishiyama
2014/0109204 A1 4/2014 Papillon et al.
2014/0111416 A1 4/2014 Sugiura
2014/0115636 A1 4/2014 Stuckman
2014/0123006 A1 5/2014 Chen et al.
2014/0129232 A1 5/2014 Jones et al.
2014/0130097 A1 5/2014 Londero
2014/0136946 A1 5/2014 Matas
2014/0137029 A1 5/2014 Stephenson et al.
2014/0137030 A1 5/2014 Matas
2014/0143260 A1 5/2014 Simonson et al.
2014/0143683 A1 5/2014 Underwood et al.
2014/0156792 A1 6/2014 Roberts et al.
2014/0157204 A1 6/2014 Roberts et al.
2014/0157329 A1 6/2014 Roberts et al.
2014/0164966 A1 6/2014 Kim et al.
2014/0168071 A1 6/2014 Ahmed et al.
2014/0171153 A1 6/2014 Kienzle et al.
2014/0172622 A1 6/2014 Baronshin
2014/0172953 A1 6/2014 Blanksteen
2014/0173660 A1 6/2014 Correa et al.
2014/0184471 A1 7/2014 Martynov et al.
2014/0189523 A1 7/2014 Shuttleworth et al.
2014/0189574 A1 7/2014 Stallings et al.
2014/0189606 A1 7/2014 Shuttleworth et al.
2014/0196064 A1 7/2014 Kennedy et al.
2014/0196069 A1 7/2014 Ahmed et al.
2014/0208268 A1 7/2014 Jimenez
2014/0208360 A1 7/2014 Kardatzke
2014/0219637 A1 8/2014 Mcintosh et al.
2014/0224867 A1 8/2014 Werner et al.
2014/0244751 A1 8/2014 Tseng
2014/0245148 A1 8/2014 Silva et al.
2014/0245186 A1 8/2014 Tseng
2014/0245222 A1 8/2014 Kovacevic et al.
2014/0250465 A1 9/2014 Mulholland et al.
2014/0250479 A1 9/2014 Lee et al.
2014/0253463 A1 9/2014 Hicks
2014/0253803 A1 9/2014 Jiang
2014/0259074 A1 9/2014 Ansari et al.
2014/0278072 A1 9/2014 Fino et al.
2014/0278940 A1 9/2014 Wade
2014/0280728 A1 9/2014 Szerlip Joyce et al.
2014/0282208 A1 9/2014 Chaudhri
2014/0282636 A1 9/2014 Petander et al.
2014/0282677 A1 9/2014 Mantell et al.
2014/0288686 A1 9/2014 Sant et al.
2014/0289226 A1 9/2014 English et al.
2014/0289751 A1 9/2014 Hsu et al.
2014/0310742 A1 10/2014 Kim
2014/0317653 A1 10/2014 Mlodzinski
2014/0325357 A1 10/2014 Sant et al.
2014/0333530 A1 11/2014 Agnetta et al.
2014/0337607 A1 11/2014 Peterson et al.
2014/0340358 A1 11/2014 Martinoli
2014/0341109 A1 11/2014 Cartmell et al.
2014/0344247 A1 11/2014 Procopio et al.
2014/0344291 A9 11/2014 Simonson et al.
2014/0344294 A1 11/2014 Skeen et al.
2014/0351691 A1 11/2014 Neil et al.
2014/0359598 A1 12/2014 Oliver et al.
2014/0364056 A1 12/2014 Belk et al.
2014/0365479 A1 12/2014 Lyons et al.
2014/0365481 A1 12/2014 Novosel et al.
2014/0365604 A1 12/2014 Lewis et al.
2014/0365919 A1 12/2014 Shaw et al.
2014/0366040 A1 12/2014 Parker et al.
2014/0366047 A1 12/2014 Thomas et al.
2015/0020127 A1 1/2015 Doshi et al.
2015/0039685 A1 2/2015 Lewis et al.
2015/0046866 A1 2/2015 Shimadate
2015/0067582 A1 3/2015 Donnelly et al.
2015/0067724 A1 3/2015 Johnson et al.
2015/0074522 A1 3/2015 Harned et al.
2015/0074552 A1 3/2015 Chai et al.
2015/0074603 A1 3/2015 Abe et al.
2015/0082187 A1 3/2015 Wallters et al.
2015/0095460 A1 4/2015 Berger et al.
2015/0095845 A1 4/2015 Chun et al.
2015/0106856 A1* 4/2015 Rankine ............. H04N 21/8456
725/60
2015/0113000 A1 4/2015 Scheer et al.
2015/0113429 A1 4/2015 Edwards et al.
2015/0121408 A1 4/2015 Jacoby et al.
2015/0134653 A1 5/2015 Bayer et al.
2015/0135049 A1* 5/2015 Murphy ................. G06Q 30/00
715/205
2015/0135071 A1 5/2015 Glotzer
2015/0150049 A1 5/2015 White
2015/0150066 A1 5/2015 Park et al.
2015/0153571 A1 6/2015 Ballard et al.
2015/0154151 A1 6/2015 Xue et al.
2015/0161251 A1 6/2015 Ramanarayanan et al.
2015/0169705 A1 6/2015 Korbecki et al.
2015/0169975 A1 6/2015 Kienzle et al.
2015/0186002 A1 7/2015 Suzuki et al.
2015/0189347 A1 7/2015 Oztaskent et al.
2015/0193119 A1 7/2015 Chai et al.
2015/0193192 A1 7/2015 Kidron
2015/0195624 A1 7/2015 Gossweiler, III
2015/0205591 A1 7/2015 Jitkoff et al.
2015/0237389 A1 8/2015 Grouf et al.
2015/0296072 A1 10/2015 Zhou et al.
2015/0301729 A1 10/2015 Wang et al.
2015/0309670 A1 10/2015 Wheeler et al.
2015/0312603 A1 10/2015 Singh et al.
2015/0317343 A1 11/2015 Cselle et al.
2015/0318020 A1* 11/2015 Pribula ............. H04N 21/2743
386/290
2015/0331685 A1 11/2015 Bourke
2015/0334464 A1 11/2015 Shin
2015/0346975 A1 12/2015 Lee et al.
2015/0350741 A1 12/2015 Rajaraman et al.
2015/0355816 A1 12/2015 Shim
2015/0363035 A1 12/2015 Hinckley et al.
2015/0365306 A1 12/2015 Chaudhri et al.
2015/0365729 A1 12/2015 Kaya et al.
2015/0370435 A1 12/2015 Kirmse et al.
2015/0370455 A1 12/2015 Van Os et al.
2015/0370920 A1 12/2015 Van Os et al.
2015/0373107 A1 12/2015 Chan et al.
2015/0379021 A1 12/2015 Kuper

(56) References Cited

U.S. PATENT DOCUMENTS

2015/0382047 A1 12/2015 Van Os et al.
2015/0382066 A1* 12/2015 Heeter ............ H04N 21/42224 386/234
2016/0004425 A1 1/2016 Yoon et al.
2016/0004772 A1 1/2016 Kim et al.
2016/0004773 A1 1/2016 Jannink et al.
2016/0005013 A1 1/2016 Perry
2016/0014461 A1 1/2016 Leech et al.
2016/0021412 A1 1/2016 Zito, Jr.
2016/0035119 A1 2/2016 Lee et al.
2016/0036897 A1 2/2016 Kim et al.
2016/0041702 A1 2/2016 Wang
2016/0043962 A1 2/2016 Kim et al.
2016/0066004 A1 3/2016 Lieu et al.
2016/0066021 A1 3/2016 Thomas et al.
2016/0066040 A1 3/2016 Webster et al.
2016/0066049 A1 3/2016 Mountain
2016/0078465 A1 3/2016 Chai et al.
2016/0078526 A1 3/2016 Nations et al.
2016/0080815 A1* 3/2016 Ruffini ............ H04N 21/41407 725/46
2016/0092042 A1 3/2016 Yenigalla et al.
2016/0092559 A1 3/2016 Lind et al.
2016/0096113 A1 4/2016 Decoufle
2016/0099991 A1 4/2016 Lonkar et al.
2016/0105540 A1 4/2016 Kwon et al.
2016/0110064 A1 4/2016 Shapira
2016/0127783 A1 5/2016 Garcia Navarro
2016/0127789 A1 5/2016 Roberts et al.
2016/0133230 A1 5/2016 Daniels et al.
2016/0142783 A1 5/2016 Bagga et al.
2016/0165307 A1 6/2016 Lavender et al.
2016/0188902 A1 6/2016 Jin
2016/0191639 A1 6/2016 Dai et al.
2016/0192017 A1 6/2016 Tirpak
2016/0231885 A1 8/2016 Lee et al.
2016/0249105 A1 8/2016 Carney Landow
2016/0255379 A1 9/2016 Langan et al.
2016/0277785 A1 9/2016 Newman et al.
2016/0345070 A1 11/2016 Beeson et al.
2016/0357305 A1 12/2016 Wells et al.
2016/0357352 A1 12/2016 Matas et al.
2016/0357355 A1 12/2016 Carrigan et al.
2016/0357366 A1 12/2016 Migos et al.
2016/0370982 A1 12/2016 Penha et al.
2016/0378283 A1 12/2016 Cockcroft et al.
2017/0010846 A1 1/2017 Bernstein et al.
2017/0010847 A1 1/2017 Bernstein et al.
2017/0013295 A1 1/2017 Wertheimer et al.
2017/0046039 A1 2/2017 Karunamuni et al.
2017/0046339 A1 2/2017 Bhat et al.
2017/0068402 A1 3/2017 Lochhead et al.
2017/0068511 A1 3/2017 Brown et al.
2017/0070786 A1 3/2017 Keene et al.
2017/0094360 A1 3/2017 Keighran et al.
2017/0097969 A1 4/2017 Stein et al.
2017/0115867 A1 4/2017 Bargmann
2017/0124594 A1 5/2017 Naiga et al.
2017/0132659 A1 5/2017 Dirks et al.
2017/0132829 A1 5/2017 Blas et al.
2017/0134778 A1 5/2017 Christie et al.
2017/0140748 A1 5/2017 Roberts et al.
2017/0185240 A1 6/2017 Delrosario et al.
2017/0188116 A1 6/2017 Major et al.
2017/0192642 A1 7/2017 Fishman et al.
2017/0195736 A1 7/2017 Chai et al.
2017/0201850 A1 7/2017 Raleigh et al.
2017/0214975 A1 7/2017 Schmidt et al.
2017/0220228 A1* 8/2017 Sang .................... H04N 23/63
2017/0242913 A1 8/2017 Tijssen et al.
2017/0243244 A1 8/2017 Trabelsi et al.
2017/0245017 A1 8/2017 Chaudhri et al.
2017/0251257 A1 8/2017 Obrien
2017/0272543 A1 9/2017 Lo et al.
2017/0300151 A1 10/2017 Lue-sang et al.
2017/0339443 A1 11/2017 Lue-sang et al.
2017/0344553 A1 11/2017 Evnine et al.
2017/0345040 A1 11/2017 Pirnack et al.
2017/0353603 A1 12/2017 Grunewald et al.
2017/0357387 A1 12/2017 Clarke
2017/0359722 A1 12/2017 Folse et al.
2017/0364246 A1 12/2017 Van Os et al.
2017/0364274 A1 12/2017 Hammons et al.
2018/0011580 A1 1/2018 Lebowitz et al.
2018/0027279 A1* 1/2018 Templeman ....... H04N 21/4545 725/37
2018/0041814 A1 2/2018 Christie et al.
2018/0053094 A1 2/2018 Patel et al.
2018/0063591 A1 3/2018 Newman et al.
2018/0070121 A1 3/2018 Zimmerman et al.
2018/0070138 A1 3/2018 Chai et al.
2018/0107353 A1 4/2018 Lee
2018/0113579 A1 4/2018 Johnston et al.
2018/0130097 A1 5/2018 Tran et al.
2018/0136800 A1 5/2018 Johnston et al.
2018/0146377 A1 5/2018 Folse et al.
2018/0189076 A1 7/2018 Liston et al.
2018/0253900 A1 9/2018 Finding et al.
2018/0275855 A1 9/2018 Van Os et al.
2018/0293210 A1 10/2018 Xue et al.
2018/0293771 A1 10/2018 Piemonte et al.
2018/0295403 A1 10/2018 Christie et al.
2018/0302680 A1 10/2018 Cormican
2018/0343497 A1 11/2018 Brown et al.
2018/0349509 A1 12/2018 Abou Mahmoud et al.
2018/0364872 A1 12/2018 Miura et al.
2018/0367834 A1 12/2018 Carpenter et al.
2018/0367863 A1 12/2018 Newman et al.
2019/0012048 A1 1/2019 Johnston et al.
2019/0020925 A1 1/2019 Christie et al.
2019/0028769 A1 1/2019 Jeon et al.
2019/0045271 A1 2/2019 Christie et al.
2019/0052744 A1 2/2019 Jung et al.
2019/0058921 A1 2/2019 Christie et al.
2019/0066672 A1 2/2019 Wood et al.
2019/0073104 A1 3/2019 Wang
2019/0073680 A1 3/2019 Knox
2019/0129588 A1 5/2019 Johnston et al.
2019/0138163 A1 5/2019 Howland et al.
2019/0141399 A1 5/2019 Auxer et al.
2019/0258373 A1 8/2019 Davydov et al.
2019/0272853 A1 9/2019 Moore
2019/0324614 A1 10/2019 Brillon et al.
2019/0342616 A1 11/2019 Domm et al.
2019/0354264 A1 11/2019 Van Os et al.
2019/0373320 A1 12/2019 Balsamo
2020/0034792 A1 1/2020 Rogers et al.
2020/0068274 A1 2/2020 Aher et al.
2020/0084488 A1 3/2020 Christie et al.
2020/0099985 A1 3/2020 Keighran et al.
2020/0133631 A1 4/2020 Christie et al.
2020/0137175 A1 4/2020 Ganci et al.
2020/0145726 A1* 5/2020 Ciuca .................. H04N 21/435
2020/0213642 A1* 7/2020 Bartos ............... H04N 21/6587
2020/0257415 A1 8/2020 Clarke
2020/0272666 A1 8/2020 Van Os et al.
2020/0301567 A1 9/2020 Park et al.
2020/0301575 A1 9/2020 Lindholm et al.
2020/0304863 A1 9/2020 Domm et al.
2020/0304876 A1 9/2020 Cielak et al.
2020/0304879 A1 9/2020 Ellingford
2020/0304880 A1 9/2020 Diaz Delgado et al.
2020/0344531 A1 10/2020 Soundararajan et al.
2020/0356160 A1 11/2020 Kosugi et al.
2020/0363934 A1 11/2020 Van Os et al.
2020/0374595 A1* 11/2020 Yang ................. H04N 21/4821
2020/0380029 A1 12/2020 Chen
2020/0382845 A1 12/2020 Payne
2020/0396507 A1 12/2020 Balsamo
2021/0021903 A1 1/2021 Christie et al.
2021/0092489 A1* 3/2021 Dutta ................ H04N 21/4728
2021/0168424 A1 6/2021 Sharma
2021/0181901 A1 6/2021 Johnston et al.
2021/0195277 A1 6/2021 Thurlow et al.

(56) References Cited

U.S. PATENT DOCUMENTS

| | | | |
|---|---|---|---|
| 2021/0286454 | A1 | 9/2021 | Beaumier et al. |
| 2021/0306711 | A1 | 9/2021 | Ellingford et al. |
| 2021/0337280 | A1 | 10/2021 | Diaz Delgado et al. |
| 2021/0345004 | A1 | 11/2021 | Christie et al. |
| 2021/0365134 | A1 | 11/2021 | Beaumier et al. |
| 2021/0397306 | A1 | 12/2021 | Rajam et al. |
| 2021/0406995 | A1 | 12/2021 | Peters et al. |
| 2021/0409822 | A1 | 12/2021 | Aher et al. |
| 2022/0057984 | A1 | 2/2022 | Yang et al. |
| 2022/0132215 | A1* | 4/2022 | Venugopal ....... H04N 21/47217 |
| 2022/0179526 | A1 | 6/2022 | Schoberl |
| 2022/0244824 | A1 | 8/2022 | Cielak |
| 2022/0321940 | A1 | 10/2022 | Christie et al. |
| 2022/0329891 | A1 | 10/2022 | Christie et al. |
| 2022/0337914 | A1 | 10/2022 | Christie et al. |
| 2022/0360858 | A1 | 11/2022 | Christie et al. |
| 2022/0413796 | A1 | 12/2022 | Christie et al. |
| 2023/0022781 | A1 | 1/2023 | Lindholm et al. |
| 2023/0033604 | A1 | 2/2023 | Diaz Delgado et al. |
| 2023/0096458 | A1 | 3/2023 | Van Os et al. |
| 2023/0127228 | A1 | 4/2023 | Clarke |
| 2023/0132595 | A1 | 5/2023 | Van Os et al. |
| 2023/0300415 | A1 | 9/2023 | Balsamo |
| 2023/0328327 | A1 | 10/2023 | Cielak et al. |
| 2024/0037144 | A1 | 2/2024 | Chen |
| 2024/0089550 | A1 | 3/2024 | Ellingford et al. |
| 2024/0089553 | A1 | 3/2024 | Payne |
| 2024/0126401 | A1 | 4/2024 | Rajam et al. |
| 2024/0220195 | A1 | 7/2024 | Christie et al. |
| 2024/0302952 | A1 | 9/2024 | Wood et al. |
| 2024/0323473 | A1 | 9/2024 | Newman et al. |
| 2024/0388761 | A1 | 11/2024 | Christie et al. |
| 2024/0402899 | A1 | 12/2024 | Sart et al. |
| 2024/0419736 | A1 | 12/2024 | Van Os et al. |
| 2024/0422394 | A1 | 12/2024 | Keighran et al. |
| 2025/0021218 | A1 | 1/2025 | Os et al. |
| 2025/0138725 | A1 | 5/2025 | Lindholm |
| 2025/0142175 | A1 | 5/2025 | Christie et al. |

FOREIGN PATENT DOCUMENTS

| | | | |
|---|---|---|---|
| AU | 2017101431 | A4 | 11/2017 |
| AU | 2018100810 | A4 | 7/2018 |
| CN | 1295419 | A | 5/2001 |
| CN | 1391765 | A | 1/2003 |
| CN | 1985277 | A | 6/2007 |
| CN | 1985327 | A | 6/2007 |
| CN | 101160932 | A | 4/2008 |
| CN | 101228570 | A | 7/2008 |
| CN | 101317149 | A | 12/2008 |
| CN | 101370104 | A | 2/2009 |
| CN | 101405679 | A | 4/2009 |
| CN | 101436110 | A | 5/2009 |
| CN | 101465993 | A | 6/2009 |
| CN | 101529437 | A | 9/2009 |
| CN | 101641662 | A | 2/2010 |
| CN | 101699505 | A | 4/2010 |
| CN | 101706704 | A | 5/2010 |
| CN | 101719125 | A | 6/2010 |
| CN | 101860447 | A | 10/2010 |
| CN | 102098537 | A | 6/2011 |
| CN | 102103460 | A | 6/2011 |
| CN | 102187338 | A | 9/2011 |
| CN | 102265586 | A | 11/2011 |
| CN | 102325144 | A | 1/2012 |
| CN | 102541419 | A | 7/2012 |
| CN | 102819715 | A | 12/2012 |
| CN | 102859484 | A | 1/2013 |
| CN | 102880404 | A | 1/2013 |
| CN | 102890615 | A | 1/2013 |
| CN | 102939515 | A | 2/2013 |
| CN | 102955653 | A | 3/2013 |
| CN | 102981695 | A | 3/2013 |
| CN | 103037265 | A | 4/2013 |
| CN | 103177738 | A | 6/2013 |
| CN | 103399967 | A | 11/2013 |
| CN | 103516933 | A | 1/2014 |
| CN | 103546816 | A | 1/2014 |
| CN | 103562848 | A | 2/2014 |
| CN | 103562947 | A | 2/2014 |
| CN | 103620531 | A | 3/2014 |
| CN | 103620541 | A | 3/2014 |
| CN | 103620639 | A | 3/2014 |
| CN | 103686418 | A | 3/2014 |
| CN | 103985045 | A | 8/2014 |
| CN | 103999017 | A | 8/2014 |
| CN | 104508618 | A | 4/2015 |
| CN | 104822098 | A | 8/2015 |
| CN | 105190590 | A | 12/2015 |
| CN | 105247526 | A | 1/2016 |
| CN | 105264479 | A | 1/2016 |
| CN | 105303372 | A | 2/2016 |
| CN | 105308634 | A | 2/2016 |
| CN | 105308923 | A | 2/2016 |
| CN | 105336350 | A | 2/2016 |
| CN | 105657554 | A | 6/2016 |
| CN | 105812849 | A | 7/2016 |
| CN | 105828098 | A | 8/2016 |
| CN | 105955520 | A | 9/2016 |
| CN | 105955607 | A | 9/2016 |
| CN | 105989085 | A | 10/2016 |
| CN | 105992068 | A | 10/2016 |
| CN | 106101982 | A | 11/2016 |
| CN | 107710131 | A | 2/2018 |
| CN | 108292190 | A | 7/2018 |
| CN | 109313491 | A | 2/2019 |
| CN | 109313651 | A | 2/2019 |
| DE | 202016003233 | U1 | 8/2016 |
| EP | 0608708 | A2 | 8/1994 |
| EP | 0624853 | A2 | 11/1994 |
| EP | 2386984 | A2 | 11/2011 |
| EP | 2453667 | A1 | 5/2012 |
| EP | 2535844 | A2 | 12/2012 |
| EP | 2574089 | A1 | 3/2013 |
| EP | 2605203 | A1 | 6/2013 |
| EP | 2642402 | A2 | 9/2013 |
| EP | 2672703 | A1 | 12/2013 |
| EP | 2679017 | A2 | 1/2014 |
| EP | 2704032 | A2 | 3/2014 |
| EP | 2725531 | A1 | 4/2014 |
| EP | 2879398 | A1 | 6/2015 |
| EP | 2947905 | A1 | 11/2015 |
| JP | 2000-112977 | A | 4/2000 |
| JP | 2000-163031 | A | 6/2000 |
| JP | 2001-197445 | A | 7/2001 |
| JP | 2002-27381 | A | 1/2002 |
| JP | 2002-342033 | A | 11/2002 |
| JP | 2003-99452 | A | 4/2003 |
| JP | 2003-534737 | A | 11/2003 |
| JP | 2004-62237 | A | 2/2004 |
| JP | 2006-31219 | A | 2/2006 |
| JP | 2007-124465 | A | 5/2007 |
| JP | 2007-512640 | A | 5/2007 |
| JP | 2007-140910 | A | 6/2007 |
| JP | 2007-294068 | A | 11/2007 |
| JP | 2008-71112 | A | 3/2008 |
| JP | 2008-135911 | A | 6/2008 |
| JP | 2009-60328 | A | 3/2009 |
| JP | 2009-206957 | A | 9/2009 |
| JP | 2009-260947 | A | 11/2009 |
| JP | 2009-276557 | A | 11/2009 |
| JP | 2010-28437 | A | 2/2010 |
| JP | 2010-56595 | A | 3/2010 |
| JP | 2010-509684 | A | 3/2010 |
| JP | 2010-114733 | A | 5/2010 |
| JP | 2011-76588 | A | 4/2011 |
| JP | 2011-512701 | A | 4/2011 |
| JP | 2011-123750 | A | 6/2011 |
| JP | 2011-154455 | A | 8/2011 |
| JP | 2011-182146 | A | 9/2011 |
| JP | 2011-205562 | A | 10/2011 |
| JP | 2011-257930 | A | 12/2011 |
| JP | 2012-095123 | A | 5/2012 |
| JP | 2012-123685 | A | 6/2012 |

(56) References Cited

FOREIGN PATENT DOCUMENTS

| | | | |
|---|---|---|---|
| JP | 2012-208622 | A | 10/2012 |
| JP | 2013-8369 | A | 1/2013 |
| JP | 2013-12021 | A | 1/2013 |
| JP | 2013-223150 | A | 10/2013 |
| JP | 2013-235523 | A | 11/2013 |
| JP | 2013-242610 | A | 12/2013 |
| JP | 2014-81740 | A | 5/2014 |
| JP | 2014-102660 | A | 6/2014 |
| JP | 2015-50655 | A | 3/2015 |
| JP | 2015-70404 | A | 4/2015 |
| KR | 10-2001-0005939 | A | 1/2001 |
| KR | 10-2001-0035356 | A | 5/2001 |
| KR | 10-2002-0010151 | A | 2/2002 |
| KR | 10-2007-0114329 | A | 12/2007 |
| KR | 10-2009-0106104 | A | 10/2009 |
| KR | 10-2010-0039194 | A | 4/2010 |
| KR | 10-2011-0036408 | A | 4/2011 |
| KR | 10-2011-0061811 | A | 6/2011 |
| KR | 10-2012-0076682 | A | 7/2012 |
| KR | 10-2012-0124445 | A | 11/2012 |
| KR | 10-2013-0014712 | A | 2/2013 |
| KR | 10-2013-0058034 | A | 6/2013 |
| KR | 10-2013-0137969 | A | 12/2013 |
| KR | 10-2014-0041939 | A | 4/2014 |
| KR | 10-2019-0033658 | A | 3/2019 |
| KR | 10-2022-0041231 | A | 3/2022 |
| TW | 200622893 | A | 7/2006 |
| TW | 200719204 | A | 5/2007 |
| TW | 201337717 | A | 9/2013 |
| TW | 201349049 | A | 12/2013 |
| TW | 201351261 | A | 12/2013 |
| WO | 1994/009438 | A2 | 4/1994 |
| WO | 1999/040728 | A1 | 8/1999 |
| WO | 2004/063862 | A2 | 7/2004 |
| WO | 2004/102285 | A2 | 11/2004 |
| WO | 2005/050652 | A1 | 6/2005 |
| WO | 2005/109345 | A1 | 11/2005 |
| WO | 2007/078623 | A2 | 7/2007 |
| WO | 2008/005135 | A1 | 1/2008 |
| WO | 2008/060486 | A2 | 5/2008 |
| WO | 2009/016607 | A2 | 2/2009 |
| WO | 2009/039786 | A1 | 4/2009 |
| WO | 2009/148781 | A1 | 12/2009 |
| WO | 2010/022570 | A1 | 3/2010 |
| WO | 2010/025168 | A1 | 3/2010 |
| WO | 2010/118690 | A1 | 10/2010 |
| WO | 2011/095693 | A1 | 8/2011 |
| WO | 2011/158475 | A1 | 12/2011 |
| WO | 2012/012446 | A2 | 1/2012 |
| WO | 2012/061760 | A2 | 5/2012 |
| WO | 2012/088665 | A1 | 7/2012 |
| WO | 2013/000741 | A1 | 1/2013 |
| WO | 2013/149128 | A2 | 10/2013 |
| WO | 2013/169849 | A2 | 11/2013 |
| WO | 2013/169877 | A2 | 11/2013 |
| WO | 2013/187370 | A1 | 12/2013 |
| WO | 2013/149128 | A3 | 2/2014 |
| WO | 2014/105276 | A1 | 7/2014 |
| WO | 2014/144908 | A1 | 9/2014 |
| WO | 2014/177929 | A2 | 11/2014 |
| WO | 2014/200730 | A1 | 12/2014 |
| WO | 2015/200227 | A1 | 12/2015 |
| WO | 2015/200228 | A1 | 12/2015 |
| WO | 2015/200537 | A2 | 12/2015 |
| WO | 2016/030437 | A1 | 3/2016 |
| WO | 2016/048308 | A1 | 3/2016 |
| WO | 2016/048310 | A1 | 3/2016 |
| WO | 2016/111065 | A1 | 7/2016 |
| WO | 2017/008079 | A1 | 1/2017 |
| WO | 2017/124116 | A1 | 7/2017 |
| WO | 2017/200923 | A1 | 11/2017 |
| WO | 2017/218104 | A1 | 12/2017 |
| WO | 2018/081157 | A1 | 5/2018 |

OTHER PUBLICATIONS

Applicant Initiated Interview Summary received for U.S. Appl. No. 15/167,801, mailed on Apr. 23, 2018, 3 pages.

Applicant Initiated Interview Summary received for U.S. Appl. No. 15/167,801, mailed on Jul. 29, 2019, 3 pages.

Applicant Initiated Interview Summary received for U.S. Appl. No. 17/210,352, mailed on Feb. 28, 2022, 4 pages.

Corrected Notice of Allowability received for U.S. Appl. No. 16/108,519, mailed on Dec. 22, 2021, 3 pages.

Corrected Notice of Allowance received for U.S. Appl. No. 14/242,575, mailed on Dec. 15, 2016, 7 pages.

Corrected Notice of Allowance received for U.S. Appl. No. 14/242,575, mailed on Nov. 16, 2016, 7 pages.

Corrected Notice of Allowance received for U.S. Appl. No. 14/255,664, mailed on Aug. 29, 2017, 4 pages.

Corrected Notice of Allowance received for U.S. Appl. No. 14/267,671, mailed on Nov. 29, 2018, 3 pages.

Corrected Notice of Allowance received for U.S. Appl. No. 14/749,288, mailed on Sep. 21, 2017, 5 pages.

Corrected Notice of Allowance received for U.S. Appl. No. 15/276,633, mailed on Sep. 10, 2019, 7 pages.

Corrected Notice of Allowance received for U.S. Appl. No. 15/695,880, mailed on Jun. 11, 2018, 6 pages.

Corrected Notice of Allowance received for U.S. Appl. No. 15/714,904, mailed on Sep. 7, 2018, 5 pages.

Corrected Notice of Allowance received for U.S. Appl. No. 15/876,715, mailed on Apr. 11, 2022, 4 Pages.

Corrected Notice of Allowance received for U.S. Appl. No. 15/876,715, mailed on Apr. 19, 2022, 4 Pages.

Corrected Notice of Allowance received for U.S. Appl. No. 15/876,715, mailed on Oct. 20, 2021, 2 pages.

Corrected Notice of Allowance received for U.S. Appl. No. 16/010,280, mailed on Aug. 6, 2019, 2 pages.

Corrected Notice of Allowance received for U.S. Appl. No. 16/036,810, mailed on Nov. 19, 2018, 6 pages.

Corrected Notice of Allowance received for U.S. Appl. No. 16/142,635, mailed on Mar. 10, 2022, 2 Pages.

Corrected Notice of Allowance received for U.S. Appl. No. 16/233,990, mailed on Mar. 8, 2022, 4 pages.

Corrected Notice of Allowance received for U.S. Appl. No. 16/233,990, mailed on Oct. 20, 2022, 2 pages.

Corrected Notice of Allowance received for U.S. Appl. No. 16/827,931, mailed on Dec. 6, 2021, 4 pages.

Corrected Notice of Allowance received for U.S. Appl. No. 16/872,274, mailed on Aug. 12, 2022, 5 pages.

Corrected Notice of Allowance received for U.S. Appl. No. 16/888,453, mailed on Jul. 26, 2023, 5 pages.

Corrected Notice of Allowance received for U.S. Appl. No. 16/888,478, mailed on Oct. 31, 2023, 6 pages.

Corrected Notice of Allowance received for U.S. Appl. No. 16/945,724, mailed on Aug. 31, 2022, 2 pages.

Corrected Notice of Allowance received for U.S. Appl. No. 17/000,112, mailed on Jun. 17, 2022, 2 pages.

Corrected Notice of Allowance received for U.S. Appl. No. 17/065,387, mailed on Mar. 30, 2022, 2 Pages.

Corrected Notice of Allowance received for U.S. Appl. No. 17/210,352, mailed on Sep. 20, 2023, 5 pages.

Corrected Notice of Allowance received for U.S. Appl. No. 17/367,227, mailed on Jul. 27, 2023, 2 pages.

Cover Flow, Wikipedia, Available online at: <https://en.wikipedia.org/w/index.php?title=Cover_Flow&oldid=879285208>, Jan. 20, 2019, 3 pages.

Examiner Initiated Interview Summary received for U.S. Appl. No. 15/390,377, mailed on Oct. 30, 2017, 2 pages.

Examiner's Answer to Appeal Brief received for U.S. Appl. No. 15/876,715, mailed on Aug. 18, 2020, 16 pages.

Examiner's Answer to Appeal Brief received for U.S. Appl. No. 16/697,090, mailed on Oct. 26, 2023, 10 pages.

Extended European Search Report received for European Patent Application No. 17813728.7, mailed on Feb. 11, 2019, 8 pages.

Extended European Search Report received for European Patent Application No. 20190698.9, mailed on Oct. 30, 2020, 6 pages.

(56) References Cited

OTHER PUBLICATIONS

Extended European Search Report received for European Patent Application No. 20199219.5, mailed on Apr. 22, 2021, 8 pages.
Extended European Search Report received for European Patent Application No. 22167405.4, mailed on Jul. 4, 2022, 11 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/167,801, mailed on Sep. 19, 2023, 19 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/390,377, mailed on Nov. 9, 2017, 18 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/719,404, mailed on Mar. 30, 2021, 19 pages.
Final Office Action received for U.S. Appl. No. 15/876,715, mailed on Nov. 5, 2018, 15 pages.
Final Office Action received for U.S. Appl. No. 16/108,519, mailed on Dec. 12, 2019, 10 pages.
Final Office Action received for U.S. Appl. No. 16/108,519, mailed on Nov. 25, 2020, 12 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/584,790, mailed on May 27, 2020, 27 pages.
Final Office Action received for U.S. Appl. No. 16/682,443, mailed on Mar. 9, 2021, 9 pages.
Final Office Action received for U.S. Appl. No. 16/697,090, mailed on Dec. 14, 2022, 28 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,910, mailed on Mar. 15, 2023, 18 pages.
Final Office Action received for U.S. Appl. No. 16/827,918, mailed on Jul. 8, 2021, 31 pages.
Final Office Action received for U.S. Appl. No. 16/827,926, mailed on Apr. 18, 2023, 32 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Feb. 13, 2023, 27 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/133,550, mailed on Feb. 15, 2023, 22 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
Final Office Action received for U.S. Appl. No. 17/379,785, mailed on Aug. 23, 2023, 13 pages.
Final Office Action received for U.S. Appl. No. 17/379,785, mailed on Oct. 28, 2022, 14 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Final Office Action received for U.S. Appl. No. 18/060,902, mailed on Aug. 25, 2023, 8 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2015/037030, mailed on Dec. 10, 2015, 6 pages.
International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.

(56) References Cited

OTHER PUBLICATIONS

International Search Report received for PCT Patent Application No. PCT/US2017/031764, mailed on Aug. 7, 2017, 2 pages.
International Search Report received for PCT Patent Application No. PCT/US2017/058132, mailed on Mar. 27, 2018, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/208,099, mailed on Jun. 25, 2015, 12 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Non-Final Office Action received for U.S. Appl. No. 14/262,435, mailed on Feb. 22, 2016, 22 pages.
Non-Final Office Action received for U.S. Appl. No. 14/267,671, mailed on Apr. 1, 2016, 16 pages.
Non-Final Office Action received for U.S. Appl. No. 14/267,671, mailed on Dec. 1, 2017, 18 pages.
Non-Final Office Action received for U.S. Appl. No. 14/267,671, mailed on May 26, 2017, 18 pages.
Non-Final Office Action received for U.S. Appl. No. 14/271,179, mailed on May 29, 2015, 25 pages.
Non-Final Office Action received for U.S. Appl. No. 14/271,179, mailed on Oct. 5, 2018, 15 pages.
Non-Final Office Action received for U.S. Appl. No. 14/271,179, mailed on Sep. 21, 2017, 12 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 14/746,620, mailed on Jan. 11, 2017, 16 pages.
Non-Final Office Action received for U.S. Appl. No. 14/746,662, mailed on Aug. 9, 2016, 8 pages.
Non-Final Office Action received for U.S. Appl. No. 14/749,288, mailed on Oct. 12, 2016, 11 pages.
Non-Final Office Action received for U.S. Appl. No. 15/167,801 mailed on Mar. 24, 2017, 12 pages.
Office Action received for U.S. Appl. No. 15/167,801, mailed on Aug. 30, 2018, 15 pages.
Office Action received for U.S. Appl. No. 15/167,801, mailed on Dec. 11, 2020, 18 pages.
Office Action received for U.S. Appl. No. 15/167,801, mailed on Feb. 8, 2023, 23 pages.
Office Action received for U.S. Appl. No. 15/167,801, mailed on May 18, 2022, 17 Pages.
Office Action received for U.S. Appl. No. 15/167,801, mailed on Sep. 3, 2021, 17 pages.
Office Action received for U.S. Appl. No. 15/167,801, mailed on Sep. 26, 2019, 18 pages.
Office Action received for U.S. Appl. No. 15/224,370, mailed on Oct. 3, 2017, 14 pages.
Office Action received for U.S. Appl. No. 15/235,000, mailed on Jul. 14, 2017, 31 pages.
Office Action received for U.S. Appl. No. 15/235,000, mailed on Jul. 25, 2018, 31 pages.
Office Action received for U.S. Appl. No. 15/235,000, mailed on Jun. 26, 2019, 31 pages.
Office Action received for U.S. Appl. No. 15/272,393, mailed on Oct. 2, 2018, 52 pages.
Office Action received for U.S. Appl. No. 15/272,397, mailed on Nov. 22, 2016, 20 pages.
Office Action received for U.S. Appl. No. 15/276,633, mailed on Feb. 23, 2018, 12 pages.
Office Action received for U.S. Appl. No. 15/276,633, mailed on Mar. 5, 2019, 16 pages.
Office Action for U.S. Appl. No. 15/276,633, mailed on Nov. 17, 2016, 12 pages.
Non-Final Office Action received for U.S. Appl. No. 15/390,377, mailed on Apr. 5, 2017, 17 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Office Action received for U.S. Appl. No. 15/674,992, mailed on May 11, 2018, 8 pages.
Office Action received for U.S. Appl. No. 15/719,404, mailed on Dec. 14, 2018, 14 pages.
Office Action received for U.S. Appl. No. 15/719,404, mailed on May 10, 2023, 14 pages.
Office Action received for U.S. Appl. No. 15/719,404, mailed on Nov. 26, 2021, 19 pages.
Office Action received for U.S. Appl. No. 15/719,404, mailed on Oct. 16, 2020, 18 pages.
Office Action received for U.S. Appl. No. 15/798,092, mailed on Dec. 20, 2017, 20 pages.
Office Action received for U.S. Appl. No. 15/876,715, mailed on Jun. 4, 2018, 12 pages.
Office Action received for U.S. Appl. No. 15/876,715, mailed on Sep. 10, 2019, 13 pages.
Office Action received for U.S. Appl. No. 15/990,327, mailed on Jul. 31, 2018, 8 pages.
Office Action received for U.S. Appl. No. 16/010,280, mailed on Mar. 7, 2019, 5 pages.
Office Action received for U.S. Appl. No. 16/108,519, mailed on Apr. 5, 2021, 13 pages.
Office Action received for U.S. Appl. No. 16/108,519, mailed on Aug. 2, 2019, 10 pages.
Office Action received for U.S. Appl. No. 16/108,519, mailed on May 8, 2020, 11 pages.
Office Action received for U.S. Appl. No. 16/126,962, mailed on Aug. 25, 2020, 22 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 9, 2020, 10 pages.
Non-Final Office Action received for U.S. Appl. No. 16/136,005, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/142,635, mailed on Jun. 11, 2021, 23 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.

(56) References Cited

OTHER PUBLICATIONS

Non-Final Office Action received for U.S. Appl. No. 16/175,565, mailed on Feb. 17, 2023, 33 pages.
Non-Final Office Action received for U.S. Appl. No. 16/175,565, mailed on Sep. 20, 2021, 33 pages.
Non-Final Office Action received for U.S. Appl. No. 16/233,990, mailed on Jul. 9, 2021, 18 pages.
Non-Final Office Action received for U.S. Appl. No. 16/233,990, mailed on Jun. 18, 2020, 17 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 23, 2020, 30 pages.
Non-Final Office Action received for U.S. Appl. No. 16/584,790, mailed on Dec. 26, 2019, 24 pages.
Non-Final Office Action received for U.S. Appl. No. 16/584,790, mailed on Feb. 1, 2022, 33 pages.
Non-Final Office Action received for U.S. Appl. No. 16/682,443, mailed on Sep. 23, 2020, 10 pages.
Non-Final Office Action received for U.S. Appl. No. 16/697,090, mailed on Aug. 3, 2021, 16 pages.
Non-Final Office Action received for U.S. Appl. No. 16/697,090, mailed on Jul. 6, 2020, 14 pages.
Non-Final Office Action received for U.S. Appl. No. 16/697,090, mailed on Jul. 7, 2022, 25 pages.
Non-Final Office Action received for U.S. Appl. No. 16/827,910, mailed on Jun. 17, 2021, 16 pages.
Non-Final Office Action received for U.S. Appl. No. 16/827,910, mailed on Sep. 14, 2022, 18 pages.
Non-Final Office Action received for U.S. Appl. No. 16/827,918, mailed on Dec. 10, 2020, 28 pages.
Non-Final Office Action received for U.S. Appl. No. 16/827,926, mailed on Apr. 25, 2022, 27 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/888,478, mailed on May 2, 2022, 29 pages.
Non-Final Office Action received for U.S. Appl. No. 16/945,724, mailed on Jul. 19, 2021, 8 pages.
Non-Final Office Action received for U.S. Appl. No. 17/000,112, mailed on Dec. 7, 2021, 15 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Jun. 8, 2021, 23 pages.
Non-Final Office Action received for U.S. Appl. No. 17/133,550, mailed on Sep. 9, 2022, 23 pages.
Non-Final Office Action received for U.S. Appl. No. 17/210,352, mailed on Oct. 18, 2021, 18 pages.
Non-Final Office Action received for U.S. Appl. No. 17/353,527, mailed on Dec. 8, 2022, 17 pages.
Non-Final Office Action received for U.S. Appl. No. 17/353,527, mailed on Oct. 5, 2021, 14 pages.
Non-Final Office Action received for U.S. Appl. No. 17/379,785, mailed on Mar. 9, 2023, 14 pages.
Non-Final Office Action received for U.S. Appl. No. 17/379,785, mailed on Mar. 30, 2022, 18 pages.
Non-Final Office Action received for U.S. Appl. No. 17/457,901, mailed on Apr. 28, 2022, 24 pages.
Non-Final Office Action received for U.S. Appl. No. 17/586,625, mailed on Sep. 1, 2022, 13 pages.
Non-Final Office Action received for U.S. Appl. No. 17/651,731, mailed on Apr. 25, 2023, 9 pages.
Non-Final Office Action received for U.S. Appl. No. 17/656,610, mailed on Feb. 6, 2023, 10 pages.
Non-Final Office Action received for U.S. Appl. No. 17/656,610, mailed on Jul. 26, 2023, 10 pages.
Non-Final Office Action received for U.S. Appl. No. 17/657,913, mailed on Jul. 21, 2023, 16 pages.
Non-Final Office Action received for U.S. Appl. No. 17/660,622, mailed on Dec. 20, 2022, 17 pages.
Non-Final Office Action received for U.S. Appl. No. 17/937,410, mailed on Mar. 2, 2023, 15 pages.
Non-Final Office Action received for U.S. Appl. No. 17/937,704, mailed on Mar. 30, 2023, 18 pages.
Non-Final Office Action received for U.S. Appl. No. 18/060,902, mailed on Mar. 10, 2023, 8 pages.
Non-Final Office Action received for U.S. Appl. No. 18/146,336, mailed on Aug. 3, 2023, 23 pages.
Non-Final Office Action received for U.S. Appl. No. 16/175,565, mailed on Mar. 4, 2020, 36 pages.
Notice of Allowability received for U.S. Appl. No. 17/457,901, mailed on Mar. 8, 2023, 9 pages.
Notice of Allowance received for U.S. Appl. No. 14/208,099, mailed on Feb. 3, 2016, 10 pages.
Notice of Allowance received for U.S. Appl. No. 14/242,575, mailed on Oct. 27, 2016, 11 pages.
Notice of Allowance received for U.S. Appl. No. 14/255,664, mailed on May 5, 2017, 7 pages.
Notice of Allowance received for U.S. Appl. No. 14/262,435, mailed on Aug. 16, 2016, 6 pages.
Notice of Allowance received for U.S. Appl. No. 14/267,671, mailed on Sep. 19, 2018, 8 pages.
Notice of Allowance received for U.S. Appl. No. 14/746,095, mailed on Dec. 31, 2019, 8 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/272,397, mailed on Oct. 18, 2017, 8 pages.
Notice of Allowance received for U.S. Appl. No. 15/276,633, mailed on Aug. 26, 2019, 8 pages.
Notice of Allowance received for U.S. Appl. No. 15/390,377, mailed on Jul. 2, 2018, 9 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/714,904, mailed on May 22, 2018, 8 pages.
Notice of Allowance received for U.S. Appl. No. 15/719,404, mailed on Jul. 13, 2022, 8 pages.
Notice of Allowance received for U.S. Appl. No. 15/719,404, mailed on Nov. 9, 2022, 7 pages.
Notice of Allowance received for U.S. Appl. No. 15/798,092, mailed on Jun. 7, 2018, 9 pages.

(56) References Cited

OTHER PUBLICATIONS

Notice of Allowance received for U.S. Appl. No. 15/798,092, mailed on Oct. 9, 2018, 5 pages.
Notice of Allowance received for U.S. Appl. No. 15/833,618, mailed on Mar. 14, 2018, 9 pages.
Notice of Allowance received for U.S. Appl. No. 15/876,715, mailed on Apr. 4, 2022, 7 pages.
Notice of Allowance received for U.S. Appl. No. 15/876,715, mailed on Aug. 3, 2022, 7 pages.
Notice of Allowance received for U.S. Appl. No. 15/876,715, mailed on Oct. 14, 2021, 7 pages.
Notice of Allowance received for U.S. Appl. No. 15/990,327, mailed on Jan. 11, 2019, 7 pages.
Notice of Allowance received for U.S. Appl. No. 16/010,280, mailed on Jul. 29, 2019, 7 pages.
Notice of Allowance received for U.S. Appl. No. 16/036,810, mailed on Oct. 31, 2018, 9 pages.
Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/144,077, mailed on May 8, 2020, 15 pages.
Notice of Allowance received for U.S. Appl. No. 16/233,990, mailed on Feb. 22, 2022, 8 pages.
Notice of Allowance received for U.S. Appl. No. 16/233,990, mailed on Jan. 31, 2023, 5 pages.
Notice of Allowance received for U.S. Appl. No. 16/233,990, mailed on May 26, 2022, 5 pages.
Notice of Allowance received for U.S. Appl. No. 16/233,990, mailed on Oct. 5, 2022, 5 pages.
Notice of Allowance received for U.S. Appl. No. 16/392,467, mailed on Mar. 23, 2020, 9 pages.
Notice of Allowance received for U.S. Appl. No. 16/584,790, mailed on Feb. 3, 2023, 9 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/827,910, mailed on Aug. 3, 2023, 21 pages.
Notice of Allowance received for U.S. Appl. No. 16/827,910, mailed on Dec. 13, 2023, 19 pages.
Notice of Allowance received for U.S. Appl. No. 16/827,918, mailed on Feb. 7, 2022, 9 pages.
Notice of Allowance received for U.S. Appl. No. 16/827,918, mailed on Jun. 8, 2022, 9 Pages.
Notice of Allowance received for U.S. Appl. No. 16/827,926, mailed on Nov. 1, 2021, 35 pages.
Notice of Allowance received for U.S. Appl. No. 16/827,926, mailed on Sep. 13, 2023, 9 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2020, 10 pages.
Notice of Allowance received for U.S. Appl. No. 16/865,172, mailed on Apr. 13, 2022, 8 pages.
Notice of Allowance received for U.S. Appl. No. 16/865,172, mailed on Aug. 25, 2022, 8 pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/888,453, mailed on Jun. 21, 2023, 7 pages.
Notice of Allowance received for U.S. Appl. No. 16/888,453, mailed on Mar. 1, 2023, 8 pages.
Notice of Allowance received for U.S. Appl. No. 16/888,478, mailed on Aug. 2, 2023, 9 pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/065,387, mailed on Dec. 1, 2021, 10 pages.
Notice of Allowance received for U.S. Appl. No. 17/210,352, mailed on Dec. 5, 2022, 9 pages.
Notice of Allowance received for U.S. Appl. No. 17/210,352, mailed on Mar. 16, 2023, 7 pages.
Notice of Allowance received for U.S. Appl. No. 17/353,527, mailed on Jul. 21, 2023, 7 pages.
Notice of Allowance received for U.S. Appl. No. 17/353,527, mailed on Oct. 4, 2023, 7 pages.
Notice of Allowance received for U.S. Appl. No. 17/367,227, mailed on Mar. 23, 2023, 12 pages.
Notice of Allowance received for U.S. Appl. No. 17/457,901, mailed on Nov. 16, 2022, 9 pages.
Notice of Allowance received for U.S. Appl. No. 17/586,625, mailed on Oct. 26, 2023, 7 pages.
Notice of Allowance received for U.S. Appl. No. 17/651,731, mailed on Oct. 3, 2023, 5 pages.
Notice of Allowance received for U.S. Appl. No. 17/654,578, mailed on Feb. 15, 2023, 8 pages.
Notice of Allowance received for U.S. Appl. No. 17/654,578, mailed on Jun. 13, 2023, 7 pages.
Notice of Allowance received for U.S. Appl. No. 17/654,578, mailed on Oct. 25, 2022, 8 pages.
Patent Board Decision received for U.S. Appl. No. 15/876,715, mailed on Aug. 3, 2021, 8 pages.
Restriction Requirement received for U.S. Appl. No. 14/208,099, mailed on Feb. 24, 2015, 5 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201780066823.6, mailed on Nov. 1, 2022, 4 pages (2 pages of English Translation and 2 pages of Official Copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201910469185.3, mailed on Feb. 23, 2021, 6 pages (3 page of English Translation and 3 page of Official Copy).

(56) References Cited

OTHER PUBLICATIONS

Search Report received for Chinese Patent Application No. 201910587972.8, mailed on Jan. 4, 2022, 4 pages (2 pages of English Translation and 2 pages of Official Copy).
Search Report received for Chinese Patent Application No. 201911313480.6, mailed on Jan. 20, 2023, 4 pages (2 pages of English Translation and 2 pages of Official Copy).
Search Report received for Chinese Patent Application No. 201911313496.7, mailed on Jan. 20, 2023, 4 pages (2 pages of English Translation and 2 pages of Official Copy).
Search Report received for Chinese Patent Application No. 201911313497.1, mailed on Apr. 11, 2023, 5 pages (2 pages of English Translation and 3 pages of Official Copy).
Search Report received for Chinese Patent Application No. 201911313497.1, mailed on Dec. 14, 2022, 3 pages (1 page of English Translation and 2 pages of Official Copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010011436.6, mailed on Dec. 15, 2022, 9 pages (4 pages of English Translation and 5 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for Chinese Patent Application No. 202010662994.9, mailed on Sep. 28, 2023, 3 pages (1 page of English Translation and 2 pages of Official Copy).
Search Report received for Chinese Patent Application No. 202110201931.8, mailed on Oct. 16, 2023, 3 pages (1 page of English Translation and 2 pages of Official Copy).
Search Report received for Chinese Patent Application No. 202210799020.4, mailed on Jul. 27, 2023, 5 pages (1 page of English Translation and 4 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201670582, mailed on Feb. 9, 2017, 1 page.
Search Report received for Danish Patent Application No. PA 201870354, mailed on Sep. 26, 2018, 4 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for European Patent Application No. 20718506.7, mailed on Mar. 21, 2023, 2 pages.
Search Report received for Taiwanese Patent Application No. 104120369, mailed on Aug. 8, 2016, 2 Pages (1 page of official copy & 1 page of English translation).
Search Report received for Taiwanese Patent Application No. 104120385, mailed on Nov. 25, 2016, 2 pages (1 page of official copy & 1 page of English translation).
Supplemental Notice of Allowability received for U.S. Appl. No. 16/827,942, mailed on Nov. 4, 2020, 3 pages.
Supplemental Notice of Allowance received for U.S. Appl. No. 15/798,092, mailed on Jan. 9, 2019, 2 pages.
Akhtar Iyaz, "Movies Anywhere: Everything You Need to Know", Available online at: <https://www.cnet.com/how-to/movies-anywhere-ultraviolet-movies-locker-streaming-redeem-faq/>, [Retrieved May 4, 2020], 2017, 8 pages.
Alvarez Edgar, "Sling TV Redesign Makes It Easy to Find Your Favorite Content", Engadget, Available online at: <https://www.engadget.com/2016/01/05/sling-tv-major-redesign/>, [Retrieved Aug. 5, 2019], May 1, 2016, pp. 1-12.
Anonymous, "Video Progress Bar—YouTube Help", Retrieved from the Internet: <URL:https://web.archive.org/web/20190317001501/https://support.google.com/youtube/answer/7174115?hl=en>, [retrieved on Mar. 22, 2023], Mar. 17, 2019, 2 pages.
Apple, "The control is all yours", Available online at : <https://www.apple.com.cn/privacy/control/>, [Retrieved Dec. 29, 2022], Nov. 30, 2022, 12 pages.
Beer et al., "The Odds of Running a Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Budhraja et al., "Probability Based Playlist Generation Based on Music Similarity and User Customization", National Conference on Computing and Communication Systems, 2012, 5 pages.
Cai Chongshan, "Analysis of Copyright Infringement Problems of Video Aggregation App", China Copyright, vol. 02, [retrieved on Oct. 6, 2023], Available online at: <http://www.cqvip.com/qk/81889a/2015002/90716681504849534850485048.html>, Apr. 15, 2015, 2 pages (1 page English Translation and 1 page Official Copy).
Chen et al., "What a Juke! A Collaborative Music Sharing System", IEEE, 2012, 6 pages.
Cheng Luo, "The Designing of Dynamic Play-list Based on Flash Streaming Media Technology", Computer and Telecommunication, 2008, 3 pages.
Cheredar Tom, "Verizon's Viewdini Lets You Watch Netflix, Comcast, & Hulu Videos from a Single App", Available online at: <venturebeat.com>, [Retrieved Jun. 10, 2021], May 22, 2012, 6 pages.
Cunningham et al., "An Ethnographic Study of Music Information Seeking: Implications for the Design of a Music Digital Library", IEEE, 2003, 13 pages.
Drews et al., "Virtual Jukebox—Reviving a Classic", Proceedings of the 35th Hawaii International Conference on System Sciences, 2022, 7 pages.
episodecalendar.com, "Keep track of your favorite TV shows!—TV Episode Calendar", Available Online at: <https://web.archive.org/web/20140517060612/https://episodecalendar.com/>, [Retrieved Oct. 18, 2017], May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Jin et al., "Pricing Sponsored Content in Wireless Networks with Multiple Content Providers", The Fourth IEEE Workshop on Smart Data Pricing 2015, 2015, pp. 668-673.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, [Retrieved Jun. 10, 2021], Aug. 3, 2015, 1 page.

(56) References Cited

OTHER PUBLICATIONS

Kimbler Kristofer, "App Store Strategies for Service Providers", 2010 4th International Conference on Intelligence in Next Generation Networks, Nov. 18, 2010, 5 pages.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Liu Chang, "Functions and Design of Multi-Screen Playing System in TV Variety Studio", Modern TV Technology, 2013, 5 pages.
Meng et al., "Role Authorization Based Web Service Access Control Model", Journal of Lanzhou University (Natural Science Edition), vol. 42, No. 2, 2007, pp. 84-88.
Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.
Rubine Dean, "Combining Gestures and Direct Manipulation", CHI'92, May 3-7, 1992, pp. 659-660.
Rubine Deanh. "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Tinari George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Wang et al., "Authorization Management Mechanism of Web Application System", Network and Information Technology, vol. 25, No. 11, 2006, 3 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Zhang et al., "Music Playlist Prediction Via Detecting Song Moods", IEEE China Summit and International Conference on Signal and Information Processing, 2013, pp. 174-178.
Advisory Action received for U.S. Appl. No. 14/208,963, mailed on Feb. 17, 2017, 3 pages.
Advisory Action received for U.S. Appl. No. 18/060,902, mailed on Nov. 13, 2023, 2 pages.
Applicant Initiated Interview Summary received for U.S. Appl. No. 17/656,610, mailed on Apr. 10, 2024, 2 pages.
Corrected Notice of Allowability received for U.S. Appl. No. 18/060,902, mailed on Sep. 5, 2024, 4 pages.
Corrected Notice of Allowability received for U.S. Appl. No. 15/719,404, mailed on Mar. 22, 2024, 2 pages.
Corrected Notice of Allowability received for U.S. Appl. No. 17/586,625, mailed on Feb. 20, 2024, 2 pages.
Corrected Notice of Allowability received for U.S. Appl. No. 17/656,610, mailed on Dec. 19, 2024, 2 pages.
Corrected Notice of Allowability received for U.S. Appl. No. 17/656,610, mailed on Jan. 13, 2025, 2 pages.
Corrected Notice of Allowability received for U.S. Appl. No. 17/657,913, mailed on Jan. 23, 2025, 2 pages.
Corrected Notice of Allowability received for U.S. Appl. No. 17/657,913, mailed on Sep. 16, 2024, 2 pages.
Corrected Notice of Allowability received for U.S. Appl. No. 17/657,913, mailed on Sep. 26, 2024, 2 pages.
Corrected Notice of Allowability received for U.S. Appl. No. 17/937,704, mailed on Jul. 31, 2024, 8 pages.
Decision on Appeal received for U.S. Appl. No. 14/208,963, mailed on Dec. 22, 2021, 12 pages.
Decision on Appeal received for U.S. Appl. No. 15/943,316, mailed on Jan. 11, 2022, 19 pages.
European Search Report received for European Patent Application No. 20718505.9, mailed on Sep. 27, 2024, 5 pages.
Examiner's Answer to Appeal Brief received for U.S. Appl. No. 14/208,963, mailed on Jun. 24, 2021, 20 pages.
Examiner's Answer to Appeal Brief received for U.S. Appl. No. 15/943,316, mailed on Jun. 16, 2021, 9 pages.
Examiner's Answer to Appeal Brief received for U.S. Appl. No. 16/175,565, mailed on Dec. 15, 2023, 27 pages.
Examiner's Answer to Appeal Brief received for U.S. Appl. No. 17/133,550, mailed on Sep. 23, 2024, 26 pages.
Extended European Search Report received for European Patent Application No. 24152097.2, mailed on Jul. 23, 2024, 9 pages.
Extended European Search Report received for European Patent Application No. 24195286.0, mailed on Nov. 5, 2024, 9 pages.
Final Office Action received for U.S. Appl. No. 14/208,963, mailed on Aug. 13, 2015, 16 pages.
Final Office Action received for U.S. Appl. No. 14/208,963, mailed on Aug. 18, 2016, 17 pages.
Final Office Action received for U.S. Appl. No. 15/943,316, mailed on Apr. 27, 2020, 19 pages.
Final Office Action received for U.S. Appl. No. 15/943,316, mailed on Mar. 6, 2019, 8 pages.
Final Office Action received for U.S. Appl. No. 17/379,785, mailed on Aug. 16, 2024, 14 pages.
Final Office Action received for U.S. Appl. No. 17/656,610, mailed on Jan. 16, 2024, 12 pages.
Final Office Action received for U.S. Appl. No. 17/930,703, mailed on Nov. 6, 2024, 39 pages.
Final Office Action received for U.S. Appl. No. 18/146,336, mailed on Feb. 23, 2024, 23 pages.
Non-Final Office Action received for U.S. Appl. No. 14/208,963 mailed on Nov. 3, 2014, 17 pages.
Non-Final Office Action received for U.S. Appl. No. 14/208,963, mailed on Apr. 21, 2017, 19 pages.
Non-Final Office Action received for U.S. Appl. No. 14/208,963, mailed on Jan. 29, 2016, 17 pages.
Non-Final Office Action received for U.S. Appl. No. 14/208,963, mailed on Jun. 30, 2020, 20 pages.
Non-Final Office Action received for U.S. Appl. No. 15/943,316, mailed on Aug. 20, 2019, 11 pages.
Non-Final Office Action received for U.S. Appl. No. 15/943,316, mailed on Jul. 23, 2018, 9 pages.
Non-Final Office Action received for U.S. Appl. No. 17/133,550, mailed on Dec. 18, 2023, 25 pages.
Non-Final Office Action received for U.S. Appl. No. 17/379,785, mailed on Feb. 15, 2024, 14 pages.
Non-Final Office Action received for U.S. Appl. No. 17/656,610, mailed on Apr. 30, 2024, 12 pages.
Non-Final Office Action received for U.S. Appl. No. 17/657,913, mailed on Jan. 11, 2024, 20 pages.
Non-Final Office Action received for U.S. Appl. No. 17/930,703, mailed on May 16, 2024, 36 pages.
Non-Final Office Action received for U.S. Appl. No. 17/937,410, mailed on Feb. 29, 2024, 16 pages.
Non-Final Office Action received for U.S. Appl. No. 17/937,704, mailed on Feb. 1, 2024, 21 pages.
Non-Final Office Action received for U.S. Appl. No. 18/060,902, mailed on Dec. 1, 2023, 9 pages.
Non-Final Office Action received for U.S. Appl. No. 18/168,490, mailed on Jun. 27, 2024, 19 pages.
Non-Final Office Action received for U.S. Appl. No. 18/336,569, mailed on Oct. 23, 2024, 22 pages.
Non-Final Office Action received for U.S. Appl. No. 18/391,448, mailed on Sep. 24, 2024, 12 pages.
Non-Final Office Action received for U.S. Appl. No. 18/518,109, mailed on Jul. 9, 2024, 26 pages.

(56) References Cited

OTHER PUBLICATIONS

Notice of Allowance received for U.S. Appl. No. 17/656,610, mailed on Sep. 11, 2024, 7 pages.
Notice of Allowance received for U.S. Appl. No. 17/657,913, mailed on Aug. 30, 2024, 7 pages.
Notice of Allowance received for U.S. Appl. No. 17/657,913, mailed on Jan. 14, 2025, 5 pages.
Notice of Allowance received for U.S. Appl. No. 17/660,622, mailed on Aug. 22, 2024, 9 pages.
Notice of Allowance received for U.S. Appl. No. 18/168,490, mailed on Sep. 18, 2024, 10 pages.
Notice of Allowance received for U.S. Appl. No. 15/719,404, mailed on Dec. 8, 2023, 10 pages.
Notice of Allowance received for U.S. Appl. No. 16/175,565, mailed on Oct. 24, 2024, 5 pages.
Notice of Allowance received for U.S. Appl. No. 16/827,926, mailed on Feb. 2, 2024, 8 pages.
Notice of Allowance received for U.S. Appl. No. 17/651,731, mailed on Jan. 25, 2024, 5 pages.
Notice of Allowance received for U.S. Appl. No. 17/651,731, mailed on Jul. 10, 2024, 5 pages.
Notice of Allowance received for U.S. Appl. No. 17/660,622, mailed on Jan. 24, 2024, 11 pages.
Notice of Allowance received for U.S. Appl. No. 17/937,410, mailed on Sep. 26, 2024, 8 pages.
Notice of Allowance received for U.S. Appl. No. 17/937,704, mailed on Apr. 25, 2024, 12 pages.
Notice of Allowance received for U.S. Appl. No. 18/060,902, mailed on May 21, 2024, 8 pages.
Notice of Allowance received for U.S. Appl. No. 18/146,336, mailed on Nov. 22, 2024, 11 pages.
Notice of Allowance received for U.S. Appl. No. 18/395,268, mailed on Dec. 2, 2024, 8 pages.
Notice of Allowance received for U.S. Appl. No. 18/487,837, mailed on May 30, 2024, 8 pages.
Notice of Allowance received for U.S. Appl. No. 18/487,837, mailed on Nov. 8, 2024, 7 pages.
Notice of Allowance received for U.S. Appl. No. 18/503,515, mailed on Jun. 13, 2024, 8 pages.
Notice of Allowance received for U.S. Appl. No. 18/503,515, mailed on Oct. 1, 2024, 8 pages.
Notice of Allowance received for U.S. Appl. No. 18/518,109, mailed on Jan. 17, 2025, 8 pages.
Notice of Allowance received for U.S. Appl. No. 18/518,365, mailed on Jul. 3, 2024, 8 pages.
Notice of Allowance received for U.S. Appl. No. 18/518,365, mailed on Nov. 6, 2024, 8 pages.
Patent Board Decision received for U.S. Appl. No. 16/175,565, mailed on Jul. 31, 2024, 19 pages.
Patent Board Decision received for U.S. Appl. No. 16/697,090, mailed on Jul. 26, 2024, 33 pages.
Search Report received for Chinese Patent Application No. 201811143102.3, mailed on Nov. 2, 2023, 5 pages (3 pages of English Translation and 2 pages of Official Copy).
Search Report received for Chinese Patent Application No. 202080040260.5, mailed on Apr. 4, 2024, 8 pages (4 pages of English Translation and 4 pages of Official Copy).
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Search Report received for Chinese Patent Application No. 202210608296.X, mailed on Aug. 15, 2024, 4 pages (1 page of English Translation and 3 pages of Official Copy).
Usainbolt.com, Available online at: <https://usainbolt.com/>; <https://web.archive.org>, Archived on Mar. 15, 2015 in Wayback Machine, 2015, 4 pages.
Anonymous, "YouTube(TM) On Hover :: add0n.com", Retrieved from the Internet: <URL: https://web.archive.org/web/20180713134812/https://add0n.com/youtube-hover.html>, [retrieved on Nov. 8, 2024], Jul. 13, 2018, 4 pages.
Kim et al., "Towards Optimal Navigation Through Video Content on Interactive TV", Interacting with Computers, vol. 18, No. 4, Mar. 3, 2006, pp. 723-746.
Leonard Sengere, "You can now hover over videos on Youtube to get GIF like previews—Techzim", Retrieved from the Internet: URL: <https://web.archive.org/web/20171007193435/https://www.techzim.co.zw/2017/07/can-now-hover-videos-youtube-get-gif-like-previews/>, [retrieved on Nov. 8, 2024], Oct. 7, 2017, 6 pages.
Matejka et al., "Swifter: Improved Online Video Scrubbing", Proceedings of the SIGCHI Conference on Human Factors in Computing Systems, Apr. 27-May 2, 2013, 10 pages.
Schmidt Alexander, "Graphical User Interface for Video on Demand Navigation from an IPTV Set Top Box", Jun. 16, 2009, 52 pages.
Tech Life Unity, "How to Use Netflix | Netflix Guide Part 2", Available online at: <https://www.youtube.com/watch?v=Hg4lC_BIHss> [Retrieved Sep. 16, 2024], Aug. 19, 2017, 2 pages.
Extended European Search Report received for European Patent Application No. 24217869.7, mailed on Feb. 28, 2025, 10 pages.
Non-Final Office Action received for U.S. Appl. No. 18/391,448, mailed on May 7, 2025, 16 pages.
Non-Final Office Action received for U.S. Appl. No. 18/665,420, mailed on Apr. 8, 2025, 16 pages.
Corrected Notice of Allowability received for U.S. Appl. No. 18/518,109, mailed on Apr. 18, 2025, 2 pages.
Patent Board Decision received for U.S. Appl. No. 17/133,550, mailed on Mar. 27, 2025, 27 pages.
European Search Report received for European Patent Application No. 20718500.0, mailed on Feb. 11, 2025, 5 pages.
Corrected Notice of Allowability received for U.S. Appl. No. 18/168,490, mailed on Mar. 4, 2025, 2 pages.
Final Office Action received for U.S. Appl. No. 18/336,569, mailed on Feb. 4, 2025, 24 pages.
Final Office Action received for U.S. Appl. No. 18/391,448, mailed on Jan. 29, 2025, 14 pages.
Non-Final Office Action received for U.S. Appl. No. 18/668,008, mailed on Feb. 11, 2025, 14 pages.
Pai, Aditi, "38 More Health and Wellness Apps That Connect to Apple's HealthKit", MobiHealthNews, Oct. 16, 2024 [online]. Retrieved from <http://www.mobihealthnews.com/37340/38-more-health-and-wellness-apps-that- connect-to-apples-healthkit>, 3 pages.
Notice of Allowance received for U.S. Appl. No. 16/175,565, mailed on Feb. 12, 2025, 5 pages.
Notice of Allowance received for U.S. Appl. No. 17/379,785, mailed on Feb. 20, 2025, 9 pages.
Notice of Allowance received for U.S. Appl. No. 17/937,410, mailed on Jan. 29, 2025, 8 pages.
Notice of Allowance received for U.S. Appl. No. 18/168,490, mailed on Feb. 21, 2025, 9 pages.

* cited by examiner

Figure 7B:
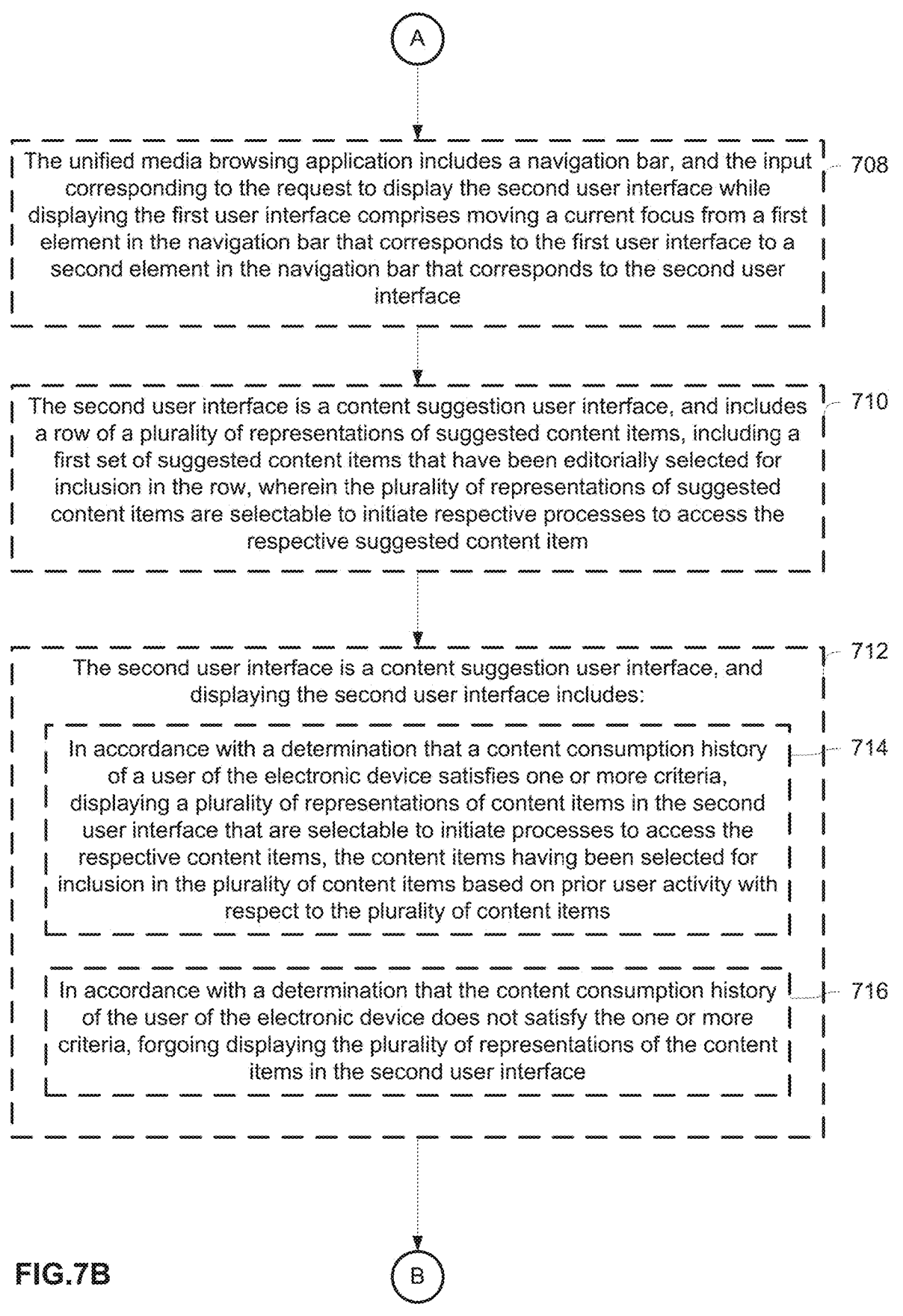

A

The unified media browsing application includes a navigation bar, and the input corresponding to the request to display the second user interface while displaying the first user interface comprises moving a current focus from a first element in the navigation bar that corresponds to the first user interface to a second element in the navigation bar that corresponds to the second user interface 708

The second user interface is a content suggestion user interface, and includes a row of a plurality of representations of suggested content items, including a first set of suggested content items that have been editorially selected for inclusion in the row, wherein the plurality of representations of suggested content items are selectable to initiate respective processes to access the respective suggested content item 710

The second user interface is a content suggestion user interface, and displaying the second user interface includes: 712

In accordance with a determination that a content consumption history of a user of the electronic device satisfies one or more criteria, displaying a plurality of representations of content items in the second user interface that are selectable to initiate processes to access the respective content items, the content items having been selected for inclusion in the plurality of content items based on prior user activity with respect to the plurality of content items 714

In accordance with a determination that the content consumption history of the user of the electronic device does not satisfy the one or more criteria, forgoing displaying the plurality of representations of the content items in the second user interface 716

Figure 7D:
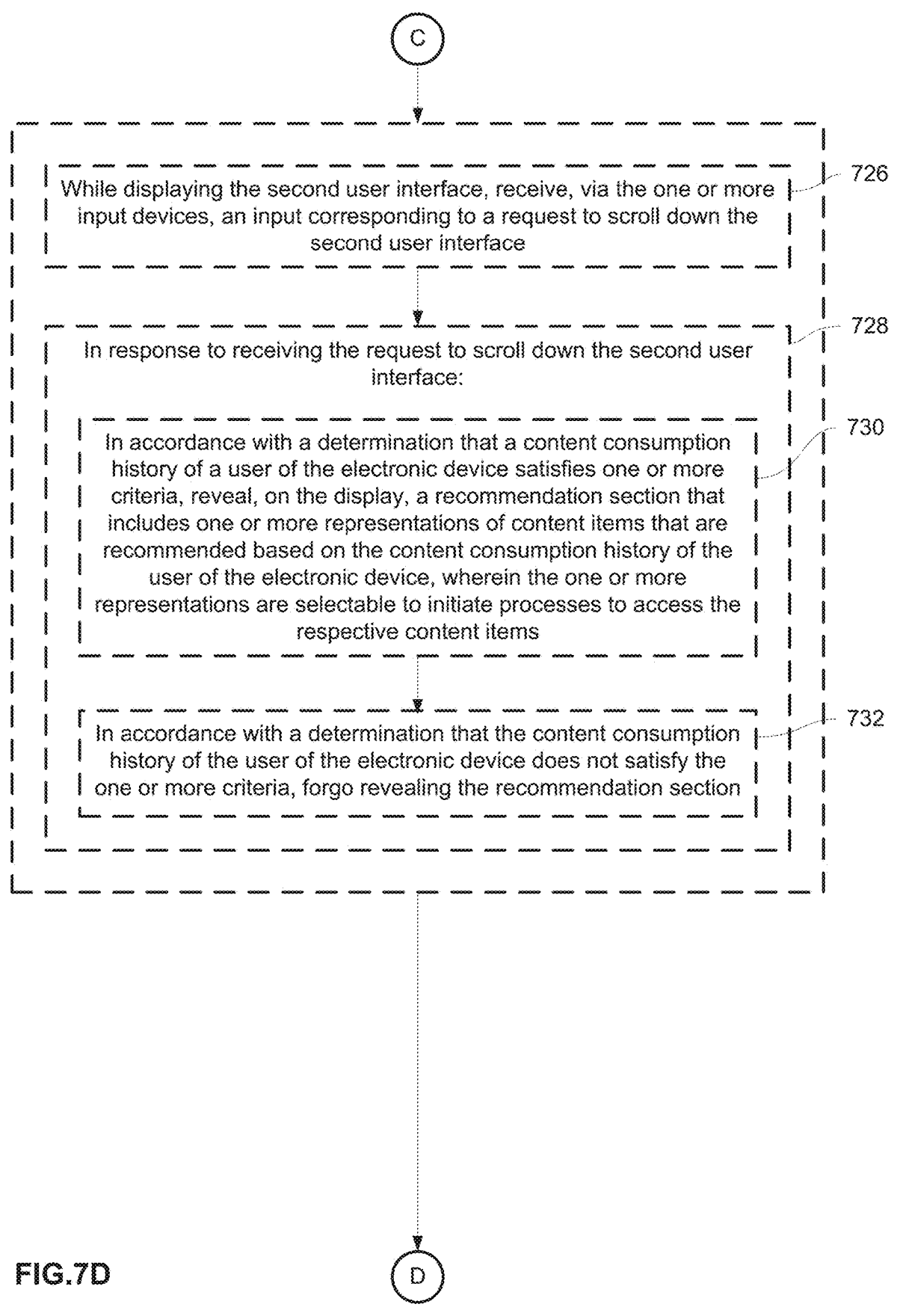

726 While displaying the second user interface, receive, via the one or more input devices, an input corresponding to a request to scroll down the second user interface 728 In response to receiving the request to scroll down the second user interface:

730 In accordance with a determination that a content consumption history of a user of the electronic device satisfies one or more criteria, reveal, on the display, a recommendation section that includes one or more representations of content items that are recommended based on the content consumption history of the user of the electronic device, wherein the one or more representations are selectable to initiate processes to access the respective content items 732 In accordance with a determination that the content consumption history of the user of the electronic device does not satisfy the one or more criteria, forgo revealing the recommendation section

Figure 7K:
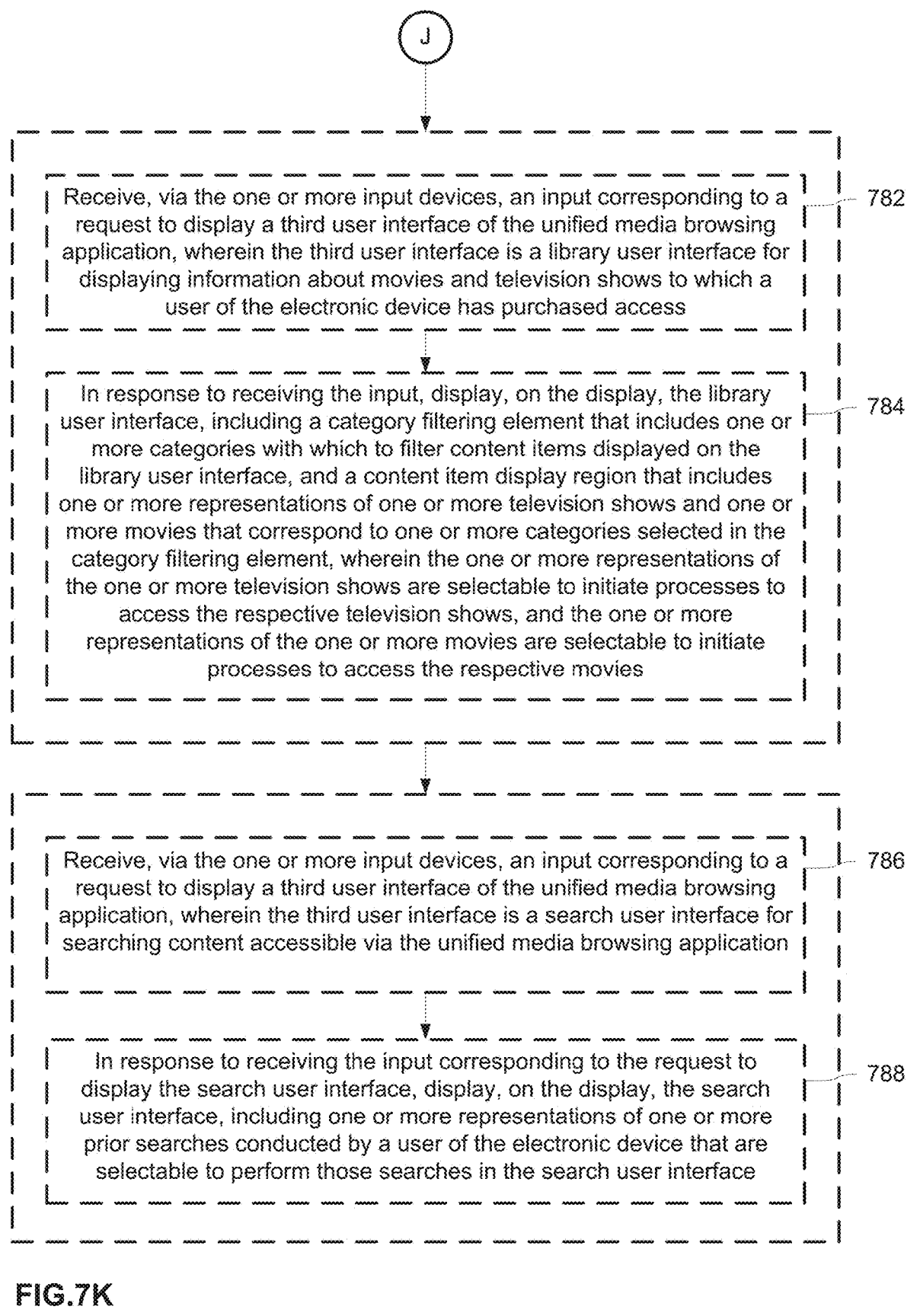

Receive, via the one or more input devices, an input corresponding to a request to display a third user interface of the unified media browsing application, wherein the third user interface is a library user interface for displaying information about movies and television shows to which a user of the electronic device has purchased access — 782

In response to receiving the input, display, on the display, the library user interface, including a category filtering element that includes one or more categories with which to filter content items displayed on the library user interface, and a content item display region that includes one or more representations of one or more television shows and one or more movies that correspond to one or more categories selected in the category filtering element, wherein the one or more representations of the one or more television shows are selectable to initiate processes to access the respective television shows, and the one or more representations of the one or more movies are selectable to initiate processes to access the respective movies — 784

Receive, via the one or more input devices, an input corresponding to a request to display a third user interface of the unified media browsing application, wherein the third user interface is a search user interface for searching content accessible via the unified media browsing application — 786

In response to receiving the input corresponding to the request to display the search user interface, display, on the display, the search user interface, including one or more representations of one or more prior searches conducted by a user of the electronic device that are selectable to perform those searches in the search user interface — 788

Figure 11A:
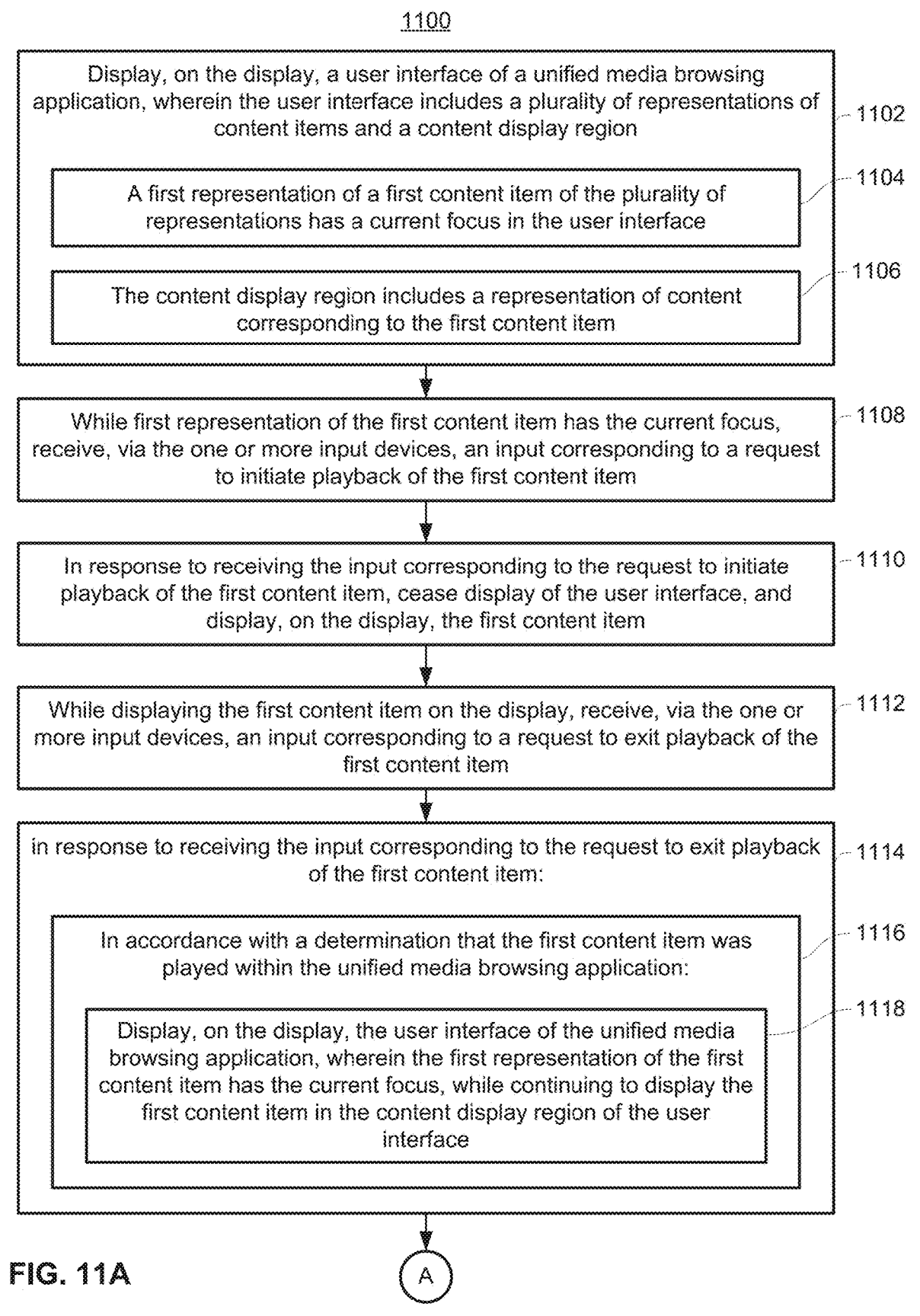

Display, on the display, a user interface of a unified media browsing application, wherein the user interface includes a plurality of representations of content items and a content display region — 1102

A first representation of a first content item of the plurality of representations has a current focus in the user interface — 1104

The content display region includes a representation of content corresponding to the first content item — 1106

While first representation of the first content item has the current focus, receive, via the one or more input devices, an input corresponding to a request to initiate playback of the first content item — 1108

In response to receiving the input corresponding to the request to initiate playback of the first content item, cease display of the user interface, and display, on the display, the first content item — 1110

While displaying the first content item on the display, receive, via the one or more input devices, an input corresponding to a request to exit playback of the first content item — 1112 in response to receiving the input corresponding to the request to exit playback of the first content item: — 1114

In accordance with a determination that the first content item was played within the unified media browsing application: — 1116

Display, on the display, the user interface of the unified media browsing application, wherein the first representation of the first content item has the current focus, while continuing to display the first content item in the content display region of the user interface — 1118

Figure 13B:
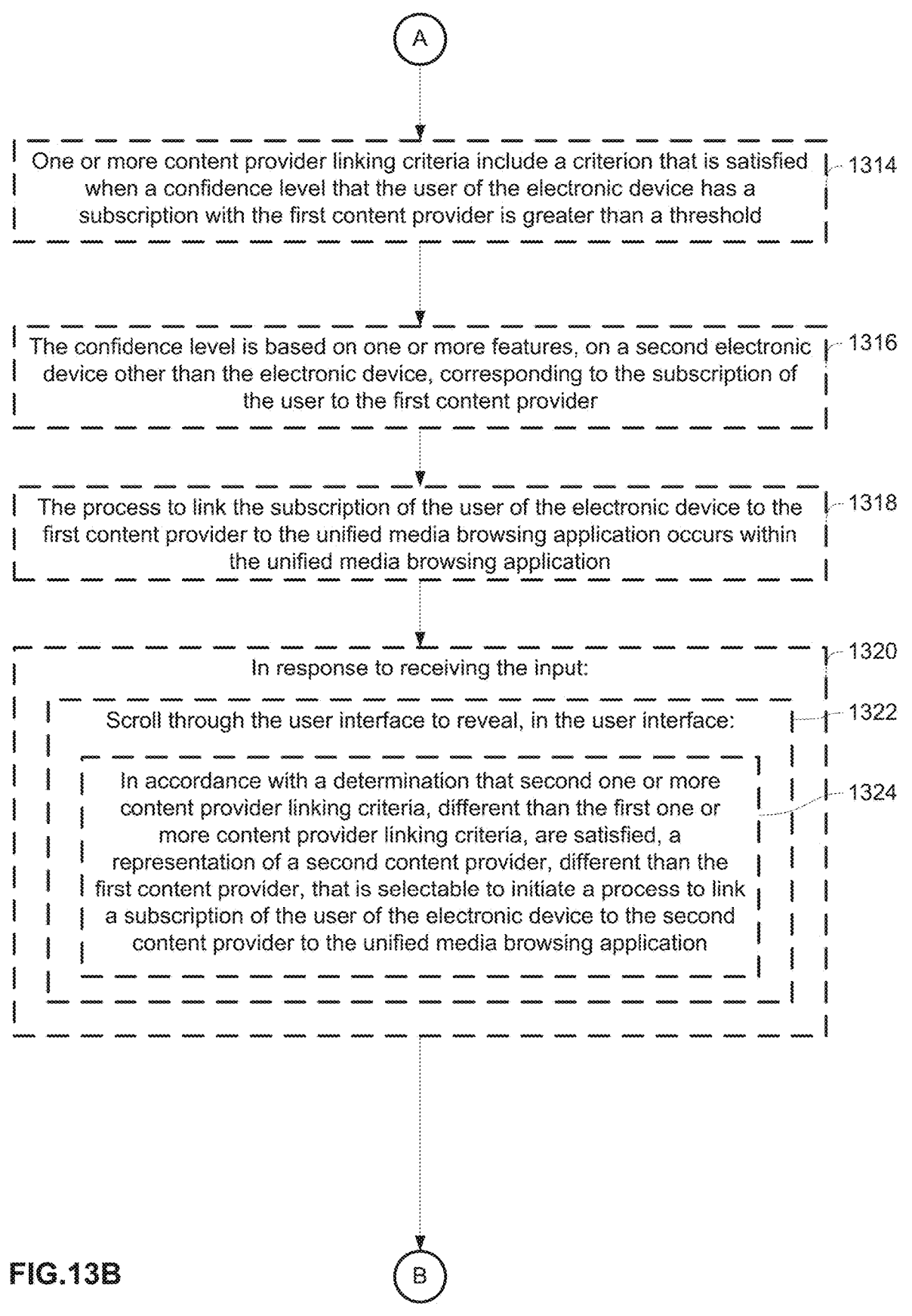

One or more content provider linking criteria include a criterion that is satisfied when a confidence level that the user of the electronic device has a subscription with the first content provider is greater than a threshold 1314

The confidence level is based on one or more features, on a second electronic device other than the electronic device, corresponding to the subscription of the user to the first content provider 1316

The process to link the subscription of the user of the electronic device to the first content provider to the unified media browsing application occurs within the unified media browsing application 1318

In response to receiving the input: 1320

Scroll through the user interface to reveal, in the user interface: 1322

In accordance with a determination that second one or more content provider linking criteria, different than the first one or more content provider linking criteria, are satisfied, a representation of a second content provider, different than the first content provider, that is selectable to initiate a process to link a subscription of the user of the electronic device to the second content provider to the unified media browsing application 1324

Device at Geography A

Device at Geography A

Device at Geography B

Device at Geography B

Device at Geography B

Device at Geography B

Device at Geography B

Device at Geography A

Figure 15B:
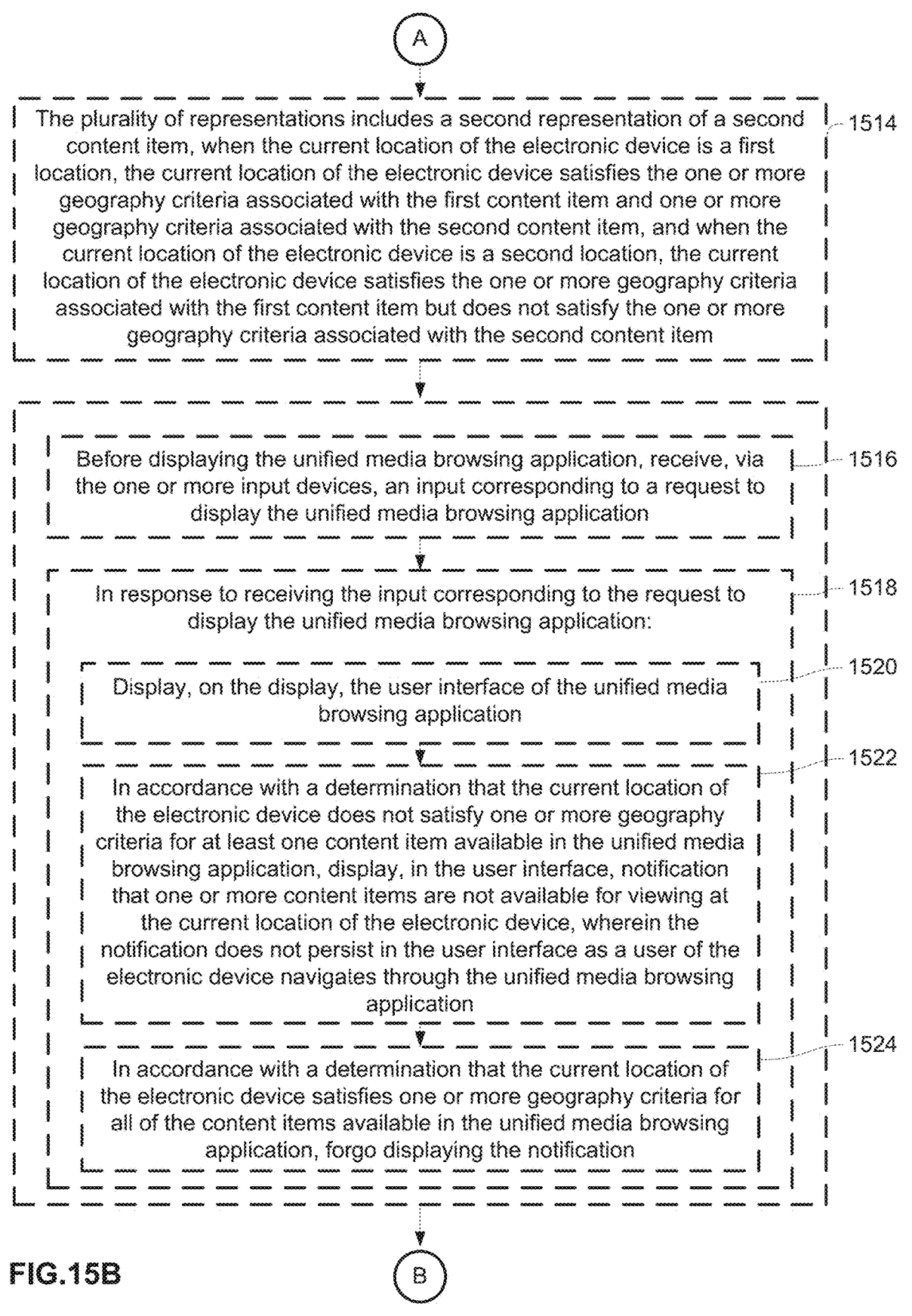

A

The plurality of representations includes a second representation of a second content item, when the current location of the electronic device is a first location, the current location of the electronic device satisfies the one or more geography criteria associated with the first content item and one or more geography criteria associated with the second content item, and when the current location of the electronic device is a second location, the current location of the electronic device satisfies the one or more geography criteria associated with the first content item but does not satisfy the one or more geography criteria associated with the second content item 1514

Before displaying the unified media browsing application, receive, via the one or more input devices, an input corresponding to a request to display the unified media browsing application 1516

In response to receiving the input corresponding to the request to display the unified media browsing application: 1518

Display, on the display, the user interface of the unified media browsing application 1520

In accordance with a determination that the current location of the electronic device does not satisfy one or more geography criteria for at least one content item available in the unified media browsing application, display, in the user interface, notification that one or more content items are not available for viewing at the current location of the electronic device, wherein the notification does not persist in the user interface as a user of the electronic device navigates through the unified media browsing application 1522

In accordance with a determination that the current location of the electronic device satisfies one or more geography criteria for all of the content items available in the unified media browsing application, forgo displaying the notification 1524

Figure 17C:
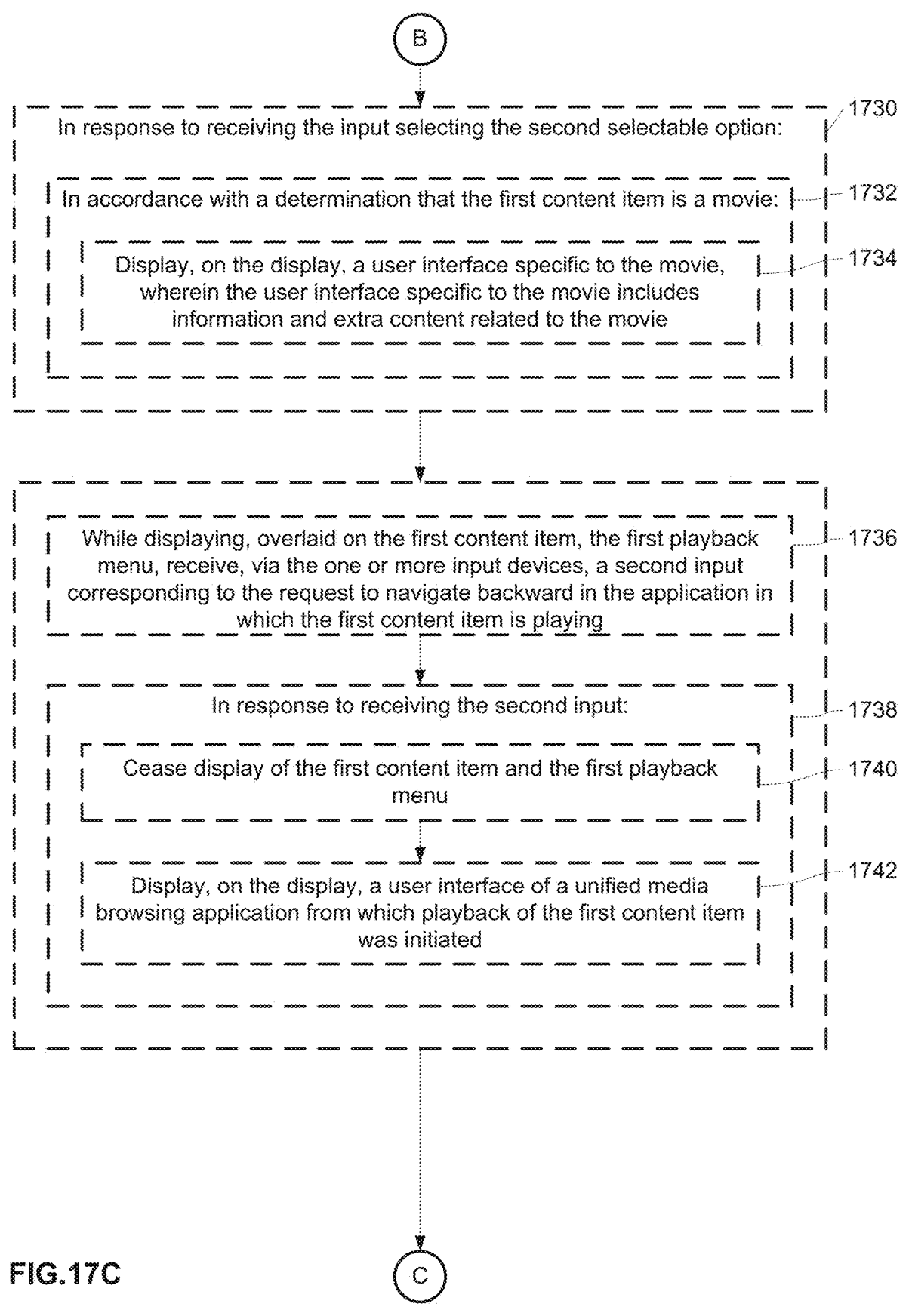

1730 In response to receiving the input selecting the second selectable option:

1732 In accordance with a determination that the first content item is a movie:

1734 Display, on the display, a user interface specific to the movie, wherein the user interface specific to the movie includes information and extra content related to the movie 1736 While displaying, overlaid on the first content item, the first playback menu, receive, via the one or more input devices, a second input corresponding to the request to navigate backward in the application in which the first content item is playing 1738 In response to receiving the second input:

1740 Cease display of the first content item and the first playback menu

1742 Display, on the display, a user interface of a unified media browsing application from which playback of the first content item was initiated

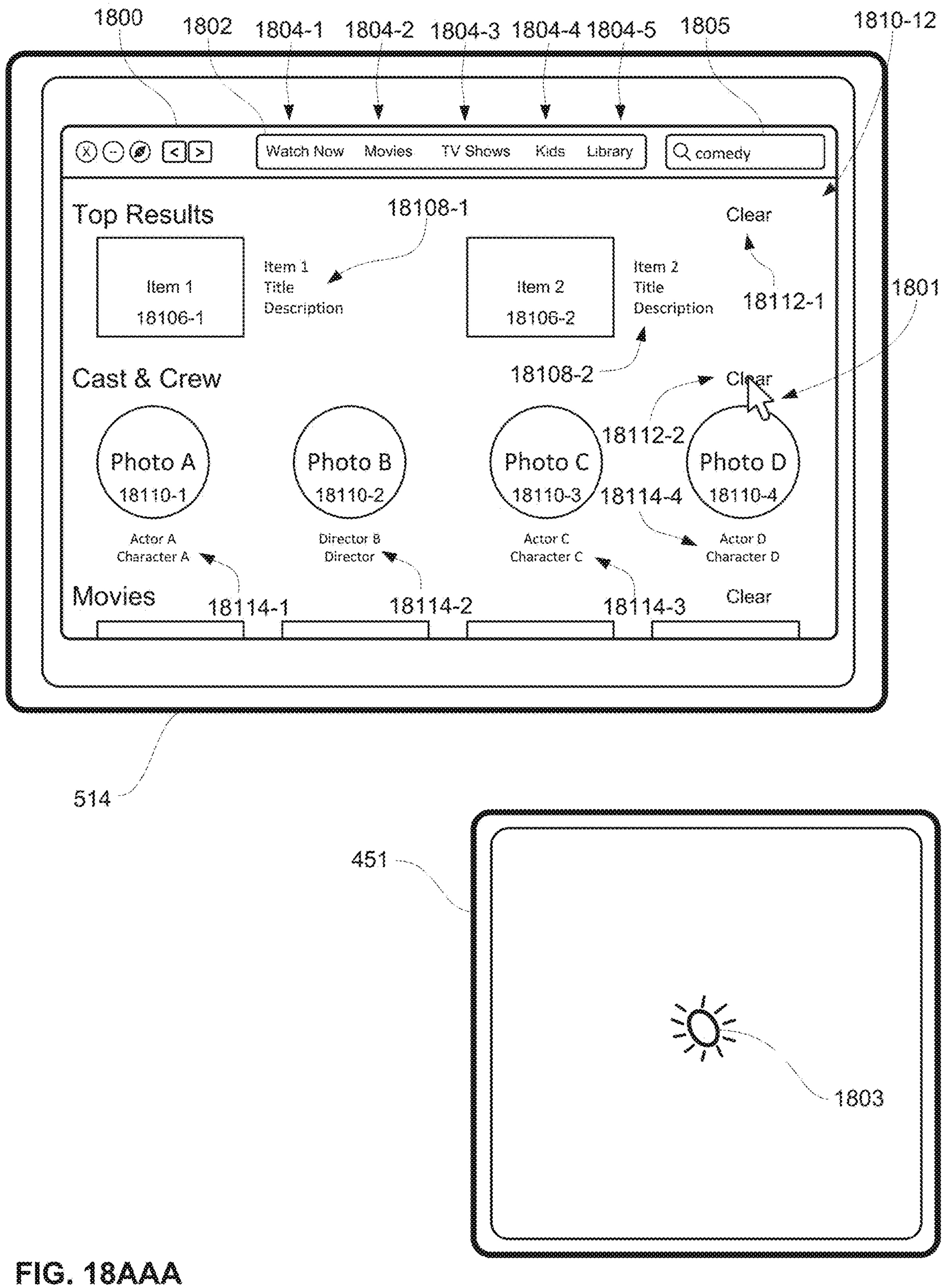
FIG. 18AAA

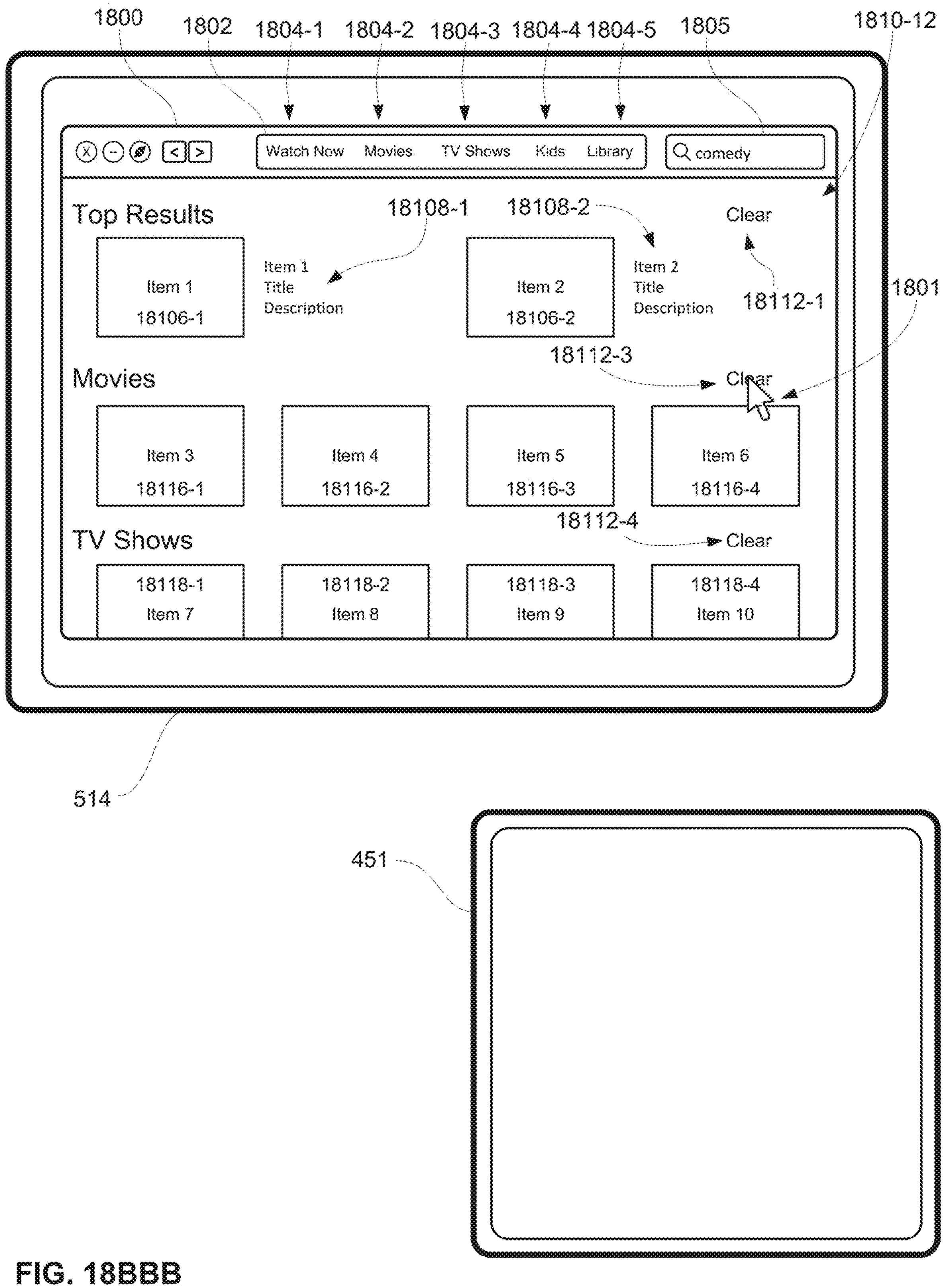
FIG. 18BBB

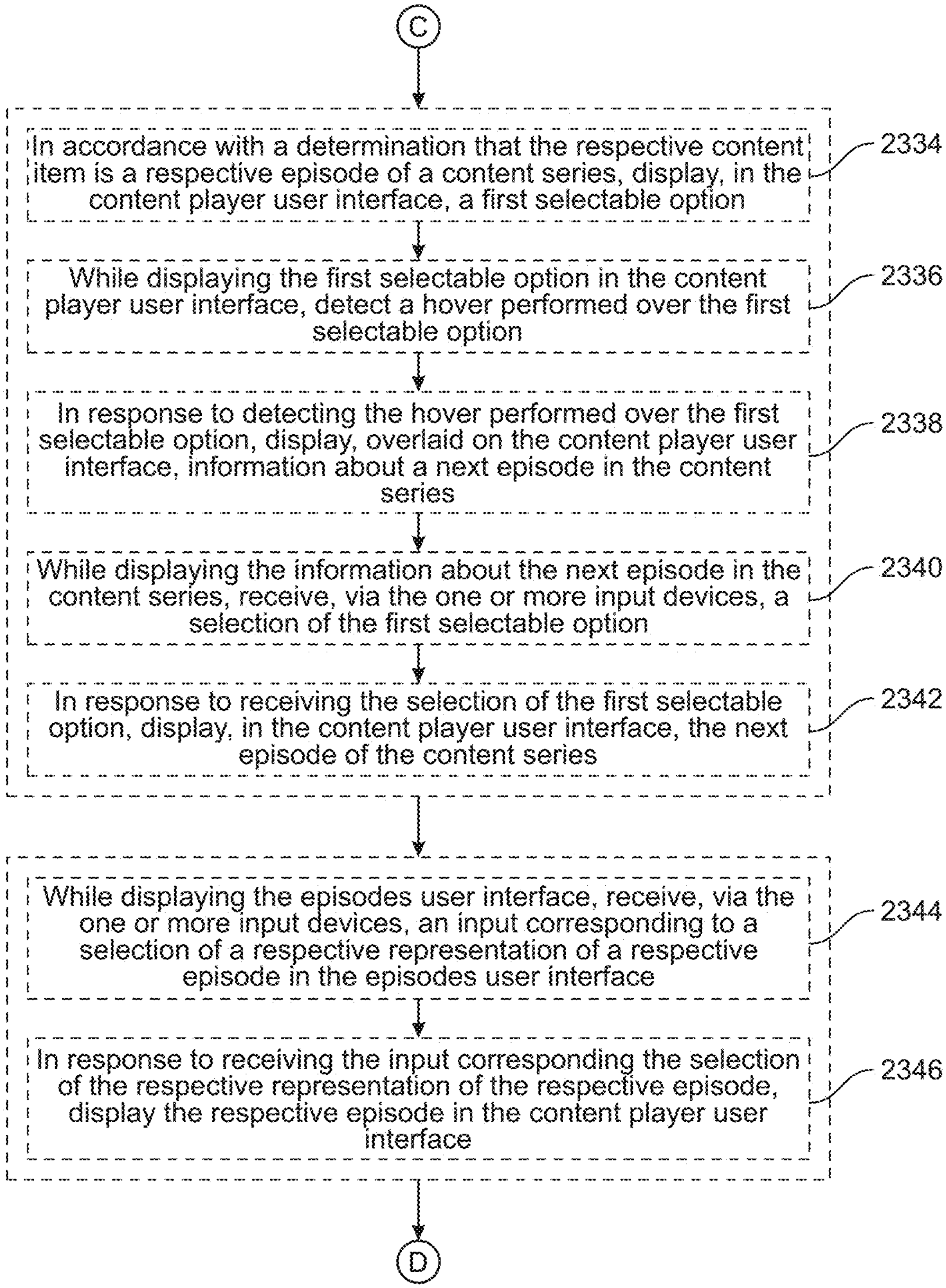
FIG. 23C1

USER INTERFACES FOR A MEDIA BROWSING APPLICATION

CROSS REFERENCE TO RELATED APPLICATIONS

This application is a continuation of U.S. patent application Ser. No. 16/827,910, filed Mar. 24, 2020, published on Sep. 24, 2020 as U.S. Publication No. 2020-0304863, which claims the benefit under 35 U.S.C. § 119 (e) of U.S. Provisional Patent Application No. 62/822,948, filed Mar. 24, 2019, and U.S. Provisional Patent Application No. 62/855,842, filed May 31, 2019, the contents of which are incorporated herein by reference in their entireties for all purposes.

FIELD OF THE DISCLOSURE

This relates generally to user interfaces that enable a user to interact with a media browsing application on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents items of content using a media browsing application. In some circumstances, the items of content are provided by a variety of sources. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that present a plurality of representations of content items in a unified media browsing application. Some embodiments described in this disclosure are directed to one or more electronic devices that present information on representations of content items. Some embodiments described in this disclosure are directed to one or more electronic devices that display content in a unified media browsing application. Some embodiments described in this disclosure are directed to one or more electronic devices that link to an account for a primary content provider. Some embodiments described in this disclosure are directed to one or more electronic devices that restrict access to content based on the geographic location of the device. Some embodiments described in this disclosure are directed to one or more electronic devices that present playback menus during playback of content in a unified media browsing application. Some embodiments described in this disclosure are directed to one or more electronic devices that display user interfaces specific to respective content items. Some embodiments described in this disclosure are directed to one or more electronic devices that display content items. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7K are flow diagrams illustrating a method of presenting a plurality of representations of content items in a unified media browsing application in accordance with some embodiments of the disclosure.

FIGS. 11A-11F are flow diagrams illustrating a method of displaying content in a unified media browsing application in accordance with some embodiments of the disclosure.

FIGS. 13A-13C are flow diagrams illustrating a method of linking to an account for a primary content provider in accordance with some embodiments of the disclosure.

FIGS. 15A-15C are flow diagrams illustrating a method of restricting access to content based on the geographic location of the device in accordance with some embodiments of the disclosure.

FIGS. 17A-17D are flow diagrams illustrating a method of presenting playback menus during playback of content in a unified media browsing application in accordance with some embodiments of the disclosure.

DETAILED DESCRIPTION

Figure 1A:
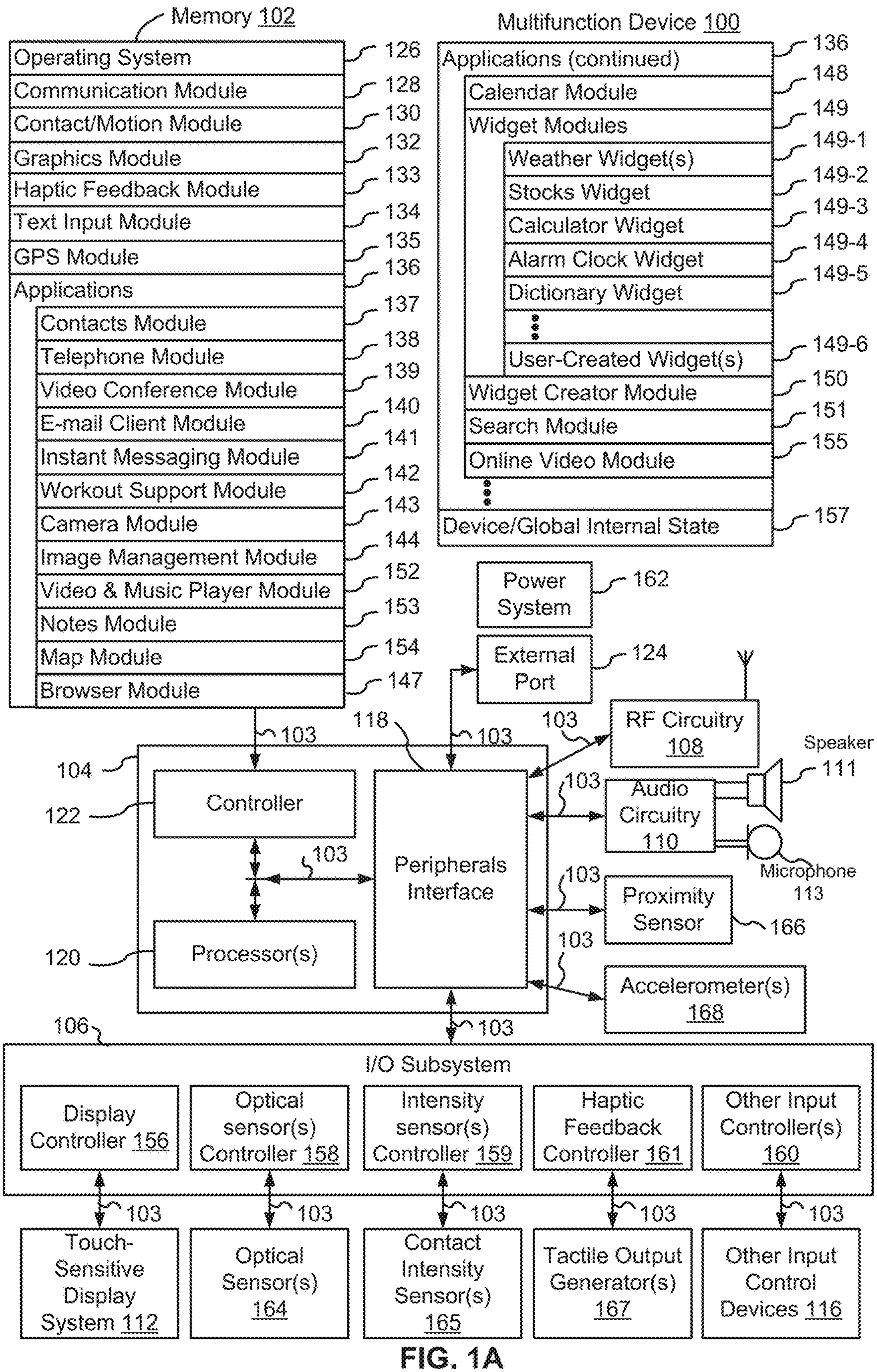
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device";

Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
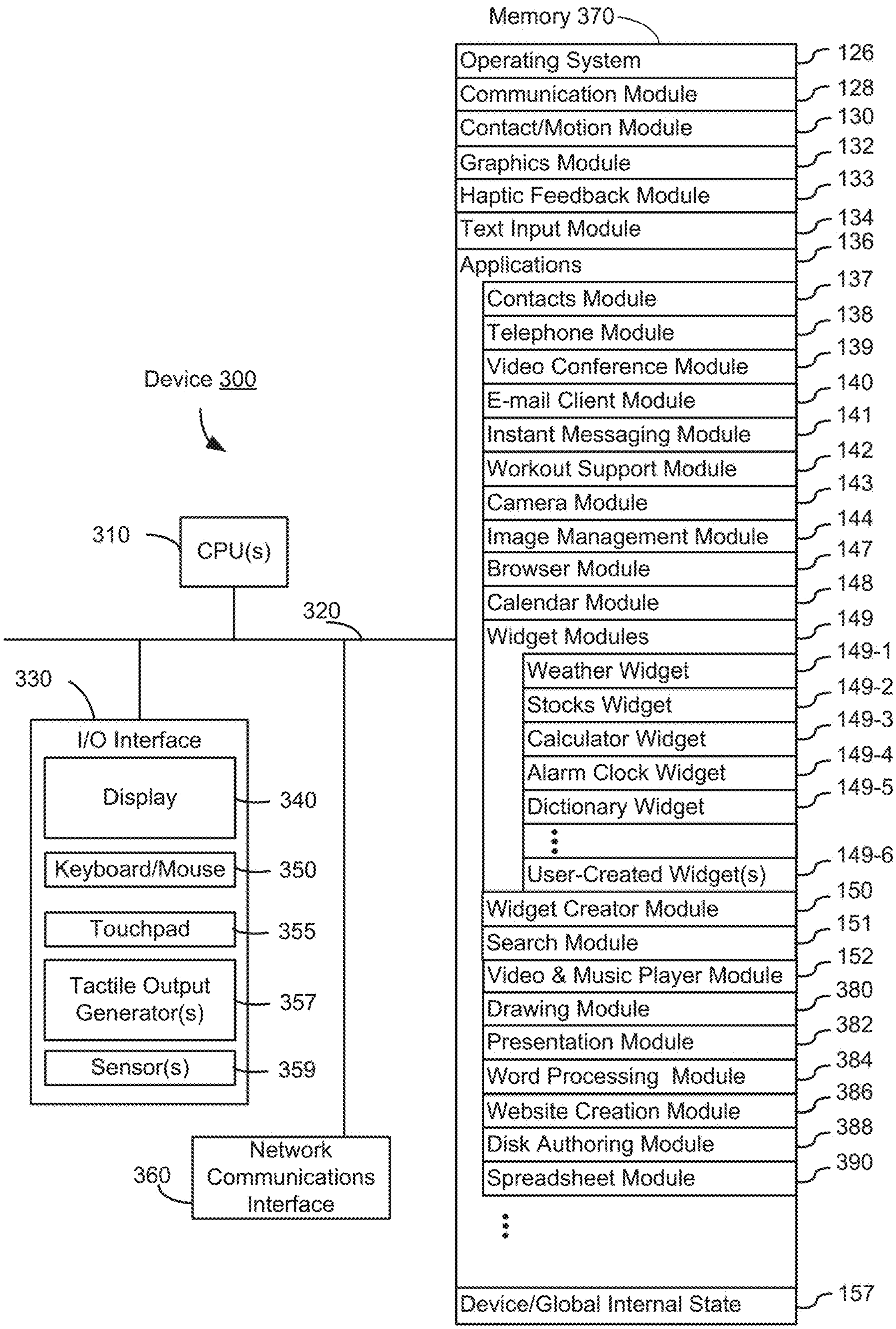
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
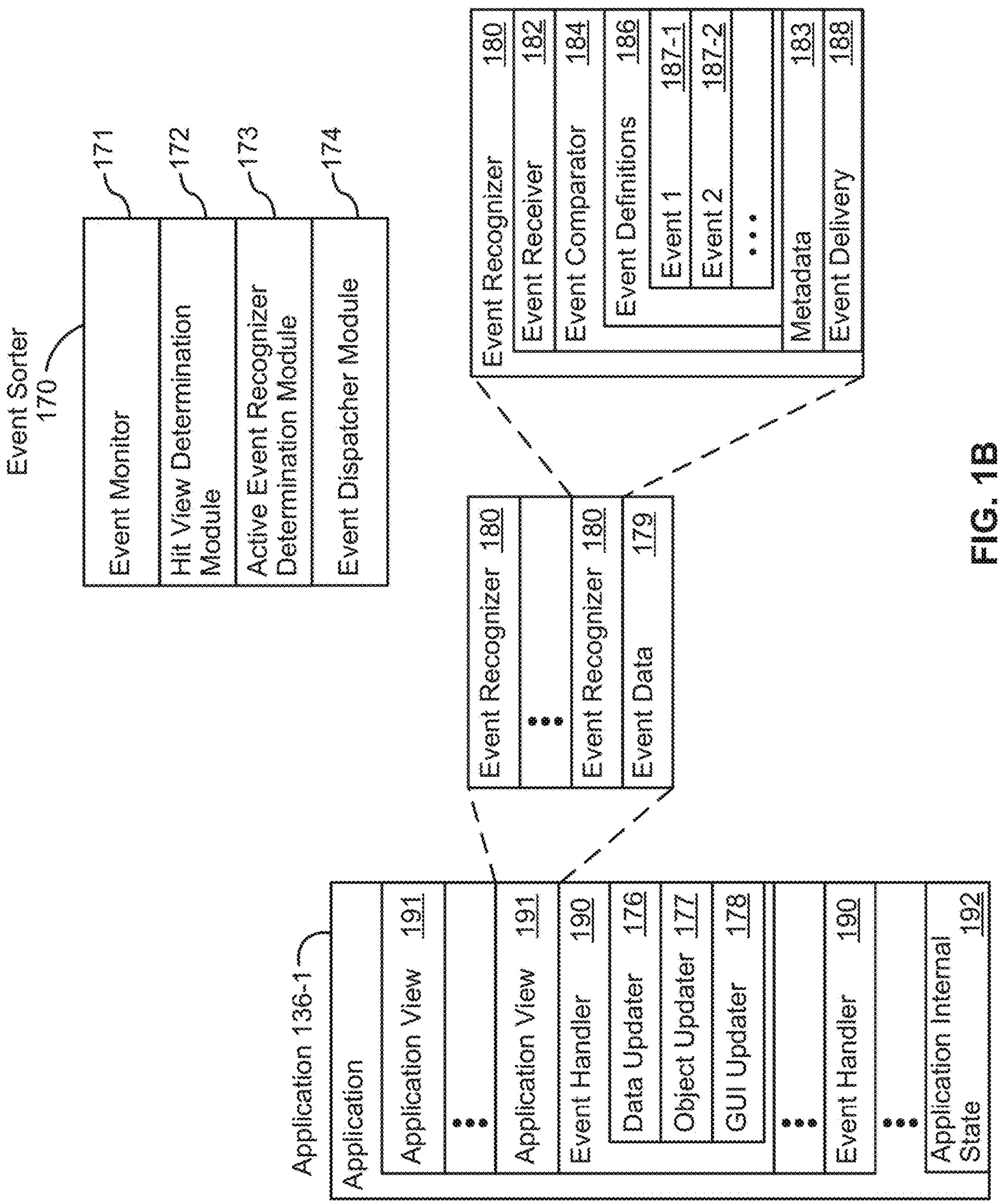
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
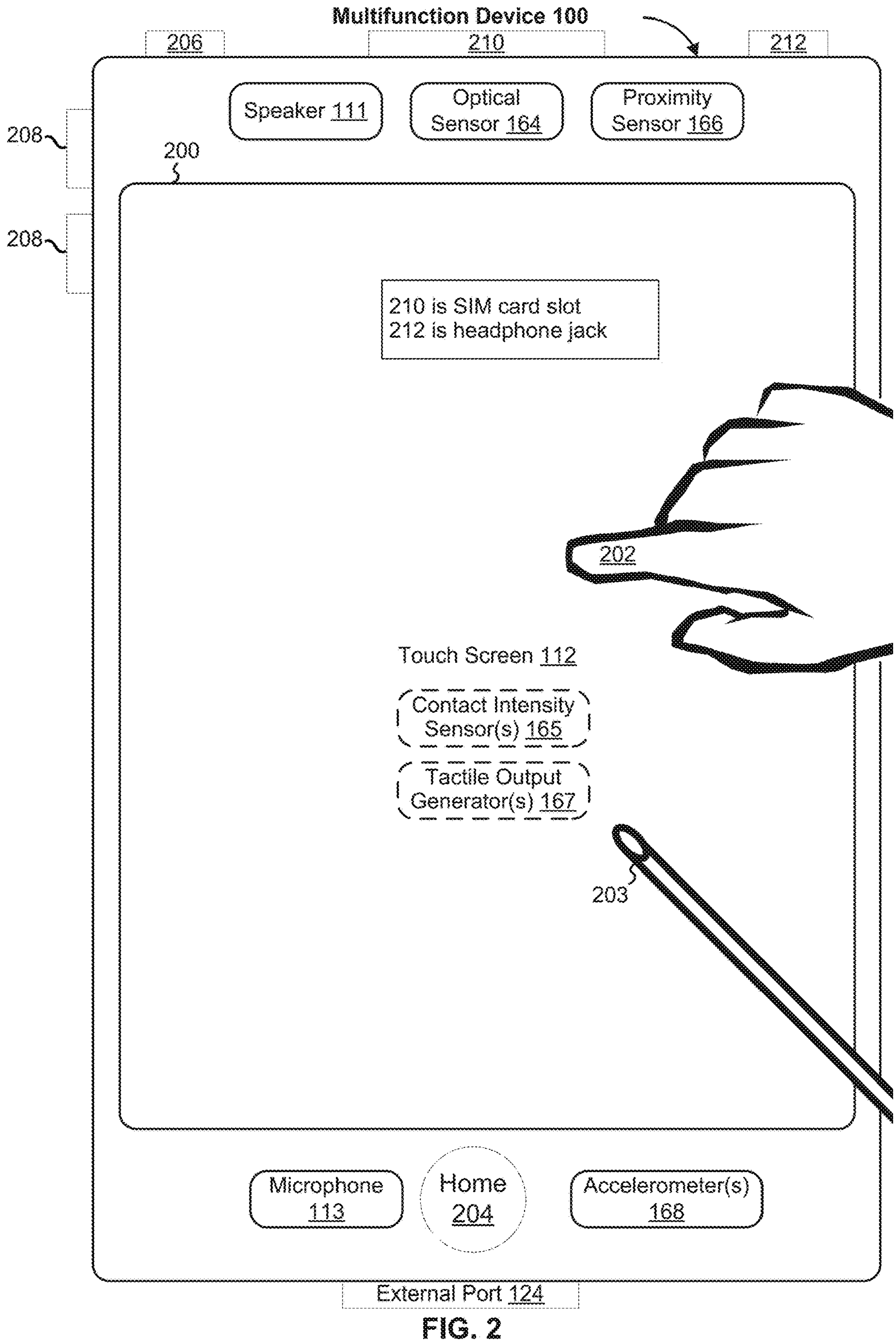
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
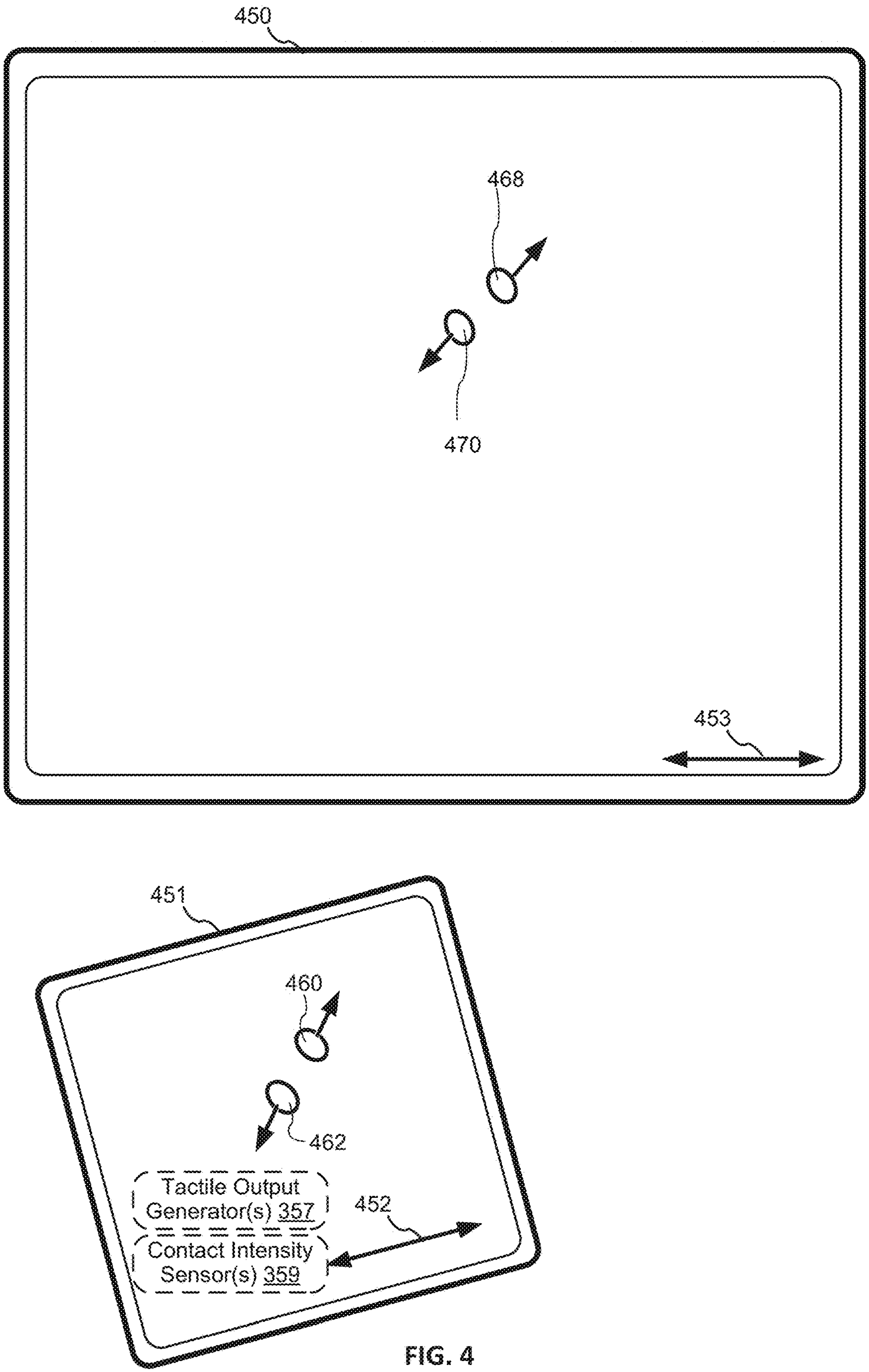
FIG. 4 illustrates an exemplary user interface for a multifunction device with a touch-sensitive surface that is separate from the display in accordance with some embodiments of the disclosure.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
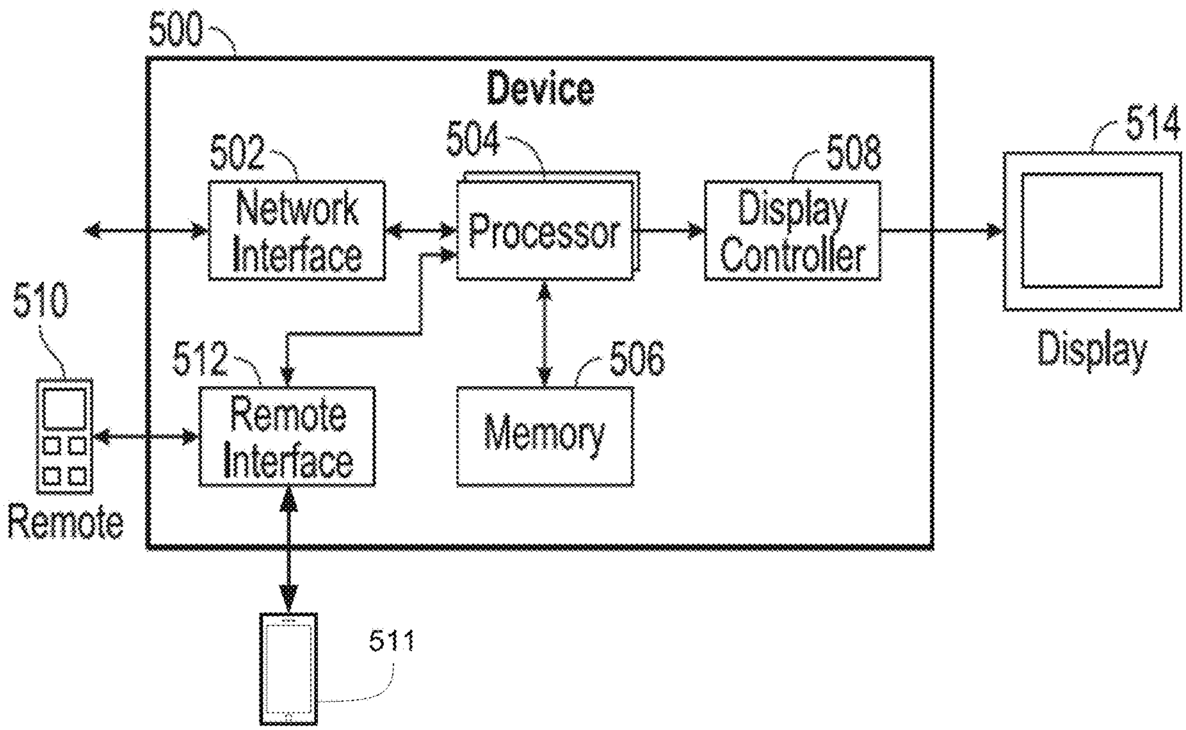
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, 1500, 1700, 1900, 2100, and 2300).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
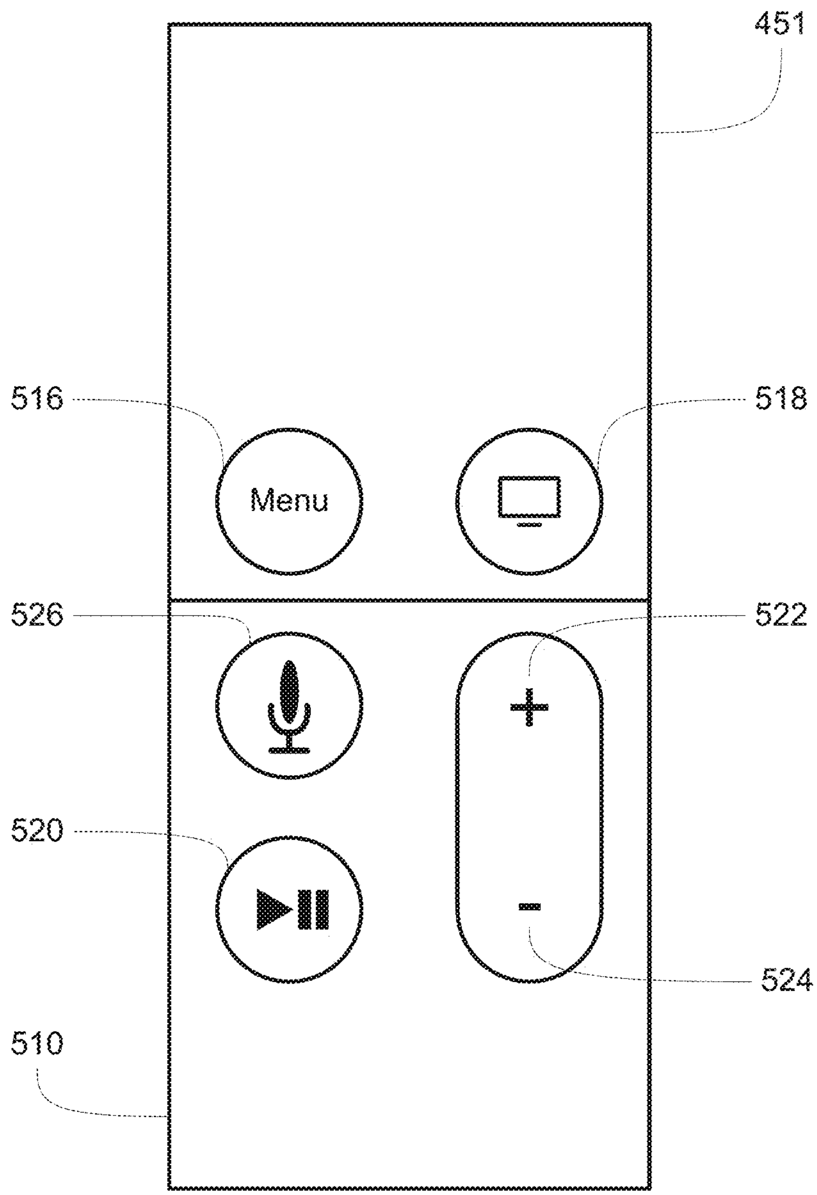

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
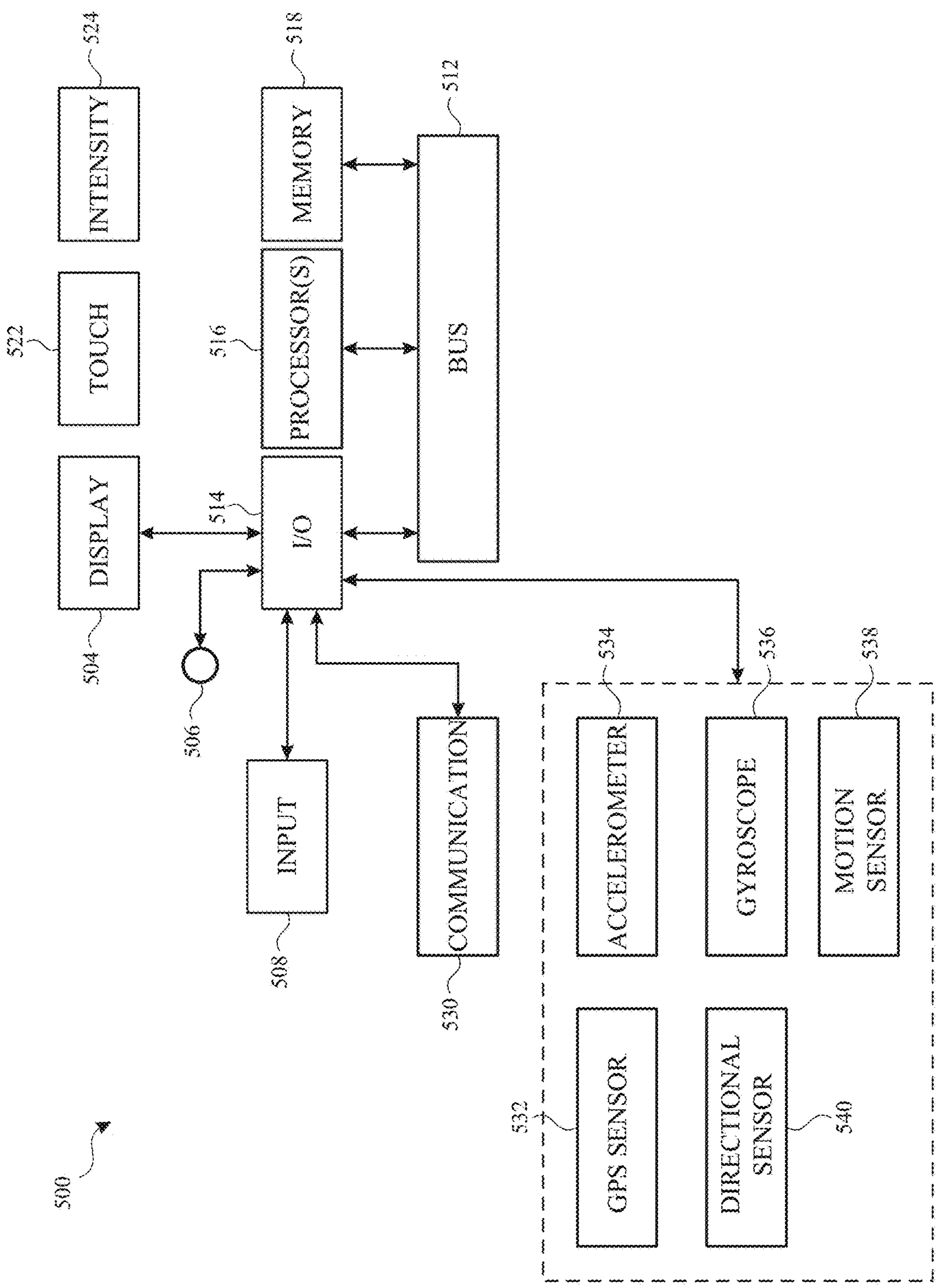

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-23. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, 500 and/or 511 (FIGS. 1A, 3, and 5A-5C). For example, an image (e.g., icon), a button, and text (e.g., hyperlink) each optionally constitute an affordance.

As used herein, "installed application" refers to a software application that has been downloaded onto an electronic device (e.g., devices 100, 300, 500, and/or 511) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (U.S. Patent Application No. 62/822,952, filed Mar. 24, 2019), "User Interfaces Including Selectable Representations of Content Items" (U.S. Patent Application No. 62/822,942, filed Mar. 24, 2019), and "User Interface Specific to Respective Content Items" (U.S. Patent Application No. 62/822,966, filed Mar. 24, 2019), each of which is hereby incorporated by reference.

Attention is now directed towards embodiments of user interfaces ("UI") and associated processes that are implemented on an electronic device, such as portable multifunction device 100, device 300, device 500, or device 511.

User Interfaces and Associated Processes

Representations of Content in a Unified Media Browsing Application

Users interact with electronic devices in many different manners, including using an electronic device to browse and access content in a media browsing application. In some embodiments, an electronic device aggregates available content in a single unified media browsing application. The embodiments described below provide ways in which an electronic device presents a plurality of representations of content items in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
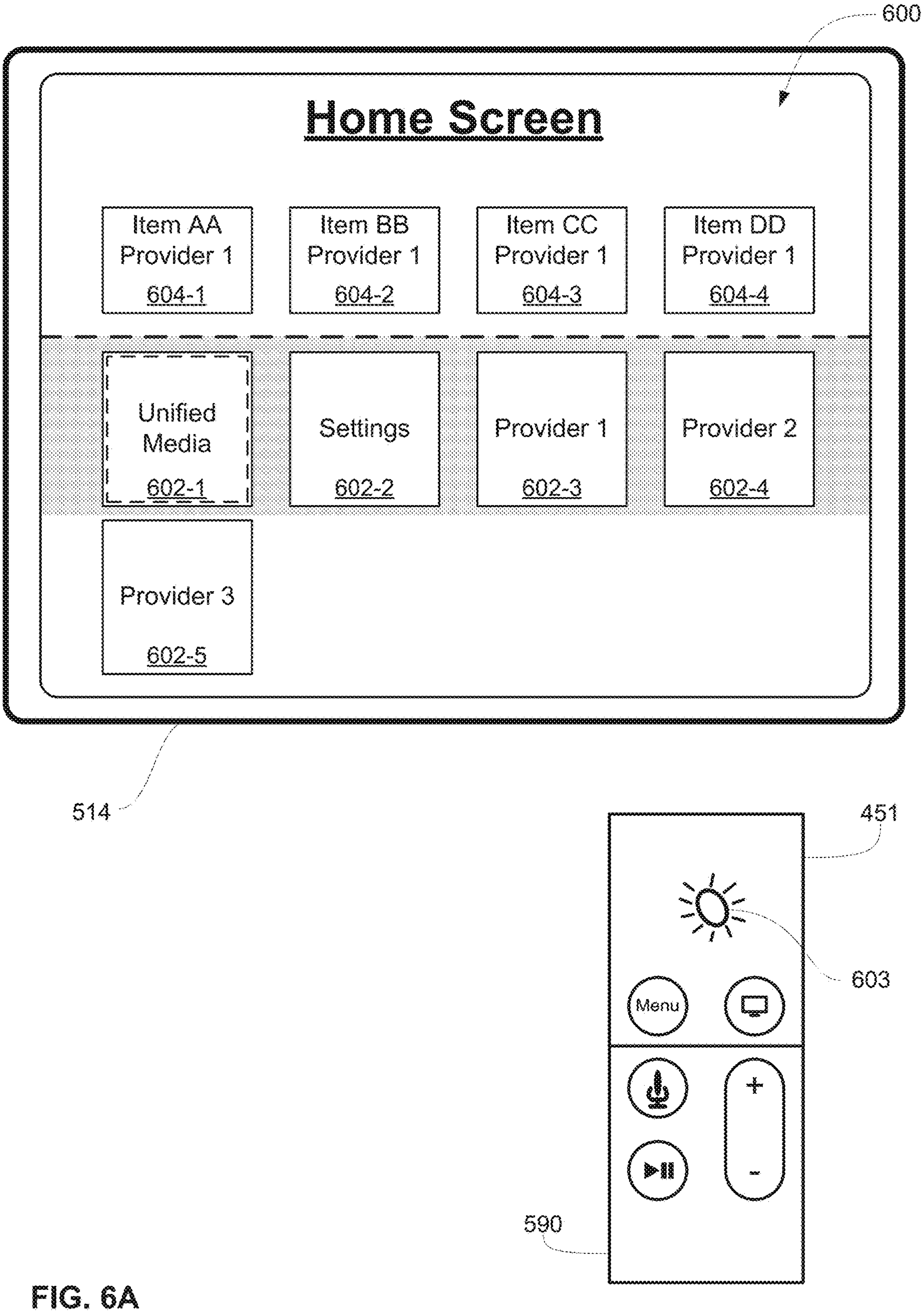
FIGS. 6A-6QQ illustrate exemplary ways in which an electronic device presents a plurality of representations of content items in a unified media browsing application in accordance with some embodiments of the disclosure.
Figure 6B:
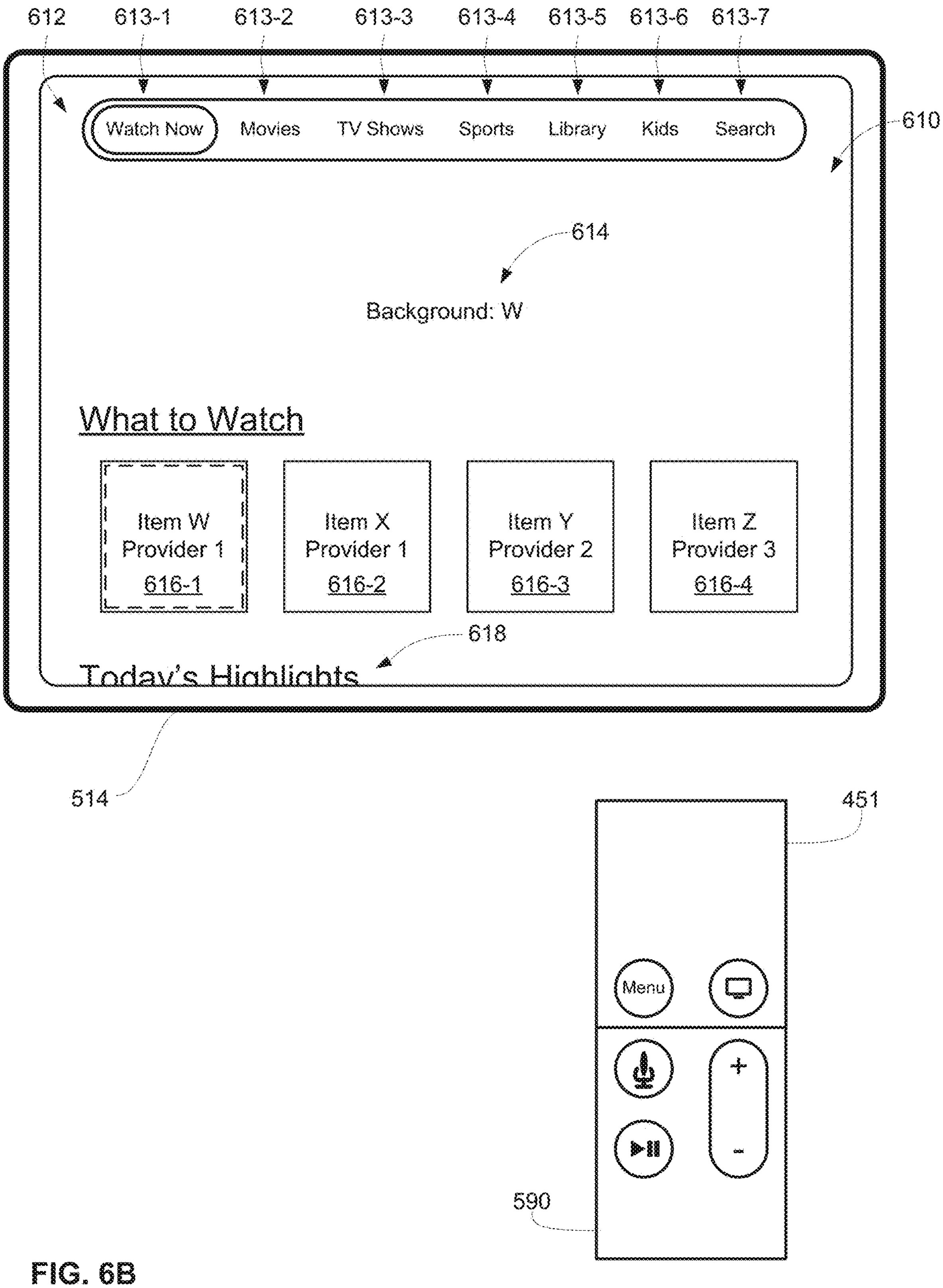
Figure 6C:
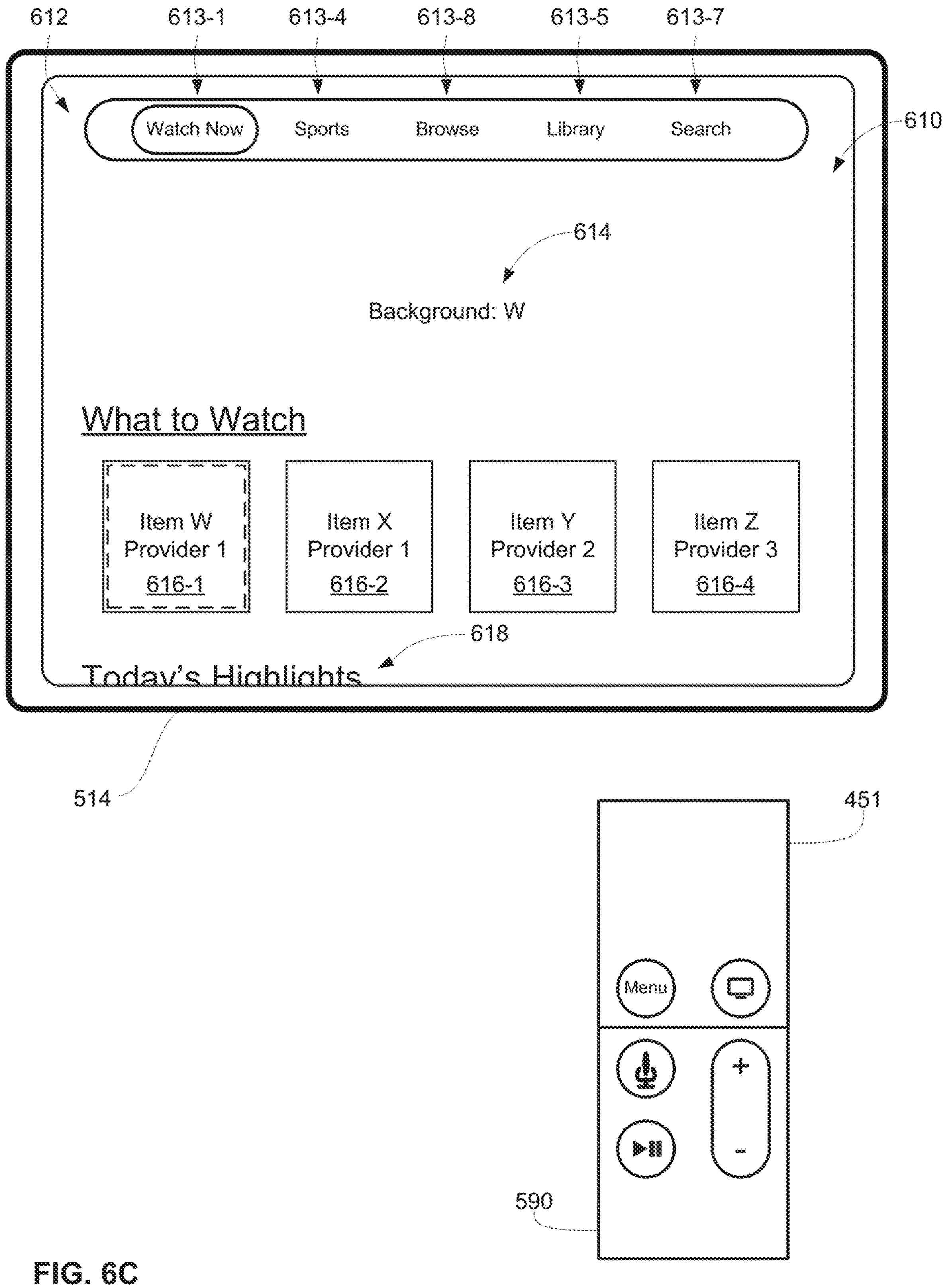
Figure 6D:
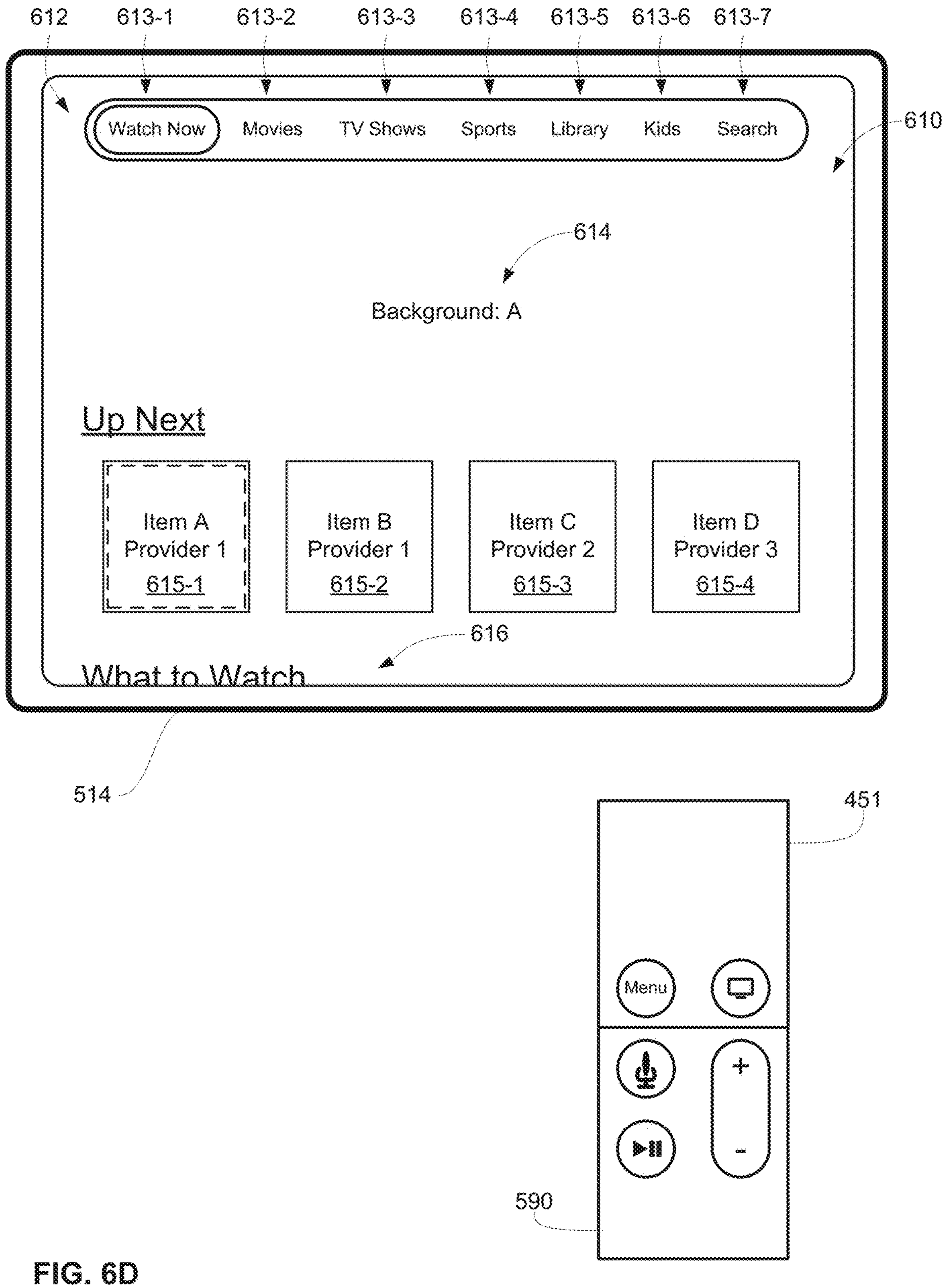
Figure 6E:
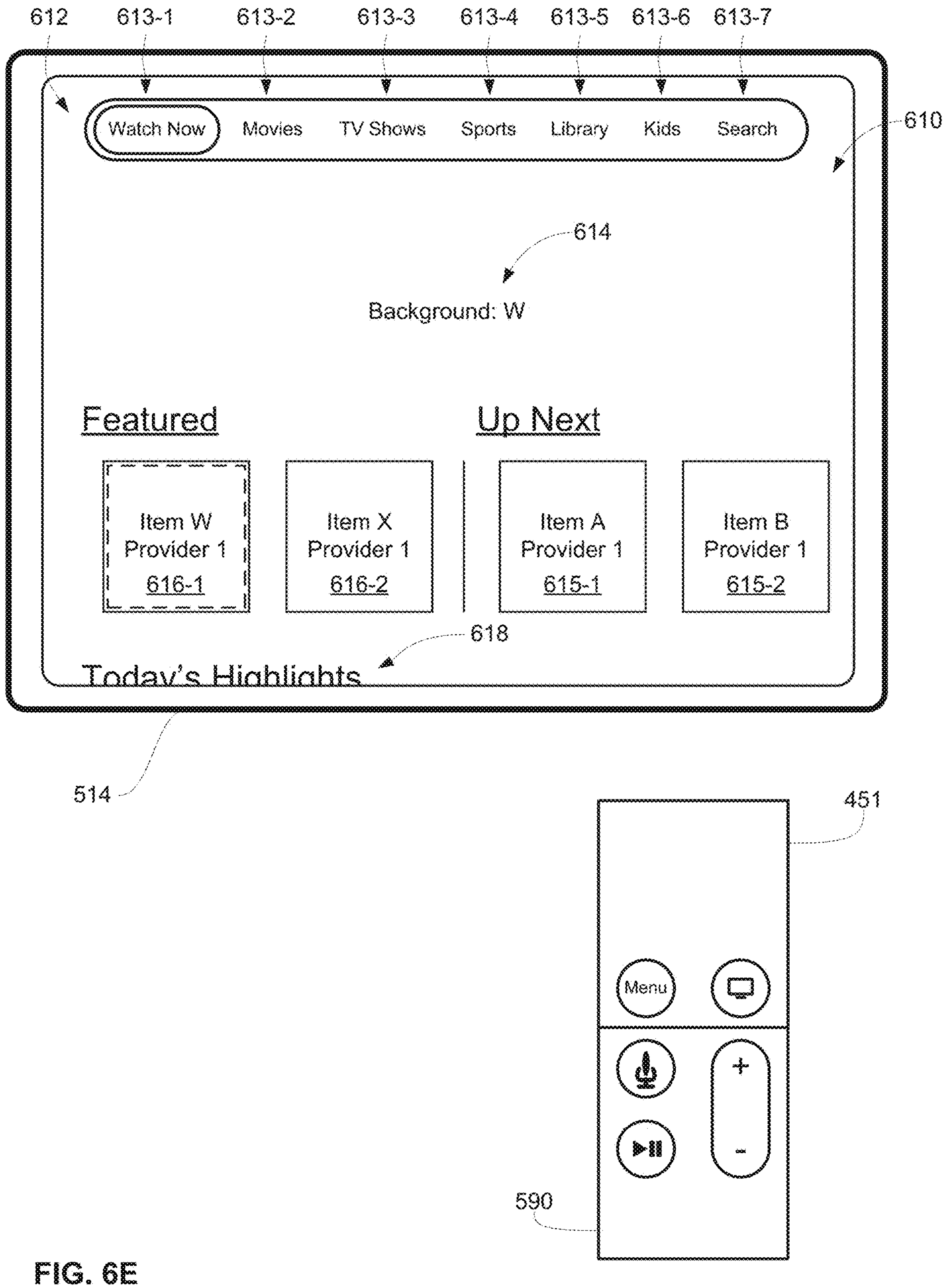
Figure 6F:
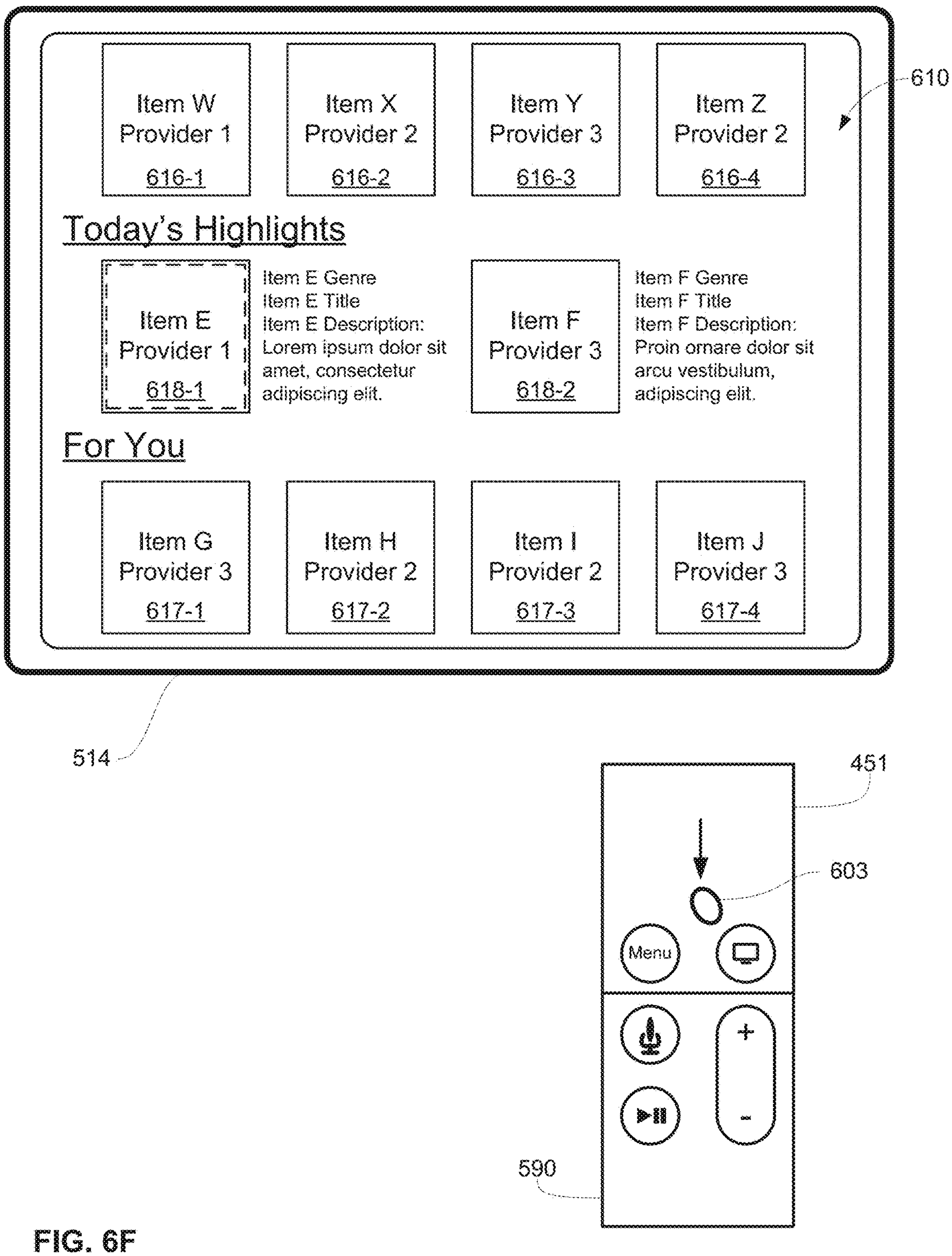
Figure 6G:
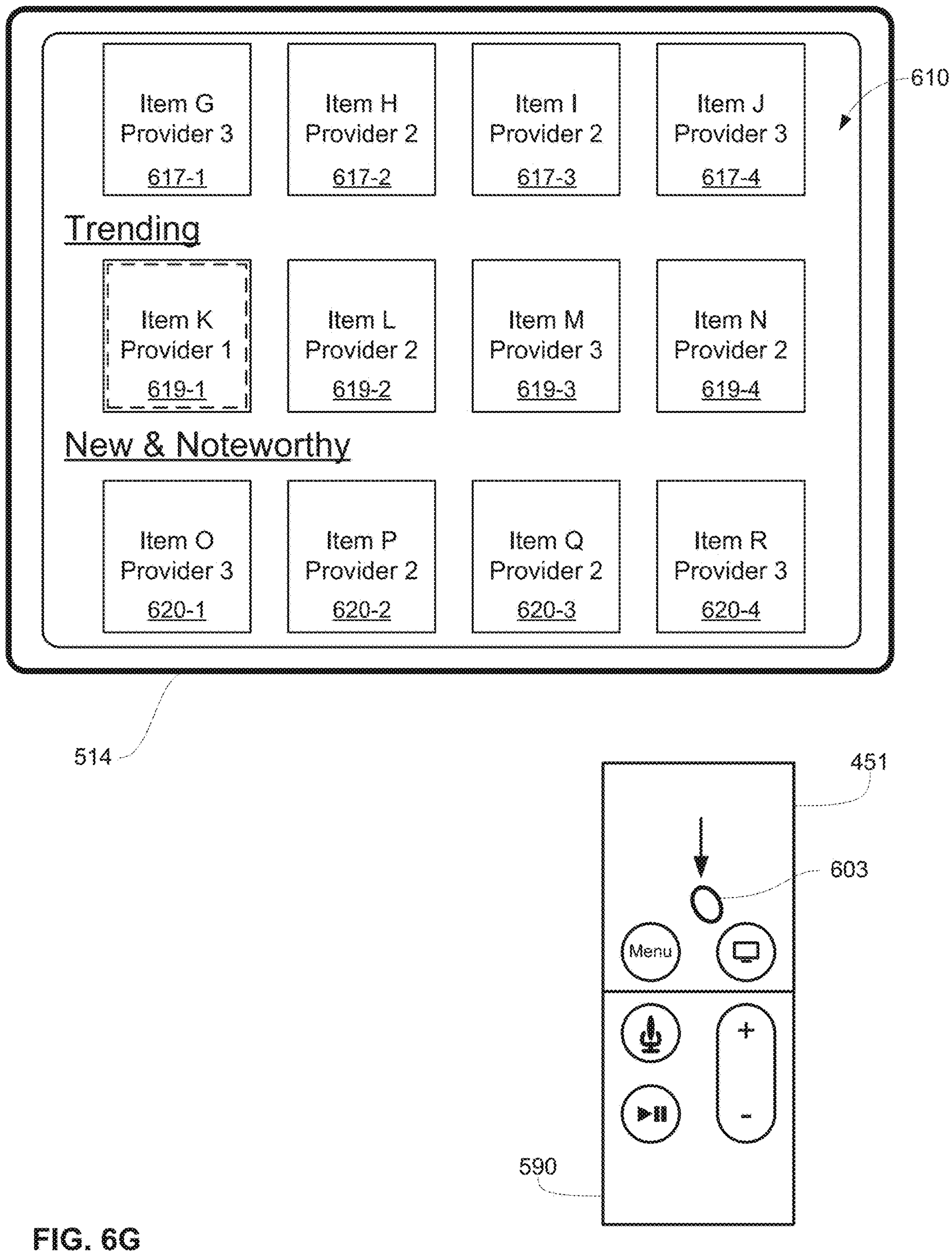
Figure 6H:
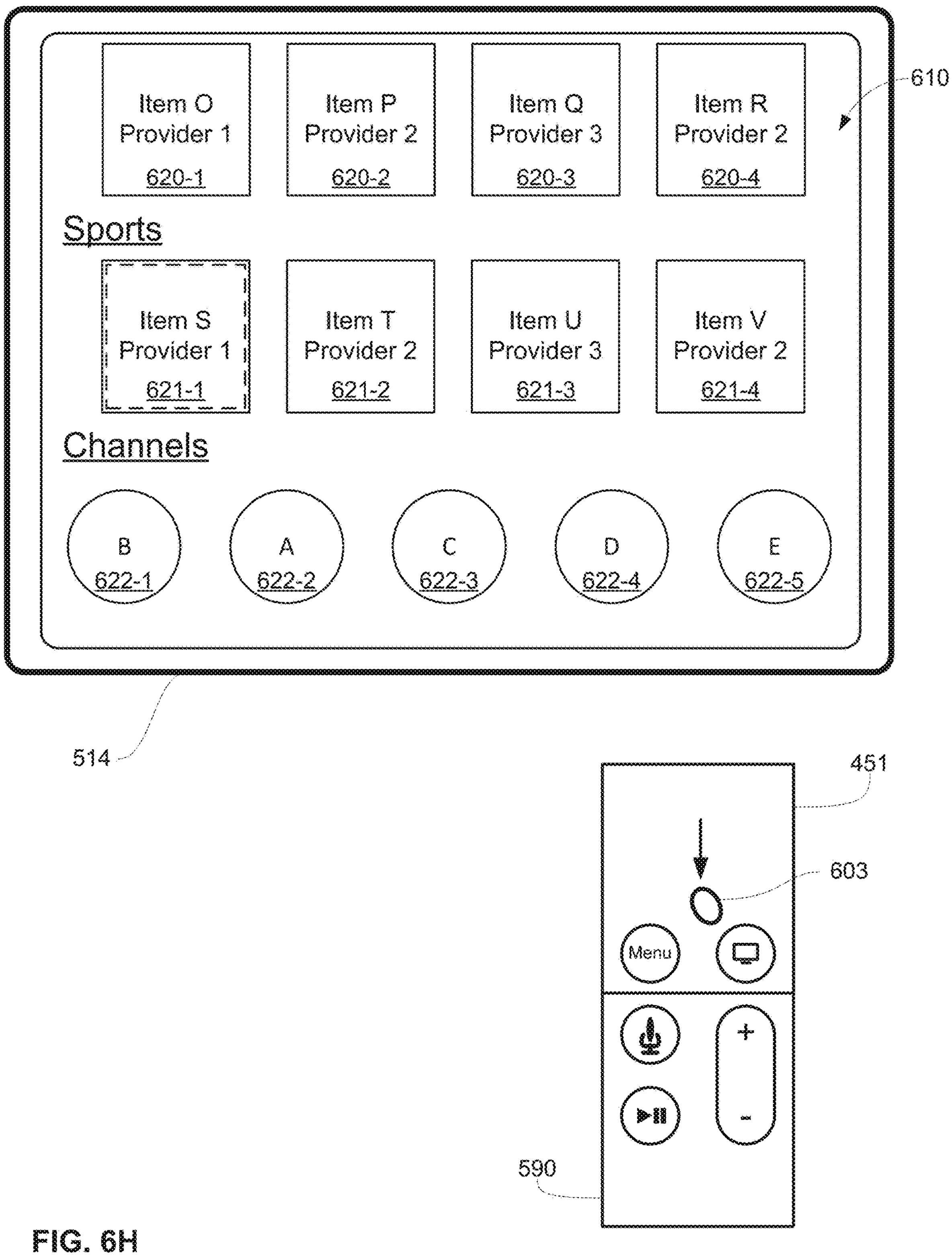
Figure 6I:
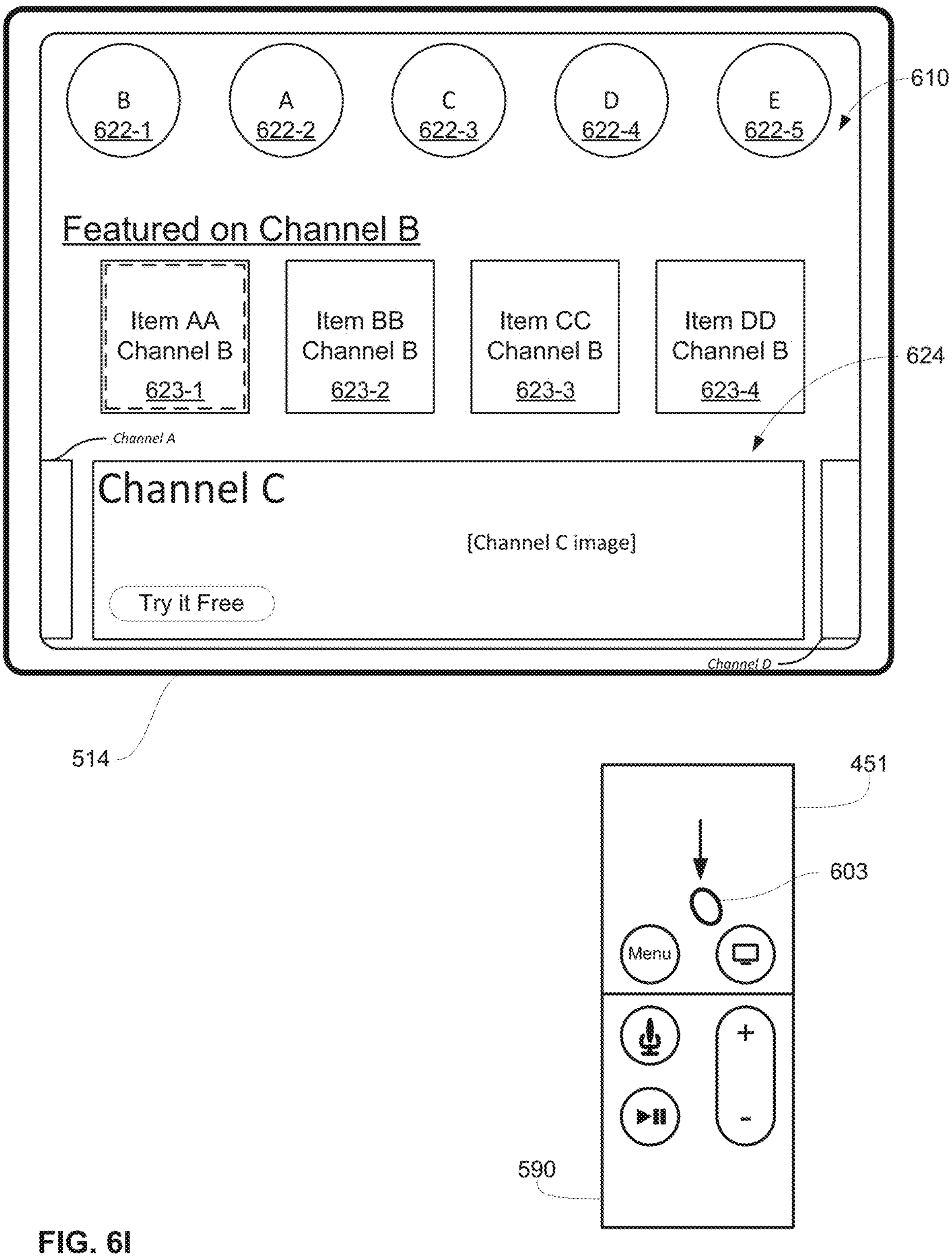
Figure 6J:
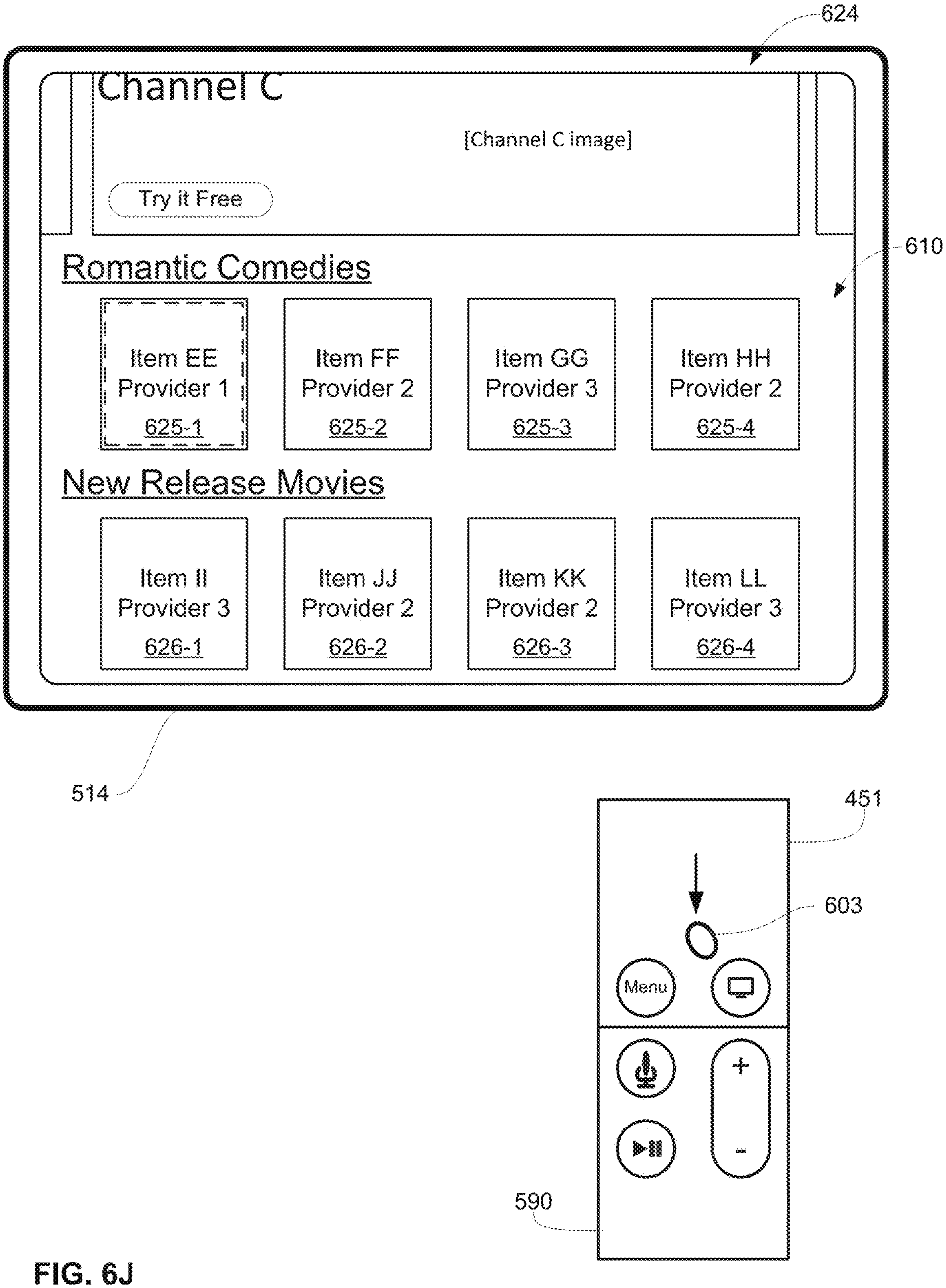
Figure 6K:
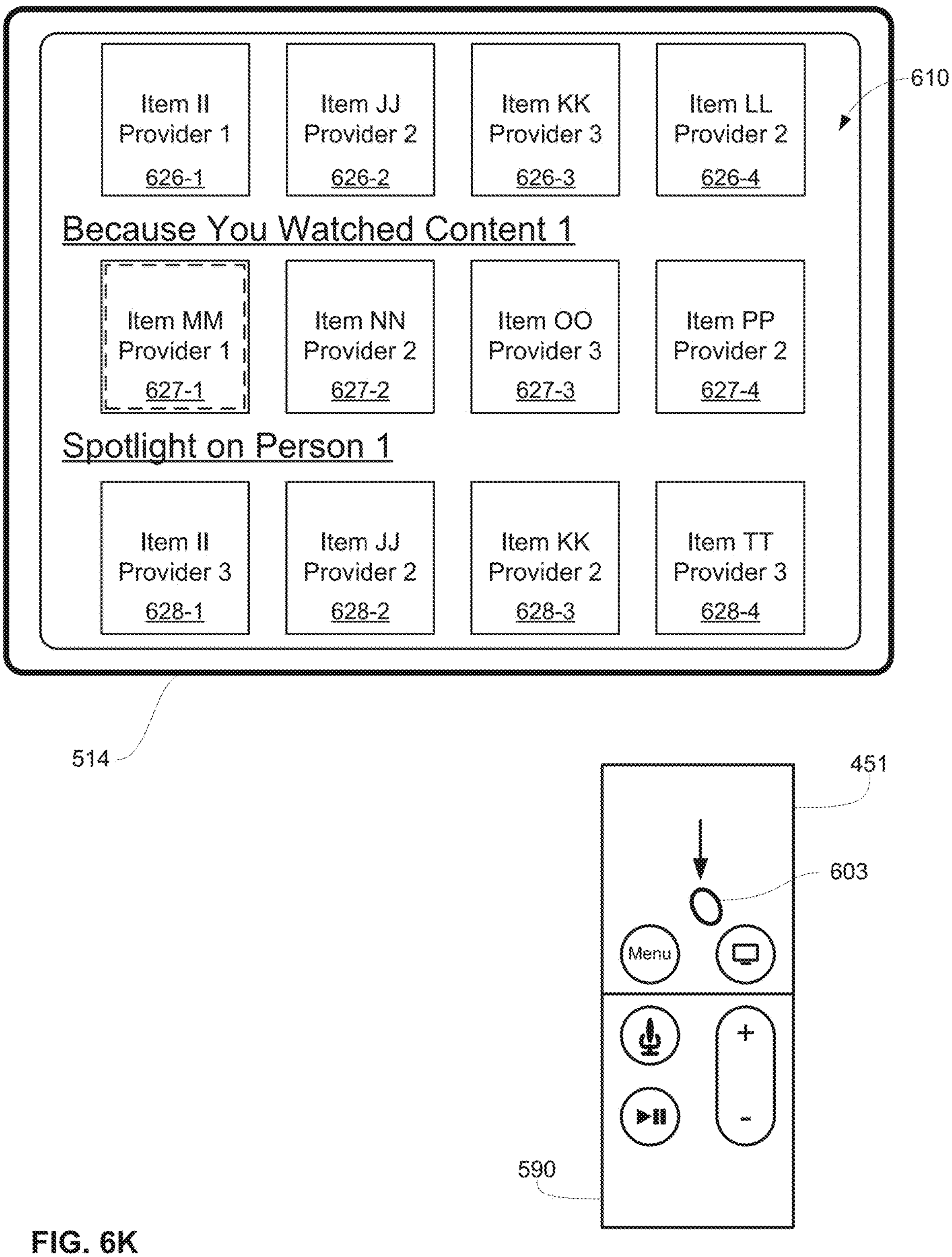
Figure 6L:
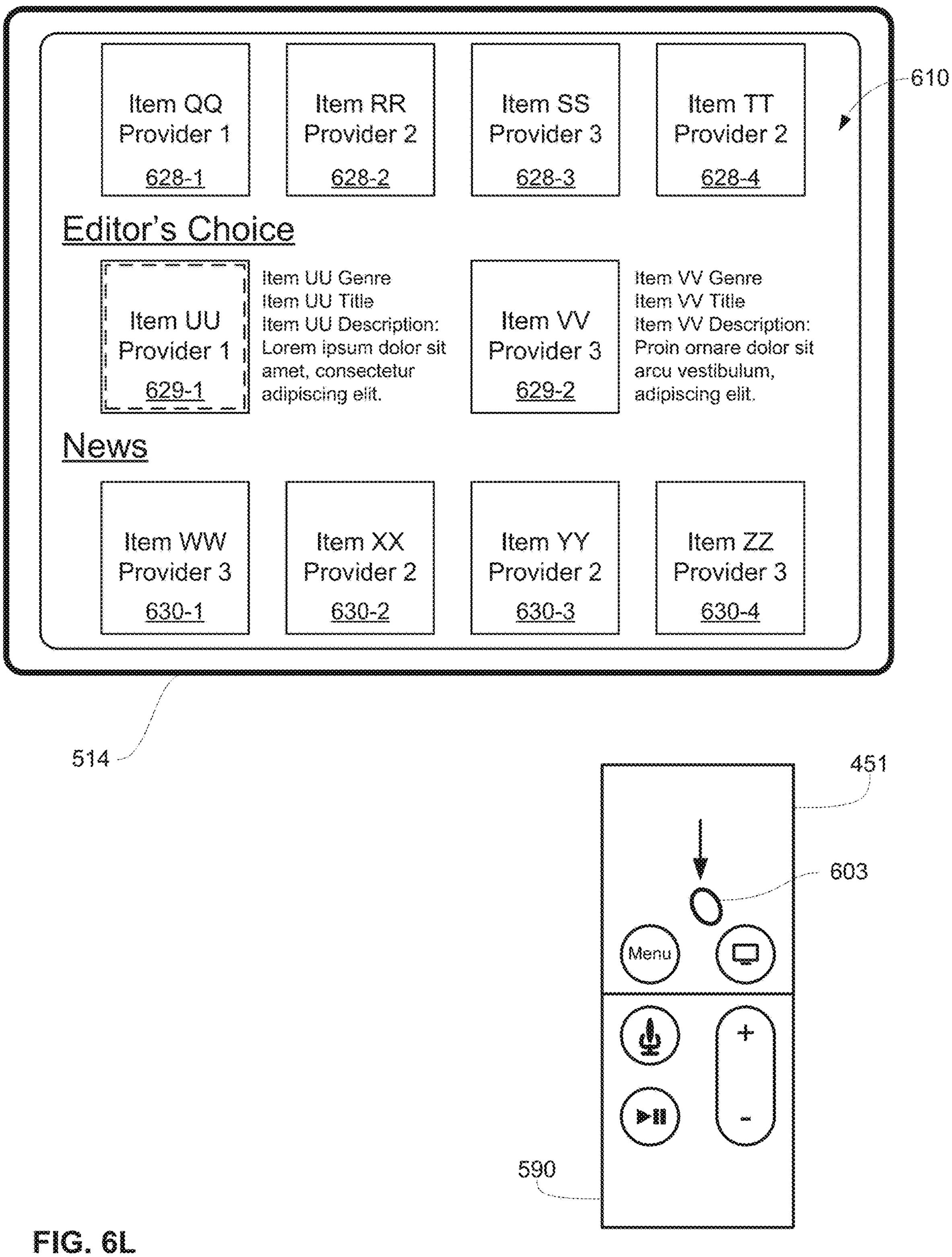
Figure 6M:
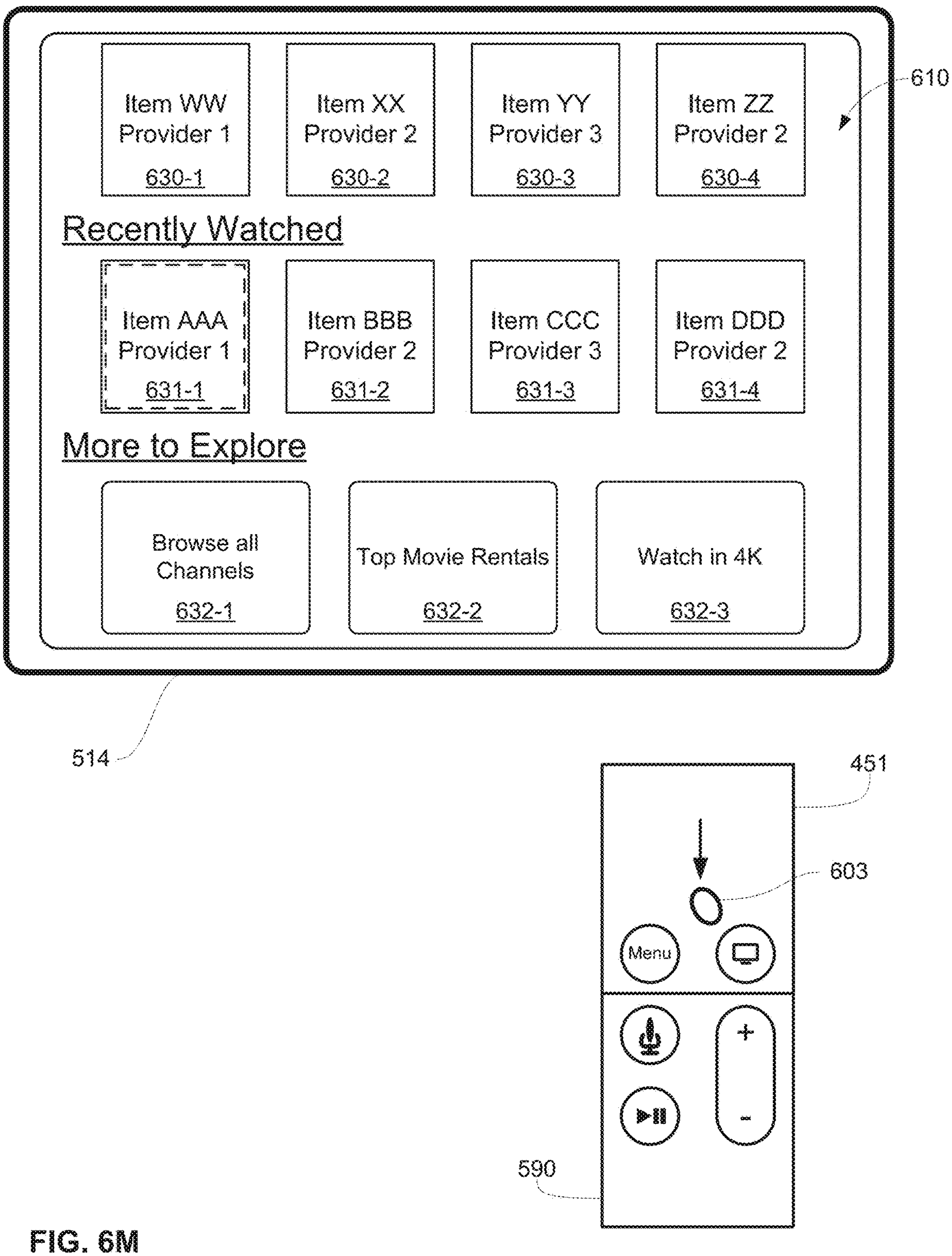
Figure 6N:
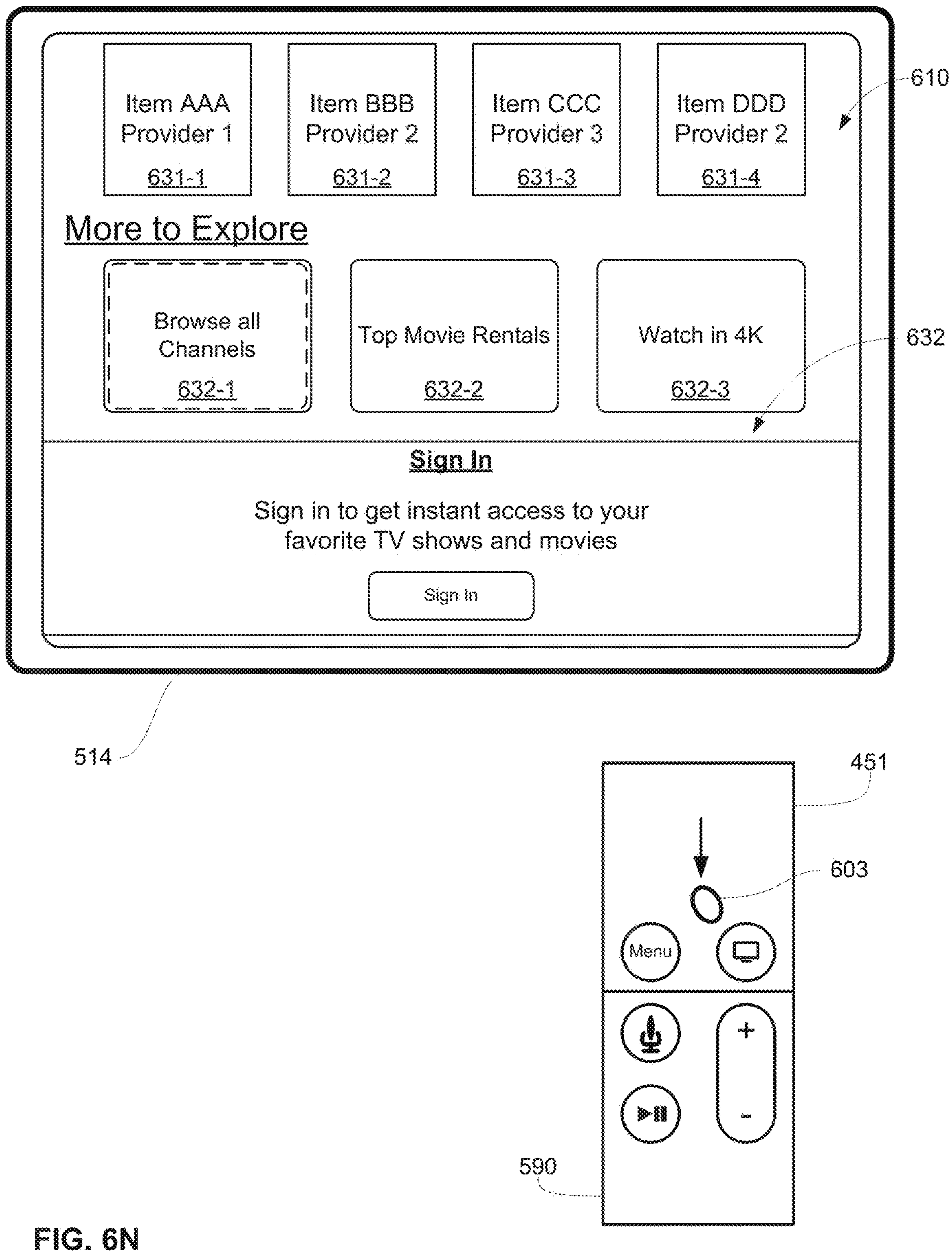
Figure 6O:
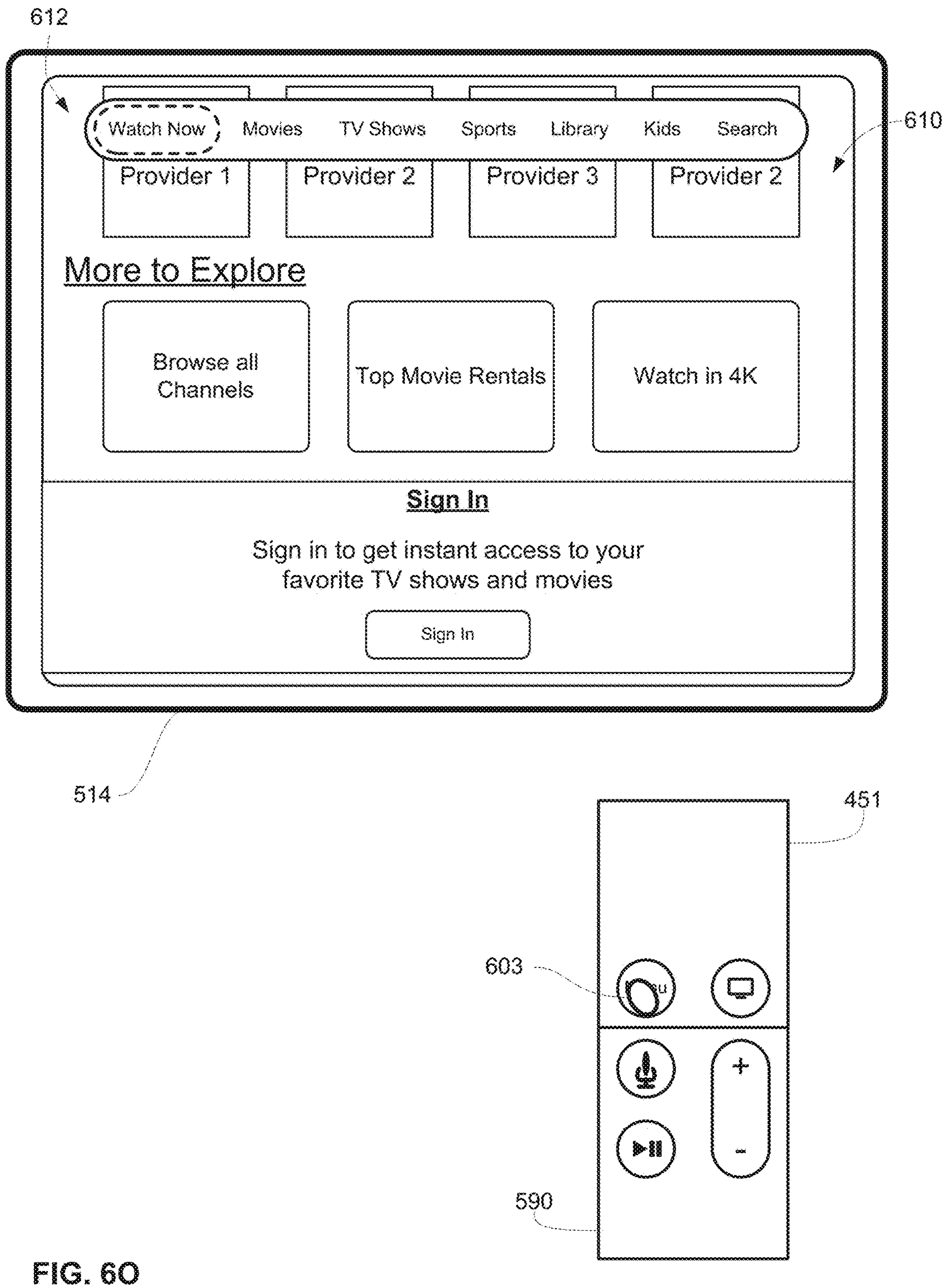
Figure 6P:
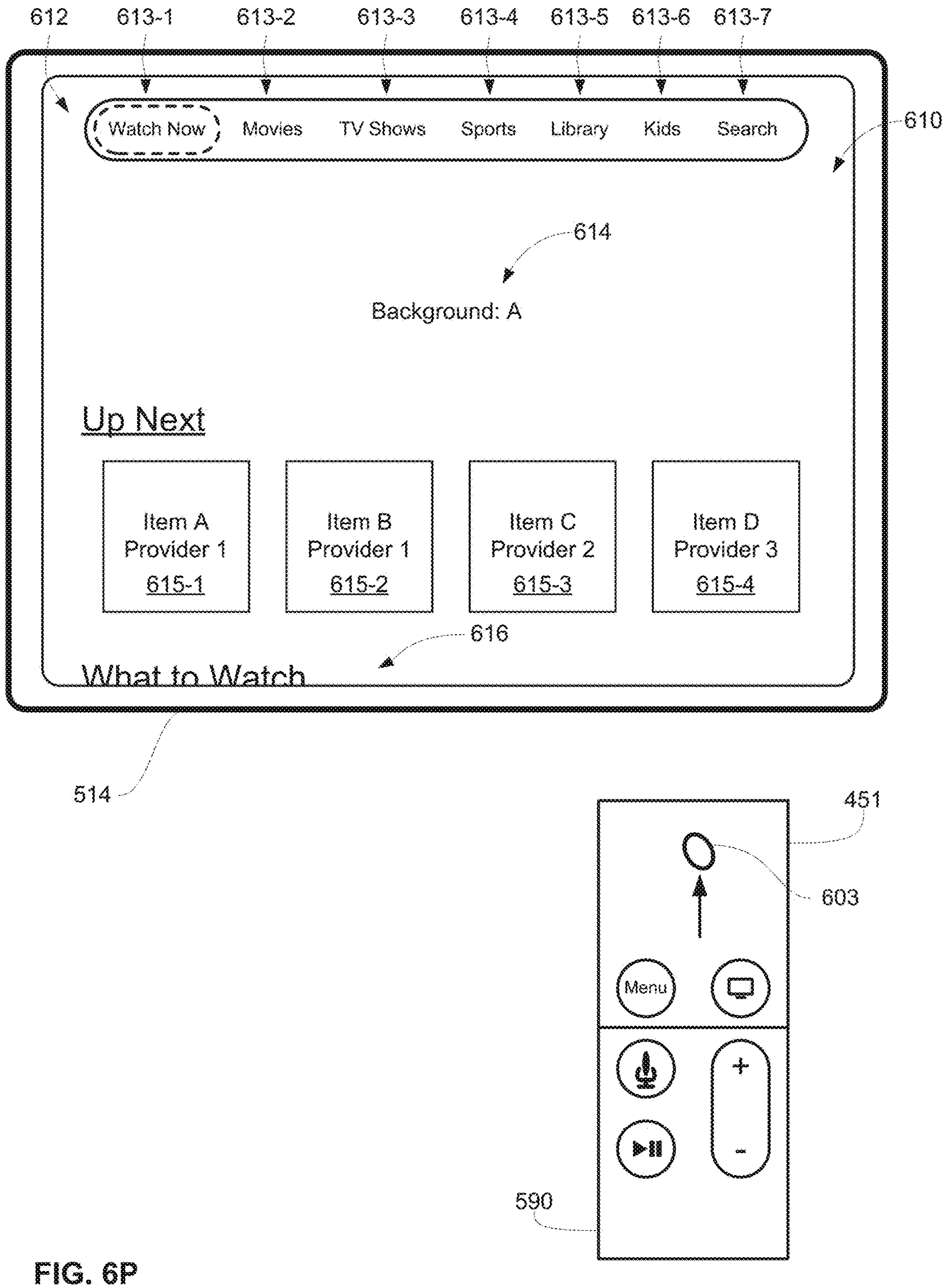
Figure 6Q:
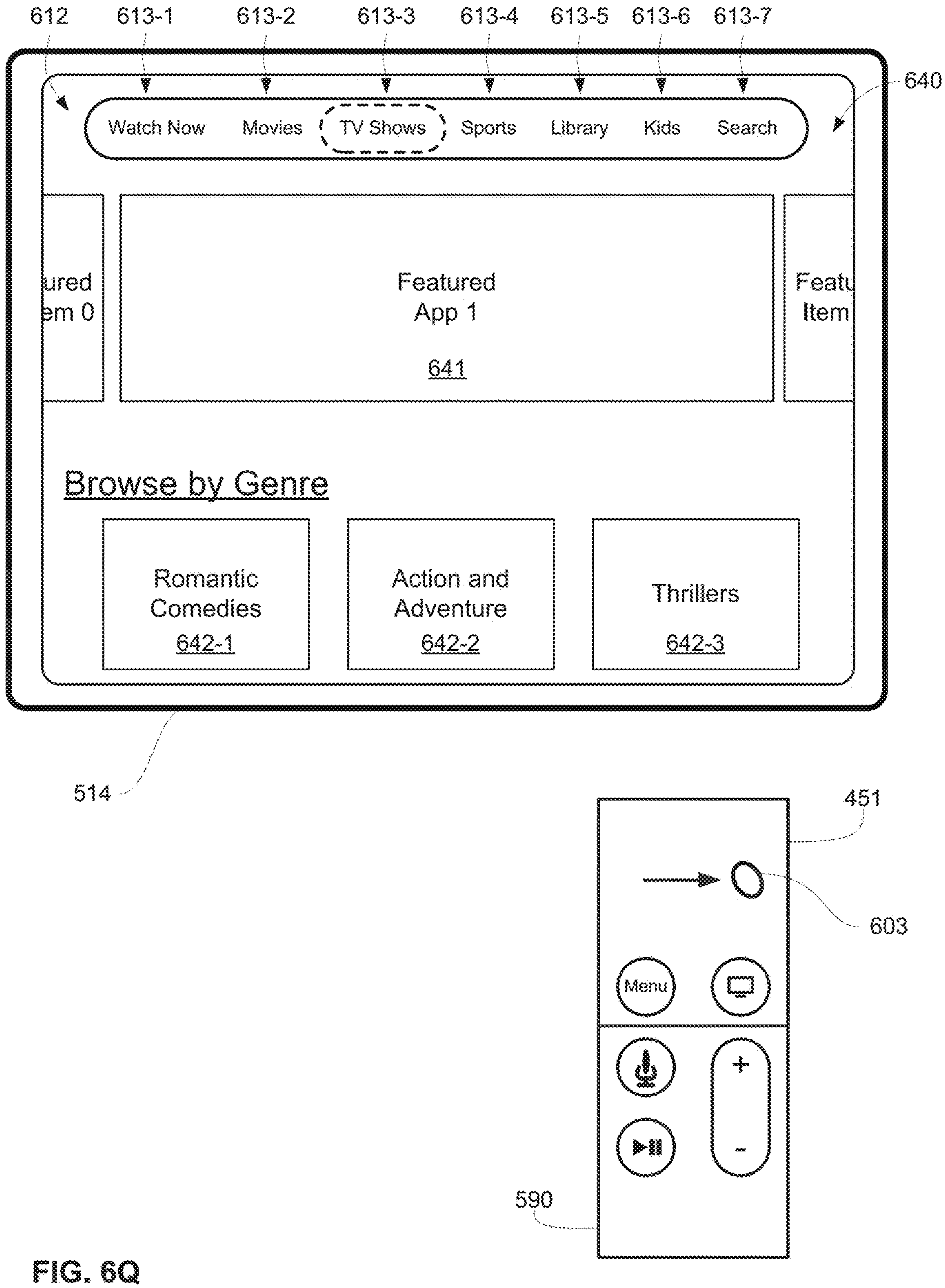

FIGS. 6A-6QQ illustrate exemplary ways in which an electronic device presents a plurality of representations of content items in a unified media browsing application in accordance with some embodiments of the disclosure. The embodiments in these figures are used to illustrate the processes described below, including the processes described with reference to FIGS. 7A-7K.

FIGS. 6A-6QQ illustrate an electronic device 500 presenting a plurality of representations of content items in a unified media browsing application. FIG. 6A illustrates electronic device (such as electronic device 500, not shown) displaying a home screen user interface 600 on display 514. In some embodiments, home screen user interface 600 is an application launching user interface. For example, home screen user interface 600 includes multiple selectable options that when selected causes the electronic device 600 to launch or otherwise present applications. In some embodiments, home screen user interface 600 includes multiple pages or tabs and includes all launchable applications that have been installed onto electronic device 500. In some embodiments, home screen user interface 600 includes a subset of the applications that are installed and launchable on electronic device 500. In some embodiments, home screen user interface 1000 includes 602-1 for launching a unified media browsing application, icon 602-2 for launching a settings application (e.g., or a settings user interface), icon 602-3 for launching a provider 1 application (e.g., an application dedicated to and for accessing content from provider 1), icon 602-4 for launching a provider 2 application and icon 602-5 for launching a provider 3 application.

User interface 600 optionally also includes a region above icons 602 (e.g., a "top shelf" region) that optionally displays one or more user interface elements corresponding to the application whose icon 602 has the current focus. In some embodiments, only icons in the top row of icons in user interface 600 cause the top shelf to display user interface elements. In some embodiments, the top row of icons 602 is visually distinguished from the other rows of icons 602 to indicate that only the top row includes this behavior, as shown in FIG. 6A. For example, in FIG. 6A, icon 602-1 corresponding to the unified media browsing application has the current focus (e.g., as indicated by the dotted square). As a result, device 500 displays representations 604-1 to 604-4 of media items accessible from the unified media browsing application (e.g., content that is browsable and selectable in the unified media browsing application for display within the unified media browsing application or another application that is launched in response to the user selection) in the "top shelf" region of user interface 600. Representations 604 optionally include information identifying each media item (e.g., textual information) and/or information about the content of each media item (e.g., video previews of the media items, still images of the media items, etc.). The "top shelf" region is, in some embodiments, a scrollable region that includes representations of suggested media items for the currently highlighted application in the home screen, and an upward swipe on remote 590 (e.g., on touch sensitive surface 451) causes the current focus to move to the top shelf. In some embodiments, selection of the items in the top shelf region (e.g., with a tap or click input on remote 590), will cause device 500 to start playing a media item that corresponds to the representation of a suggested media item that has current focus (e.g., within the unified media browsing application or another application that is launched in response to the user selection).

In FIG. 6A, a user input 603 is received corresponding to a click input on a touch sensitive surface 451 of remote 590 while icon 602-1 corresponding to the unified media browsing application has a focus (e.g., a selection input). In some embodiments, in response to the user input, device 500 launches the unified media browsing application and displays user interface 610 of the unified media browsing application, as shown in FIG. 6B.

In some embodiments, the unified media browsing application is installed on device 500 (e.g., pre-installed on device 500 by default or installed during the setup process). The unified media browsing application optionally provides a centralized location for browsing, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc. (e.g., such as provider 1, provider 2, provider 3 discussed above with reference to FIG. 6A)). In some embodiments, the unified media browsing application aggregates all the shared information to provide a better and more cohesive interface and dataset for the user. In some embodiments, the unified media browsing application allows the user to browse the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the unified media browsing application provides an interface for the user to select content items that the user desires to view. Upon selection of the content item, the electronic device optionally determines the respective application from where the content item is available, launches the respective application, and causes playback of the selected content item. In some embodiments, the unified media browsing application can perform playback within the unified media browsing application itself (e.g., by receiving data directly from the provider's server, by receiving data through the provider's application (e.g., the provider's application requests and receives the data and forwards or otherwise transmits it to the unified media browsing application), or any other suitable method). In some embodiments, content that can be played from a respective provider's application can also be played from within the unified media browsing application.

In some embodiments, user interface 610 includes navigation bar 612. In some embodiments, navigation bar 612 includes selectable options 613-1 to 613-7 (e.g., navigation tabs) which are selectable to display different user interfaces (e.g., pages). In some embodiments, the different user interfaces correspond to different types of content items, different genres of content items, or other organizational scheme. For example, selectable option 613-1 is selectable to display a "watch now" user interface for generally suggested content items, selectable option 613-2 is selectable to display a "movies" user interface for movie content items, selectable option 613-3 is selectable to display a "tv shows" user interface for television content items, selectable option 613-4 is selectable to display a "sports" user interface for sports content items, selectable option 613-5 is selectable to display a "library" user interface for previously purchased and/or downloaded content items, selectable option 613-6 is selectable to display a "kids" user interface for children's content item, and selectable option 613-7 is selectable to display a "search" user interface for performing a text search for content. It is understood that all user interfaces discussed below with respect to FIGS. 6B-6QQ, including, for example, user interface 610, are user interfaces of the unified media browsing application, unless explicitly stated otherwise. In other words, the user interfaces discussed below are (unless explicitly stated otherwise), displayed by and within the unified media browsing application (e.g., as opposed to a user interface of another application or a system user interface).

In some embodiments, as shown in FIG. 6B, when the unified media browsing application is initially launched, user interface 610 is displayed corresponding to the "watch now" page. In some embodiments, the "watch now" page displays content that falls within all different genres and/or types of content items. In some embodiments, user interface 610 includes a content display region 614 (e.g., content display region). In some embodiments, content display region 614 displays a representation (e.g., such as a still image, a moving image, an animation, a snapshot, a logo, or any other representation) of the content item that current has a focus. For example, user interface 610 includes a row of icons 616-1 to 616-4 corresponding to content items in the "What to Watch" category. In some embodiments, the row of content items is placed below the content display region 614. In some embodiments, the row of content items is placed overlaid on top of content display region 614 (e.g., such that at least a portion of the content display region is beneath and/or at least partially obscured by the row of icons 616-1 to 616-4. In some embodiments, the row of icons 616-1 to 616-4 is scrollable (e.g., left/right) to reveal further icons for content items. It is understood that all rows of content discussed below are scrollable (e.g., left/right) to reveal further content items belonging to that row and/or category of content items. It is also understood that all rows of content can be sorted or arranged in a way such that content that is more likely to be of interest to the user is arranged earlier in the row than items that are less likely to be of interest to the user.

Returning to FIG. 6B, icon 616-1 corresponding to item W (e.g., provided by provider 1) currently has a focus, as indicated by the dotted box. In some embodiments, when icon 616-1 has a current focus, then content display region 614 displays a representation of the respective content item (e.g., item W). In some embodiments, the content display region only displays representations of content that are displayed in the top-most row of user interface 610. In some embodiments, content display region 614 only displays representations of content that are displayed in the "Up Next" group of content items (as will be discussed in further detail below with respect to FIG. 6D).

In some embodiments, user interface 610 is scrollable to reveal further rows of content items (e.g., up/down scrolling). For example, beneath the "What to Watch" row of content items exists a second row of icons 618 corresponding to "Today's Highlights" content items. In some embodiments, the "What to Watch" row is displayed if the user of device 500 does not have a threshold amount of viewing history. For example, if the user has just set up device 500 for the first time, the user may not have watched enough shows to generate meaningful recommendations. In such embodiments, device 500 presents a list of shows that are generally recommended and/or featured that may be of interest to the user. In some embodiments, the list of shows are selected as the most popular items or trending items.

FIG. 6C illustrates another exemplary embodiment of navigation bar 612 in which selectable icon 613-2 corresponding to movies, selectable icon 613-3 corresponding to television shows, and selectable icon 613-7 corresponding to children's content have been replaced with a single selectable icon 613-8 labeled "browse," which includes movies, television, and children's content. In some embodiments, selection of selectable icon 613-8 displays a further submenu in which the user selects movies, television shows, or children's content. In some embodiments, navigation bar 612 is scrollable (e.g., left/right) to reveal further selectable options for displaying other user interfaces. It is understood that the order of the selectable options in navigation bar 612 are not limited to only those described in FIG. 6B or FIG. 6C and can be in any other order.

FIG. 6D illustrates user interface 610 corresponding to the "watch now" page in which there is enough viewing history to generate recommendations for the user. In some embodiments, the icons 616 corresponding to the "what to watch" row are pushed down or otherwise displaced by an "Up Next" row. In some embodiments, icons 615-1 to 615-4 correspond to the "Up Next" row. In some embodiments, the content displayed in the "Up Next" row are items related to particular items that the user has previously interacted with. For example, if a user has previously watched an episode of a particular television series, then the next episode of the television series is displayed in the "Up Next" row. In some embodiments, if a user has partially watched a content item, the content item is added to the "Up Next" queue to allow the user to continue watching from the previous playback position. In some embodiments, the user can add certain content items to the "Up Next" row by selecting a selectable icon on the content items' product page or otherwise selecting an option to add a particular content item to the "Up Next" row (e.g., to bookmark an item for future viewing). In some embodiments, as discussed above, only items in the "Up Next" row are featured in the content display region 614 when the respective icon has a focus. In some embodiments, selection of any of icons 615 causes display or playback of the selected content or display of a canonical page for the selected content. In some embodiments, selection of only icons 615 causes playback of the selected content. For example, other content corresponding to other rows that are not the "Up Next" optionally are not selectable to cause playback of the selected content. Instead, selection of the non-"Up Next" content items only cause display of a canonical page, from where the user can select a selectable option to cause playback.

FIG. 6E illustrates an exemplary user interface 610 in which the top-most row of content items includes a "Featured" sub-group and an "Up Next" sub-group. In some embodiments, the "Up Next" sub-group is similar to the "Up Next" row discussed above with respect to FIG. 6D. In some embodiments, the "Featured" sub-group includes content items that have been selected to be featured to the user. In some embodiments, the content in the "Featured" sub-group are similar to those in the "What to Watch" row discussed above with respect to FIG. 6B. In some embodiments, content display region 614 does not display any content because icon 616-1 corresponding to item W is not in the "Up Next" sub-group. In some embodiments, selection of any of icons 616 or 615 causes display or playback of the selected content or display of a canonical page for the selected content. In some embodiments, only the items in the "Up Next" sub-group are selectable to cause playback of the selected content item and items in the "Featured" sub-group are selectable to display a canonical page for the selected content item (e.g., a user interface specific to the specific content item), even though both sub-groups are displayed in the top region of user interface 610.

In some embodiments, the exemplary embodiments described above with respect to the first and/or top-most row of content items in user interface 610 can also be displayed in a widget for the unified media browsing application (e.g., a widget outside of the unified media browsing application). For example, in some embodiments, a device has a widget user interface which includes one or more widgets associated with one or more applications installed on the device. In some embodiments, the widget user interface includes a unified media browsing application widget. In some embodiments, the unified media browsing application widget displays one or more content items, selection of which causes playback of the respective content item. In some embodiments, the one or more content items displayed are displayed in one or more sets or groups. In some embodiments, the sets or groups can be any of "Up Next" content items, "Featured" content items, and/or "What to Watch" content items. In some embodiments, other groups of content items are possible.

In FIG. 6F, user input 603 corresponding to a downward navigation (e.g., downward swipe) on touch sensitive surface 451 of remote 590 is received. In some embodiments, in response to the downward navigation, user interface 610 navigates downwards and reveals further rows of content items.

In some embodiments, after navigating downwards, the top row of user interface 610 includes icons 616 corresponding to the "What to Watch" row discussed above with respect to FIG. 6D. In some embodiments, user interface 610 includes a "Today's Highlights" row with icons 618-1 and 618-2. In some embodiments, icons 618-1 and 618-2 are accompanied with additional information. In some embodiments, the additional information includes the title, genre, and a description of the content item. In some embodiments, the content in the "Today's Highlights" row are selected to be featured for the particular day (e.g., topical content). In other words, the content in the "Today's Highlights" row is refreshed every day to feature new and fresh content. In some embodiments, selection of any of icons 618 causes display or playback of the selected content or display of a canonical page for the selected content.

In some embodiments, user interface 610 includes a "For You" row of icons 617. In some embodiments, the content in the "For You" row are personalized and recommended for the user based on the user's past viewing history. For example, if a user has watched a particular television show or movie, device 500 (e.g., or a server) can determine that the user may be interested in one or more other television shows or movies that are related to the particular television show. In some embodiments, device 500 (e.g., or a server) can determine that the user may be interested in one or more other television shows or movies based on the aggregation of the user's viewing histories. For example, if a user's viewing history indicates that the user is interested in romantic comedies (e.g., based on the amount of content watched by the user in the romantic comedy genre), the "For You" row can include the most popular romantic comedies that the user has not yet watched. In some embodiments, selection of any of icons 617 causes display or playback of the selected content or display of a canonical page for the selected content.

FIG. 6G illustrates user interface 610 that is displayed in response to a user input 603 performing a further downward navigation to reveal further rows of content. In some embodiments, user interface 610 includes a "trending" row of icons 619. In some embodiments, the "trending" row includes content that is currently popular. In some embodiments, the "trending" row includes content that have been the most viewed in a short time frame (e.g., the last 24 hours, the last 48 hours, etc.). In some embodiments, selection of any of icons 619 causes display or playback of the selected content or display of a canonical page for the selected content. In some embodiments, user interface 610 includes a "New & Noteworthy" row of icons 620. In some embodiments, the "New & Noteworthy" row includes newly released content or content that is related to current events or news. In some embodiments, selection of any of icons 620 causes display or playback of the selected content or display of a canonical page for the selected content.

FIG. 6H illustrates user interface 610 that is displayed in response to a user input 603 performing a further downward navigation to reveal further rows of content. In some embodiments, user interface 610 includes a "sports" row of icons 621-1. In some embodiments, the "sports" row includes sports-related content. In some embodiments, the "sports" row includes streaming content or otherwise on-demand content. In some embodiments, the "sports" row includes live broadcast items, such as live broadcast sports games. In some embodiments, the content in the "sports" row is personalized for the user. For example, based on the user's viewing history, if a user has shown a preference for a particular sport (e.g., basketball, football, soccer, etc.), then the content in the "sports" row will show a preference for the particular sport (e.g., only show that sport, prioritize that sport over other sports, etc.). In some embodiments, the "sports" row will not show content for sports that the user has not shown any interest in. In some embodiments, if the user has shown a preference for a particular team or a particular player, then the sports row can display content that shows a preference for the particular team or player (e.g., show content that includes the particular team or player first or otherwise earlier in the row than other content). In some embodiments, selection of any of icons 621 causes display or playback of the selected content or display of a canonical page for the selected content.

In some embodiments, user interface 610 includes a "channels" row of icons 622-1 to 622-5. In some embodiments, the "channel" row of one or more channels. In some embodiments, the channels provide one or more content items that are playable from within the unified media browsing application. In some embodiments, accessing content from a respective channels requires a subscription to the respective channel. In some embodiments, selection of any of icons 621 causes display of a canonical page for the selected channel. In some embodiments, the canonical page for the selected channel provides options browsing for and viewing content available on the selected channel.

FIG. 6I illustrates user interface 610 that is displayed in response to a user input 603 performing a further downward navigation to reveal further rows of content. In some embodiments, user interface 610 includes a "Featured on Channel B" row of content 623. In some embodiments, the "Featured on Channel B" row includes content that is available from Channel B (e.g., from a particular provider). In some embodiments, the "Featured on Channel B" row is only displayed if the user has a subscription Channel B. In some embodiments, the content items that are available from the above-discussed channels are compatible with being played from within the unified media browsing application. In other words, in response to a request to play a content item from one of the channels (e.g., by selecting a content item from user interface 610 or by selecting the content item from a user interface specific to the channel or content item) will cause playback of the selected content item within the unified media browsing application (e.g., as opposed to using a separate application that is launched). In some embodiments, user interface 610 includes a channels promotion banner 624. In some embodiments, channels promotion banner 624 includes one or more banners promoting a subscription to different channels. In some embodiments, only the channels that the user is not already a subscriber of are displayed in the promotional banner. In some embodiments, banner 624 includes selectable options that are selectable to initiate a process to subscribe to the selected channel. In some embodiments, selection of the selectable option causes display of a product page for the selected channel, from where the user can subscribe to the channel.

FIG. 6J illustrates user interface 610 that is displayed in response to a user input 603 performing a further downward navigation to reveal further rows of content. In some embodiments, user interface 610 includes a "Romantic Comedies" row of content 625. In some embodiments, the "Romantic Comedies" row includes content in the romantic comedies genre. In some embodiments, any number of rows of genres can be displayed (e.g., 1 row, 2 rows, 3 rows, etc.). In some embodiments, the rows that are displayed are based on the user's viewing history. For example, if a user has shown a preference for romantic comedies, action & adventure, and thrillers, then three rows are be displayed (e.g., one for romantic comedies, one for action and adventure, and one for thrillers). In some embodiments, if the user has shown interest in more than three genres (or some predetermined number), then device 500 selects the three genres that the user has shown the most interest in and displays rows for those genres. In some embodiments, if the user does not have enough viewing history to determine the user's favorite genres, then the top three popular genres is selected and displayed. In some embodiments, selection of any of icons 625 causes display or playback of the selected content or display of a canonical page for the selected content.

In some embodiments, user interface 610 includes a "New Release Movies" row of icons 626-1. In some embodiments, the "New Release Movies" row includes movie content that were recently released. For example, the movies can be released in the past month, past 3 months, past 6 months, etc. In some embodiments, selection of any of icons 626 causes display or playback of the selected content or display of a canonical page for the selected content.

FIG. 6K illustrates user interface 610 that is displayed in response to a user input 603 performing a further downward navigation to reveal further rows of content. In some embodiments, user interface 610 includes a "Because You Watched Content 1" row of icons 627. In some embodiments, the "Because You Watched Content 1" row includes content that is recommended to the user because of the user's past history of viewing content 1. In some embodiments, the content that is recommended is selected based on the interest of other users who have enjoyed content 1. For example, if many users that have rated content 1 well have also rated item MM (e.g., corresponding to icon 627-1) well, then device 500 optionally includes item MM in the "Because You Watched Content 1" row. In some embodiments, other recommendation algorithms are possible. In some embodiments, selection of any of icons 627 causes display or playback of the selected content or display of a canonical page for the selected content.

In some embodiments, user interface 610 includes a "Spotlight on Person 1" row of icons 628. In some embodiments, the "Spotlight on Person 1" row includes content that features or includes person 1. In some embodiments, the "Spotlight on Person 1" row is displayed due to the user's past history of viewing content that included person 1. In some embodiments, the "Spotlight" row is displayed due to the user's past history which shows an interest in person 1 (e.g., watching a threshold number of shows that included person 1, the user's history of viewing information about person 1, etc.). In some embodiments, selection of any of icons 628 causes display or playback of the selected content or display of a canonical page for the selected content.

FIG. 6L illustrates user interface 610 that is displayed in response to a user input 603 performing a further downward navigation to reveal further rows of content. In some embodiments, user interface 610 includes an "Editor's Choice" row of icons 629. In some embodiments, similarly to the "Today's Highlights" row discussed above with respect to FIG. 6F, the "Editor's Choice" row includes additional information alongside of icons 629-1 and 629-2. In some embodiments, the additional information includes the content items' title, genre and description. In some embodiments, the content in the "Editor's Choice" row has been editorially selected as recommended for the user (e.g., optionally selected by a human editor, rather than a machine algorithm). In some embodiments, selection of any of icons 629 causes display or playback of the selected content or display of a canonical page for the selected content.

In some embodiments, user interface 610 includes a news row of icons 630. In some embodiments, the news row includes news content. In some embodiments, the "news" row includes streaming content or otherwise on-demand content. In some embodiments, the "news" row includes live broadcast items, such as live broadcast news segments. In some embodiments, the content in the "news" row is personalized for the user. For example, based on the user's viewing history, if a user has shown a preference for a particular news channel, then the content in the "news" row will show a preference for the particular news channel. In some embodiments, selection of any of icons 630 causes display or playback of the selected content or display of a canonical page for the selected content.

FIG. 6M illustrates user interface 610 that is displayed in response to a user input 603 performing a further downward navigation to reveal further rows of content. In some embodiments, user interface 610 includes a "Recently Watched" row of icons 631. In some embodiments, the "Recently Watched" row includes content that the user has recently watched (e.g., within the last day, the last week, the last month, etc.). In some embodiments, selection of any of icons 630 causes display or playback of the selected content or display of a canonical page for the selected content.

In some embodiments, user interface 610 includes a "More to Explore" row of icons 632. In some embodiments, the "More to Explore" row provides different ways in which the user can continue browsing for content. For example, selection of icon 632-1 corresponding to the "Browse all Channels" option causes display of a canonical page of all the available channels. Similarly, selection of icon 632-2 causes display of a canonical page with content that is the most often rented. In some embodiments, selection of icon 632-3 causes display of a user interface with content that is available in 4K (e.g., or any other video quality). In some embodiments, the "More to Explore" row includes other icons corresponding to other ways to further browse content.

FIG. 6N illustrates user interface 610 that is displayed in response to a user input 603 performing a further downward navigation to reveal further rows of content. In some embodiments, user interface 610 includes a provider sign-in banner 632. In some embodiments, provider sign-in banner 632 is similar to provider sign-in banner 1229, discussed in further detail below with respect to FIG. 12I.

It is understood that although the above discussion of the plurality of rows of content included in user 610 is described as having a particular order, the rows of content discussed above is not limited to only the order described and can be displayed in any order.

In FIG. 6O, a user input 603 is detected selecting the "menu" button on remote 590. In some embodiments, in response to the selection of the "menu" button, navigation bar 612 is displayed and focus is moved to navigation bar 612. In some embodiments, in response to displaying navigation bar 612, the user can navigate to different user interfaces corresponding to the different selectable options on navigation bar 612. In some embodiments, other inputs or gesture are possible to invoke navigation bar 612. In some embodiments, the user is able to reach navigation bar 612 by navigating back to the very top of user interface 610, as shown in FIG. 6P. In some embodiments, if the user performs an upwards navigation (e.g., upward swipe) while icon 615-1 has a focus (e.g., or any icon in the "Up Next" row), then focus is moved upwards to navigation bar 612.

In FIG. 6Q, a user input 603 corresponding to a rightward navigation (e.g., rightward swipe on touch sensitive surface 451) is detected. In response to user input 603, focus is moved to selectable option 613-3 corresponding to television shows. In some embodiments, in response to the focus moving to selectable option 613-3, display 514 displays user interface 640 without requiring the user to click or otherwise select selectable option 613-3. In some embodiments, the navigation to selectable option 613-3 is based on the length and/or intensity of the user input. For example, a long or fast swipe causes the focus to move by more than one unit (e.g., 2 units, 3 units, etc. based on the gesture). In some embodiments, if the focus moves by a plurality of units, then display 514 will forgo displaying the intervening user interfaces and display only the user interface corresponding to the selectable option that has a focus (e.g., display 514 will not display the user interface corresponding to movies because the movies option was effectively "skipped").

As shown in FIG. 6Q, user interface 640 corresponds to television shows. In some embodiments, user interface 640 includes a feature items banner at or near the top of user interface 640. In some embodiments, the featured items banner includes one or more banners promoting featured items. In some embodiments, the featured items include featured content or featured applications. In some embodiments, user interface 640 includes rows of television content, similarly to the rows of content displayed on user interface 610 discussed above with respect to FIG. 6B-6P. In other words, rows of content described with respect to user interface 610 can be included in user interface 640 (e.g., and in the user interfaces associated with the "movies" page, "sports" page, and "kids" page) and the rows of content described with respect to user interface 640 can be included in user interface 610 (e.g., and in the user interfaces associated with the "movies" page, "sports" page, and "kids" page). For example, in some embodiments, user interface 640 includes a "Browse by Genre" row with icons 642-1 to 642-3. In some embodiments, the "Browse by Genre" row includes icons corresponding to different genre of items. For example, icon 642-1 corresponding to the romantic comedies genre is selectable to display a user interface for browsing romantic comedy television content, icon 642-2 corresponding to the action and adventure genre is selectable to display a user interface for browsing action and adventure television content, and icon 642-3 corresponding to the thriller genre is selectable to display a user interface for browsing thriller television content.

Figure 6R:
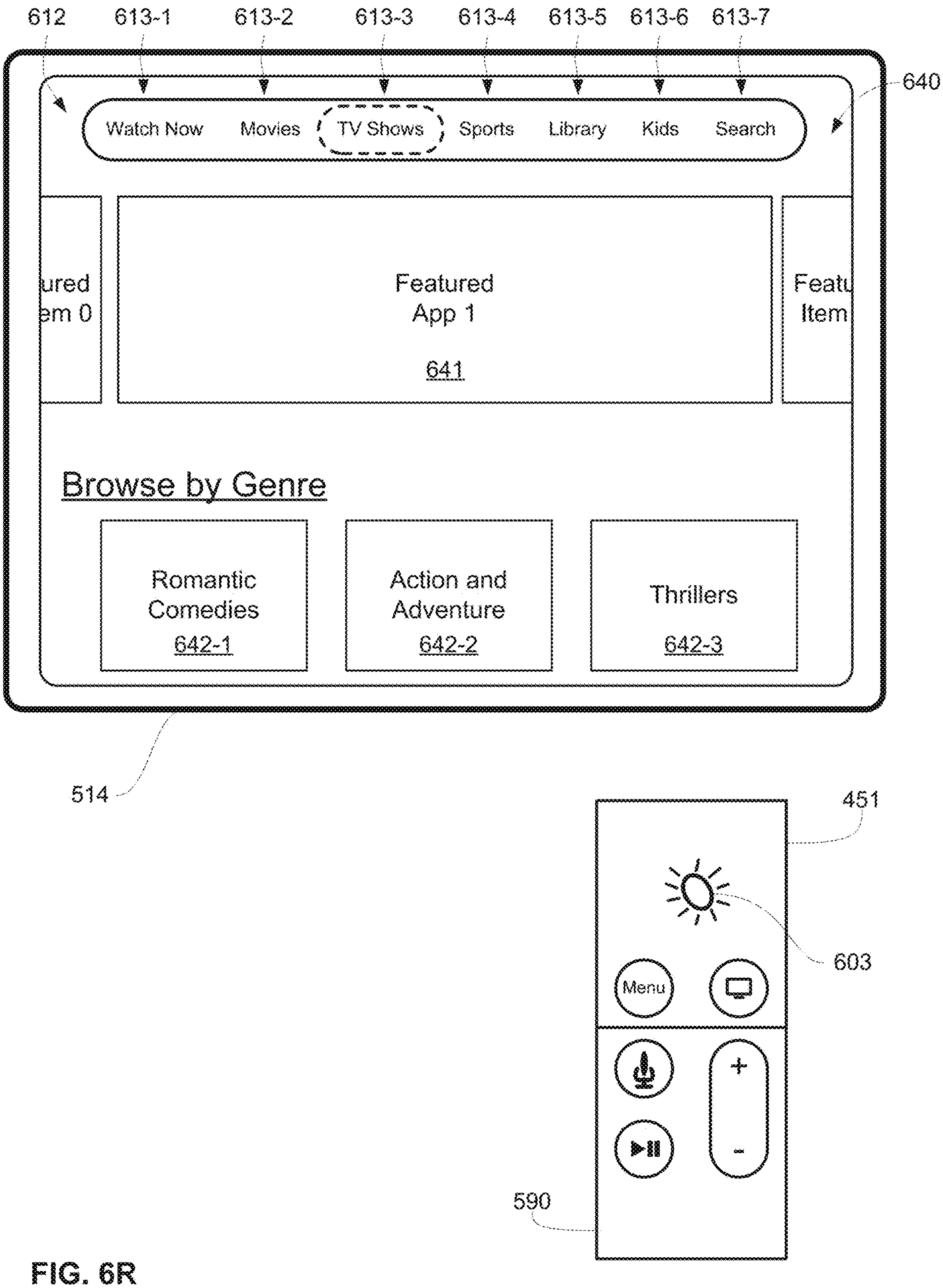
Figure 6S:
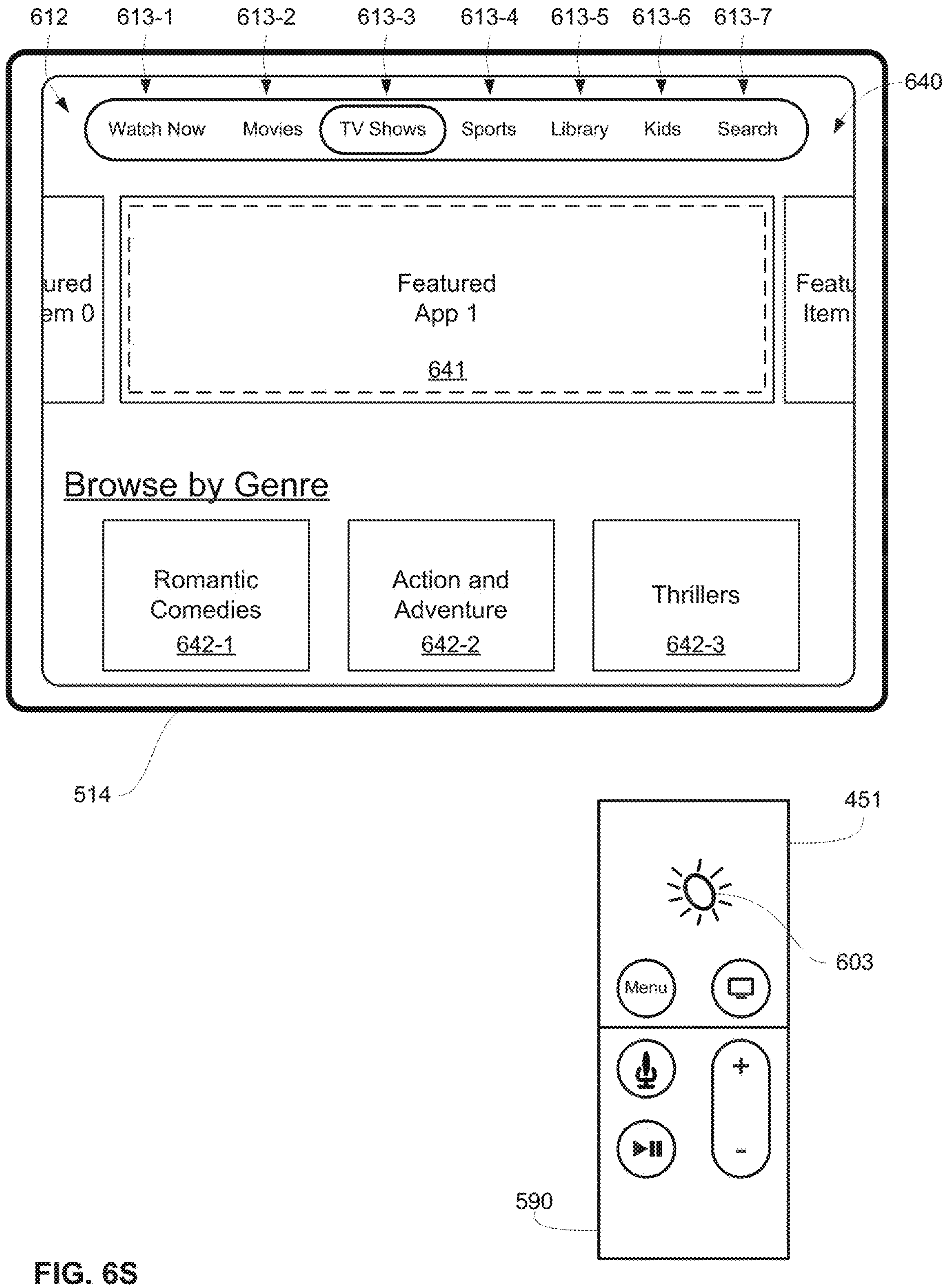
Figure 6T:
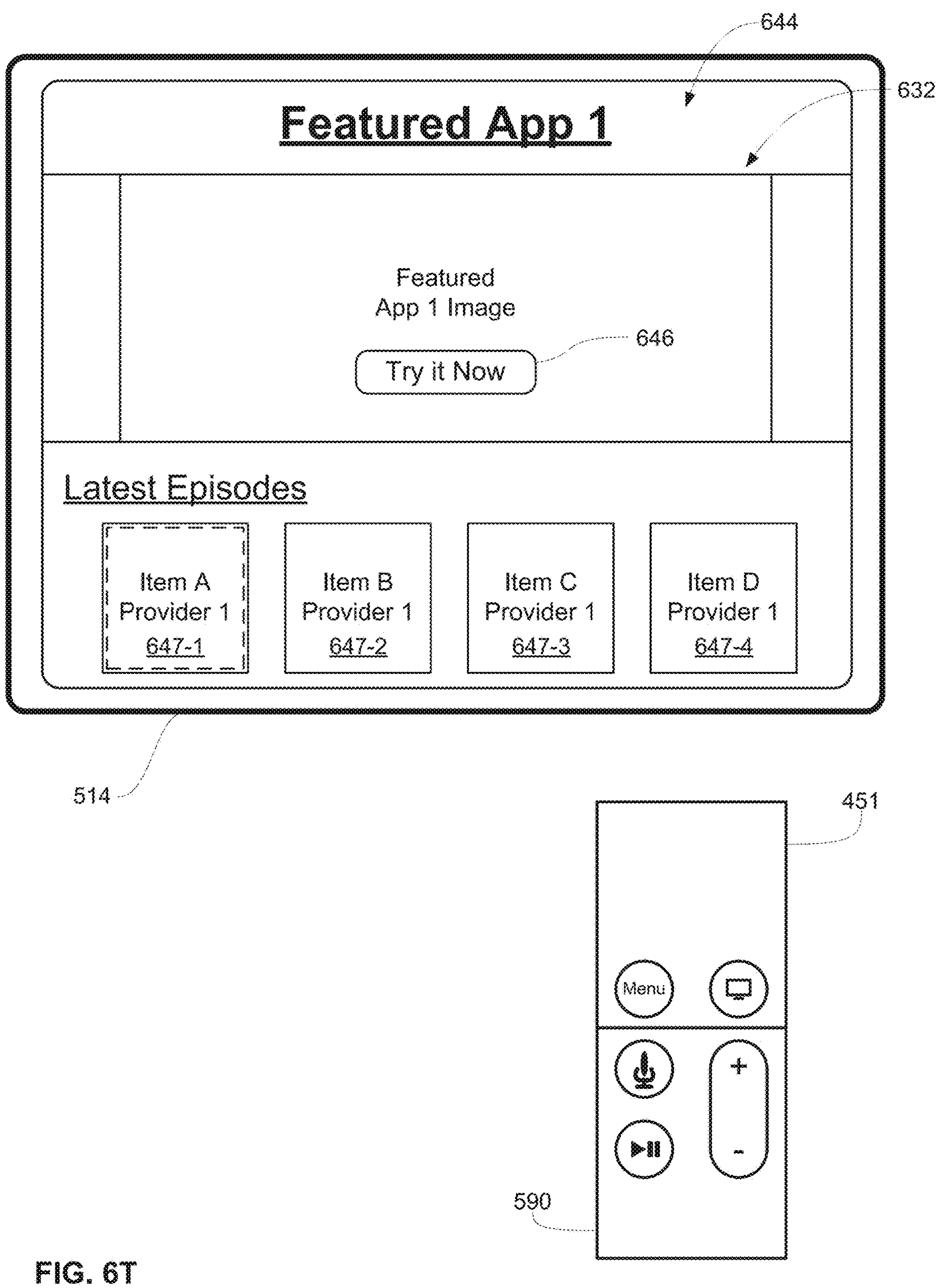

In some embodiments, as shown in FIG. 6R, user input 603 corresponding to a selection input (e.g., a click input on touch-sensitive surface 451) is received selecting selectable option 613-3 (e.g., while selectable option 613-3 has a focus). In some embodiments, in response to user input 603, the focus moves from navigation bar 612 to within user interface 640, as shown in FIG. 6S. In some embodiments, as discussed above, when the focus move from navigation bar 612 to the elements within the user interface, the focus moves to the first item in the user interface (e.g., in this case, banner 641 corresponding to featured app 1). In some embodiments, the focus skips the featured banner and moves to the first content item in the rows of content items (e.g., in this case, icon 642-1).

In FIG. 6S, user input 603 corresponding to a selection input (e.g., a click input on touch-sensitive surface 451) is received selecting banner 641 corresponding to featured app 1 (e.g., while banner 641 has a focus). In some embodiments, in response to user input 603, device 500 displays user interface 644 corresponding to a product page for featured app 1. In some embodiments, user interface 644 includes a promotional banner 632 promoting featured app 1. In some embodiments, promotional banner 632 includes an image, movie, or other representation of featured app 1. In some embodiments, promotional banner 632 includes selectable option 646 that is selectable to subscribe to the provider associated with featured app 1 or download featured app 1. In some embodiments, user interface 644 includes one or more rows of content that is available via featured app 1. For example, user interface 644 includes a "Latest Episodes" row with icons 647-1 to 647-4 corresponding to the most recently released episodes of television shows that are available in featured app 1. In some embodiments, selection of any of icons 647-1 to 647-4 causes playback of a preview of the corresponding content items. In some embodiments, selection of any of icons 647-1 to 647-4 causes display of a user interface to download featured app 1 (e.g., user interface 648 described below with respect to FIG. 6U).

Figure 6U:
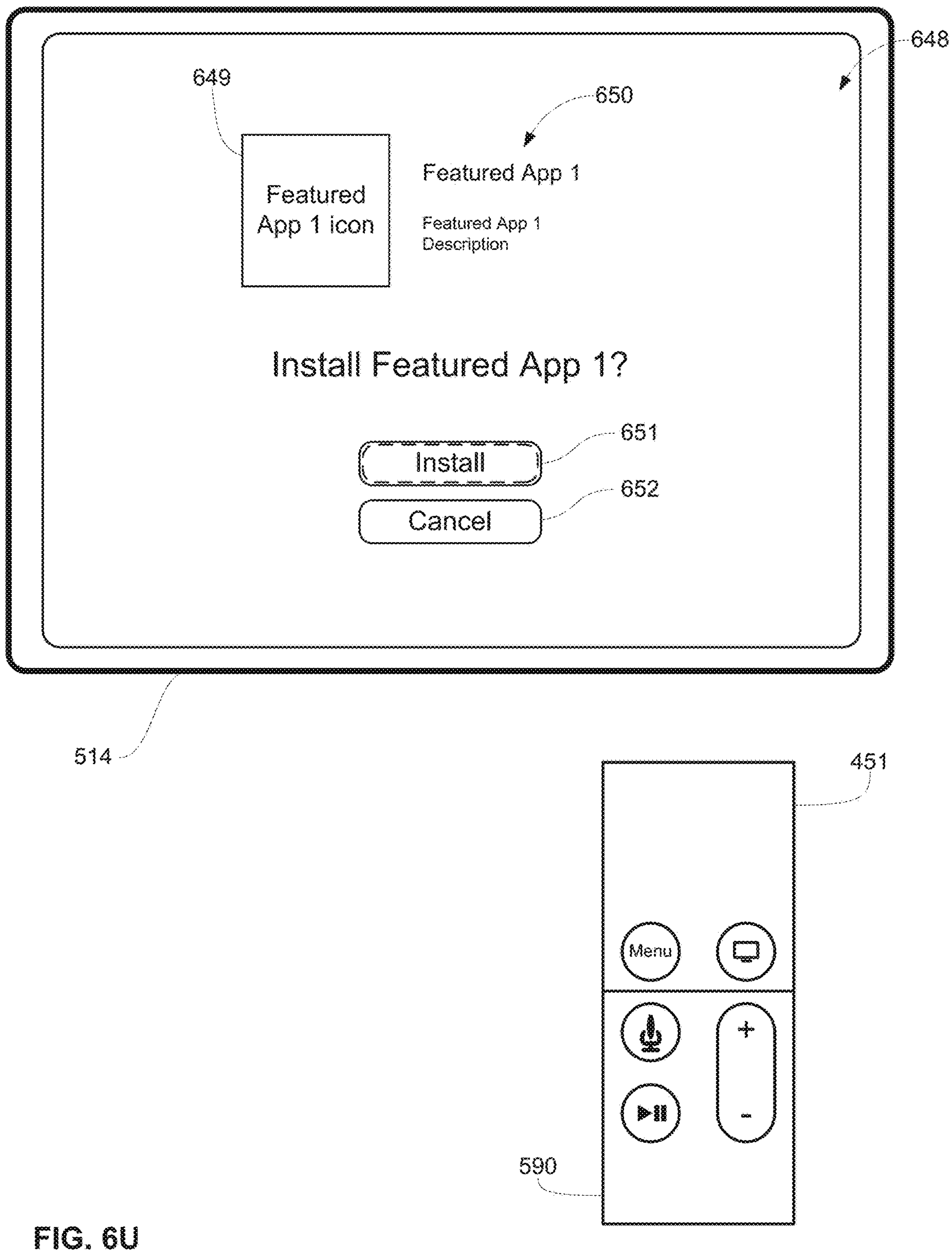

FIG. 6U illustrates an alternative user interface displayed in response to receiving a selection input selecting banner 641 corresponding to featured app 1 (e.g., while banner 641 has a focus). In some embodiments, device 500 displays user interface 648 corresponds to an application installation prompt for downloading featured app 1. In some embodiments, user interface 648 is a user interface of the unified media application. In some embodiments, user interface 648 is a user interface of an application store application (e.g., the unified media application launches an application store application and navigates to the download page for featured app 1). In some embodiments, user interface 648 is a system interface. In some embodiments, user interface 648 includes icon 649 representing featured app 1 (e.g., a still image, a video, a logo, or other representation). In some embodiments, user interface 648 includes information region 650 that displays information about the featured app, such as a title and description. In some embodiments, user interface 648 includes selectable option 651 ("e.g., "Install") and selectable option 652 (e.g., "Cancel"). In some embodiments, selectable option 651 is selectable to initiate a process for downloading featured app 1. In some embodiments, selectable option 652 is selectable to forgo initiating a process to download featured app 1 and returns to the previous user interface that invoked user interface 648 (e.g., user interface 640).

Figure 6V:
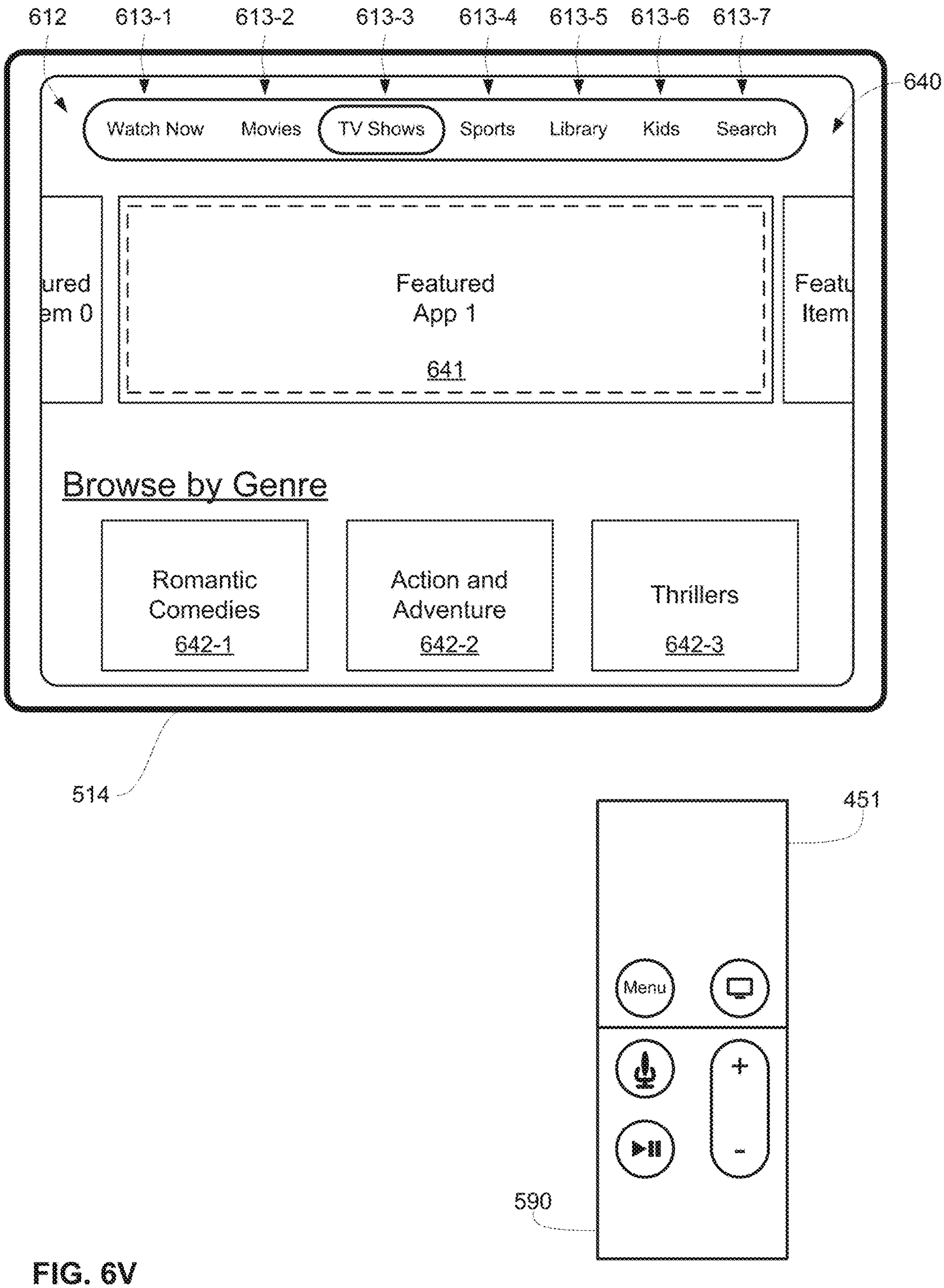
Figure 6W:
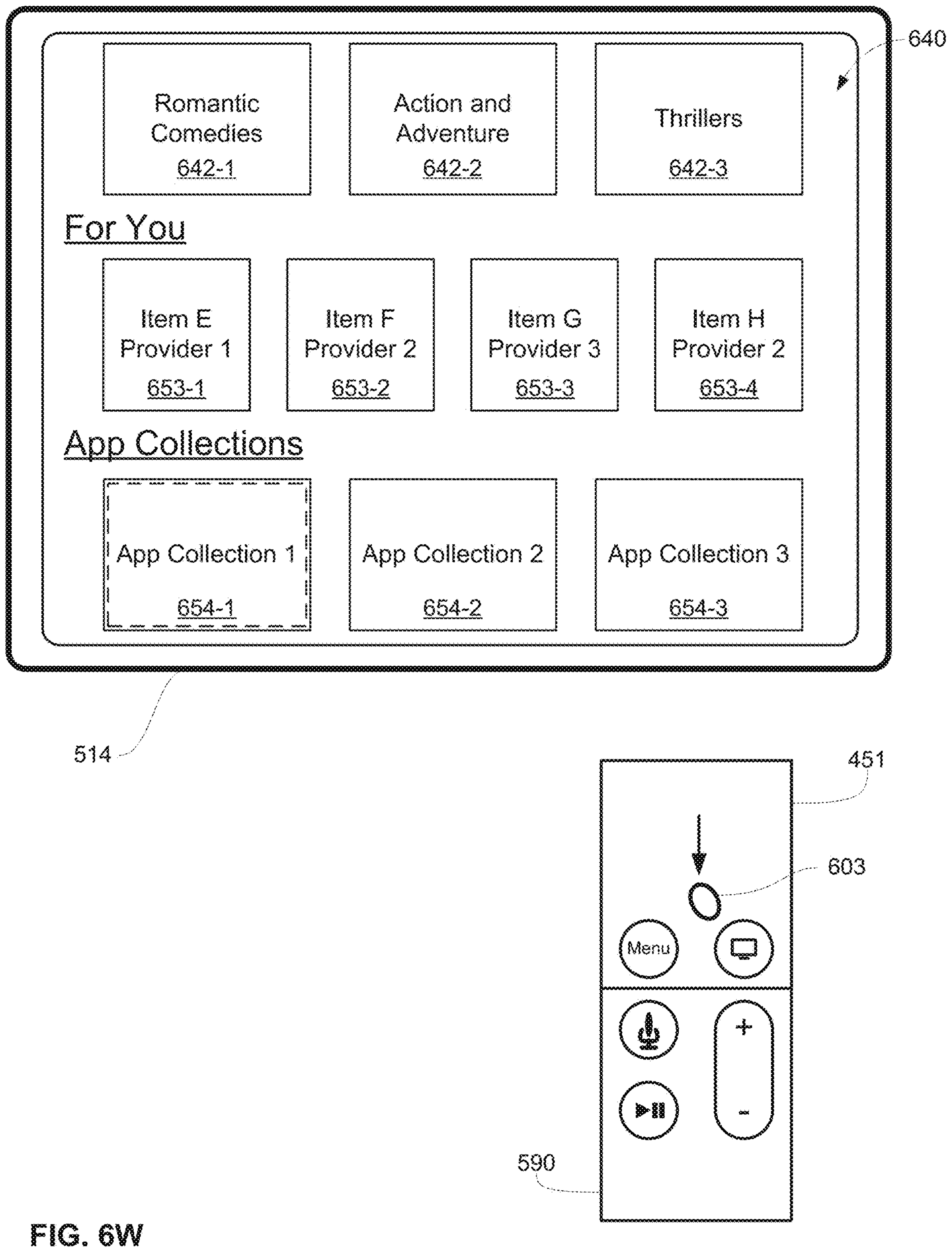

In some embodiments, FIG. 6V illustrates user interface 640 with banner 641 having a current focus. In some embodiments, a user input 603 is received corresponding to a downward navigation to reveal further rows of content (e.g., downward swipe on touch-sensitive surface 451), as shown in FIG. 6W. In some embodiments, user interface 640 includes a "For You" row of icons 653-1 to 653-4. In some embodiments, the "For You" is similar to and/or shares similar features as the "For You" row in user interface 610 discussed above with respect to 6F, but limited to television shows (e.g., because user interface 640 is a user interface dedicated to television shows). In some embodiments, user interface 640 includes "App Collections" row of icons 654-1 to 654-3. In some embodiments, the items in the "app collections" row correspond to certain categories and/or collections of applications. For example, "App Collection 1" can correspond to a collection of "top television apps" selection of icon 654-1 displays a user interface with top television applications to download onto device 500.

Figure 6X:
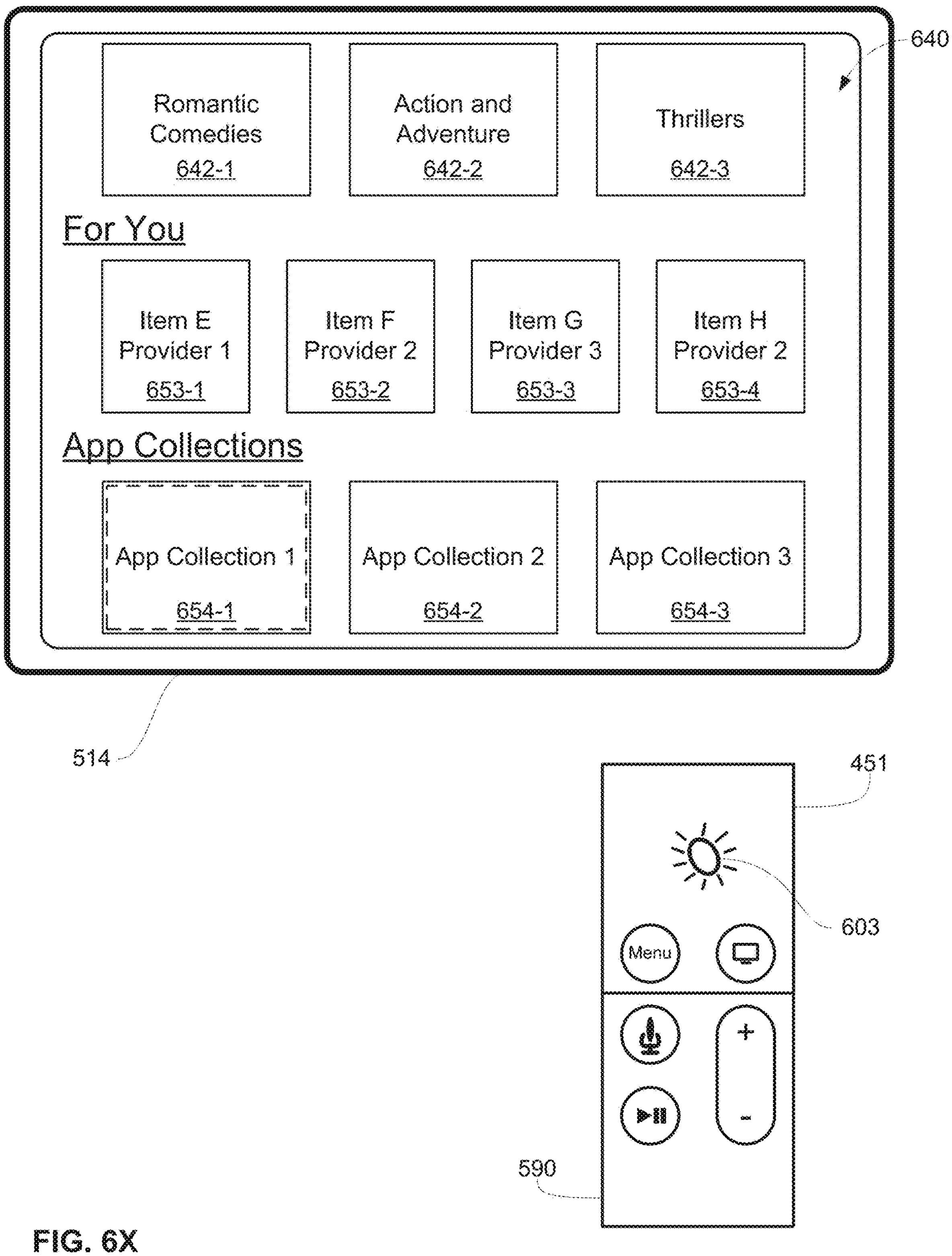
Figure 6Y:
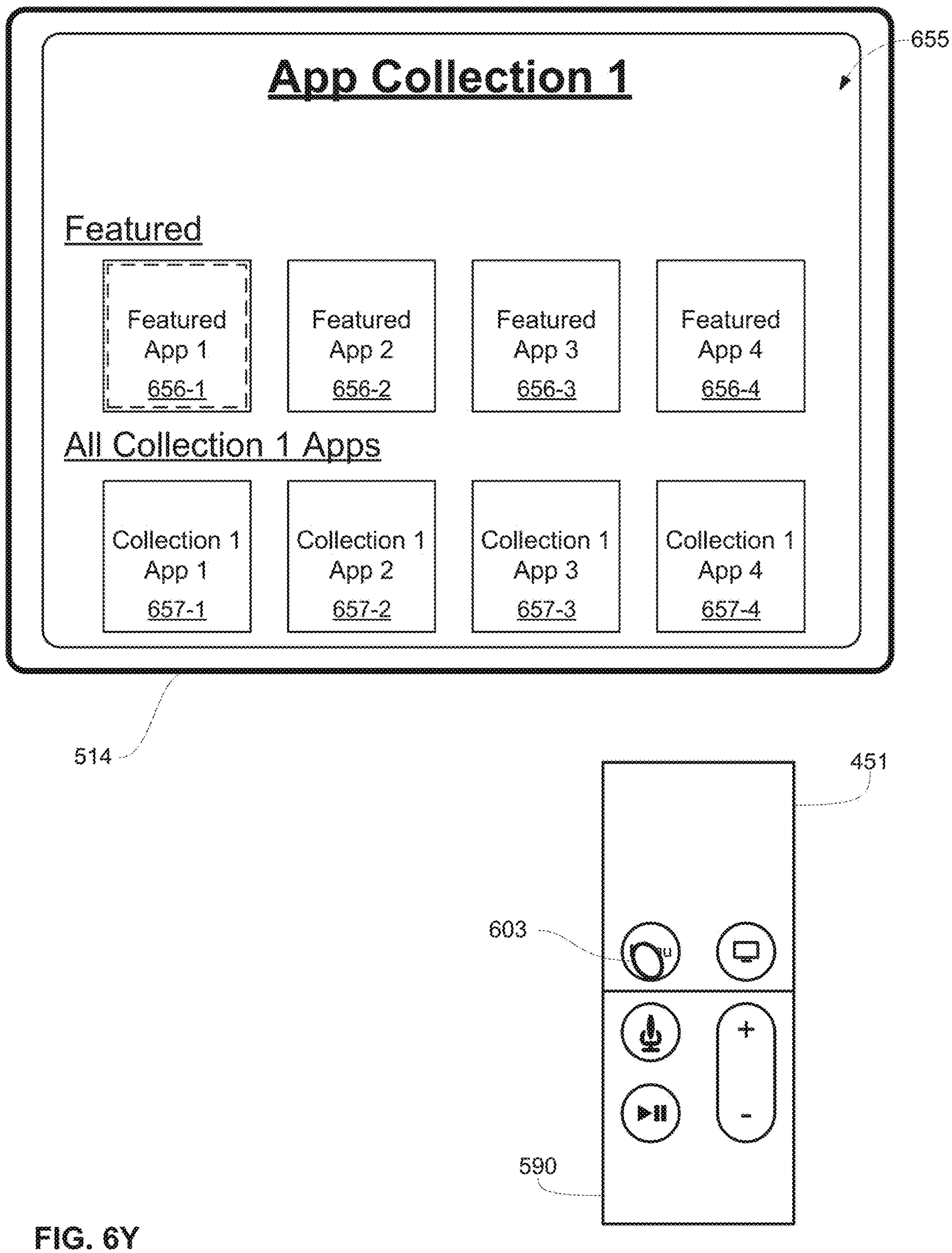

In FIG. 6X, user input 603 corresponding to a selection input (e.g., a click on touch-sensitive surface 451) on icon 654-1. In some embodiments, in response to user input 603, device 500 displays user interface 655 corresponding to application collection 1, as shown in FIG. 6Y. In some embodiments, user interface 655 displays a plurality of rows of a plurality applications included in application collection 1. In some embodiments, user interface 655 includes a "Featured" row corresponding to featured applications in app collection 1. In some embodiments, user interface 655 includes an "all collection 1 apps" section corresponding to all applications in app collection 1. In some embodiments, any of icons 656 and 657 are selectable to display a product page associated with the corresponding application or to display a download page (e.g., similar to user interface 648 discussed above with respect to FIG. 6U) for downloading the corresponding application.

Figure 6Z:
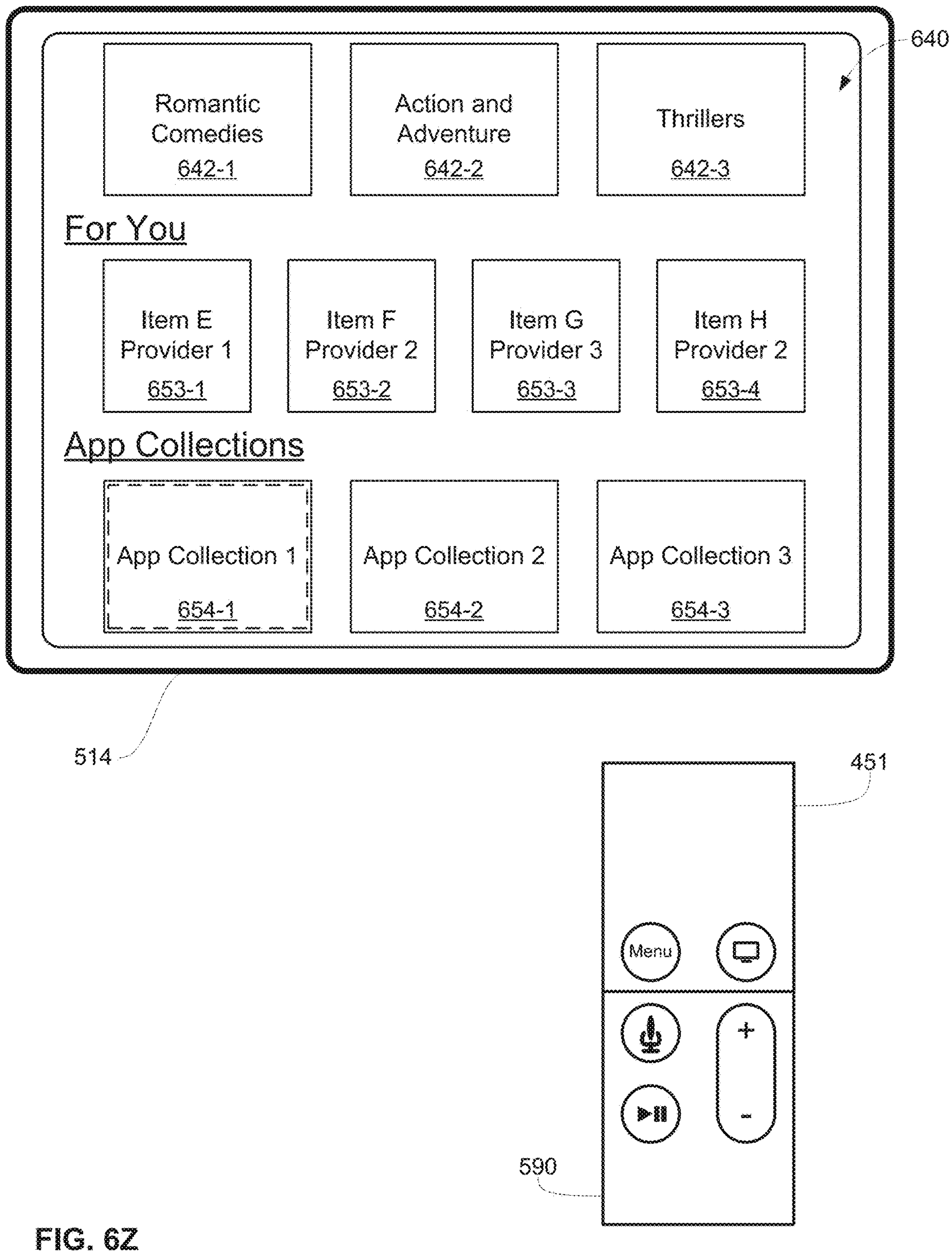
Figure 6A:
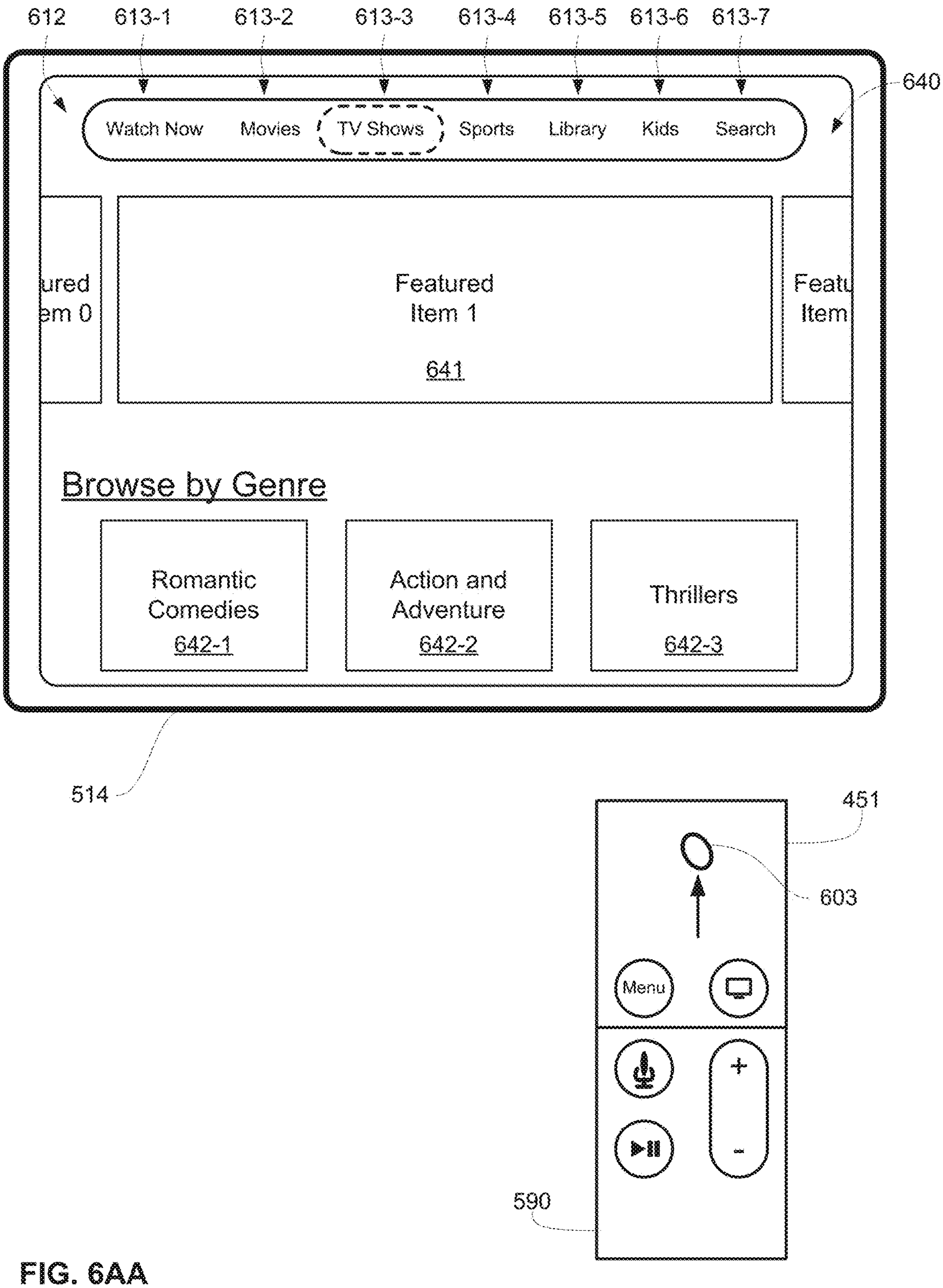
Figure 6B:
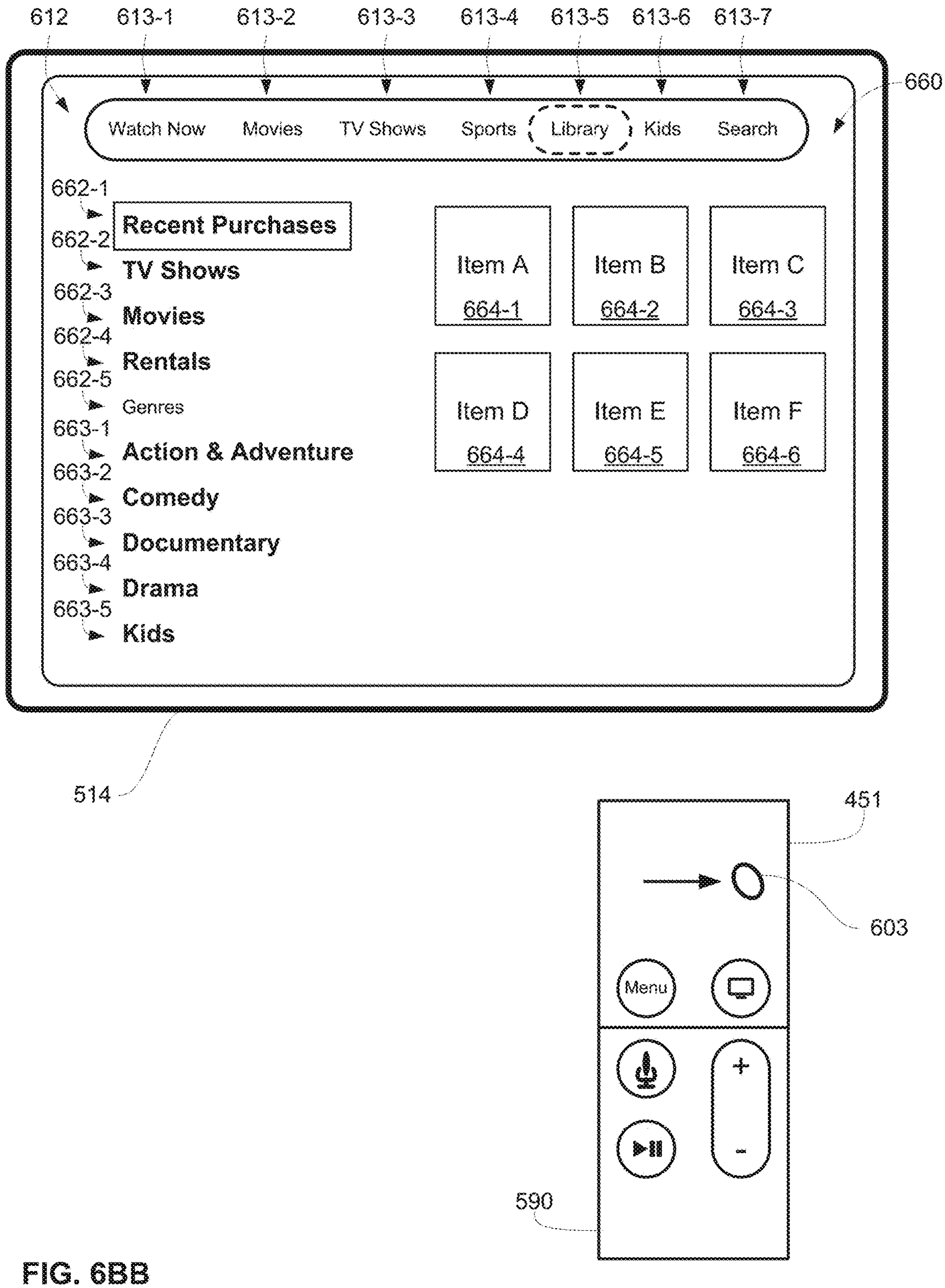
Figure 6C:
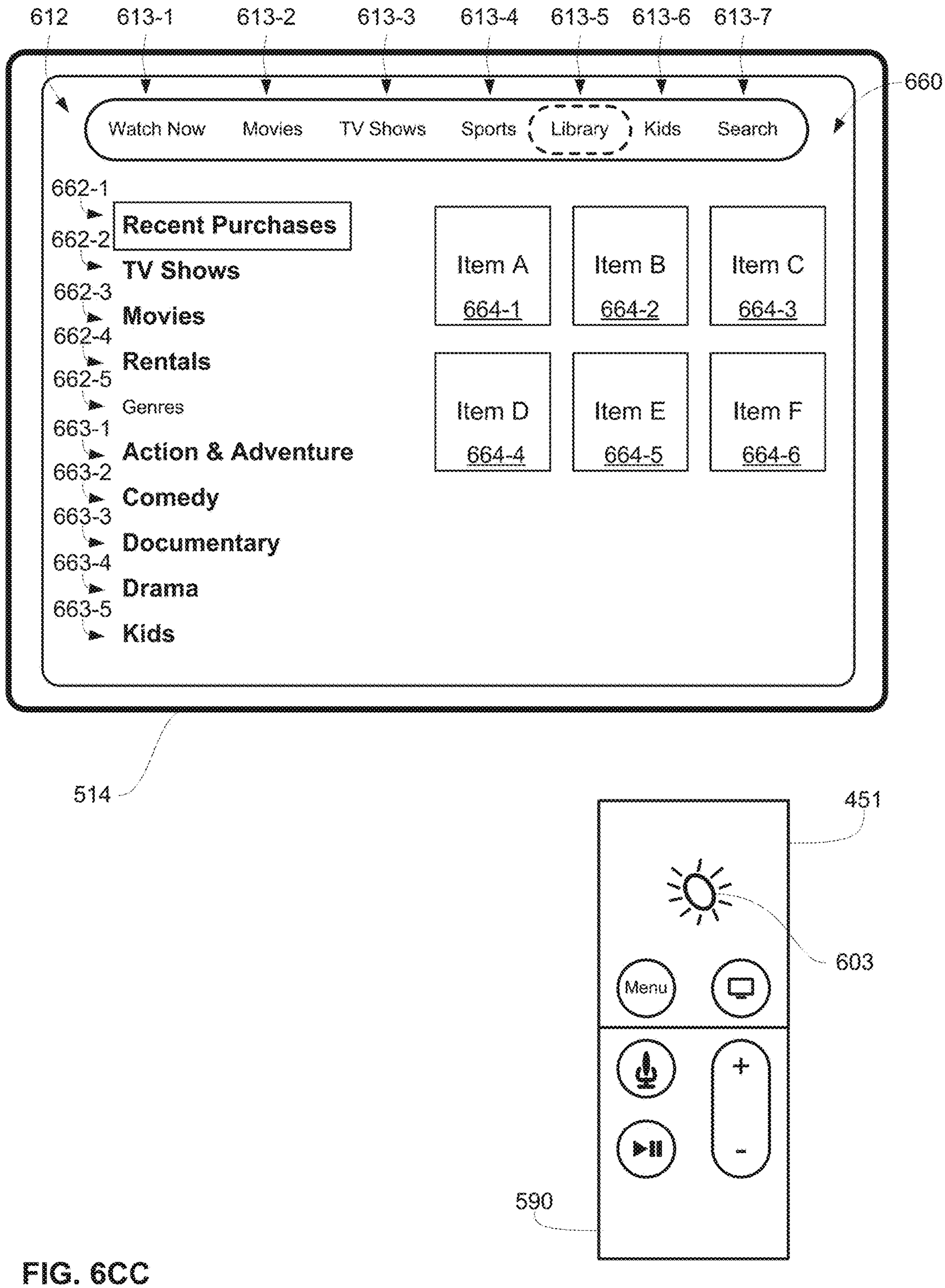
Figure 6D:
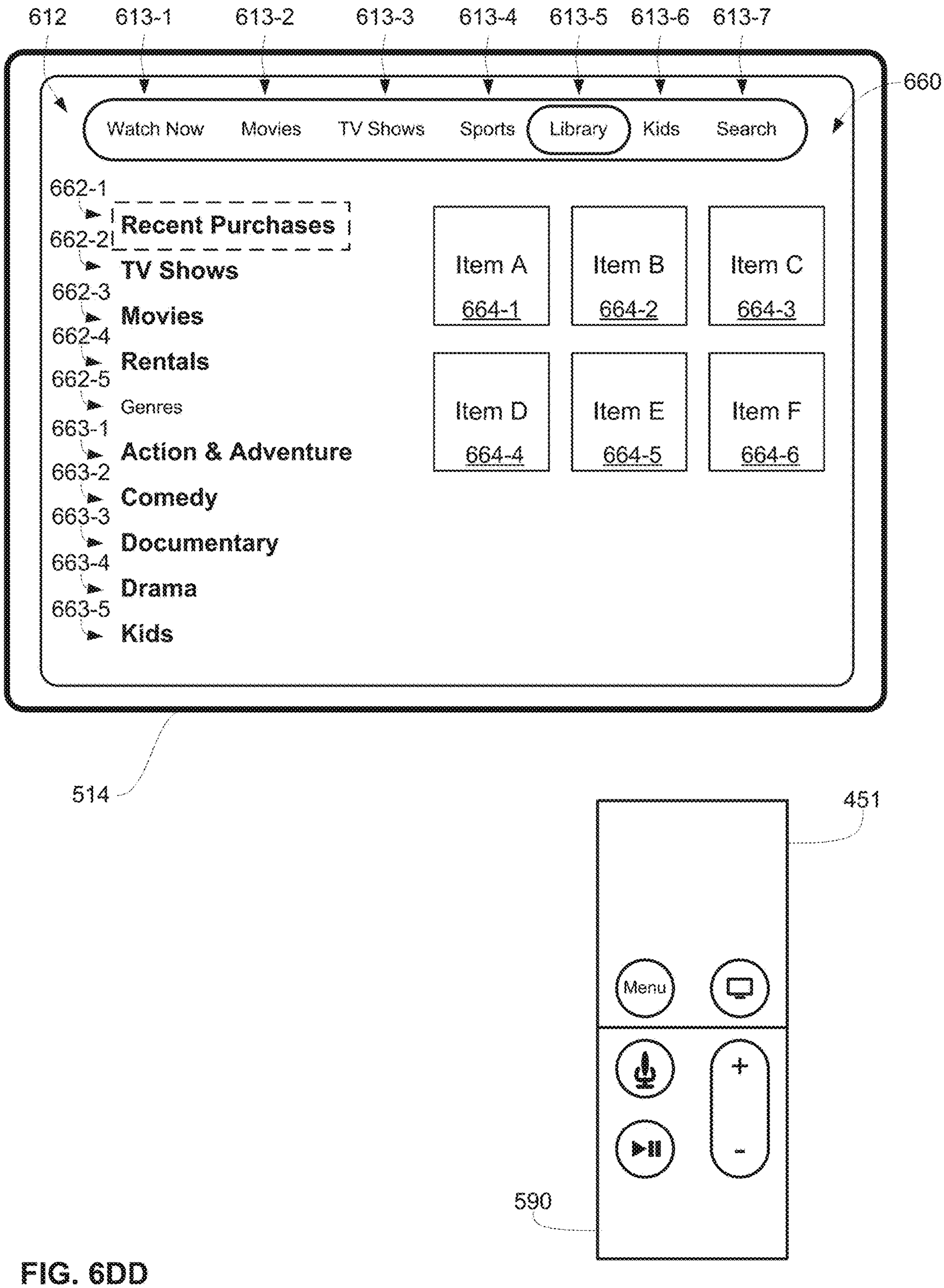
Figure 6E:
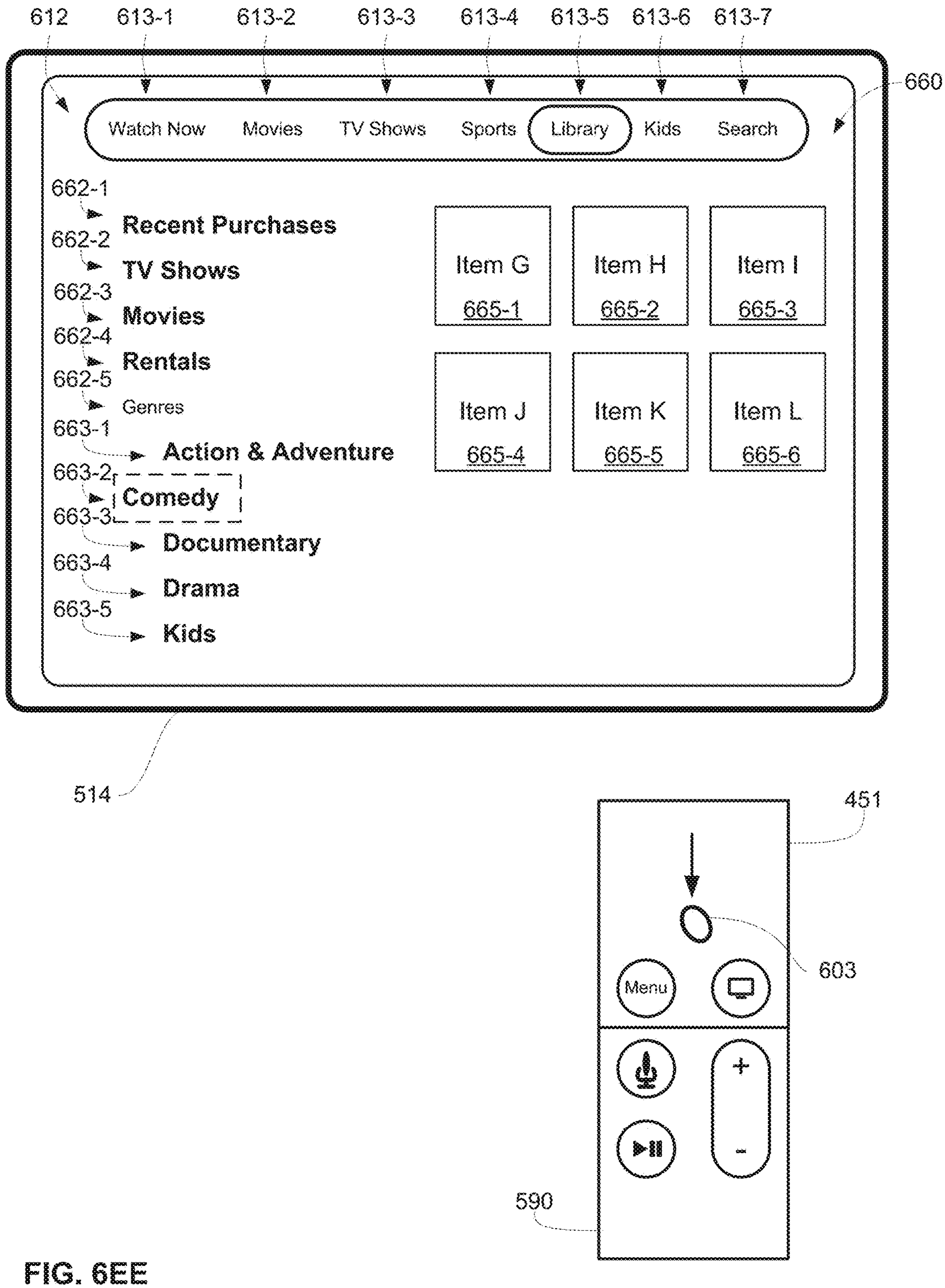
Figure 6F:
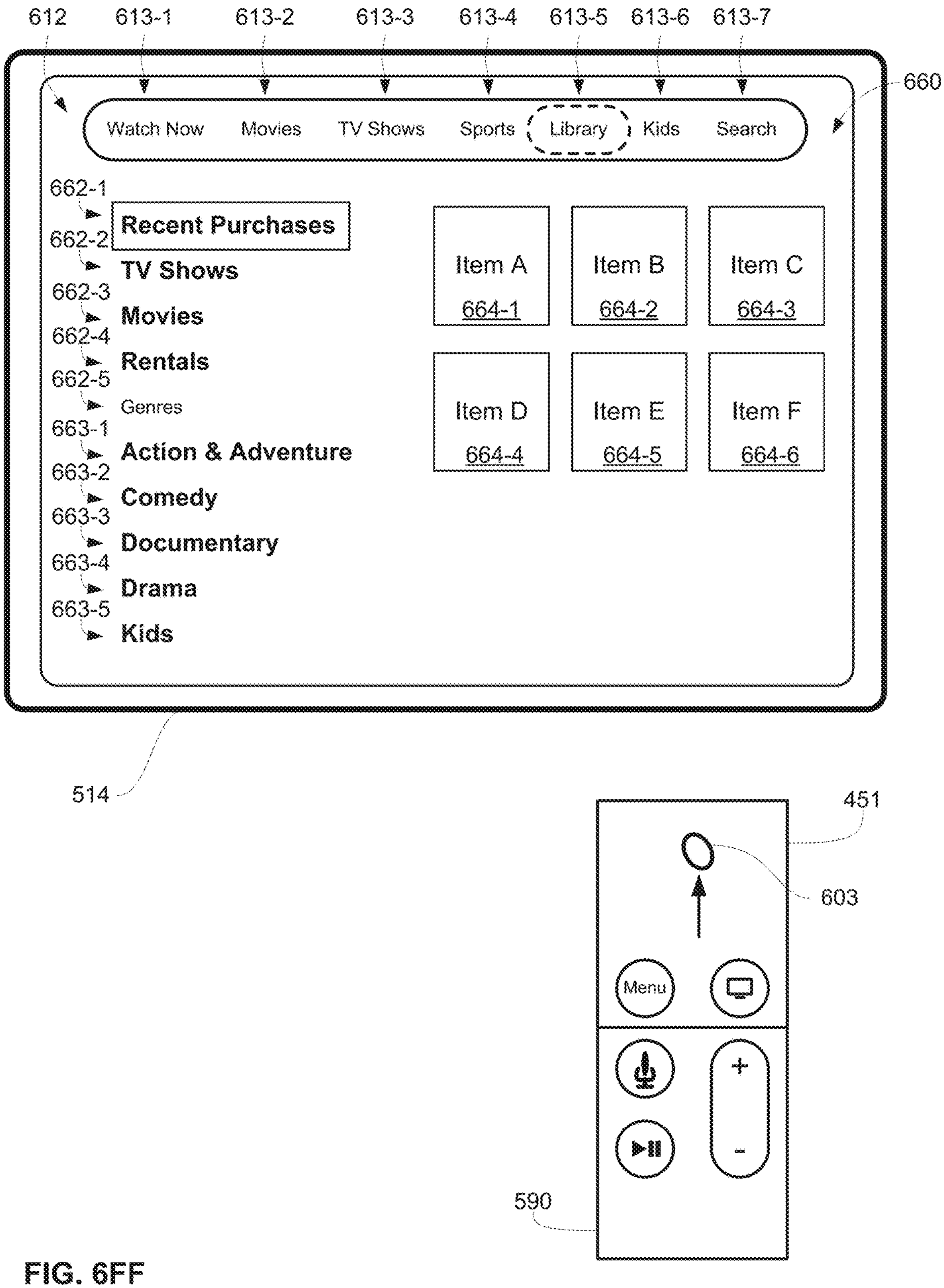
Figure 6G:
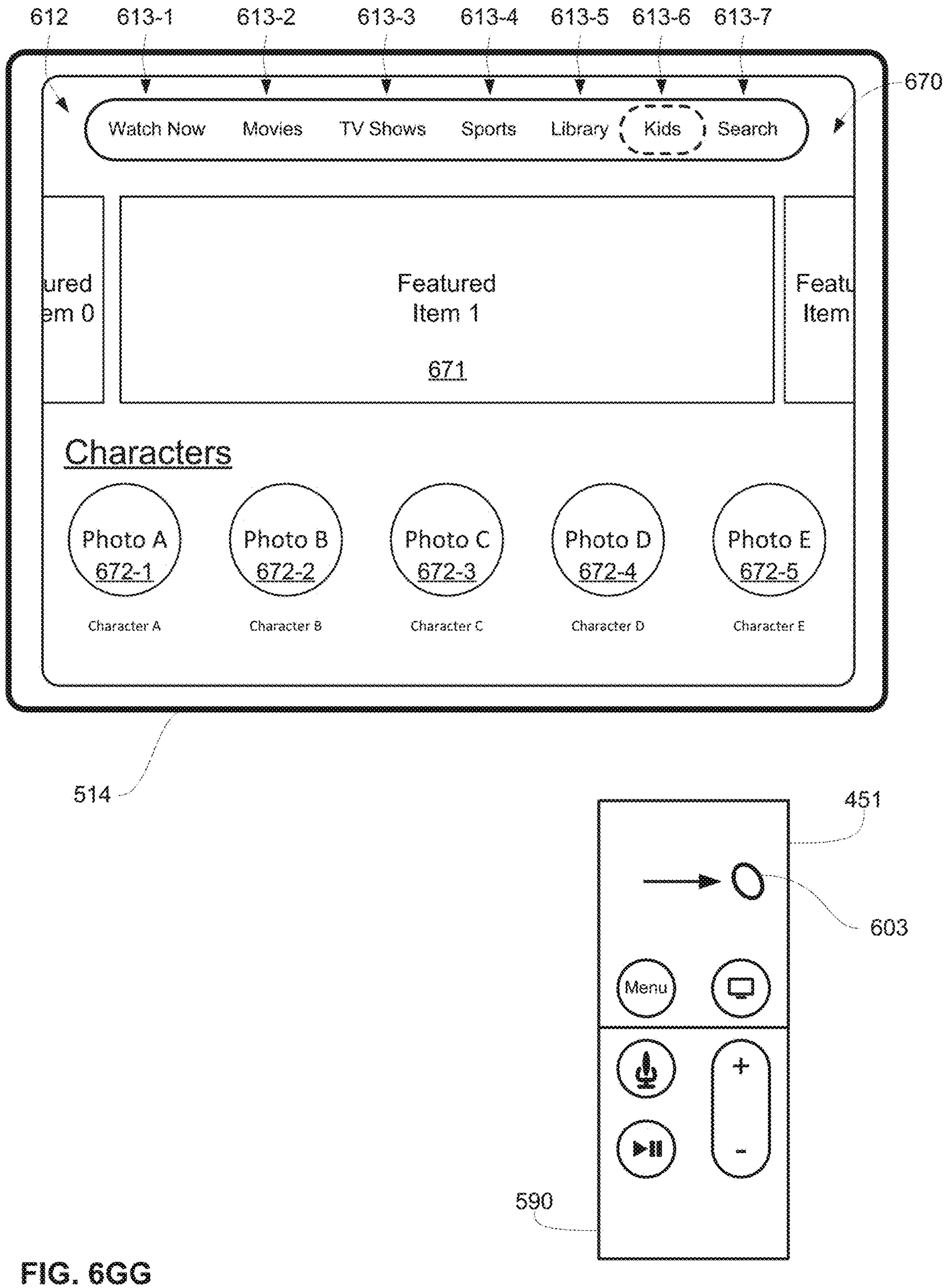
Figure 6H:
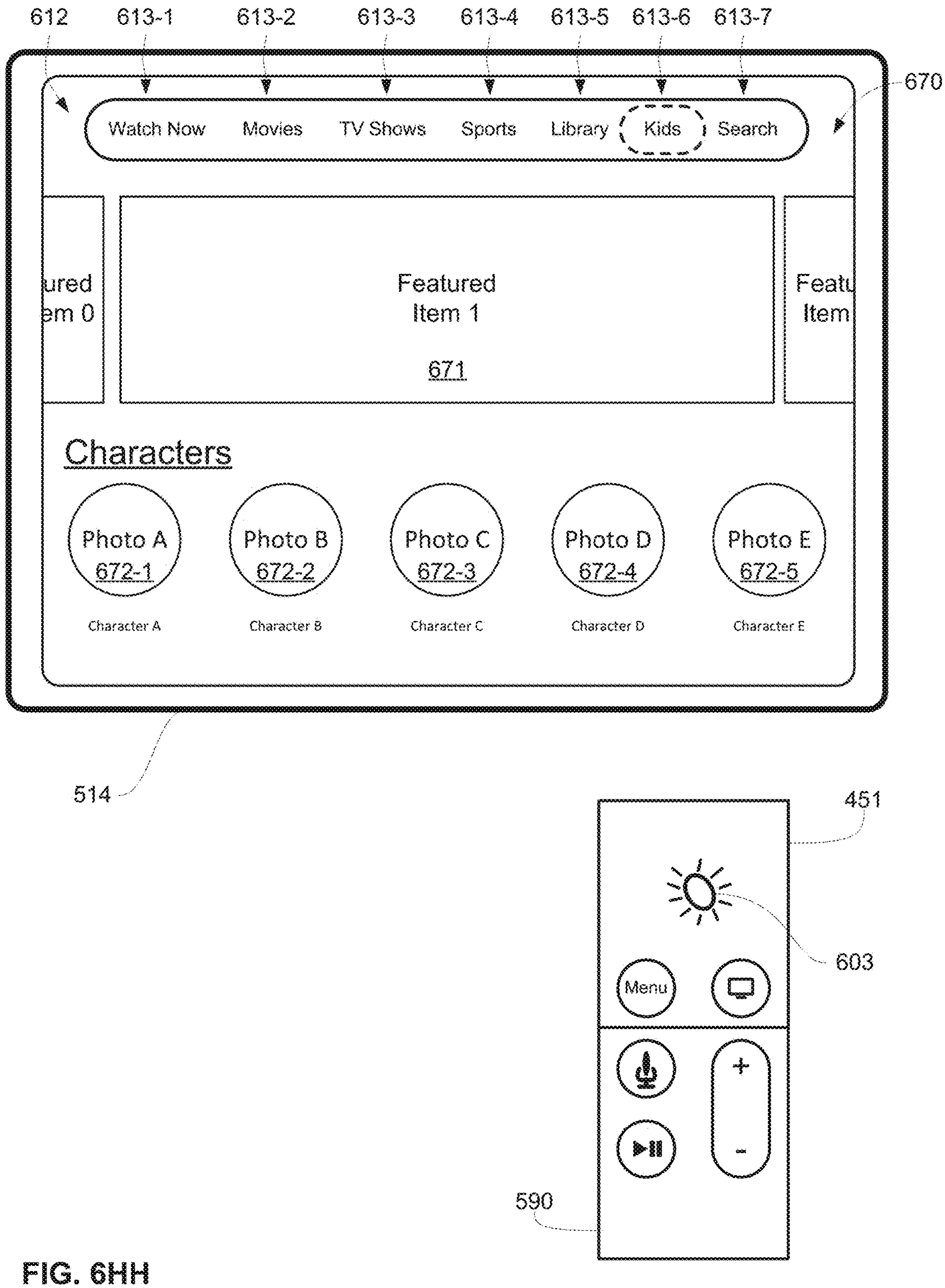
Figure 6I:
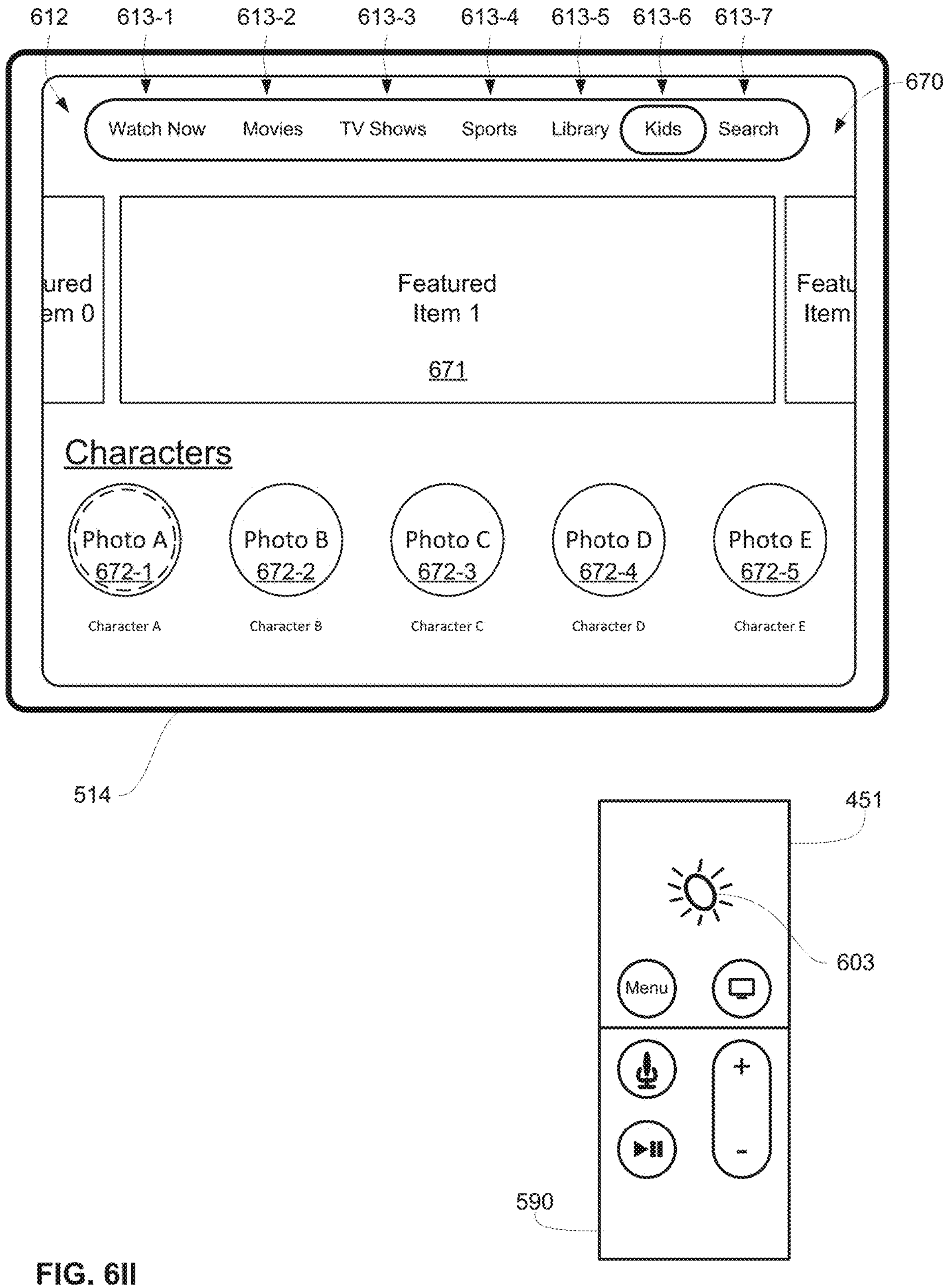
Figure 6J:
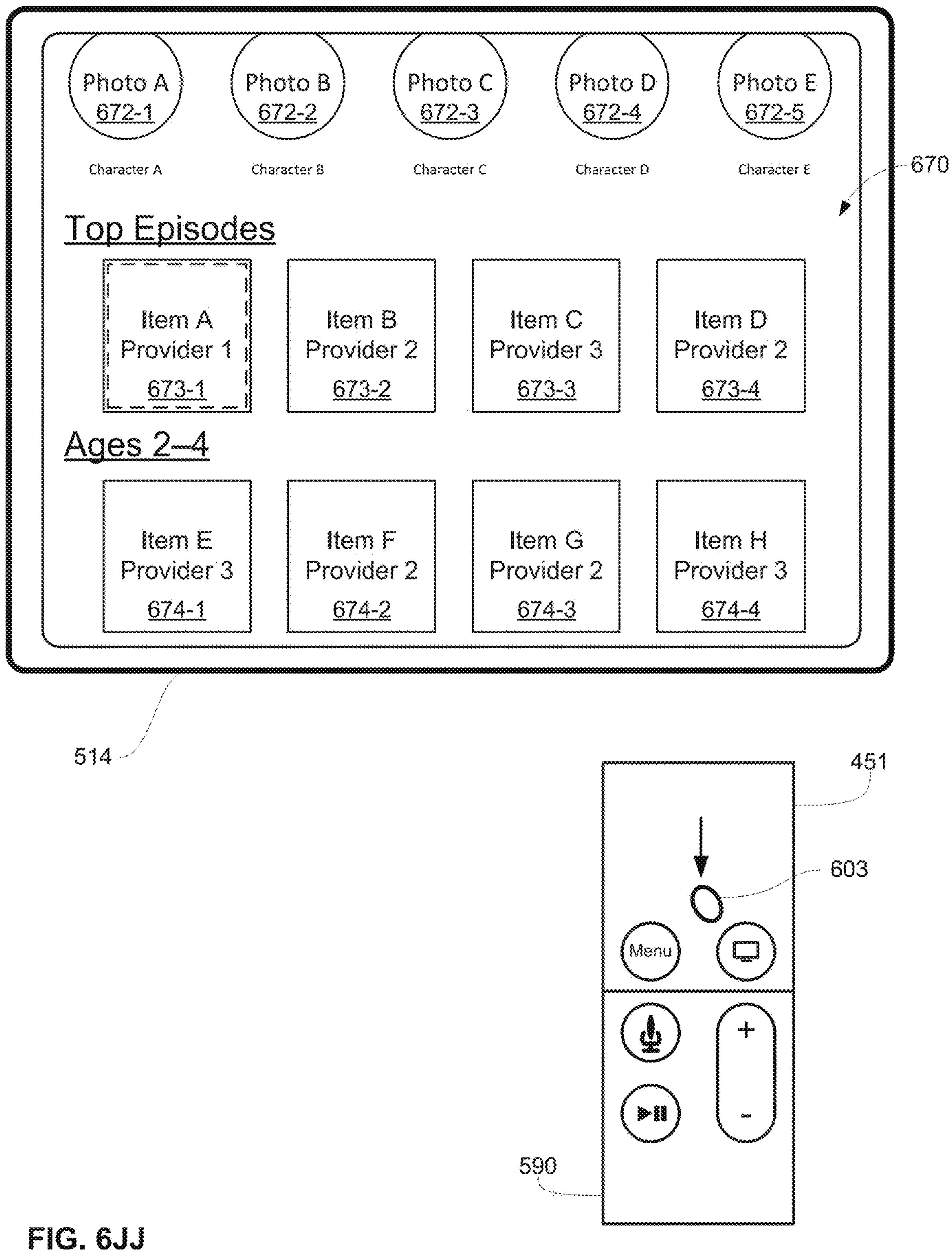
Figure 6K:
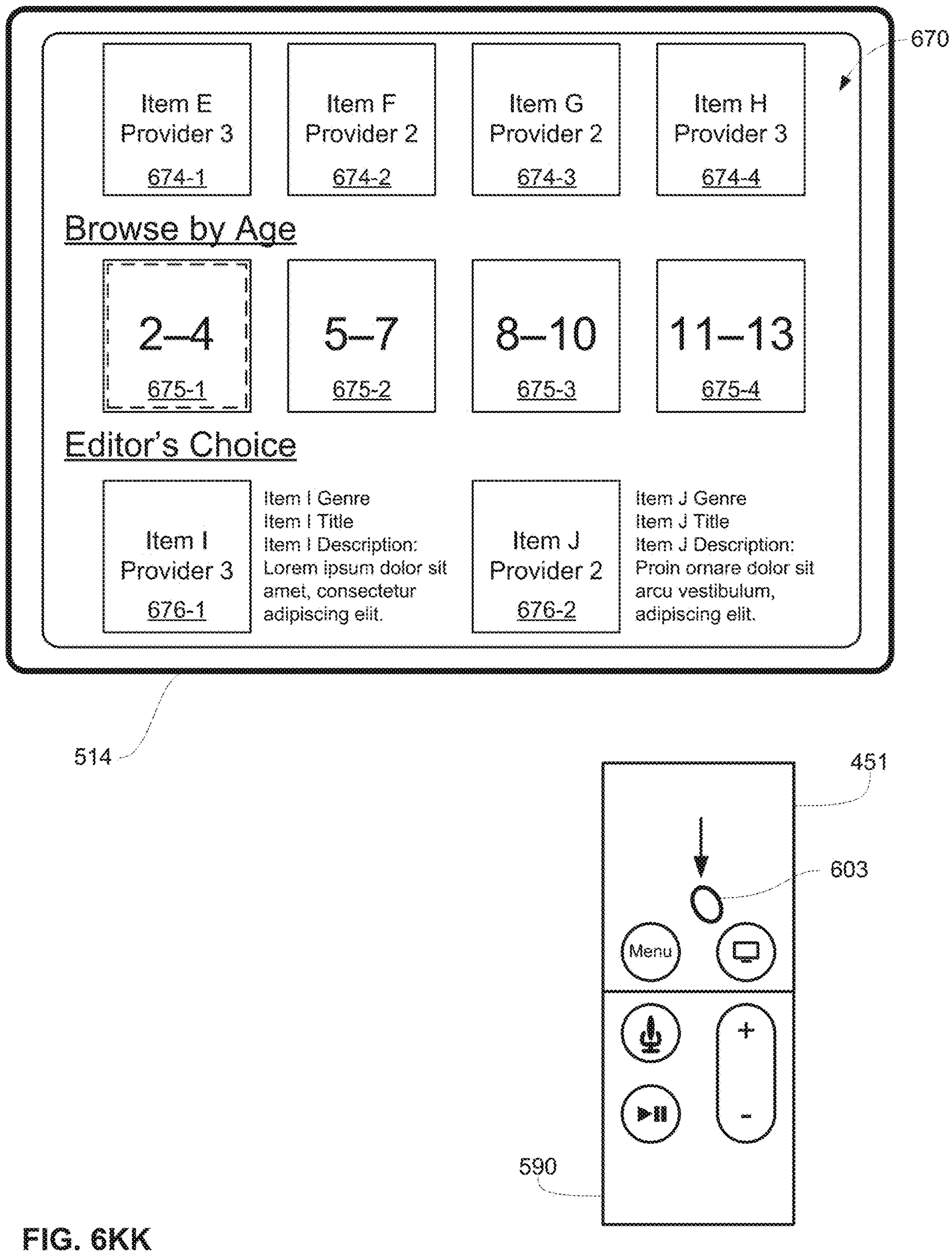
Figure 6L:
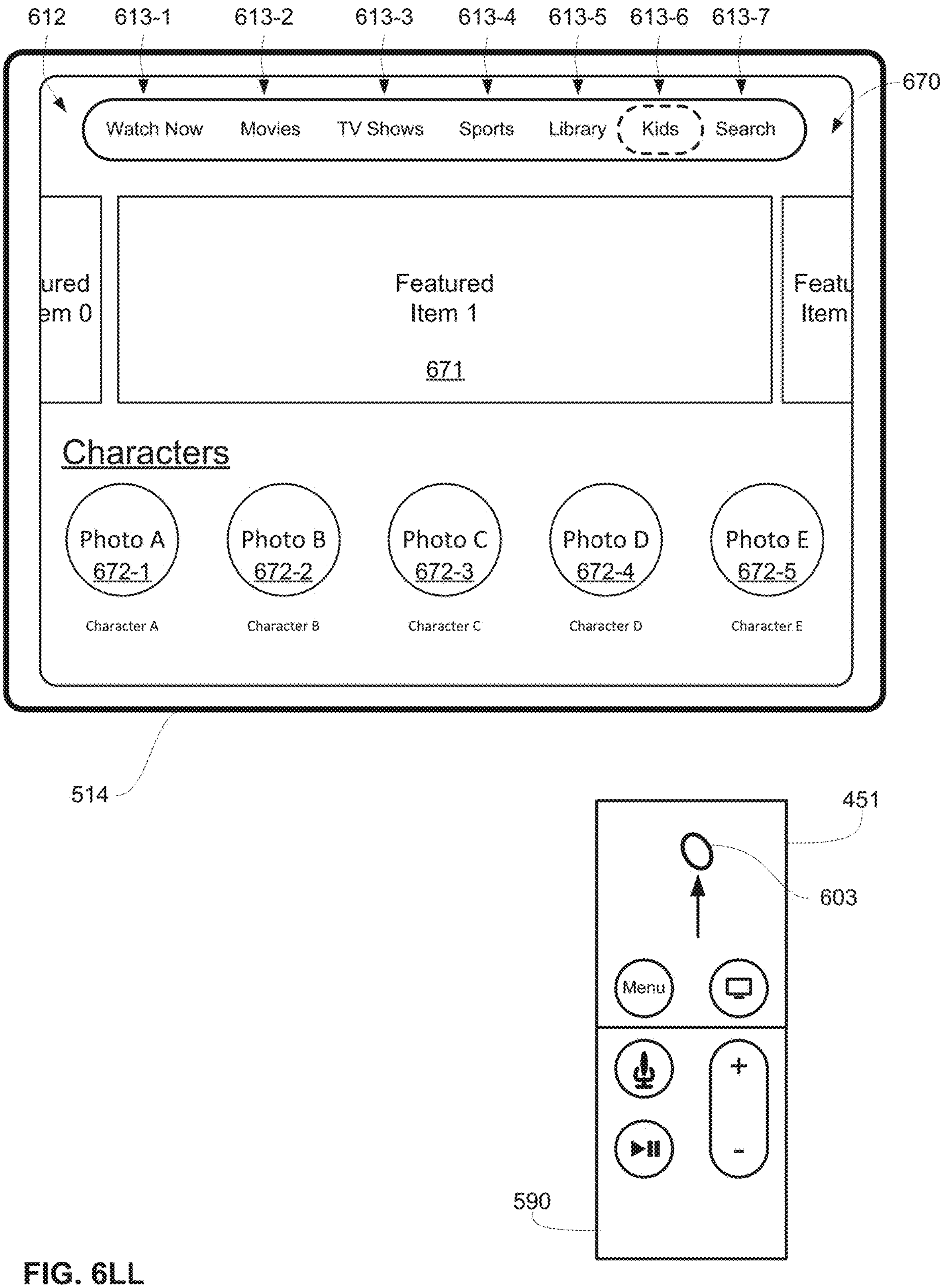
Figure 6M:
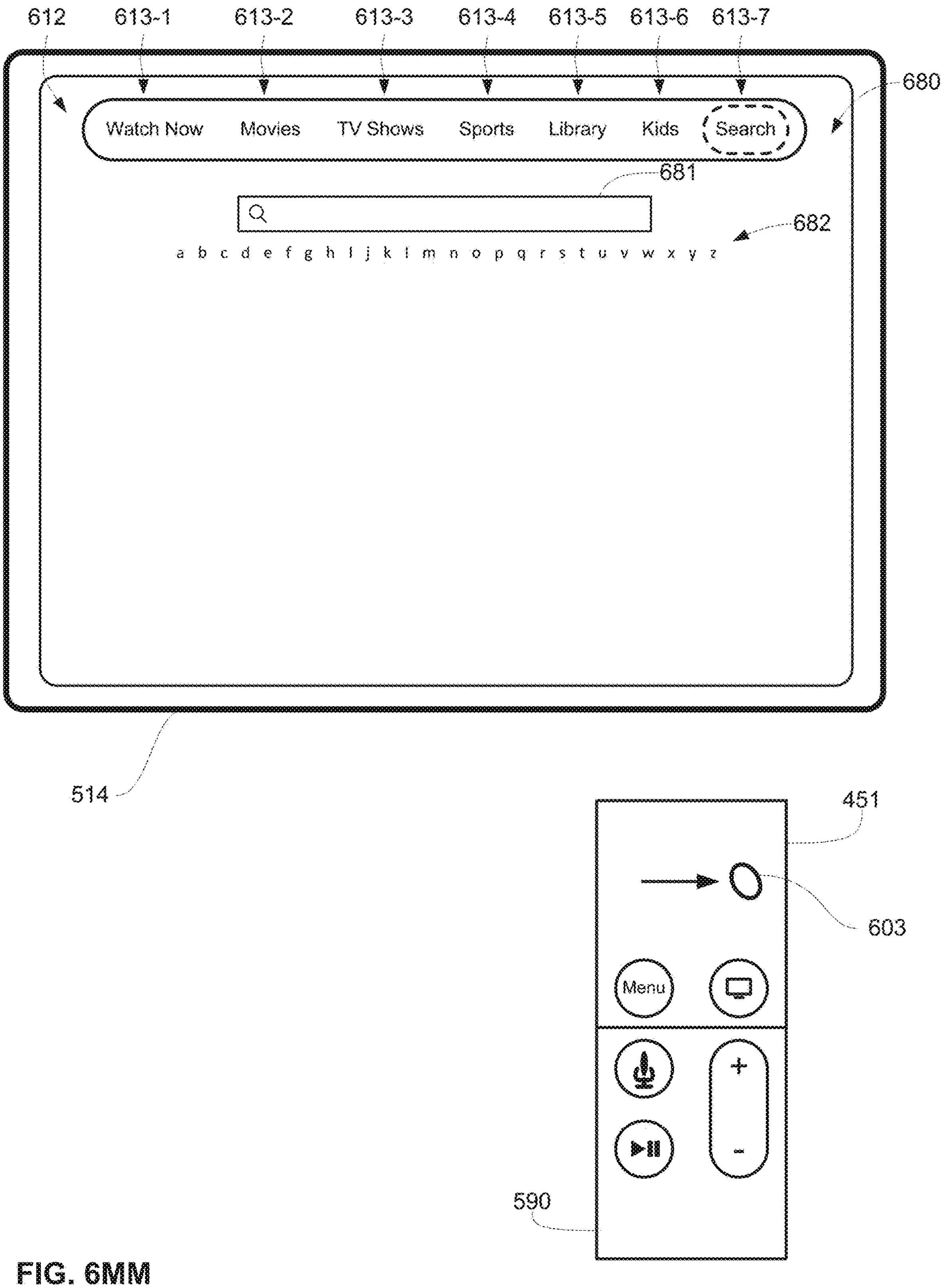
Figure 6N:
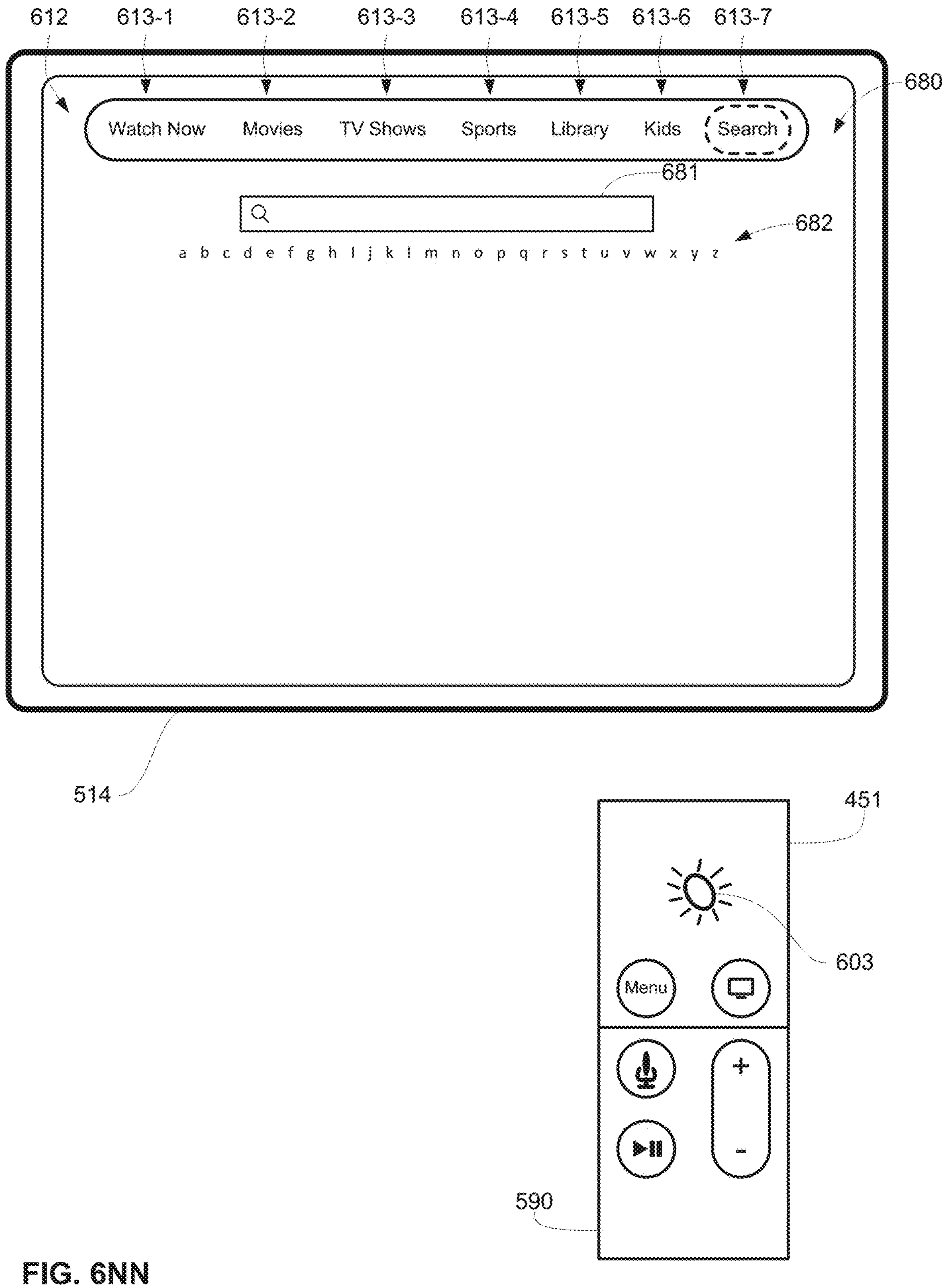
Figure 6O:
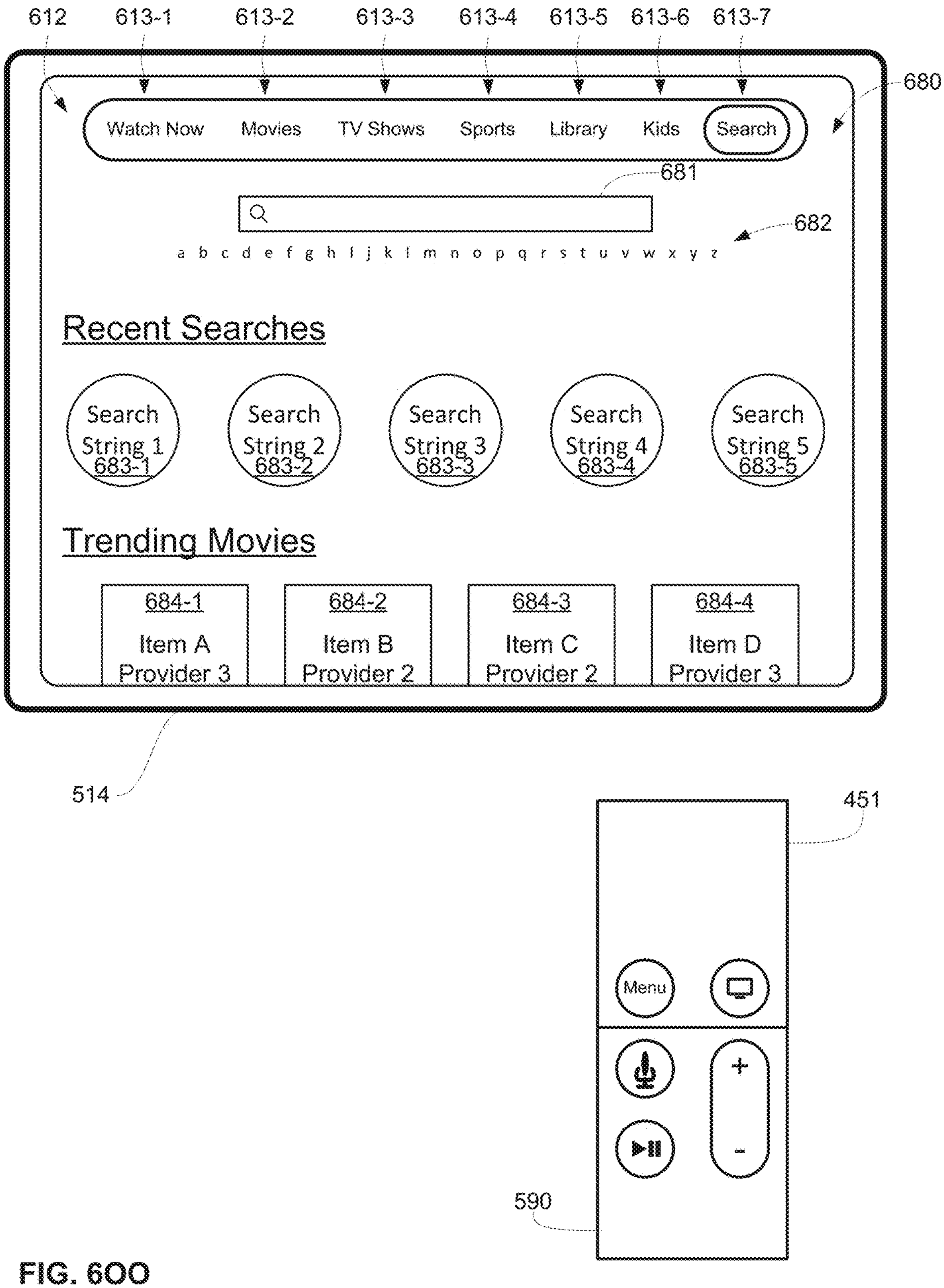
Figure 6P:
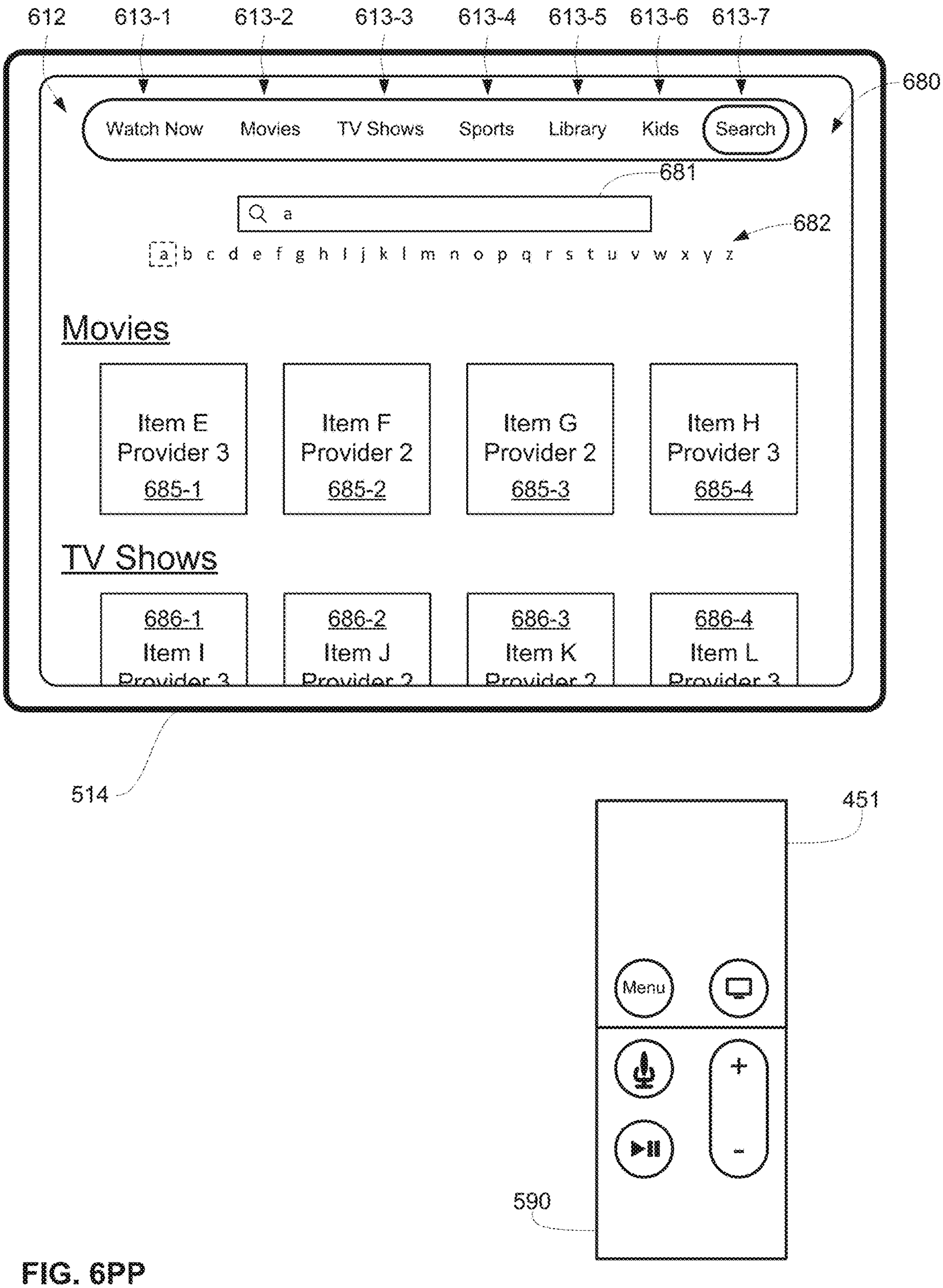
Figure 6Q:
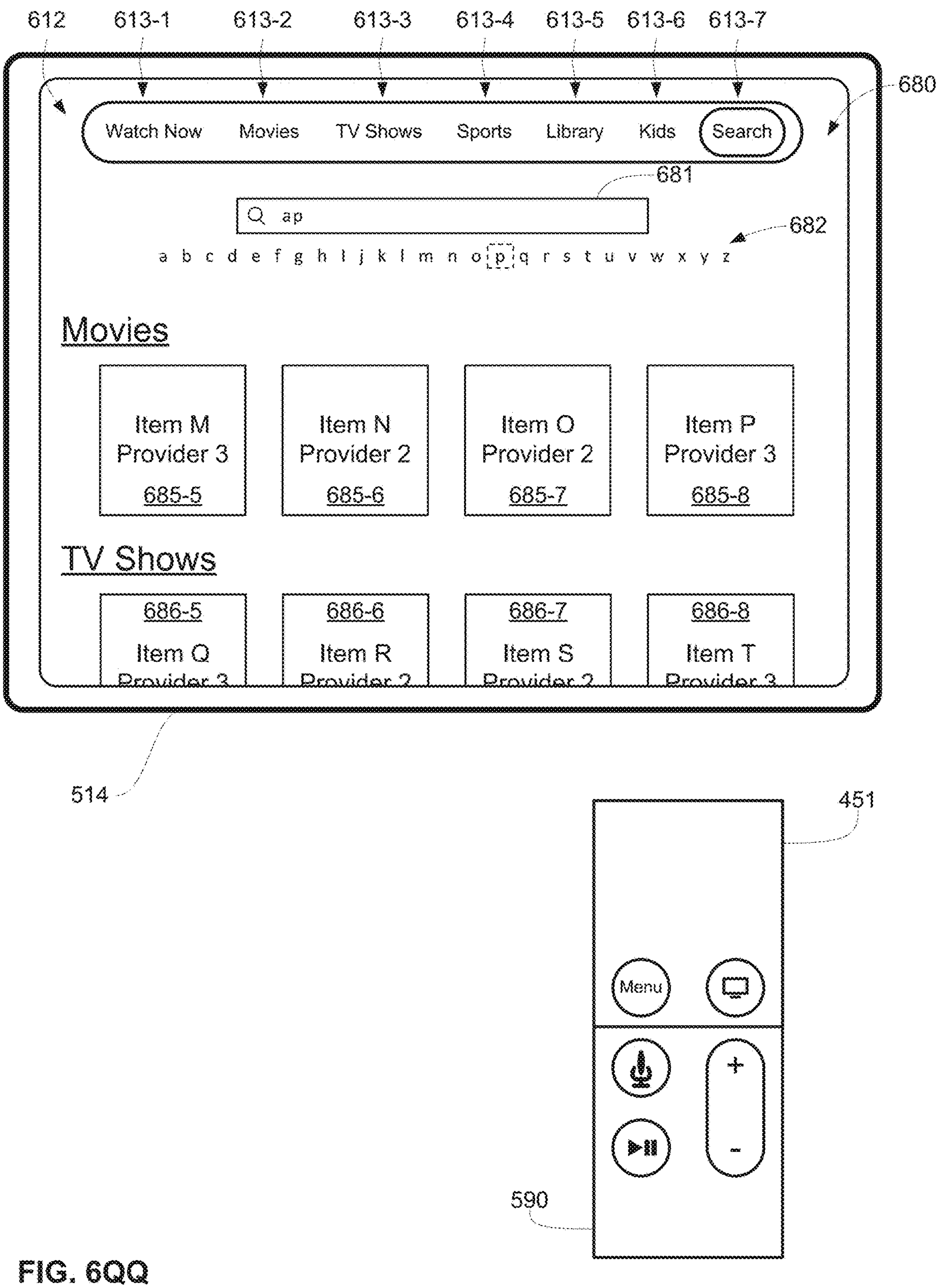
Figure 7A:
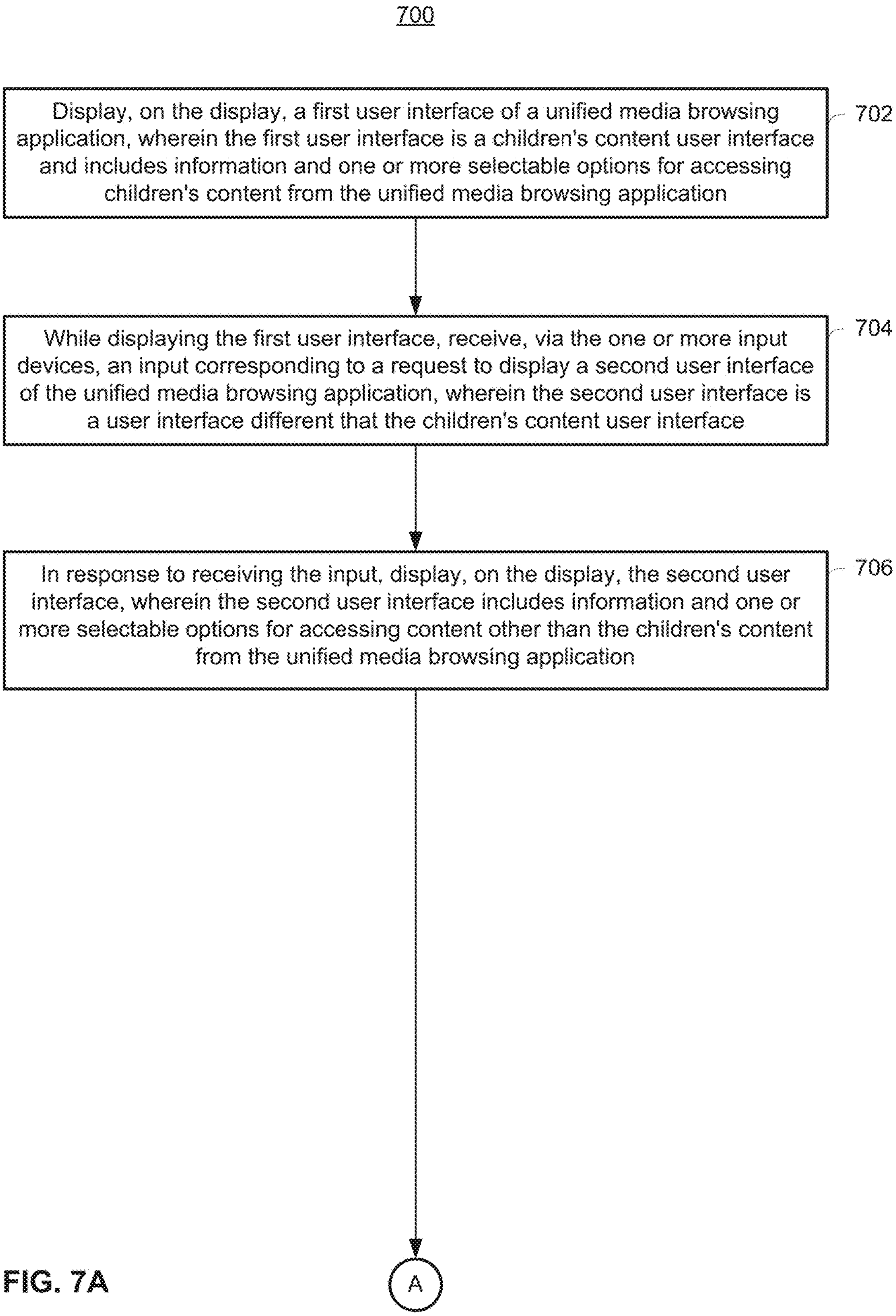
Figure 7C:
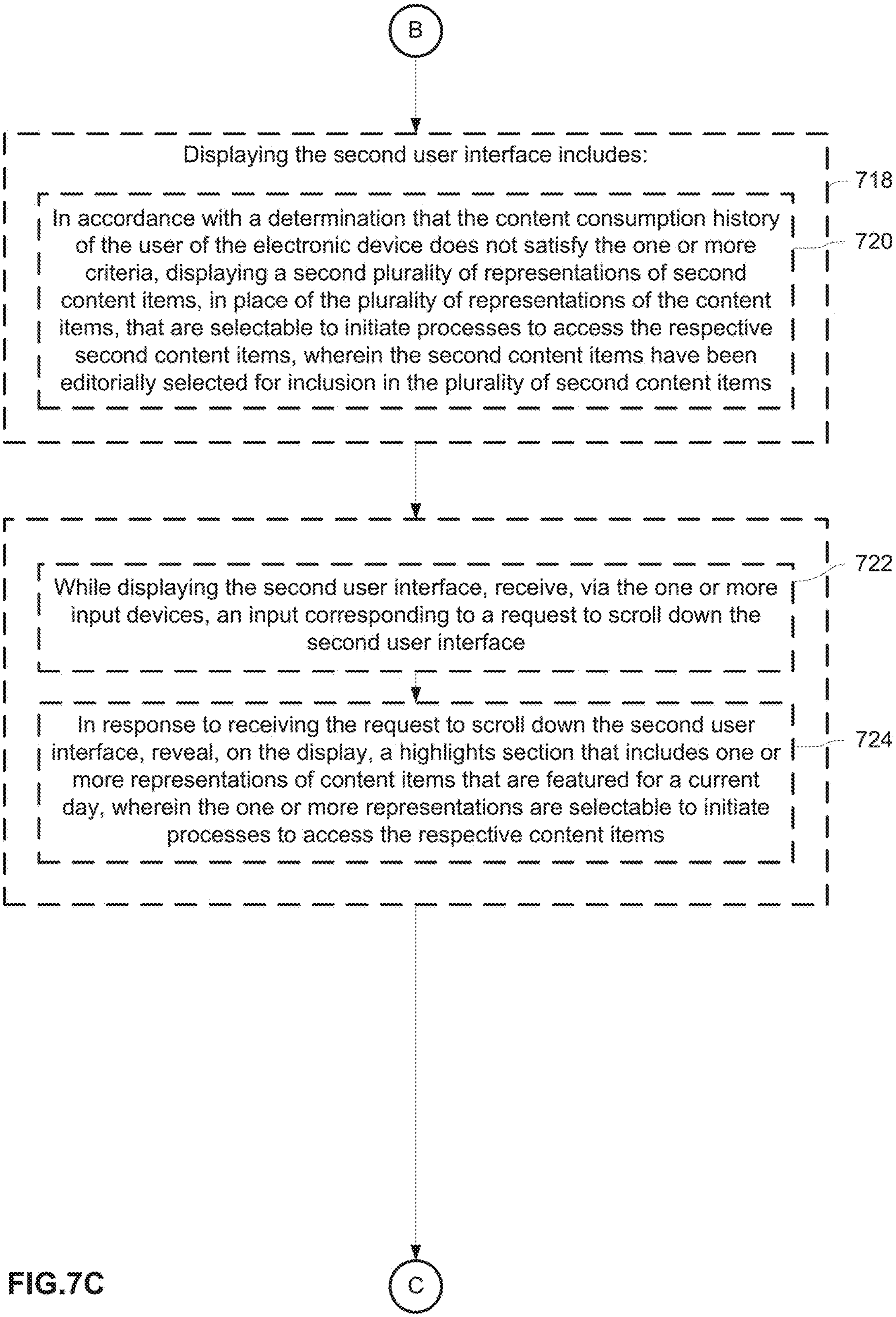
Figure 7E:
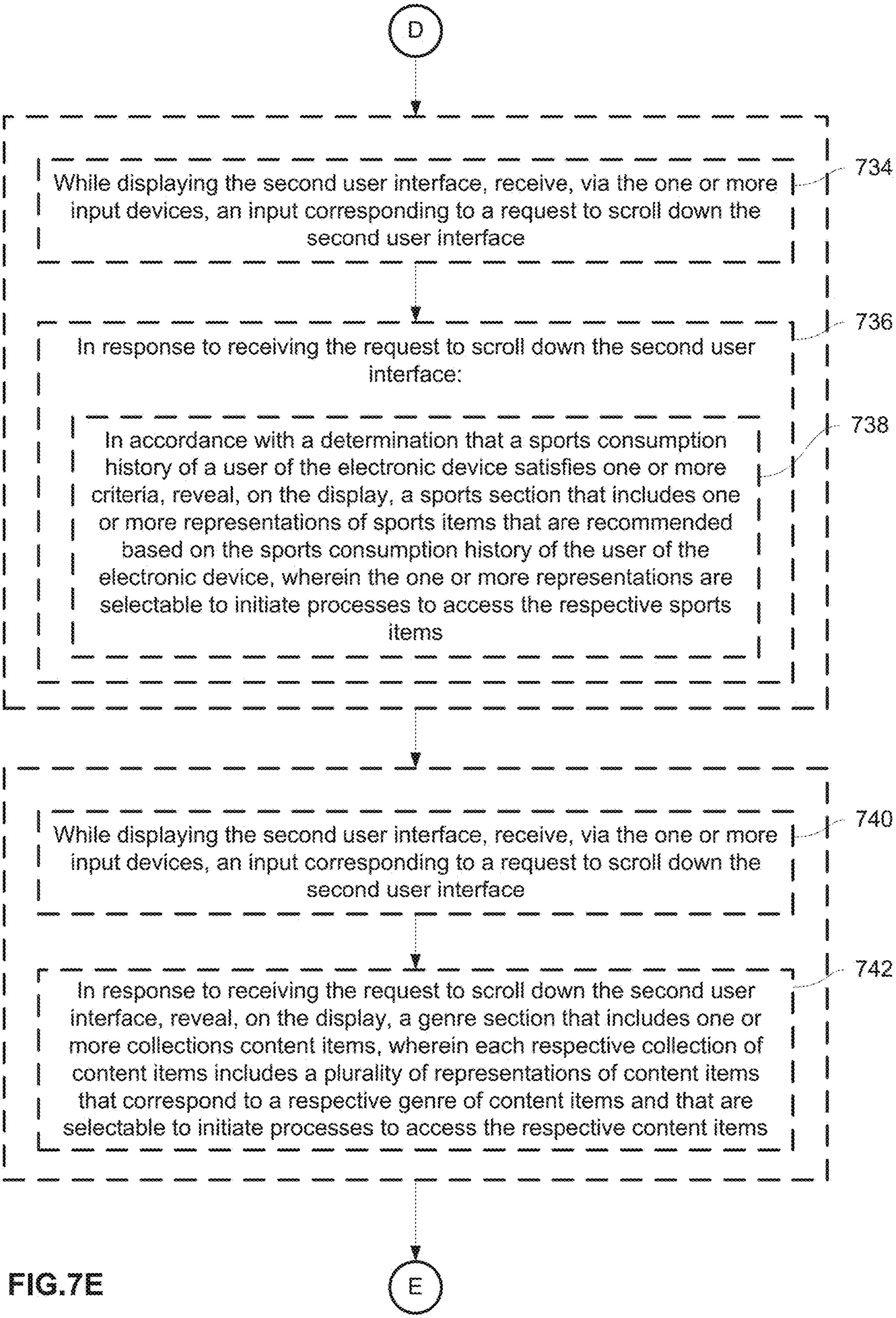
Figure 7F:
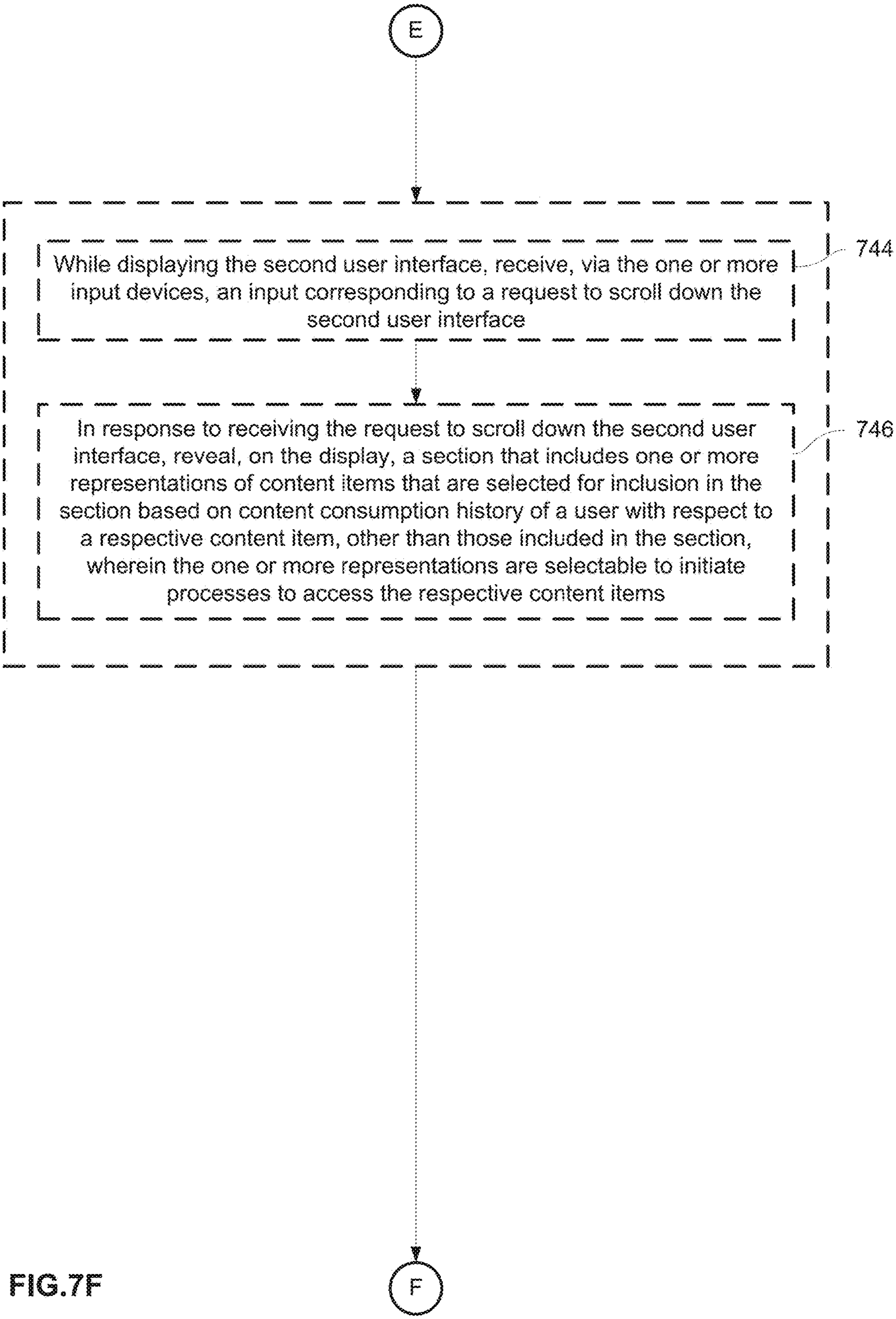
Figure 7G:
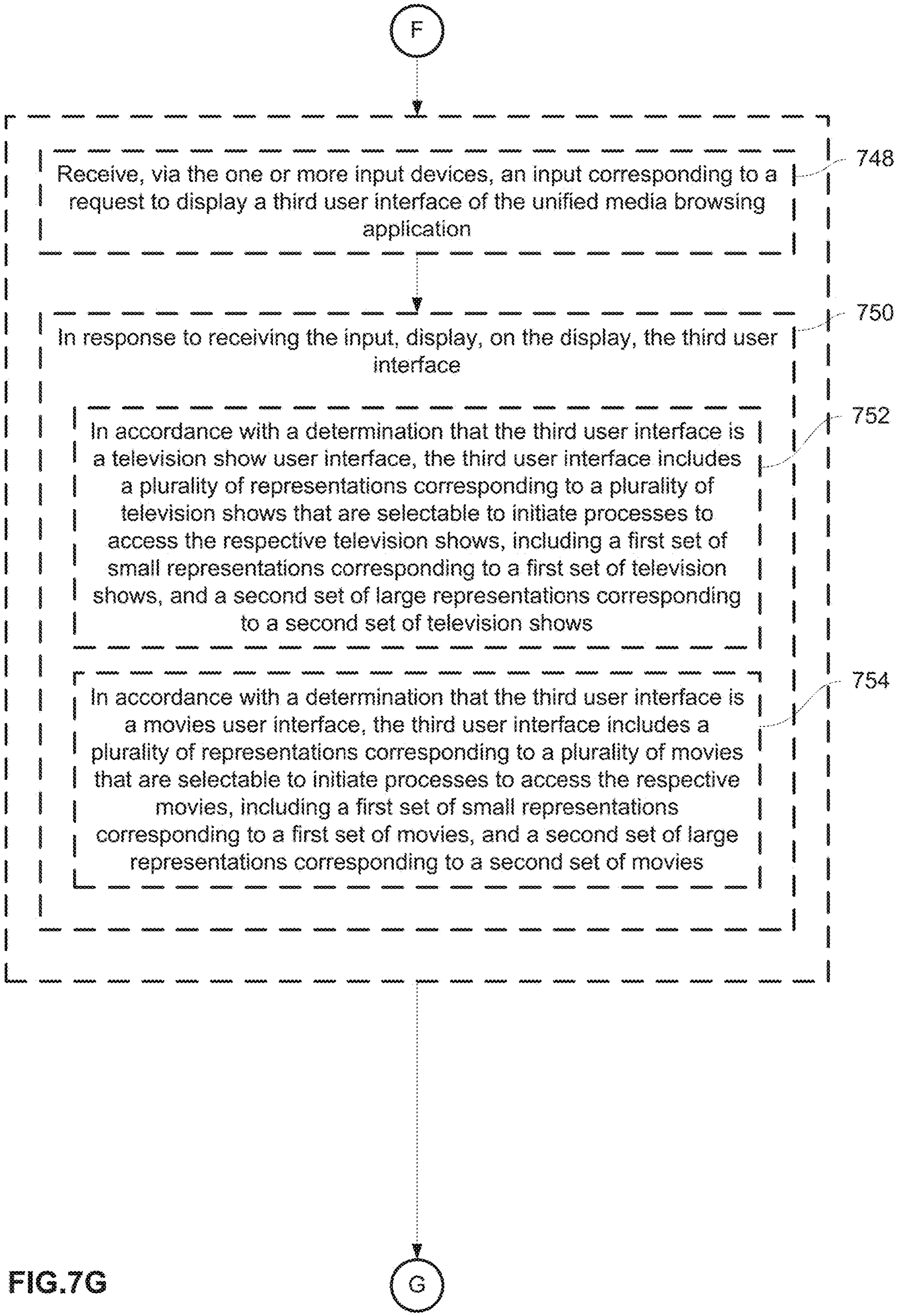
Figure 7H:
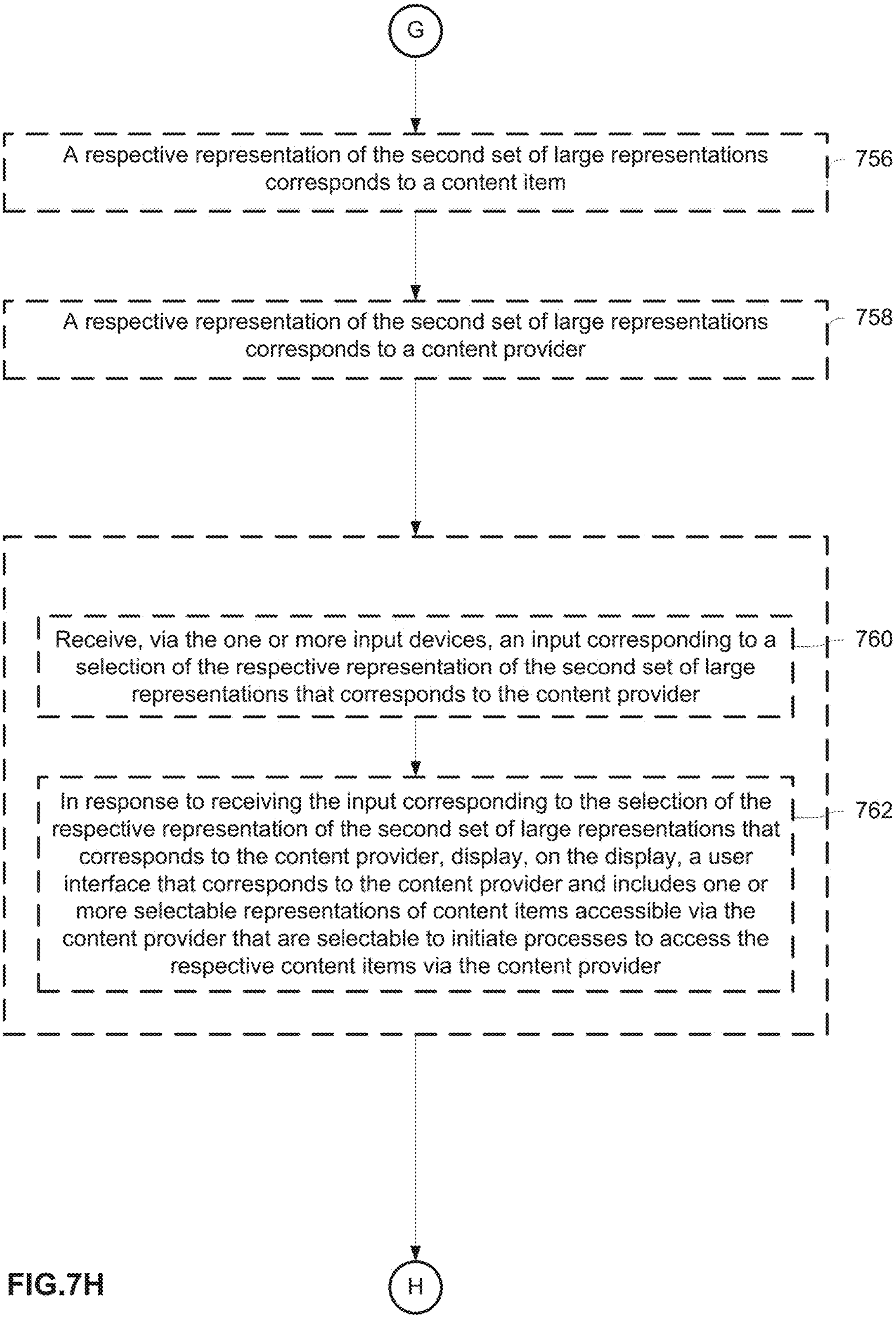
Figure 7I:
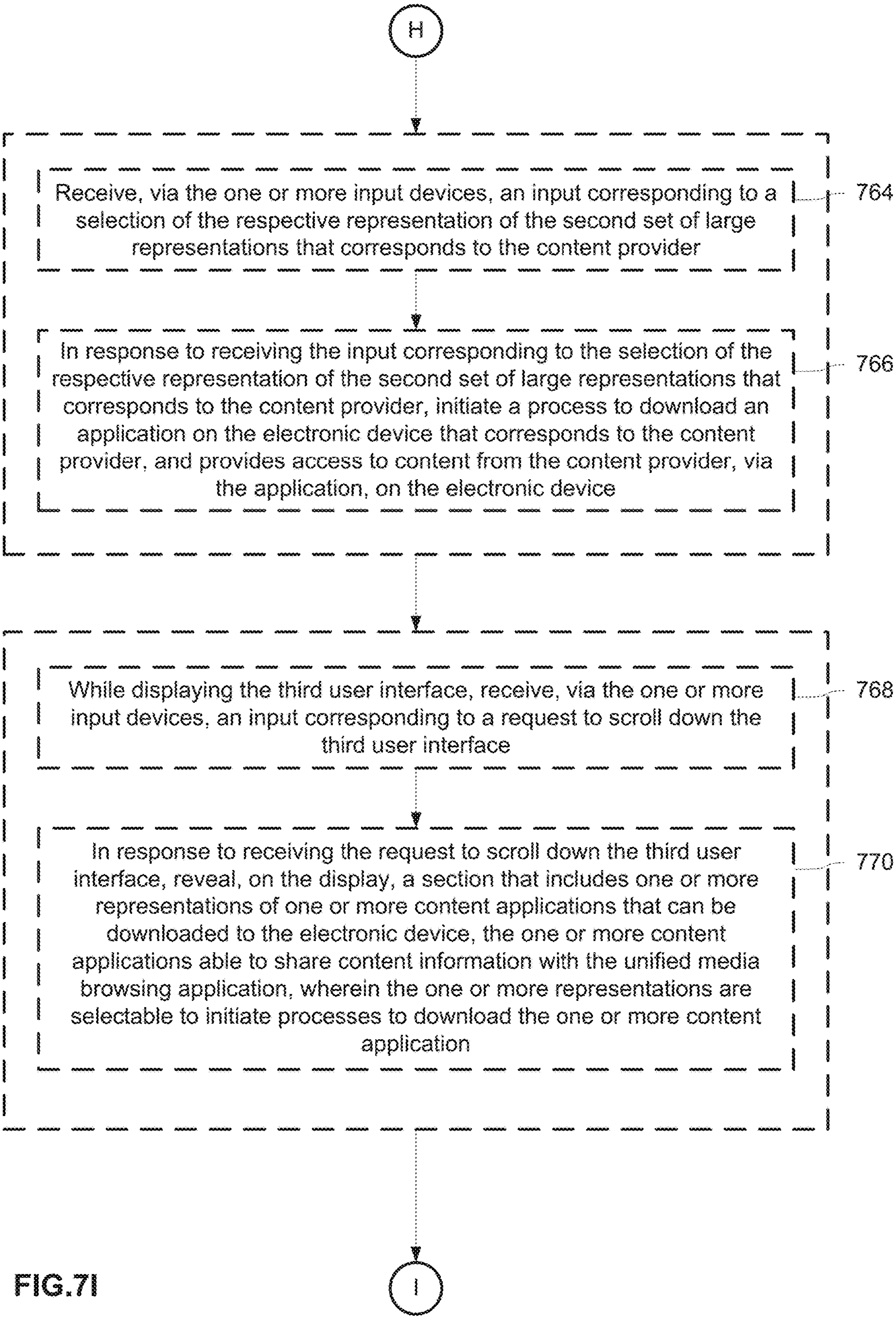
Figure 7J:
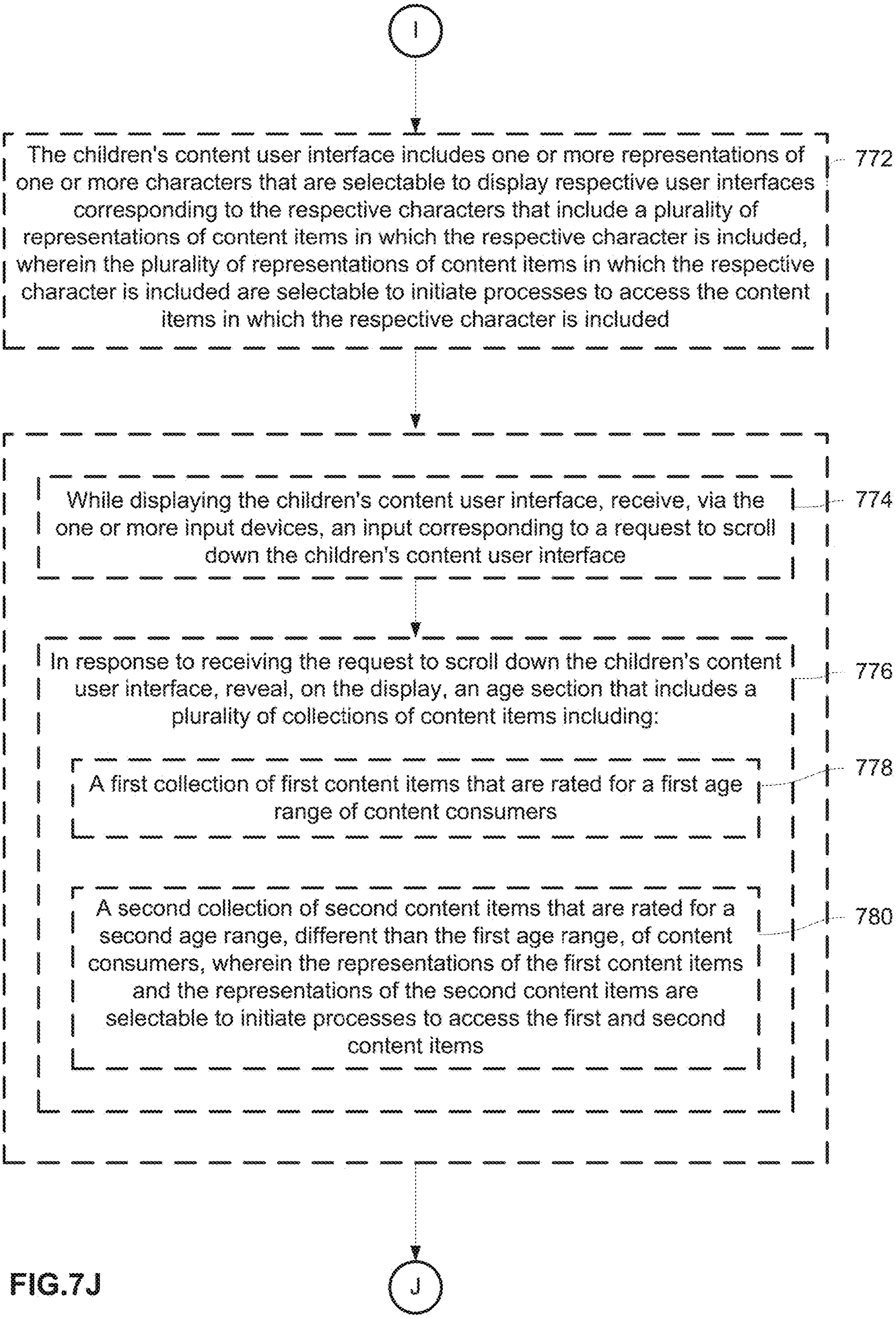

In some embodiments, in response to receiving a user input 603 selecting the "menu" (e.g., or "back") button, device 500 returns to the previous user interface displayed (e.g., user interface 640), as shown in FIG. 6Z. In some embodiments, as shown in FIG. 6AA, in response to receiving a user input 603 corresponding to an upward navigation to the top of user interface 640, focus is moved into navigation bar 612. In particular, selectable icon 613-3 corresponding to the currently displayed user interface (e.g., user interface 640 corresponding to television shows) has a current focus.

In some embodiments, as shown in FIG. 6BB, a user input 603 corresponding to a rightward navigation is received. In some embodiments, in response to user input 603, focus moves rightwards from selectable icon 613-3 to selectable icon 613-5. In some embodiments, in response to a focus moving to selectable icon 613-5 corresponding to the "library" page, device 500 displays user interface 660. In some embodiments, the "library" page corresponds to content that are available to be downloaded or are already downloaded onto electronic device 500. In some embodiments, content in the "library" page are not received as streaming or on-demand content from any particular provider. For example, the content can be purchased from a content store and be downloaded to the device. In some embodiments, user interface 660 includes one or more categories. For example, user interface 660 includes selectable options 662-1 to 662-4 (e.g., corresponding to recent purchases, tv shows, movies, and rentals). In some embodiments, selection of any of selectable options 662-1 to 662-4 cause display of content associated with the corresponding category. For example, when selectable 662-1 corresponding to recent purchases is selected, recently purchased content is displayed in a content list region (e.g., to the right of the list of selectable options). In some embodiments, when user interface 660 is initially shown, selectable option 662-1 corresponding to recent purchases is selected by default (e.g., and thus content corresponding to the recent purchases category is displayed in the content list region). In some embodiments, the content items displayed in the content list region (e.g., items 664-1 to 664-6) are selectable to cause playback of the corresponding content item (e.g., either within the unified media browsing application or in another media playback application).

In some embodiments, option 662-5 corresponds to genres of content. In some embodiments, option 662-5 is not a selectable option and is merely a label indicating that the categories below (e.g., selectable options 663-1 to 663-5) are organized by genre. For example, selectable option 663-1 corresponds to the action and adventure genre and is selectable to display action and adventure content in the content list region. Similarly, selectable option 663-2 corresponds to the comedy genre, selectable option 663-3 corresponds to the documentary genre, selectable option 663-4 corresponds to the drama genre, and selectable option 663-5 corresponds to the kids genre. It is understood that the categories described herein are merely exemplary and any number and type of categories can be displayed in user interface 660.

In FIG. 6CC, a user input 603 corresponding to a click input is received selecting selectable icon 613-5. In some embodiments, focus moves from navigation bar 612 to the first element of user interface 660 (e.g., selectable option 662-1). In some embodiments, because selectable option 662-1 was already selected by default, the list of content in the content list region is unchanged. In some embodiments, in response to receiving a user input 603 corresponding to a downward navigation, focus is moved from selectable option 662-1 to selectable option 663-2 corresponding to the comedy genre. In some embodiments, when any of the selectable options corresponding to a genre category has a focus, the other of the selectable options corresponding to the other genre categories are shifted to indicate that the selectable option that has a focus is selected (e.g., selectable option 663-1 and 663-5 is indented to the right, leaving selectable option 663-2 left-aligned with selectable options 662-1 to 662-4.). In some embodiments, in response to selectable icon 663-2 having a focus, the content list region is updated to display content that correspond to the selected genre (e.g., comedy). In some embodiments, any of icons 665-1 to 665-6 are selectable to cause playback of the corresponding item.

In FIG. 6FF, user input 603 corresponding to an upward swipe is received. In some embodiments, in response to user input 603, focus is moved back to selectable option 613-5 in navigation bar 612. In FIG. 6GG, user input 603 corresponding to a rightward swipe is received. In some embodiments, in response to user input 603, focus is moved from selectable option 613-5 to selectable option 613-6 corresponding to children's content.

In some embodiments, in response to selectable option 613-6 receiving a focus, device 500 displays user interface 670 corresponding to children's content. In some embodiments, user interface 670 includes a featured banner, similar to or sharing features of the featured banner on user interface 640 described above with respect to FIG. 6R. For example, in some embodiments, banner 671 promotes featured item 1. In some embodiments, banner 671 is selectable to display a product page corresponding to featured item 1. In some embodiments, user interface 670 includes a "characters" row of icons 672-1 to 672-5. In some embodiments, the "characters" row includes items corresponding to different children's characters. In some embodiments, selection of any of icons 672 cause display of a user interface for browsing content in which the corresponding character is included or featured. In some embodiments, the characters listed in the characters row is personalized for the user. For example, characters that the user has shown an interest in are included in the characters row. In some embodiments, characters that are more likely to be of interest to the user are listed earlier than characters that are less likely to be of interest to the user.

In FIG. 6HH, user input 603 corresponding to a click input is received selecting selectable option 613-6. In some embodiments, in response to user input 603, focus moves from navigation bar 612 to within user interface 670. In some embodiments, the focus skips the featured banner and moves directly to the first item in the rows of items (e.g., icon 572-1 corresponding to character A).

In FIG. 6JJ, a user input 603 corresponding to a request to navigate downwards (e.g., downward swipe on touch-sensitive surface 451) to reveal further rows of children's content. In some embodiments, user interface 670 includes a "top episodes" row with icons 673-1 to 673-4. In some embodiments, the "top episodes" row includes the most popular children's television episodes. In some embodiments, user interface 670 includes an age-specific row (e.g., ages 2-4). In some embodiments, the age-specific row includes content that has been determined to be appropriate for the corresponding age group. In some embodiments, any number of age-specific rows can be displayed. For example, user interface 670 can include a row for ages 0-1, a row for ages 2-4, a row for ages 5-7, etc. In some embodiments, which rows and the number of rows displayed are personalized for the user. For example, if the user has indicated that the user is interested in content from particular age ranges, or that the user's household has children of particular age ranges, then the respective age ranges are displayed in user interface 670.

In FIG. 6KK, a user input 603 corresponding to a request to navigate downwards (e.g., downward swipe on touch-sensitive surface 451) to reveal further rows of children's content. In some embodiments, user interface 670 includes a "browse by age" row in which icons 675-1 to 675-4 are selectable to display a user interface for browsing children's content for age groups 2-4, 5-7, 8-10, and 11-13, respectively. In some embodiments, more or fewer age groups can be displayed and group of age ranges are possible. In some embodiments, user interface 670 includes an "Editor's Choice" row. In some embodiment, the "Editor's choice" row is similar to or shares similar features of the editor's choice in user interface 610 described above with respect to FIG. 6L.

In FIG. 6LL, user input 603 corresponding to an upward swipe is received. In some embodiments, in response to user input 603, focus is moved back to selectable option 613-6 in navigation bar 612. In FIG. 6MM, user input 603 corresponding to a rightward swipe is received. In some embodiments, in response to user input 603, focus is moved from selectable option 613-6 to selectable option 613-7 corresponding to the search page. In some embodiments, in response to selectable option 613-7 receiving a focus, search user interface 680 is displayed. In some embodiments, search user interface includes a text entry field 681 and a character selection list 682. In some embodiments, a user enters text into the text entry field 681 by moving a focus within the character selection list 682 and selecting characters from character selection list 682.

In some embodiments, as shown in FIG. 6NN, a user input 603 corresponding to a click input selecting selectable option 613-7 is received. In some embodiments, focus moves from selectable option 613-7 from navigation bar 612 to user interface 680 (e.g., to text entry field 681 or character selection list 682), as shown in FIG. 6OO. In some embodiments, user interface 680 includes a "Recent Searches" row. In some embodiments, the "recent searches" row is displayed whenever user interface 680 is displayed and the user has not entered text into text entry field 681. In some embodiments, the "recent searches" row is displayed only after the user has not entered text for a threshold amount of time (e.g., 1 second, 5 seconds, 10 seconds). In some embodiments, the "recent searches" row includes icons representing previous search strings performed by the user or performed on device 500. For example, icon 683-1 corresponds to previous search string 1, icon 683-2 corresponds to previous search string 2, etc. In some embodiments, selection of any of icons 683 corresponding to a previous search string causes the respective search string to be entered into text entry field 681. In some embodiments, selection of any of icons 683 corresponding to a previous search string causes a search using the respective search string. In some embodiments, performing a search comprises searching all content that is available and/or accessible to the unified media browsing application and presenting the results of the search for the user to select from, as will be described in further detail below with respect to FIG. 6PP.

In some embodiments, if no text is entered into text entry field 681 for a threshold amount of time (e.g., 1 second, 5 seconds, 10 seconds), then user interface 680 displays rows of suggested content, such as “Trending Movies” row with icons 684-1 to 684-4. In some embodiments, multiple rows of suggested content is displayed in user interface 680. In some embodiments, user interface 680 is scrollable to reveal the multiple rows of suggested content. In some embodiments, the suggested content is organized into categories, such as trending movies, sports, television shows, etc. (e.g., in some embodiments, one scrollable row per category).

In FIG. 6PP, a character “a” is entered into text entry field 681. In some embodiments, in response to the entry of a character into text entry field 681, a search is immediately performed to find content that matches the string in text entry field 681. In other words, the search is performed live and updated as soon as any additions or deletions are detected in text entry field 681. For example, in response to detecting the entry of the “a” character, device 500 finds a plurality of shows that matches the string and user interface 680 displays one or more rows of content items. In some embodiments, the one or more rows of content items are organized into content types, such as movies, television shows, etc.

In FIG. 6PP, a character “p” is entered into text entry field 681 resulting in a search string of “ap”. In some embodiments, in response to the entry of an additional character, a new search is performed and the results displayed on user interface 680 are updated in accordance with the new search results. For example, device 500 finds a plurality of shows that matches the new search string “ap” and displays one or more rows of content items that match the updated search string. Thus, in some embodiments, the search is performed “live” and the search results are updated “live” (e.g., as characters are added or removed from text entry field 681). In some embodiments, selection of any of icons 684, 685, and 686 causes display or playback of the respective content item or display of a product page for the respective content item.

FIGS. 7A-7K are flow diagrams illustrating a method 700 of presenting a plurality of representations of content items in a unified media browsing application in accordance with some embodiments of the disclosure. The method 700 is optionally performed at an electronic device such as device 100, device 300, device 500, and device 511 as described above with reference to FIGS. 1A-1B, 2-3, 4A-4B and 5A-5C. Some operations in method 700 are, optionally combined and/or order of some operations is, optionally, changed.

As described below, the method 700 provides ways to present a plurality of representations of content items in a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (702), on the display, a first user interface of a unified media browsing application, wherein the first user interface is a children's content user interface and includes information and one or more selectable options for accessing children's content from the unified media browsing application, such as in FIG. 6GG (e.g., a page or tab in the unified media browsing application to browse for, purchase, and/or select to cause playback of children's content).

In some embodiments, the page or tab for children's content displays multiple icons (e.g., representations, selectable options) of children's content items. In some embodiments, when a user selects one of content items (e.g., by selecting the selectable option associated with a respective content item), the electronic device initiates a process for accessing the selected content item (e.g., cause playback, launch an application to cause playback, display more information about the content item such as displaying a canonical page for the content item, etc.). In some embodiments, content in the unified media browsing application is accessible via another application installed on the electronic device and selection of the respective content item will cause the other application to launch and the respective content item to play in the other application. In some embodiments, some content is accessible via the unified media browsing application itself and selection of the respective content item causes the content item to play within the unified media browsing application (e.g., without launching another application and causing playback in the other application). In some embodiments, the unified media browsing application provides a centralized location for browsing, searching, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device).

In some embodiments, while displaying the first user interface, the electronic device receives (704), via the one or more input devices, an input corresponding to a request to display a second user interface of the unified media browsing application, wherein the second user interface is a user interface different that the children's content user interface, such as in FIG. 6Q (e.g., navigating to a different tab or page in the unified media browsing application). In some embodiments, navigating to a different tab or page includes navigating to a navigation bar. In some embodiments, the navigation bar allows the user to browse to different user interfaces of the unified media browsing application. In some embodiments, the unified browsing media application includes tabs or pages for television shows, movies, sports, children's content, recommended content, purchased content, etc.

In some embodiments, in response to receiving the input, the electronic device displays (706), on the display, the second user interface, wherein the second user interface includes information and one or more selectable options for accessing content other than the children's content from the unified media browsing application, such as in FIG. 6Q (e.g., display one of the other user interfaces in the unified browsing media application). In some embodiments, the other user interfaces in the unified browsing media application include other content items which the user can select and access. In some embodiments, selecting a content item in the unified browsing media application causes display of a canonical page for the content item.

The above-described manner of displaying content (e.g., by providing a user interface for children's content and a separate user interface for other content) allows the electronic device to provide the user with an organized user interface for browsing different categories of content (e.g., by sorting the content into different categories, such as children's content and providing different user interface for each category), which simplifies the interaction between the user and the electronic device and enhances the operability of the electronic device and makes the user-device interface more efficient (e.g., by organizing the content into user interfaces such that the user can intuitively and easily browse for and find content of interest, without requiring the user to navigate through multiple user interfaces to find desired content), which additionally reduces power usage and improves battery life of the electronic device by enabling the user to use the electronic device more quickly and efficiency while reducing errors in the usage of the device.

In some embodiments, the unified media browsing application includes a navigation bar, and the input corresponding to the request to display the second user interface while displaying the first user interface comprises moving a current focus from a first element in the navigation bar that corresponds to the first user interface to a second element in the navigation bar that corresponds to the second user interface (708), such as in FIG. 6B (e.g., without requiring a click input while the current focus in on the second element). In some embodiments, navigating through the navigation bar causes the unified media browsing application to display different interfaces associated with the selected item in the navigation bar. In some embodiments, clicking or tapping on the input device while the navigation bar has a current focus causes the focus to move down into the page. In some embodiments, when the focus moves down into the page, the focus moves to the top-most element on the page. In some embodiments, when the focus moves down, it does not move to the top-most element on the page and instead skips one or more banners and moves to the first element in a row of content items. In some embodiments, when the focus moves down, it moves to the previous item that had focus if the user has browsed through the page before (e.g., the item that had focus when the user previously navigated away from the page). In some embodiments, when focus moves down into the page, the navigation bar remains displayed at the top of the page. In some embodiments, when focus moves down into the page, the navigation bar ceases to be displayed. In some embodiments, the user moves the focus back to the navigation bar by performing an upward scrolling gesture after the user reaches the top-most element of the page. In some embodiments, the user moves the focus back to the navigation bar by selecting a menu or back button on an input device.

The above-described manner of navigating through user interfaces (e.g., by providing a navigation bar via which the user can navigate to desired user interfaces) allows the electronic device to provide the user with an organized user interface for browsing different categories of content (e.g., by sorting the content into different categories and displaying the categories on a navigation bar for the user to select from), which simplifies the interaction between the user and the electronic device and enhances the operability of the electronic device and makes the user-device interface more efficient (e.g., by organizing the content into user interfaces and displaying a navigation bar such that the user can easily see and navigate to the desired user interface to find desired content), which additionally reduces power usage and improves battery life of the electronic device by enabling the user to use the electronic device more quickly and efficiency while reducing errors in the usage of the device.

In some embodiments, the second user interface is a content suggestion user interface (e.g., a page or tab in the unified media browsing application that displays suggestions or recommendations to the user), and includes a row of a plurality of representations of suggested content items, including a first set of suggested content items that have been editorially selected for inclusion in the row (e.g., independent of user activity with respect to those first set of content items), and a second set of content items that have been selected for inclusion in the row based on prior user activity with respect to the second set of content items (e.g., content items related to other items that the user has watched. For example, if a user has watched episodes of a particular series, the second set of content items can include the next episode in the series), wherein the plurality of representations of suggested content items are selectable to initiate respective processes to access the respective suggested content items (710), such as in FIG. 6E.

In some embodiments, the content suggestion user interface is not limited to a particular genre or category. In some embodiments, the content suggestion user interface includes multiple rows of content items with each row displaying content of a particular category. For example, a featured set of content items that have been selected. In some embodiments, the first set of suggested content is placed in a prioritized location as compared to the second set of content items (e.g., earlier in the row). In some embodiments, the row of content items is the first row that is displayed on the user interface (e.g., at the top of the user interface). In some embodiments, the second set includes items that the user has added to the second set of items (e.g., queued into the second set of content items). In some embodiments, in response to a user selecting one of the plurality of representations, the electronic device causes playback of the selected content item, displays a canonical page related to the selected content item, or otherwise accesses the selected content item. In some embodiments, selection of the first set of suggested content items causes a display of a product page for the selected content item (in which the user is presented with more information about the content item and other related content and the option to begin playback). In some embodiments, selection of the second set of suggested content causes playback of the content item, either within the unified media browsing application or a separate application.

The above-described manner of suggesting content (e.g., by providing rows of content items, wherein one row is an editor's choice row and another row is a row based on the user's past history) allows the electronic device to suggest to the user content that may be of interest to the user (e.g., by displaying content in rows, each row containing suggested content based on different suggestion criteria), which simplifies the interaction between the user and the electronic device and enhances the operability of the electronic device and makes the user-device interface more efficient (e.g., by presenting rows content to the user that the user may be interested in without requiring the user to navigate to different user interfaces to find content based on different sorting algorithms), which additionally reduces power usage and improves battery life of the electronic device by enabling the user to use the electronic device more quickly and efficiency while reducing errors in the usage of the device.

In some embodiments, the second user interface is a content suggestion user interface, and displaying the second user interface includes (712): in accordance with a determination that a content consumption history of a user of the electronic device satisfies one or more criteria, displaying a plurality of representations of content items in the second user interface that are selectable to initiate processes to access the respective content items, the content items having been selected for inclusion in the plurality of content items based on prior user activity with respect to the plurality of content items (714), such as in FIG. 6D. In some embodiments, if there is enough viewing history, then the content suggestion user interface can display suggestions related to the viewing history. In some embodiments, the one or more criteria are satisfied if the user has watched a threshold amount of content. For example, the user has watched more than a threshold number of programs, more than a threshold duration of programming, more than a threshold number of programs from more than a threshold number of different content types (e.g., sports, movies, television, news, etc.), has installed more than a threshold amount of content applications, or has viewed more than a threshold amount of content-related websites or product pages. In some embodiments, the suggested content are episodes of television series that the user has previously watched, shows or movies featuring the same genre, actors, directors, or products as shows the user has previously watched, or other shows that the user has shown an interest in but have not watched. In some embodiments, the suggested content includes content that the user has partially watched and not completed. In some embodiments, displaying the second interface includes: in accordance with a determination that the content consumption history of the user of the electronic device does not satisfy the one or more criteria, forgoing displaying the plurality of representations of the content items in the second user interface (716), such as in FIG. 6B. If there is not enough viewing history (e.g., or has not reached the threshold amounts discussed above), then suggesting content to the user may be difficult and the electronic device optionally forgoes displaying certain suggested items that are based on the user's viewing history. In some embodiments, instead of displaying suggested items based on the user's viewing history, the content suggestion user interface suggests content items that are popular or trending, independent of the user's content consumption activity.

The above-described manner of suggesting content (e.g., by displaying content recommended based on the user's past viewing history only if there has been enough viewing history to generate a meaningful amount of suggested content) allows the electronic device to provide the user with meaningful suggested content (e.g., by only displaying content based on the user's viewing history only if there is enough viewing history), which simplifies the interaction between the user and the electronic device and enhances the operability of the electronic device and makes the user-device interface more efficient (e.g., by suggesting content to the user that is meaningfully based on the user's viewing history without requiring the user to browse through content that is not meaningfully based on the user's viewing history or to navigate to a separate user interface to find desired content), which additionally reduces power usage and improves battery life of the electronic device by enabling the user to use the electronic device more quickly and efficiency while reducing errors in the usage of the device.

In some embodiments, displaying the second user interface includes (718): in accordance with a determination that the content consumption history of the user of the electronic device does not satisfy the one or more criteria, displaying a second plurality of representations of second content items, in place of the plurality of representations of the content items, that are selectable to initiate processes to access the respective second content items, wherein the second content items have been editorially selected for inclusion in the plurality of second content items (720), such as in FIG. 6B (e.g., independent of user activity with respect to those first set of content items). In some embodiments, if there is not enough viewing history data, then the suggested items that are displayed to the user can be popular, trending, or featured content items. For example, the content suggestion user interface can include a row of items that are recommended generally to all users. In some embodiments, if the content consumption history satisfies the one or more criteria, the row of items can be displayed in a lower row than the row of item that is based on the user's prior user activity (e.g., pushed down by the row that is selected based on the prior user activity). In some embodiments, the one or more criteria are satisfied if the user has watched a threshold amount of content. For example, the user has watched more than a threshold number of programs, more than a threshold duration of programming, more than a threshold number of programs from more than a threshold number of different content types (e.g., sports, movies, television, news, etc.), has installed more than a threshold amount of content applications, or has viewed more than a threshold amount of content-related websites or product pages.

The above-described manner of displaying content (e.g., by displaying different suggested content when there is not enough viewing history to provide suggestions based on the user's viewing history) allows the electronic device to provide the user with suggested content for viewing (e.g., by providing suggested content to the user based on a criteria different than the user's past viewing history when there is not enough viewing history to generate suggestions), which simplifies the interaction between the user and the electronic device and enhances the operability of the electronic device and makes the user-device interface more efficient (e.g., by suggesting content to the user that could be of interest to the user even if there is not enough viewing history to generate contest suggestions without requiring the user to navigate to a separate user interface to find content), which additionally reduces power usage and improves battery life of the electronic device by enabling the user to use the electronic device more quickly and efficiency while reducing errors in the usage of the device.

In some embodiments, while displaying the second user interface, the electronic device receives (722), via the one or more input devices, an input corresponding to a request to scroll down the second user interface; and in response to receiving the request to scroll down the second user interface, the electronic device reveals (724), on the display, a highlights section that includes one or more representations of content items that are featured for a current day, wherein the one or more representations are selectable to initiate processes to access the respective content items, such as in FIG. 6F (e.g., a row of content items that optionally update every day and include items that are topical or relevant to recent events). In some embodiments, the content displayed in this row are customized and/or personalized for the user. For example, the items displayed can be related to content that the user has shown an interest in. In some embodiments, items can be sorted or ordered based on the user's interest (e.g., content that the user is more likely to be interested in is displayed earlier than content that the user may be less interested in).

The above-described manner of displaying content (e.g., by displaying content that is featured for the current day) allows the electronic device to provide the user with suggested content for viewing (e.g., by featuring different content on different days), which simplifies the interaction between the user and the electronic device and enhances the operability of the electronic device and makes the user-device interface more efficient (e.g., by providing the user with a variety of new content that have been selected to be featured for the day, without requiring the user to navigate to different user interfaces to find content), which additionally reduces power usage and improves battery life of the electronic device by enabling the user to use the electronic device more quickly and efficiency while reducing errors in the usage of the device.

In some embodiments, while displaying the second user interface, the electronic device receives (726), via the one or more input devices, an input corresponding to a request to scroll down the second user interface; and in response to receiving the request to scroll down the second user interface (728): in accordance with a determination that a content consumption history of a user of the electronic device satisfies one or more criteria, the electronic device reveals (730), on the display, a recommendation section that includes one or more representations of content items that are recommended based on the content consumption history of the user of the electronic device (e.g., different from activity of the user with respect to those content items in particular), wherein the one or more representations are selectable to initiate processes to access the respective content items, such as in FIG. 6F (e.g., content items that are recommended to the user based on the user's past consumption history, such as items that share the same genre or actors as previously watched content items). In some embodiments, the items can be sorted or ordered based on the user's interest (e.g., content that the user is more likely to be interested in is displayed earlier than content that the user may be less interested in). In some embodiments, the one or more criteria are satisfied if the user has watched a threshold amount of content. For example, the user has watched more than a threshold number of programs, more than a threshold duration of programming, more than a threshold number of programs from more than a threshold number of different content types (e.g., sports, movies, television, news, etc.), has installed more than a threshold amount of content applications, or has viewed more than a threshold amount of content-related websites or product pages. In some embodiments, in accordance with a determination that the content consumption history of the user of the electronic device does not satisfy the one or more criteria, the electronic device forgoes (732) revealing the recommendation section, such as in FIG. 6F. In some embodiments, if the user does not have enough viewing history (e.g., or the threshold amounts discussed above are not reached), then the electronic device des not display the row of items selected and recommended for the user. In some embodiments, there is not enough viewing history to generate meaningful recommendations for the user.

The above-described manner of suggesting content (e.g., by providing a rows of content items based on the user's past viewing history) allows the electronic device to suggest to the user content that may be of interest to the user (e.g., by displaying content that is suggested based on the user's past viewing history), which simplifies the interaction between the user and the electronic device and enhances the operability of the electronic device and makes the user-device interface more efficient (e.g., by presenting content to the user that the user may be interested in without requiring the user to navigate to different user interfaces to find content), which additionally reduces power usage and improves battery life of the electronic device by enabling the user to use the electronic device more quickly and efficiency while reducing errors in the usage of the device.

In some embodiments, while displaying the second user interface, the electronic device receives (734), via the one or more input devices, an input corresponding to a request to scroll down the second user interface; and in response to receiving the request to scroll down the second user interface (736): in accordance with a determination that a sports consumption history of a user of the electronic device satisfies one or more criteria, the electronic device reveals (738), on the display, a sports section that includes one or more representations of sports items that are recommended based on the sports consumption history of the user of the electronic device (e.g., different from activity of the user with respect to those content items in particular), wherein the one or more representations are selectable to initiate processes to access the respective sports items, such as in FIG. 6H. In some embodiments, the one or more criteria are satisfied if the user has watched a threshold amount of sports content. For example, the user has watched more than a threshold number of sports programs, more than a threshold duration of sports programming, more than a threshold number of sports programs from more than a threshold number of content types, has installed more than a threshold amount of sports-related applications, or has viewed more than a threshold amount of sports-related websites or product pages. In some embodiments, a row of sports item includes sports content items that are relevant to the user based on the user's past consumption or viewing activity. For example, in some embodiments, the sports row includes content from the sports which the user likes to watch or from teams that the user likes to watch. In some embodiments, items can be sorted or ordered based on the user's interest (e.g., content that the user is more likely to be interested in is displayed earlier than content that the user may be less interested in). In some embodiments, the sports row is not displayed if the one or more criteria is not satisfied (e.g., the user has not shown interest in sports content).

The above-described manner of suggesting content (e.g., by providing a row of sports content based on the user's past history) allows the electronic device to suggest to the user content that may be of interest to the user (e.g., by displaying sports specific content based on the user's consumption history), which simplifies the interaction between the user and the electronic device and enhances the operability of the electronic device and makes the user-device interface more efficient (e.g., by presenting rows content to the user that the user may be interested in without requiring the user to navigate to different user interfaces to find content), which additionally reduces power usage and improves battery life of the electronic device by enabling the user to use the electronic device more quickly and efficiency while reducing errors in the usage of the device.

In some embodiments, while displaying the second user interface, the electronic device receives (740), via the one or more input devices, an input corresponding to a request to scroll down the second user interface; and in response to receiving the request to scroll down the second user interface, the electronic device reveals (742), on the display, a genre section that includes one or more collections content items, wherein each respective collection of content items includes a plurality of representations of content items that correspond to a respective genre of content items and that are selectable to initiate processes to access the respective content items, such as in FIG. 6J (e.g., the second user interface can include one or more rows of content from particular genres). For example, a first row of items can have the genre of "Romantic Comedy" and another row of items can all have the genre of "Action and Adventure". In some embodiments, a predetermined number of rows of genres are displayed even if more genres are available. In some embodiments, the genres that are displayed are based on the user's viewing history (e.g., the user's top three most watched genres). In some embodiments, the second user interface includes only three rows of genres even though the user's viewing history suggests that the user is interested in five different genres of content. In some embodiments, if there is not enough viewing history to determine what genres the user is interested in, the second user interface can include rows for the most popular genres, independent of the user's content consumption activity.

The above-described manner of suggesting content (e.g., by providing one or more rows of different genres of content) allows the electronic device to suggest to the user content that may be of interest to the user (e.g., by displaying different content organized by genres based on the user's consumption history), which simplifies the interaction between the user and the electronic device and enhances the operability of the electronic device and makes the user-device interface more efficient (e.g., by presenting different genres of content to the user that the user may be interested in without requiring the user to navigate to different user interfaces to find content of different genres), which additionally reduces power usage and improves battery life of the electronic device by enabling the user to use the electronic device more quickly and efficiency while reducing errors in the usage of the device.

In some embodiments, while displaying the second user interface, the electronic device receives (744), via the one or more input devices, an input corresponding to a request to scroll down the second user interface; and in response to receiving the request to scroll down the second user interface, the electronic device reveals (746), on the display, a section that includes one or more representations of content items that are selected for inclusion in the section based on content consumption history of a user with respect to a respective content item, other than those included in a section based on prior user activity with respect to a plurality of content items, wherein the one or more representations are selectable to initiate processes to access the respective content items, such as in FIG. 6K (e.g., a row of content that is related to a particular content item that the user has previously watched). For example, if the user has previously watched Content 1, then the second user interface can include a row of content items that are similar to Content 1. In some embodiments, the second user interface can include multiple rows, each including items related to different items from the user's past viewing history (e.g., a first row of items similar to Content 1, a second row of items similar to Content 2, and a third row of items similar to Content 3). In some embodiments, items can be sorted or ordered based on the user's interest (e.g., content that the user is more likely to be interested in is displayed earlier than content that the user may be less interested in). In some embodiments, if there is not enough viewing history or if there is not enough content related to the user's viewing history, this row can be not displayed. In some embodiments, if a respective content item is already displayed in the "For You" row of content items, the respective content item will not be displayed in this row of content (and/or vice versa).

The above-described manner of suggesting content (e.g., by providing content that is similar or related to a previously watched content item) allows the electronic device to suggest to the user content that may be of interest to the user (e.g., by displaying content that is similar or related to content that the user has watched), which simplifies the interaction between the user and the electronic device and enhances the operability of the electronic device and makes the user-device interface more efficient (e.g., by presenting content to the user that the user may be interested in without requiring the user to navigate to different user interfaces or separately research and search for content that is similar to content that the user has previously watched), which additionally reduces power usage and improves battery life of the electronic device by enabling the user to use the electronic device more quickly and efficiency while reducing errors in the usage of the device.

In some embodiments, the electronic device receives (748), via the one or more input devices, an input corresponding to a request to display a third user interface of the unified media browsing application (e.g., a user interface dedicated to television shows and/or movies). In some embodiments, one user interface is dedicated for television shows and another user interface is dedicated for movies. In some embodiments, in response to receiving the input, displaying, on the display, the third user interface (750), such as in FIG. 6Q. In some embodiments, in accordance with a determination that the third user interface is a television show user interface, the third user interface includes a plurality of representations corresponding to a plurality of television shows that are selectable to initiate processes to access the respective television shows (e.g., a user interface that is dedicated to television shows), including a first set of small representations corresponding to a first set of television shows, and a second set of large representations corresponding to a second set of television shows (752), such as in FIG. 6Q. In some embodiments, the user interface includes multiple rows of items. In some embodiments, the rows described as being in the second user interface can also be included in the third user interface. For example, the user interface for television shows can include a row for genres of television shows, a row of content recommended to the user, etc. In some embodiments, the set of television shows include small icons of television shows and large icons of television shows. In some embodiments, the small icons can be arranged in a grid of 4 or 5 icons in a row. In some embodiments, the large icons can be arranged in a grid of one, two, or three icons in a row. In some embodiments, the large icons are used to visually differentiate content items to promote the respective content item. In some embodiments, in accordance with a determination that the third user interface is a movies user interface, the third user interface includes a plurality of representations corresponding to a plurality of movies that are selectable to initiate processes to access the respective movies (e.g., a user interface that is dedicated to movies), including a first set of small representations corresponding to a first set of movies, and a second set of large representations corresponding to a second set of movies (754), such as in FIG. 6Q. In some embodiments, the user interface includes multiple rows of items. In some embodiments, the rows described as being in the second user interface can also be included in the third user interface. For example, the user interface for movies can include a row for genres of movies, a row of content recommended to the user, etc. In some embodiments, the user interface includes both television and movie content items. In some embodiments, the set of movies include small icons of movies and large icons of movies. In some embodiments, the small icons can be arranged in a grid of 4 or 5 icons in a row. In some embodiments, the large icons can be arranged in a grid of one, two, or three icons in a row. In some embodiments, the large icons are used to visually differentiate content items to promote the respective content item.

The above-described manner of displaying content (e.g., by providing a user interface for television content and a separate user interface for movie content) allows the electronic device to provide the user with an organized user interface for browsing different categories of content (e.g., by sorting the content into different categories, such as television shows and movies and providing separate user interfaces for each category), which simplifies the interaction between the user and the electronic device and enhances the operability of the electronic device and makes the user-device interface more efficient (e.g., by organizing the content into user interfaces such that the user can intuitively and easily browse for and find content of interest, without requiring the user to navigate through multiple user interfaces or through a monolithic user interface to find desired content), which additionally reduces power usage and improves battery life of the electronic device by enabling the user to use the electronic device more quickly and efficiency while reducing errors in the usage of the device.

In some embodiments, a respective representation of the second set of large representations corresponds to a content item (756), such as in FIG. 6Q (e.g., the large icons or banners correspond to a particular content item that is being promoted or otherwise visually distinguished from the smaller icons of content items). In some embodiments, the large representation is also selectable to access the content item. In some embodiments, selection of the large representation causes playback of the respective content item. In some embodiments, selection of the large representation causes display of a product page related to the content item. In some embodiments, selection of the large representation causes display of a dedicated promotional page for the content item.

The above-described manner of displaying content (e.g., by displaying a large icon or banner to highlight certain suggested content) allows the electronic device to provide the user with highly suggested content (e.g., by displaying some content with a larger representation than other content, thus distinguishing the content and causing the content to be more noticeable by the user), which simplifies the interaction between the user and the electronic device and enhances the operability of the electronic device and makes the user-device interface more efficient (e.g., by displaying certain featured content in a way that is more easily noticeable by the user, without requiring the user to sort through multiple potentially visually indistinguishable content items to find desired content), which additionally reduces power usage and improves battery life of the electronic device by enabling the user to use the electronic device more quickly and efficiency while reducing errors in the usage of the device.

In some embodiments, a respective representation of the second set of large representations corresponds to a content provider (758), such as in FIG. 6Q (e.g., the large icons correspond to a particular content provider that is being promoted). In some embodiments, selection of a large icon corresponding to a content provider causes display of a user interface specific to the content provider. For example, the large icon can be for HBO and selection of the HBO icon causes display of an HBO page containing HBO content.

The above-described manner of suggesting a particular content provider (e.g., by providing a large icon promoting a particular content provider) allows the electronic device to provide the user with a suggested content provider (e.g., by displaying the icon of the content provider with a larger representation than other content, thus distinguishing the content provider and causing the content provider to be more noticeable by the user), which simplifies the interaction between the user and the electronic device and enhances the operability of the electronic device and makes the user-device interface more efficient (e.g., by suggesting to the user a featured content provider for the user to subscribe to, without requiring the user to sort through different user interfaces or separately contact the content provider to subscribe to the displayed content provider), which additionally reduces power usage and improves battery life of the electronic device by enabling the user to use the electronic device more quickly and efficiency while reducing errors in the usage of the device.

In some embodiments, the electronic device receives (760), via the one or more input devices, an input corresponding to a selection of the respective representation of the second set of large representations that corresponds to the content provider, such as in FIG. 6S (e.g., while the respective representation is highlighted, on a remote control device, receiving a click input corresponding to a selection of the highlighted item.). In some embodiments, in response to receiving the input corresponding to the selection of the respective representation of the second set of large representations that corresponds to the content provider, the electronic device displays (762), on the display, a user interface that corresponds to the content provider and includes one or more selectable representations of content items accessible via the content provider that are selectable to initiate processes to access the respective content items via the content provider, such as in FIG. 6T (e.g., displaying a user interface specific to the content provider). In some embodiments, the user interface specific to the content provider includes content accessible from the content provider. In some embodiments, selection of any of the selectable representations of content items causes playback of the respective content item. In some embodiments, playback occurs within the unified media browsing application. In some embodiments, playback occurs within a separate application. In some embodiments, selection of the selectable representations of content items causes display of an application download interface from which the user can download an application for the content provider.

The above-described manner of displaying information about a content provider (e.g., by displaying a user interface specific to the content provider including content available from the content provider) allows the electronic device to provide the user with suggested content (e.g., by displaying a user interface specific to a content provider and allowing a user to find content that is only provided by the content provider), which simplifies the interaction between the user and the electronic device and enhances the operability of the electronic device and makes the user-device interface more efficient (e.g., by providing only content that is provided by a desired content provider without requiring the user to browse through a monolithic list of content and separately determining which of the content in the monolithic list is provided by the desired content provider), which additionally reduces power usage and improves battery life of the electronic device by enabling the user to use the electronic device more quickly and efficiency while reducing errors in the usage of the device.

In some embodiments, the electronic device receives (764), via the one or more input devices, an input corresponding to a selection of the respective representation of the second set of large representations that corresponds to the content provider, such as in FIG. 6S (e.g., while the respective representation is highlighted, on a remote control device, receiving a click input corresponding to a selection of the highlighted item). In some embodiments, in response to receiving the input corresponding to the selection of the respective representation of the second set of large representations that corresponds to the content provider, the electronic device initiates (766) a process to download an application on the electronic device that corresponds to the content provider, and provides access to content from the content provider, via the application, on the electronic device, such as in FIG. 6U (e.g., display a page or user interface suggesting to the user to download an application for the content provider). In some embodiments, if the application for the content provider is already downloaded onto the electronic device, the user is not prompted to download the application. In some embodiments, instead of prompting the user to download the application, selection of the respective representation causes display of a canonical page for the content provider. In some embodiments, instead of prompting the user to download the application, the device launches the respective application for the content provider. In some embodiments, the application for the content provider provides the user with access to the content from the content provider. In some embodiments, downloading the application will automatically enable the application to share viewing information with the unified media browsing application.

The above-described manner of downloading a particular content provider (e.g., by promoting a particular content provider's application for accessing content) allows the electronic device to provide the user with a suggested content provider application (e.g., by displaying the icon promoting the content provider's app and automatically presenting an option for the user to download the content provider's app in response to the user selecting the icon), which simplifies the interaction between the user and the electronic device and enhances the operability of the electronic device and makes the user-device interface more efficient (e.g., by providing an easy and intuitive method of downloading the desired content provider's application to access content available via the desired content provider without requiring the user to navigate through different user interfaces to find and download the desired content provider's application), which additionally reduces power usage and improves battery life of the electronic device by enabling the user to use the electronic device more quickly and efficiency while reducing errors in the usage of the device.

In some embodiments, while displaying the third user interface, the electronic device receives (768), via the one or more input devices, an input corresponding to a request to scroll down the third user interface; and in response to receiving the request to scroll down the third user interface, the electronic device reveals (770), on the display, a section that includes one or more representations of one or more content applications that can be downloaded to the electronic device, the one or more content applications able to share content information with the unified media browsing application (e.g., and does not include content applications that can be downloaded to the electronic device that do not share content information with the unified media browsing application), wherein the one or more representations are selectable to initiate processes to download the one or more content application, such as in FIG. 6W. In some embodiments, the one or more content applications are configured to be compatible with sharing information with the unified media browsing application. In some embodiments, the section includes one or more representations of collections of applications and the selection of a representation of a collection of applications displays a user interface with icons of applications that are able to share content information with the user. For example, the row can include a "great apps" icon and selection of the icon displays a user interface with a number of applications that have been identified as a "great app", each of which are capable of sharing information with the unified media browsing application. In some embodiments, the collections of applications are not limited to only being displayed in the third user interface. For example, a row for collections of applications can be displayed in the first user interface, second user interface, or any other appropriate user interface. In some embodiments, downloading the applications will automatically enable the respective application to share information with the unified media browsing application. In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application uses the shared information and includes the available content from the respective content provider within the unified media browsing application's catalog to allow the user to browse or search for content from the respective content provider within the unified media browsing application. In some embodiments, selection of a respective content for the respective content provider from the unified media browsing application causes playback of the respective content, either within the unified media browsing application or the respective content provider's application. In some embodiments, selection of a respective content item for a respective content provider causes launch of the respective content provider's application and/or display of a product page for the respective content item.

The above-described manner of suggesting content applications (e.g., by displaying a row of applications for accessing content to download onto the electronic device) allows the electronic device to provide the user with suggested applications to download (e.g., by displaying a row of suggested applications for the user alongside content that the user is interested in), which simplifies the interaction between the user and the electronic device and enhances the operability of the electronic device and makes the user-device interface more efficient (e.g., by providing an organic method of suggesting applications for the user when the user has displayed an interest in a particular type of content without requiring the user to navigate to a separate application store application to browse for and download desired applications), which additionally reduces power usage and improves battery life of the electronic device by enabling the user to use the electronic device more quickly and efficiency while reducing errors in the usage of the device.

In some embodiments, the children's content user interface includes one or more representations of one or more characters that are selectable to display respective user interfaces corresponding to the respective characters that include a plurality of representations of content items in which the respective character is included, wherein the plurality of representations of content items in which the respective character is included are selectable to initiate processes to access the content items in which the respective character is included (772), such as in FIG. 6GG (e.g., a row with icons of different popular characters). In some embodiments, the characters displayed are those that the user's viewing history indicates is preferred by the user. In some embodiments, selection of the icon displays a user interface that displays only content that includes the selected character. In some embodiments, the characters can be sorted or ordered based on the user's interest (e.g., characters that the user is more likely to be interested in is displayed earlier than content that the user may be less interested in). In some embodiments, if the user has not provided enough viewing history to determine favorite characters, this row is not displayed. In some embodiments, the children's content user interface includes a row of top episodes of children's content. For example, a row of content can be dedicated to the most popular children's content. In some embodiments, the children's content user interface includes of row of content that has been editorially selected for children.

The above-described manner of displaying content (e.g., by displaying a row of character icons which are selectable to display content that include the selected character) allows the electronic device to provide the user with an easy method of accessing content (e.g., by displaying a row of character icons for filtering for only content that includes given characters that the user is interested in), which simplifies the interaction between the user and the electronic device and enhances the operability of the electronic device and makes the user-device interface more efficient (e.g., by providing the user with a method of quickly displaying only content that includes a given character, without requiring the user to browse through a monolithic list of content and separately determine whether particular content items include the desired character), which additionally reduces power usage and improves battery life of the electronic device by enabling the user to use the electronic device more quickly and efficiency while reducing errors in the usage of the device.

In some embodiments, while displaying the children's content user interface, the electronic device receives (774), via the one or more input devices, an input corresponding to a request to scroll down the children's content user interface; and in response to receiving the request to scroll down the children's content user interface, the electronic device reveals (776), on the display, an age section that includes a plurality of collections of content items, including: a first collection of first content items that are rated for a first age range of content consumers (778) (e.g., a row of content for children of a certain age range) and a second collection of second content items that are rated for a second age range, different than the first age range, of content consumers (e.g., a row of content for children of another age range.), wherein the representations of the first content items and the representations of the second content items are selectable to initiate processes to access the first and second content items (780), such as in FIG. 6JJ. In some embodiments, the plurality of collections includes rows that are sorted by predefined age groups for children. For example, one row of content can be for children of ages 0-2 and a second row of content can be for children of ages 3-5. In some embodiments, a row can include icons of collections of different age groups such that selection of a particular icon causes display of a user interface with content for the particular age group. For example, a row can include a first icon selectable to display content for children of ages 0-2 and a second icon selectable to display content for children of ages 3-5. In some embodiments, items can be sorted or ordered based on the user's interest (e.g., content that the user is more likely to be interested in is displayed earlier than content that the user may be less interested in). In some embodiments, the device determines what age ranges the user is interested in or the age ranges of the children in the user's family group and displays only rows of the age ranges that are relevant to the user. In some embodiments, the children's content user interface includes a row of collections for different age ranges (e.g., one selectable item for age 0-2 content selectable to display a page with content for children ages 0-2, another selectable item for ages 3-5, etc.).

The above-described manner of suggesting content (e.g., by displaying rows of content, each row dedicated to content for a particular age group) allows the electronic device to provide the user with age-appropriate suggested content (e.g., by displaying different rows for different age ranges of content), which simplifies the interaction between the user and the electronic device and enhances the operability of the electronic device and makes the user-device interface more efficient (e.g., by easily organizing content into age ranges without requiring the user to browse through a monolithic list and separately determine what the age range is of a given content item), which additionally reduces power usage and improves battery life of the electronic device by enabling the user to use the electronic device more quickly and efficiency while reducing errors in the usage of the device.

In some embodiments, the electronic device receives (782), via the one or more input devices, an input corresponding to a request to display a third user interface of the unified media browsing application, wherein the third user interface is a library user interface for displaying information about movies and television shows to which a user of the electronic device has purchased access, such as in FIG.

6BB. In some embodiments, the library user interface includes content items that the user has previously purchased or downloaded onto the electronic device. In some embodiments, the library sorts the content into categories and selection of the categories displays the respective content in a display region. In some embodiments, the content displayed is not streaming content and/or content that is accessible via a primary or secondary content provider. In some embodiments, the content displayed in the library user interface is accessible without a subscription, account, or entitlements with any content provider. In contrast, content displayed in the other described user interfaces are accessible via a streaming service via a subscription with a content provider. In some embodiments, in response to receiving the input, the electronic device displays (784), on the display, the library user interface, including a category filtering element that includes one or more categories with which to filter content items displayed on the library user interface, and a content item display region that includes one or more representations of one or more television shows and one or more movies that correspond to one or more categories selected in the category filtering element (e.g., displaying content in the content item display region corresponding to the category that is selected.), wherein the one or more representations of the one or more television shows are selectable to initiate processes to access the respective television shows, and the one or more representations of the one or more movies are selectable to initiate processes to access the respective movies, such as in FIG. 6BB. In some embodiments, one or more categories, which when selected, causes display of only content that match the selected category. For example, a first category can be "TV Shows" and selection of this category causes display of only tv shows and a second category can be "Movies" and selection of this category causes display of only movies. In some embodiments, the categories can be for different genres, such as action and adventure content, comedy content, documentary content, dramatic content, and children's content. In some embodiments, the categories can include rented content and/or recently purchased items.

The above-described manner of displaying previously acquired content (e.g., by displaying a user interface dedicated to content that has been previously acquired by the user) allows the electronic device to provide the user with content (e.g., by displaying a user interface of previously acquired items sorted into different categories and genres), which simplifies the interaction between the user and the electronic device and enhances the operability of the electronic device and makes the user-device interface more efficient (e.g., by providing a single user interface that contains the user's previously acquired content sorted into categories and genres without requiring the user to browse through a monolithic list of content and separately determining whether a particular content item has been previously acquired or what category the content belongs in), which additionally reduces power usage and improves battery life of the electronic device by enabling the user to use the electronic device more quickly and efficiency while reducing errors in the usage of the device.

In some embodiments, the electronic device receives (786), via the one or more input devices, an input corresponding to a request to display a third user interface of the unified media browsing application, wherein the third user interface is a search user interface for searching content accessible via the unified media browsing application, such as in FIG. 6MM. In some embodiments, the search user interface includes a search page or tab in which a user can search for content that is either accessible via the primary or secondary content providers that the unified media browsing application has access to or the content that has been rented, purchased, or otherwise downloaded onto the electronic device. In some embodiments, in response to receiving the input corresponding to the request to display the search user interface, the electronic device displays (788), on the display, the search user interface, including one or more representations of one or more prior searches conducted by a user of the electronic device that are selectable to perform those searches in the search user interface, such as in FIG. 6OO (e.g., without the user inputting any text to begin searching for content, display previous search strings performed on the electronic device). In some embodiments, three, four, or five previous search strings can be displayed as icons. In some embodiments, selection of a respective search string causes a search for content that matches the selected search string. In some embodiments, icons of the previous search strings are displayed in a row. In some embodiments, if the user does not begin entering text after a threshold amount of time (e.g., 1 second, 2 seconds, 3 seconds), then the search user interface displays suggested items for the user to select from (e.g., as rows of content). In some embodiments, the automatically displayed suggested items are organized into categories, such as trending items, movies, tv shows, etc. In some embodiments, the previous search options are displayed in the same area as the suggested items, which is the same area that the results of the search are displayed. In some embodiments, when the user begins entering text to begin search, the row of previous search strings (and automatically displayed suggested items, if displayed) ceases to be displayed and is replaced with results of the search. In some embodiments, the search is performed live while the user is entering text and content that matches the text entered so far is displayed. In some embodiments, the results of the search are sorted based on the type of content displayed. For example, the search results can be organized into a row of television shows, a row of movies, etc. In some embodiments, items can be sorted or ordered based on the user's interest (e.g., content that the user is more likely to be interested in is displayed earlier than content that the user may be less interested in).

The above-described manner of searching for content (e.g., by displaying a user interface dedicated for searching for content and displaying previous searches) allows the electronic device to provide the user with content (e.g., by displaying a search user interface with representations of previous searches which the user can select to re-perform the previous search), which simplifies the interaction between the user and the electronic device and enhances the operability of the electronic device and makes the user-device interface more efficient (e.g., by providing a single user interface that allows the user to search and to re-perform a previous search, without requiring the user to enter the entire search string again to perform the previous search), which additionally reduces power usage and improves battery life of the electronic device by enabling the user to use the electronic device more quickly and efficiency while reducing errors in the usage of the device.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700, 1900, 2100, and 2300) are also applicable in an analogous manner to method 700 described above with respect to FIGS. 7A-7K. For example, the operation of the electronic device to present content in the unified media browsing application described above with reference to method 700 optionally has one or more of the characteristics of the presentation of information on representations of content items, displaying of content in a unified media browsing application, linking of an account for a primary content provider, restricting of access to content based on the geographic location of the device, and presentation of playback menus during playback of content in a unified media browsing application, displaying user interfaces specific to a respective content item, displaying content items, etc., described herein with reference to other methods described herein (e.g., methods 900, 1100, 1300, 1500, 1700, 1900, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 7A-7K are, optionally, implemented by components depicted in FIGS. 1A-1B. For example, displaying operations 702, 706, 714, 718, 724, 730, 738, 742, 746, 750, 762 766, 770, 776, 784, and 788, receiving operations 704, 722, 726, 734, 740, 744, 748, 760, 762, 768, 774, 782, and 786, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Information on Representations of Content Items

Users interact with electronic devices in many different manners, including using an electronic device to browse and access content in a media browsing application. In some embodiments, an electronic device aggregates available content in a single unified media browsing application. In some embodiments, the available content is displayed as selectable representations of content items. The embodiments described below provide ways in which an electronic device presents information on the representations of the content items, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8H illustrate exemplary ways in which an electronic device presents information on representations of content items in accordance with some embodiments of the disclosure. The embodiments in these figures are used to illustrate the processes described below, including the processes described with reference to FIGS. 9A-9E.

FIGS. 8A-8H illustrate the electronic device 500 presenting information on representations of content items. It is understood that although the discussion below describes the presentation of information on representations of content items in user interfaces of a unified media browsing application, the methods of presenting information on representations of content items are not limited to unified media browsing applications and can be implemented in any media browsing interface.

Figure 8A:
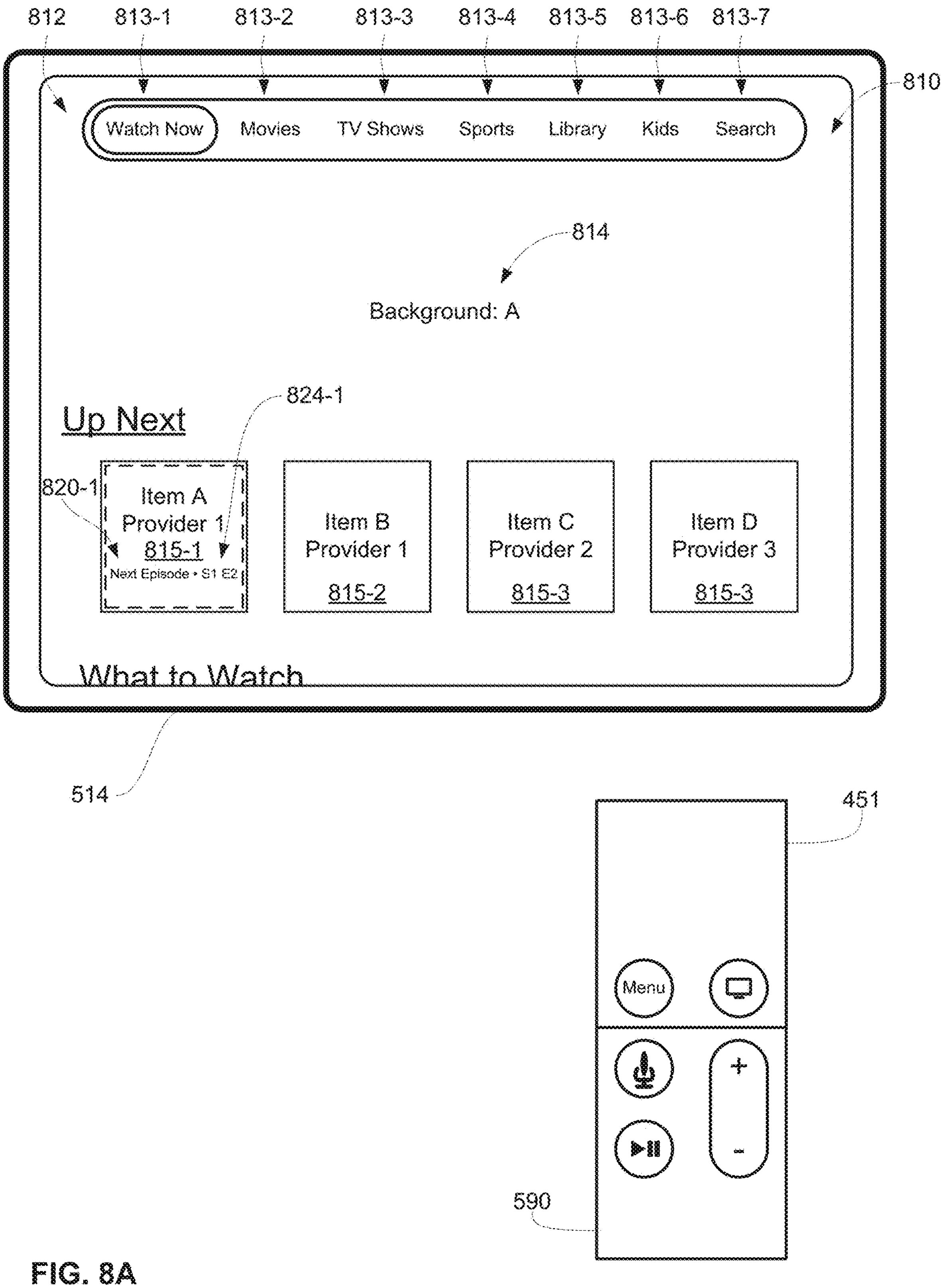
FIGS. 8A-8H illustrate exemplary ways in which an electronic device presents information on representations of content items in accordance with some embodiments of the disclosure.

FIG. 8A illustrates user interface 810 of a media browsing application corresponding to the "Watch Now" page (e.g., similar to user interface 610 described above with respect to FIG. 6D). The user interface includes a navigation bar 612 that includes a plurality of selectable options 813-1 to 813-7. The navigation bar 802 indicates that the user interface is currently a "Watch Now" user interface that is related to content of multiple types, such as television and movies. In some embodiments, user interface 610 includes rows of content items, including an "Up Next" row of content. In some embodiment, icons 815-1 to 815-4 correspond to the "Up Next" row of content and is similar to or shares similar features as the "Up Next" content described above with respect to FIG. 6D. Each of icons 815-1 to 815-4 are selectable to cause playback of the corresponding content. In some embodiments, only representations in the "Up Next" row are selectable to cause playback of the content. In some embodiments, representations in rows other than the "Up Next" row are selectable to display a product page or canonical page for the corresponding content item (e.g., from which the user optionally is able to select a selectable option to cause playback of the content item).

In some embodiments, the icons (e.g., representations) of content can include one or more indicators. In some embodiments, the icons of content include no indicators and only display the representation of the content (e.g., still image, logo, screen shot, video clip, etc.). In some embodiments, the indicators indicate the playback status of the representation, the type of content item, the reason why the content is selected for inclusion in the "up next" queue, and/or the application needed to playback the content item, as will be described in more detail below. In some embodiments, the indicators are overlaid on top of the icons (e.g., on top of the graphic in the representation). In some embodiments, the indicators are embedded into the icons (e.g., but still displayed above the graphic in the representation). In some embodiments, the indicators can be textual labels, icons, and/or other graphic, etc. In some embodiments, one or more of the indicators are only displayed when the icon has a focus. In some embodiments, only displaying certain indicators when the content has a focus reduces the clutter of information on the screen and only provides information to the user when the user is likely to be interested in receiving the information. In some embodiments, one or more of the indicators are displayed at all times (e.g., even when the icon does not have a current focus). In some embodiments, if a plurality of indicators is displayed, the indicators can be shifted, re-aligned, resized, or even merged. In some embodiments, only icons in the "Up Next" row include the indicators described herein (e.g., other rows of content do not include any or only include a subset of the indicators that can be included in the icons in the "Up Next" row). In some embodiments, all icons in the unified media browsing application can include the indicators described herein. In some embodiments, certain rows can include indicators even though the content is not included in the "Up Next" row (e.g., such as sports content, news content, or other live broadcast content, as will be described below with respect to FIGS. 8F-8H).

In FIG. 8A, icon 815-1 corresponding to "Item A" has a current focus (e.g., as shown by the dashed box). In some embodiments, "item A" is a television episode of a series that the user has recently watched. In some embodiments, "item A" was explicitly added to the "Up Next" row by the user. In some embodiments, "item A" was automatically added to the "Up Next" row because of the user's recent viewing of the previous episode of the television series corresponding to "item A". Thus, in some embodiments, icon 815-1 includes indicator 820-1 and indicator 824-1. In some embodiments, indicator 820-1 indicates that "item A" is the next episode of a television series that the user has previously watched (or just watched) (e.g., "Next Episode"). In some embodiments, indicator 824-1 indicates the season and episode corresponding to "item A". In some embodiments, indicator 824-1 can be indicated as "S1 E2" or "Season 1 Episode 2" or any other suitable indication of the season and episode of item A. In some embodiments, the user has not partially watched item A, so icon 815-1 does not include an indicator of the playback progress of item A.

Figure 8B:
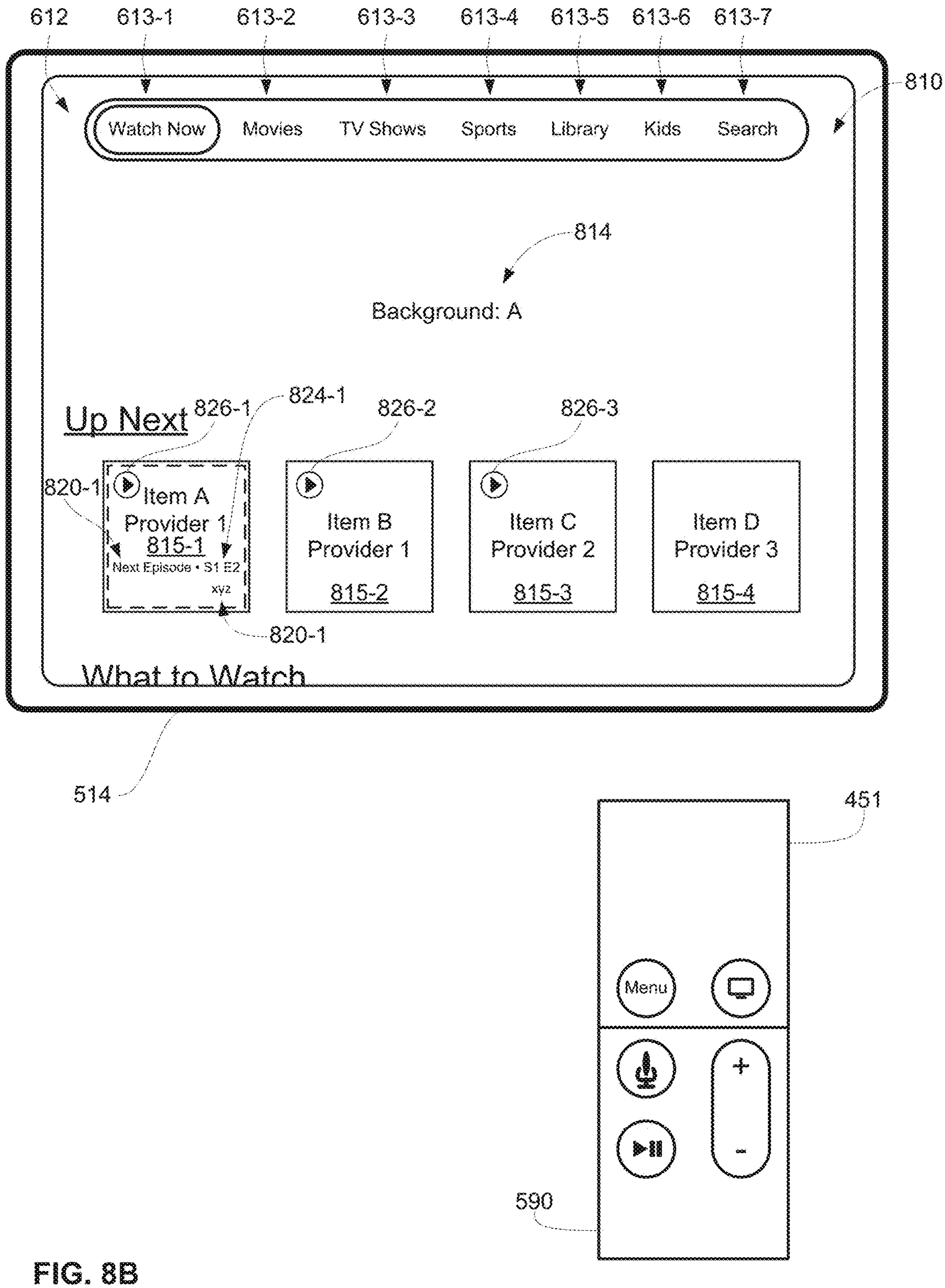

FIG. 8B illustrates an alternative exemplary embodiment of user interface 810 in which the icons include indicator 826-1 indicating that the user is entitled to view the respective content if the user is entitled to view the content. In some embodiments, indicator 826-1 is a play icon or any other suitable indicator to indicate that selection of the respective icon initiates a process to play back the corresponding content item. In some embodiments, indicator 826 is displayed at all times, even when the respective icon does not have a focus. In some embodiments, if the user is not entitled to view a particular content item, the corresponding icon does not include the entitlement indicator 826 (e.g., such as icon 815-3). In some embodiments, selection of a content item in which the user is not entitled to view can cause device 500 to display a product page from which the user can subscribe to a respective content provider to gain access to the respective content item. In some embodiments, item 815-1 includes indicator 820-1 that indicates that the corresponding content item is playable from within the unified media browsing application (e.g., as opposed to launching a separate application to cause playback). In some embodiments, indicator 820-1 is a logo of a particular content provider whose content is compatible to be placed within the unified media browsing application. In some embodiments, indicator 820-1 is a logo or other suitable symbol that indicates that playback will occur within the unified media browsing application.

Figure 8C:
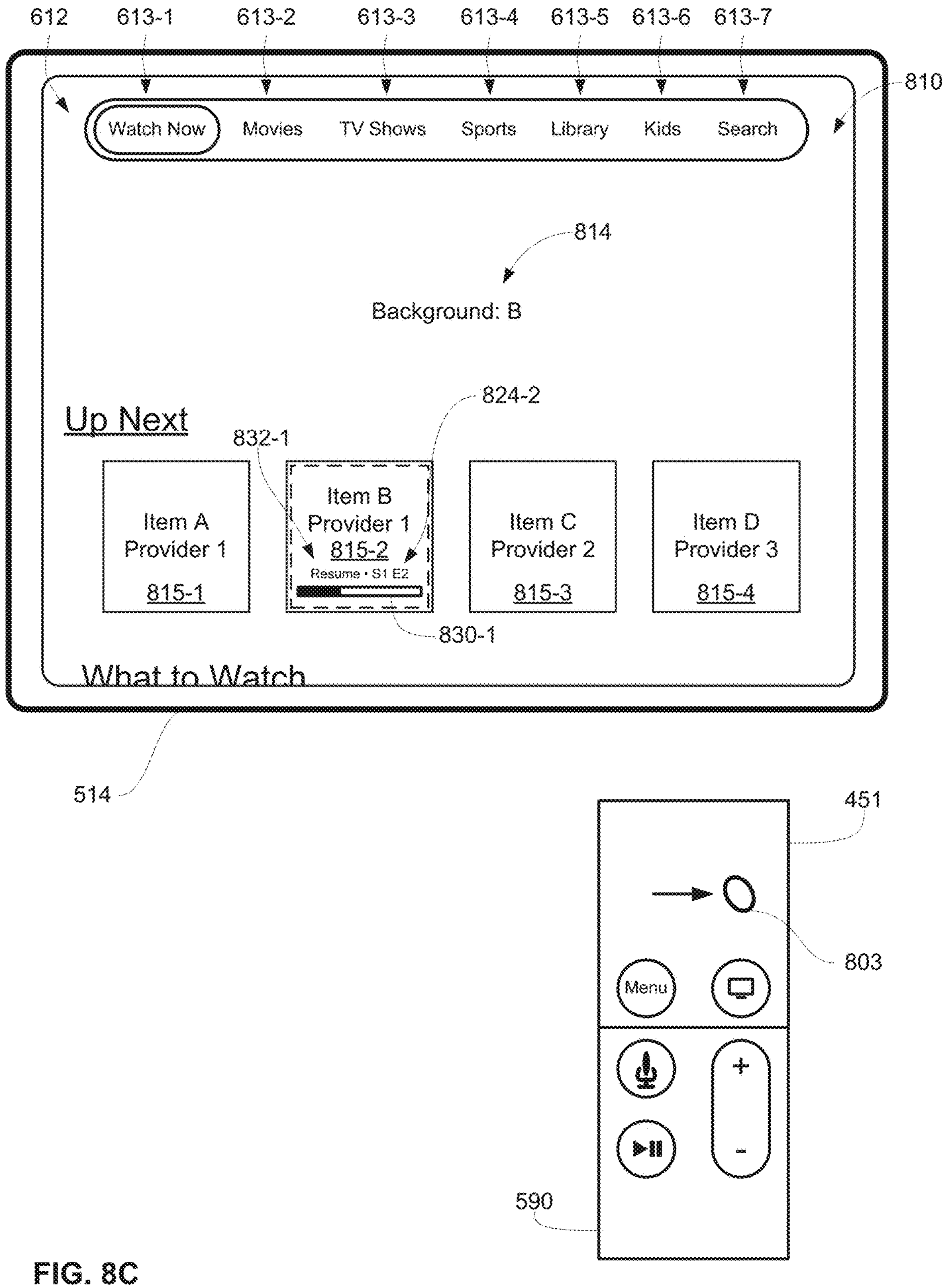

In FIG. 8C, a user input 803 corresponding to a rightward navigation (e.g., rightward swipe on touch-sensitive surface 451) is received. In some embodiments, in response to user input 803, the focus is moved to icon 815-2 corresponding to item B. In some embodiments, because icon 815-1 no longer has a focus, the indicators described above with respect to FIGS. 8A-8B are no longer displayed. In some embodiments, because icon 815-2 now has a focus, indicators are displayed on icon 815-2. In some embodiments, icon 815-2 includes indicator 832-1, indicator 824-2, and indicator 830-1. In some embodiments, indicator 832-1 indicates that the user has partially watched "item B" and selection of icon 815-2 will resume playback of item B (e.g., "Resume"). In some embodiment, indicator 824-2 indicates the season and episode of item B because item B is an episode of a television series (e.g., or otherwise an episode of episodic content). In some embodiments, because the user has partially watched item B, icon 815-2 includes indicator 830-1 that indicates the playback progress of item B. In some embodiments, indicator 830-1 is a graphical playback progress bar. In some embodiments, indicator 830-1 is a textual label indicating the remaining time and/or the current playback position.

Figure 8D:
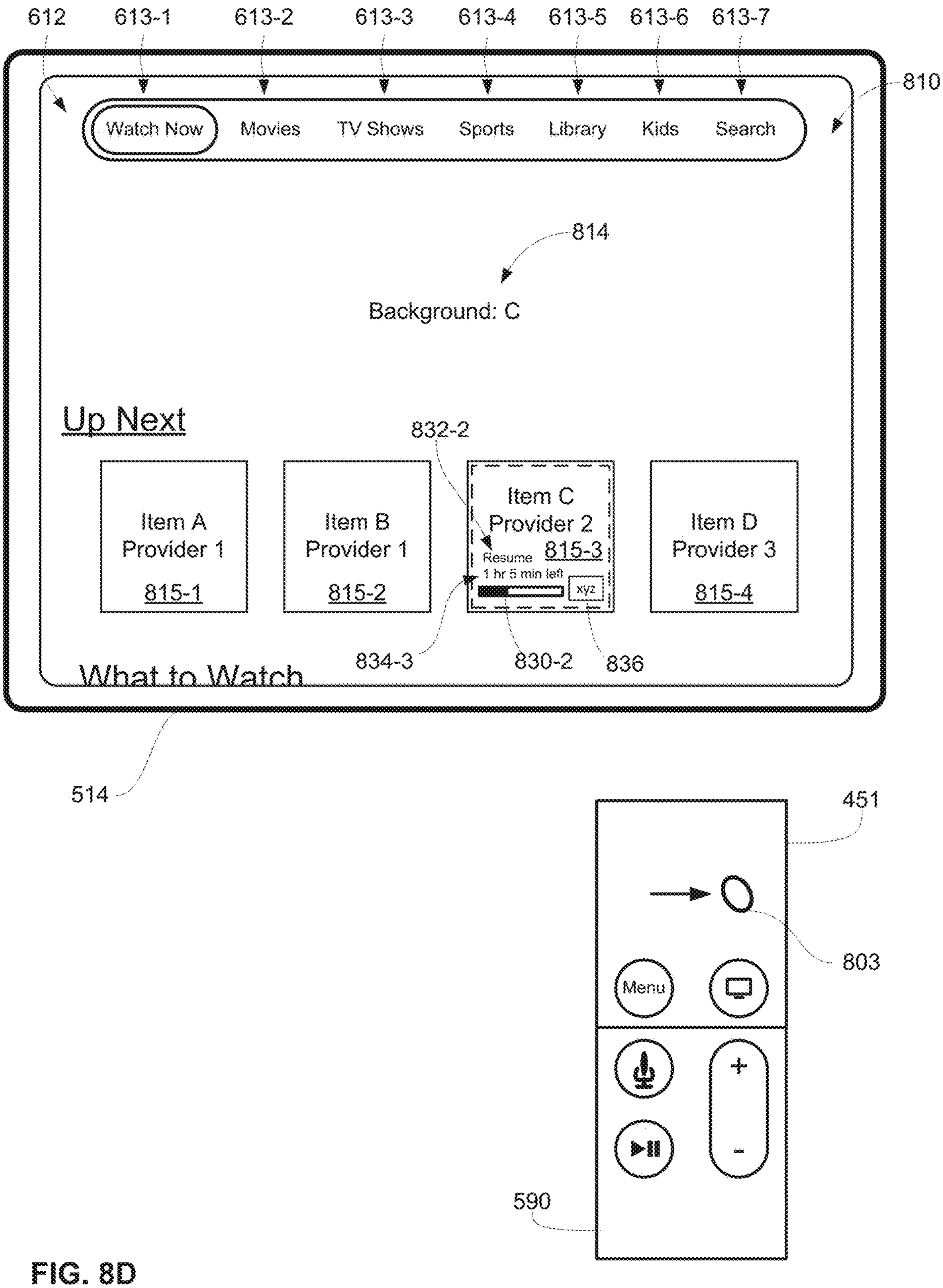

In FIG. 8D, a user input 803 corresponding to a rightward navigation (e.g., rightward swipe on touch-sensitive surface 451) is received. In some embodiments, in response to user input 803, the focus is moved to icon 815-3. In some embodiments, item C corresponding to icon 815-3 is a movie content item that the user has partially watched. In some embodiments, icon 815-3 includes indicator 832-2, indicator 834-3, indicator 830-2 and indicator 836. In some embodiments, indicator 832-2 indicates that the user has partially watched "item C" and selection of icon 815-3 will resume playback of item C (e.g., "Resume"). In some embodiments, indicator 834-3 is a textual label that indicates the remaining playback time of content C. In some embodiments, indicator 830-2 is a graphical playback progress bar. In some embodiments, indicator 836 indicates that the corresponding content item is playable using a separate application (e.g., separate from the unified media browsing application) and selection of icon 815-3 will cause launch the separate application to cause playback of the content item. In some embodiments, indicator 836 is a logo of a particular content provider that is providing the content item or the application from which the content item will be played. In some embodiments, indicator 836 is a logo or other suitable symbol that indicates that playback will not occur within the unified media browsing application. In some embodiments, indicator 836 has a different visual characteristic than indicator 820-1 described above with respect to FIG. 8B. For example, in some embodiments, indicator 836 has a border or frame and indicator 820-1 does not have an indicator or border and the background color of indicator 820-1 is transparent or translucent and fades into the image displayed on icon 815-1. In some embodiments, if the user has not partially watched item C (e.g., corresponding to a movie item), then icon 815-3 optionally does not include some or all of indicator 832-2, indicator 834-3 and indicator 830-2. In some embodiments, if the user has not partially watched item C, then icon 815-3 optionally includes an indicator of the total duration of the content item. In some embodiments, if item C is part of a series of movies, then icon 815-3 optionally includes an "Sequel" or "Next Movie" indicator (e.g., for movies with prequels and sequels, movies with multiple parts, etc.).

Figure 8E:
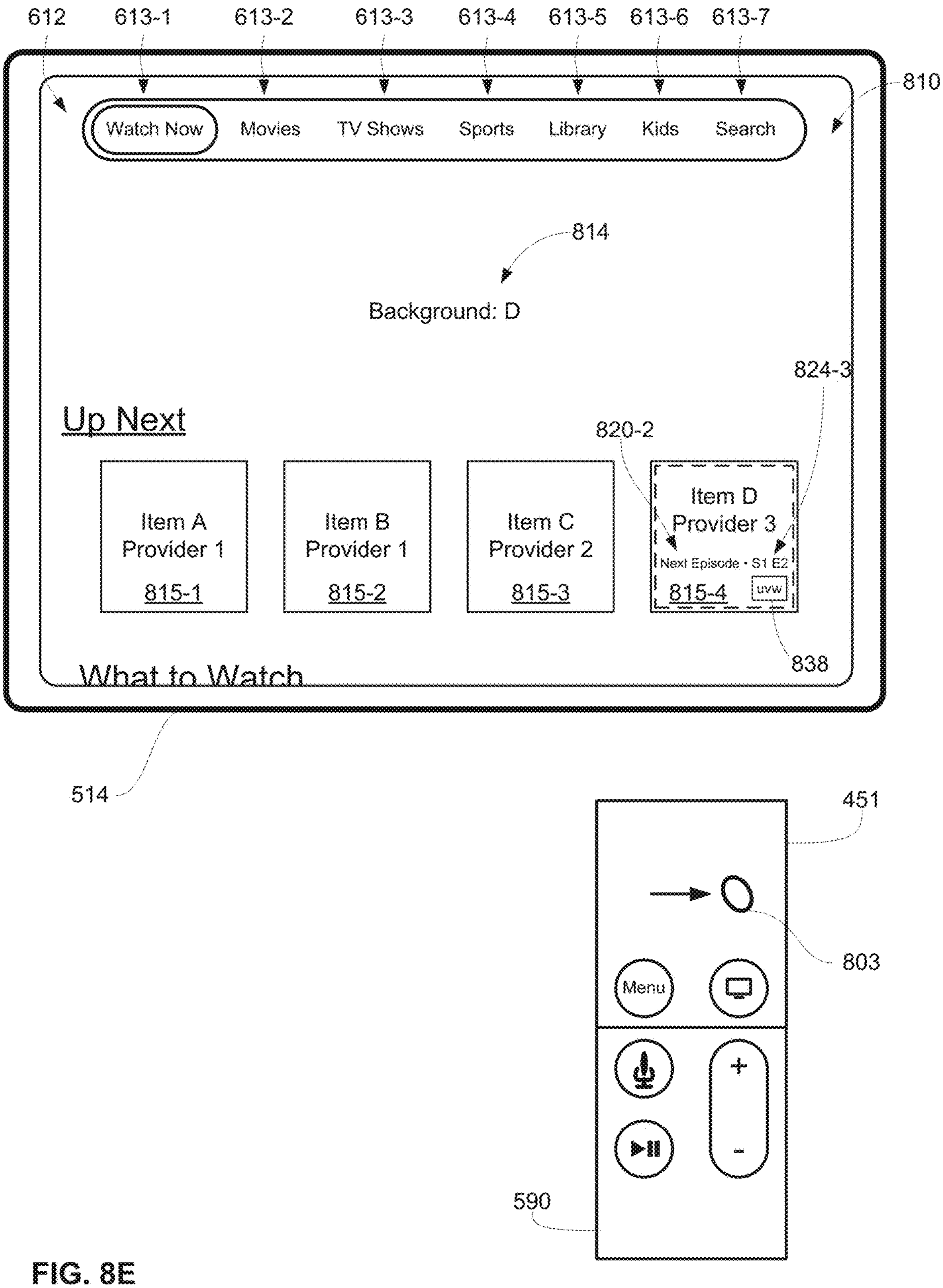

In FIG. 8E, a user input 803 corresponding to a rightward navigation (e.g., rightward swipe on touch-sensitive surface 451) is received. In some embodiments, in response to user input 803, the focus is moved to icon 815-4 corresponding to item D. In some embodiments, item D is a television episode, playback of which occurs in an application separate from the unified media browsing application (e.g., selection of icon 815-4 causes launch of a separate application to playback item D). In some embodiments, icon 815-3 includes indicator 820-2, indicator 824-3 and indicator 838. In some embodiments, indicator 820-2 indicates that item D is the next episode in a television series that the user has been watching and indicator 824-3 indicates the season and episode corresponding to item D. In some embodiments, indicator 838 indicates that the corresponding content item is playable using a separate application (e.g., separate from the unified media browsing application) and selection of icon 815-4 will cause launch the separate application to cause playback of the content item. In some embodiments, indicator 838 is a logo of a particular content provider that is providing the content item or the application from which the content item will be played. In some embodiments, indicator 838 is a logo or other suitable symbol that indicates that playback will not occur within the unified media browsing application.

Figure 8F:
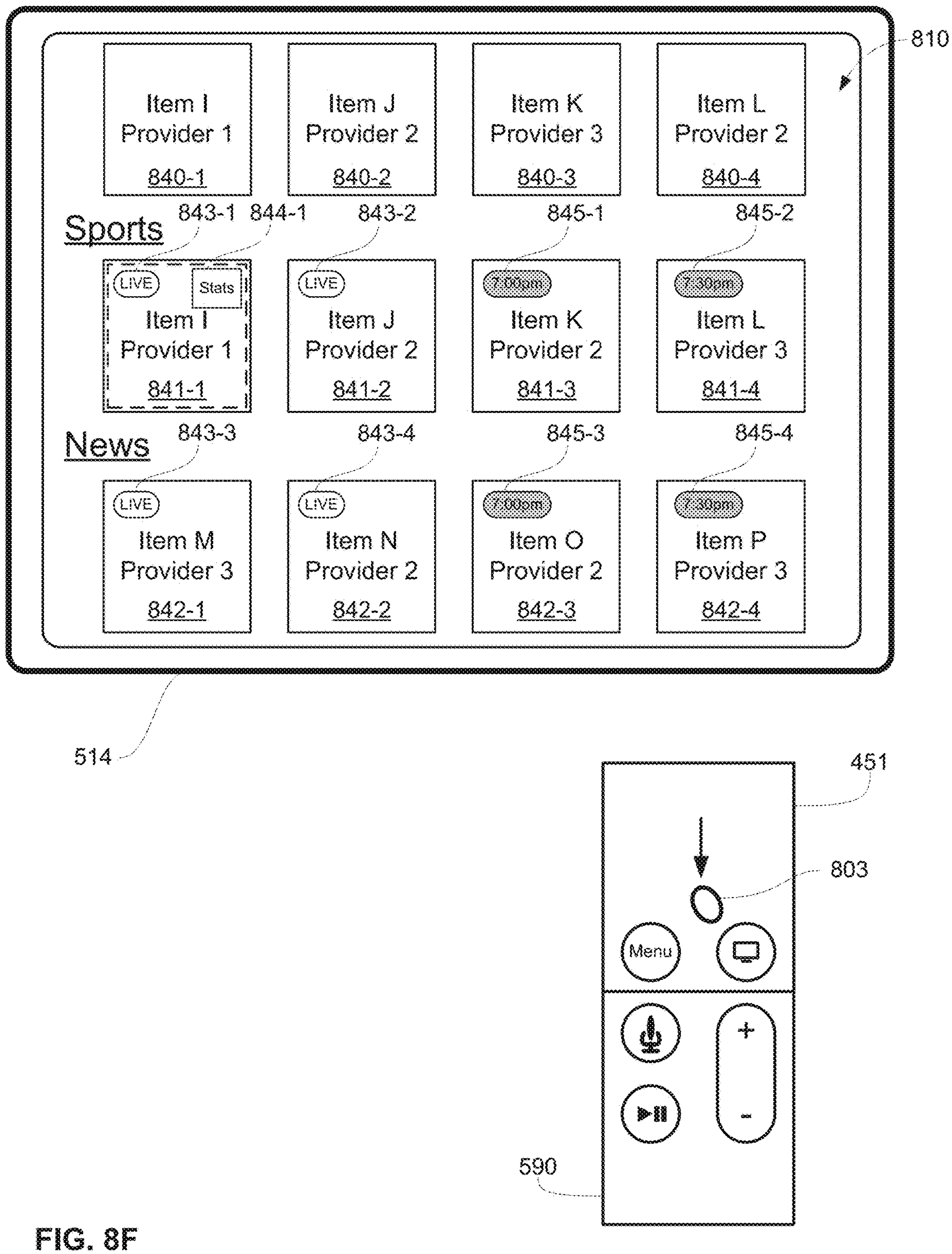

In FIG. 8F, a user input 803 corresponding to a downward navigation (e.g., downward swipe on touch-sensitive surface 451) is received. In some embodiments, in response to user input 803, the focus is moved downwards. In some embodiments, user interface 810 is updated and reveals more rows of content below the "Up Next" row. For example, user interface 810 includes a "sports" row and a "news" row corresponding to live broadcast sports and news content, respectively. It is understood that the order of rows shown is exemplary and user interface 810 can have any order, any number, or any type of rows, similar to those described above with respect to FIGS. 6B-6KK.

In some embodiments, the sports row includes icons 841-1 to 841-4 corresponding to sports content items. In some embodiments, the sports content items in the sports row are sports games or content that are being or will be broadcast live (e.g., as opposed to on-demand). In some embodiments, because the sports content items are live broadcast items, icons 841-1 to 841-4 include indicators that indicate that the respective content is a live broadcast item and whether the item is currently being broadcast live or is scheduled to be broadcast at a future time. For example, icon 841-1 includes indicator 843-1 that indicates that item I is currently being broadcast live (e.g., an icon, graphic, or textual label). In some embodiments, because icon 841-1 is of a currently live broadcast content item, the live broadcast of the live content is displayed in icon 841-1 itself. In other words, instead of a still image or animation representing the content item, icon 841-1 displays the current live broadcast of the content item. In some embodiments, icon 845 includes indicator 845-1 that indicates that item K is scheduled to be broadcast live at 7:00 pm (e.g., an icon, graphic, or textual label). In some embodiments, indicator 843-1 indicating a current live broadcast and indicator 845-1 indicating a future broadcast time have different visual characteristics. For example, live broadcast indicators 843-1 and 843-2 is colored red, while future broadcast indicators 845-1 and 845-2 is colored white. In some embodiments, other visual distinguishing characteristics are possible to distinguish currently live indicators and future broadcast indicators. In some embodiments, indicators 843-1, 843-2, 845-1, and 845-2 indicating the broadcast status of the content items are displayed on the icons at all times, even when the content is not currently in focus. In some embodiments, indicators 843-1, 843-2, 845-1, and 845-2 are displayed on the icons even though the content is not contained in the "Up Next" row. In some embodiments, icon 841-1 includes indicator 844-1. In some embodiments, indicator 844-1 is a graphical or textual indication of statistics associated with the content that is currently broadcast in item I. In some embodiments, indicator 844-1 is only displayed if the content is associated with one or more statistics. For example, if item I is a sports game, then indicator 844-1 includes one or more of the current score of the sports game, the current game clock of the sports game, the current period of the game (e.g., quarter, half, etc.), the participating teams, etc. For example, indicator 844-1 can indicate that the current score of the game is 100 to 95, the participating teams are Apples vs. Oranges, and the current game time is 0:23 in the second quarter. In some embodiments, indicator 844-1 described above is not limited to only sports games and can be included for any live broadcast item that is associated with statistics. For example, a news item that is covering an election can display a statistics indicator to indicate the current election or polling results, or a donation drive broadcast can display a statistics indicator to indicate the number or amount of donations that have been received.

In some embodiments, the news row includes icons 842-1 to 842-4 corresponding to news content items. In some embodiments, similarly to the sports row, the news content items are news segments or content that are being or will be broadcast live (e.g., as opposed to on-demand). In some embodiments, because the news content items are live broadcast items, icons 842-1 to 842-4 include indicators that indicate that the respective content is a live broadcast item and whether the item is currently being broadcast live or is scheduled to be broadcast at a future time. For example, icon 842-1 includes indicator 843-3 that indicates that item M is currently being broadcast live (e.g., an icon, graphic, or textual label). In some embodiments, because icon 842-1 is of a currently live broadcast content item, the live broadcast of the live content is displayed in icon 842-1 itself. In other words, instead of a still image or animation representing the content item, icon 842-1 displays the current live broadcast of the content item. In some embodiments, icon 842-3 includes indicator 845-3 that indicates that item O is scheduled to be broadcast live at 7:00 pm (e.g., an icon, graphic, or textual label). In some embodiments, indicator 843-3 indicating a current live broadcast and indicator 845-3 indicating a future broadcast time have different visual characteristics. For example, live broadcast indicators 843-3 and 843-4 is colored red, while future broadcast indicators 845-3 and 845-4 is colored white. In some embodiments, other visual distinguishing characteristics are possible to distinguish currently live indicators and future broadcast indicators. In some embodiments, indicators 843-3, 843-4, 845-3, and 845-4 indicating the broadcast status of the content items are displayed on the icons at all times, even when the content is not currently in focus. In some embodiments, indicators 843-3, 843-4, 845-3, and 845-4 are displayed on the icons even though the content is not contained in the "Up Next" row.

Figure 8G:
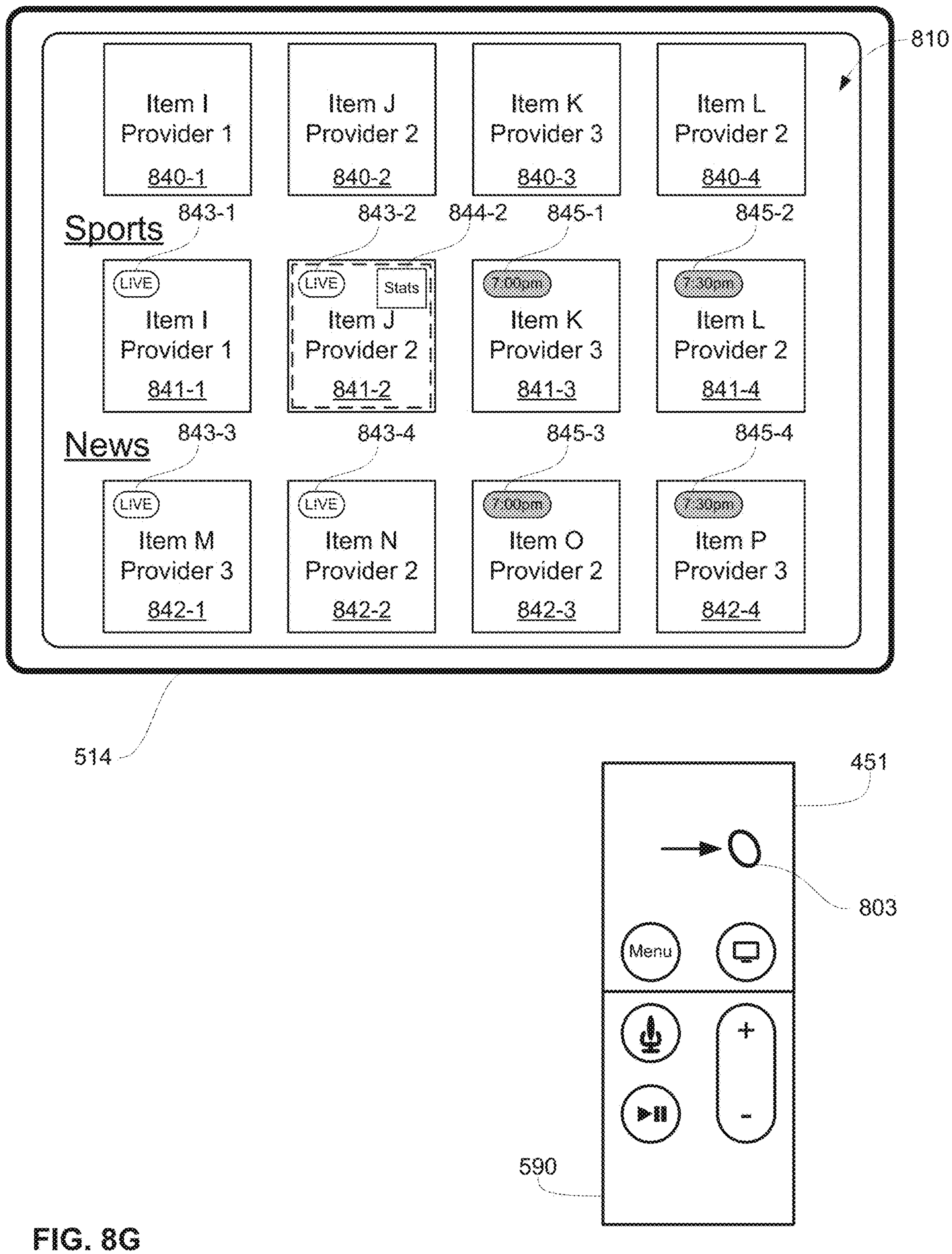
Figure 8H:
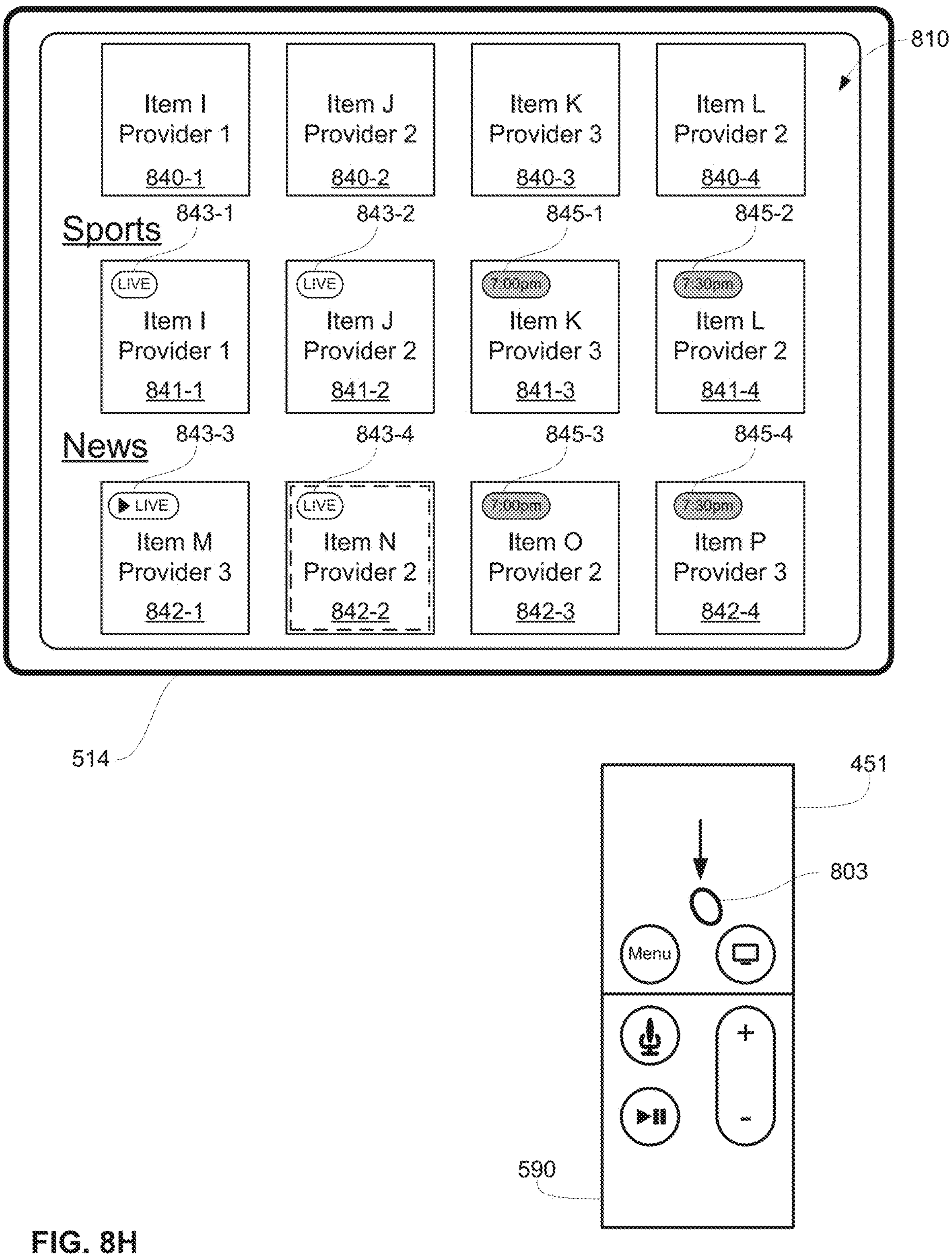
Figure 9A:
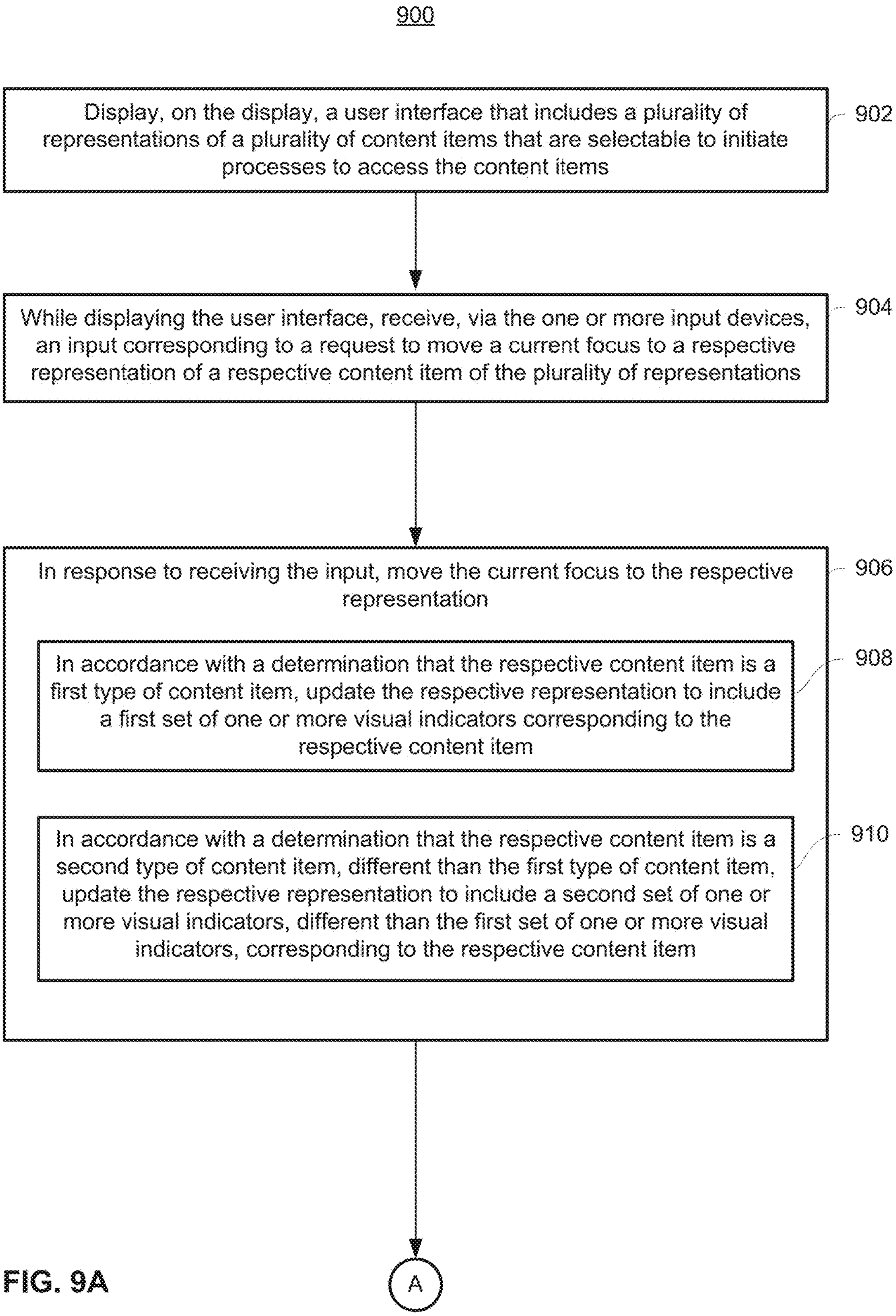
FIGS. 9A-9E are flow diagrams illustrating a method of presenting information on representations of content items in accordance with some embodiments of the disclosure.
Figure 9B:
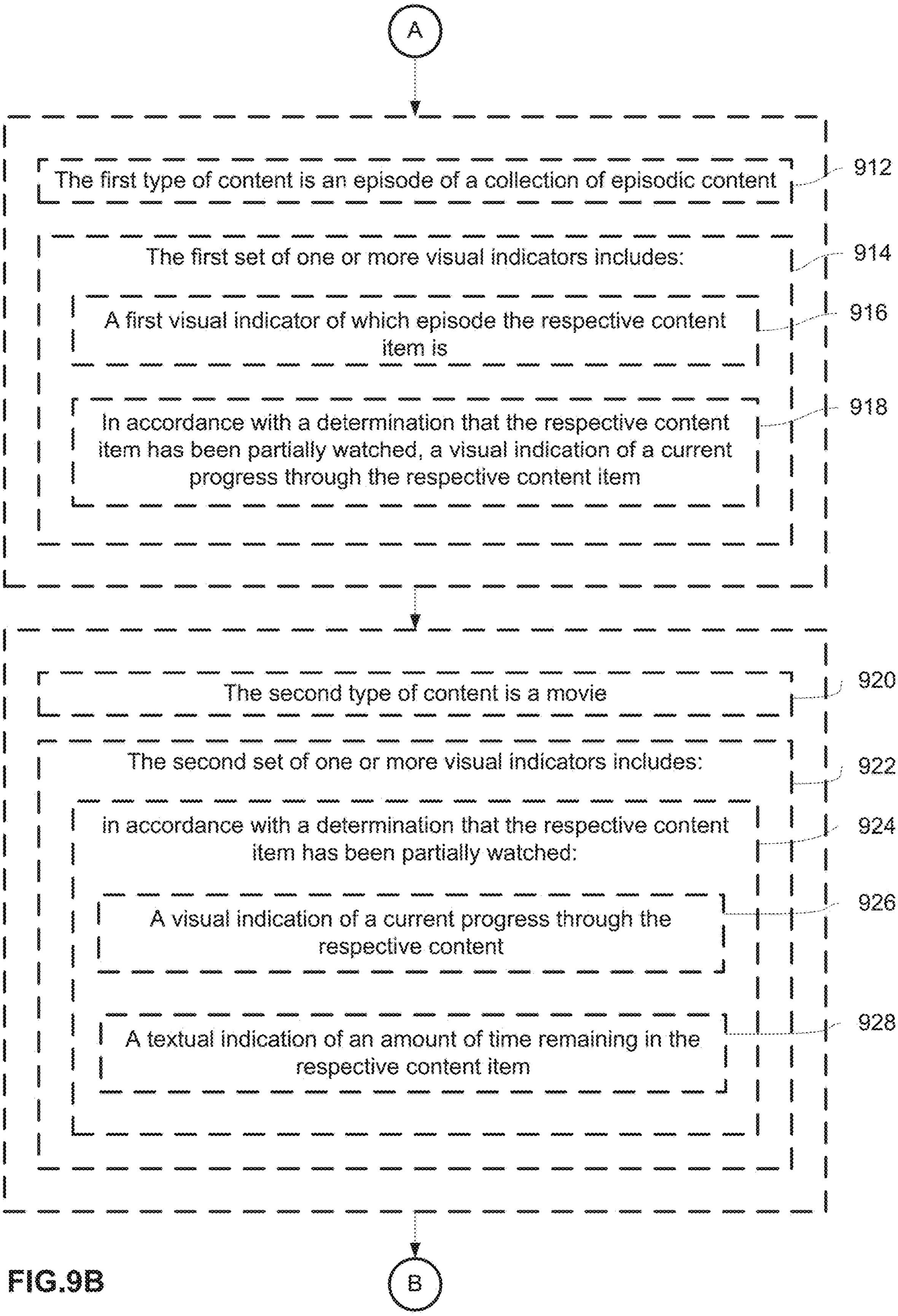
Figure 9C:
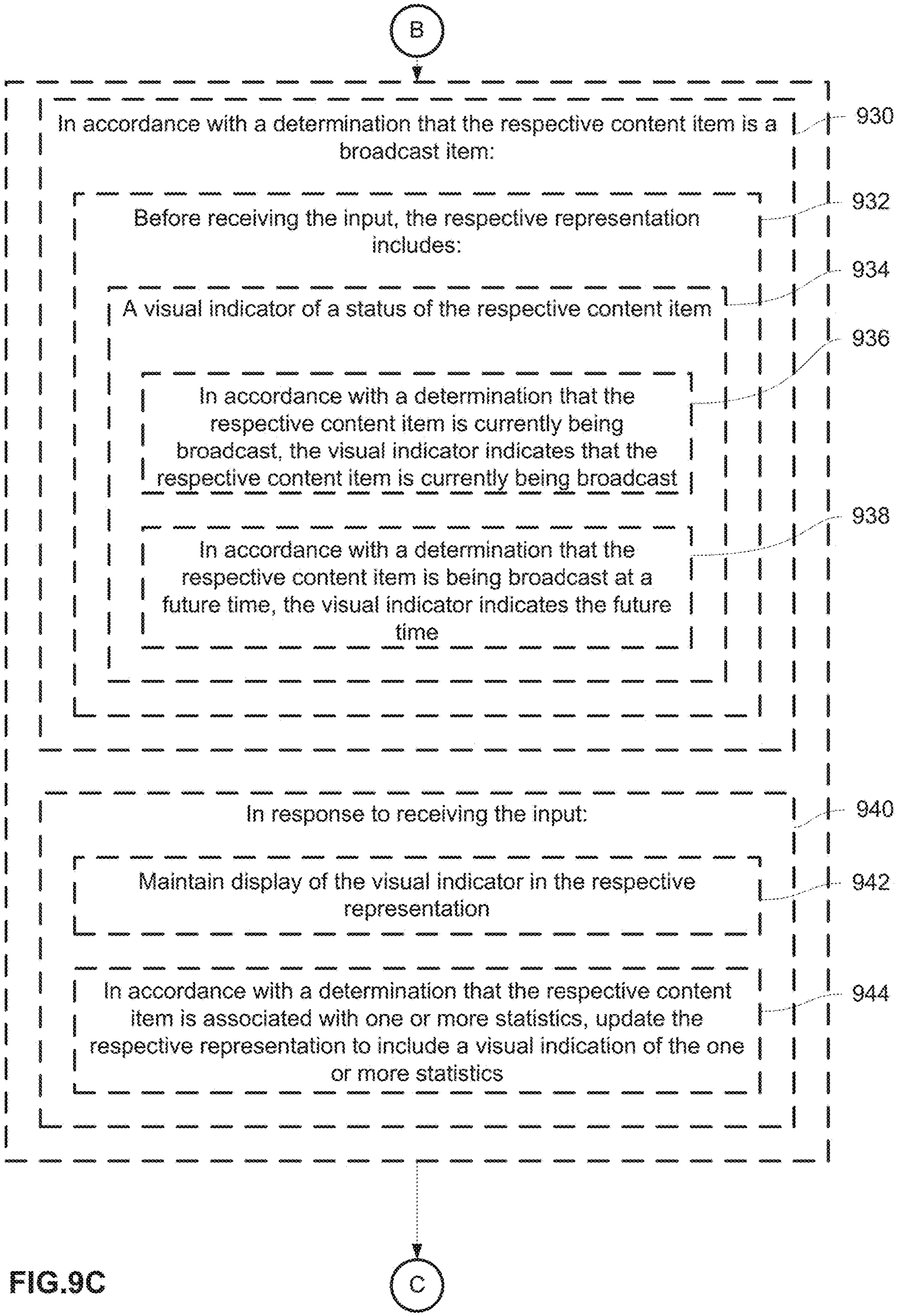
Figure 9D:
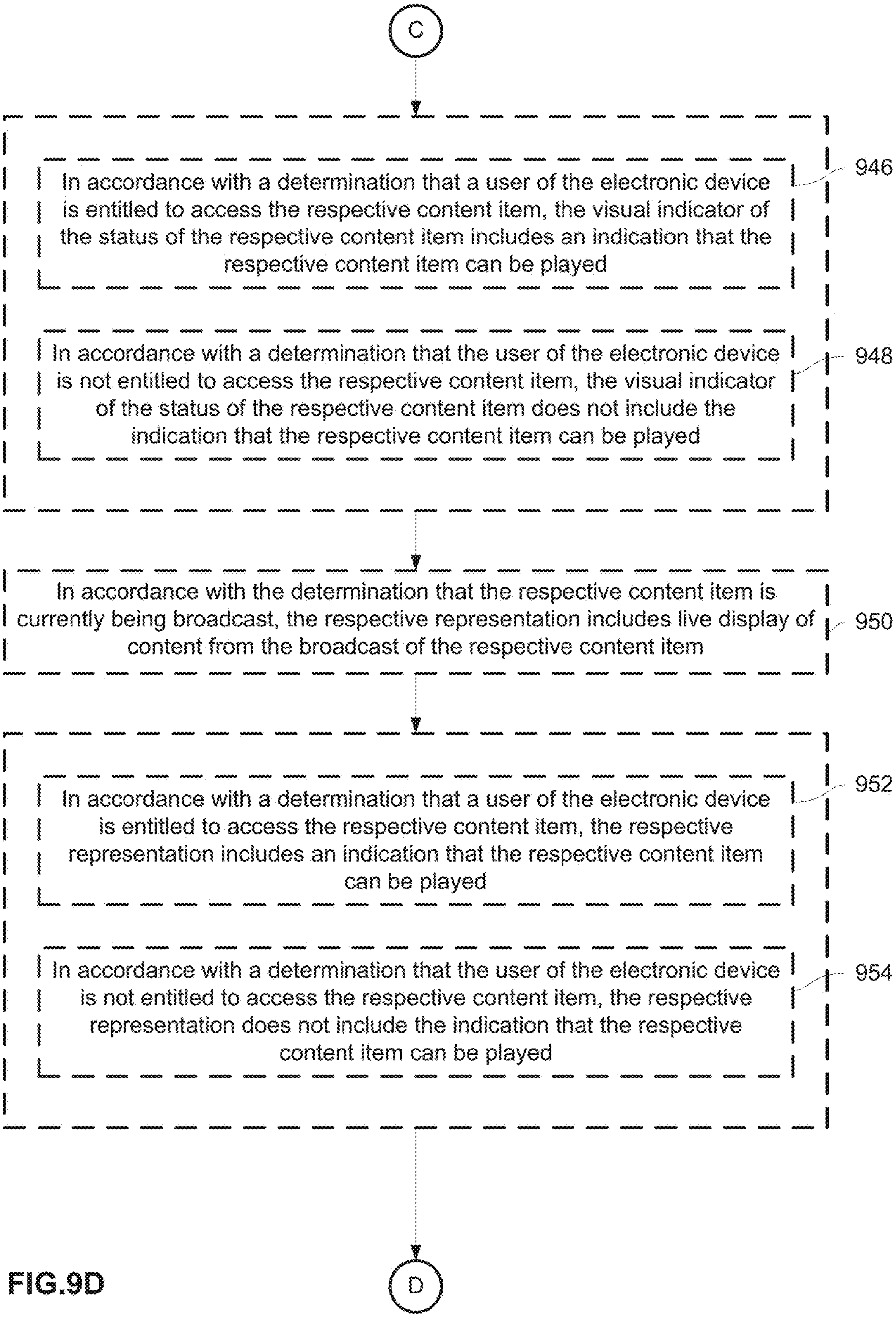
Figure 9E:
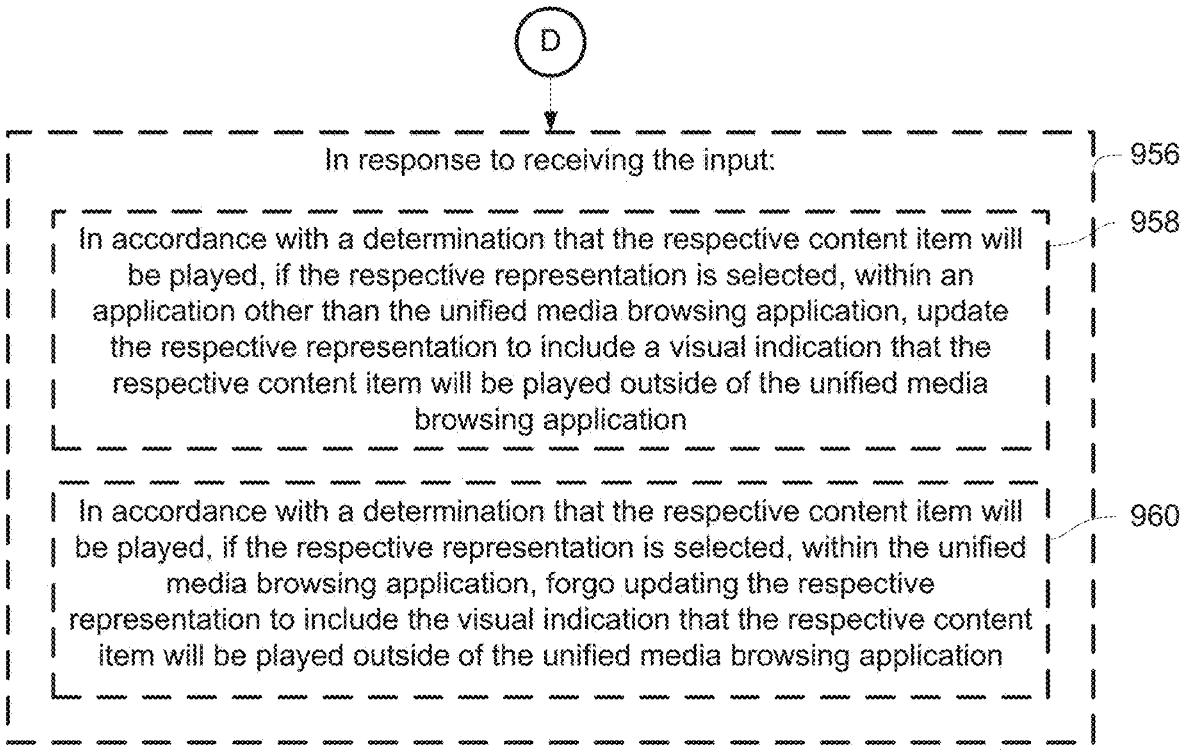

In FIG. 8G, a user input 803 corresponding to a rightward navigation (e.g., rightward swipe on touch-sensitive surface 451) is received. In some embodiments, in response to user input 803, focus moves to icon 841-2 corresponding to "item J". In some embodiments, because icon 841-1 is no longer in focus, indicator 844-1 is no longer displayed on icon 841-1. In some embodiments, because icon 841-2 now has focus, indicator 844-2 is displayed on icon 841-2. In some embodiments, indicator 844-2 indicates the statistics of item J (e.g., similarly to indicator 844-1 with respect to item I). In some embodiments, indicator 844-2 is not displayed when icons 841-3 or 841-4 have a focus because item K and item L are not currently being broadcast. In other words, if the content item is not currently being broadcast live and there is no statistic to display, the statistics indicator is optionally not displayed. In some embodiments, even if the content item is not yet being broadcast, statistics can be associated with the content item, in which case, the statistics indicator can be included (for example, a count-down timer for a special broadcast).

In FIG. 8G, a user input 803 corresponding to a downward navigation (e.g., downward swipe on touch-sensitive surface 451) is received. In response to user input 803, the focus is moved to icon 842-2 corresponding to the "item N" news content. In some embodiments, because icon 841-2 no longer has a current focus, indicator 844-2 is no longer displayed. In some embodiments, because "item N" is not associated with any statistics (e.g., there are no relevant statistics to display), no statistics indicator is displayed when icon 842-2 has focus.

In some embodiments, any of the broadcast status indicators discussed above (e.g., indicators 843 and 845) can be merged with indicator 826 that indicates that the user is entitled to view the respective content item. For example, the icon that displays indicator 826 can be merged with the icon that displays indicators 843 and 845. Thus, a large "pill" shaped icon can be displayed that includes the play icon placed alongside the "LIVE" or "7:00 pm" textual label, such as shown in indicator 843-3 on FIG. 8H.

FIGS. 9A-9E are flow diagrams illustrating a method 900 of presenting information on representations of content items in accordance with some embodiments of the disclosure. The method 900 is optionally performed at an electronic device such as device 100, device 300, device 500, and device 511 as described above with reference to FIGS. 1A-1B, 2-3, 4A-4B and 5A-5C. Some operations in method 900 are, optionally combined and/or order of some operations is, optionally, changed.

As described below, the method 900 provides ways to present information on representations of content items. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (902), on the display, a user interface that includes a plurality of representations of a plurality of content items that are selectable to initiate processes to access the content items, such as in FIG. 8A (e.g., icons of content items that are accessible on the electronic device). In some embodiments, accessing a content item includes beginning playback of the content item. In some embodiments, playback can begin within the same application that is displaying the user interface. In some embodiments, another application is launched and playback begins in the other application. In some embodiments, accessing a content item includes displaying further information about the content item such as displaying a canonical page or moving a focus to the content item to display information on the icon. In some embodiments, selecting a representation comprises first moving a focus to the representation and performing a selection input.

In some embodiments, while displaying the user interface, the electronic device receives (904), via the one or more input devices, an input corresponding to a request to move a current focus to a respective representation of a respective content item of the plurality of representations, such as in FIG. 8C (e.g., a navigational input moving the focus or highlighting to the respective representation). In some embodiments, when a respective representation has a focus, the respective representation is visually distinguished from the other representations that do not have focus. For example, the representation can have a different size, can have a border, can be tinted with a particular color, or can have any other suitable visually distinguishing characteristic.

In some embodiments, in response to receiving the input, the electronic device moves (906) the current focus to the respective representation, and: in accordance with a determination that the respective content item is a first type of content item, the electronic device updates (908) the respective representation to include a first set of one or more visual indicators corresponding to the respective content item, such as in FIG. 8C (e.g., displaying one or more visual indicators on the representation itself). In some embodiments, the visual indicators that are displayed are based on the type of content item that has a focus. For example, if the representation is of a sports game, the indicator can be statistics of the sports game (e.g., score, time, etc.). In another exemplary example, if the representation is of an episode in a television series, the indicator can be a text label of the season and episode of the episode. In another exemplary example, if the representation is of a movie, the indicator can be a text label of the length of the movie or the remaining time in the movie. In some embodiments, if the user has partially watched a content item, the representation can include an indicator of the playback progress of the content item. In some embodiments, if the representation is of the next episode in a series that the user has been watching, the representation includes an indicator that the content item is recommended to the user because it is the next user in a series that the user has been watching (e.g., a "Next Episode" textual indicator). In some embodiments, some visual indicators are displayed even when the representation does not have a focus. For example, if a user is entitled to view the respective content item, the representation can include an indicator that the user is entitled to view the item (e.g., a play button) regardless of whether the representation has a focus. In some embodiments, the representation includes a textual label of the title of the content item. In some embodiments, the representation includes, in the background (e.g., behind one or more of the other displayed indicators), a still frame, screenshot, or other graphic that represents or identifies the content item. In some embodiments, the visual indicators can be either textual, graphical, or both. In some embodiments, the visual indicators are animated and/or can change or update over time as the content in the content item changes. For example, if the representation is of a sports game and the indicator is of the score of the game, the score indicator is updated as the score changes. In some embodiments, some indicators are only displayed when the respective representation is in focus and some indicators are always displayed, even when the representation does not have a focus.

In some embodiments, in accordance with a determination that the respective content item is a second type of content item, different than the first type of content item, the electronic device updates (910) the respective representation to include a second set of one or more visual indicators, different than the first set of one or more visual indicators, corresponding to the respective content item, such as in FIG. 8D (e.g., display a different set of indicators if and when the representation is of a different type of content item). For example, as described above, television content items display a first set of indicators, movies display a second set of indicators and broadcast items display a third set of content items. In some embodiments, the same type of indicator can be in all three sets of indicators. In some embodiments, the representations of the content items, while displaying the indicators (or even if no indicators are displayed), are selectable by the user to initiate a process for playing back or otherwise viewing the selected content item. In some embodiments, some indicators are only displayed when the respective representation is in focus and some indicators are always displayed, even when the representation does not have a focus.

The above-described manner of displaying information associated with a content item (e.g., by displaying one or more visual indicators on the representation of a content item based on the content type of the content item) allows the electronic device to provide the user with information about a content item (e.g., by displaying one or more visual indicators on the representation of the content item itself when the user has moved a focus to the content item and is focusing on the representation), which simplifies the interaction between the user and the electronic device and enhances the operability of the electronic device and makes the user-device interface more efficient (e.g., by providing a single place (e.g., the representation) to display information to the user while the user is moving the focus of the representations and is likely looking at the representations themselves, without requiring the user to look at different areas of the screen or to navigate to a separate user interface to find the same information), which additionally reduces power usage and improves battery life of the electronic device by enabling the user to use the electronic device more quickly and efficiency.

In some embodiments, the first type of content is an episode of a collection of episodic content (912) (e.g., an episode of a television series). In some embodiments, the item is an episode that the user has partially watched. In some embodiments, the item is the next episode in a series that the user has been watching. In some embodiments, the first set of one or more visual indicators includes (914): a first visual indicator of which episode the respective content item is (916), such as in FIG. 8A (e.g., the representation includes a textual indicator of what season and what episode the content item is of). For example, if the episode is episode 3 of season 4 of the television series, the indicator reads "S4 E3" or "Season 4 Episode 3" or any other suitable indicator. In some embodiments, the indicator is a graphical indicator. In some embodiments, the representation includes, in the background of the representation, a still frame, screenshot, or other graphic that represents the particular episode. In some embodiments, the representation includes a still frame, screenshot, or other graphic that represents the season or the television series. In some embodiments, the visual indicator of the episode of the respective content item is only displayed when the respective content item has a focus.

In some embodiments, the first set of one or more visual indicators includes: in accordance with a determination that the respective content item has been partially watched, a visual indication of a current progress through the respective content item (918), such as in FIG. 8C. In some embodiments, if the user has partially watched the item, the representation includes a playback progress bar. In some embodiments, the representation includes a textual label of the amount of playback time remaining in the content item. In some embodiments, if the user has not watched the content item (partially or otherwise), the representation does not include a playback progress bar and does not include a textual label of the amount of playback time remaining. In some embodiments, the visual indication of a current progress is only displayed when the respective content item has a focus.

The above-described manner of displaying information associated with a television item (e.g., by displaying a visual indicator of the episode of a television series and a progress bar if the content has been partially watched) allows the electronic device to provide the user with information about a content item (e.g., by displaying a visual indicator of the season and episode of an episodic content item and by displaying a progress bar if the content item has been partially watched), which simplifies the interaction between the user and the electronic device and enhances the operability of the electronic device and makes the user-device interface more efficient (e.g., by providing information about the content item without requiring the user to separately research what season and episode a particular episodic content item is and without requiring the user to partially watch the content item to determine whether the user has partially watched the content item and at what point the user stopped watching), which additionally reduces power usage and improves battery life of the electronic device by enabling the user to use the electronic device more quickly and efficiency.

In some embodiments, the second type of content is a movie (920), such as in FIG. 8D (e.g., a movie or other content item that is not an episode of an episodic series). In some embodiments, content is considered a movie based on the length of the content item. In some embodiments, a lengthy movie that is split into multiple parts (e.g., part 1, part 2, or volume 1, volume 2) are considered movies despite having multiple parts. In some embodiments, the second set of one or more visual indicators includes (922): in accordance with a determination that the respective content item has been partially watched (924): a visual indication of a current progress through the respective content (926) (e.g., a graphical playback progress bar); and a textual indication of an amount of time remaining in the respective content item (928), such as in FIG. 8D (e.g., a textual indicator of the playback time remaining). For example, if a movie is lengthy, the playback progress bar may not have a fine enough of a resolution to indicate to the user with precision how much time is remaining and a textual indicator is required. In some embodiments, only one of the two indications of playback progress is displayed. In some embodiments, if the user has not partially watched the movie content item, then the representation does not include the visual indicators of time remaining or current progress. In some embodiments, the representation includes no visual indicators if the user has not partially watched the movie content item. In some embodiments, if the user has not partially watched the movie content item, then the representation includes a representation of the total duration of the movie content item. In some embodiments, the visual indicator of the current progress and the amount of time remaining is displayed only when the respective content item has a focus.

The above-described manner of displaying information associated with a movie item (e.g., by displaying a progress bar if the movie has been partially watched and an indication of how much time is remaining) allows the electronic device to provide the user with information about a movie item (e.g., by displaying a progress bar if the movie item has been partially watched and a text label of how much time is remaining), which simplifies the interaction between the user and the electronic device and enhances the operability of the electronic device and makes the user-device interface more efficient (e.g., by providing the partial watched status of the movie item without requiring the user to separately to begin playback of the movie to determine whether the user has partially watched the content item and at what point the user stopped watching or separately research the length of the movie), which additionally reduces power usage and improves battery life of the electronic device by enabling the user to use the electronic device more quickly and efficiency.

In some embodiments, in accordance with a determination that the respective content item is a broadcast item (930): before receiving the input, the respective representation includes (932): a visual indicator of a status of the respective content item (934), such as in FIG. 8F (e.g., representations of broadcast items include indicators even when the representation doesn't have a focus.). In some embodiments, the respective content item is an item that is broadcast to viewers at a fixed or predetermined time, for example, a live news show or a live sports game. In some embodiments, broadcast items include live broadcast television or movie content (e.g., as opposed to content that is available on-demand or streaming after or during a live broadcast of the content). In some embodiments, live broadcast items cannot be fast forwarded, paused, or rewinded. In some embodiments, the electronic device records the live broadcast item as it is being broadcasted to provide the user with pause and rewind capabilities (e.g., similarly to a digital video recorder). In some embodiments, in accordance with a determination that the respective content item is currently being broadcast, the visual indicator indicates that the respective content item is currently being broadcast (936), such as in FIG. 6F (e.g., an indicator that the item is currently being broadcast live). For example, the representation includes a textual indicator, "LIVE". In some embodiments, the representation includes a graphical indicator that the content is currently being broadcast live. In some embodiments, the indicator that the respective content is currently being broadcast is displayed at all times, even when the content item does not have a focus. In some embodiments, in accordance with a determination that the respective content item is being broadcast at a future time, the visual indicator indicates the future time, such as in FIG. 6F (e.g., instead of the "LIVE" textual or graphical indicator, the representation includes a time at which the content will be broadcast (e.g., "7:00 PM")). In some embodiments, when a broadcast item is currently being broadcast, the visual indicators have a different color than when the broadcast item is to be broadcast in the future. For example, the visual indicators are red when the content is currently being broadcast live, and white when the content is to be broadcast in the future. In some embodiments, the indicator of the future broadcast time is displayed at all times, even when the content item does not have a focus. In some embodiments, in response to receiving the input (940): the electronic device maintains (942) display of the visual indicator in the respective representation, such as in FIG. 8G. When the representation has a focus, in some embodiments, the indicators that are displayed when the representation does not have a focus continues to be displayed. In some embodiments, some or all of the indicators that are displayed when the representation does not have a focus can be removed or replaced with other indicators when the representation gets focus. In some embodiments, in accordance with a determination that the respective content item is associated with one or more statistics, the electronic device updates (944) the respective representation to include a visual indication of the one or more statistics, such as in FIG. 8F. In some embodiments, if the content item is a sports item or any other item in which there are statistics being updated live (e.g., such as election or polling results), then the representation includes an indicator of the statistics. For example, a sports item can include an indicator of the current score, the time remaining in the game or the current time of the gameplay, and/or the current quarter, inning, or half that the game is in. In some embodiments, the representation includes a textual label, symbol, or icon of the teams that are competing in the sports game. In some embodiments, if the content item is not associated with one or more statistics, then no statistics are shown on the representation.

The above-described manner of displaying information associated with a live broadcast item (e.g., by displaying an indicator of whether the item is currently being broadcast live or will be broadcast live in the future and by displaying an indicator with statistics of the content item if the content item has statistics) allows the electronic device to provide the user with information about a live broadcast item (e.g., by displaying an indicator of whether the item is currently being broadcast live or will be broadcast live in the future and by displaying an indicator with statistics of the content item if the content item has statistics), which simplifies the interaction between the user and the electronic device and enhances the operability of the electronic device and makes the user-device interface more efficient (e.g., by providing information about the broadcast time of a live broadcast item and providing a quick-peek of the statistics associated with the live broadcast item, without requiring the user to separately perform research to determine when the content item is being broadcast and without requiring the user to begin playback of the broadcast item to determine the relevant statistics of the broadcast item), which additionally reduces power usage and improves battery life of the electronic device by enabling the user to use the electronic device more quickly and efficiency.

In some embodiments, in accordance with a determination that a user of the electronic device is entitled to access the respective content item, the visual indicator of the status of the respective content item includes an indication that the respective content item can be played (946), such as in FIG. 8B. In some embodiments, the indication includes a play icon (or any other graphical indicator) that indicates to the user that the user is entitled to watch the content item such that selection of the content item will cause playback of the content item. In some embodiments, the indicator that the user is entitled merges with the indicator that the content item is currently being broadcast or that the content item will be broadcast in the future. In other words, the play icon and the broadcast time or "LIVE" indicator can be merged into one indicator such that there's one single graphic that includes both indicators, rather than two visually separate indicators (e.g., one single "pill" that includes both indicators). In some embodiments, the indicators do not merge and are visually separate (e.g., two separate "pills" or frames). In some embodiments, the visual indicator of the status is displayed at all times, even when the respective representation doesn't have a focus. In some embodiments, in accordance with a determination that the user of the electronic device is not entitled to access the respective content item, the visual indicator of the status of the respective content item does not include the indication that the respective content item can be played (948), such as in FIG. 8B (e.g., do not display the play icon or textual indicator that the user is entitled to access the content item). In some embodiments, the representation includes a visual indicator that indicates that the user is not entitled to view the content item. For example, the representation can include a lock icon or other suitable graphical or textual indicator to indicate that the user does not have the entitlement to view a content item.

The above-described manner of displaying information associated with a content item (e.g., by displaying an indicator if the user is currently entitled to view the content item with the indicator of the status of the content item) allows the electronic device to provide the user with information about the content item (e.g., by displaying the two indicators together), which simplifies the interaction between the user and the electronic device and enhances the operability of the electronic device and makes the user-device interface more efficient (e.g., by providing both sets of information in a single indicator, which gives the user a single place to look to get the relevant information without requiring the user to look at different areas of the display or separately performing research to receive the same information), which additionally reduces power usage and improves battery life of the electronic device by enabling the user to use the electronic device more quickly and efficiency.

In some embodiments, in accordance with the determination that the respective content item is currently being broadcast, the respective representation includes live display of content from the broadcast of the respective content item (950), such as in FIG. 8F. In some embodiments, instead of a still image, still frame, or screenshot, the background of the representation displays the live broadcast of the content item itself (e.g., moving thumbnail of the live broadcast). In other words, the user can live preview some or all of the broadcast item being broadcast as it is being broadcast. In some embodiments, the representation includes display of the live broadcast if the user is entitled to view the content. In some embodiments, if the user is not entitled, the representation displays a still image, still frame, or some other graphical representation of the content item. In some embodiments, even if the user does not have entitlement to view the content item, the representation displays a live broadcast of the content item. In some embodiments, displaying a live broadcast of the content item on the representation comprises a continuous updating video, or a periodically updating snapshot (e.g., every 5 seconds, 10 seconds, 20 seconds, etc. or updated whenever an event occurs in the broadcast, such as a new news segment or a score in a sports game). In some embodiments, the live display of content from the broadcast only occurs when the content item has a focus. In some embodiments, the live display of content from the broadcast is displayed at all times, even when the content item does not have a focus.

The above-described manner of providing a preview of live broadcast content (e.g., by providing a live display of a live broadcast content on the representation of the content itself) allows the electronic device to provide the user with a preview of the content item broadcast item (e.g., by displaying a live preview or thumbnail of the broadcast item), which simplifies the interaction between the user and the electronic device and enhances the operability of the electronic device and makes the user-device interface more efficient (e.g., by providing the user with information on what is being broadcast without requiring the user to begin playback of the content item to determine what is being broadcast and whether the user is interested in the content item), which additionally reduces power usage and improves battery life of the electronic device by enabling the user to use the electronic device more quickly and efficiency.

In some embodiments, in accordance with a determination that a user of the electronic device is entitled to access the respective content item, the respective representation includes an indication that the respective content item can be played (952), such as in FIG. 8B. In some embodiments, the indication includes a play icon (or any other graphical indicator) that indicates to the user that the user is entitled to watch the content item such that selection of the content item will cause playback of the content item. In some embodiments, instead of or in addition to the play icon, the representation includes a textual indicator that the user is entitled to access the content item. In some embodiments, the indication that the user is entitled to access the respective content item is displayed regardless of focus (e.g., even when the content item does not have a focus). In some embodiments, in accordance with a determination that the user of the electronic device is not entitled to access the respective content item, the respective representation does not include the indication that the respective content item can be played (954), such as in FIG. 8B (e.g., do not display the play icon or textual indicator that the user is entitled to access the content item). In some embodiments, the representation includes a visual indicator that indicates that the user is not entitled to view the content item. For example, the representation can include a lock icon or other suitable graphical or textual indicator to indicate that the user does not have the entitlement to view a content item.

The above-described manner of providing information about a content item (e.g., by displaying an indication if the user is entitled to view the content item) allows the electronic device to provide the user with a quick preview of whether the user can view the content item (e.g., by displaying an indicator if the user is entitled to view the content item and not displaying the indicator if the user is not entitled to view the content item), which simplifies the interaction between the user and the electronic device and enhances the operability of the electronic device and makes the user-device interface more efficient (e.g., by providing the user with information on whether the user is entitled to view a particular content item without requiring the user to perform separate research to determine whether the user is entitled, navigate to a separate user interface to determine what is included in the user's subscriptions, or attempt to access the content item without knowing whether the user is entitled to view the broadcast item (and potentially be charged for the access)), which additionally reduces power usage and improves battery life of the electronic device by enabling the user to use the electronic device more quickly and efficiency, while reducing errors in usage.

In some embodiments, in response to receiving the input (956): in accordance with a determination that the respective content item will be played, if the respective representation is selected, within an application other than the unified media browsing application, the electronic device updates (958) the respective representation to include a visual indication that the respective content item will be played outside of the unified media browsing application, such as in FIG. 8D. In some embodiments, if the content item is not compatible or configured to be played within the unified media browsing application, the representation includes an indicator that a separate application will be launched to play the content item. For example, the representation can include an icon that symbolizes that another application will be launched. In some embodiments, the representation can include a logo or other representation of the application that will be launched. For example, if the content item can only be played within the "ABC" application, then the representation includes a logo of the "ABC" application to indicate to the user that the user will be leaving the unified media browsing application and launching the ABC application in order to view the content item. In some embodiments, if the content item includes a progress bar or other progress indicator (e.g., if the item has been partially viewed), then the size of the progress bar can be reduced (e.g., length reduced) to provide enough space on the representation for the logo or icon of the application that will be launched. In some embodiments, if the representation includes other indicators that would otherwise conflict with the location of the icon (or any other indicator), then the indicators can be resized or moved to ensure that the indicators do not overlap or conflict. In some embodiments, the visual indicator that the respective content will be played outside of the unified media browsing application is only displayed when the respective content item has a focus. In some embodiments, in accordance with a determination that the respective content item will be played, if the respective representation is selected, within the unified media browsing application, the electronic device forgoes (960) updating the respective representation to include the visual indication that the respective content item will be played outside of the unified media browsing application, such as in FIG. 8A-8B. In some embodiments, for content items that are compatible to be played within the unified media browsing application (e.g., without needing to launch an application separate from the unified media browsing application), then the electronic device does not display the logo or icon of another application to be launched or a logo or icon that symbolizes that another application will be launched. In some embodiments, if the content item is compatible to be played within the unified media browsing application, the representation can include an icon or symbol indicating that the content item can be played from within the unified media browsing application itself (e.g., a logo of the unified media browsing application).

The above-described manner of providing information about a content item (e.g., by displaying an indication if accessing the content requires launching of a separate application) allows the electronic device to provide the user with a quick preview of what application will be used to display the content item (e.g., by displaying an indicator if the content is to be displayed in a separate application and not displaying the indicator if content is to be displayed in the unified media browsing application itself), which simplifies the interaction between the user and the electronic device and enhances the operability of the electronic device and makes the user-device interface more efficient (e.g., by providing the user with information on what application will perform playback of a particular content item without requiring the user to perform separate research to determine whether the user is entitled or begin playback to determine what application will be used to playback the particular content item), which additionally reduces power usage and improves battery life of the electronic device by enabling the user to use the electronic device more quickly and efficiency.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, and 1700) are also applicable in an analogous manner to method 900 described above with respect to FIGS. 9A-9E. For example, the operation of the electronic device to present information on representations of content items described above with reference to method 900 optionally has one or more of the characteristics of the presentation of content in the unified media browsing application, displaying of content in a unified media browsing application, linking of an account for a primary content provider, restricting of access to content based on the geographic location of the device, and presentation of playback menus during playback of content in a unified media browsing application, etc., described herein with reference to other methods described herein (e.g., methods 700, 1100, 1300, 1500, and 1700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 9A-9E are, optionally, implemented by components depicted in FIGS. 1A-1B. For example, displaying operations 902, and 942, receiving operations 904, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Content while Browsing in a Unified Media Browsing Application

Users interact with electronic devices in many different manners, including using an electronic device to browse and access content in a media browsing application. In some embodiments, an electronic device aggregates available content in a single unified media browsing application. The embodiments described below provide ways in which an electronic device displays content while simultaneously allowing a user to browse for content in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10HH illustrate exemplary ways in which an electronic device displays content in a unified media browsing application in accordance with some embodiments of the disclosure. The embodiments in these figures are used to illustrate the processes described below, including the processes described with reference to FIGS. 11A-11F.

Figure 10A:
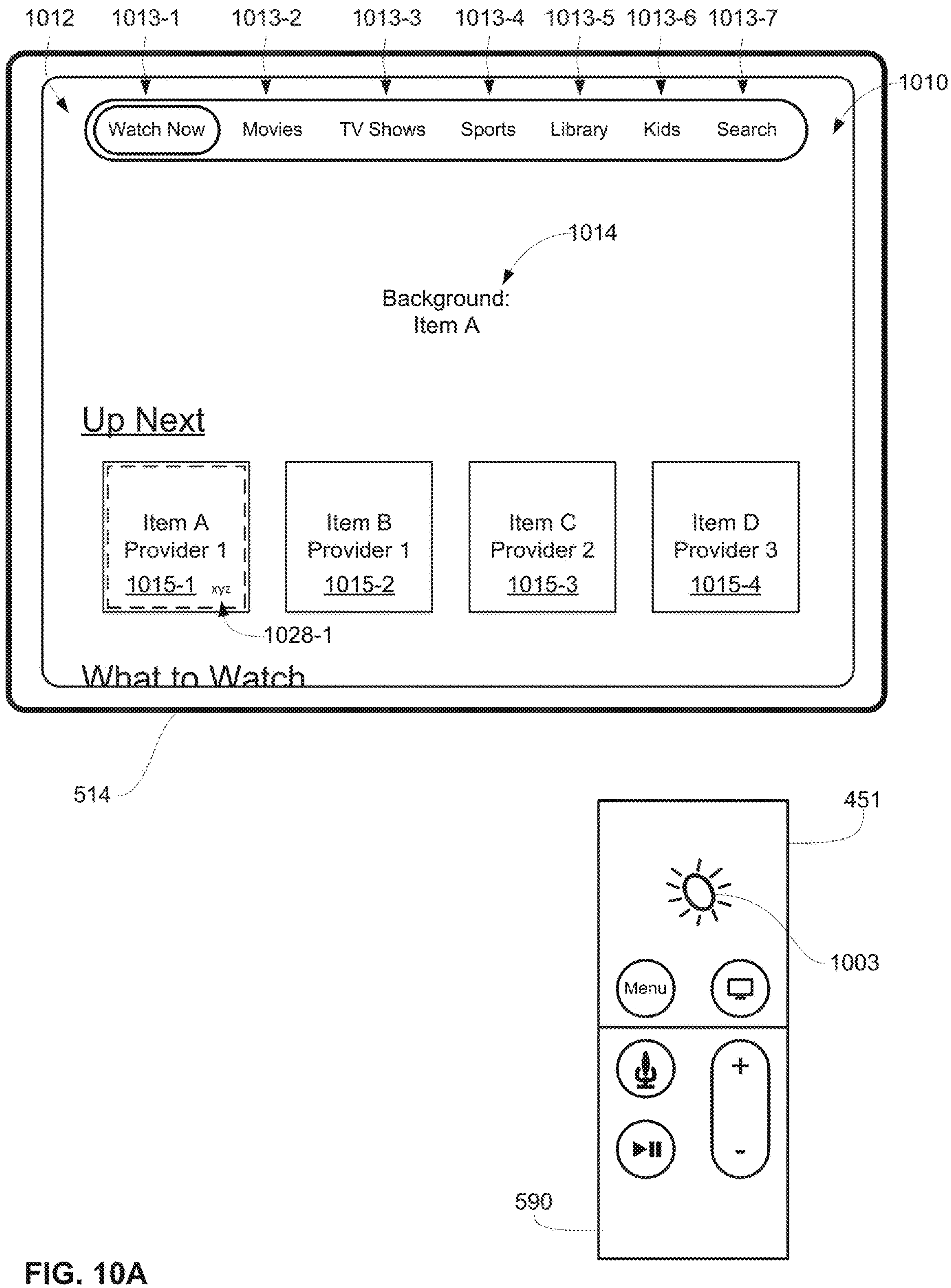
FIGS. 10A-10HH illustrate exemplary ways in which an electronic device displays content in a unified media browsing application in accordance with some embodiments of the disclosure.

FIGS. 10A-10HH illustrate displaying content in a unified media browsing application. FIG. 10A illustrates user interface 1010 of a media browsing application corresponding to the "Watch Now" page (e.g., similar to user interface 810 and 610 described above with respect to FIGS. 8A and 6D, respectively). User interface 1010 includes a navigation bar 1012 that includes a plurality of selectable options 1013-1 to 1013-7. The navigation bar 1012 indicates that the user interface is currently a "Watch Now" user interface that is related to content of multiple types, such as television and movies. In some embodiments, user interface 1010 includes rows of content items, including an "Up Next" row of content. In some embodiment, icons 1015-1 to 1015-4 correspond to the "Up Next" row of content and is similar to or shares similar features as the "Up Next" content described above with respect to FIGS. 8A and 6D. Each of icons 1015-1 to 1015-4 are selectable to cause playback of the corresponding content. In some embodiments, only representations in the "Up Next" row are selectable to cause playback of the content. In some embodiments, representations in rows other than the "Up Next" row are selectable to display a product page or canonical page for the corresponding content item (e.g., from which the user optionally is able to select a selectable option to cause playback of the content item).

In some embodiments, user interface 1010 includes a content display region 1014 (e.g., content display region). In some embodiments, content display region 1014 displays a representation (e.g., such as a still image, a moving image, an animation, a snapshot, a logo, or any other representation) of the content item that current has a focus. For example, while icon 1015-1 corresponding to "Item A" has a focus, content display region 1014 displays an image of item A. In some embodiments, content display region 1014 encompasses the entire display and navigate bar 1012 and the rows of content are overlaid on top of content display region 1014. As shown in FIG. 10A, item A is a content item which is compatible to be played back within the unified media browsing application. In other words, selection of icon 1015-1 causes fullscreen playback of item A within the unified media browsing application without launching another application to play item A.

As shown in FIG. 10A, user input 1003 corresponding to a selection input (e.g., click on touch sensitive surface 451) is received while icon 1015-1 has a focus. In response to user input 1003, device 500 displays user interface 1020 and begins fullscreen playback of item A. In some embodiments, fullscreen playback of item A occurs from within the unified media browsing application. In other words, device 500 does not launch another application and the unified media browsing application causes the fullscreen playback of item A. In some embodiments, user input 1003 corresponding to a button press on a "menu" button (e.g., "back" button). In some embodiments, in response to user input 1003 selecting the "menu" button on remote 590, playback menu 1022 is displayed. In some embodiments, playback menu 1022 includes information about the currently playing content and selectable options to restart playback and to display more content associated with the currently playing content. In some embodiments, playback menu 1022 is similar to or shares features with playback menu 1627 described in more detail with respect to FIG. 16G.

In some embodiments, in response to receiving another user input 1003 corresponding to a button press on a "menu" button, device 500 replaces display of user interface 1200 with user interface 1013 (e.g., the user interface that was previously displayed before playback began). In some embodiments, after exiting fullscreen playback of item A, content display region 1014 displays a still frame of item A at the position when fullscreen playback ended. For example, if playback of item A was at 15 minutes and 30 seconds, content display region 1014 displays a still frame of item A at the 15 minute and 30 second playback position. In some embodiments, as will be described in further detail below, content display region 1014 can continue playback of item A.

Figure 10B:
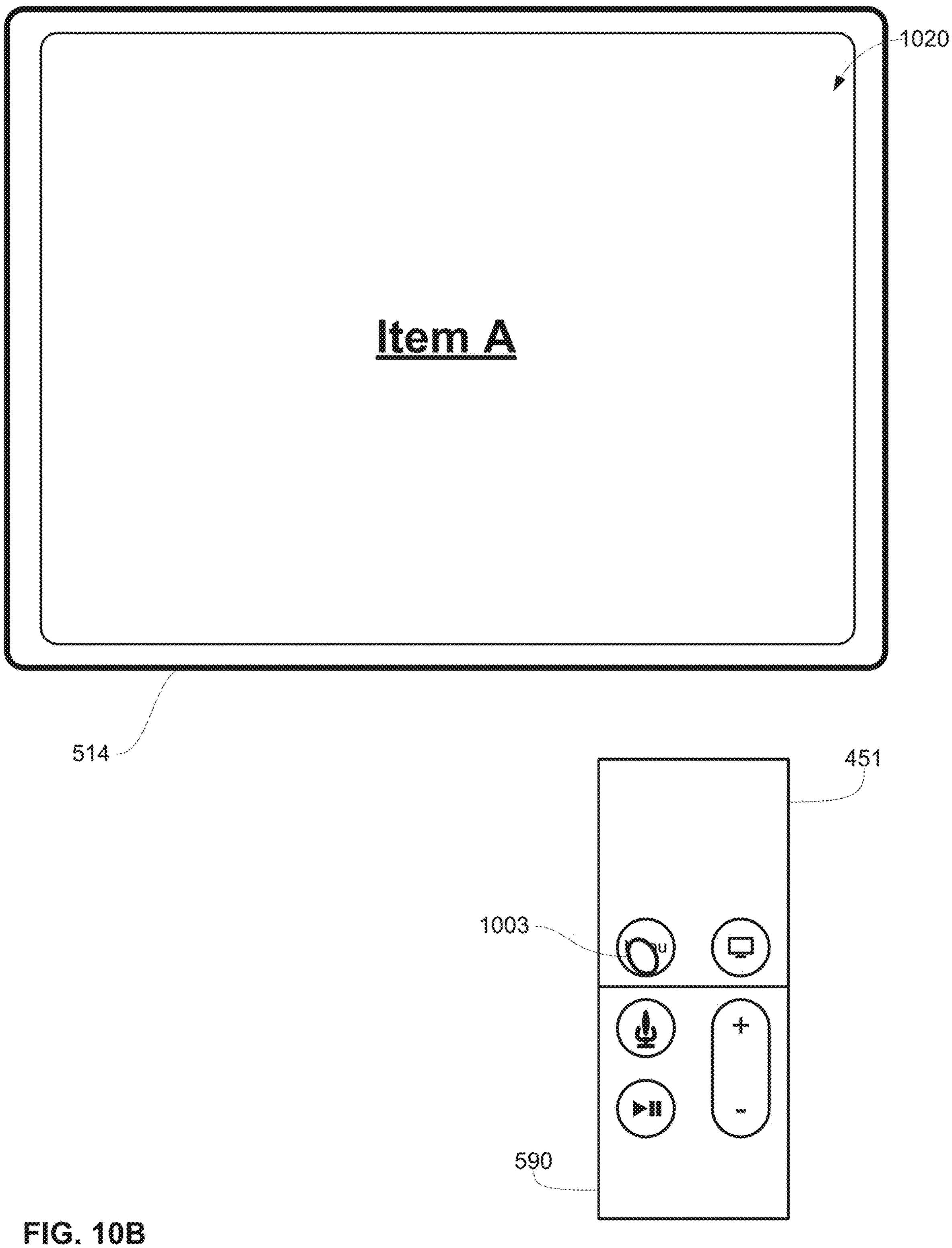
Figure 10C:
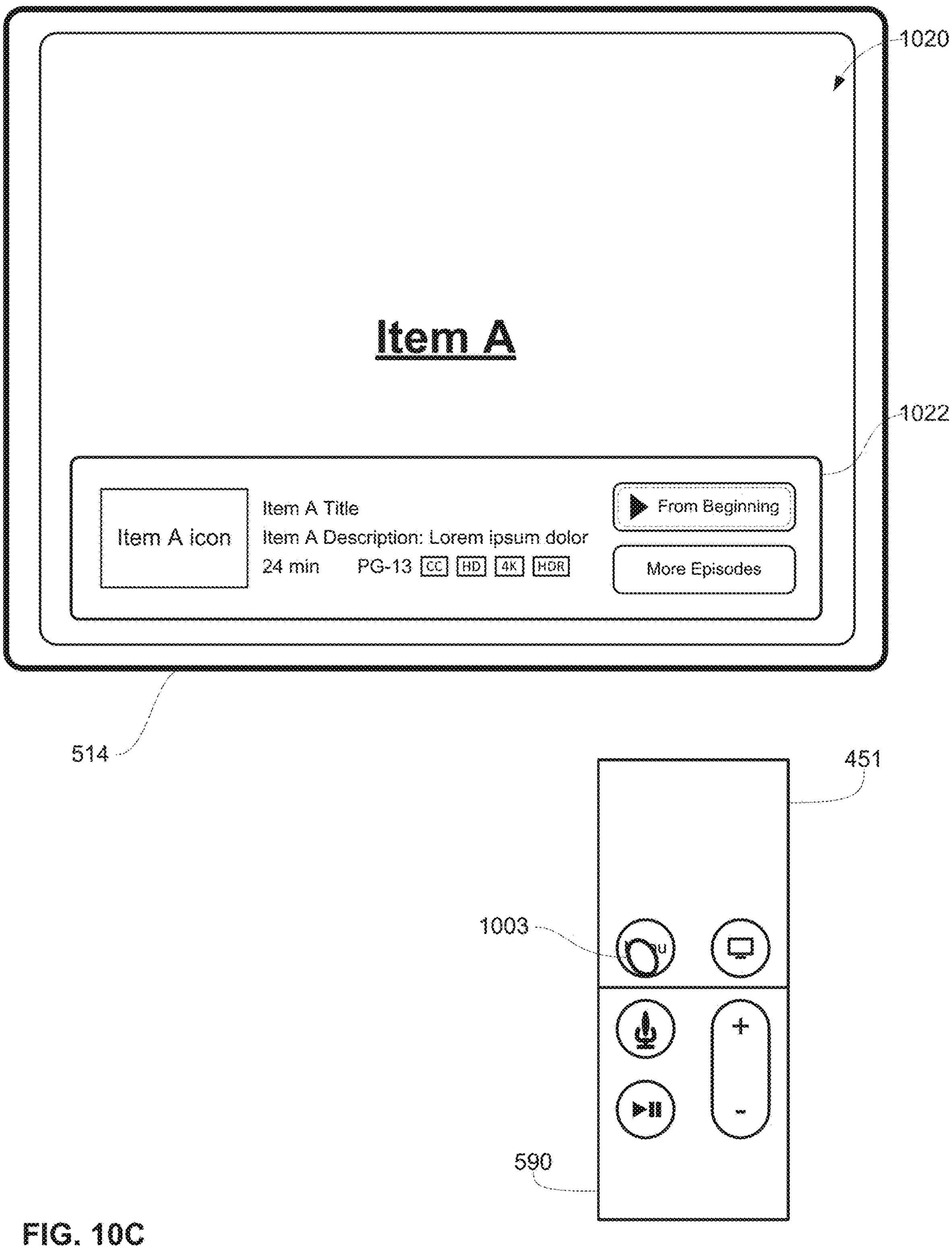
Figure 10D:
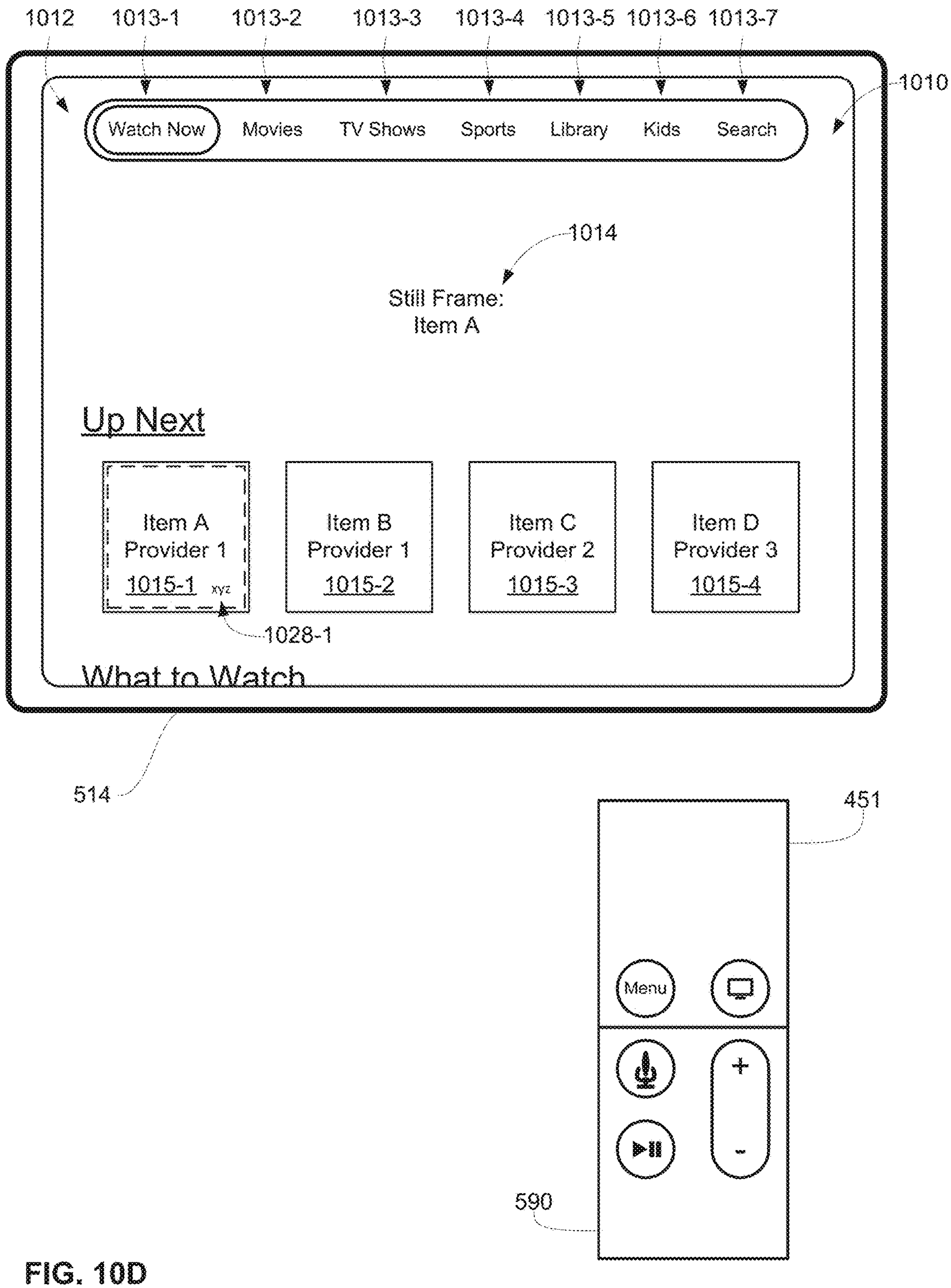
Figure 10E:
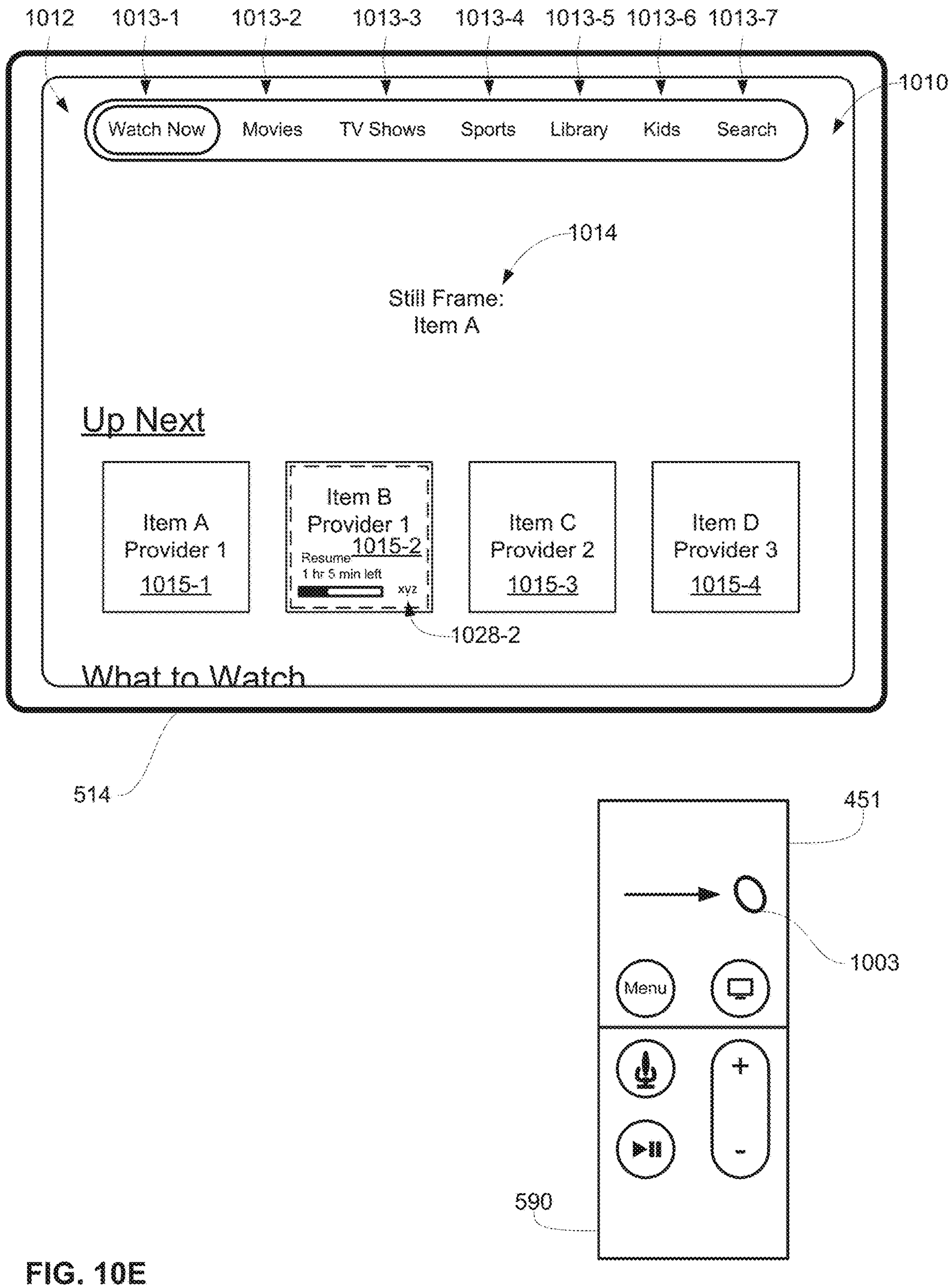

In FIG. 10E, user input 1003 corresponding to a rightward navigation (e.g., rightward swipe) is received. In some embodiments, in response to user input 1003, focus is moved to icon 1015-2 corresponding to item B. In some embodiments, because content display region 1014 is displaying a still frame of item A after fullscreen playback of item A, moving the focus to 1015-2 does not cause content display region 1014 to update or change to display content from item B. In some embodiments, content display region 1014 continues to display a still frame of item A at the 15 minute and 30 second playback position.

Figure 10F:
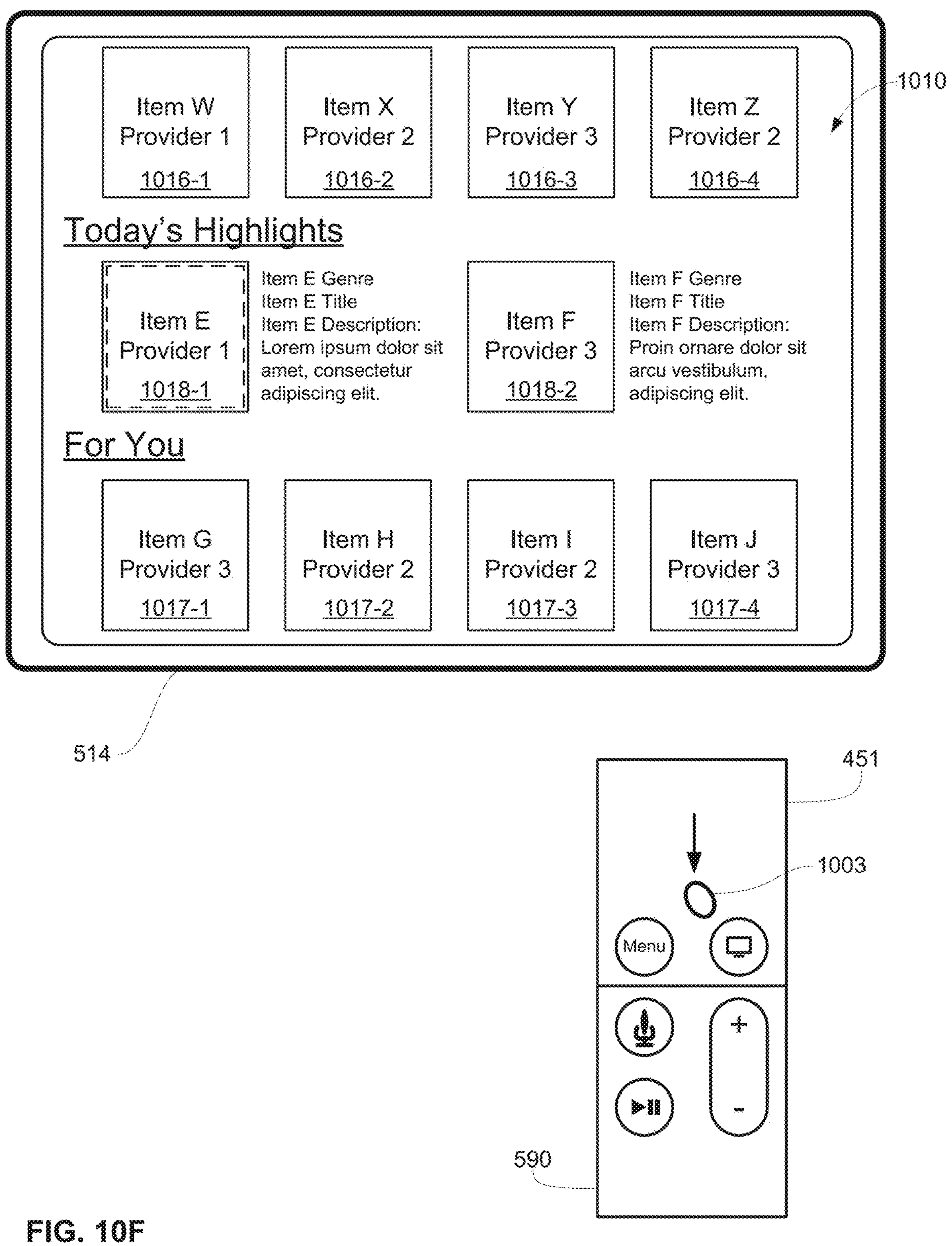
Figure 10G:
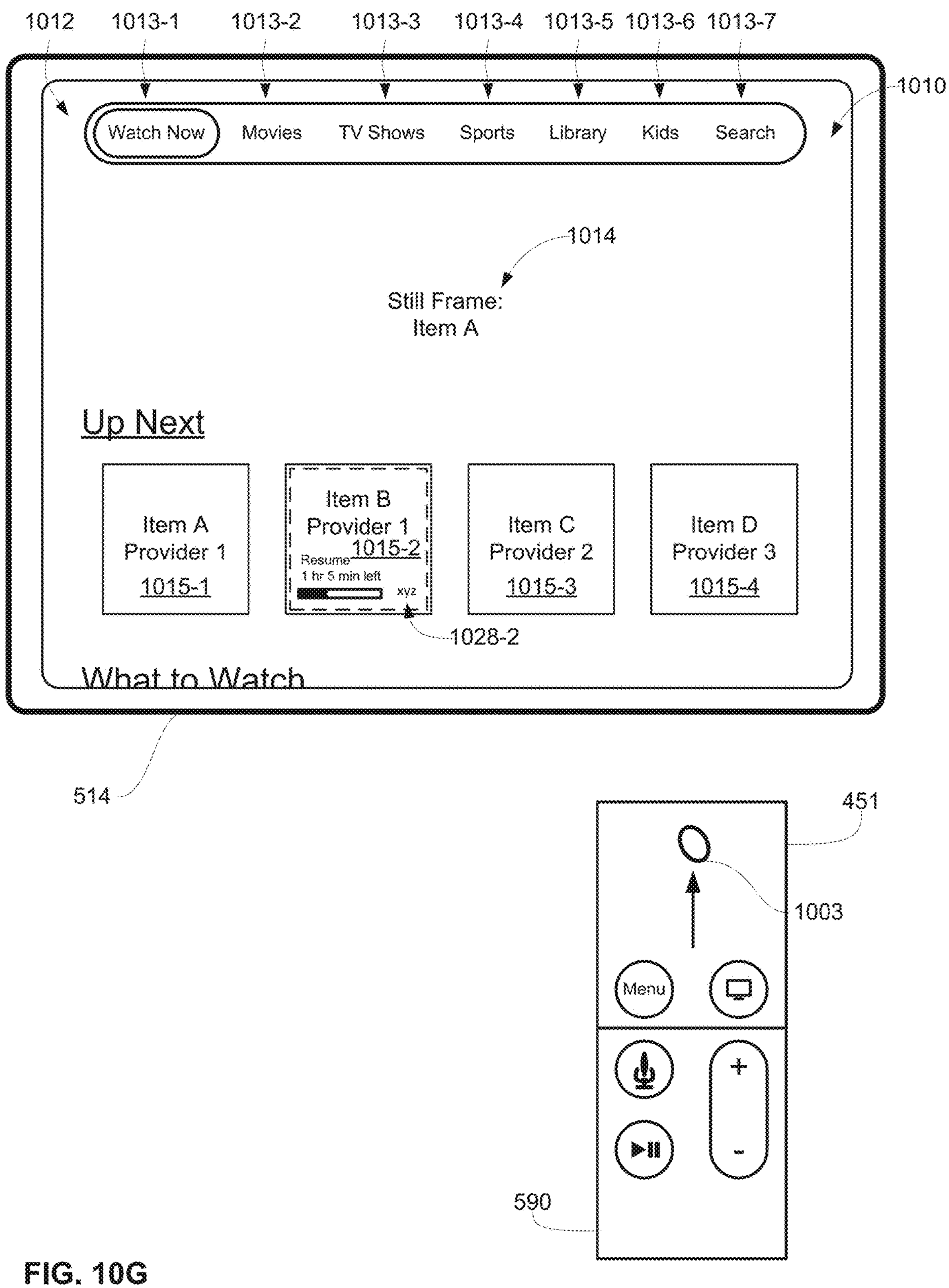

In FIG. 10F, user input 1003 corresponding to a downward navigation (e.g., downward swipe) is received. In some embodiments, in response to user input 1003, user interface 1010 scrolls downwards and reveals more rows of content. In some embodiments, when user interface 1010 scrolls downward, content display region 1014 is hidden and no longer displayed. In FIG. 10G, user input 1003 corresponding to an upward navigation (e.g., upward swipe) is received. In some embodiments, in response to user input 1003, user interface 1010 scrolls upwards and reveals the "Up Next" row and content display region 1014. In some embodiments, content display region 1014 still displays a still frame of item A at the 15 minute and 30 second playback position. Thus, in some embodiments, when content display region 1014 displays a still frame of a previously playing content (e.g., content that is played in fullscreen mode within the unified media browsing application), content display region 1014 exhibits a "sticky" behavior in which the content display region 1014 continues to display the still frame despite the user navigating around user interface 1010 and browsing for content. In some embodiments, this feature allows the user to browse for content while it appears as if fullscreen playback of item A is merely paused.

Figure 10H:
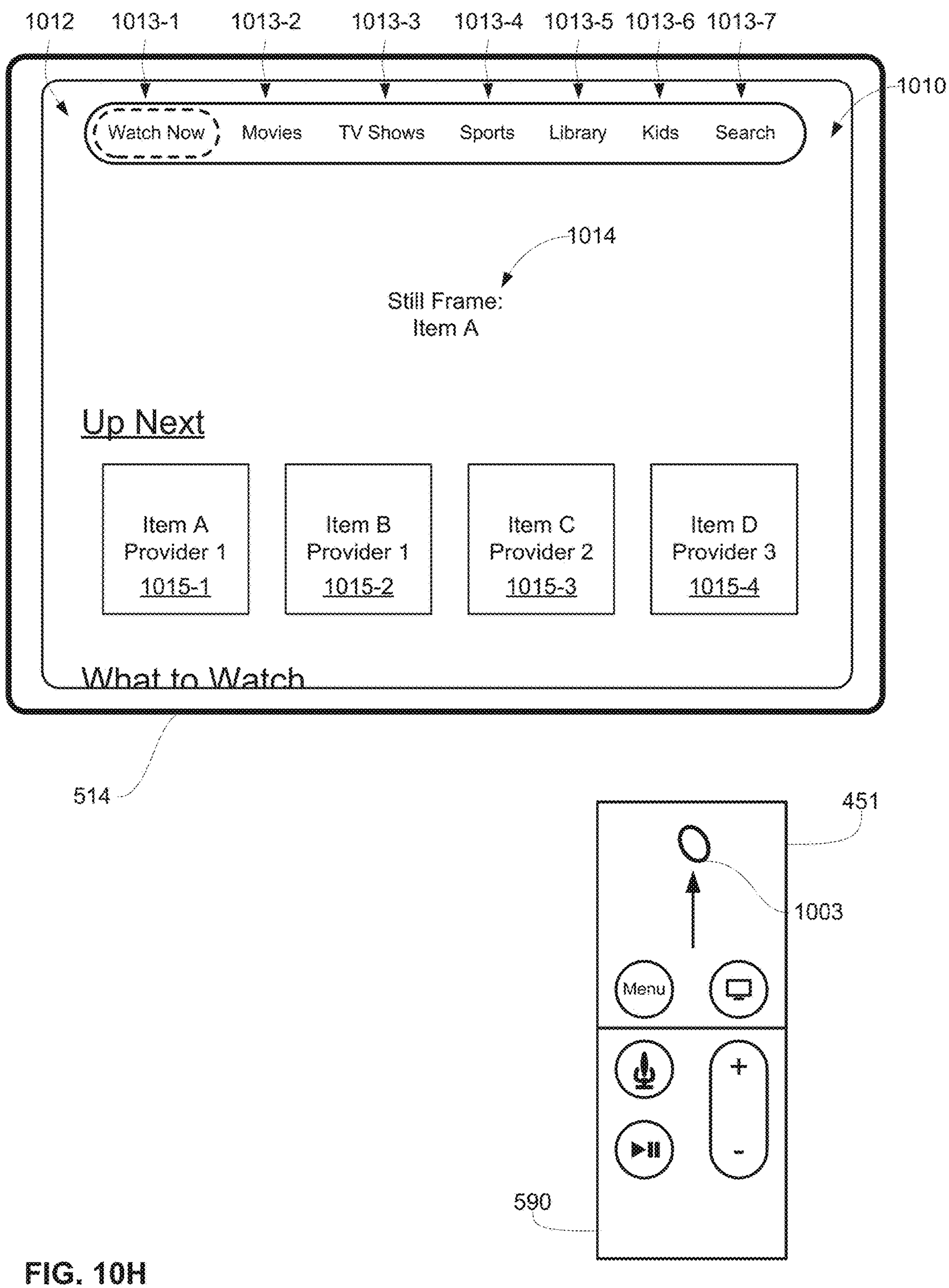
Figure 10I:
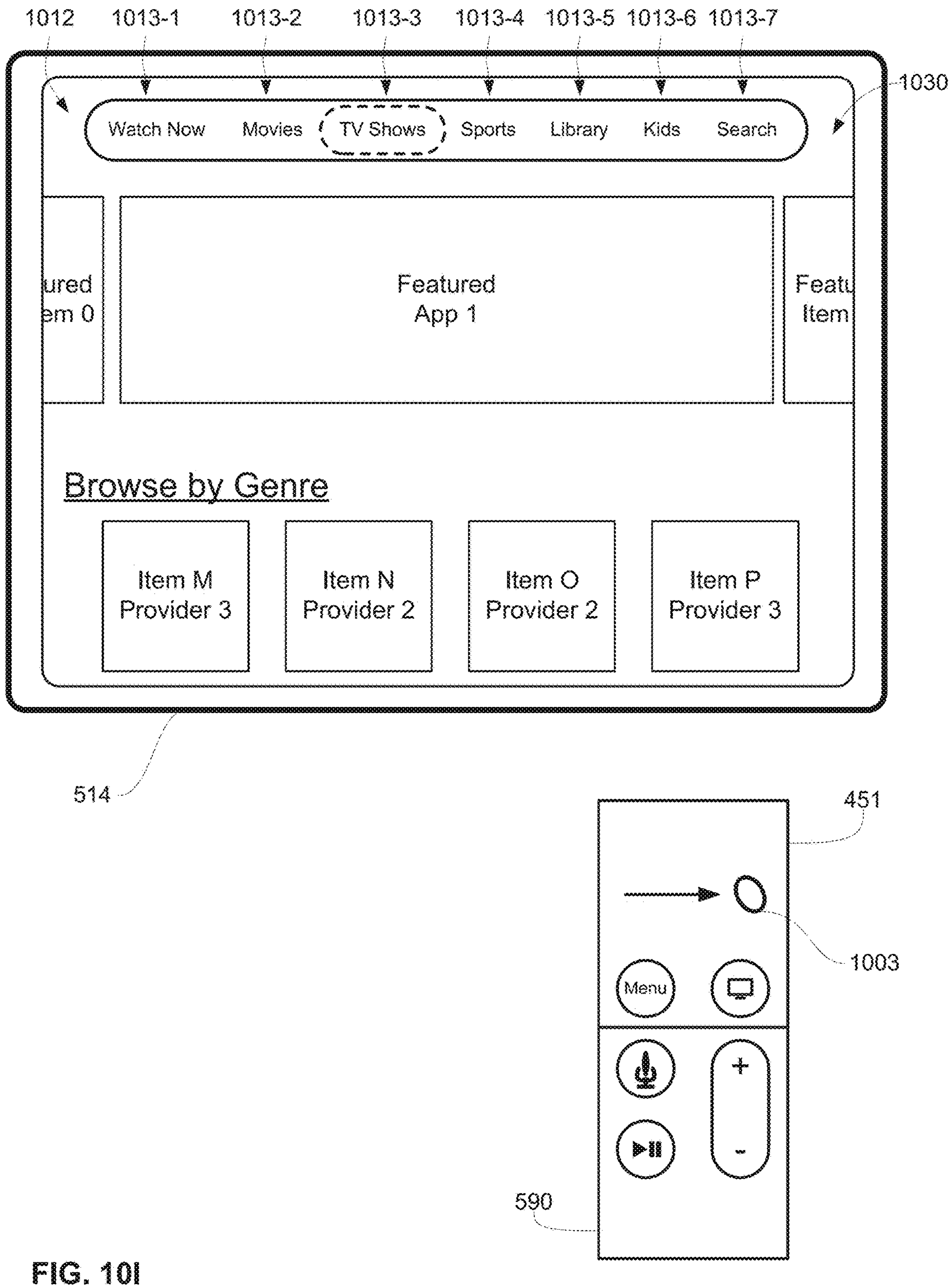
Figure 10J:
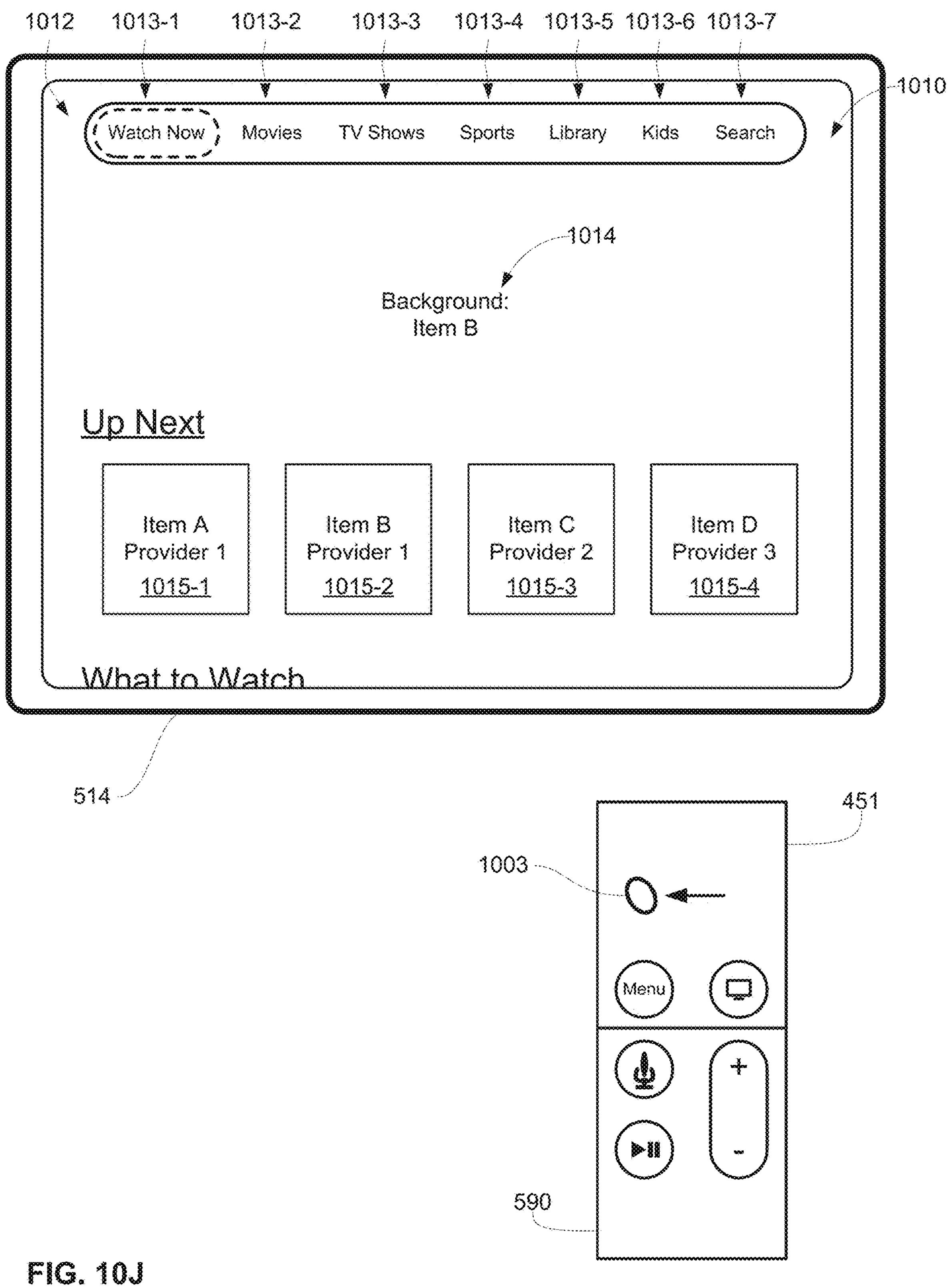
Figure 10K:
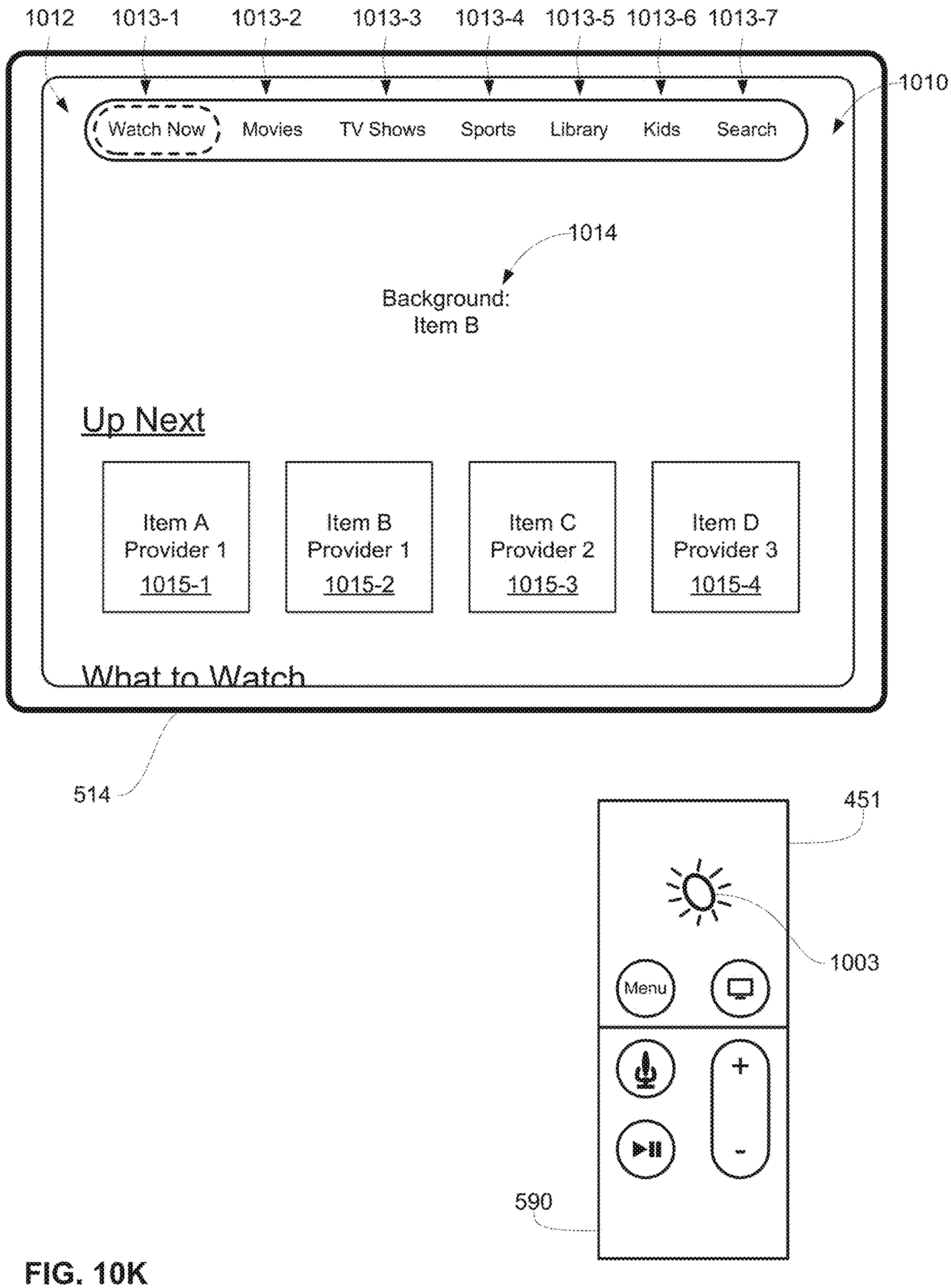

In FIG. 10H, user input 1003 corresponding to an upward navigation (e.g., upward swipe) is received. In some embodiments, in response to user input 1003, focus moves to navigation bar 1012. In FIG. 10I, user input 1003 corresponding to a rightward navigation (e.g., rightward swipe) is received. In some embodiments, in response to user input 1003, focus is shifted to selectable option 1013-3 corresponding to television shows. In some embodiments, in response to the focus moving to selectable option 1013-3, device 500 replaces display of user interface 1010 with display of user interface 1030 corresponding to television shows, as shown in FIG. 10I. In FIG. 10J, user input 1003 corresponding to a leftward navigation (e.g., leftward swipe) is received. In some embodiments, in response to user input 1003, focus is shifted to selectable option 1013-1 corresponding to the "Watch Now" page. In some embodiments, in response to the focus moving to selectable option 1013-1, device 500 replaces display of user interface 1030 with display of user interface 1010 corresponding to the "Watch Now" page, as shown in FIG. 10J.

Figure 10L:
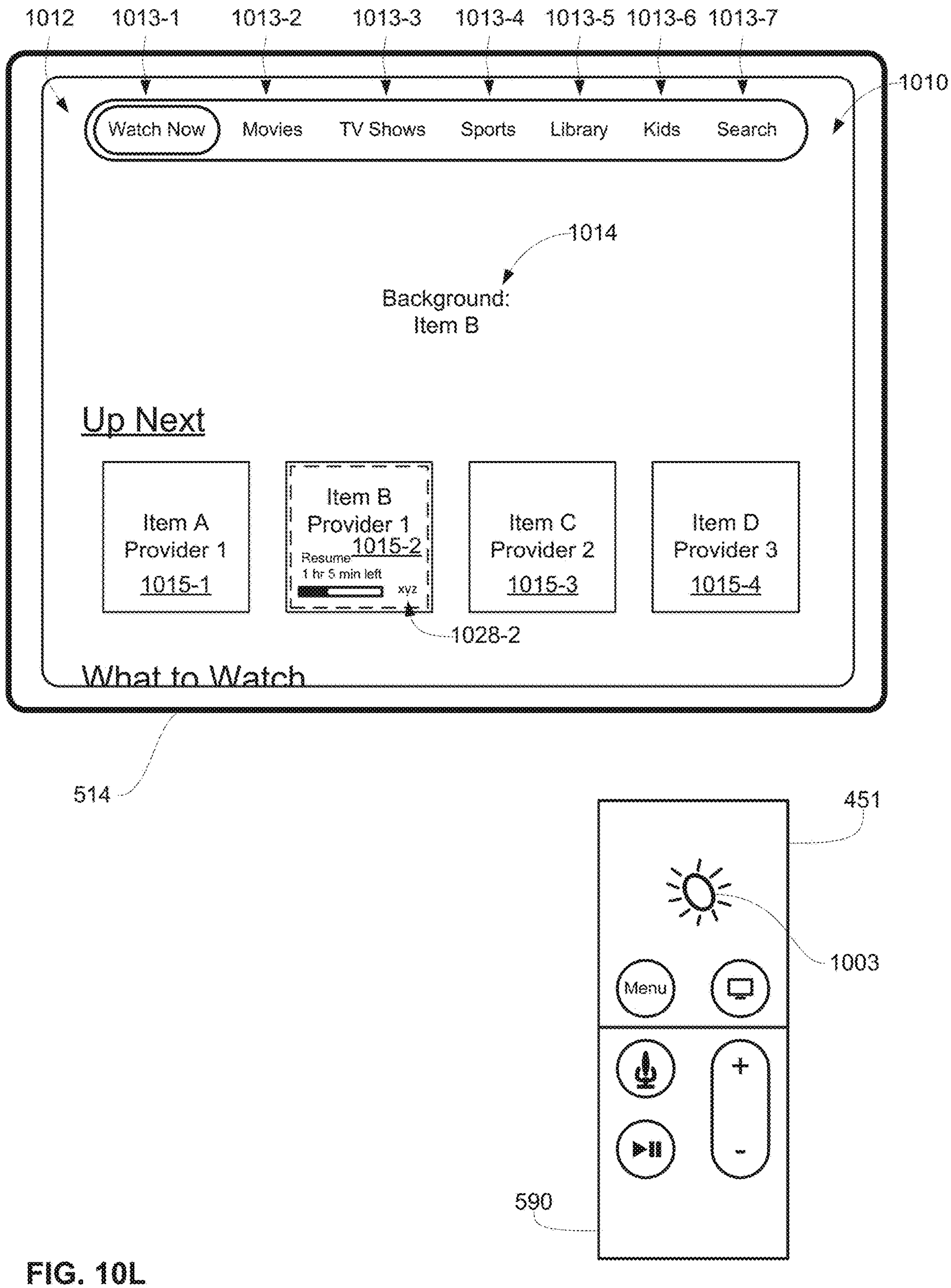
Figure 10M:
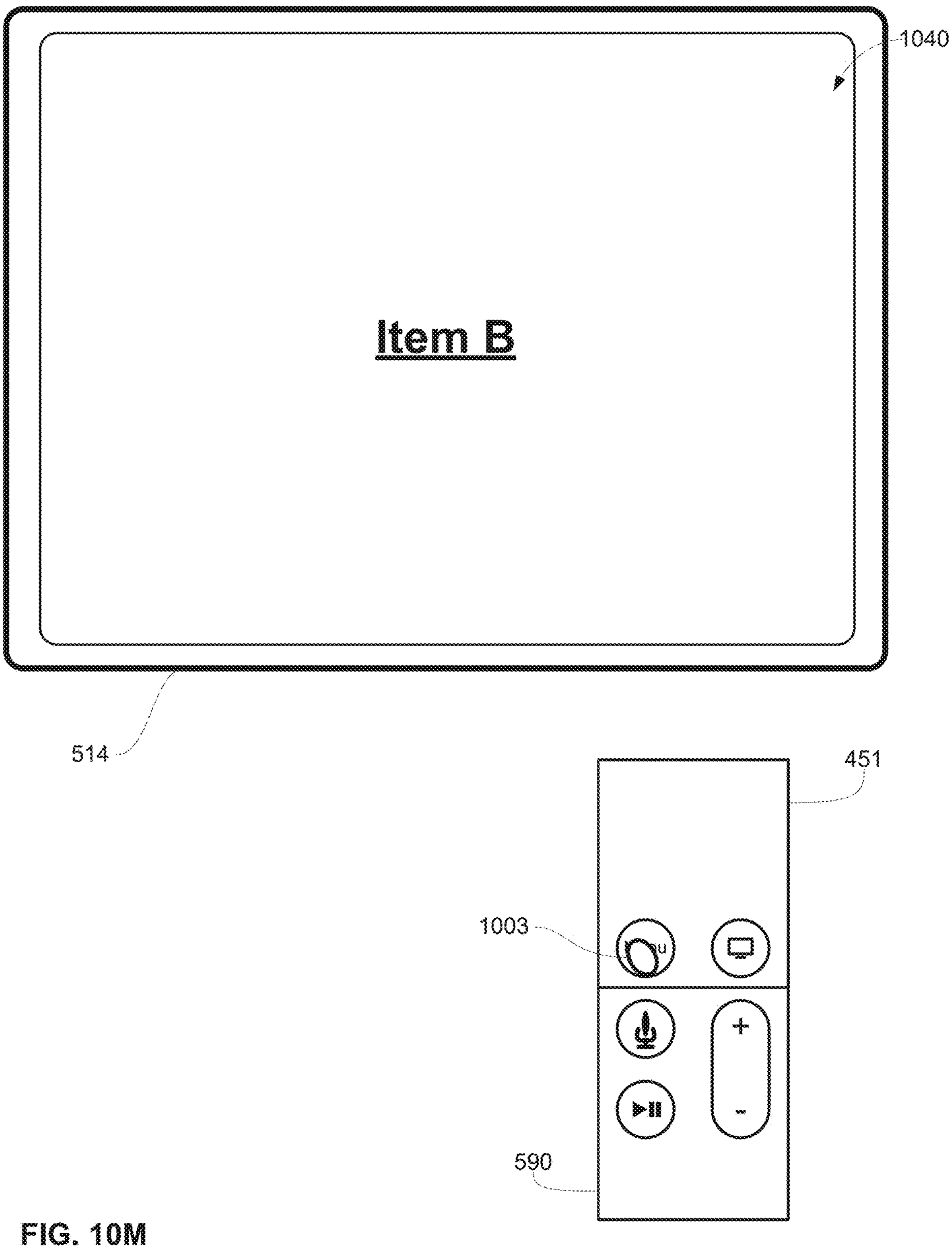

In some embodiments, content display region 1014 is no longer displaying a still image of item A and is now displaying an image of "item B" because "item B" is the content item that previously had focus (e.g., when user interface 1010 was previously displayed) and because icon 1015-2 is the icon that will have focus when the focus moves downwards into user interface 1010. For example, in FIG. 10K, user input 1003 corresponding to a click is received while selectable option 1013-1 has a focus. In some embodiments, in response to user input 1003, focus moves downwards into user interface 1010 and onto icon 1015-2, as shown in FIG. 10L.

Figure 10N:
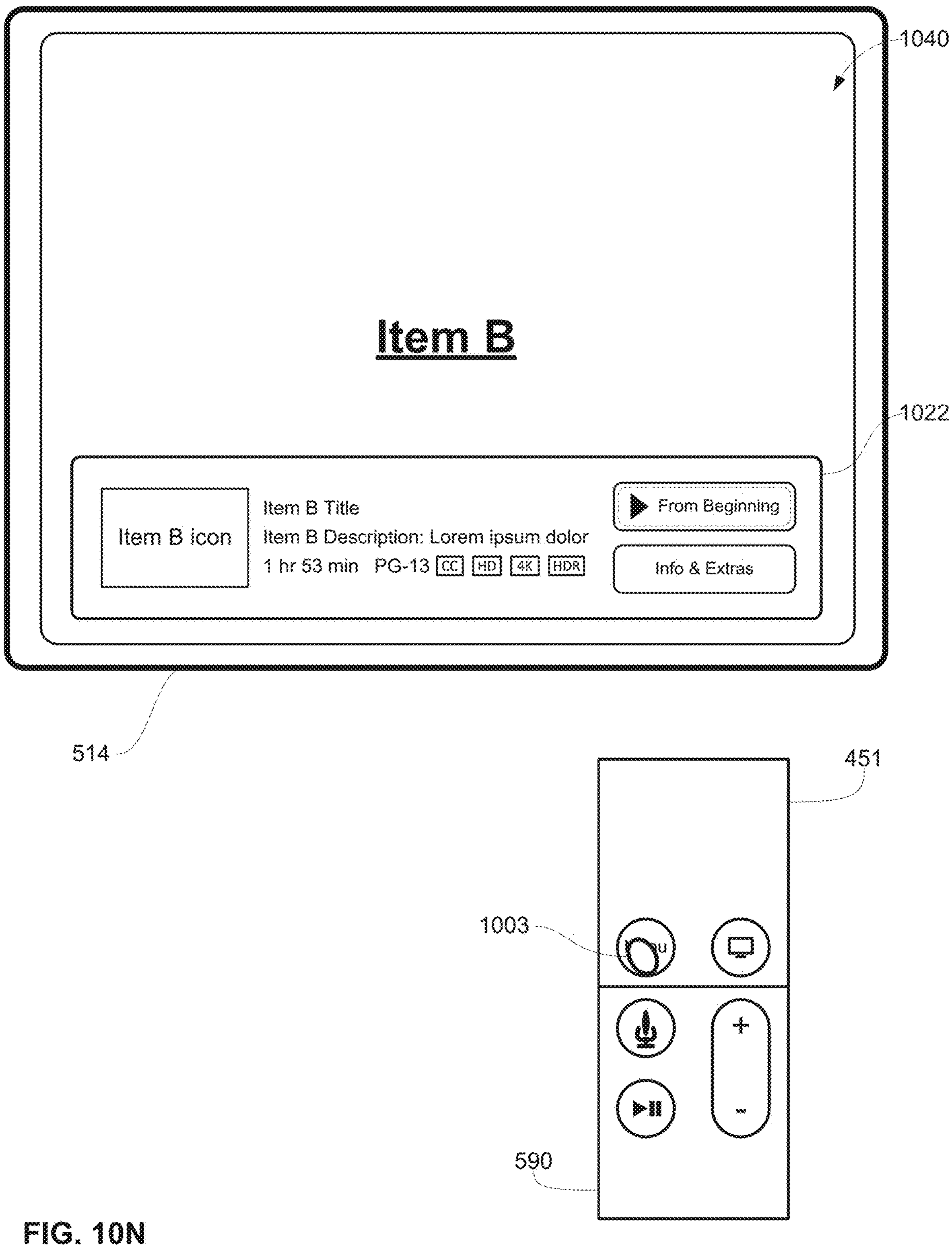
Figure 10O:
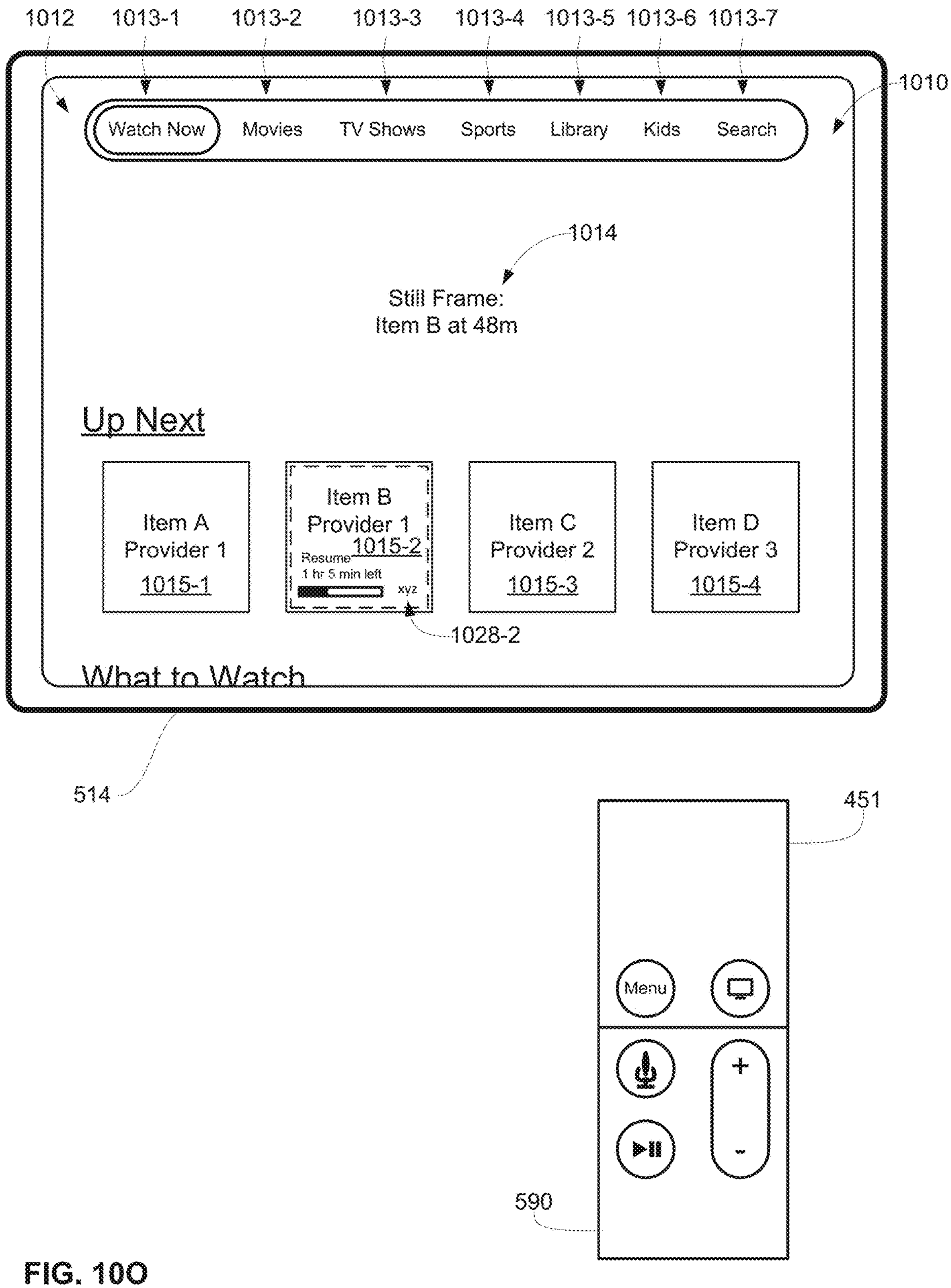

In some embodiments, while icon 1015-2 has a focus, user input 1003 corresponding to a selection input is received. In some embodiments, item B is a content item that is compatible to be played from within the unified media application. Thus, in some embodiments, in response to user input 1003, device 500 displays user interface 1040 and causes fullscreen playback of item B from within the unified media browsing application. In some embodiments, a user input 1003 is received selecting the "menu" button on remote 590. In some embodiments, in response to user input 1003, playback menu 1022 is displayed, as shown in FIG. 10N. In some embodiments, because item B is a movie content item (e.g., as opposed to a television content item), playback menu 1022 includes different types of selectable options, as will be described in more detail below with respect to FIG. 16T.

In some embodiments, while playback menu 1022 is displayed, user input 1003 corresponding to another selection of the "menu" button is received. In some embodiments, in response to the user input, device 500 displays user interface 1010 (e.g., the previous user interface that was displayed before fullscreen playback began). In some embodiments, content display region 1014 now displays a still image of item B at the playback position when fullscreen playback ended (e.g., 48 minutes). Thus, in some embodiments, content display region 1014 has a "sticky" behavior with the still image of item B at 48 minutes.

Figure 10P:
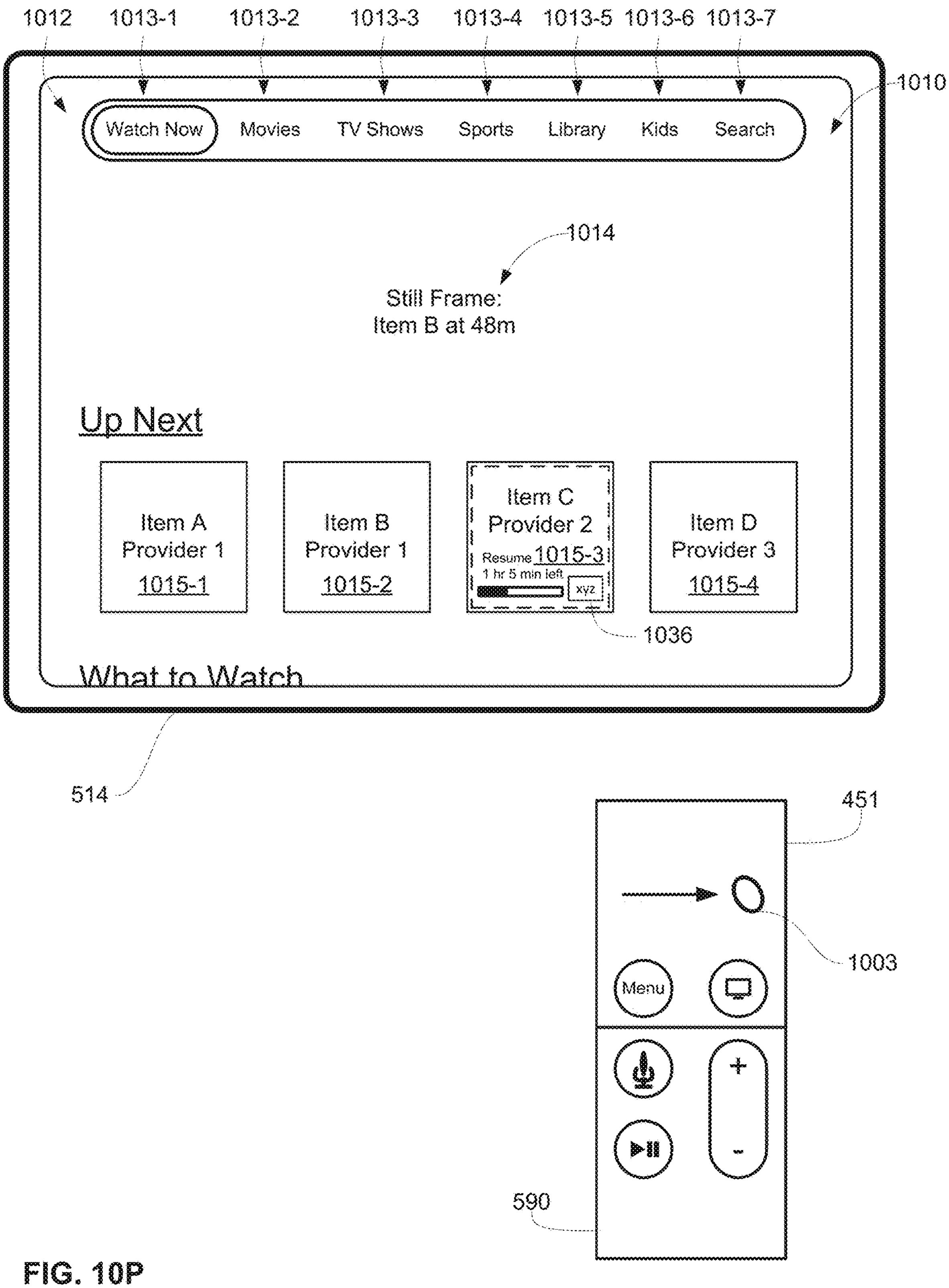

For example, in FIG. 10P, user input 1003 corresponding to a rightward navigation (e.g., rightward swipe on touch sensitive surface 451) is received. In response to user input 1003, focus moves to icon 1015-3 corresponding to "Item C". In some embodiments, because content display region 1014 is displaying a still frame of item B at 48 m, content display region does not update to display an image of item C and instead, continues to display a still frame of item B at 48 m.

Figure 10Q:
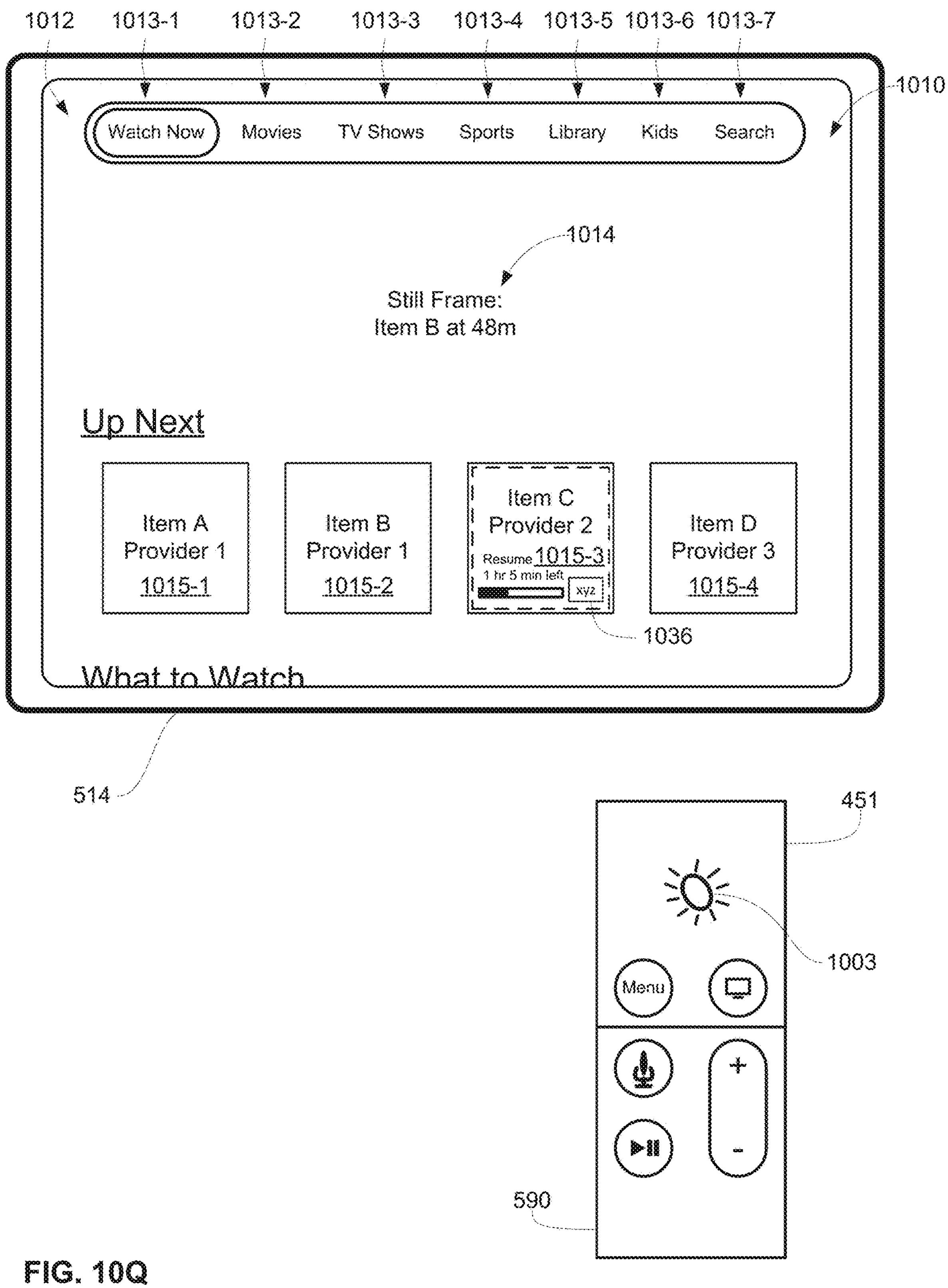
Figure 10R:
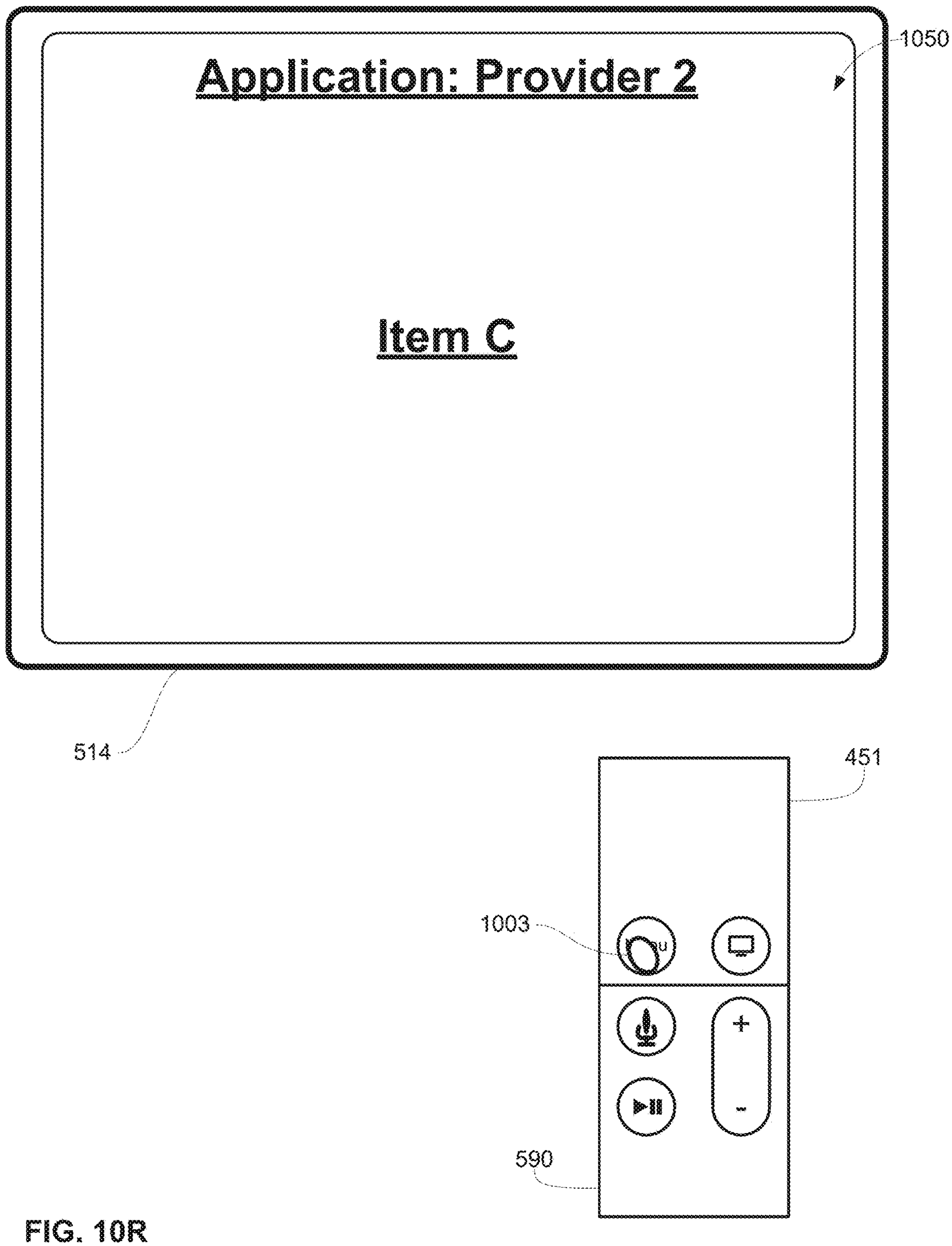
Figure 10S:
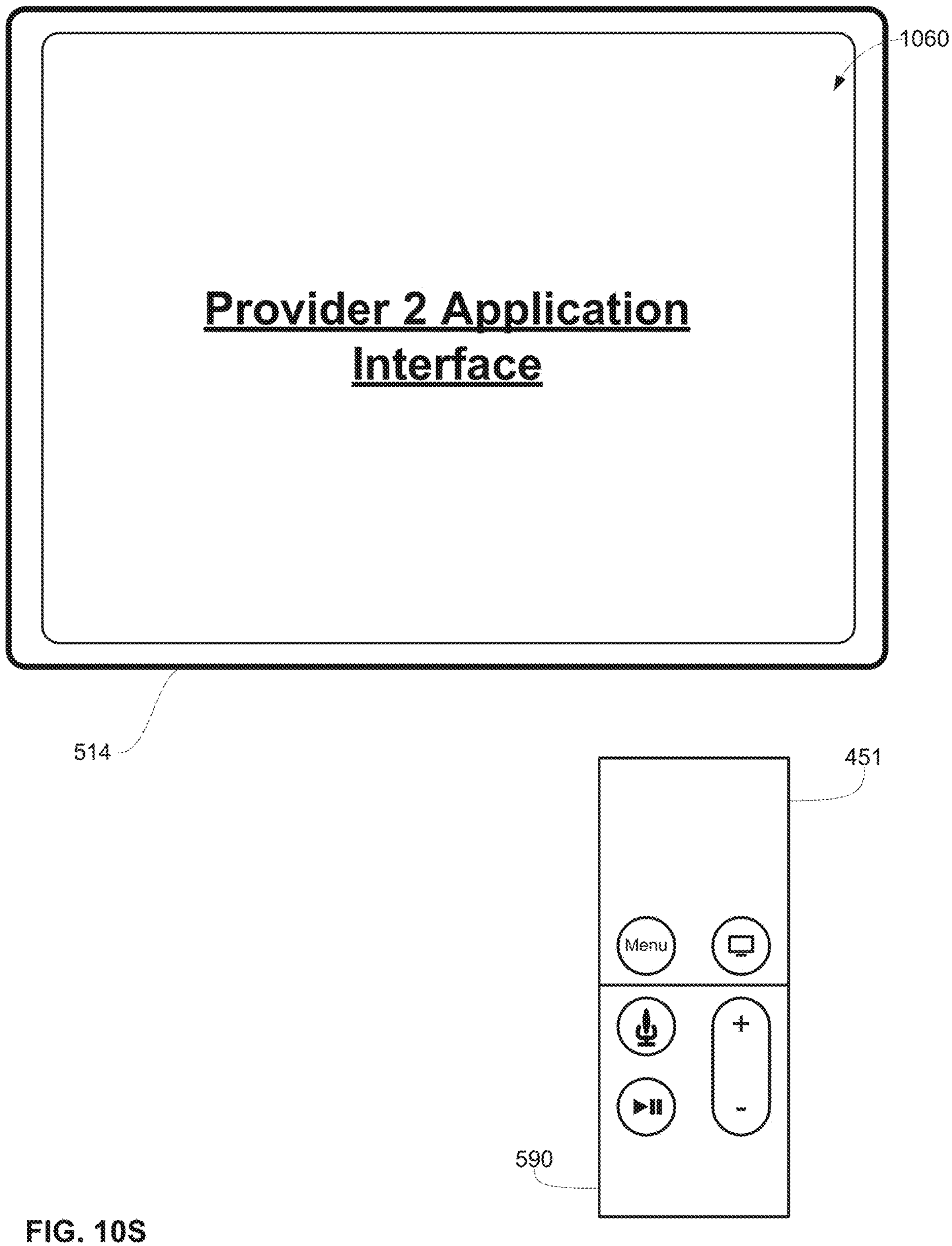

In some embodiments, as shown in FIG. 10Q, user input 1003 corresponding to a selection in put (e.g., click on touch sensitive surface 451 of remote 590) is received while icon 1015-3 has a focus. In some embodiments, item C, corresponding to icon 1015-3 is a content item that is not compatible to be played within the unified media browsing application. For example, in some embodiments, item C must be played by the dedication application of provider 2. Thus, in response to user input 1003 selecting item C, the provider 2 application is launched to cause fullscreen playback of item C, as shown in FIG. 10R. Thus, in some embodiments, device 500 has transitioned away from the unified media browsing application and the provider 2 application is now running and being displayed.

In some embodiments, while the provider 2 application is displaying item C, user input 1003 is received selecting the "menu" button on remote 590. In some embodiments, because the provider 2 application is displayed, in response to user input 1003, device 500 displays user interface 1060 of application 2. In some embodiments, user interface 1060 is a menu user interface of application 2. In some embodiments, user interface 1060 is a user interface that is at a higher navigational level than user interface 1050. In other words, in response to a request to exit playback, user interface 1010 is not redisplayed and thus content display region 1014 does not display a still image of item C. In some embodiments, if the user navigates back to the unified media browsing navigation, the "sticky" aspect of content display region 1014 is reset because display of user interface 1010 has been "refreshed" (e.g., similarly to when the user interface was refreshed when device 500 navigated to user interface 1030 and back to user interface 1010, as described above with respect to FIGS. 10I-10J).

Figure 10T:
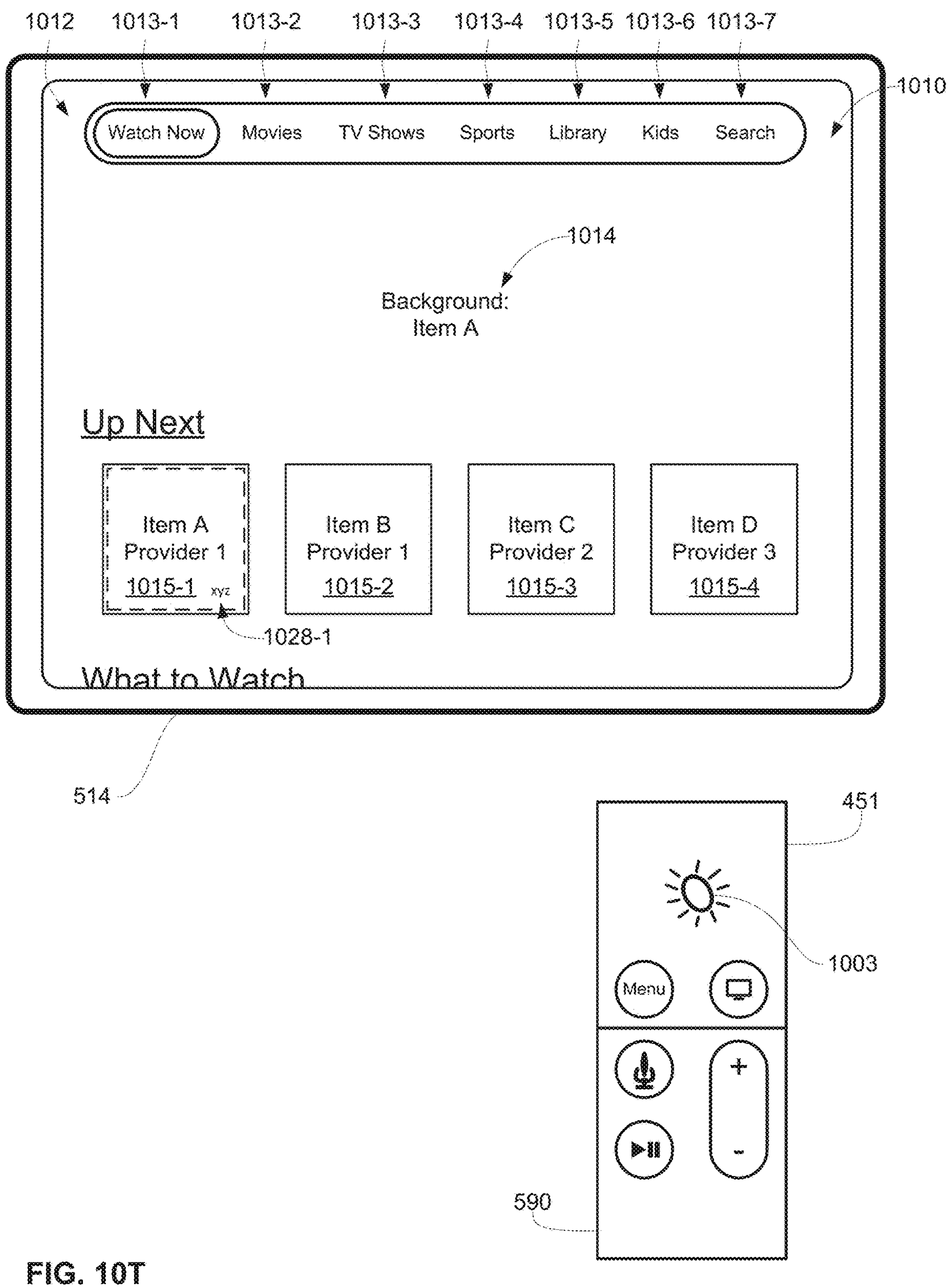
Figure 10U:
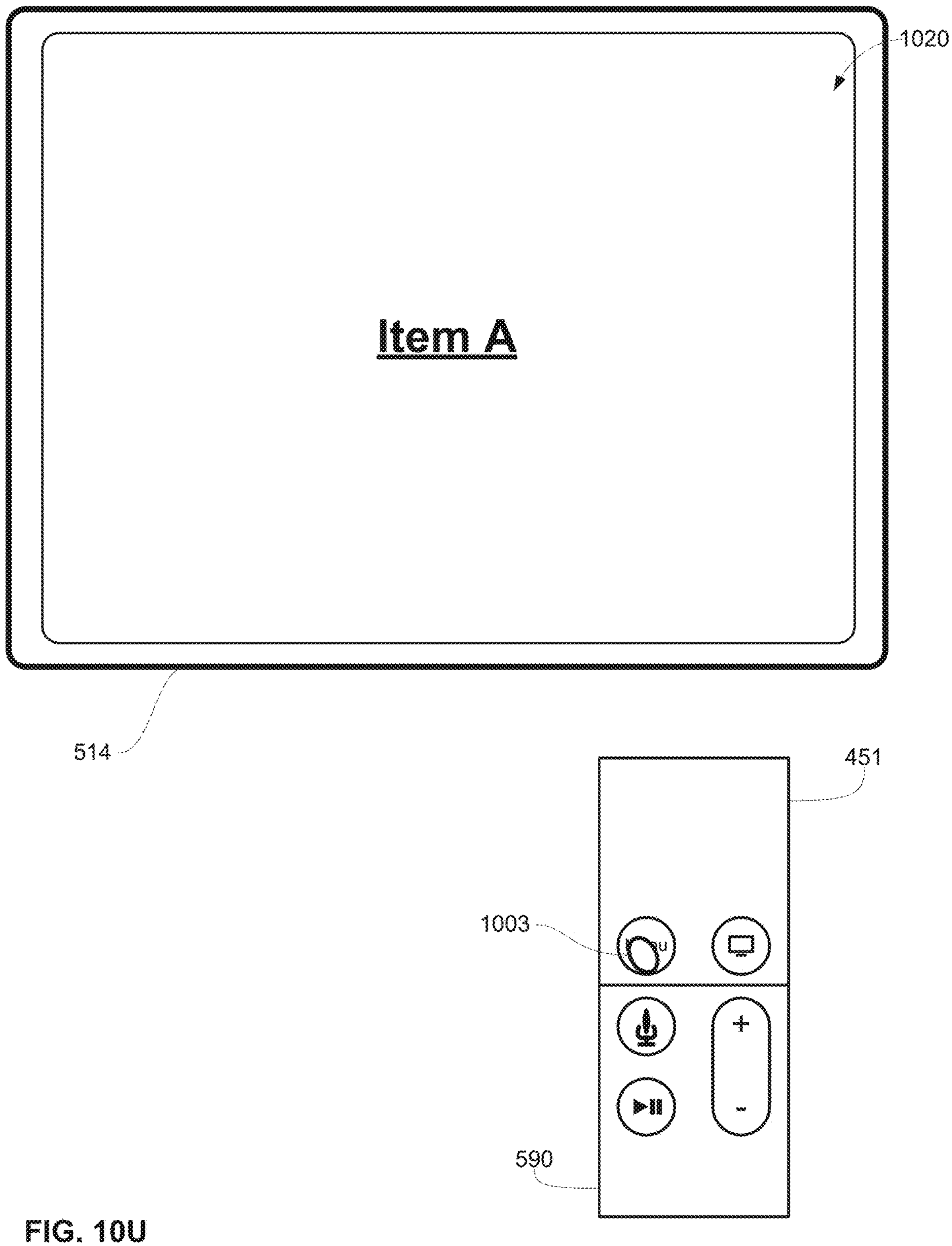
Figure 10V:
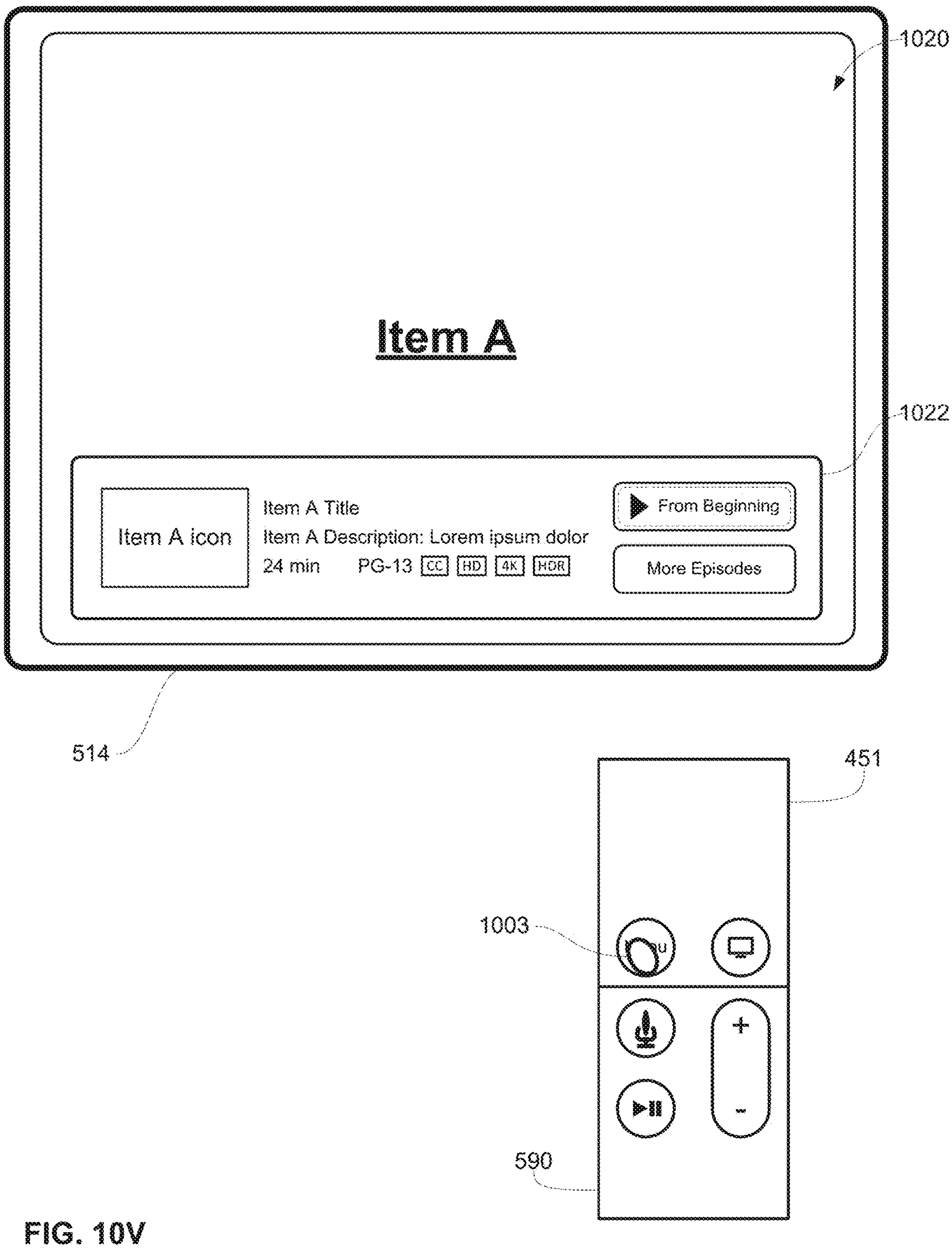

FIGS. 10T-10HH illustrate an alternative embodiment in which the "sticky" behavior of content display region 1014 applies to continued playback of content (e.g., as opposed to displaying of a still image). FIG. 10T illustrates user interface 1010 of a media browsing application corresponding to the "Watch Now" page. In some embodiments, while icon 1015-1 has a focus, user input 1003 corresponding to a selection input (e.g., click on touch-sensitive surface 451 of remote 590) is received. In some embodiments, in response to user input 1003, device 500 displays user interface 1020 and causes fullscreen playback of item A within the unified media browsing application, as shown in FIG. 10U.

Figure 10W:
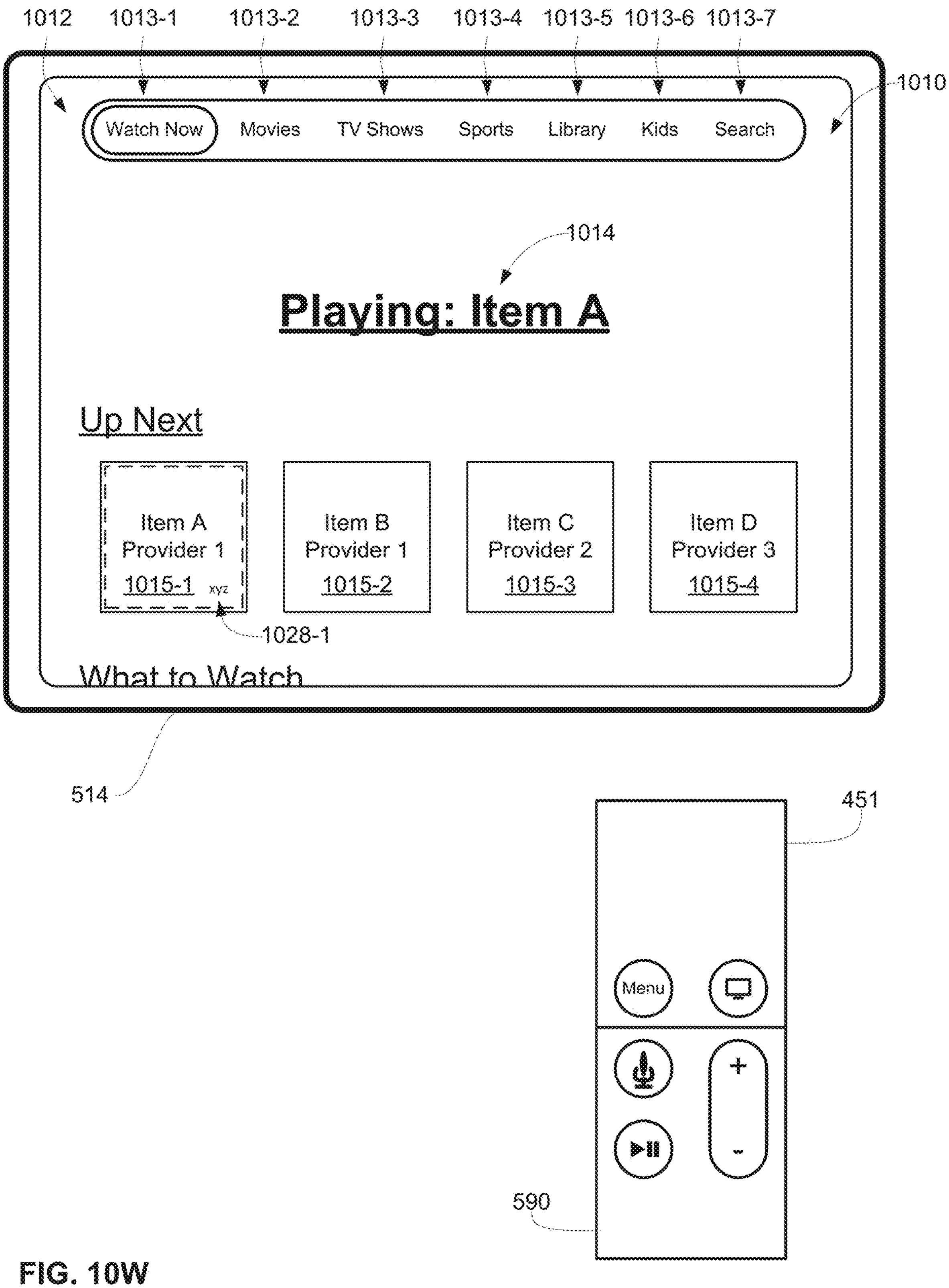

In some embodiments, while fullscreen playback of item A is displayed on display 514, user input 1003 is received selecting the "menu" button of remote 590. In response to user input 1003, playback menu 1022 is displayed, as shown in FIG. V. In some embodiments, while playback menu 1022 is displayed, user input 1003 is received selecting the "menu" button of remote 590. In response to user input 1003, device 500 replaces display of user interface 1020 with user interface 1010 (e.g., the previous user interface that was displayed before fullscreen playback began), as shown in FIG. 10W.

In some embodiments, after exiting fullscreen playback, content display region 1014 continues the playback of item A (e.g., continuing playback from the position when the user exited fullscreen playback mode). In some embodiments, playback of item A is similar to the fullscreen playback on user interface 1020. In some embodiments, the aspect ratio of playback of item A in content display region 1014 is changed such that the entire of content display region 1014 contains content (e.g., there are no "black bars" in the playback). In some embodiments, navigation bar 1012 and the rows of content are displayed overlaid on top of the playback of item A. In some embodiments, playback of item A in the content display region has the same "sticky" behavior as described above.

Figure 10X:
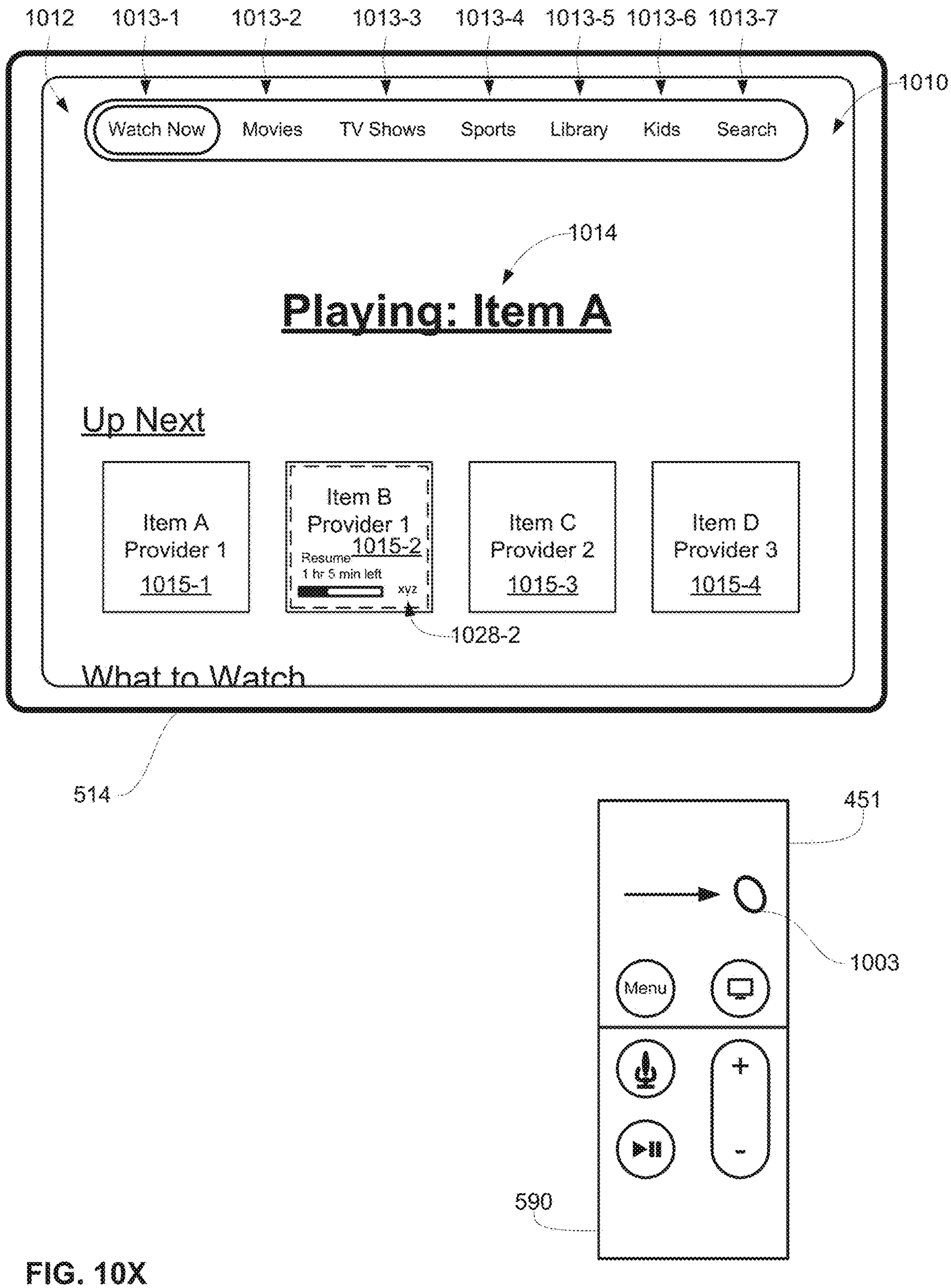

For example, in FIG. 10X, user input 1003 corresponding to a rightward navigation (e.g., rightward swipe) is received. In some embodiments, in response to user input 1003, focus is moved to icon 1015-2 corresponding to item B. In some embodiments, because content display region 1014 is performing playback of item A after exiting fullscreen playback of item A, moving the focus to 1015-2 does not cause content display region 1014 to update or change to display content from item B. In some embodiments, content display region 1014 continues to perform playback of item A.

Figure 10Y:
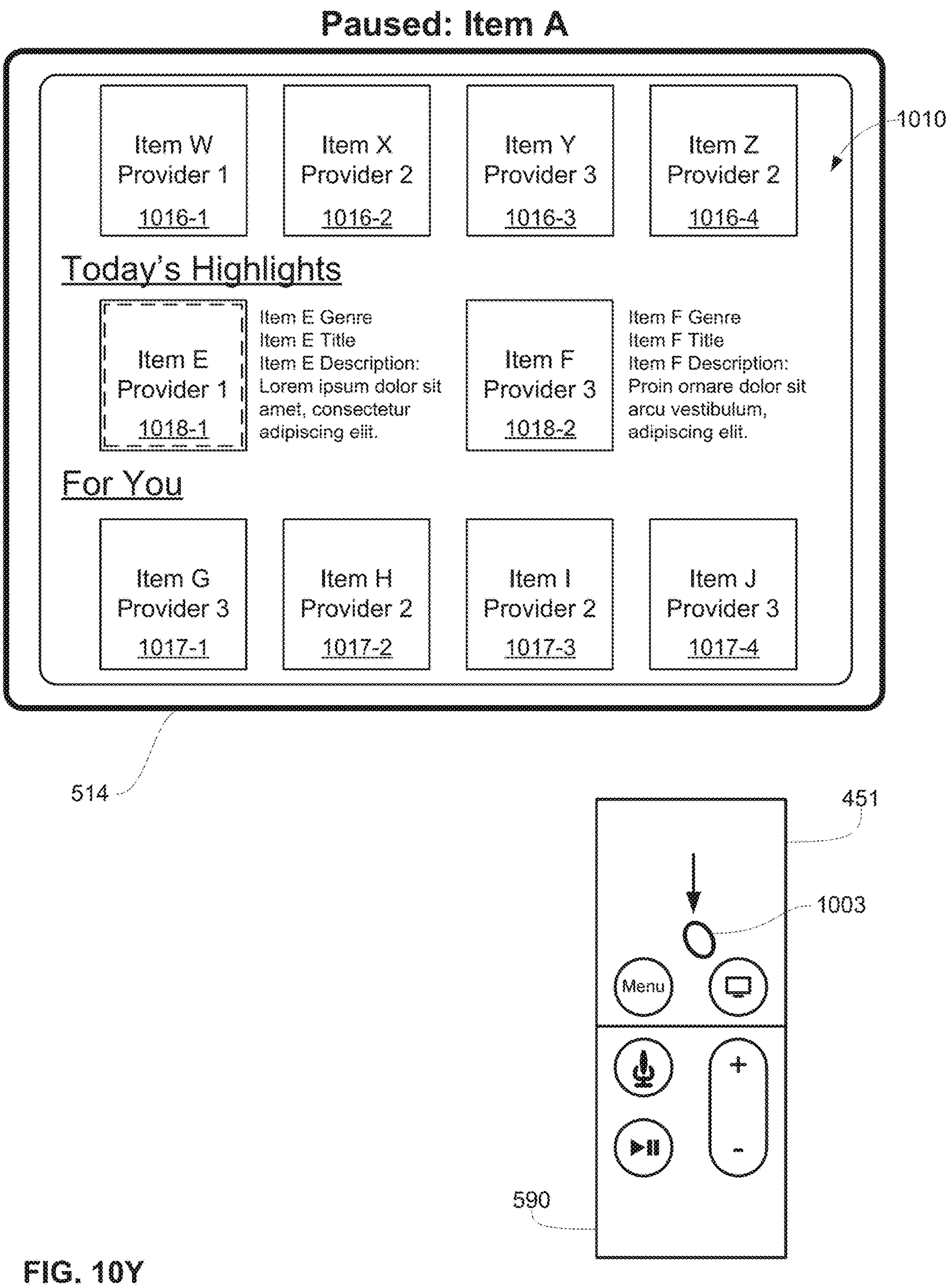

In FIG. 10Y, user input 1003 corresponding to a downward navigation (e.g., downward swipe) is received. In some embodiments, in response to user input 1003, user interface 1010 scrolls downwards and reveals more rows of content. In some embodiments, when user interface 1010 scrolls downward, content display region 1014 is hidden and no longer displayed. In some embodiments, because content display region 1014 is no longer displayed, playback of item A pauses. In some embodiments, if item A is a live broadcast content item (e.g., as opposed to an on-demand content item), then video playback of the content is paused (e.g., no longer displayed because content display region 1014 is no longer displayed), but audio playback continues. In some embodiments, continuing audio playback of a live broadcast item allows the user to continue experiencing the live broadcast while browsing for content, especially when the user cannot easily re-watch portions of the live broadcast that were missed (e.g., without a digital video recorder or waiting for an on-demand listing of the live broadcast).

Figure 10Z:
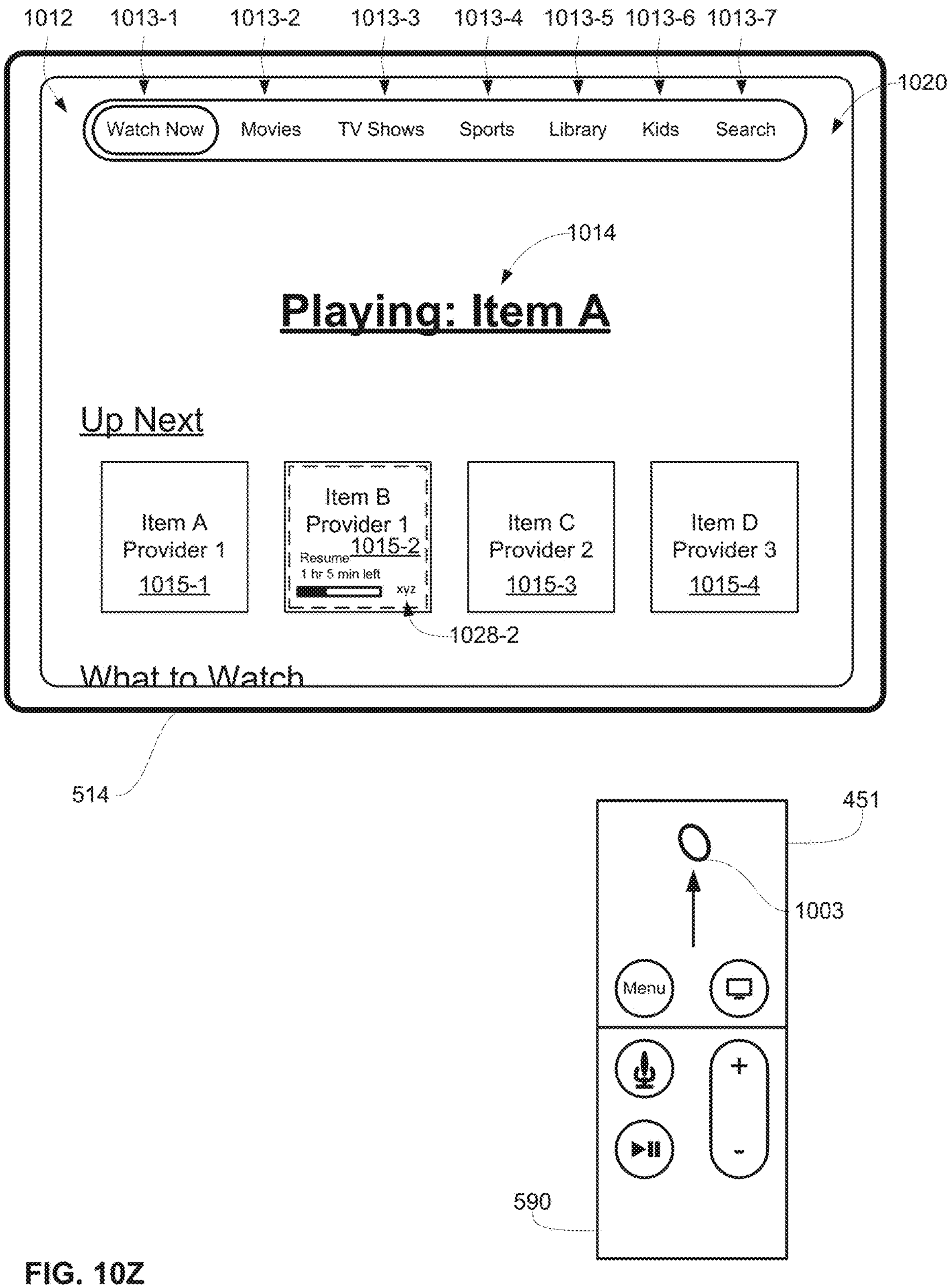
Figure 10A:
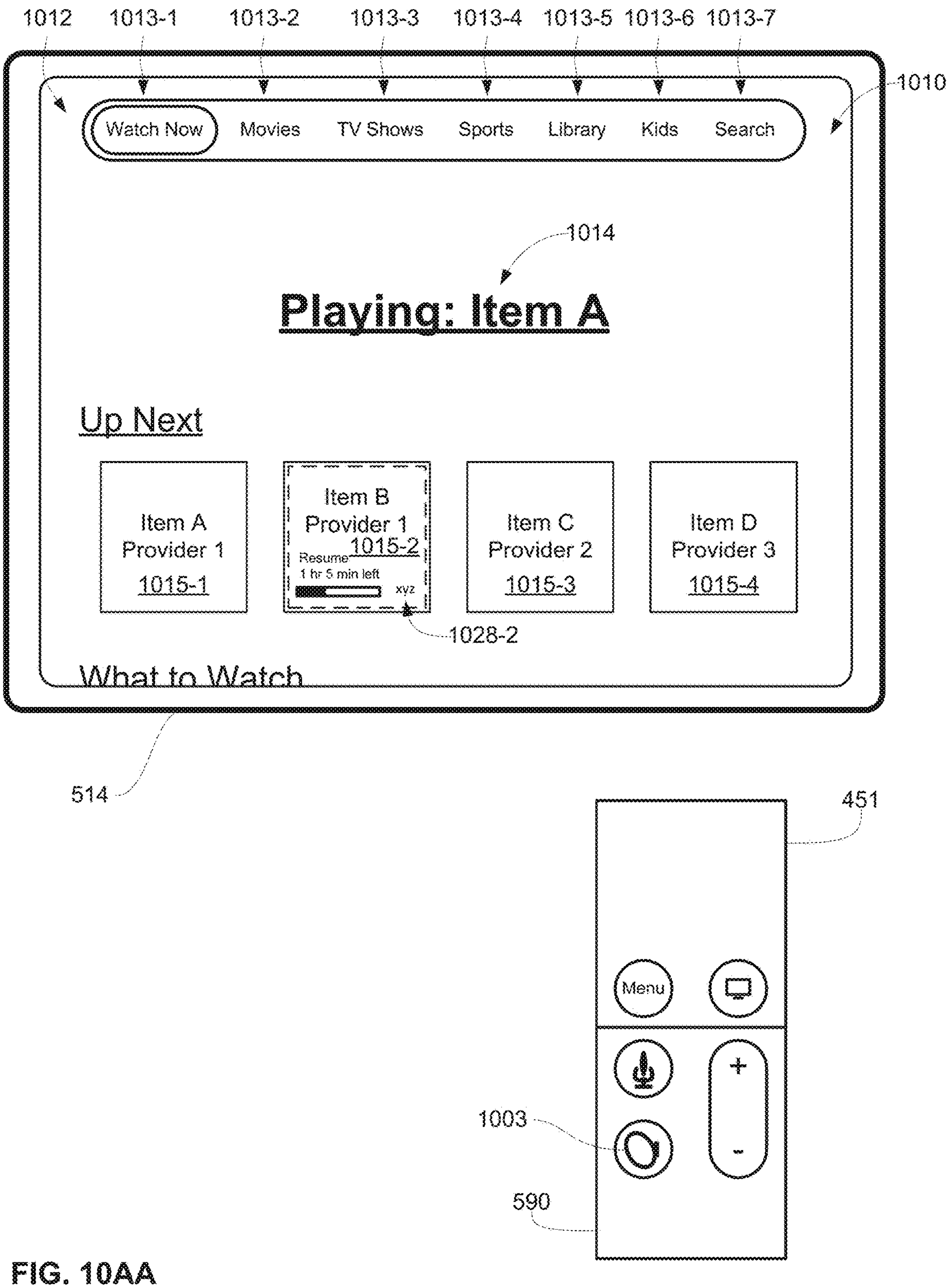
Figure 10B:
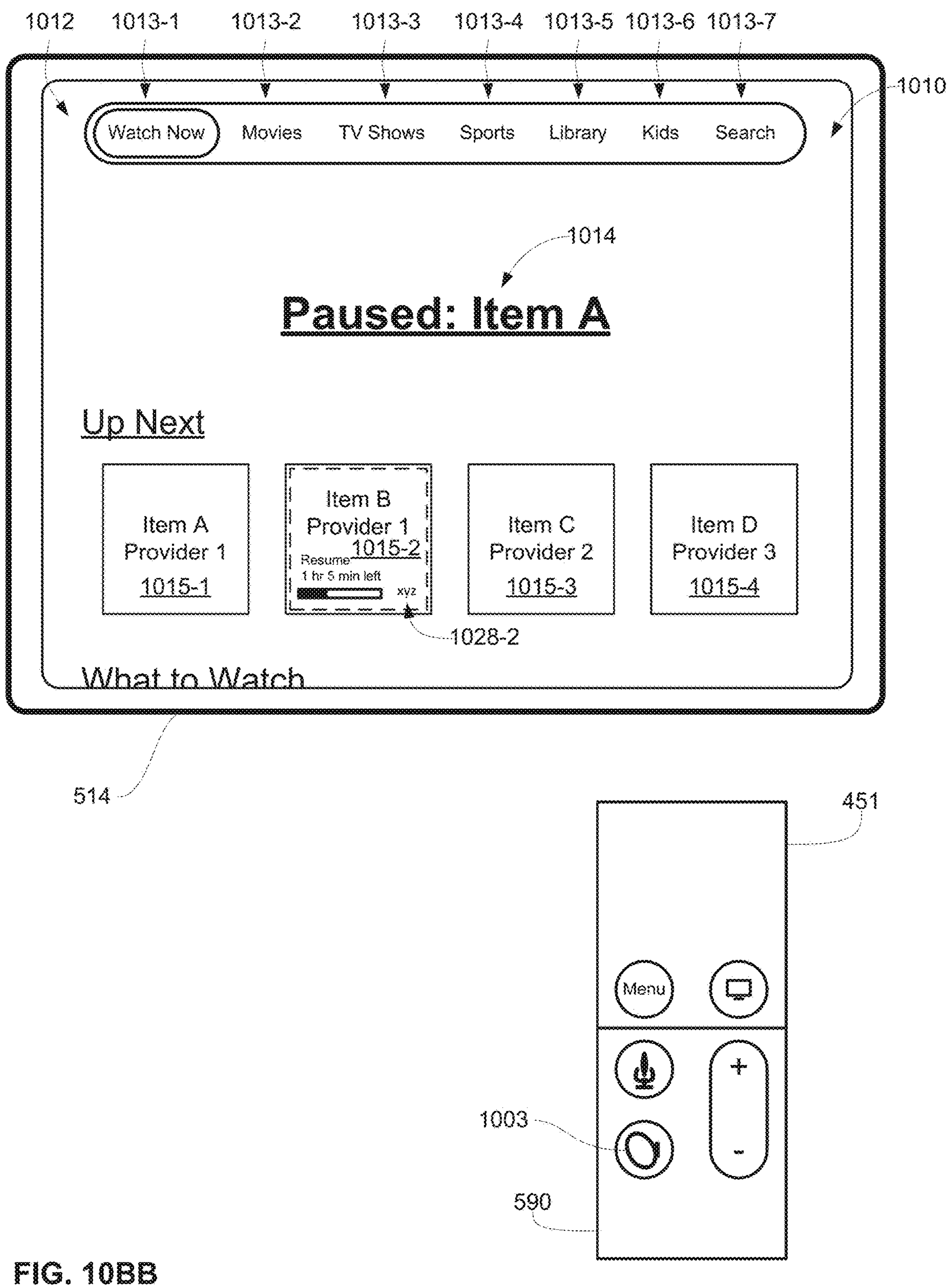
Figure 10C:
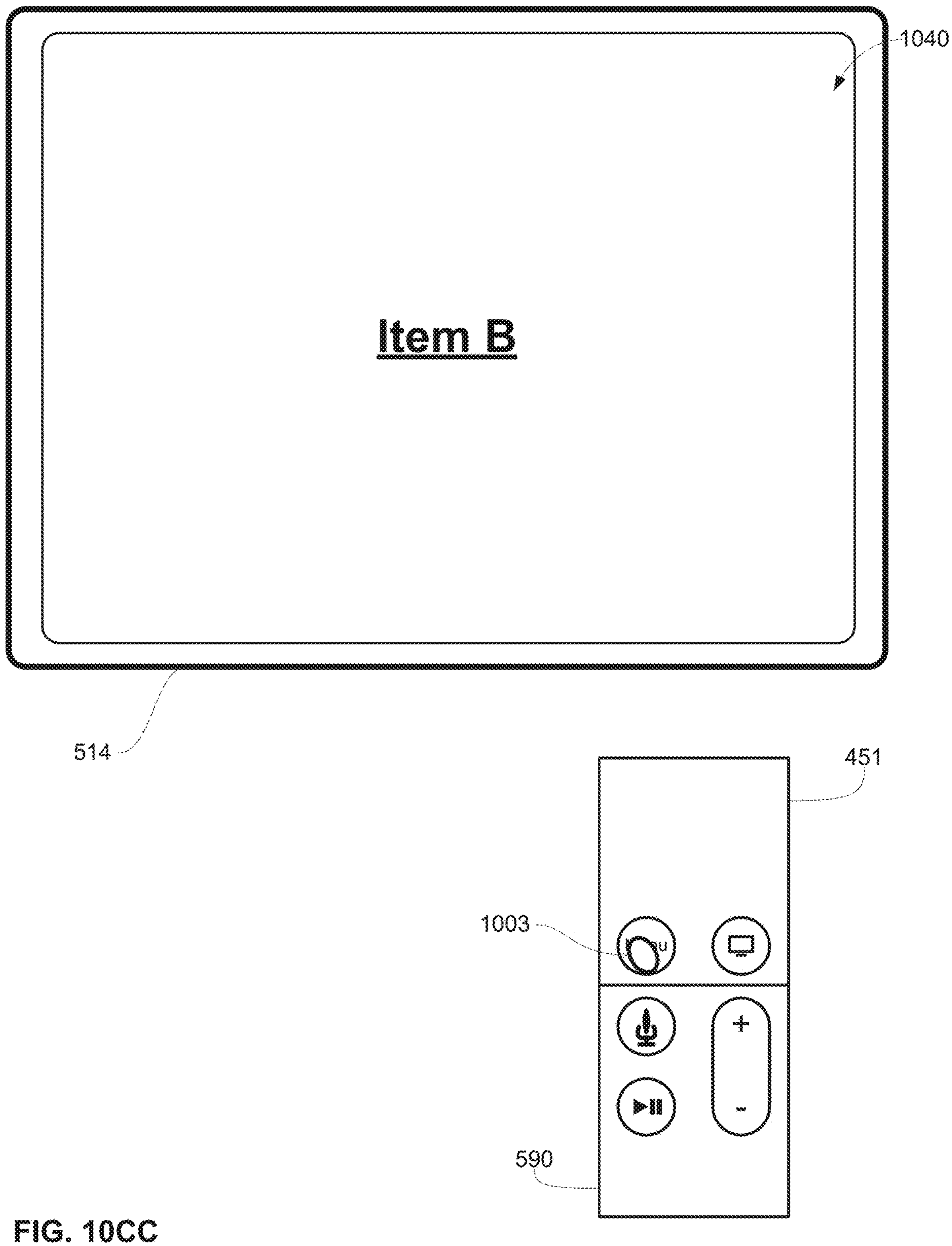
Figure 10D:
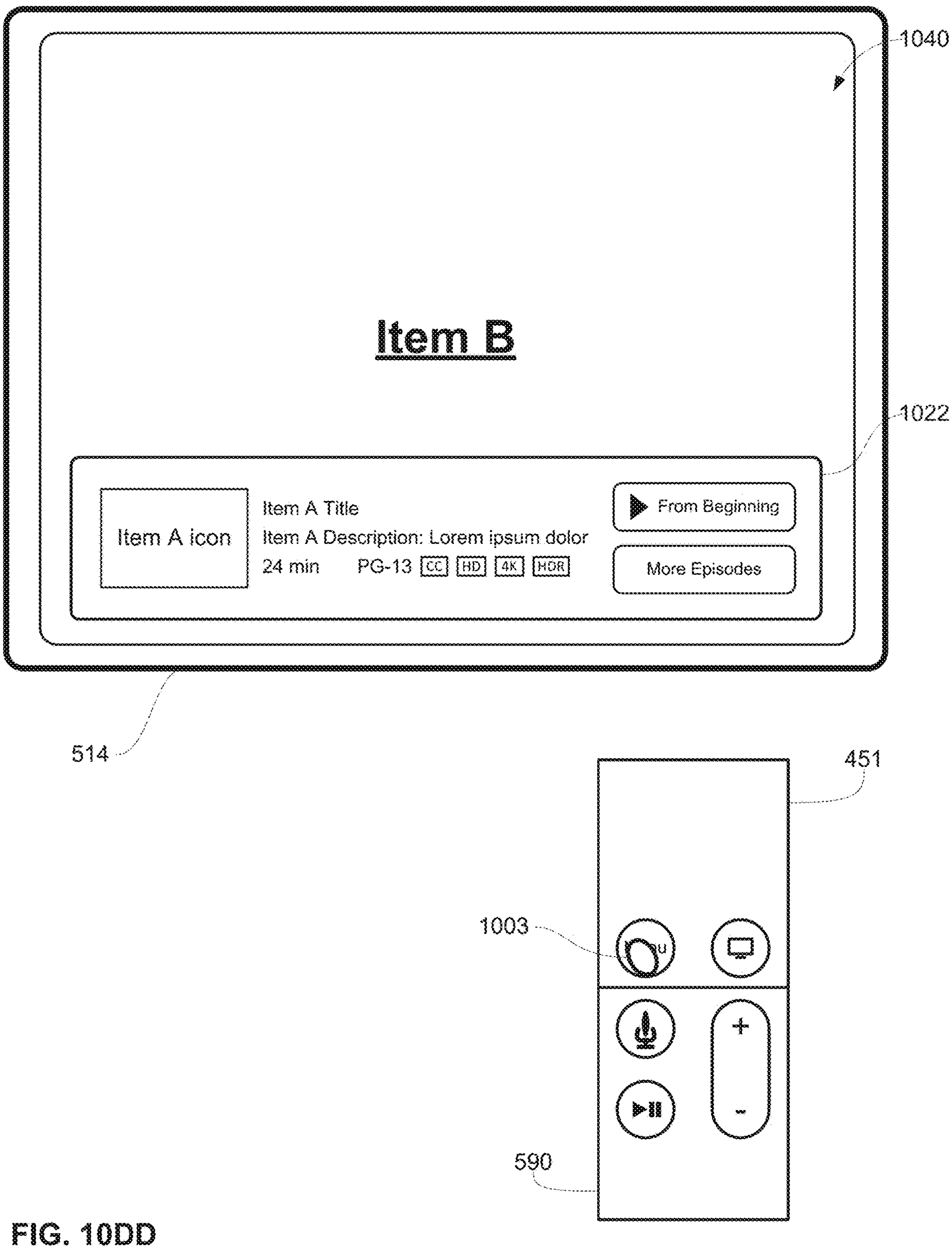
Figure 10E:
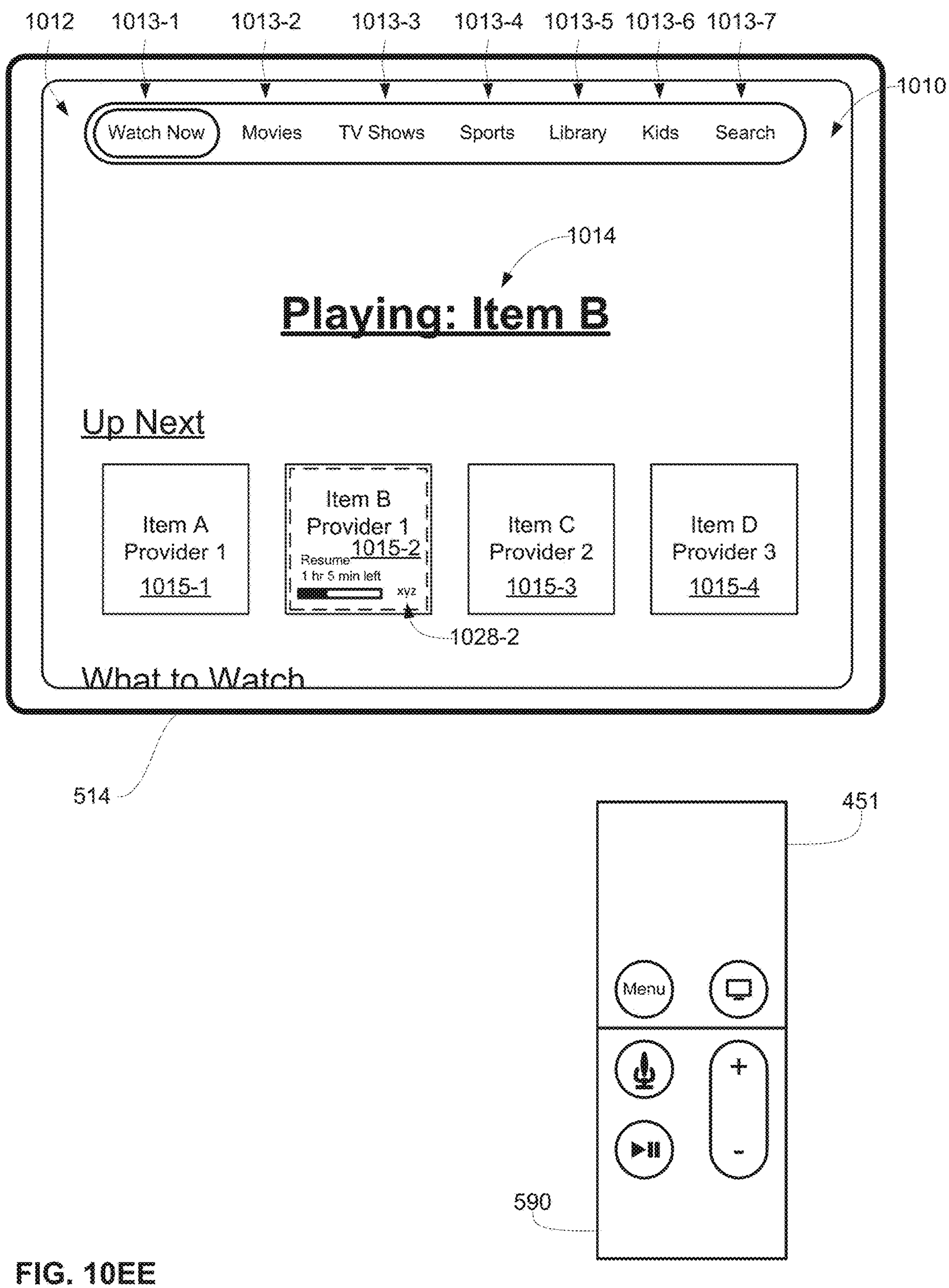
Figure 10F:
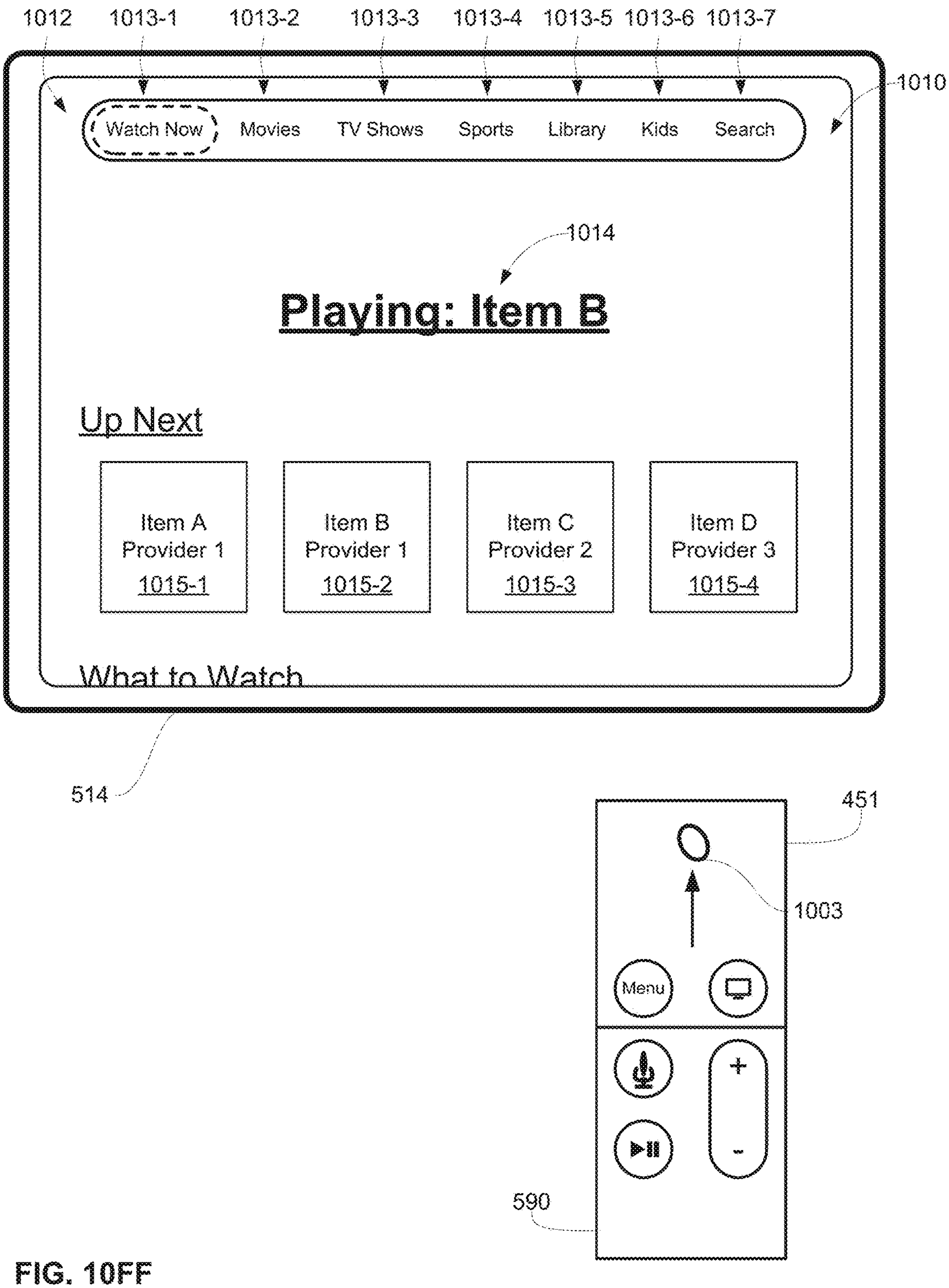
Figure 10G:
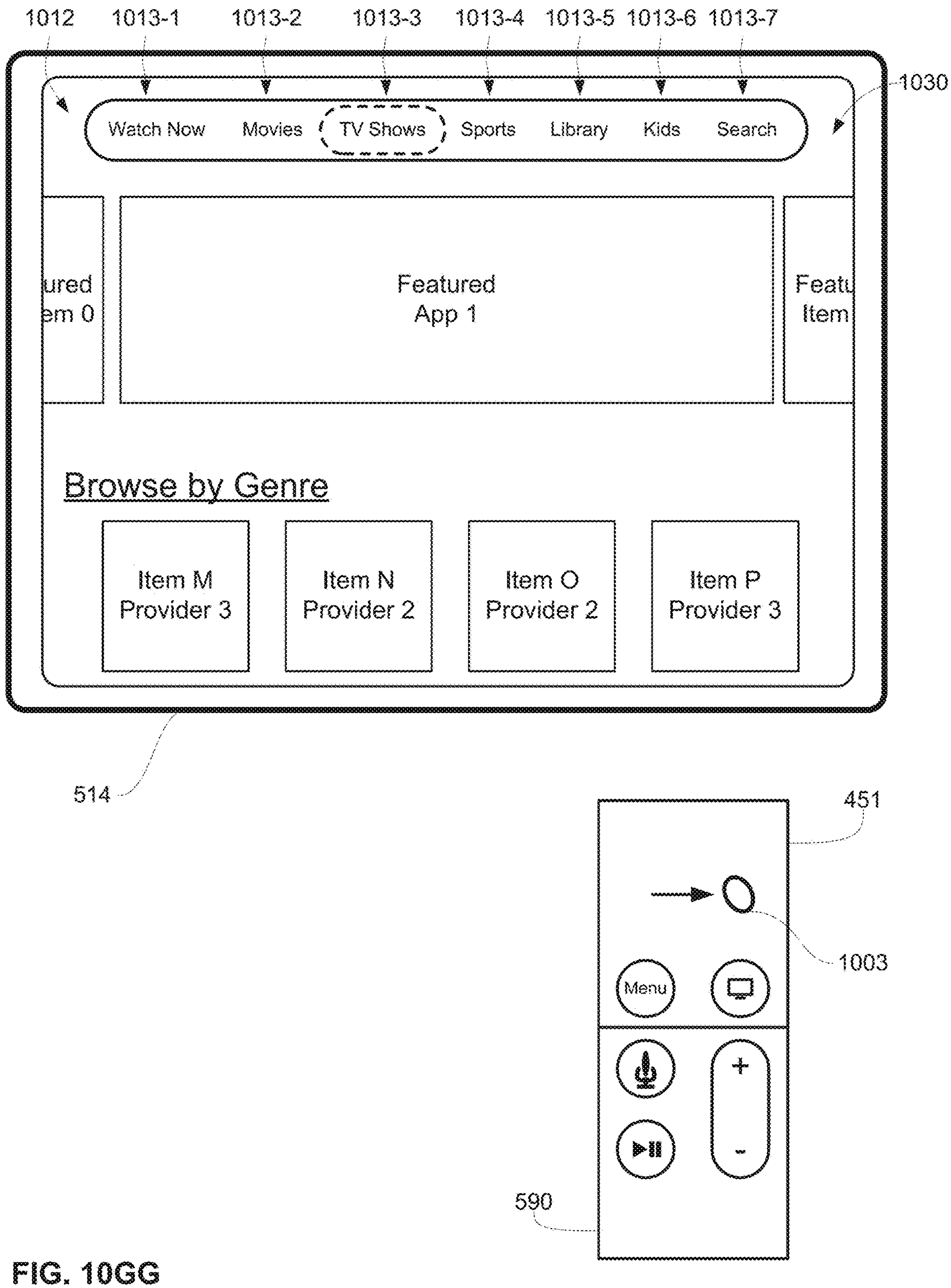
Figure 10H:
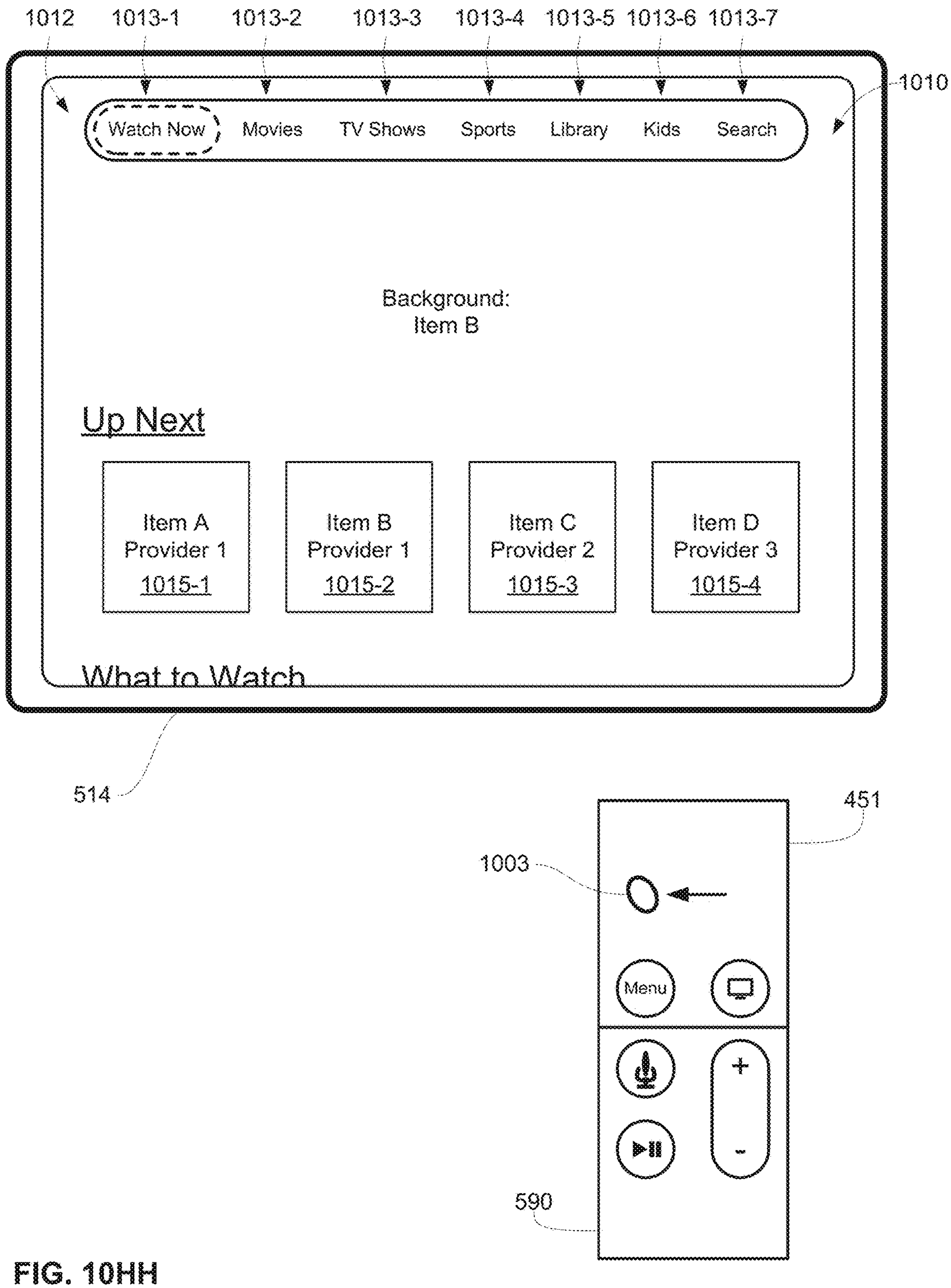
Figure 11B:
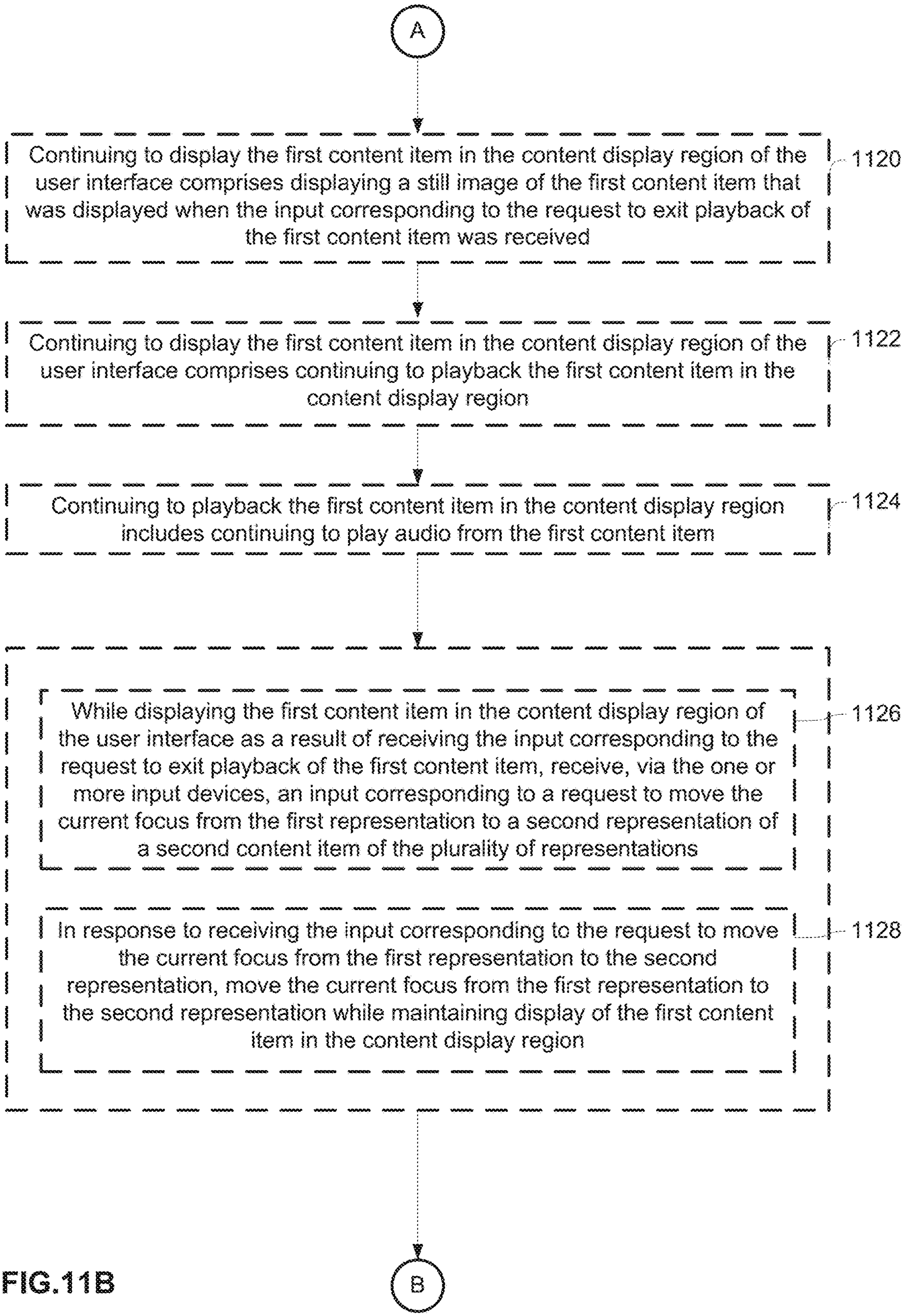
Figure 11C:
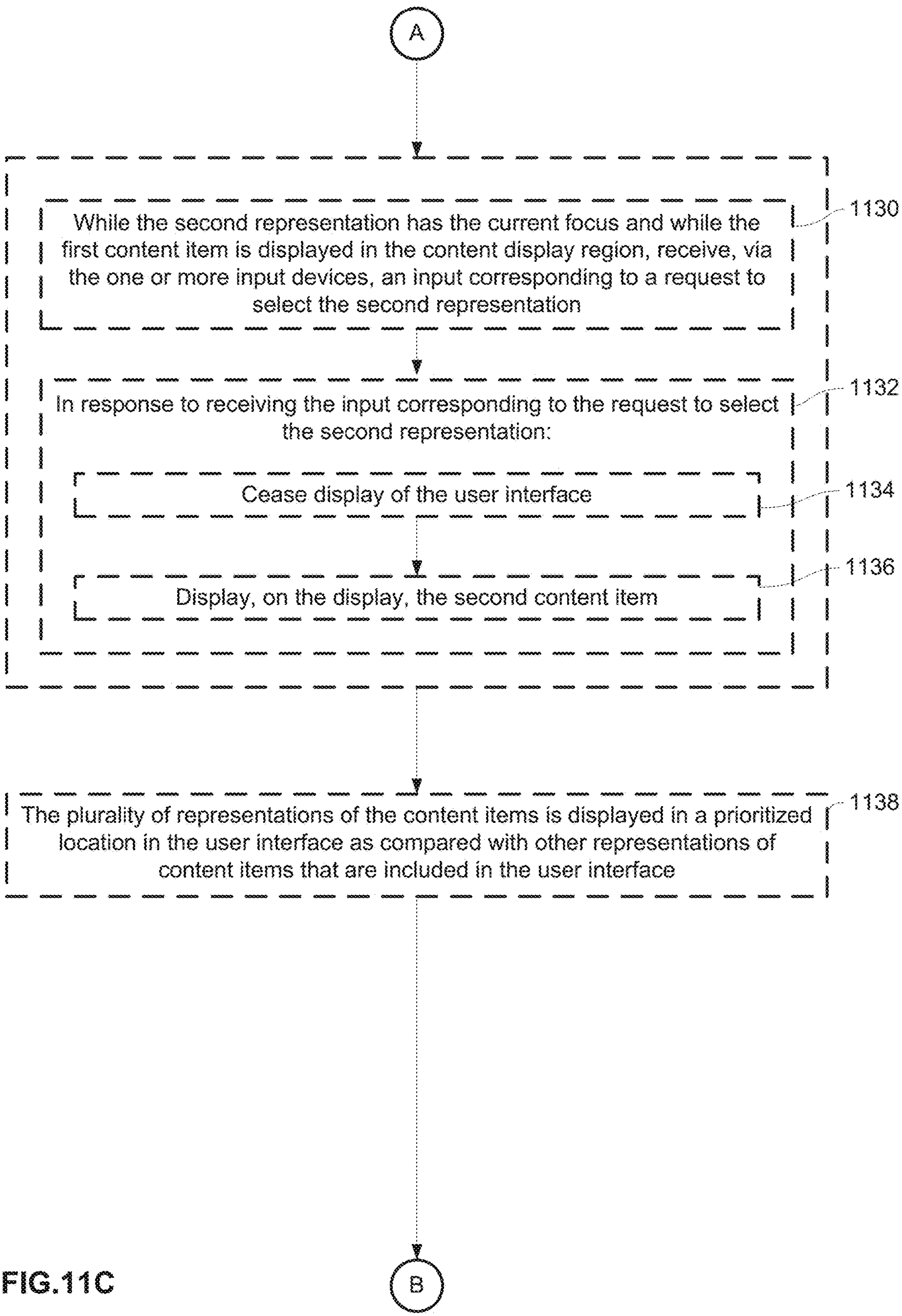
Figure 11D:
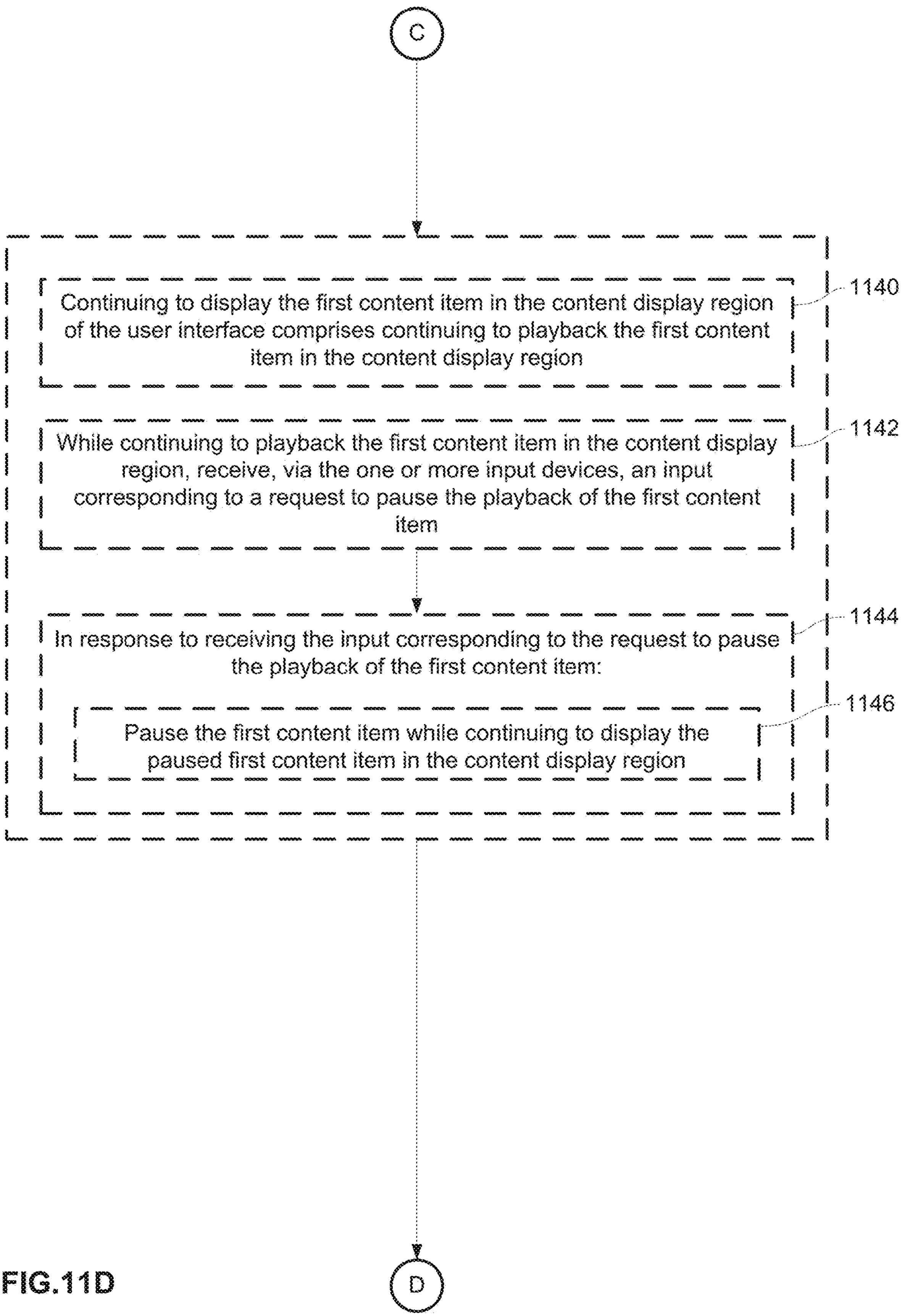
Figure 11E:
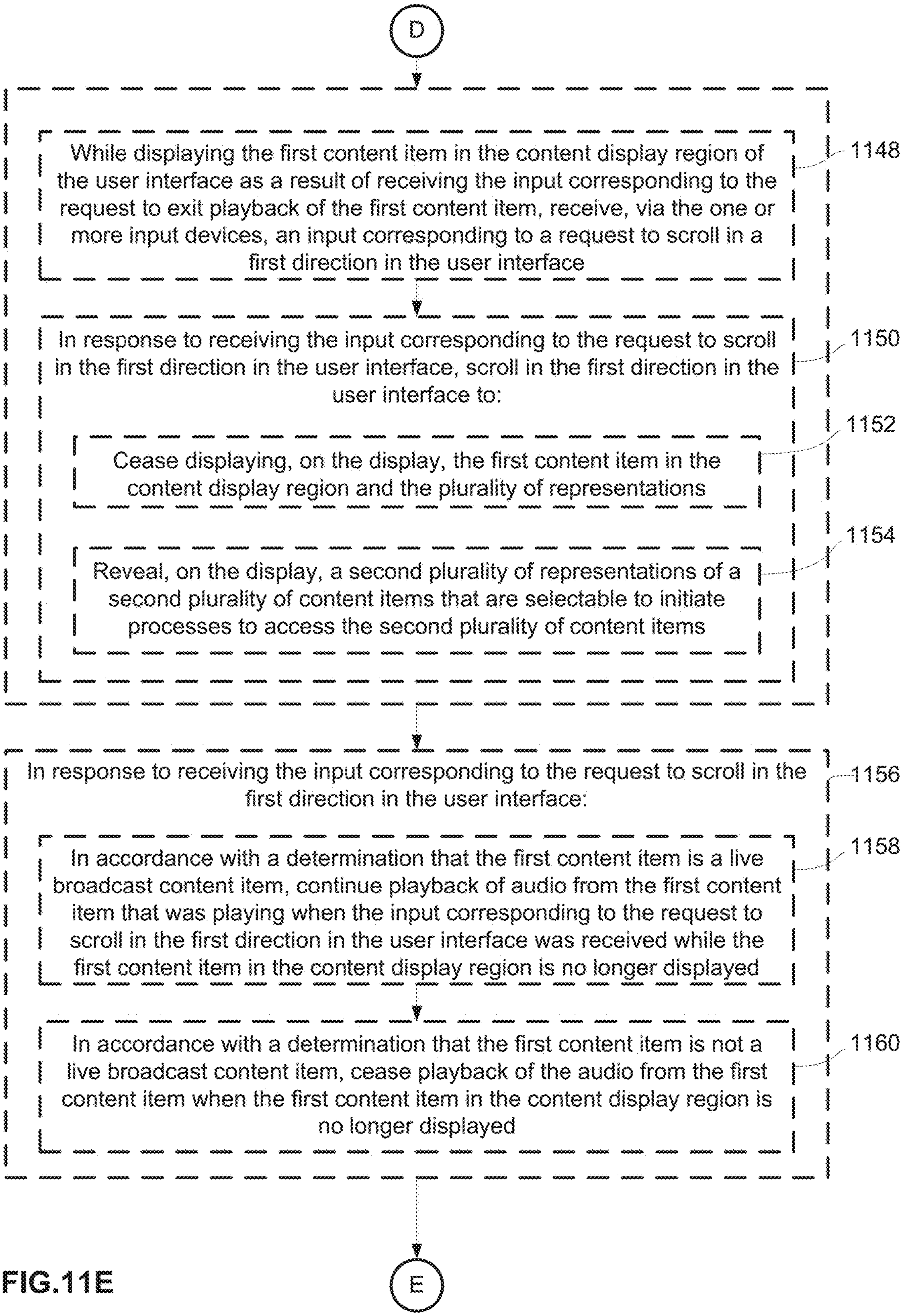
Figure 11F:
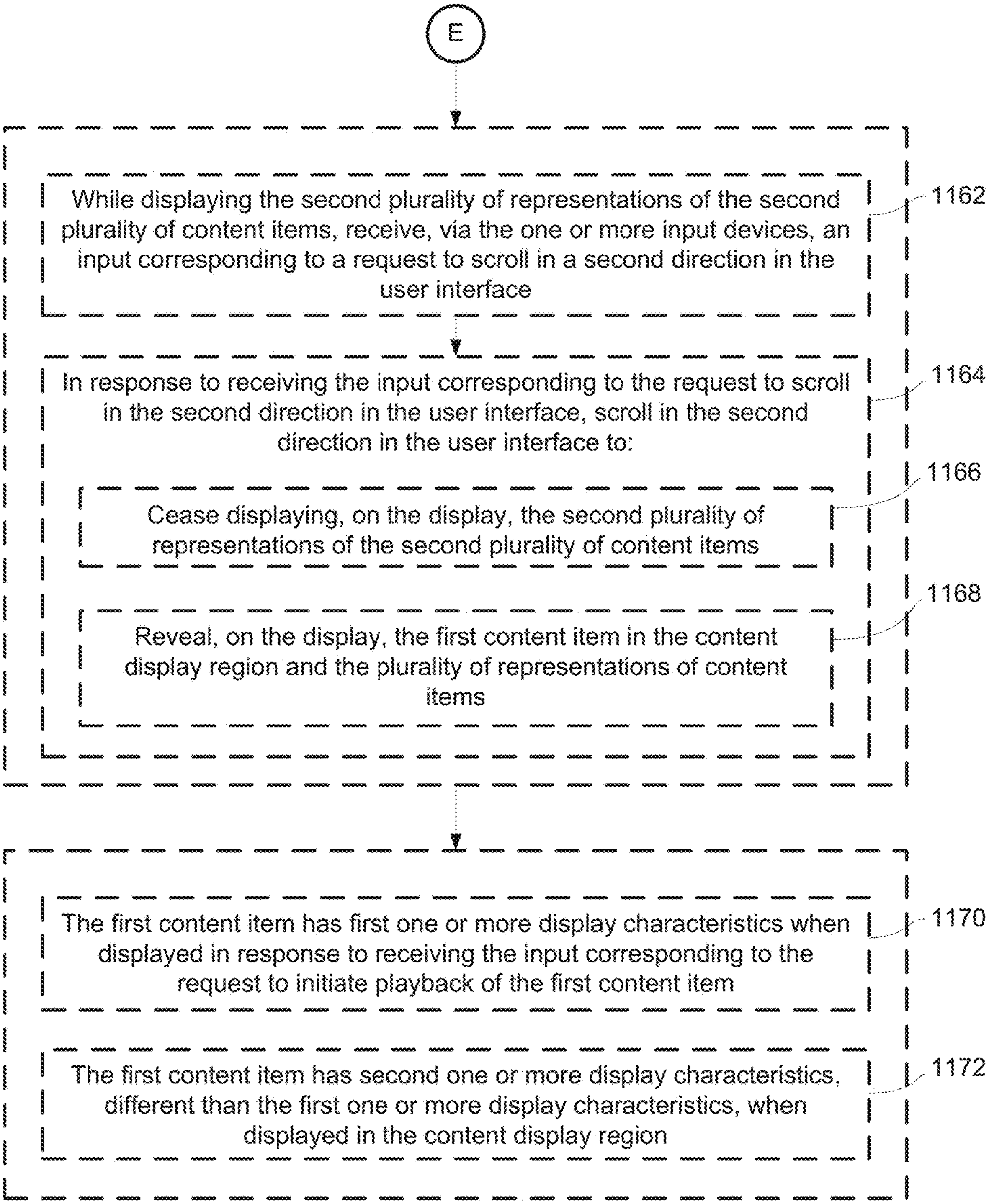

In FIG. 10Z, user input 1003 corresponding to an upward navigation (e.g., upward swipe) is received. In some embodiments, in response to user input 1003, user interface 1010 scrolls upwards and reveals the "Up Next" row and content display region 1014. In some embodiments, content display region 1014 resumes playback of item A, starting from the position where it was previously paused (e.g., as a result of content display region 1014 being scrolled away). In some embodiments, if item A is a live broadcast item and audio playback continued when user interface was navigated downwards, then resumption of playback of item A syncs the playback of the video (e.g., that was temporarily not being displayed) with the playback of the audio (that was still being played even though the video playback track was not being displayed) such that there is no skips or stutters in the audio and/or video playback. Thus, in some embodiments, when content display region 1014 performs playback of content that was playing in a fullscreen mode within the unified media browsing application, content display region 1014 exhibits a "sticky" behavior in which the content display region 1014 continues playback despite the user navigating around user interface 1010 and browsing for other content. In some embodiments, this feature allows the user to browse for content while playback of item A continues.

In FIG. 10AA, user input 1003 corresponding to a button press of a play/pause button on remote 590 is received. In some embodiments, in response to user input 1003, playback of item A in the content display region 1014 is paused, as shown in FIG. 10BB. In some embodiments, while playback in content display region 1014 is paused and while icon 1015-2 has a current focus, user input 1003 corresponding to a button press of a play/pause button on remote 590 is received. In some embodiments, in response to user input 1003, device 500 causes fullscreen playback of the item that currently had focus (e.g., item B), as shown in FIG. 10CC. In some embodiments, instead of causing fullscreen playback of the item that currently had focus, in response to user input 1003, playback in content display region 1014 is resumed.

In some embodiments, a user input 1003 is received selecting the "menu" button on remote 590. In some embodiments, in response to user input 1003, playback menu 1022 is displayed, as shown in FIG. 10DD. In some embodiments, while playback menu 1022 is displayed, user input 1003 corresponding to another selection of the "menu" button is received. In some embodiments, in response to the user input, device 500 displays user interface 1010 (e.g., the previous user interface that was displayed before fullscreen playback began), as shown in FIG. 10EE. In some embodiments, content display region 1014 continues the playback of item B. Thus, in some embodiments, content display region 1014 has a "sticky" behavior with the playback of item B.

In FIG. 10FF, user input 1003 corresponding to an upward navigation (e.g., upward swipe) is received. In some embodiments, in response to user input 1003, focus moves to navigation bar 1012. In FIG. 10GG, user input 1003 corresponding to a rightward navigation (e.g., rightward swipe) is received. In some embodiments, in response to user input 1003, focus is shifted to selectable option 1013-3 corresponding to television shows. In some embodiments, in response to the focus moving to selectable option 1013-3, device 500 replaces display of user interface 1010 with display of user interface 1030 corresponding to television shows, as shown in FIG. 10GG. In FIG. 10HH, user input 1003 corresponding to a leftward navigation (e.g., leftward swipe) is received. In some embodiments, in response to user input 1003, focus is shifted to selectable option 1013-1 corresponding to the "Watch Now" page. In some embodiments, in response to the focus moving to selectable option 1013-1, device 500 replaces display of user interface 1030 with display of user interface 1010 corresponding to the "Watch Now" page, as shown in FIG. 10HH.

In some embodiments, content display region 1014 is no longer performing playback of item B and the "sticky" aspect of content display region 1014 has been reset (e.g., because the user interface has been refreshed by navigating to a different user interface). Thus, in some embodiments, content display region is now displaying an image of "item B" because "item B" is the content item that previously had focus (e.g., when user interface 1010 was previously displayed).

FIGS. 11A-11F are flow diagrams illustrating a method 1100 of displaying content in a unified media browsing application in accordance with some embodiments of the disclosure. The method 1100 is optionally performed at an electronic device such as device 100, device 300, device 500, and device 511 as described above with reference to FIGS. 1A-1B, 2-3, 4A-4B and 5A-5C. Some operations in method 1100 are, optionally combined and/or order of some operations is, optionally, changed.

As described below, the method 1100 provides ways to display content in a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (1102), on the display, a user interface of a unified media browsing application, wherein the user interface includes a plurality of representations of content items and a content display region, such as in FIG. 10A (e.g., a page or tab in the unified media browsing application to browse for, purchase, and/or select to cause playback of content).

In some embodiments, when a user selects one of content items (e.g., by selecting representation (e.g., icon) of a respective content item), the electronic device initiates a process for accessing the selected content item (e.g., cause playback, launch an application to cause playback, display more information about the content item such as displaying a canonical page for the content item, etc.). In some embodiments, content in the unified media browsing application is accessible via another application installed on the electronic device and selection of the respective content item will cause the other application to launch and the respective content item to play in the other application. In some embodiments, some content is accessible via the unified media browsing application itself and selection of the respective content item causes the content item to play within the unified media browsing application (e.g., without launching another application and causing playback in the other application). In some embodiments, the user interface of the unified media browsing application includes a content display region above the rows of content items. In some embodiments, the content display region provides a preview of content that current has a focus. For example, if an icon for a television show currently has a focus, then the content display region displays still images, still frames, screenshots, or any other representation of the particular episode, of the particular season, or of the television show. In some embodiments, the content display region displays a video, animation, or any other sort of moving image. In some embodiments, only some of the content displayed in the unified media browsing application is compatible with displaying content in the content display region. For example, some content can only display still images, some content can only display a movie or animation, and some content is compatible with all content that is displayable in the content display region. In some embodiments, the unified media browsing application provides a centralized location for browsing, searching, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device).

In some embodiments, a first representation of a first content item of the plurality of representations has a current focus in the user interface (1104). In some embodiments, one of the items is currently selected or highlighted. In some embodiments, the content display region includes a representation of content corresponding to the first content item (1106), such as in FIG. 10A (e.g., a still image or a still frame corresponding to content from the first content item, or an image or thumbnail representing the particular episode, season, television series, or content). In some embodiments, the representation is a movie, video clip, or playback of the content itself.

In some embodiments, while first representation of the first content item has the current focus, the electronic device receives (1108), via the one or more input devices, an input corresponding to a request to initiate playback of the first content item, such as in FIG. 10A (e.g., a click or selection input selecting the item that currently has focus). In some embodiments, if the content item is compatible to be played or otherwise displayed from within the unified media browsing application, then the item will be played from within the unified media browsing application. In some embodiments, if the content item is not compatible to be played or displayed from within the unified media browsing application, then another application is launched to play or display the first content item.

In some embodiments, in response to receiving the input corresponding to the request to initiate playback of the first content item, the electronic device ceases (1110) display of the user interface, and displays, on the display, the first content item, such as in FIG. 10B. In some embodiments, the displaying includes displaying a content playback user interface within the unified media browsing application to begin displaying or playing back the first content item (e.g., full screen playback) or launching an application, separate from the unified media browsing application, to begin displaying or playing back the first content item.

In some embodiments, while displaying the first content item on the display, the electronic device receives (1112), via the one or more input devices, an input corresponding to a request to exit playback of the first content item, such as in FIG. 10B (e.g., an input from a remote control device selecting a menu button or an exit button). In some embodiments, in response to receiving the input corresponding to the request to exit playback of the first content item (1114): in accordance with a determination that the first content item was played within the unified media browsing application (1116): the electronic device displays (1118), on the display, the user interface of the unified media browsing application, wherein the first representation of the first content item has the current focus, while continuing to display the first content item in the content display region of the user interface, such as in FIG. 10D and FIG. 10W.

In some embodiments, if the playback occurred in the unified media browsing application (e.g., without launching a separate application), then exiting playback will return the user to the previous user interface of the unified media browsing application. In some embodiments, the previous user interface included rows of content items from which the user can browse and select. In some embodiments, the previous user interface included a content display region. In some embodiments, when the user exits the fullscreen playback of the content item, the content item continues playback in the content display region. In some embodiments, when the user exits the fullscreen playback of the content item, a still frame of the content item at the time when the user exited full screen playback is displayed in the content display region. In some embodiments, content display region is the area above the rows of content items from which the user can browse and select. In some embodiments, the content display region extends beyond just the region above the rows of content items. In some embodiments, when the content display region extends into the region of the rows of content items, the content display region is displayed as if behind the rows of content items and the rows of content items are overlaid over at least a portion of the content display region. For example, the content display region optionally encompasses all or substantially all of the user interface and all of the selectable options on the user interface are overlaid on top of the content display region. In some embodiments, if the playback occurred in a separate application, then exiting fullscreen playback does not cause display of the unified media browsing application. Instead, exiting fullscreen playback causes display of another user interface of the separate application according to the design of the separate application. Thus, in some embodiments, because the unified media browsing application is not displayed, content that requires launching of a separate application does not have the behavior described above when exiting fullscreen playback. In some embodiments, the above-described behavior of continuing to display the first content item is only compatible with content items that are played or otherwise displayed within the unified media browsing application. For example, selection of the compatible content item causes playback without launching a separate application.

The above-described manner of displaying content (e.g., by playing back content when the user requests display and continuing display in a content display area after the user requests exit of playback of the content item) allows the electronic device to provide the user with browsing capabilities while continuing to view content (e.g., by continuing display of the content item while displaying a plurality of content items to browse), which simplifies the interaction between the user and the electronic device and enhances the operability of the electronic device and makes the user-device interface more efficient (e.g., by providing the user with the ability to browse for content while simultaneously viewing content), which additionally reduces power usage and improves battery life of the electronic device by enabling the user to use the electronic device more quickly and efficiency.

In some embodiments, continuing to display the first content item in the content display region of the user interface comprises displaying a still image of the first content item that was displayed when the input corresponding to the request to exit playback of the first content item was received (1120), such as in FIG. 10D. In some embodiments, when the user exits the fullscreen playback of the content item, the content display region displays a still frame of the content item at the time when the user exited full screen playback. For example, if the user exits playback at the 5 minute 23 second mark, then a still image of the content item from the 5 minute 23 second point will be displayed in the content display region. In some embodiments, the content display region that is displaying the still image of the first content item optionally encompasses all or substantially all of the user interface and all of the selectable options on the user interface are overlaid on top of the content display region.

The above-described manner of displaying content (e.g., by displaying a still image of the content item at the time when the user exited playback) allows the electronic device to provide the user with browsing capabilities while continuing to view content (e.g., by displaying a still image to indicate to the user the point at which the user exited playback), which simplifies the interaction between the user and the electronic device and enhances the operability of the electronic device and makes the user-device interface more efficient (e.g., by providing the user with an image of where the playback was exited), which additionally reduces power usage and improves battery life of the electronic device by enabling the user to use the electronic device more quickly and efficiency.

In some embodiments, continuing to display the first content item in the content display region of the user interface comprises continuing to playback the first content item in the content display region (1122), such as in FIG. 10W. In some embodiments, the content item continues playback in the content display region. In some embodiments, the content display region that is continuing playback of the first content item optionally encompasses all or substantially all of the user interface and all of the selectable options on the user interface are overlaid on top of the content display region.

The above-described manner of displaying content (e.g., by continuing playback of content in the content display region even after the user requests exit of playback of the content item) allows the electronic device to provide the user with browsing capabilities while continuing to view content (e.g., by continuing playback of the content item while displaying a plurality of content items to browse), which simplifies the interaction between the user and the electronic device and enhances the operability of the electronic device and makes the user-device interface more efficient (e.g., by providing the user with the ability to browse for content while simultaneously viewing playback of the content), which additionally reduces power usage and improves battery life of the electronic device by enabling the user to use the electronic device more quickly and efficiency.

In some embodiments, continuing to playback the first content item in the content display region includes continuing to play audio from the first content item, such as in FIG. 10W (1124). In some embodiments, when the content item continues playback in the content display region, the audio track also continues playing. In other words, the user has exited dedicated fullscreen playback mode, but the user can still watch the content item but browse for other content items at the same time.

The above-described manner of playing back content (e.g., by playing back content, including playing audio when the user requests display and continuing display in a content display area after the user requests exit of playback of the content item) allows the electronic device to provide the user with browsing capabilities while continuing full playback of the content (e.g., by continuing video and audio playback of the content item while displaying a plurality of content items to browse), which simplifies the interaction between the user and the electronic device and enhances the operability of the electronic device and makes the user-device interface more efficient (e.g., by providing the user with the ability to browse for content while simultaneously playing back content), which additionally reduces power usage and improves battery life of the electronic device by enabling the user to use the electronic device more quickly and efficiency.

In some embodiments, while displaying the first content item in the content display region of the user interface as a result of receiving the input corresponding to the request to exit playback of the first content item, the electronic device receives (1126), via the one or more input devices, an input corresponding to a request to move the current focus from the first representation to a second representation of a second content item of the plurality of representations, such as in FIG. 10E and FIG. 10X. In some embodiments, after backing out of fullscreen playback mode of the first content item and while the content display region is displaying content from the first content item, the electronic device receives a request to navigate or scroll to highlight another content item in a row of content items. In some embodiments, in response to receiving the input corresponding to the request to move the current focus from the first representation to the second representation, the electronic device moves (1128) the current focus from the first representation to the second representation while maintaining display of the first content item in the content display region, such as in FIG. 10E and FIG. 10X (e.g., cause the focus to move to the second content item, but do not change the display of the content display region). For example, if the content display region is displaying a still image of the first content item, continue displaying the still image of the first content item, even though focus has shifted to the second content item. In some embodiments, if the content display region is playing back the first content item, then continue playback of the first content item, even though focus has shifted to the second content item. By contrast, if the content display region is not displaying content as a result of backing out of fullscreen display mode (e.g., if the user has not selected any content item to playback), then when the user navigates and moves focus from one item to the other, the content display region displays a preview of the item with focus. For example, if the content display region is not displaying content as a result of backing out of fullscreen display mode, then if content 1 had a focus, the content display region displays a preview of content 1, and if the user moves the focus to content 2, the content display region updates to display a preview of content 2. Thus, in some embodiments, after the user selects playback of a particular content item, then the content display region switches to a different mode in which the content displayed in the content display region has a "sticky" behavior where display of the selected content item is maintained in the content display region even when the user moves the focus. In some embodiments, if the content display region is playing back content and the user pauses the playback (e.g., by clicking a pause button), then while the content is paused, moving the focus to another content item will still maintain the paused display in the content display region.

The above-described manner of displaying content (e.g., by playing back content when the user requests display and continuing display in a content display area even after the user exits playback of the content item and browses to other content items) allows the electronic device to provide the user with browsing capabilities while continuing to view content (e.g., by continuing display of the content item while the user browses and moves focus to other content items), which simplifies the interaction between the user and the electronic device and enhances the operability of the electronic device and makes the user-device interface more efficient (e.g., by providing the user with the ability to browse for content while simultaneously viewing content without causing the content display region to stop displaying the first content item), which additionally reduces power usage and improves battery life of the electronic device by enabling the user to use the electronic device more quickly and efficiency.

In some embodiments, while the second representation has the current focus and while the first content item is displayed in the content display region, the electronic device receives (1130), via the one or more input devices, an input corresponding to a request to select the second representation, such as in FIG. 10L (e.g., receiving a selection input when the focus is on a content item that is different than the content that is being displayed in the content display region). In some embodiments, in response to receiving the input corresponding to the request to select the second representation (1132): the electronic device ceases (1134) display of the user interface and displays (1136), on the display, the second content item, such as in FIG. 10M (e.g., replacing the user interface with a fullscreen playback user interface and causing fullscreen playback of the second content item). In some embodiments, if the user exits fullscreen playback of the second content item and the fullscreen playback was performed in the unified media browsing application, then the content display region will now display content from the second media item (e.g., still frame or continue playback). In other words, the "sticky" behavior of the content display region is now switched from the first content item to the second content item.

The above-described manner of displaying content (e.g., by maintaining display of the first content item and causing playback of the second content item in response to a request to playback the second content item) allows the electronic device to provide the user with browsing capabilities while continuing to view content (e.g., by displaying the first content item until receiving the user's explicit request to begin playback of the second content item), which simplifies the interaction between the user and the electronic device and enhances the operability of the electronic device and makes the user-device interface more efficient (e.g., by providing the user with the ability to browse for content while simultaneously viewing content continuously), which additionally reduces power usage and improves battery life of the electronic device by enabling the user to use the electronic device more quickly and efficiency.

In some embodiments, the plurality of representations of the content items is displayed in a prioritized location in the user interface as compared with other representations of content items that are included in the user interface (1138), such as in FIG. 10A. In some embodiments, the plurality of representations is displayed in a row and the row is the first or top row in the user interface. In some embodiments, the prioritized row is the only row that is displayed concurrently with the content display region. In other words, the user interface can include multiple rows, but only one row is displayed when the user is at the top of the "page" and the user must scroll down in order to access the other rows. In some embodiments, when the user scrolls down to view the other rows of content, the content display region is scrolled away and no longer displayed or visible. In some embodiments, when the user scrolls down, only rows of content items are displayed and there is no more preview of any of the highlighted content items shown in the content display region. In some embodiments, scrolling back up to the prioritized row causes only the prioritized row to be displayed and for the content display region to be displayed (e.g., thus pushing all non-prioritized rows away).

The above-described manner of displaying content (e.g., by causing playback and maintaining display of the first content item only when the content item is in a prioritized location of the user interface) allows the electronic device to provide the user with playback capabilities to a particular set of content items (e.g., by providing continued display functionality to only content items in the prioritized location and not providing continued display functionality to items that are not in the prioritized location), which simplifies the interaction between the user and the electronic device and enhances the operability of the electronic device and makes the user-device interface more efficient (e.g., by forgoing continued playback capability when the user scrolls away from the content display region, indicating a desire to only browse content and not continue playback), which additionally reduces power usage and improves battery life of the electronic device by enabling the user to use the electronic device more quickly and efficiency.

In some embodiments, continuing to display the first content item in the content display region of the user interface comprises continuing to playback the first content item in the content display region (1140). In some embodiments, while continuing to playback the first content item in the content display region, the electronic device receives (1142), via the one or more input devices, an input corresponding to a request to pause the playback of the first content item, such as in FIG. 10AA. In some embodiments, while the content display region is playing back content, if a user clicks a pause button on an input device (e.g., such as a remote control device), then playback in the content display region will pause. In some embodiments, in response to receiving the input corresponding to the request to pause the playback of the first content item (1144): the electronic device pauses (1146) the first content item while continuing to display the paused first content item in the content display region, such as in FIG. 10BB. In some embodiments, the electronic device pauses the playback of the content item but continues to display the paused content item. In other words, the paused content becomes a still image or still frame of the content item at the moment the playback was paused.

The above-described manner of displaying content (e.g., by causing playback and maintaining display of the first content item until the user requests pause of the playback) allows the electronic device to provide the user with playback control of the continued display of the first content item (e.g., by pausing the playback in response to receiving a user input to pause the playback), which simplifies the interaction between the user and the electronic device and enhances the operability of the electronic device and makes the user-device interface more efficient (e.g., by continuing feedback until the user indicates a desire to no longer view the playback without requiring the user to exit from the application or navigate to a separate user interface to stop the playback), which additionally reduces power usage and improves battery life of the electronic device by enabling the user to use the electronic device more quickly and efficiency.

In some embodiments, while displaying the first content item in the content display region of the user interface as a result of receiving the input corresponding to the request to exit playback of the first content item, the electronic device receives (1148), via the one or more input devices, an input corresponding to a request to scroll in a first direction in the user interface, such as in FIG. 10F and FIG. 10Y (e.g., scrolling down and away from the prioritized row of content to display other rows of content). In some embodiments, in response to receiving the input corresponding to the request to scroll in the first direction in the user interface, the electronic device scrolls (1150) in the first direction in the user interface to: cease displaying, on the display, the first content item in the content display region and the plurality of representations (1152), such as in FIG. 10F and FIG. 10Y. In some embodiments, if the user scrolls down and away from the top prioritized row of content, the content display region is also scrolled away or otherwise hidden from display. In some embodiments, if the content display region is currently playing back content, then scrolling the content display region away causes the playback to be paused, including the video and/or audio components of the content. In some embodiments, if the user navigates back to the top prioritized row of content and the content display region is re-displayed, then continuing display of the first content item in the content display region. For example, if the content display region was playing back content when the navigation scrolled away from the content display region, then scrolling back to the content display region resumes playback of the content (e.g., resuming from the time when the user scrolled away). In some embodiments, if the content display region was displaying a still image of the content when navigation scrolled away from the content display region, then scrolling back to the content display region resumes display of the still image. In some embodiments, if the content item is a live broadcast item and navigating away causes ceasing of display of the content item but continues the audio playback of the live broadcast item, then navigating back to the content display region causes redisplay of the live broadcast. In some embodiments, the display of the live broadcast item is the current live broadcast and is not resuming from the time when the user scrolled away. In some embodiments, in response to receiving the input corresponding to the request to scroll in the first direction in the user interface, the electronic device scrolls in the first direction in the user interface to: reveal, on the display, a second plurality of representations of a second plurality of content items that are selectable to initiate processes to access the second plurality of content items (1154), such as in FIG. 10F and FIG. 10Y (e.g., display other rows of content items that were beneath the top prioritized row of content items.).

The above-described manner of displaying content (e.g., by ceasing display of the first content item when the user navigates away from the top prioritized row of content items) allows the electronic device to allow the user to further browse for content items (e.g., by displaying more rows of content items in response to the user's request to display other rows of content items), which simplifies the interaction between the user and the electronic device and enhances the operability of the electronic device and makes the user-device interface more efficient (e.g., by stopping playback of the content item when the user scrolls away from displaying the content display area, indicating a desire to only browse for content and not to view the first content item), which additionally reduces power usage and improves battery life of the electronic device by enabling the user to use the electronic device more quickly and efficiency.

In some embodiments, in response to receiving the input corresponding to the request to scroll in the first direction in the user interface (1156): in accordance with a determination that the first content item is a live broadcast content item, the electronic device continues (1158) playback of audio from the first content item that was playing when the input corresponding to the request to scroll in the first direction in the user interface was received while the first content item in the content display region is no longer displayed, such as in FIG. 10Y. In some embodiments, if the content display region is currently displaying live broadcast content, then scrolling away the content display region causes the content display region to no longer be displayed, however the audio of the live broadcast content continues to be played. In other words, the playback continues but the visual display is hidden away and the user can only hear the audio component of the playback. In some embodiments, in accordance with a determination that the first content item is not a live broadcast content item, the electronic device ceases (1160) playback of the audio from the first content item when the first content item in the content display region is no longer displayed, such as in FIG. 10Y. In some embodiments, if the playback in the content display region is not of live broadcast content, then the electronic device pauses the playback and does not otherwise continue playing the audio component of the playback.

The above-described manner of displaying live broadcast content (e.g., by continuing to play the audio component of the live broadcast content even when the user navigates away from the top prioritized row of content items) allows the electronic device to provide the user with live broadcast content (e.g., by continuing to play audio from the live broadcast content when the user scrolls downwards and away from the content display area because the user will otherwise be unable to pause or rewind the content due to its being a live broadcast item), which simplifies the interaction between the user and the electronic device and enhances the operability of the electronic device and makes the user-device interface more efficient (e.g., by continuing to provide the user with at least the audio of the live broadcast item while the user has browsed away from the content display region, without requiring the user to use another electronic device to continue receiving the live broadcast item while browsing for content), which additionally reduces power usage and improves battery life of the electronic device by enabling the user to use the electronic device more quickly and efficiency.

In some embodiments, while displaying the second plurality of representations of the second plurality of content items, the electronic device receives (1162), via the one or more input devices, an input corresponding to a request to scroll in a second direction in the user interface, such as in FIG. 10G and FIG. 10Z (e.g., scrolling back up to reveal the prioritized row and the content display region). In some embodiments, in response to receiving the input corresponding to the request to scroll in the second direction in the user interface, the electronic device scrolls (1164) in the second direction in the user interface to: cease displaying, on the display, the second plurality of representations of the second plurality of content items (1166) (e.g., scrolling the lower rows of content away from display) and reveal, on the display, the first content item in the content display region and the plurality of representations of content items, such as in FIG. 10G and FIG. 10Z (e.g., redisplaying the prioritized row of content and the content display region). In some embodiments, if the content display region was playing back content before the content display region was scrolled away, then scrolling back to the content display region causes resumption of the playback of the content. In some embodiments, if the content display region was displaying a still image, then re-display of the content display continues to display the same still image.

The above-described manner of displaying content (e.g., by resuming playback in the content display region when the user navigates back to the top prioritized row of content items and the content display region) allows the electronic device to provide the user with browsing capabilities while continuing to view content (e.g., by resuming playback as soon as the content display region is re-displayed), which simplifies the interaction between the user and the electronic device and enhances the operability of the electronic device and makes the user-device interface more efficient (e.g., by resuming playback of the first content item when the user navigates back to the content display region indicating a desire to continue viewing the first content item), which additionally reduces power usage and improves battery life of the electronic device by enabling the user to use the electronic device more quickly and efficiency.

In some embodiments, the first content item has first one or more display characteristics when displayed in response to receiving the input corresponding to the request to initiate playback of the first content item (1170), such as in FIG. 10B. In some embodiments, when the first content item is playing in a fullscreen playback mode, the playback has a certain aspect ratio. For example, the playback can have a 16:9 aspect ratio, a 4:3 aspect ratio, or any aspect ratio based on the original aspect ratio of the content. In some embodiments, the aspect ratio of the content requires use of color blocking at the top and bottom of the display screen (e.g., black bars). In some embodiments, the first content item has second one or more display characteristics, different than the first one or more display characteristics, when displayed in the content display region (1172), such as in FIG. 10W. In some embodiments, when the first content is displayed in the content display region (e.g., either as a still image or active playback), the aspect ratio is set to maximize display in the content display region. In other words, the content can be zoomed in so that there is no requirement to color block the top or bottom of the content display region and the content display region is fully filled with content from the first content item.

The above-described manner of displaying content (e.g., by displaying fullscreen playback at a particular aspect ratio and displaying in the content display region at a different aspect ratio) allows the electronic device to provide the user with the best playback mode while viewing the content (e.g., by performing fullscreen playback at the original aspect ratio of the content item and by maximizing the content in the content display region when displaying in the content display region), which simplifies the interaction between the user and the electronic device and enhances the operability of the electronic device and makes the user-device interface more efficient (e.g., by automatically selecting the best aspect ratio based on the mode of playback), which additionally reduces power usage and improves battery life of the electronic device by enabling the user to use the electronic device more quickly and efficiency.

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1700, 1900, 2100, and 2300) are also applicable in an analogous manner to method 1100 described above with respect to FIGS. 11A-11F. For example, the operation of the electronic device to display content in a unified media browsing application described above with reference to method 1100 optionally has one or more of the characteristics of the presentation of content in the unified media browsing application, presentation of information on representations of content items, linking of an account for a primary content provider, restricting of access to content based on the geographic location of the device, and presentation of playback menus during playback of content in a unified media browsing application, displaying user interfaces specific to a respective content item, displaying content items, etc., described herein with reference to other methods described herein (e.g., methods 700, 900, 1300, 1500, 1700, 1900, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 11A-11F are, optionally, implemented by components depicted in FIGS. 1A-1B. For example, displaying operations 1102, 1110, 1118, 1120, 1122, 1124, 1136, 1140, 1146, 1152, 1154, 1158, 1160, 1166, and 1168, receiving operations 1108, 1112, 1126, 1130, 1142, 1148, and 1162, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Authenticating Content Providers in a Unified Media Browsing Application

Users interact with electronic devices in many different manners, including using an electronic device to browse and access content in a media browsing application. In some embodiments, an electronic device aggregates available content in a single unified media browsing application. The embodiments described below provide ways in which an electronic device logs into a primary content provider in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12L illustrate exemplary ways in which an electronic device links to an account for a primary content provider in accordance with some embodiments of the disclosure. The embodiments in these figures are used to illustrate the processes described below, including the processes described with reference to FIGS. 13A-13C.

Figure 12A:
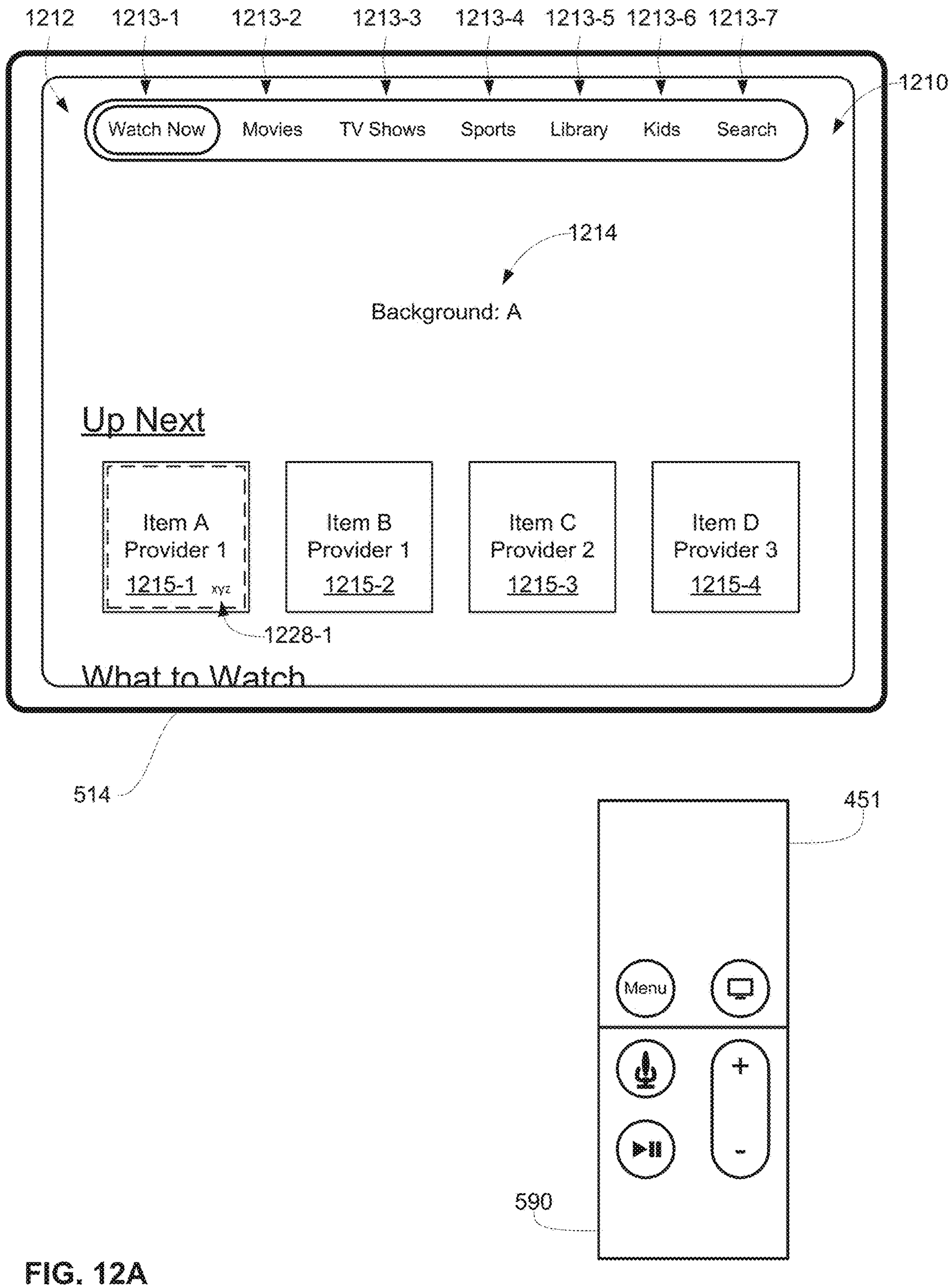
FIGS. 12A-12L illustrate exemplary ways in which an electronic device links to an account for a primary content provider in accordance with some embodiments of the disclosure.

FIGS. 12A-12L illustrate an electronic device 500 linking to an account for a primary content provider. FIG. 12A illustrates user interface 1210 of a media browsing application corresponding to the "Watch Now" page (e.g., similar to user interface 1010, 810, and 610 described above with respect to FIGS. 10A, 8A, and 6D, respectively). User interface 1210 includes a navigation bar 1212 that includes a plurality of selectable options 1213-1 to 1213-7. The navigation bar 1212 indicates that the user interface is currently a "Watch Now" user interface that is related to content of multiple types, such as television and movies. In some embodiments, user interface 1210 includes rows of content items, including an "Up Next" row of content. In some embodiment, icons 1215-1 to 1215-4 correspond to the "Up Next" row of content and is similar to or shares similar features as the "Up Next" content described above with respect to FIGS. 10A, 8A, and 6D. Each of icons 1215-1 to 1215-4 are selectable to cause playback of the corresponding content. In some embodiments, only representations in the "Up Next" row are selectable to cause playback of the content. In some embodiments, representations in rows other than the "Up Next" row are selectable to display a product page or canonical page for the corresponding content item (e.g., from which the user optionally is able to select a selectable option to cause playback of the content item).

Figure 12B:
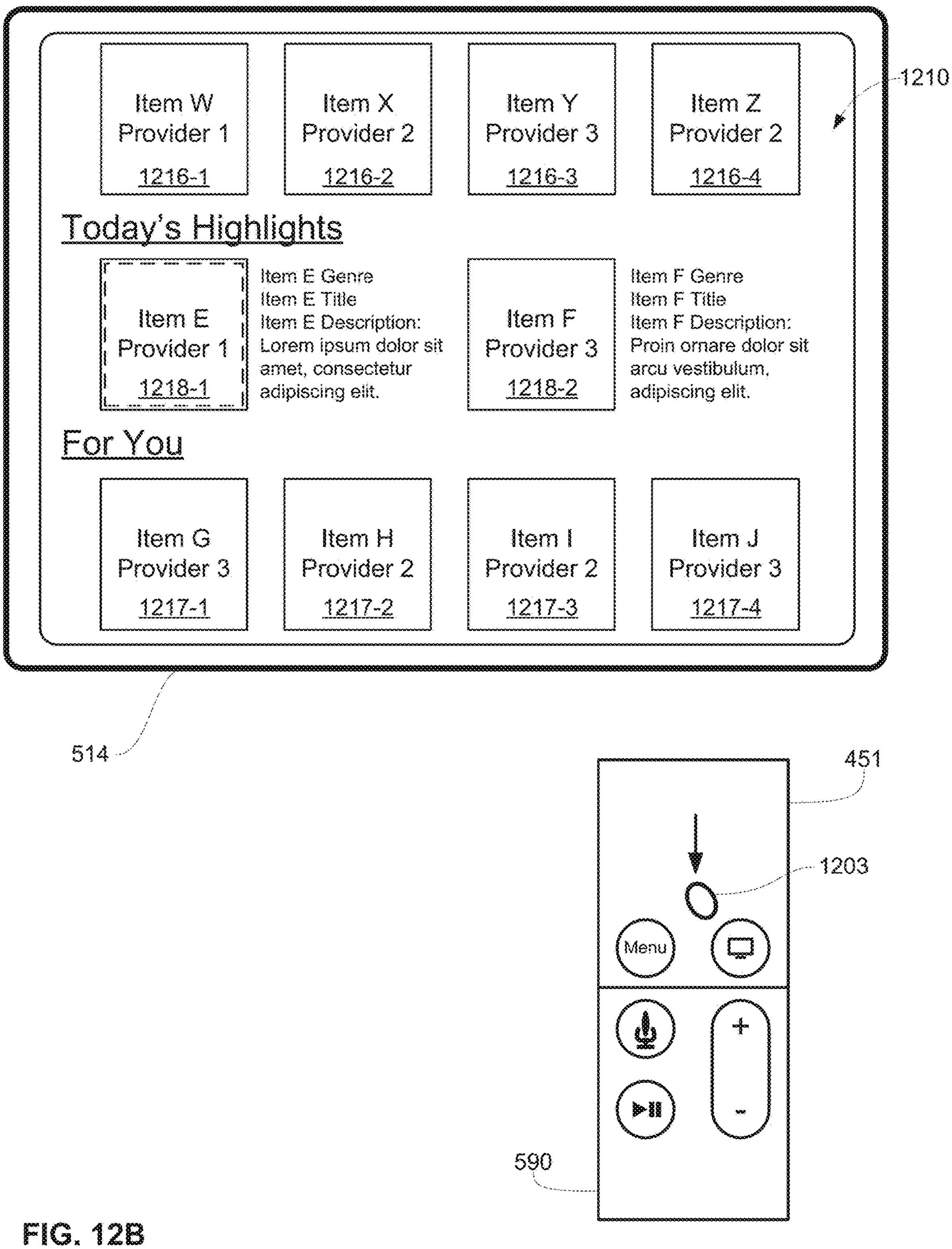
Figure 12C:
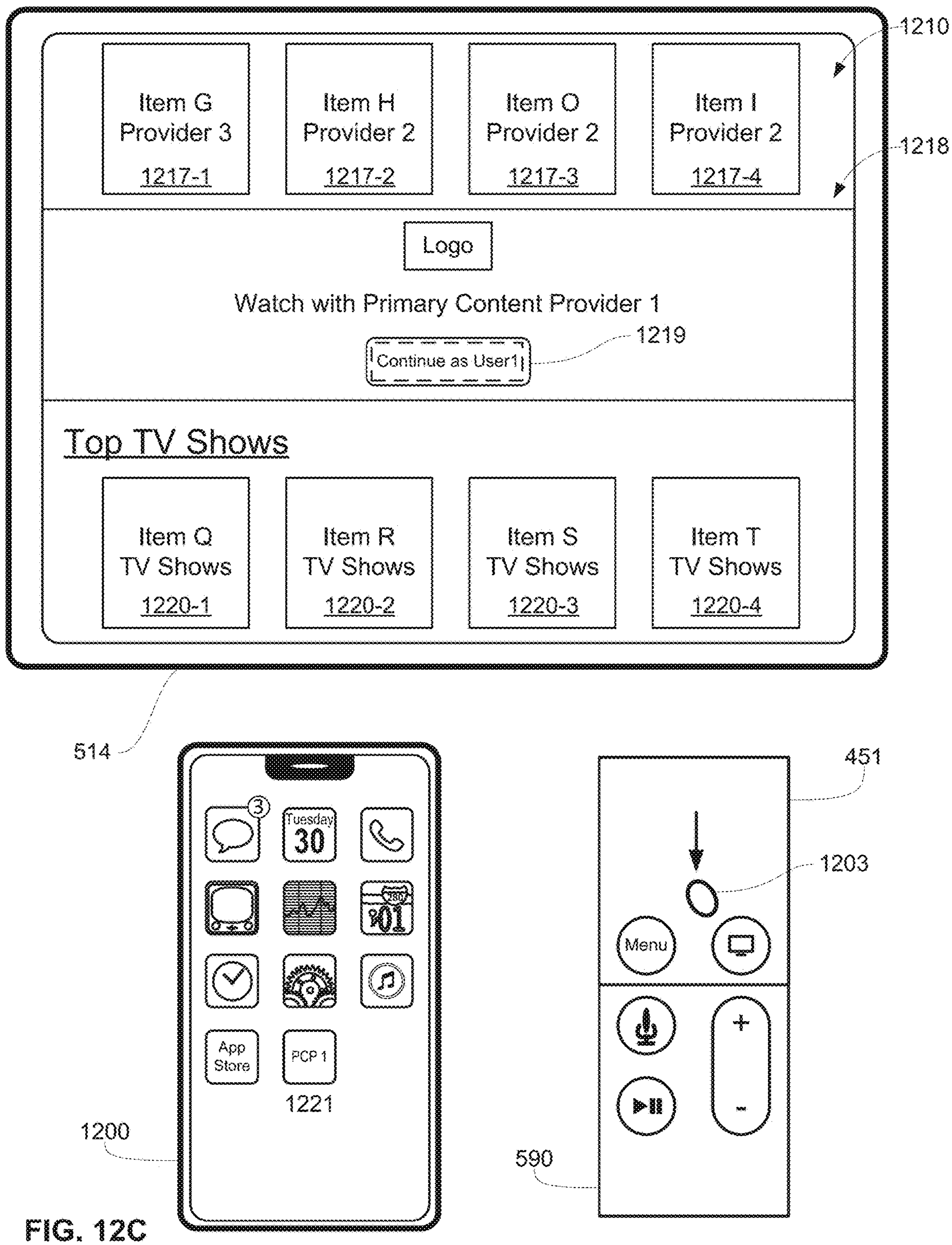

In some embodiments, user interface 1210 is scrollable to reveal further rows of content items (e.g., up/down scrolling). For example, beneath the "Up Next" row of content items exists a second row of icons corresponding to the "What to Watch" row of content items. In some embodiments, user input 1203 corresponding to a downward navigation (e.g., downward swipe on touch-sensitive surface 451) is received. In some embodiments, in response to user input 1203, further rows of content are displayed on user interface 1210, as shown in FIG. 12B. In some embodiments, a second user input 1203 corresponding to a further downward navigation (e.g., downward swipe on touch-sensitive surface 451) is received. In some embodiments, in response to user input 1203, further rows of content are displayed on user interface 1210, as shown in FIG. 12C.

In some embodiments, user interface 1210 includes provider login banner 1218. In some embodiments, if device 500 determines with a high confidence that the user has an account with a respective primary content provider, user interface 1210 includes provider login banner 1218 for logging into primary content provider 1.

For example, in some embodiments, the user of device 500 has a second electronic device 1200. In some embodiments, second electronic device 1200 can be any of device 100, device 300, device 500, and device 511 described above. In some embodiments, the user has logged into the second electronic device 1200 with the same account as with device 500. In some embodiments, second electronic device 1200 has installed an application 1221 for primary content provider 1. In some embodiments, the user is logged into primary content provider 1 on second electronic device 1200 and is entitled to access content from primary content provider 1. In some embodiments, device 500 determines that the user has an account with a primary content provider 1 because second electronic device 1200 has installed application 1221 for the primary content provider 1. In some embodiments, device 500 determines that the user has an account with a primary content provider 1 because second electronic device 1200 is logged into primary content provider 1 and is entitled to access content from primary content provider 1.

In some embodiments, device 500 determines that the user has an account with a respective content provider if the user has registered an account with a primary content provider in a digital keychain (e.g., stored locally, on one of the user's electronic devices, or on a server, in the cloud, etc.). In some embodiments, device 500 determines that the user has an account with a respective content provider if the user has previously watched content provided by the respective content provider (e.g., on device 500 or another device on which the user has logged into with the same account). In some embodiments, any or all of the above scenarios can contribute to a determination of sufficient confidence that the user has an account with a respective content provider such that user interface 1210 includes provider login banner 1218.

Figure 12D:
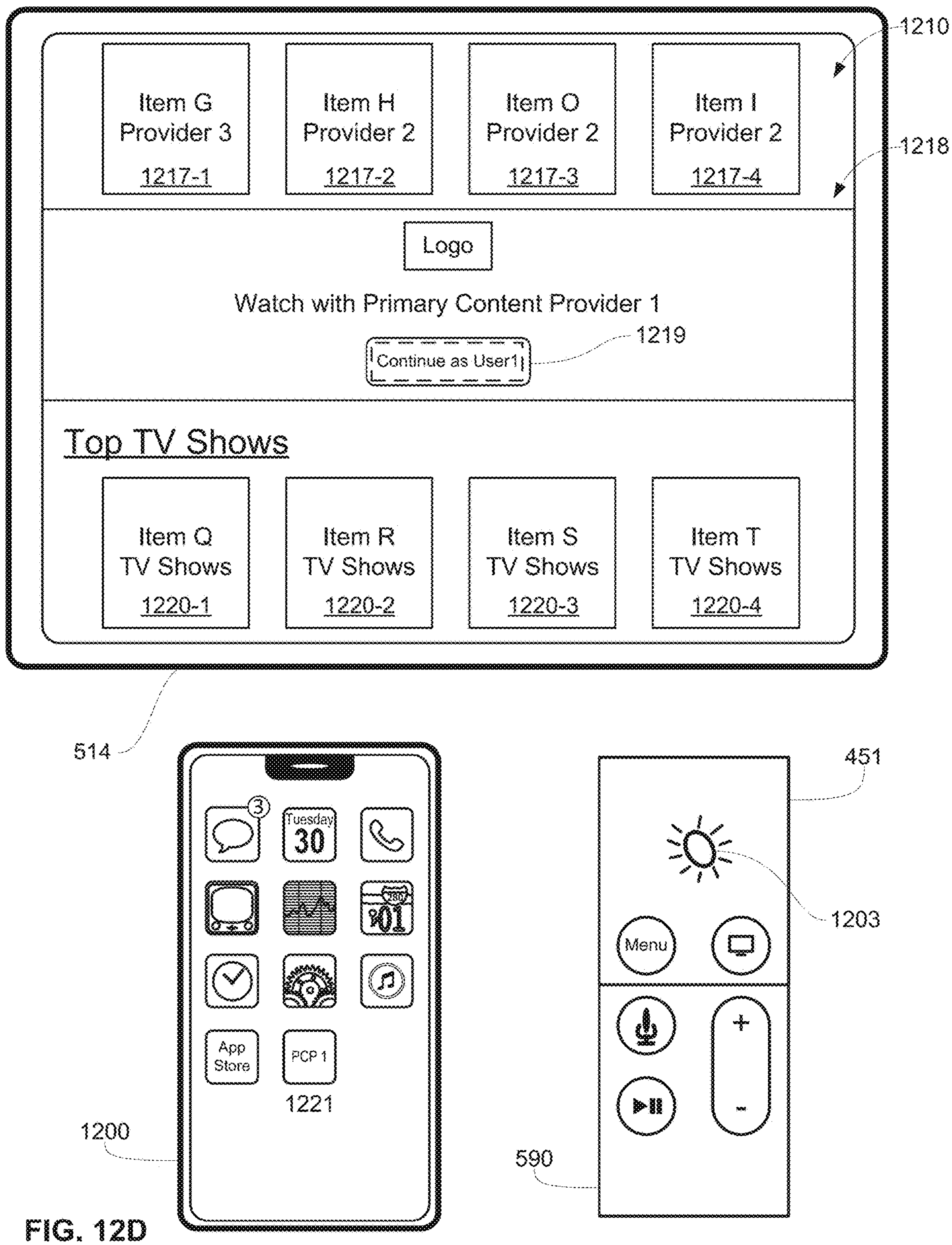

In some embodiments, provider login banner 1218 includes selectable option 1219 that is selectable to display a login user interface. In some embodiments, as shown in FIG. 12D, user input 1203 corresponding to a selection input is received while selectable option 1219 has a focus. In some embodiments, in response to user input 1203, device 500 displays login user interface 1230. In some embodiments, login user interface 1230 is a user interface of the unified media browsing application. In some embodiments, login user interface 1230 includes a text field 1232 for entering in a password for logging into primary content provider 1 with the "User 1" account. In some embodiments, device 500 automatically determines the proper user from the provider 1 application on the user's other electronic device (e.g., or any other method used to determine that the user has an account with primary content provider 1). In some embodiments, device 500 is unable to determine the user account of the user and an additional text field is displayed in user interface 1230 for the user to enter the user's user account information. In some embodiments, user interface 1230 includes selectable option 1234 and selectable option 1236. In some embodiments, selection of selectable option 1234 causes device 500 to log into the User 1 account using the provided password. In some embodiments, selection of selectable option 1236 terminates the process of logging into primary content provider 1 and dismisses user interface 1230 (e.g., and re-displays user interface 1210).

Figure 12E:
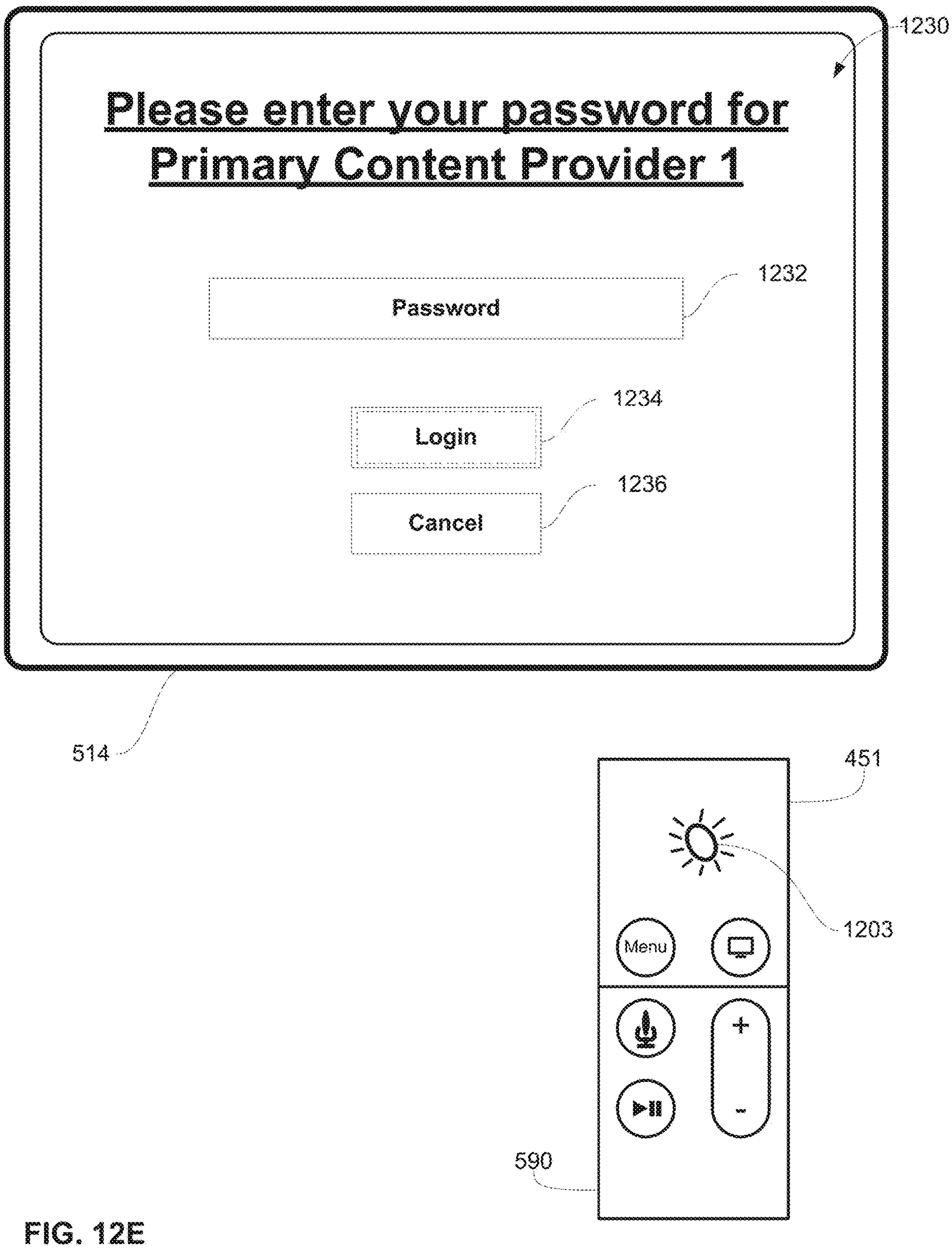
Figure 12F:
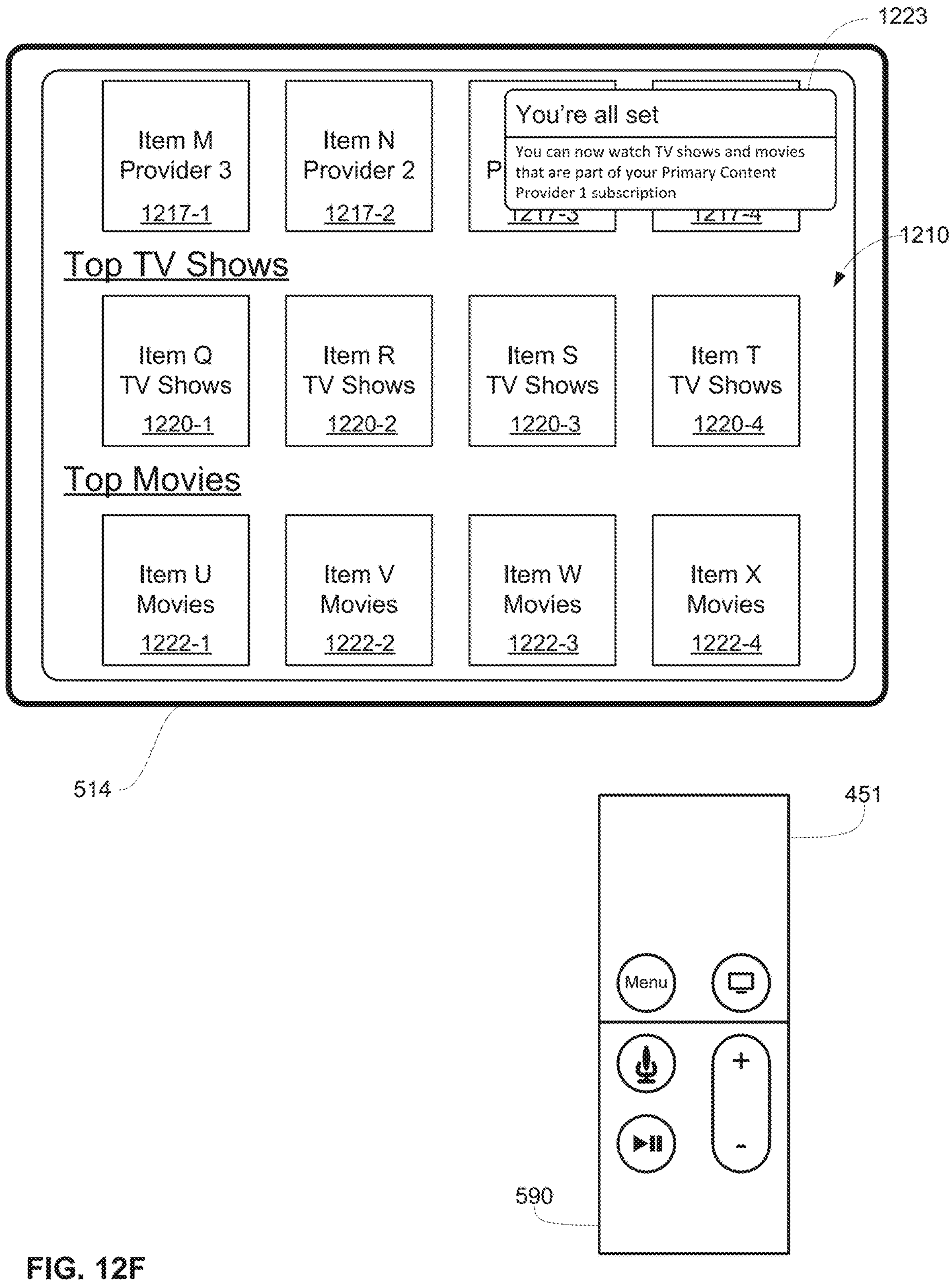

FIG. 12F illustrates user interface 1210 after the unified media browsing application successfully logs into primary content provider 1. In some embodiments, provider login banner 1218 is no longer displayed and the next row of content is displaced in place of where provider login banner 1218 was displayed. In some embodiments, popup 1223 is displayed on display 514. In some embodiments, popup 1223 is a notification that indicates to the user that the user has successfully logged into primary content provider 1 and that the user now has access to content from primary content provider 1. In some embodiments, when the unified media browsing application signs into primary content provider 1, the unified media browsing application also enables sharing of viewing content from primary content provider 1 to the unified media browsing application (e.g., such that content that is available from primary content provider 1 is included in the catalog of content displayed by the unified media browsing application). In some embodiments, popup 1223 is automatically dismissed (e.g., ceased displaying) after a threshold amount of time (e.g., 2 seconds, 3 seconds, 5 seconds). In some embodiments, popup 1223 is dismissed if any user input is detected.

Figure 12G:
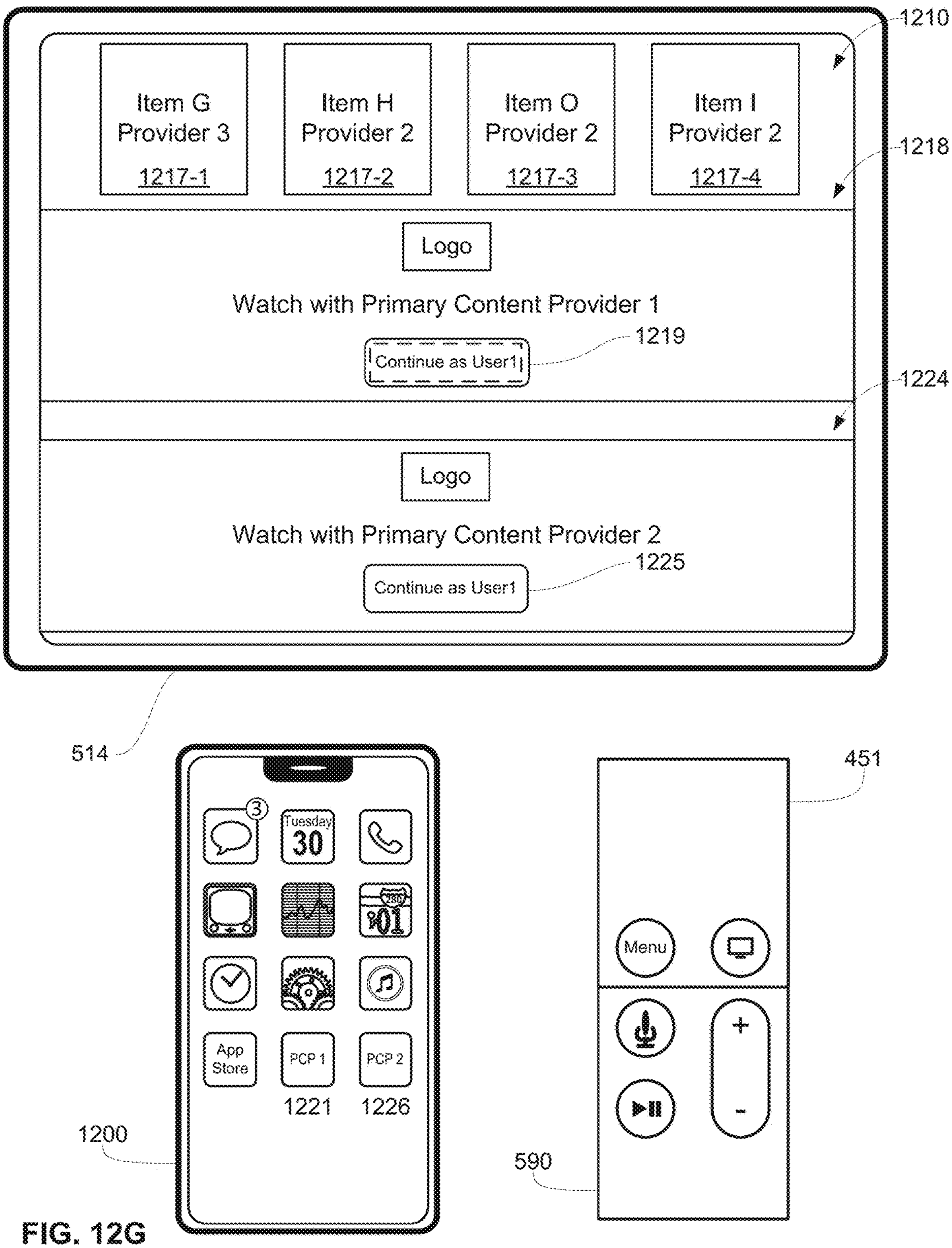

FIG. 12G illustrates an exemplary embodiment in which device 500 determines with sufficient confidence that the user has an account with primary content provider 1 and primary content provider 2. For example, second electronic device 1200 includes an application 1221 for primary content provider 1 and an application 1226 for primary content provider 2. In some embodiments, because device 500 determines with sufficient confidence that the user has an account with primary content provider 1, user interface 1210 includes provider login banner 1218. In some embodiments, because device 500 determines with sufficient confidence that the user has an account with primary content provider 2, user interface 1210 includes provider login banner 1224. Thus, any number of provider login banners can be displayed on user interface 1210 based on separate confidence determinations that the user has accounts with separate content providers. In some embodiment, device 500 determines that a user likely has an account with a respective content provider due to the user's likeliness of having an account with another content provider. In some embodiments, device 500 independently determines whether the user has accounts with different content providers (e.g., the determination of confidence for one primary content provider does not affect the determination of confidence for another primary content provider, etc.).

Figure 12H:
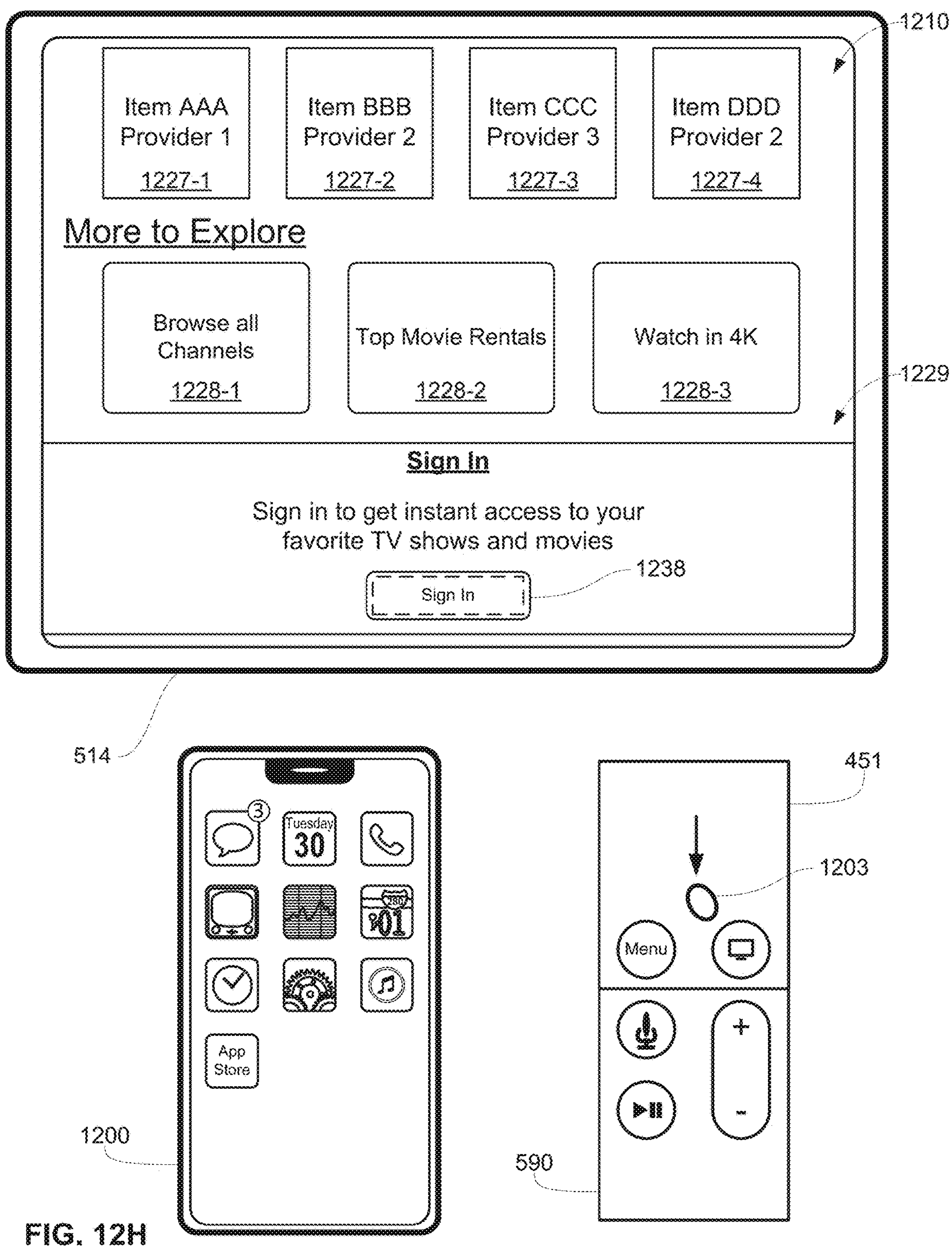

FIG. 12H illustrates user interface 1210 in which device 500 has been unable to determine with sufficient confidence that the user has an account with any primary content provider. In such a scenario, in some embodiments, user interface 1210 displays a provider selection banner 1229. In some embodiments, provider selection banner 1229 is located at or near the bottom of user interface 1210 (e.g., the last row of user interface 1210) as opposed to being displayed further up in the user interface such as in FIG. 12C. In some embodiments, provider selection banner 1229 includes selectable option 1238 for selecting providers to log into.

Figure 12I:
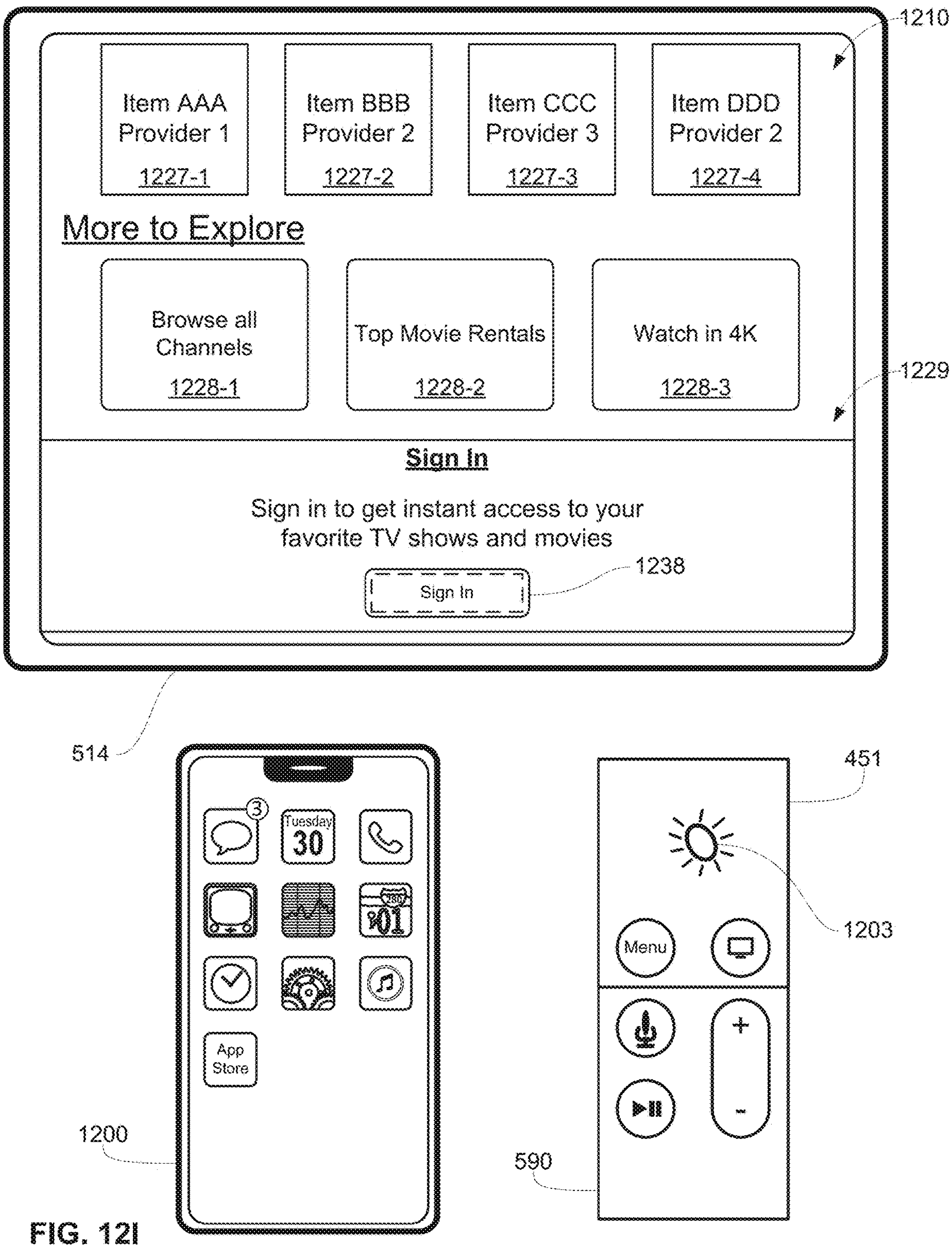
Figure 12J:
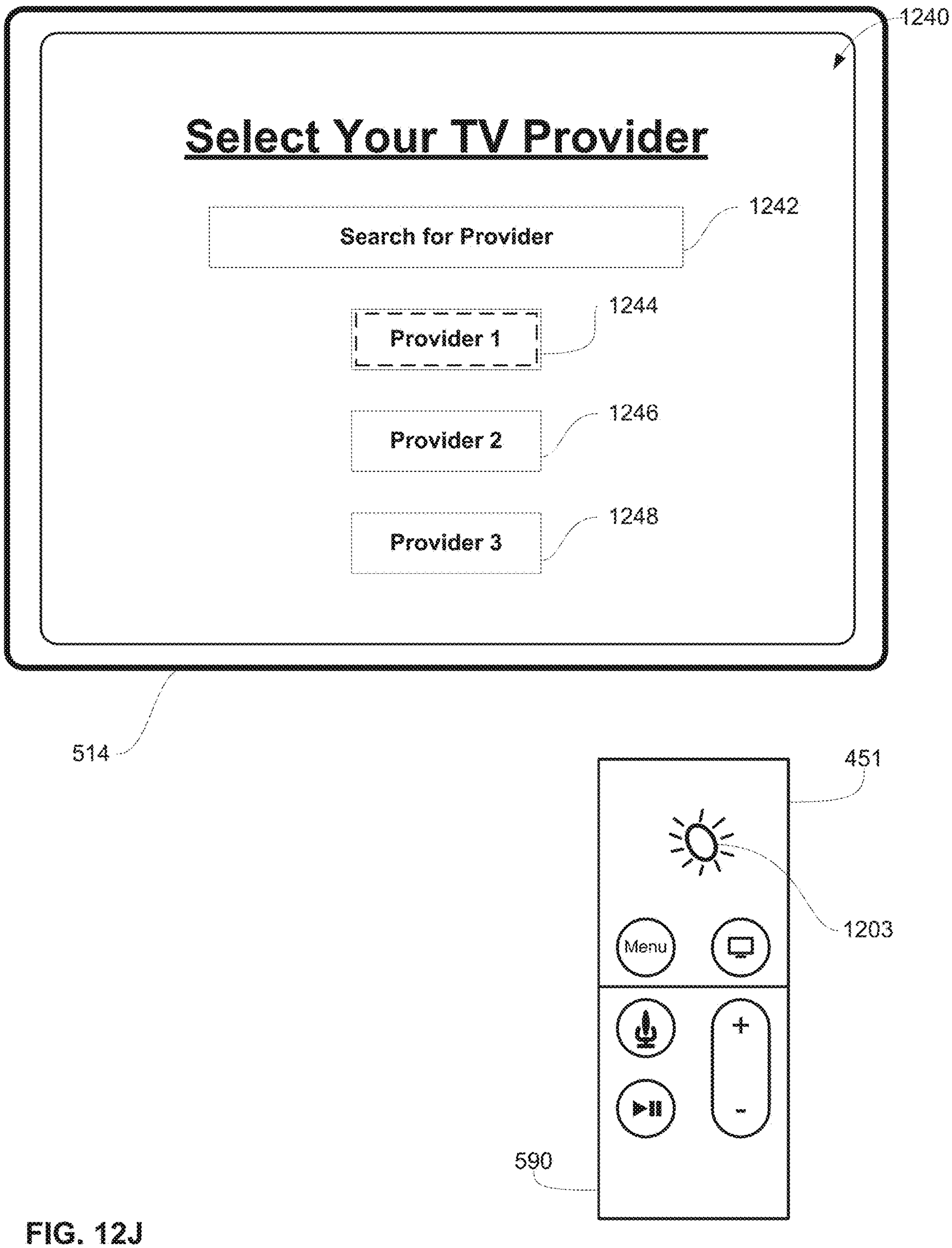
Figure 12K:
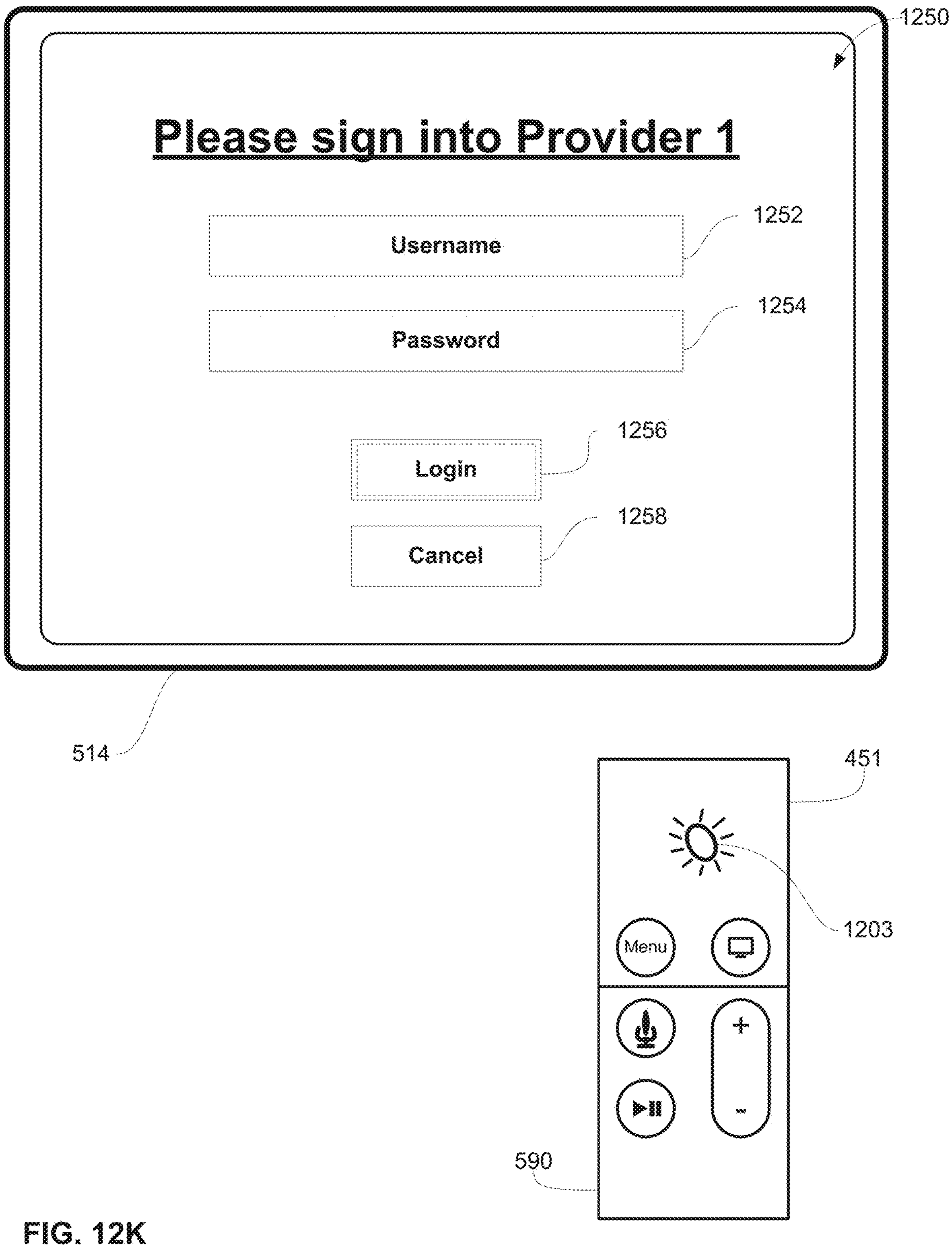
Figure 12L:
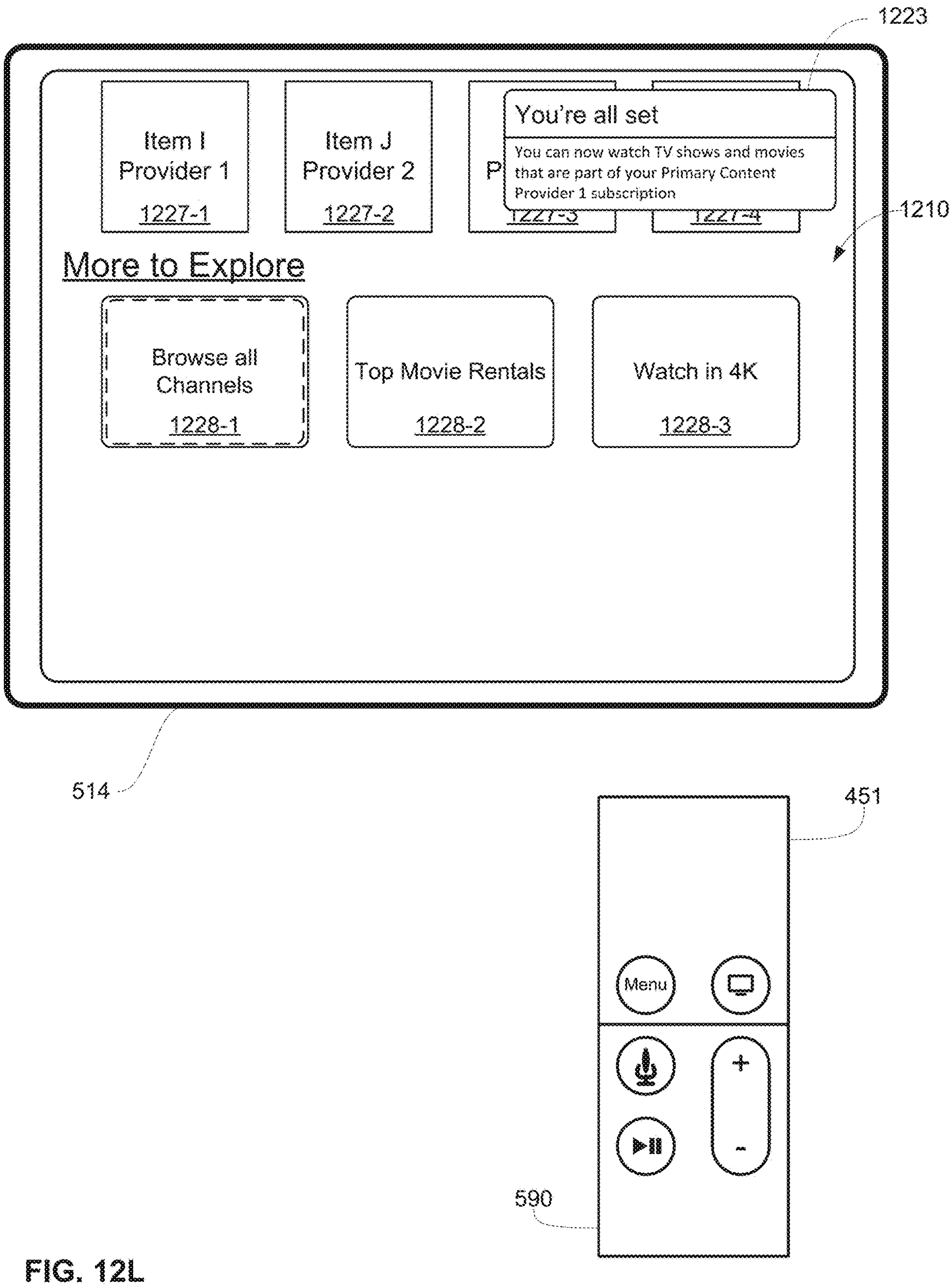

As shown in FIG. 12I, user input 1203 corresponding to a selection input (e.g., click on touch-sensitive surface 451) is received while selectable option 1238 has a focus. In some embodiments, in response to user input 1203, device 500 displays provider selection user interface 1240. In some embodiments, provider selection user interface 1240 includes a text entry field 1242 for searching for primary content providers. In some embodiments, 1240 includes selectable options 1244, 1246, and 1248 corresponding to three primary content providers. In some embodiments, selection of any of selectable options 1244, 1246, and 1248 causes display of a user interface to log into the respective primary content provider. In some embodiments, the three displayed primary content providers are the three most popular or most common content providers. In some embodiments, the three displayed primary content providers are the three primary content providers in which device 500 has determined that the user may have an account with, but not with enough confidence to cause display of a dedicated provider login banner. In some embodiments, any number of content providers can be displayed. In some embodiments, a user input 1203 corresponding to a selection input is received while selectable option 1244 corresponding to primary content provider 1 has a focus.

In response to user input 1203 selecting primary content provider 1, device 500 displays provider login user interface 1250 for logging into primary content provider 1. In some embodiments, provider login user interface 1250 includes a username text entry field 1252 and a password text entry field 1254. In some embodiments, provider login user interface 1250 includes selectable option 1256 for logging into primary content provider 1 using the provided username and password and selectable option 1258 for cancelling the process for logging into primary content provider 1. In some embodiments, selection of option 1258 dismisses provider login user interface 1250 and re-displays user interface 1210.

In some embodiments, in response to user input 1203 selecting selectable option 1256, device 500 logs into primary content provider using the provided username and password. In some embodiments, after successfully logging into primary content provider, device displays user interface 1210. In some embodiments, device 500 displays popup 1223 indicating to the user that the user has successfully logged into primary content provider 1 and that the user now has access to content from primary content provider 1. In some embodiments, when the unified media browsing application signs into primary content provider 1, the unified media browsing application also enables sharing of viewing content from primary content provider 1 to the unified media browsing application (e.g., such that content that is available from primary content provider 1 is included in the catalog of content displayed by the unified media browsing application). In some embodiments, popup 1223 is automatically dismissed (e.g., ceased displaying) after a threshold amount of time (e.g., 2 seconds, 3 seconds, 5 seconds). In some embodiments, popup 1223 is dismissed if any user input is detected.

Figure 13A:
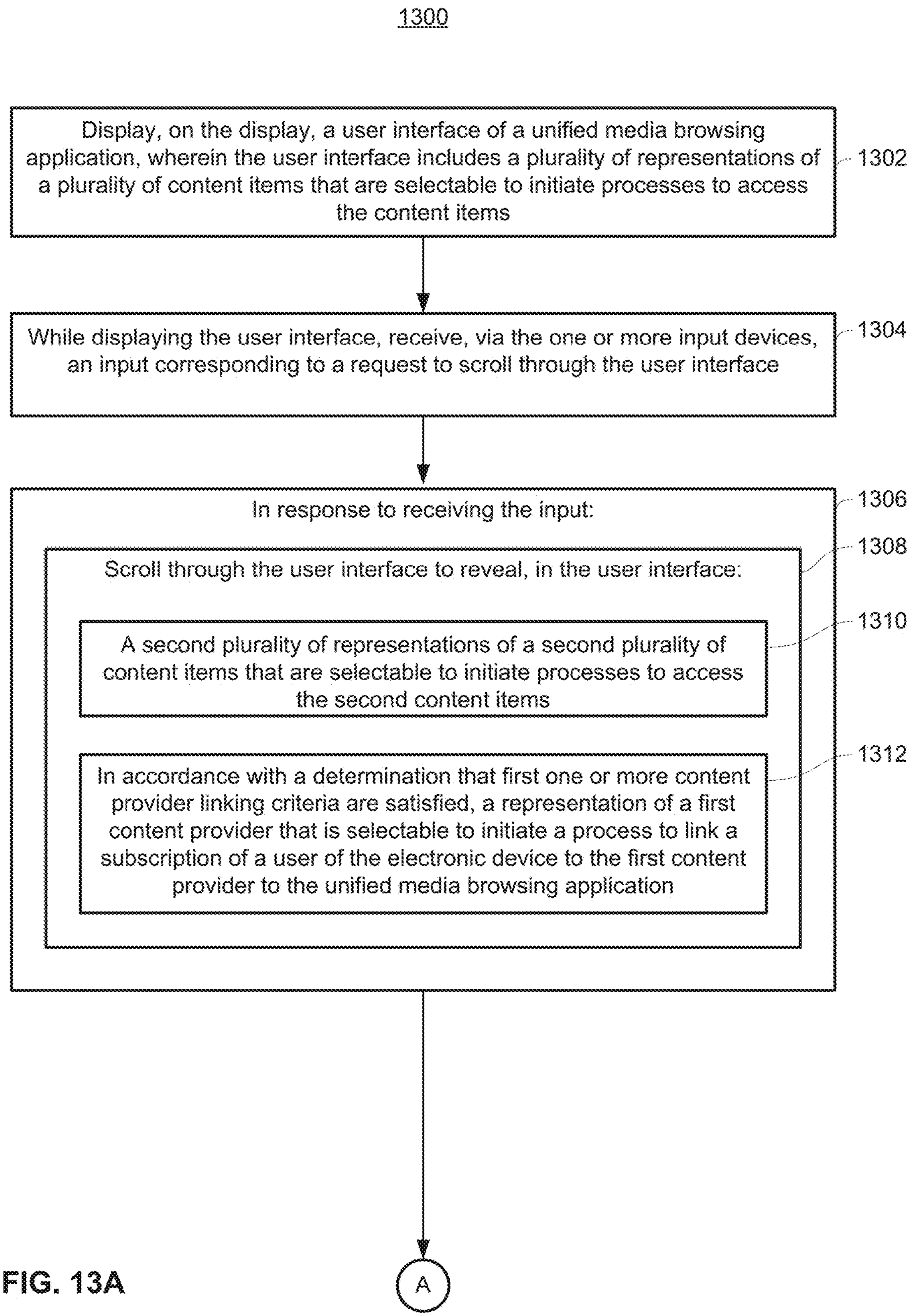
Figure 13C:
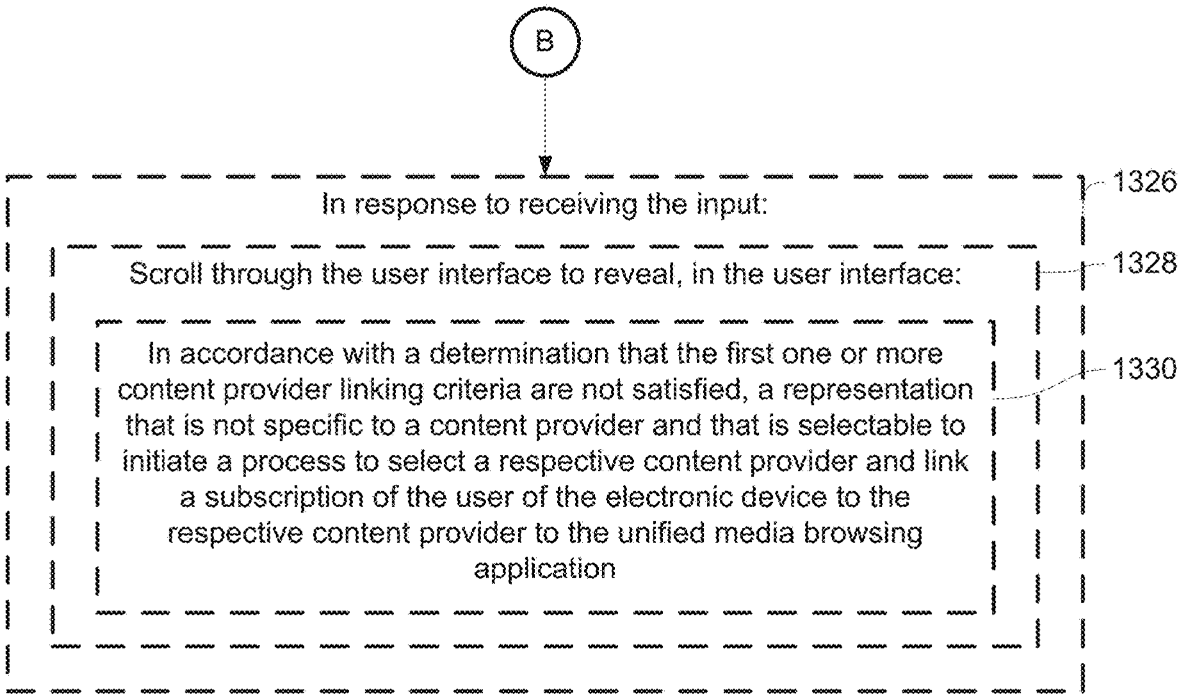

FIGS. 13A-13C are flow diagrams illustrating a method 1300 of linking to an account for a primary content provider in accordance with some embodiments of the disclosure. The method 1300 is optionally performed at an electronic device such as device 100, device 300, device 500, and device 511 as described above with reference to FIGS. 1A-1B, 2-3, 4A-4B and 5A-5C. Some operations in method 1300 are, optionally combined and/or order of some operations is, optionally, changed.

As described below, the method 1300 provides ways to link to an account for a primary content provider. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (1302), on the display, a user interface of a unified media browsing application, wherein the user interface includes a plurality of representations of a plurality of content items that are selectable to initiate processes to access the content items, such as in FIG. 12A (e.g., a page or tab in the unified media browsing application to browse for, purchase, and/or select to cause playback of content).

In some embodiments, the page or tab for content displays multiple icons (e.g., representations, selectable options) of content items. In some embodiments, when a user selects one of content items (e.g., by selecting the selectable option associated with a respective content item), the electronic device initiates a process for accessing the selected content item (e.g., cause playback, launch an application to cause playback, display more information about the content item such as displaying a canonical page for the content item, etc.). In some embodiments, content in the unified media browsing application is accessible via another application installed on the electronic device and selection of the respective content item will cause the other application to launch and the respective content item to play in the other application. In some embodiments, some content is accessible via the unified media browsing application itself and selection of the respective content item causes the content item to play within the unified media browsing application (e.g., without launching another application and causing playback in the other application). In some embodiments, the unified media browsing application provides a centralized location for browsing, searching, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device).

In some embodiments, while displaying the user interface, the electronic device receives (1304), via the one or more input devices, an input corresponding to a request to scroll through the user interface, such as in FIG. 12B (e.g., a request to scroll down the user interface to reveal rows of content.).

In some embodiments, in response to receiving the input (1308): the electronic device scrolls (1310) through the user interface to reveal, in the user interface: a second plurality of representations of a second plurality of content items that are selectable to initiate processes to access the second content items (1310), such as in FIG. 12B (e.g., scrolling down to reveal rows of different content). In some embodiments, the electronic device scrolls through the user interface to reveal, in the user interface: in accordance with a determination that first one or more content provider linking criteria are satisfied, a representation of a first content provider that is selectable to initiate a process to link a subscription of a user of the electronic device to the first content provider to the unified media browsing application (1312), such as in FIG. 12C (e.g., one of the rows is a banner for allowing a user to log into a content provider such that the content available from the content provider is accessible on the electronic device).

In some embodiments, the one or more content provider linking criteria includes a confidence level that a user has an account with a particular content provider. In some embodiments, a high confidence level is achieved if the user has a content provider's application installed on one of the user's other electronic devices (e.g., different from the electronic device), such as a mobile phone, tablet, or set-top box, and/or has logged into the content provider from the user's other electronic device. For example, if a user has a mobile phone with an HBO app installed and authenticated, then the electronic device determines with high confidence that the user has an account with HBO. In such embodiments, the electronic device displays a banner suggesting to the user to link the user's HBO account with the electronic device. In some embodiments, the electronic device automatically determines the user's login details from the other electronic device and requests authorization to use the login details to authenticate the electronic device with the primary content provider.

The above-described manner of linking a subscription with a content provider (e.g., by displaying a banner suggesting to the user to log into the content provider) allows the electronic device to provide the user with an easy method of logging into a content provider (e.g., by displaying a banner when the device determines with high confidence that the user has an account with the content provider), which simplifies the interaction between the user and the electronic device and enhances the operability of the electronic device and makes the user-device interface more efficient (e.g., by automatically determining whether the user has an account with the content provider and providing an easy interface for the user to log into the primary content provider), which additionally reduces power usage and improves battery life of the electronic device by enabling the user to use the electronic device more quickly and efficiency, while reducing errors in usage.

In some embodiments, one or more content provider linking criteria include a criterion that is satisfied when a confidence level that the user of the electronic device has a subscription with the first content provider is greater than a threshold (1314), such as in FIG. 12C (e.g., if the electronic device can determine with confidence that the user has an account or credentials with the first content provider). In some embodiments, the confidence is determined by whether the user has installed an application for the first content provider on one of the user's other devices and/or the user has logged into the first content provider from one of the user's other devices. In some embodiments, if the confidence level is below a threshold such that the content provider linking criteria is not satisfied, then the electronic device does not display a banner suggesting to the user to link the user's account with the first content provider to the electronic device. In some embodiments, instead of displaying a banner specific to a particular content provider, another banner is displayed allowing the user to choose the user's primary content provider and provide login details for that primary content provider.

The above-described manner of linking a subscription with a content provider (e.g., by displaying a banner suggesting to the user to log into the content provider when a confidence level that the user has a subscription to the content provider is above a certain level) allows the electronic device to provide the user with an easy method of logging into a content provider (e.g., by automatically determining whether the user likely has an account with the content provider), which simplifies the interaction between the user and the electronic device and enhances the operability of the electronic device and makes the user-device interface more efficient (e.g., by automatically determining whether the user has an account with the content provider and providing an easy interface for the user to log into the content provider), which additionally reduces power usage and improves battery life of the electronic device by enabling the user to use the electronic device more quickly and efficiency, while reducing errors in usage.

In some embodiments, the confidence level is based on one or more features, on a second electronic device other than the electronic device, corresponding to the subscription of the user to the first content provider (1316), such as in FIG. 12C (e.g., the existence of the first content provider's application installed onto the user's other electronic devices). For example, if the user of the electronic device owns one or more other electronic devices, such as a laptop device, smart phone, wearable device, or tablet device that the user has logged into the other electronic devices with the same account as the electronic device and the other electronic devices have one or more applications corresponding to one or more content providers installed onto any of these other laptop devices. For example, if the user owns a smartphone and has logged into the smartphone and the electronic device with the same user account, and the user has downloaded a provider 1 application onto the smartphone, then the confidence level that the user has an account with provider 1 is such that the linking criteria is satisfied. In some embodiments, the confidence level is satisfied if the user's accounts profile (e.g., a digital keychain) includes login credentials for one or more content providers.

The above-described manner of determining a user's subscription with a content provider (e.g., by determining whether another electronic device, of the user, has an application associated with the content provider) allows the electronic device to determine the user's subscription to content providers (e.g., by automatically determining whether the user likely has an account with the content provider by determining that the user has installed an application for the content provider on another of the user's devices), which simplifies the interaction between the user and the electronic device and enhances the operability of the electronic device and makes the user-device interface more efficient (e.g., by automatically determining whether the user has an account with the content provider based on the user's other electronic devices, without requiring that the user navigate to different user interfaces to manually provide information to the electronic device), which additionally reduces power usage and improves battery life of the electronic device by enabling the user to use the electronic device more quickly and efficiency, while reducing errors in usage.

In some embodiments, the process to link the subscription of the user of the electronic device to the first content provider to the unified media browsing application occurs within the unified media browsing application (1318), such as in FIG. 12E. In some embodiments, the login and/or authentication process is performed while the user remains in the unified media browsing application. In other words, the electronic device does not launch another application or a system user interface to perform the login and/or authentication. In some embodiments, the unified media browsing application displays a user interface specific for logging into and/or authentication with the first content provider.

The above-described manner of linking a subscription with a content provider (e.g., by displaying a banner suggesting to the user to log into the content provider within the unified media browsing application) allows the electronic device to provide the user with an easy method of logging into a content provider (e.g., by displaying the banner in the same user interface for browsing content items), which simplifies the interaction between the user and the electronic device and enhances the operability of the electronic device and makes the user-device interface more efficient (e.g., by conveniently placing the banner for logging into the content provider in the same user interface that the user uses to browse content, without requiring the user to navigate to a separate user interface to log into the content provider), which additionally reduces power usage and improves battery life of the electronic device by enabling the user to use the electronic device more quickly and efficiency, while reducing errors in usage.

In some embodiments, in response to receiving the input (1320): the electronic device scrolls (1322) through the user interface to reveal, in the user interface: in accordance with a determination that second one or more content provider linking criteria, different than the first one or more content provider linking criteria, are satisfied, a representation of a second content provider, different than the first content provider, that is selectable to initiate a process to link a subscription of the user of the electronic device to the second content provider to the unified media browsing application (1324), such as in FIG. 12G (e.g., display a second banner for logging into or authenticating with a second content provider). In some embodiments, the user's other devices includes multiple applications for multiple content providers and the electronic device determines with high confidence that the user has accounts and/or authentication for multiple content providers. In some embodiments, the electronic device will display multiple banners for multiple providers for which the device has high confidence for. In some embodiments, the electronic device will select a subset of the providers that it determines that there is high confidence for. In some embodiments, the electronic device will only select the most often used provider, for example. In some embodiments, if the first one or more content provider linking criteria is satisfied without regard to the criteria for the second content provider, then display the banner for logging into the first content provider and if the second one or more content provider linking criteria are satisfied without regard to the criteria for the first content provider, then display a banner for the second content provider. In other words, the criteria for displaying a banner for a respective content provider is independent of the criteria for displaying a banner for other content providers or whether other banners are being displayed for other content providers and any number or combination of banners can be displayed at any one time.

The above-described manner of linking a subscription with multiple content providers (e.g., by displaying multiple banner suggesting to the user to log into multiple content providers, respectfully, based on confidence that the user has a subscription to the respective content provider) allows the electronic device to provide the user with an easy method of logging into multiple content providers (e.g., by automatically determining the content providers that the user likely has accounts with), which simplifies the interaction between the user and the electronic device and enhances the operability of the electronic device and makes the user-device interface more efficient (e.g., by automatically determining the content providers with which the user has accounts and providing an easy login interface for each content provider), which additionally reduces power usage and improves battery life of the electronic device by enabling the user to use the electronic device more quickly and efficiency, while reducing errors in usage.

In some embodiments, in response to receiving the input (1326): the electronic device scrolls (1328) through the user interface to reveal, in the user interface: in accordance with a determination that the first one or more content provider linking criteria are not satisfied, a representation that is not specific to a content provider and that is selectable to initiate a process to select a respective content provider and link a subscription of the user of the electronic device to the respective content provider to the unified media browsing application (1330), such as in FIG. 12H (e.g., display a banner that allows a user to begin a process for selecting a particular content provider and log into the content provider (e.g., without the electronic device displaying or suggesting a content provider in particular)). In some embodiments, selection of a selectable option on the banner displays a user interface in which the user can search for, browse, or otherwise select from a list of different content providers. In some embodiments, after the user selects a respective content provider, the user is prompted to provide the user's login credentials for the respective content provider. In some embodiments, after receiving the login credentials, the electronic device verifies or otherwise authenticates the user's login details with the respective content provider. In some embodiments, after authenticating with the respective content provider, the electronic device (and the unified media browsing application) gains access to all or some of the content that is available via the respective content provider.

The above-described manner of linking a subscription with a content provider (e.g., by displaying a banner suggesting to the user to select and log into a content provider) allows the electronic device to provide the user with an easy method of logging into a content provider (e.g., by providing an interface for the user to select content providers to log into in the same interface that the user uses to browse for content), which simplifies the interaction between the user and the electronic device and enhances the operability of the electronic device and makes the user-device interface more efficient (e.g., by providing an easy method for the user to select content providers to log into without requiring the user to navigate to a separate user interface to select and log into content providers), which additionally reduces power usage and improves battery life of the electronic device by enabling the user to use the electronic device more quickly and efficiency, while reducing errors in usage.

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700, 1900, 2100, and 2300) are also applicable in an analogous manner to method 1300 described above with respect to FIGS. 13A-13C. For example, the operation of the electronic device to link an account for a primary content provider described above with reference to method 1300 optionally has one or more of the characteristics of the presentation of content in the unified media browsing application, presentation of information on representations of content items, displaying of content in a unified media browsing application, restricting of access to content based on the geographic location of the device, and presentation of playback menus during playback of content in a unified media browsing application, displaying user interfaces specific to a respective content item, displaying content items, etc., described herein with reference to other methods described herein (e.g., methods 700, 900, 1100, 1500, 1700, 1900, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 13A-13C are, optionally, implemented by components depicted in FIGS. 1A-1B. For example, displaying operations 1302, 1308, 1322, and 1328, receiving operations 1304, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Restricting Access to Content Based on Geographic Location

Users interact with electronic devices in many different manners, including using an electronic device to browse and access content in a media browsing application. In some embodiments, an electronic device aggregates available content in a single unified media browsing application. The embodiments described below provide ways in which an electronic device limits content playback based on geographical restrictions, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 14A-14M illustrate exemplary ways in which an electronic device restricts access to content based on the geographic location of the device in accordance with some embodiments of the disclosure. The embodiments in these figures are used to illustrate the processes described below, including the processes described with reference to FIGS. 15A-15C.

Figure 14A:
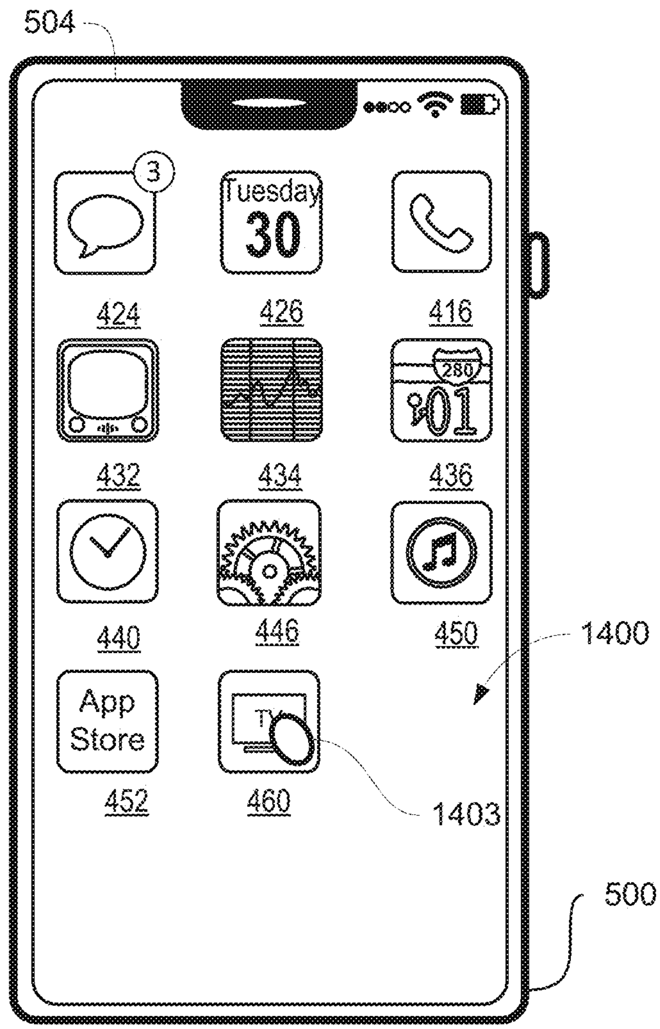
FIGS. 14A-14M illustrate exemplary ways in which an electronic device restricts access to content based on the geographic location of the device in accordance with some embodiments of the disclosure.

FIGS. 14A-14M illustrate an electronic device 500 restricting access to content based on the geographic location of the device. FIG. 14A illustrates an exemplary device 500 that includes touch screen 504. As shown in FIG. 14A, the electronic device 500 presents a home screen user interface 1000. In some embodiments, home screen user interface 1400 is an application launching user interface. For example, home screen user interface 1400 includes multiple selectable options that when selected causes the electronic device 500 to launch or otherwise present applications. In some embodiments, home screen user interface 1400 includes multiple pages or tabs and includes all launchable applications that have been installed onto electronic device 500. In some embodiments, home screen user interface 1400 includes a subset of the applications that are installed and launchable on electronic device 500. In some embodiments, home screen user interface 1400 includes an application store icon 452 for launching an application store application. In some embodiments, the application store application is an application in which the user can browse for and purchase applications (e.g., include games, services, or other content) to download and install onto electronic device 500. In some embodiments, home screen user interface 1400 includes a television application 460. In some embodiments, television application 460 is similar to and/or shares similar features as the unified media browsing application discussed above.

In FIG. 14A, a user input 1403 is detected on touch screen 504 selecting television application 460. In some embodiments, in response to user input 1403, device 500 launches the television application and displays user interface 1410 corresponding to the "Watch Now" page of the television application. In some embodiments, the "Watch Now" page is similar to or shares similar feature as the "Watch Now" user interface 610 described above with respect to FIG. 6B. For example, user interface 1410 optionally includes an "Up Next" row of content items and a "Sports" row of content items. In some embodiments, any of representations 1414 and 1415 are selectable to cause playback of the respective content item. In some embodiments, selection of content from the "Up Next" row causes playback of the respective content item and selection of content from the "Sports" row causes display of a canonical page for the respective content item. In some embodiments, playback of a respective content item occurs within the television application. In some embodiments, playback of a respective content item occurs in a separate application (e.g., television application causes launch of a separate application to playback the respective content item).

In some embodiments, content displayed in the television application can be subjected to geographic restrictions. For example, a respective content item can be restricted such that the item is not accessible while in certain geographies but is accessible in other geographies. In some embodiments, the restrictions are based on agreements between the content creator and the content provider. In some embodiments, the restrictions are based on the laws or regulations of the particular jurisdictions. In some embodiments, some content providers have a license to provide content in some jurisdictions but not others and other content providers may have a license to provide content in the jurisdiction that the first set of content providers do not have a license for. Thus, in some embodiments, although content may be subject to geographic restrictions, if a user has a subscription to certain combinations of content providers, the user may be able to access a given content in many geographies due to the coverage provided by the user's combination of content providers.

Figure 14B:
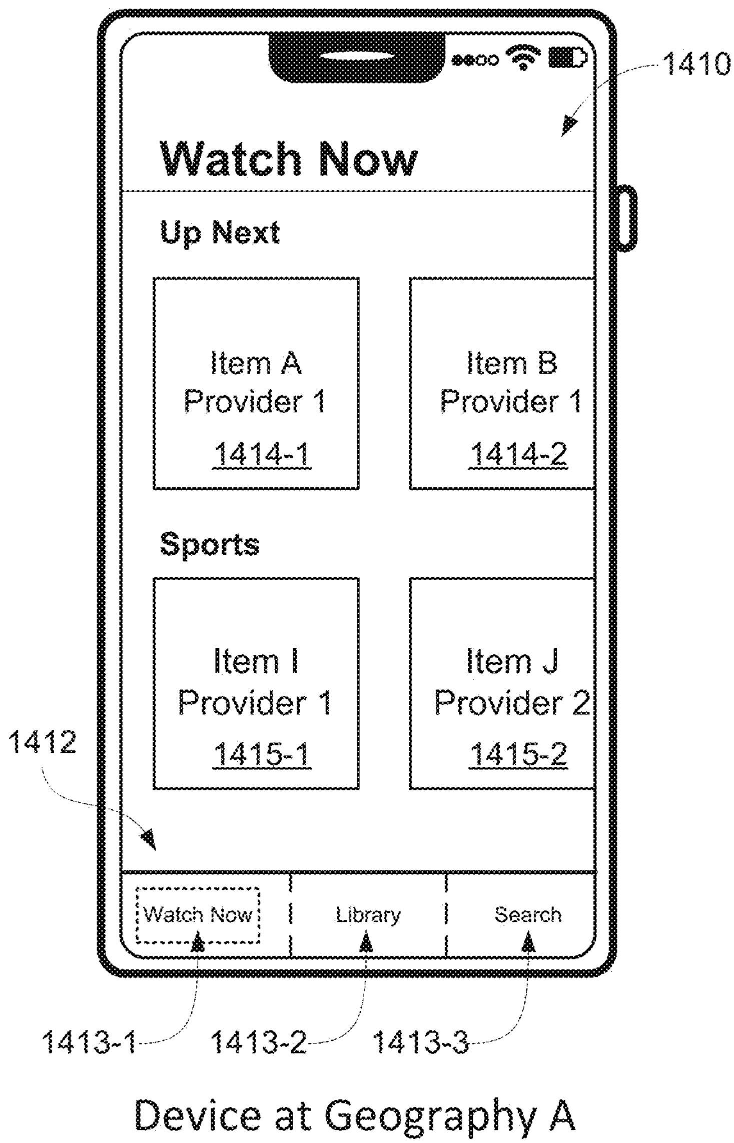
Figure 14C:
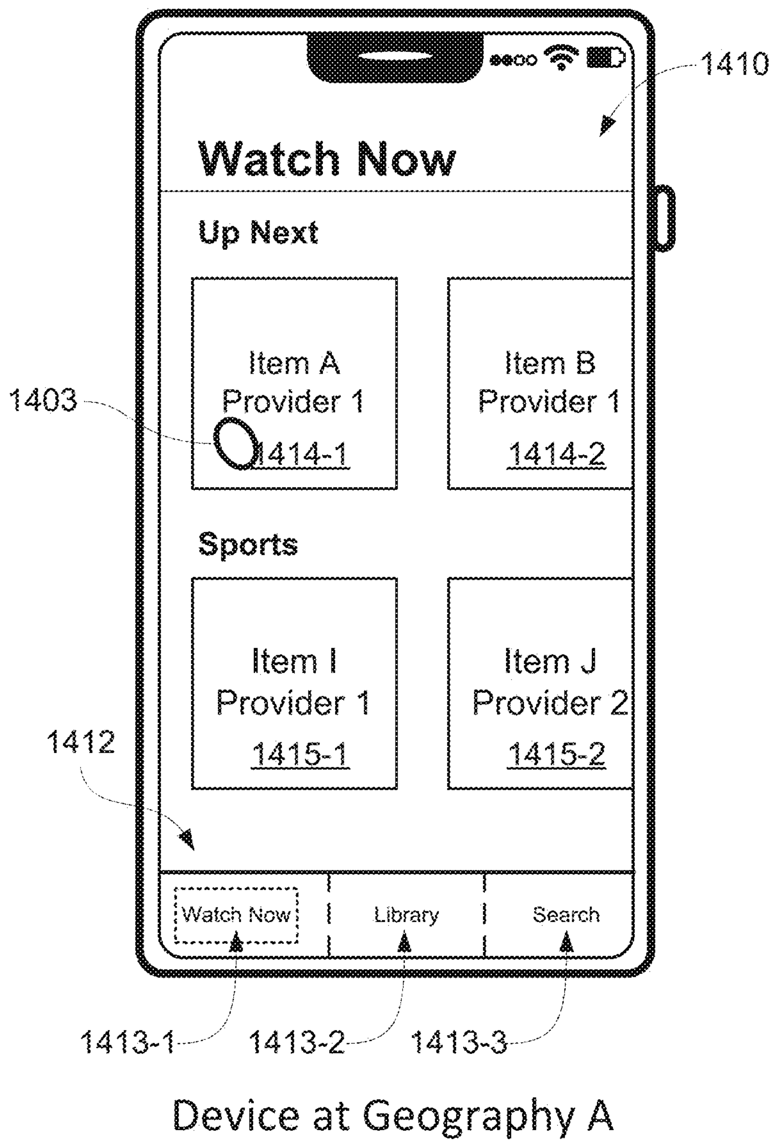
Figure 14D:
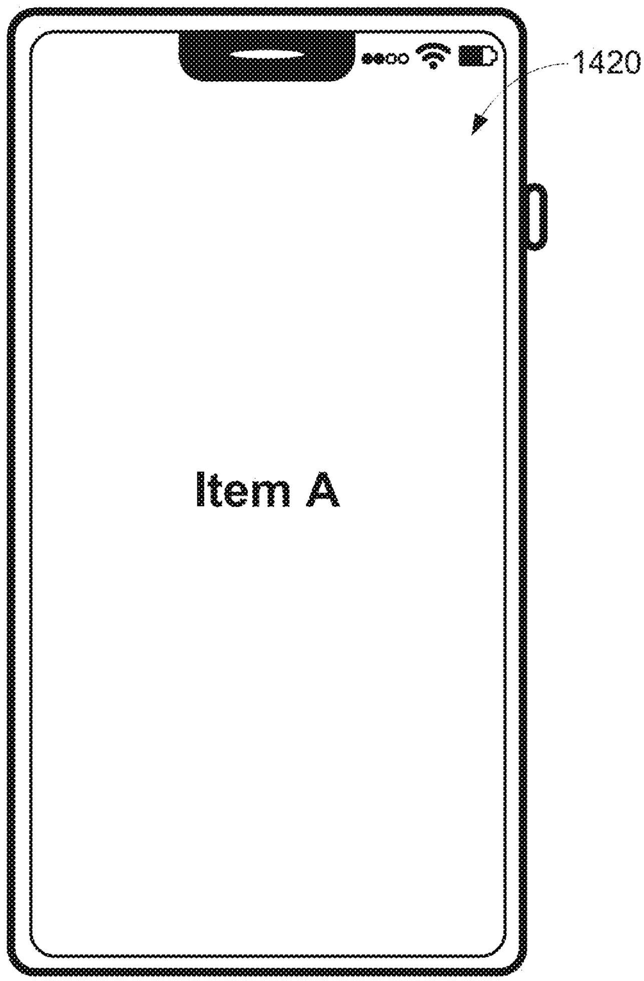

In FIG. 14B, electronic device is located in geography A. In some embodiments, geography A is the electronic device's "home" geography. For example, geography A is the geography in which device 500 was set up or is the geography in which the user spends most of the user's time. In FIG. 14C, a user input 1403 selecting representation 1414-1 corresponding to item A is received. In some embodiments, item A is available to be accessed at geography A (e.g., provider 1 has a license to provide item A in geography A and/or geography A's laws or regulations do not prevent display of item A). Thus, in response to user input 1403 selecting representation 1414-1, device 500 displays or otherwise causes playback of item A, as shown in FIG. 14D. In some embodiments, playback occurs within the television app. In some embodiments, playback occurs in a separate application (e.g., the separate application is launched and playback occurs in the separate application).

Figure 14E:
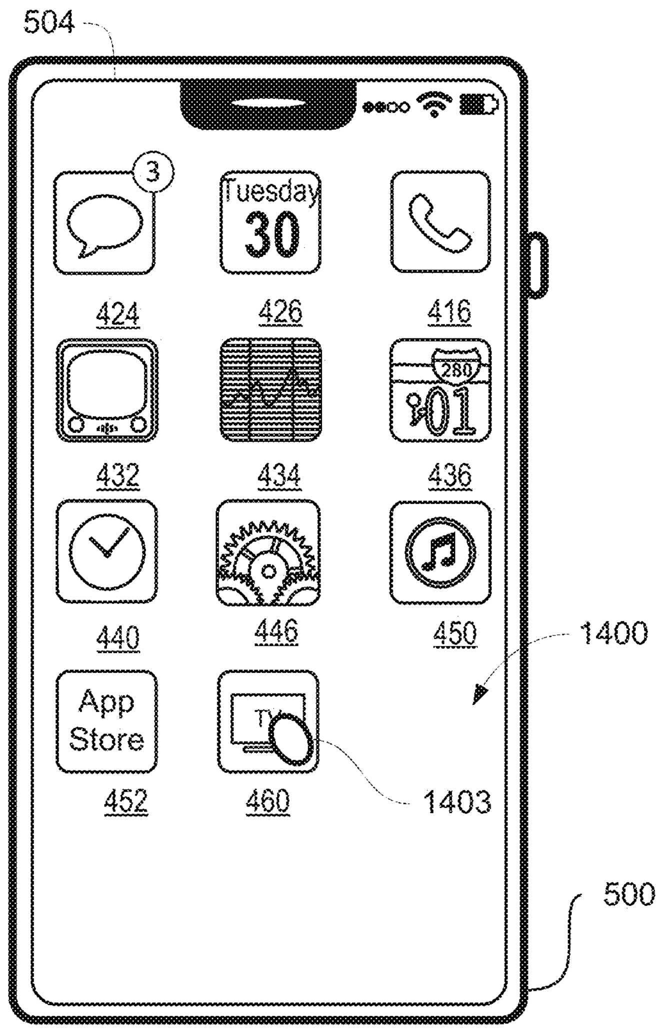
Figure 14F:
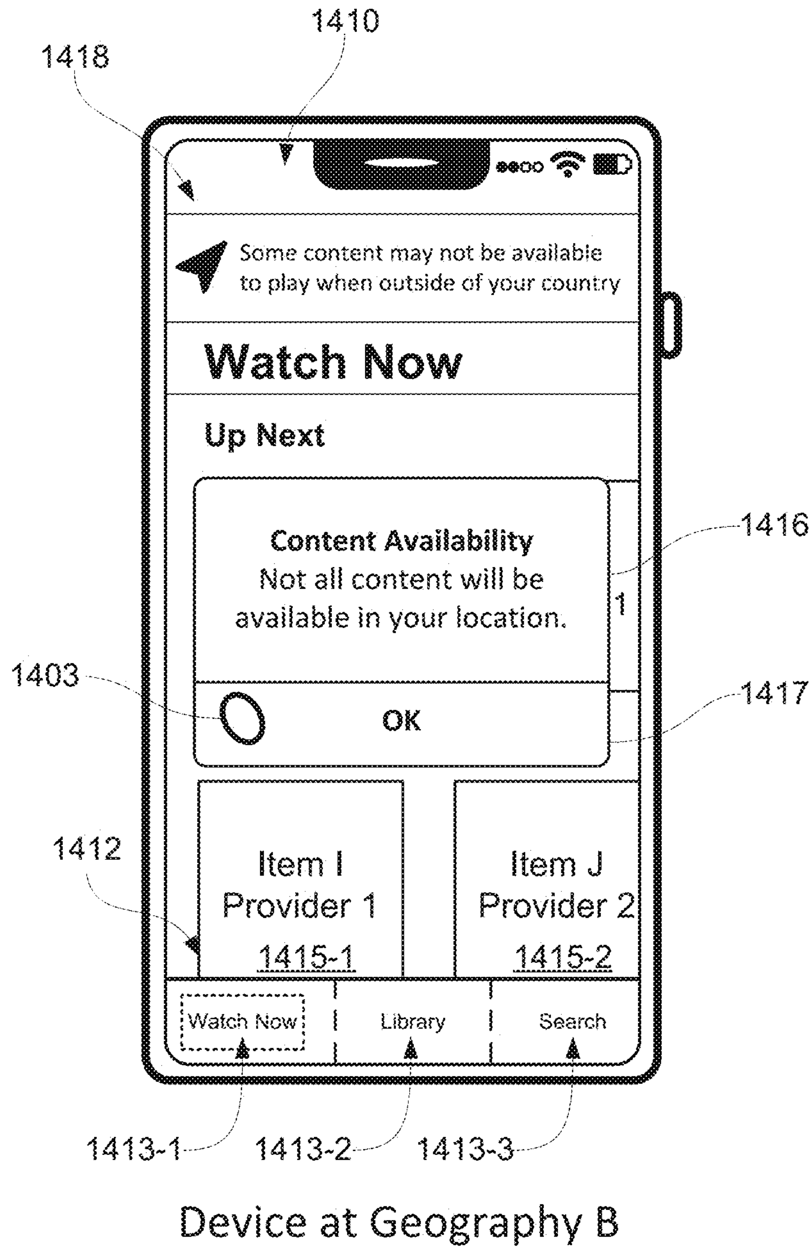

FIG. 14E illustrates an exemplary embodiment in which device 500 is in geography B. For example, the user of device 500 travelled to geography B. In some embodiments, a user input 1403 is detected on touch screen 504 selecting television application 460. In some embodiments, in response to user input 1403, device 500 launches the television application and displays user interface 1410 corresponding to the "Watch Now" page of the television application, as shown in FIG. 14F. In some embodiments, device 500 (and/or the television application) detects that device 500 has moved away from its "home" geography and is now in geography B. In some embodiments, because device 500 is in geography B, user interface 1410 displays a pop-up notification 1416 that notifies the user that not all content that is included in the television application is available to be accessed at the device's current location. In some embodiments, a user input 1403 is detected selecting selectable option 1417 for dismissing pop-up notification 1416. In some embodiment, user interface 1410 includes a content availability banner 1418. In some embodiments, content availability banner 1418 is displayed at or near the top of user interface 1410. In some embodiments, content availability banner 1418 indicates to the user that not all content is available when the user is travelling outside of the user's home country. In some embodiments, content availability banner 1418 displaces the content within user interface 1410 (e.g., pushes the content downwards).

Figure 14G:
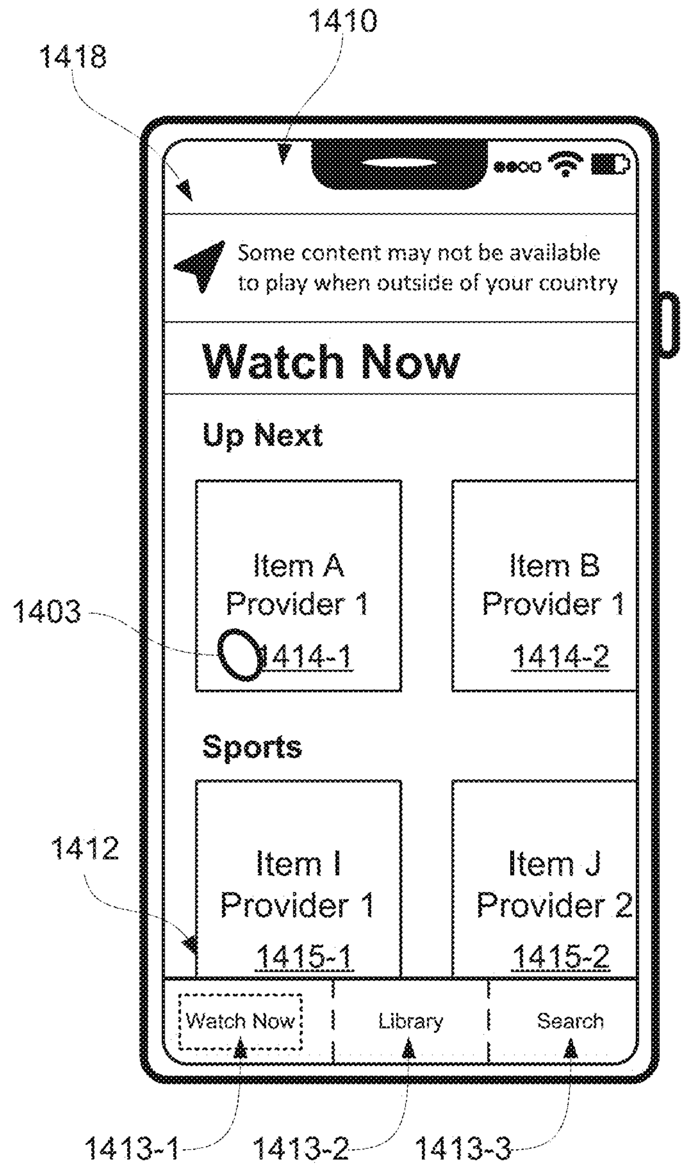

As shown in FIG. 14G, in response to user input 1403 dismissing pop-up notification 1416, user interface 1410 is fully revealed, allowing the user to browse and select content. In some embodiments, content availability banner 1418 is displayed even after the user dismisses pop-up notification 1416. In some embodiments, content availability banner 1418 is snapped to the top of the display such that scrolling downwards does not cause content availability banner 1418 to scroll away and content availability banner 1418 is always displayed at the top of the display. In some embodiments, content availability banner 1418 is not snapped to the top of the display and scrolling downwards causes content availability banner 1418 to be scrolled away.

In some embodiments, as shown in FIG. 14G, a user input 1403 is detected selecting representation 1414-1 corresponding to item A. In some embodiments, playback of item A is restricted in geography B. Therefore, in response to user input 1403, user interface 1410 displays content restriction popup 1418 informing the user that the selected content (e.g., item A) is not available to be viewed at the device's location (e.g., geography B). Thus, selection of representation 1414-1 while device 500 is in geography B does not cause playback of item A. In some embodiments, selection of selectable option 1419 causes content restriction popup 1418 to be dismissed, as shown in FIG. 14I.

In some embodiments, user input 1403 is received selecting representation 1414-2 corresponding to item B. In some embodiments, item B is available to be displayed in geography B. Therefore, in response to user input 1403 selecting representation 1414-2, device 500 causes playback of item B, as shown in FIG. 14J. Thus, as discussed above, each individual content item in the television application can be subjected to geographic restrictions, even if the content item is provided by the same provider.

Figure 14H:
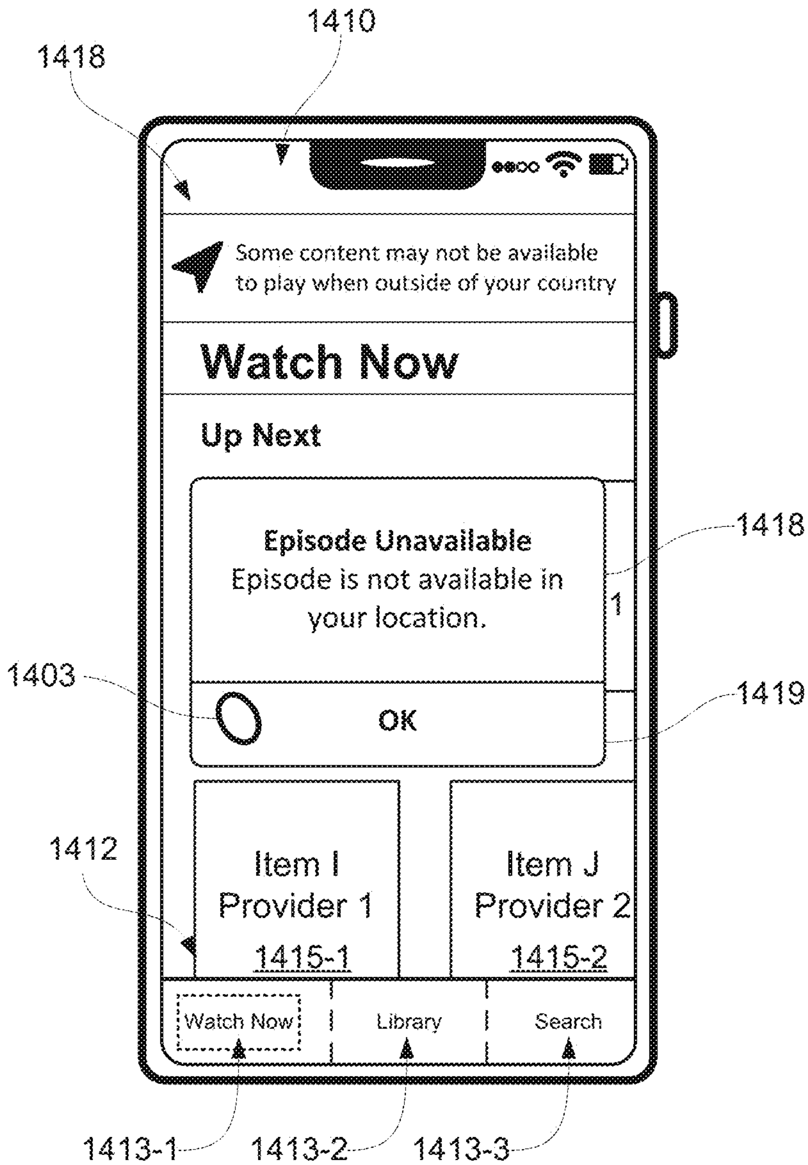
Figure 14I:
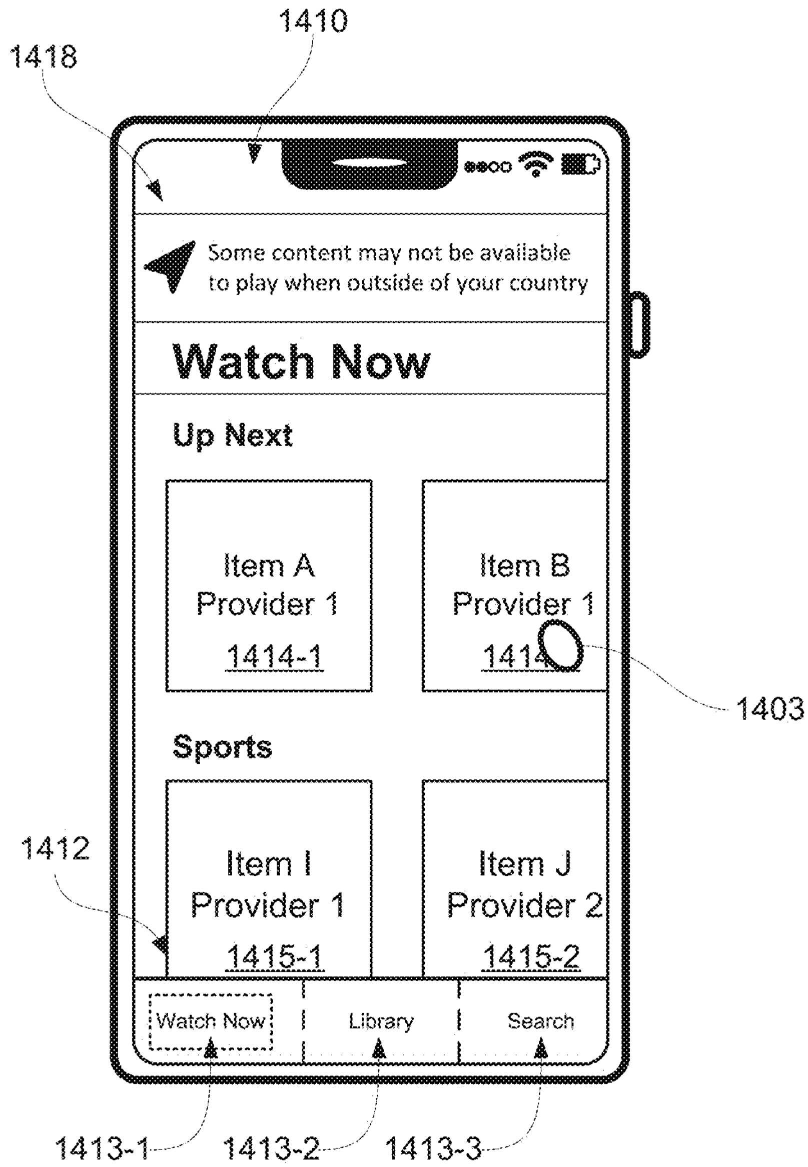
Figure 14J:
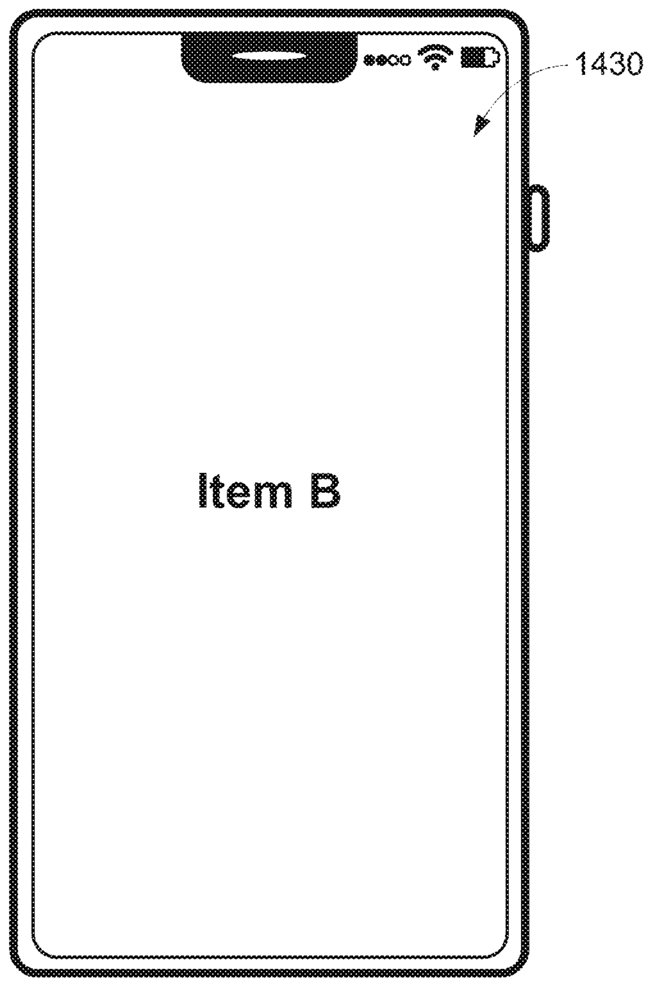
Figure 14K:
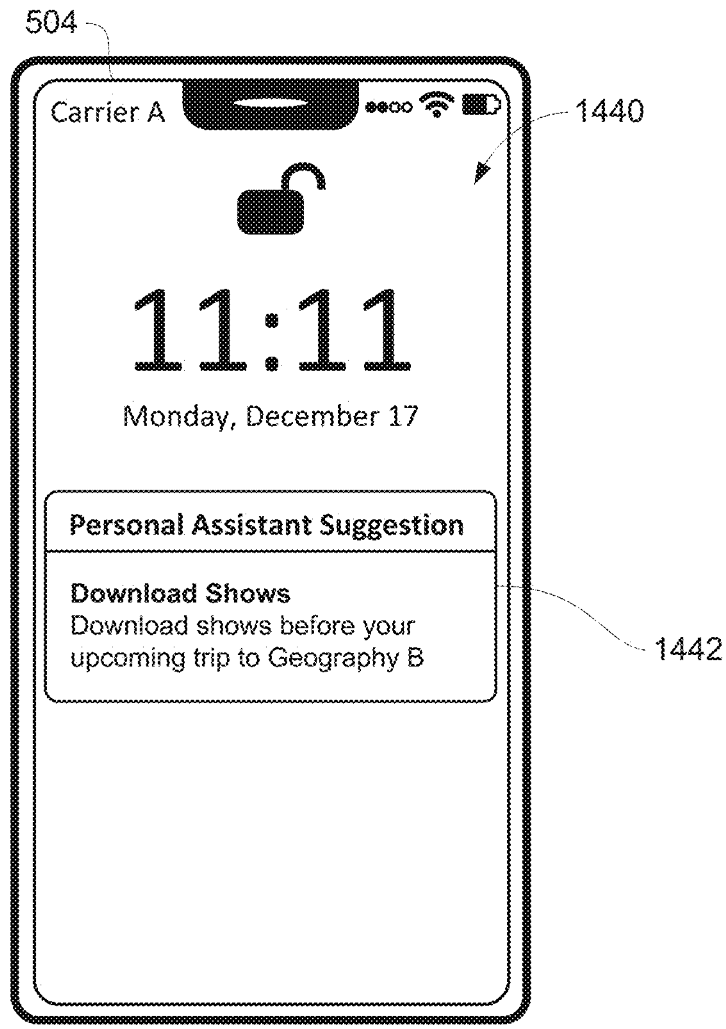

FIG. 14K illustrates a personal assistant notification 1442 in which device 500 determines that the user will be travelling to a geography in which certain content items will be subjected to content playback restrictions (e.g., such as item A). In some embodiments, device 500 will display a personal assistant notification 1142 informing and/or reminding the user to download or otherwise acquire content before the user's travel to the geography in which certain content items are subject to content playback restrictions (e.g., geography B). In some embodiments, device 500 (and/or a personal assistant on device 500) determines that the user will be travelling to the restricted geography based on the user's calendar, the user's emails, etc. In some embodiments, personal assistant notification 1142 can be displayed in any user interface in which notifications are ordinarily displayed. For example, in FIG. 14K, personal assistant notification 1142 is displayed on user interface 1440 corresponding to a lock screen user interface of device 500. For example, a user may have previously purchased a content item but has not yet downloaded the content item onto device 500. Thus, personal assistant notification 1142 would remind the user to download the content item before the user's travel.

In some embodiments, notification 1442 is selectable to display a user interface to download content items. In some embodiments, the user interface for downloading shows displays one or more content items that can be downloaded onto device 500. In some embodiments, notification 1442 is selectable to automatically begin downloading one or more content items, for example, that the user has previously purchased but has not yet downloaded.

Figure 14L:
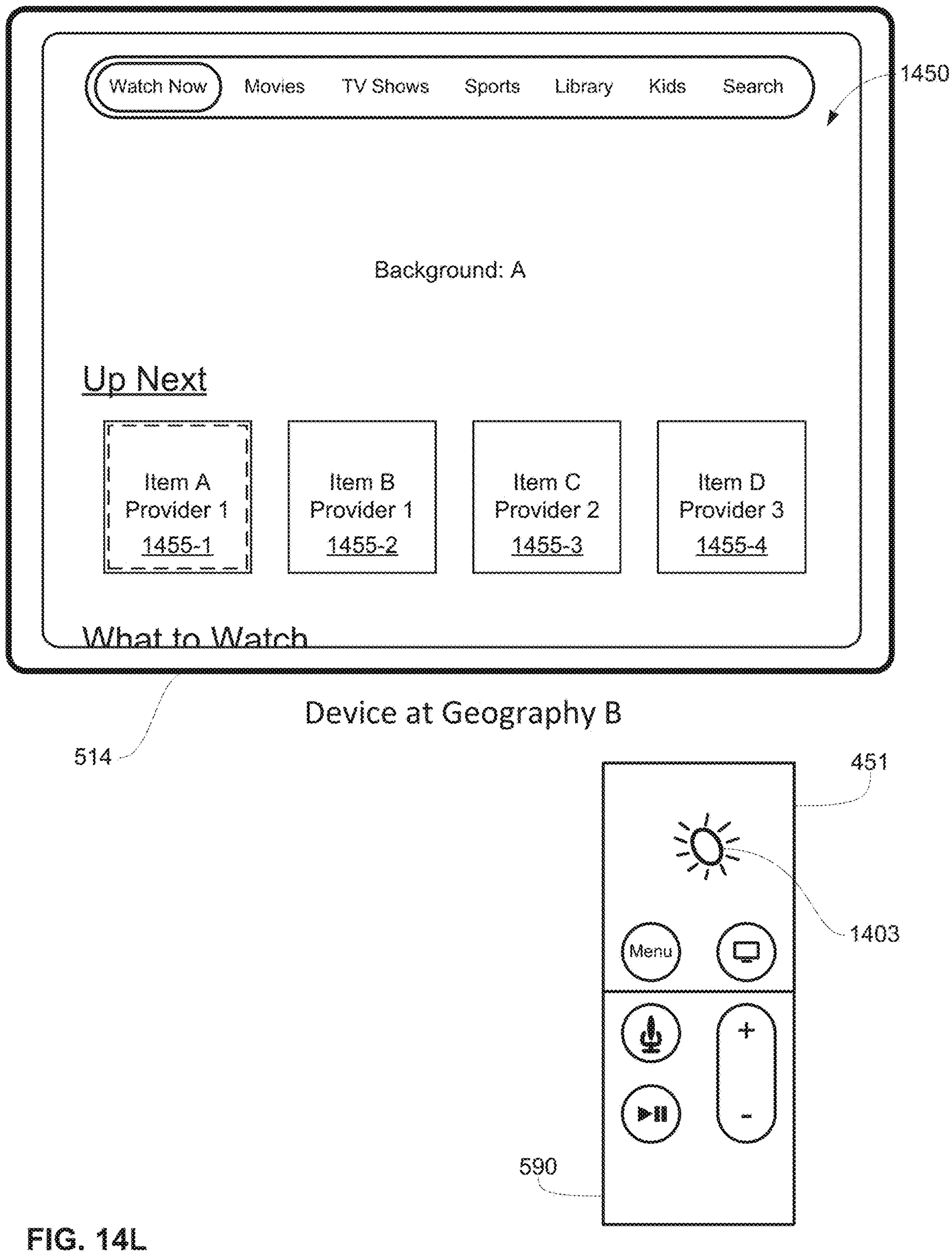
Figure 14M:
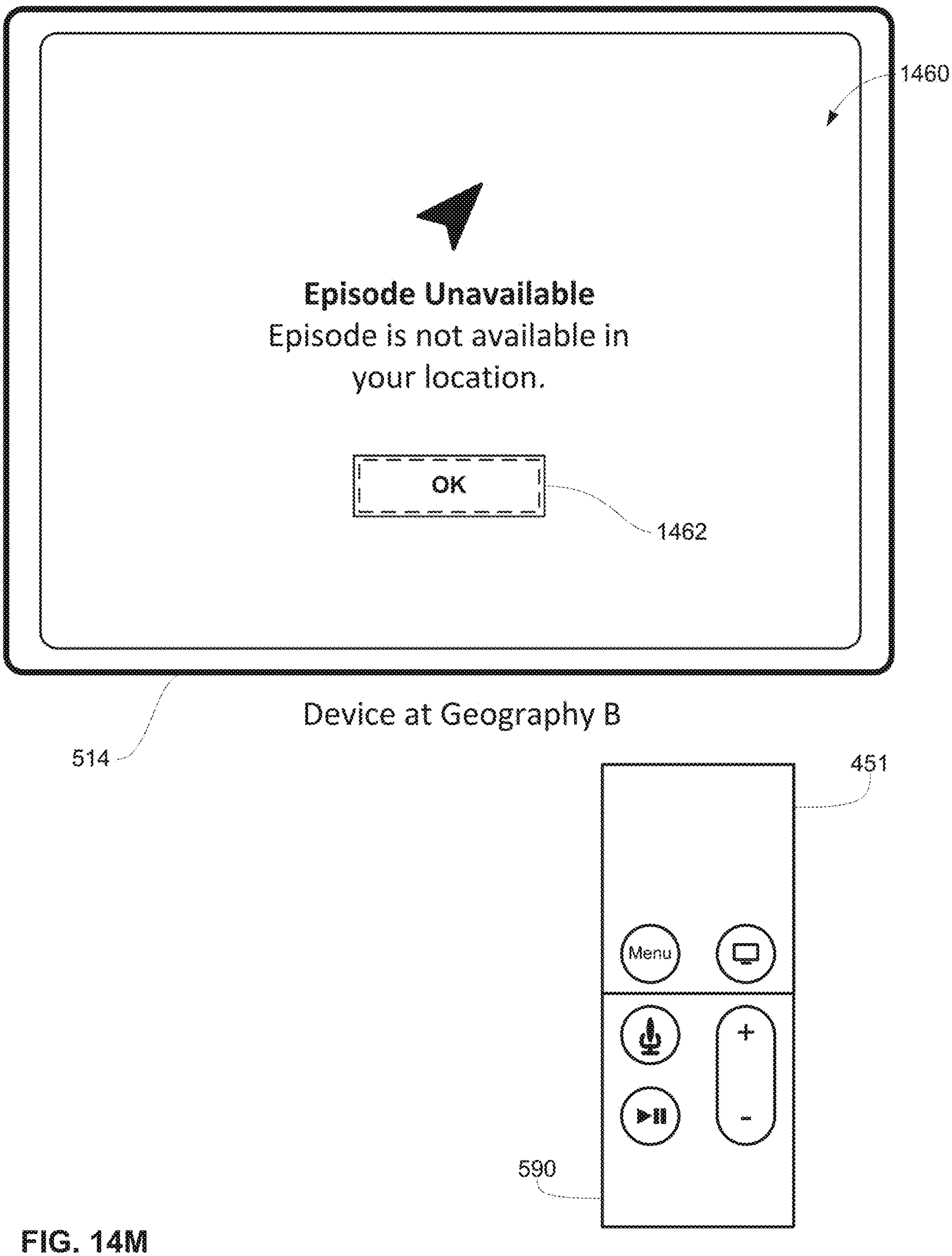

FIG. 14L-14M illustrate an exemplary method in which a set-top box device (e.g., device 500) implements geographic playback restrictions. In FIG. 14L, device 500 displays user interface 1450 of a media browsing application corresponding to the "Watch Now" page. In some embodiments, user interface 1450 includes rows of content items, including an "Up Next" row of content. In some embodiments, representations in rows other than the "Up Next" row are selectable to display a product page or canonical page for the corresponding content item (e.g., from which the user optionally is able to select a selectable option to cause playback of the content item). In some embodiments, a user input 1403 is detected selecting icon 1455-1 corresponding to item A (e.g., while icon 1455-1 has a focus) while device 500 is in geography B. In some embodiments, item A is subjected to geographic restrictions and cannot be played in geography B. Thus, in some embodiments, in response to user input 1403 selecting icon 1455-1, device 500 displays user interface 1460 informing the user that the selected content is unavailable at the device's current location (e.g., geography B). In some embodiments, selection of selectable option 1462 causes dismissal of user interface 1460 and re-display of user interface 1450.

Figure 15A:
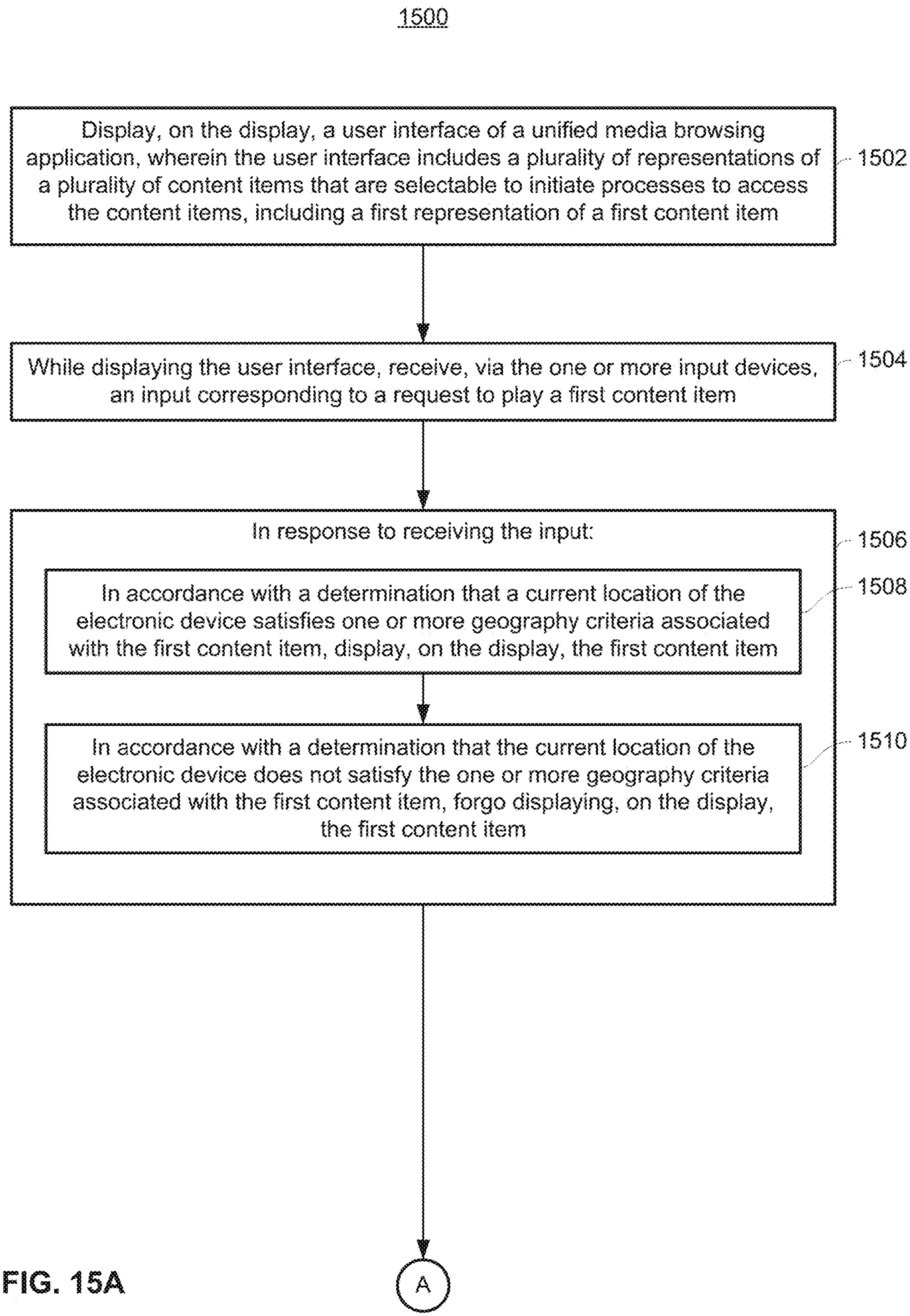
Figure 15C:
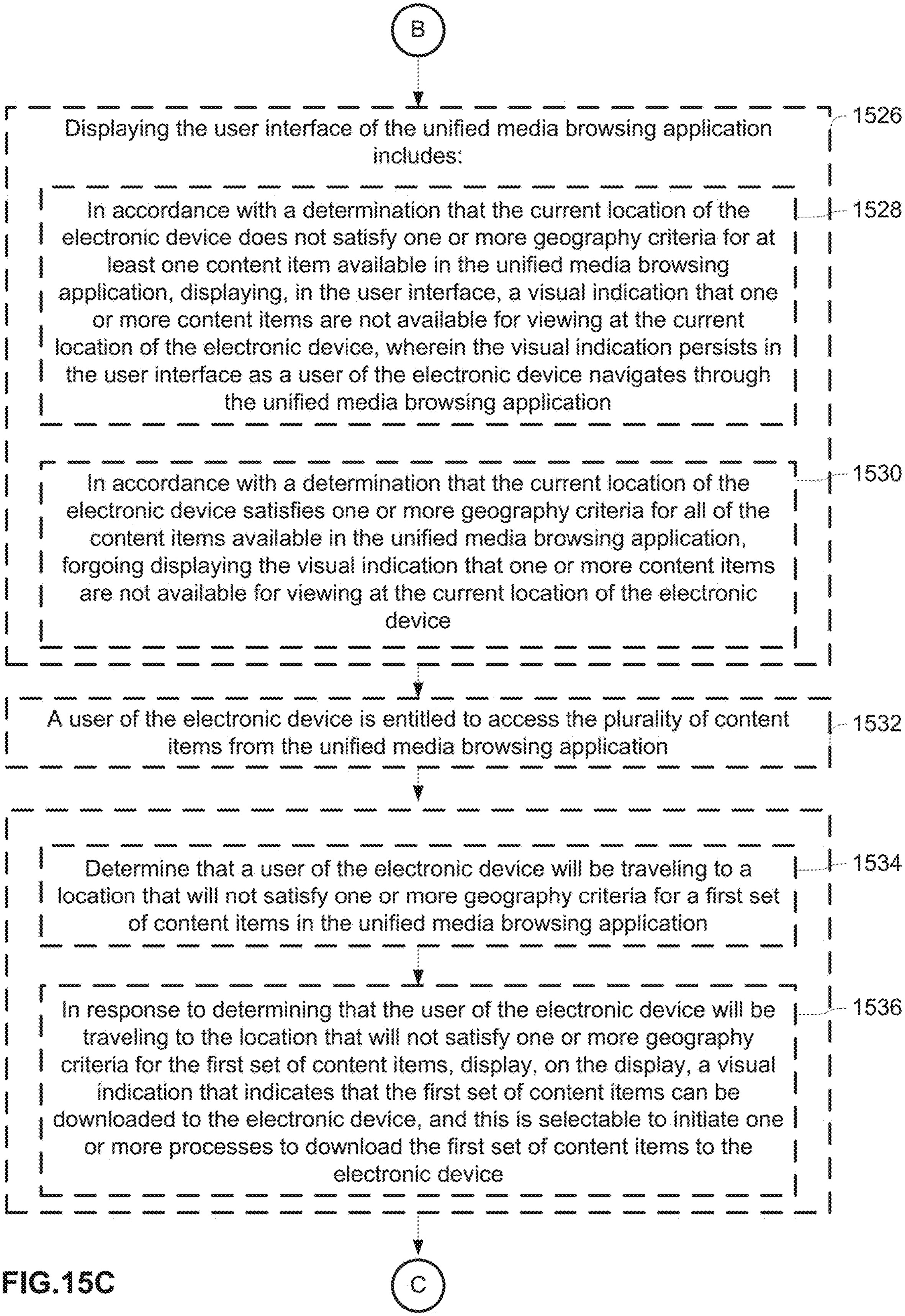

FIGS. 15A-15C are flow diagrams illustrating a method 1500 of restricting access to content based on the geographic location of the device in accordance with some embodiments of the disclosure. The method 1500 is optionally performed at an electronic device such as device 100, device 300, device 500, and device 511 as described above with reference to FIGS. 1A-1B, 2-3, 4A-4B and 5A-5C. Some operations in method 1500 are, optionally combined and/or order of some operations is, optionally, changed.

As described below, the method 1500 provides ways to restrict access to content based on the geographic location of the device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (1502), on the display, a user interface of a unified media browsing application, wherein the user interface includes a plurality of representations of a plurality of content items that are selectable to initiate processes to access the content items, including a first representation of a first content item, such as in FIG. 14B (e.g., a page or tab in the unified media browsing application to browse for, purchase, and/or select to cause playback of content).

In some embodiments, the page or tab for content displays multiple icons (e.g., representations, selectable options) of content items. In some embodiments, when a user selects one of content items (e.g., by selecting the selectable option associated with a respective content item), the electronic device initiates a process for accessing the selected content item (e.g., cause playback, launch an application to cause playback, display more information about the content item such as displaying a canonical page for the content item, etc.). In some embodiments, content in the unified media browsing application is accessible via another application installed on the electronic device and selection of the respective content item will cause the other application to launch and the respective content item to play in the other application. In some embodiments, some content is accessible via the unified media browsing application itself and selection of the respective content item causes the content item to play within the unified media browsing application (e.g., without launching another application and causing playback in the other application). In some embodiments, the unified media browsing application provides a centralized location for browsing, searching, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device).

In some embodiments, while displaying the user interface, the electronic device receives (1504), via the one or more input devices, an input corresponding to a request to play a first content item, such as in FIG. 14C (e.g., a tap or other selection input on the representation of the first content item). In some embodiments, the first content item is provided by a respective content provider to which the user has access. For example, the unified media browsing application aggregated the first content item from the respective content provider's application and/or server. In some embodiments, upon selection of the first content item, the unified media browsing application causes launching of an application for the respective content provider and playback of the first content provider in the respective content provider's application. In some embodiments, the first content provider is compatible to be played back within the unified media browsing application itself (e.g., in a fullscreen playback user interface of the unified media browsing application). In some embodiments, instead of causing playback of the first content item, selection causes display of a user interface specific to the first content item (e.g., canonical page, product page).

In some embodiments, in response to receiving the input (1506): in accordance with a determination that a current location of the electronic device satisfies one or more geography criteria associated with the first content item, the electronic device displays (1508), on the display, the first content item, such as in FIG. 14D. In some embodiments, playback of the first content item is available only if the electronic device is located in certain approved geographical locations, even if the user otherwise has access to the first content item (e.g., has a subscription to a respective content provider). In some embodiments, the geographical playback limitations of the first content item are determined by the agreements between the content providers and the content creators. In some embodiments, the geographical playback limitations of the first content item are determined by the laws and/or regulations of the geographical jurisdictions.

In some embodiments, in accordance with a determination that the current location of the electronic device does not satisfy the one or more geography criteria associated with the first content item, the electronic device forgoes (1510) displaying, on the display, the first content item, such as in FIG. 14H (e.g., if the electronic device is not located in an approved geographical location, then do not cause playback of the first content item. In some embodiments, instead of playing back the first content item, the electronic device displays a popup or notification that the first content item cannot be played at the electronic device's current geographic location. In some embodiments, the first content item can be accessible in the user's geographical location via a different content provider. In some embodiments, if the user has access to the first content item via multiple content providers and one of the content providers provides access in the electronic device's current geographic area, the unified media browsing application will automatically determine which content provider to use and will cause playback using the content provider that can provide access. In some embodiments, determining whether the user's geographical location provides access to the first content item comprises querying a server or looking up a table or list to determine what geographies are enabled. In some embodiments, the geography list can be a white list (e.g., of enabled geographies) or a black list (of disabled geographies). In some embodiments, access can be based on the content provider (e.g., a particular content provider has access in one geography but not another) or based on the content item (e.g., a particular content item has access in one geography but another) or any combination of the two or other factors.

The above-described manner of restricting playback of content based on geographic location (e.g., by displaying content when the geographical criteria are satisfied and not displaying content when the geographical criteria are not satisfied) allows the electronic device to control playback of content (e.g., by determining the geographic location of the electronic device and determine whether the content can be played in that geographic location), which simplifies the interaction between the user and the electronic device and enhances the operability of the electronic device and makes the user-device interface more efficient (e.g., by automatically determining whether the geographic location supports playback of the content item and automatically restricting playback if the geographic location does not support playback without requiring the user to navigate to a separate interface or perform separate research to determine whether the user can access content while at the particular geographic location), which additionally reduces power usage and improves battery life of the electronic device by enabling the user to use the electronic device more quickly and efficiency, while reducing errors in usage.

In some embodiments, the plurality of representations includes a second representation of a second content item, when the current location of the electronic device is a first location, the current location of the electronic device satisfies the one or more geography criteria associated with the first content item and one or more geography criteria associated with the second content item, and when the current location of the electronic device is a second location, the current location of the electronic device satisfies the one or more geography criteria associated with the first content item but does not satisfy the one or more geography criteria associated with the second content item (1514), such as in FIG. 14I. In some embodiments, a second content item has its own geographical restrictions, even if the content item is provided by the same content provider or playback occurs in the same application. In some embodiments, because both content items satisfy the geographical requirements when the electronic device is in the first geographical location, both content items are selectable to cause playback of the respective content item. In some embodiments, the second location can satisfy the second content item's geographical restrictions but does not satisfy the first content item's geographical restrictions. For example, while the device is at the second geographical location, selection of the first content item will not cause playback of the first content item, but selection of the second content item will cause playback. In some embodiments, the unified media browsing application displays all items to which the user is entitled to view, even when the device's geographical location prevents playback of all of the content items. In some embodiments, the unified media browsing application determines what content items cannot be accessed based on the geographical restrictions and does not list those content items in the unified media browsing application.

The above-described manner of displaying content (e.g., by displaying multiple content items regardless of whether all the content items satisfy the geographical restrictions) allows the electronic device to provide the user with a consistent browsing experience (e.g., by maintaining display of all accessible content (but for the geographical restrictions), even if some items cannot be displayed at the electronic device's geographic location), which simplifies the interaction between the user and the electronic device and enhances the operability of the electronic device and makes the user-device interface more efficient (e.g., by displaying to the user a consistent list of content suggested to or accessible by the user without requiring the user to navigate to a separate user interface to determine all content that is available, regardless of the geographical limitations), which additionally reduces power usage and improves battery life of the electronic device by enabling the user to use the electronic device more quickly and efficiency.

In some embodiments, before displaying the unified media browsing application, the electronic device receives (1516), via the one or more input devices, an input corresponding to a request to display the unified media browsing application, such as in FIG. 14A. In some embodiments, the input includes a user input on a home screen user interface or application launching user interface selecting the unified media browsing application corresponding to a request to launch the unified media browsing application. In some embodiments, in response to receiving the input corresponding to the request to display the unified media browsing application (1518): the electronic device displays (1520), on the display, the user interface of the unified media browsing application, such as in FIG. 14B (e.g., launching the unified media browsing application). In some embodiments, in accordance with a determination that the current location of the electronic device does not satisfy one or more geography criteria for at least one content item available in the unified media browsing application, the electronic device displays (1522), in the user interface, notification that one or more content items are not available for viewing at the current location of the electronic device, wherein the notification does not persist in the user interface as a user of the electronic device navigates through the unified media browsing application, such as in FIG. 14F. In some embodiments, the displaying includes displaying a dismiss-able popup or a notification notifying the user that not all content items are available for viewing at the user's current geographical location. In some embodiments, the user's geographical location is determined when the unified media browsing application is launched. In some embodiments, the user's geographical location is continuously determined while the electronic device is on (e.g., continuously or periodically polled). In some embodiments, the unified media browsing application determines whether all content is available in the geographical location upon the launch of the unified media browsing application (e.g., as the application is launching or immediately afterwards). In some embodiments, the user is prevented from browsing or otherwise interacting with the unified media browsing application until the user dismisses or otherwise acknowledges the notification. In some embodiments, if the geographical location of the electronic device changes while the unified media browsing application is launched and the notification is displayed, and the unified media browsing application determines that all content items are now available to be viewed, the notification is automatically dismissed and/or the notification is updated or replaced with another notification indicating that the geography has changed and/or that all content items are now available to be viewed. In some embodiments, in accordance with a determination that the current location of the electronic device satisfies one or more geography criteria for all of the content items available in the unified media browsing application, the electronic device forgoes (1524) displaying the notification, such as in FIG. 14B. In some embodiments, if all content items are available to be viewed in a particular geography, even if the geography is not necessarily the user's "home" geography (e.g., the geography in which the user originally set up the device or spends the most time), then the electronic device does not display the notification. In some embodiments, if the user has access to all content items and the user is not at the user's "home" geography, display a notification indicating that the user is now at a different geography, but that all content items are still available for viewing.

The above-described manner of notifying the user of geographical restrictions (e.g., by displaying a notification upon launch of the unified media browsing application) allows the electronic device to provide the user with information about geographical viewing restrictions (e.g., by requiring the user to acknowledge the geographical restrictions before browsing from the library of content), which simplifies the interaction between the user and the electronic device and enhances the operability of the electronic device and makes the user-device interface more efficient (e.g., by automatically determining whether the user has access to all content at the geographical location and automatically informing the user of the geographical playback restrictions without requiring the user to perform separate research to determine whether the user can playback content at the current geography), which additionally reduces power usage and improves battery life of the electronic device by enabling the user to use the electronic device more quickly and efficiency.

In some embodiments, displaying the user interface of the unified media browsing application includes (1526): in accordance with a determination that the current location of the electronic device does not satisfy one or more geography criteria for at least one content item available in the unified media browsing application, displaying, in the user interface, a visual indication that one or more content items are not available for viewing at the current location of the electronic device, wherein the visual indication persists in the user interface as a user of the electronic device navigates through the unified media browsing application (1528), such as in FIG. 14F-14H (e.g., displaying a banner that is not dismiss-able notifying the user that not all content items are available for viewing at the user's current geographical location). In some embodiments, the banner is displayed at the top of the user interface (e.g., at the very top of the page). In some embodiments, the banner persists even when the user scrolls downwards (e.g., the banner is pinned to the top of the display). In some embodiments, if the geographical location of the electronic device changes while the unified media browsing application is launched and the banner is displayed, and the unified media browsing application determines that all content items are now available to be viewed, the banner is automatically dismissed and/or the banner is updated or replaced with another banner indicating that the geography has changed and/or that all content items are now available to be viewed. In some embodiments, displaying the user interface of the unified media browsing application includes: in accordance with a determination that the current location of the electronic device satisfies one or more geography criteria for all of the content items available in the unified media browsing application, forgoing displaying the visual indication that one or more content items are not available for viewing at the current location of the electronic device (1530), such as in FIG. 14B. In some embodiments, if all content items are available to be viewed in a particular geography, even if the geography is not necessarily the user's "home" geography (e.g., the geography in which the user originally set up the device or spends the most time), then the electronic device does not display the banner. In some embodiments, if the user has access to all content items and the user is not at the user's "home" geography, display a banner indicating that the user is now at a different geography, but that all content items are still available for viewing.

The above-described manner of notifying the user of geographical restrictions (e.g., by displaying a persistent banner in the unified media browsing application notifying the user of the geographic restrictions) allows the electronic device to provide the user with information about geographical viewing restrictions (e.g., by maintaining display of the banner so the user is continuously notified of the geographic restrictions), which simplifies the interaction between the user and the electronic device and enhances the operability of the electronic device and makes the user-device interface more efficient (e.g., by maintaining display of the banner as long as there are geographical restrictions on the content without requiring the user to perform separate research to determine whether the user can playback content at the current geography), which additionally reduces power usage and improves battery life of the electronic device by enabling the user to use the electronic device more quickly and efficiency.

In some embodiments, a user of the electronic device is entitled to access the plurality of content items from the unified media browsing application (1532), such as in FIG. 14C. In some embodiments, the user is entitled to all or a subset of all of the content items displayed in the unified media browsing application. For example, the user has a subscription to the appropriate content providers and can otherwise access the content items (e.g., if not for the geographical restrictions of the content items and/or content providers).). The above-described manner of restricting content playback (e.g., by displaying content that the user otherwise is entitled to access even when the geographical restrictions prevent playback of the content) allows the electronic device to provide the user with a full browsing experience (e.g., by displaying all content that the user is entitled to view regardless of the geographical limitations), which simplifies the interaction between the user and the electronic device and enhances the operability of the electronic device and makes the user-device interface more efficient (e.g., by displaying all entitled content without requiring the user to perform separate research to determine what content the user is entitled to view), which additionally reduces power usage and improves battery life of the electronic device by enabling the user to use the electronic device more quickly and efficiency.

In some embodiments, the electronic device determines (1534) that a user of the electronic device will be traveling to a location that will not satisfy one or more geography criteria for a first set of content items in the unified media browsing application, such as in FIG. 14K. In some embodiments, based on the user's calendar events and/or emails, a digital personal assistant and/or the electronic device determines that the user will be travelling to another geographical location. In some embodiments, the digital personal assistant and/or the electronic device can determine, before the user has travelled to the geographical location, the user's future travel and whether the user will have access to all of the content items at the anticipated geographical location. In other words, at a current time (e.g., before the user has travelled), the electronic device determines that the user will be travelling at a second time (e.g., after the current time), and display, at the current time, the notification or suggestion to download content before the second time. In some embodiments, in response to determining that the user of the electronic device will be traveling to the location that will not satisfy one or more geography criteria for the first set of content items, the electronic device displays (1536), on the display, a visual indication that indicates that the first set of content items can be downloaded to the electronic device, and this is selectable to initiate one or more processes to download the first set of content items to the electronic device, such as in FIG. 14K. In some embodiments, the geography criteria are satisfied in the current location but will not be satisfied at the future location. In some embodiments, the displaying includes displaying a suggestion (e.g., notification) that the user acquire content before travelling to the future location. For example, if the user has previously purchased content but has not yet downloaded the content onto the electronic device, the digital personal assistant can suggest to the user to download the content before travelling to the second location. In some embodiments, the purchased content is unavailable to be downloaded at the future location (e.g., because the content provider is not available at the future location). In some embodiments, selection of the notification causes display of a user interface to download content. In some embodiments, the user interface to download content only displays content that is currently accessible but will not be accessible at the future location (e.g., does not display content that will continue to be accessible at the future location). In some embodiments, selection of the notification automatically begins download of all available and/or purchased content (e.g., that has not already been downloaded) that will be unavailable at the future location.

The above-described manner of suggesting download of content (e.g., by determining that the user will be traveling to a location that has geographic restriction and suggesting to the user to acquire content before the travel) allows the electronic device to provide the user with the ability to view content (e.g., by suggesting to the user to download or otherwise acquire content before geographic restrictions prevent the user from downloading or acquiring the content), which simplifies the interaction between the user and the electronic device and enhances the operability of the electronic device and makes the user-device interface more efficient (e.g., by automatically suggesting to the user to download content without requiring the user to remember to download content before the anticipated travel), which additionally reduces power usage and improves battery life of the electronic device by enabling the user to use the electronic device more quickly and efficiency.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700, 1900, 2100, 2300) are also applicable in an analogous manner to method 1500 described above with respect to FIGS. 15A-15C. For example, the operation of the electronic device to restricting access to content based on the geographic location of the device described with reference to method 1500 optionally has one or more of the characteristics of the presentation of content in the unified media browsing application, presentation of information on representations of content items, displaying of content in a unified media browsing application, linking of an account for a primary content provider, and presentation of playback menus during playback of content in a unified media browsing application, displaying user interfaces specific to a respective content item, displaying content items, etc., described herein with reference to other methods described herein (e.g., methods 700, 900, 1100, 1300, 1700, 1900, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 15A-15C are, optionally, implemented by components depicted in FIGS. 1A-1B. For example, displaying operations 1502, 1520, 1522, 1524, 1526, 1528, 1530, and 1536, receiving operations 1504, 1508, 1510, ad 1516 and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Playback Menus During Content Playback

Users interact with electronic devices in many different manners, including using an electronic device to browse and access content in a media browsing application. In some embodiments, an electronic device aggregates available content in a single unified media browsing application. In some embodiments, the available content is displayed as selectable representations of content items. In some embodiments, selection of the selectable representations causes playback of the selected content item in the unified media browsing application. The embodiments described below provide ways in which an electronic device displays playback menus during playback of content in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
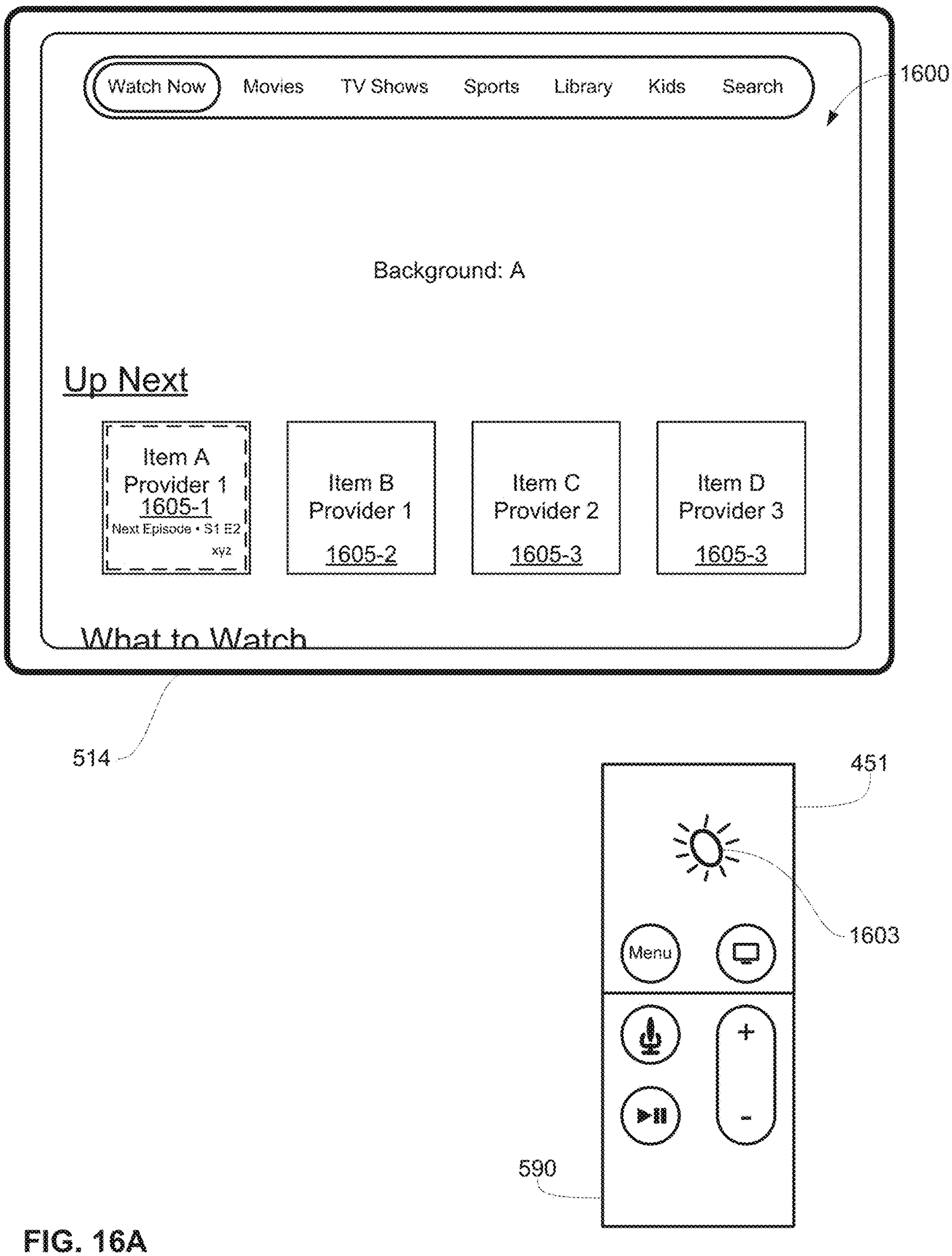
FIGS. 16A-16Y illustrate exemplary ways in which an electronic device presents playback menus during playback of content in a unified media browsing application in accordance with some embodiments of the disclosure.
Figure 16B:
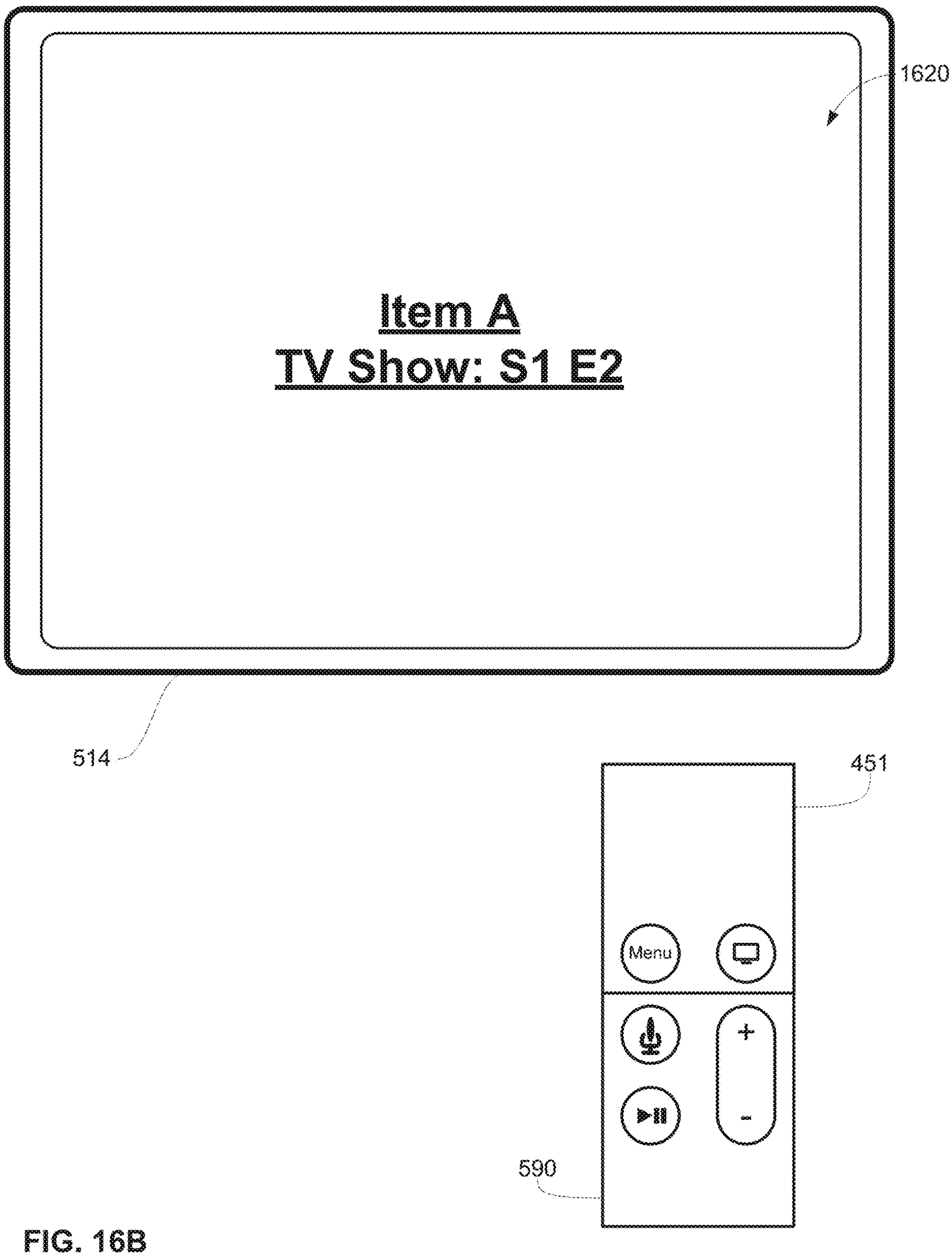
Figure 16C:
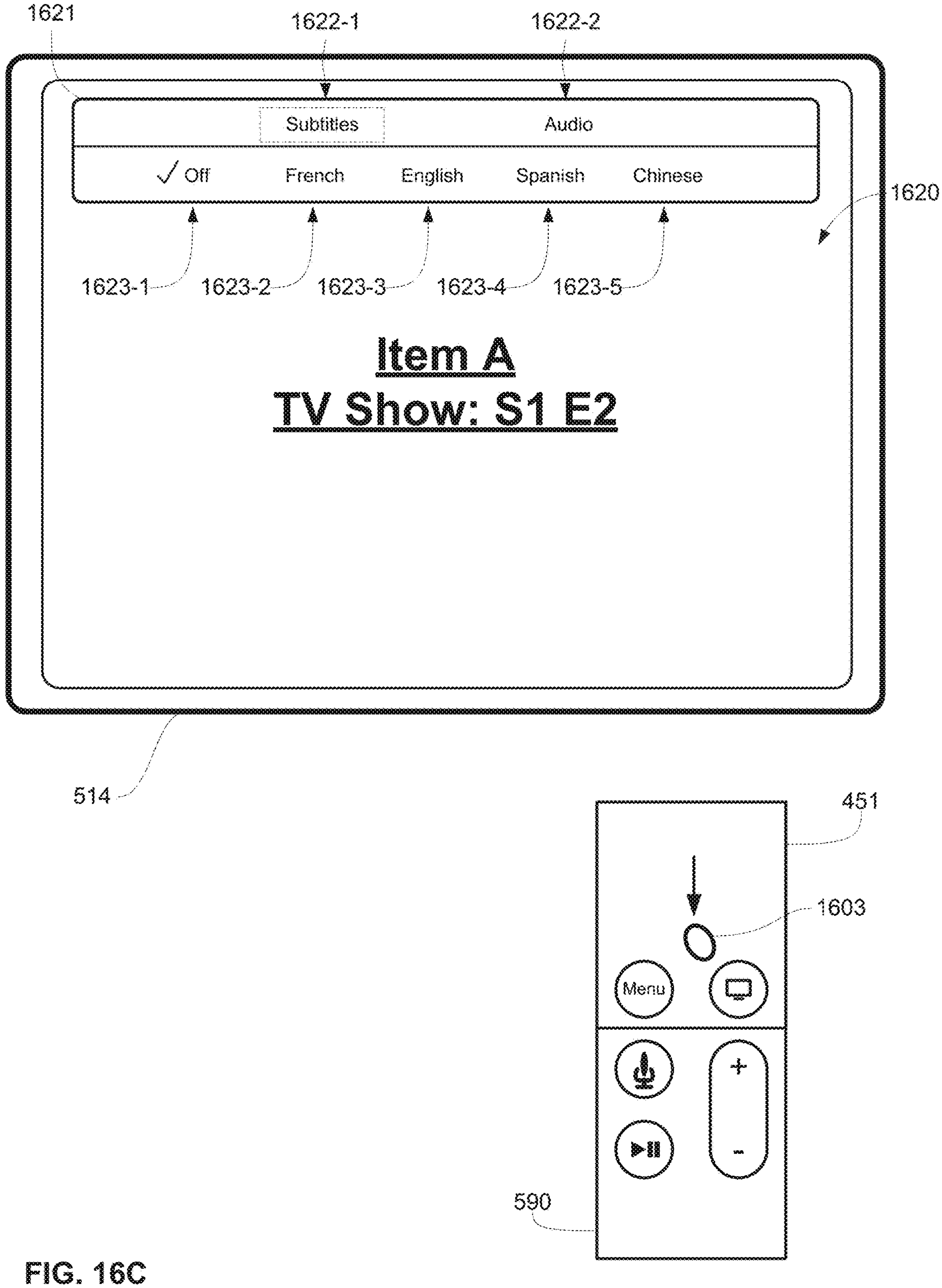
Figure 16D:
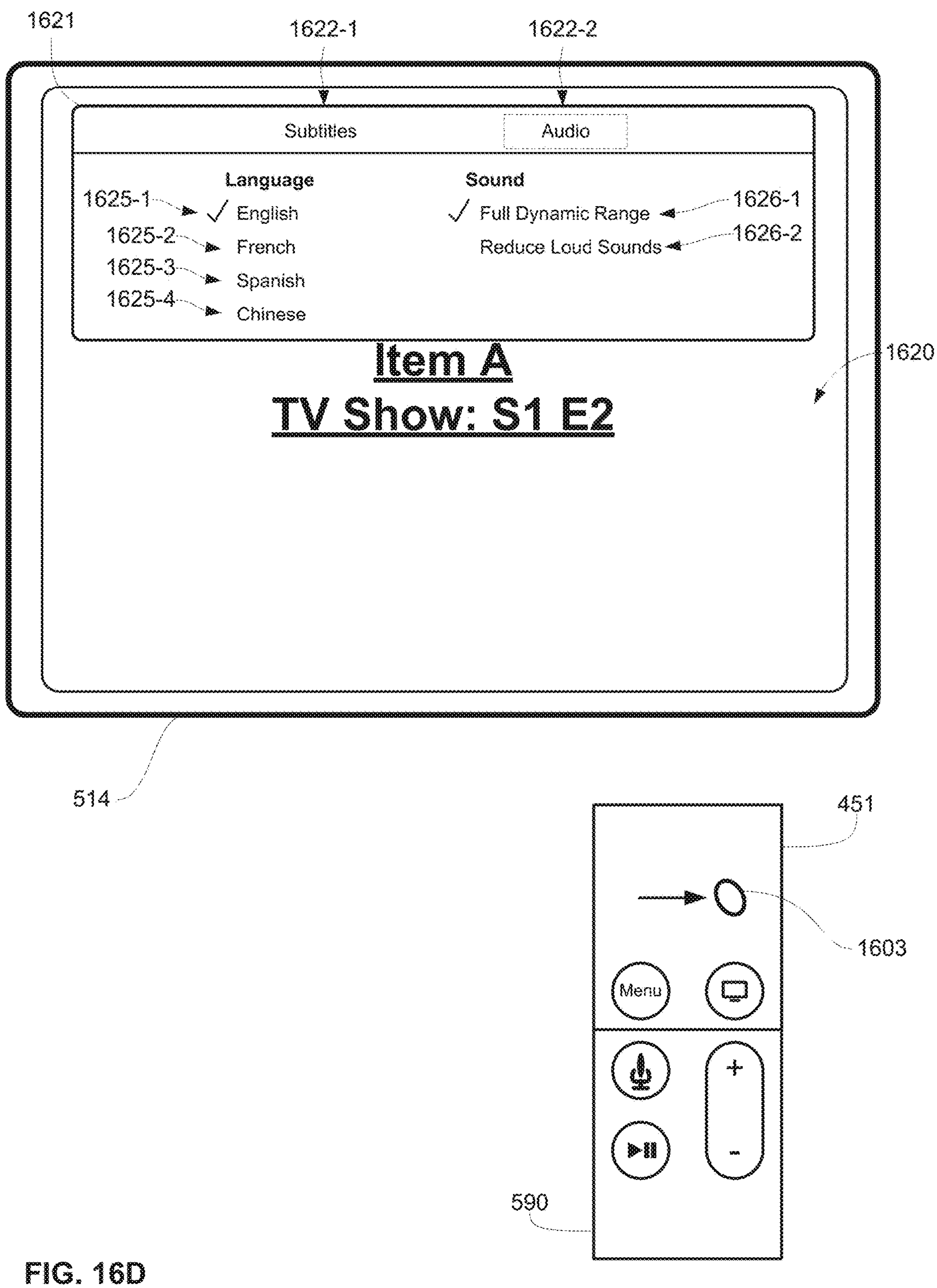
Figure 16E:
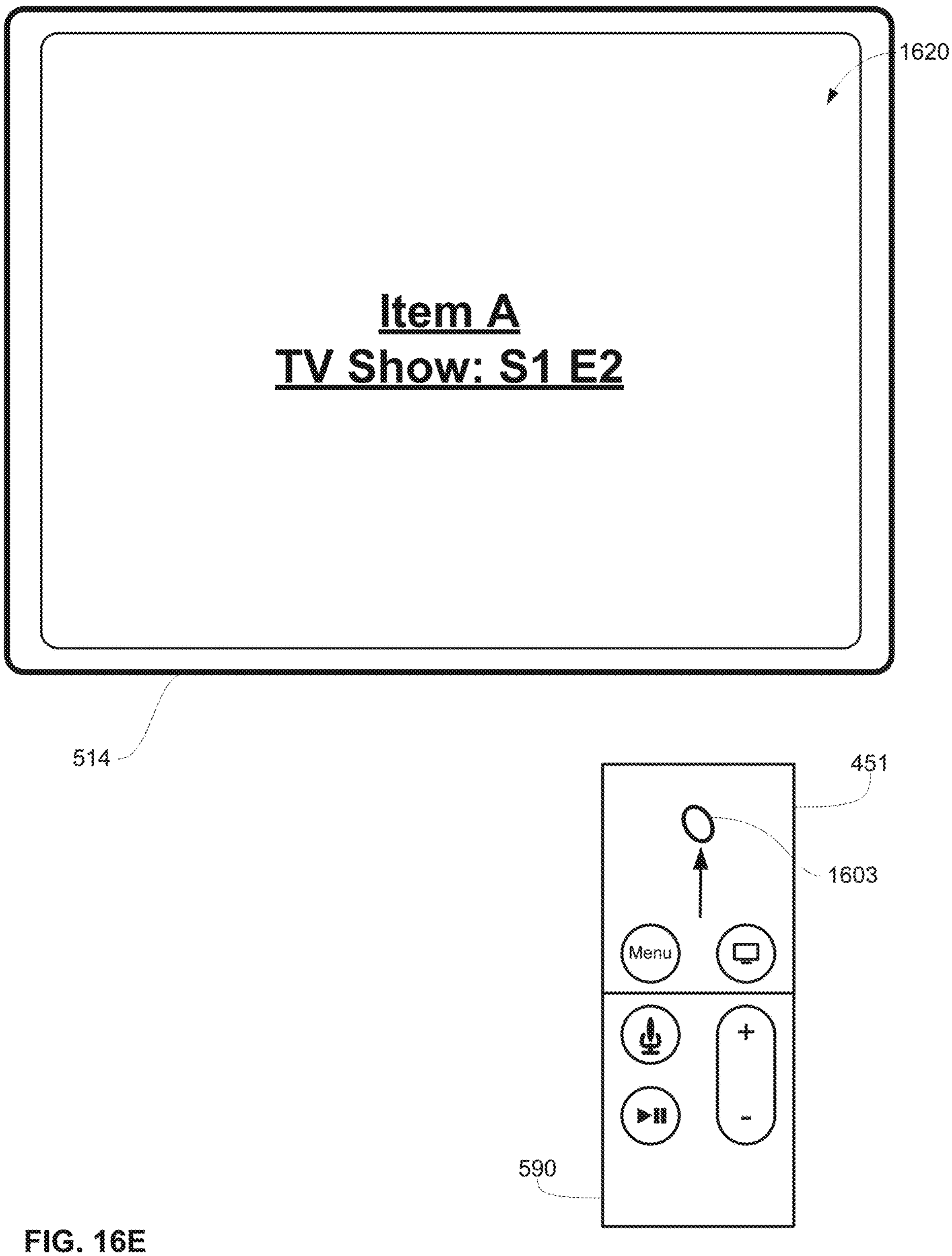
Figure 16F:
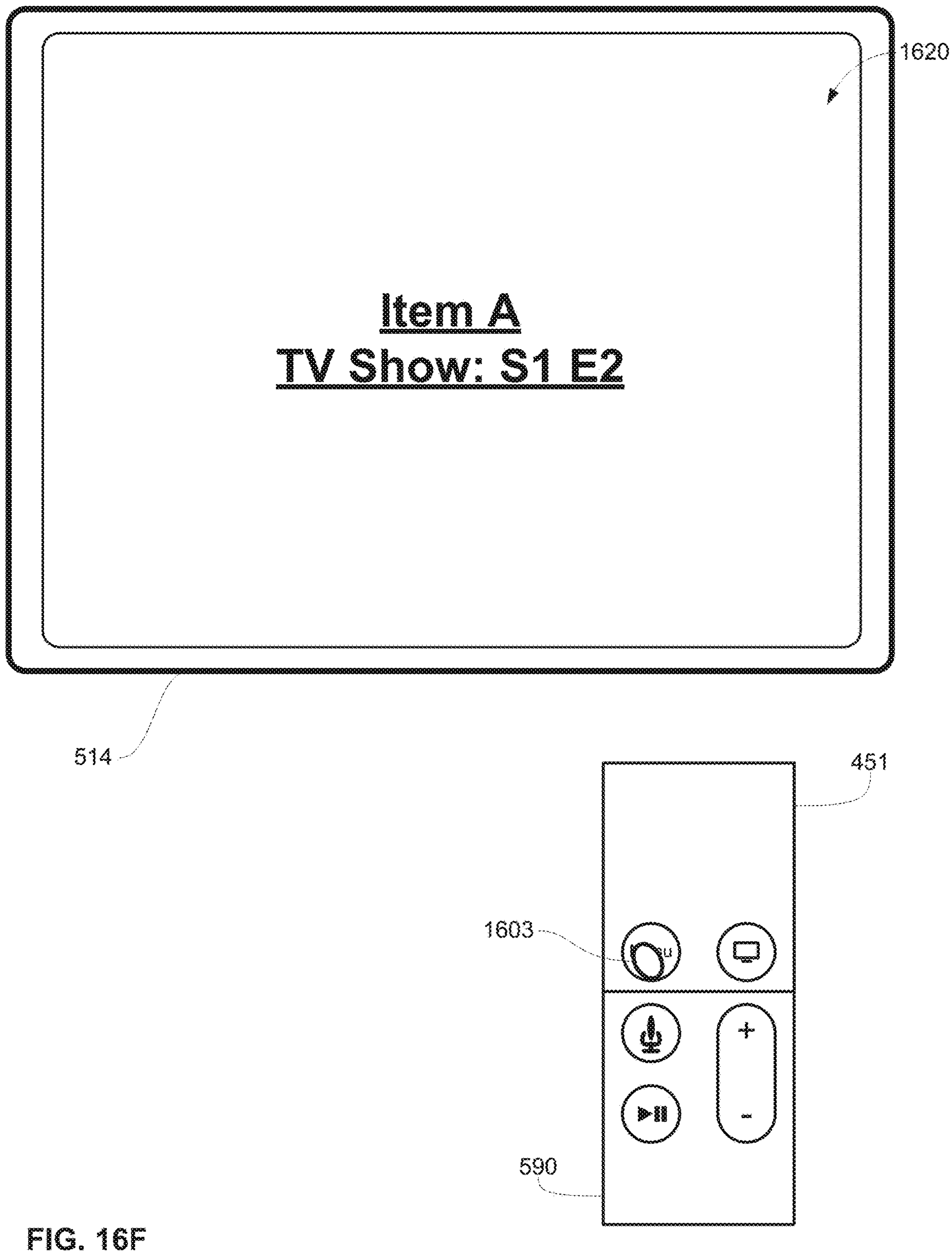
Figure 16G:
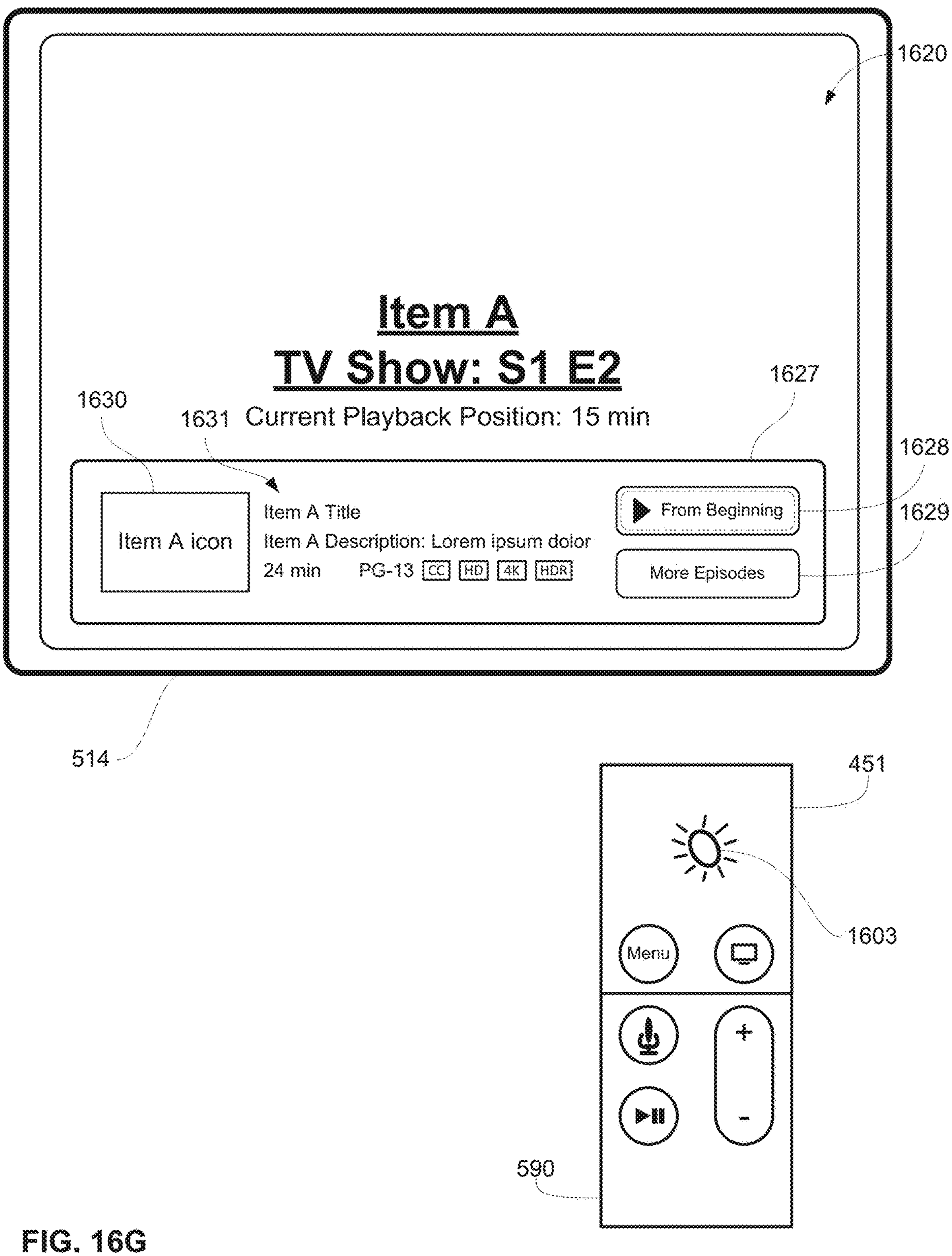
Figure 16H:
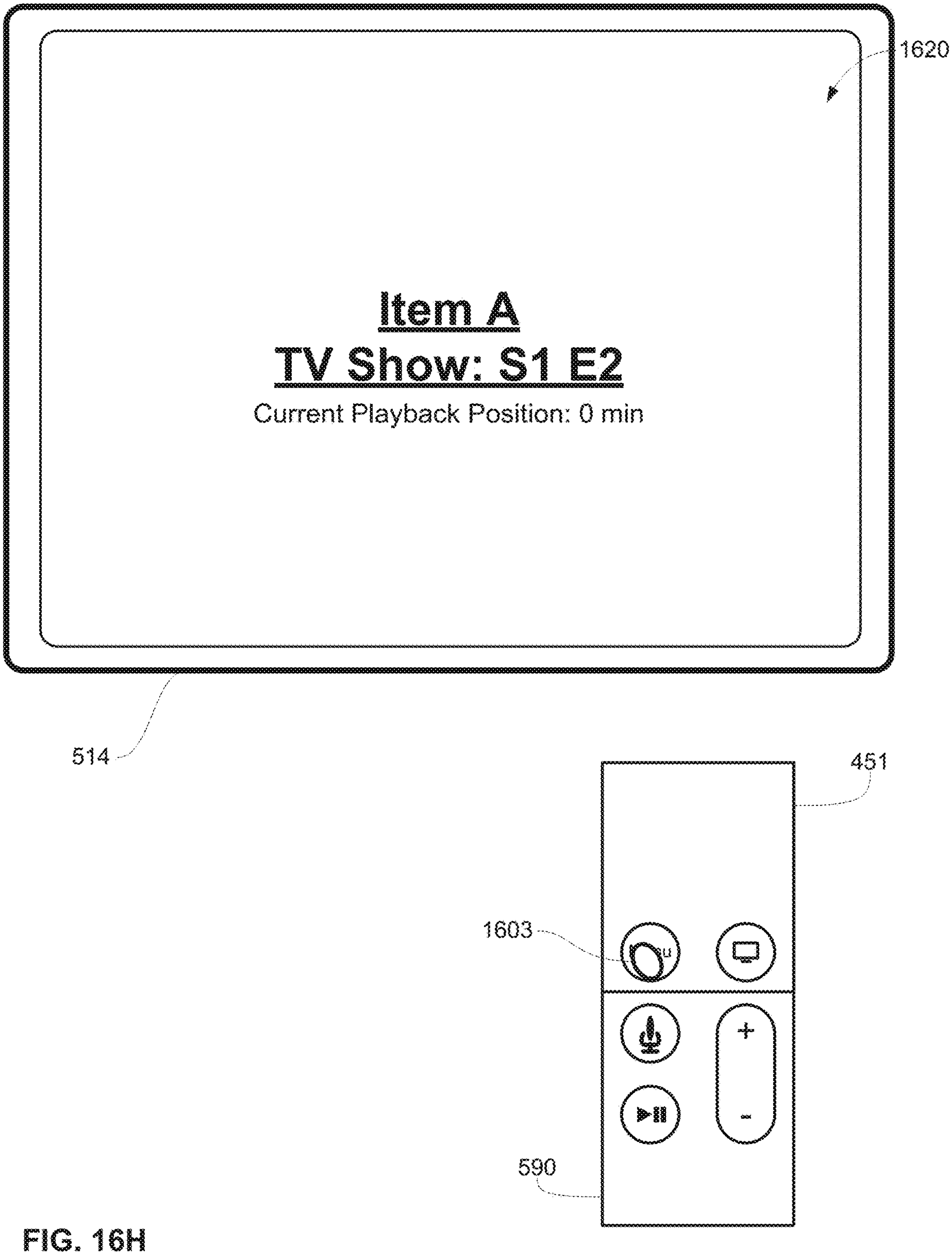
Figure 16I:
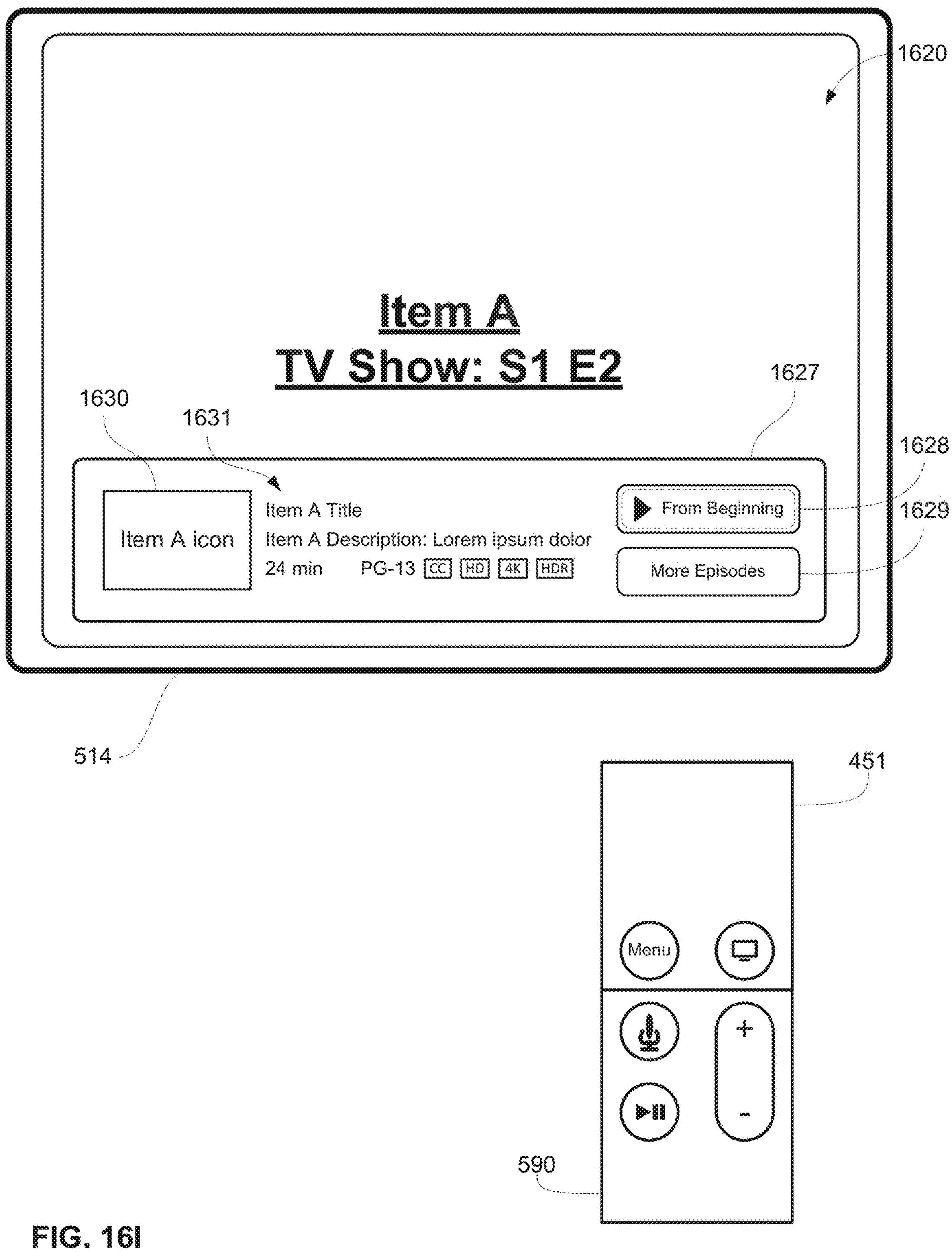
Figure 16J:
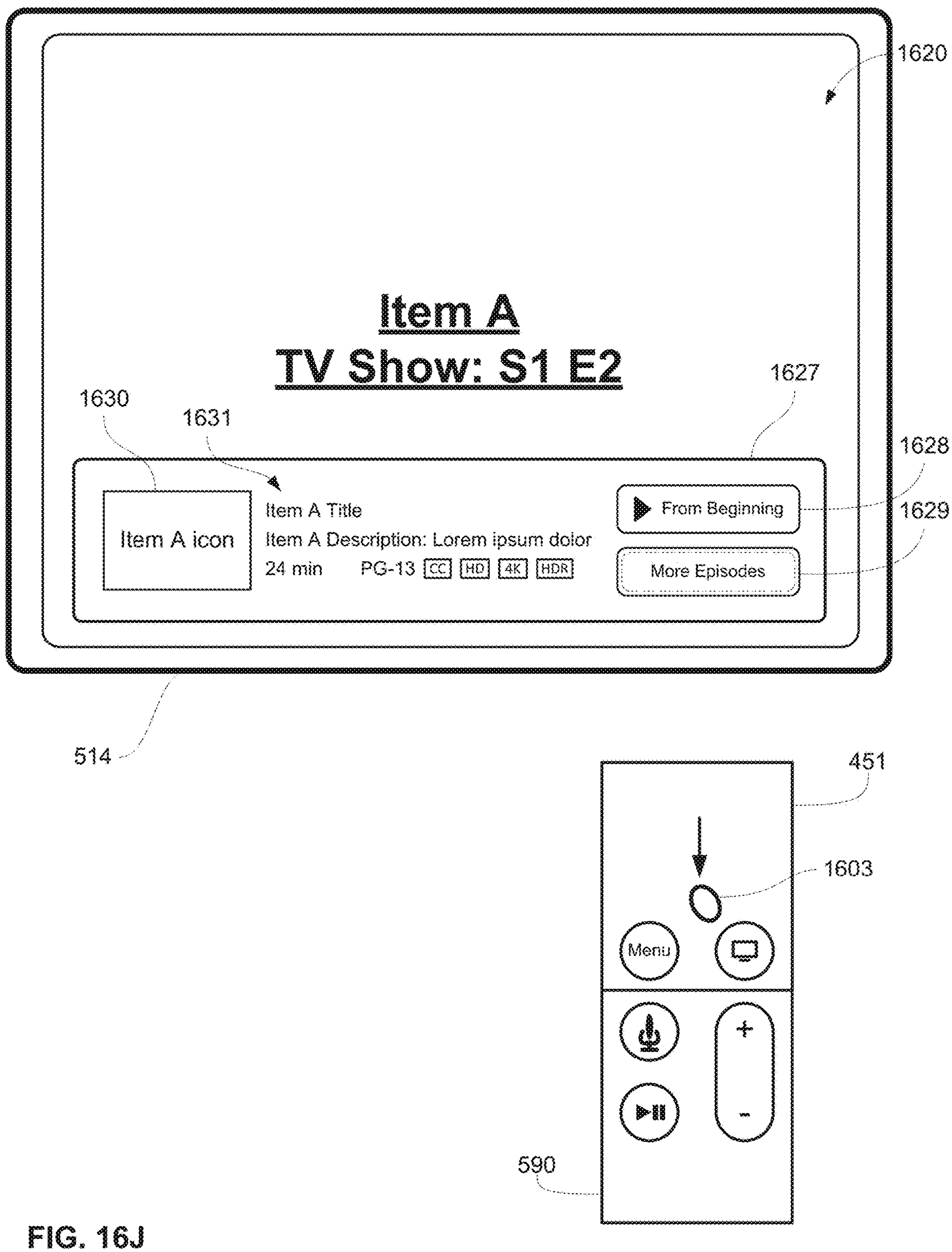
Figure 16K:
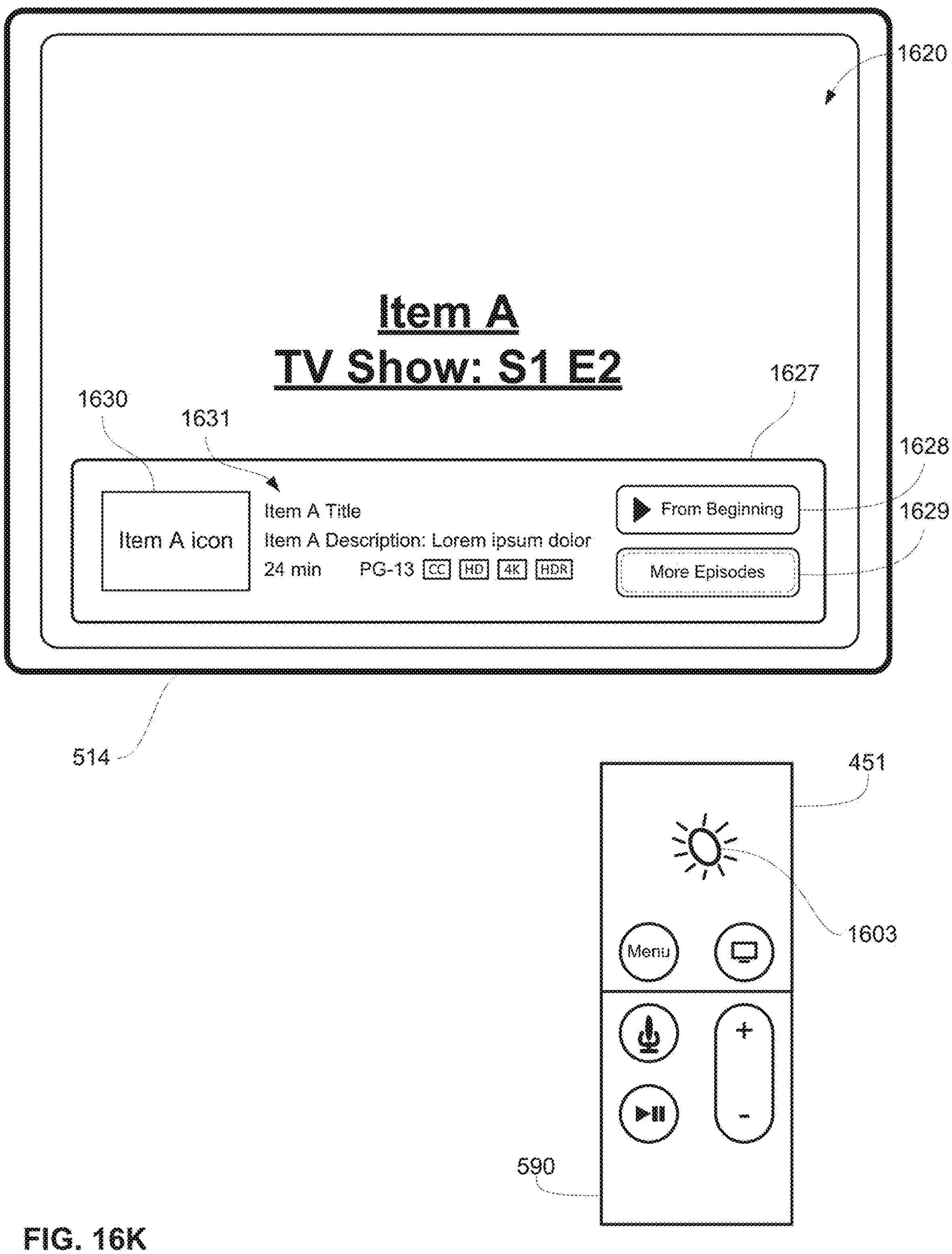
Figure 16L:
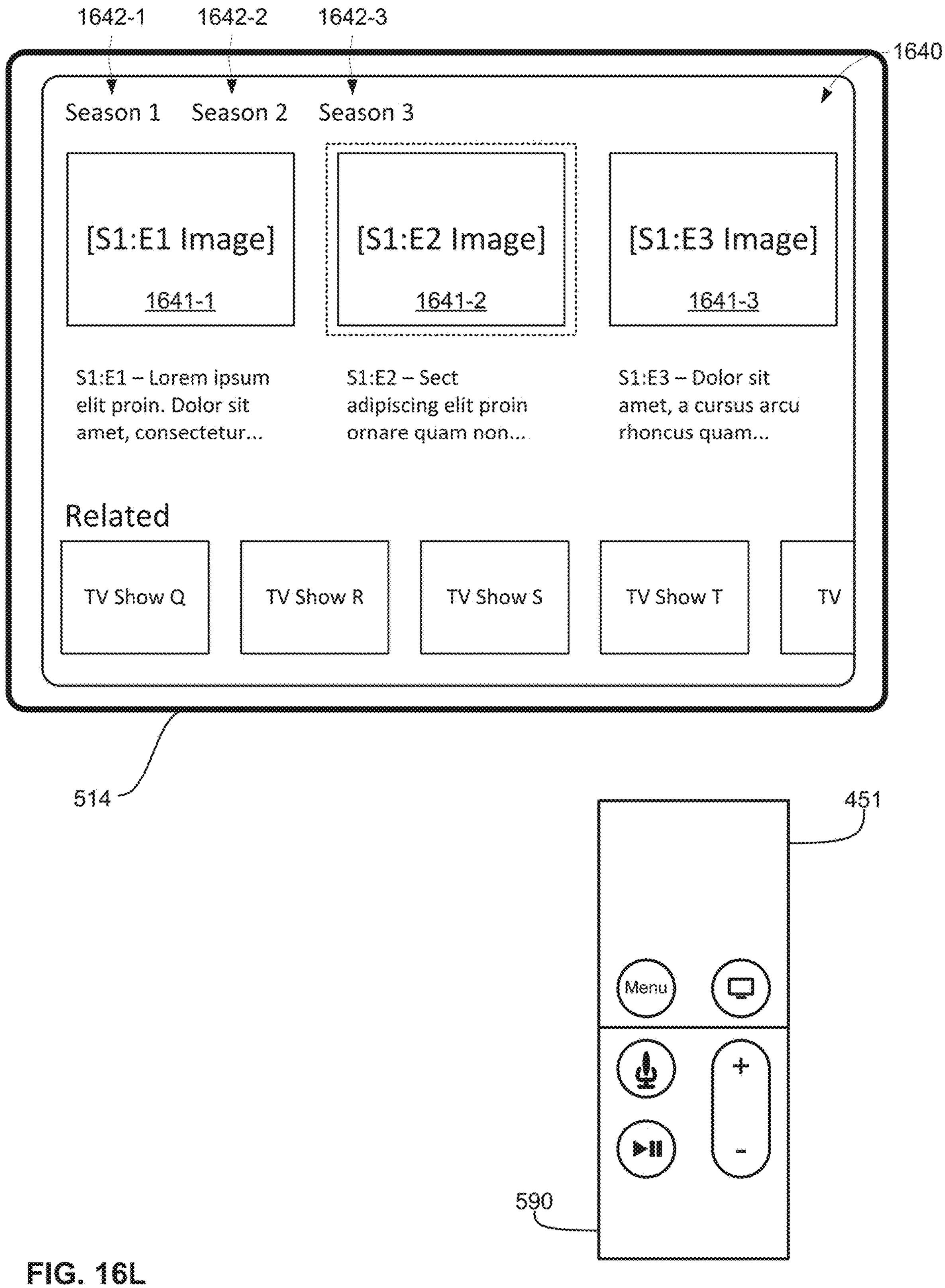
Figure 16M:
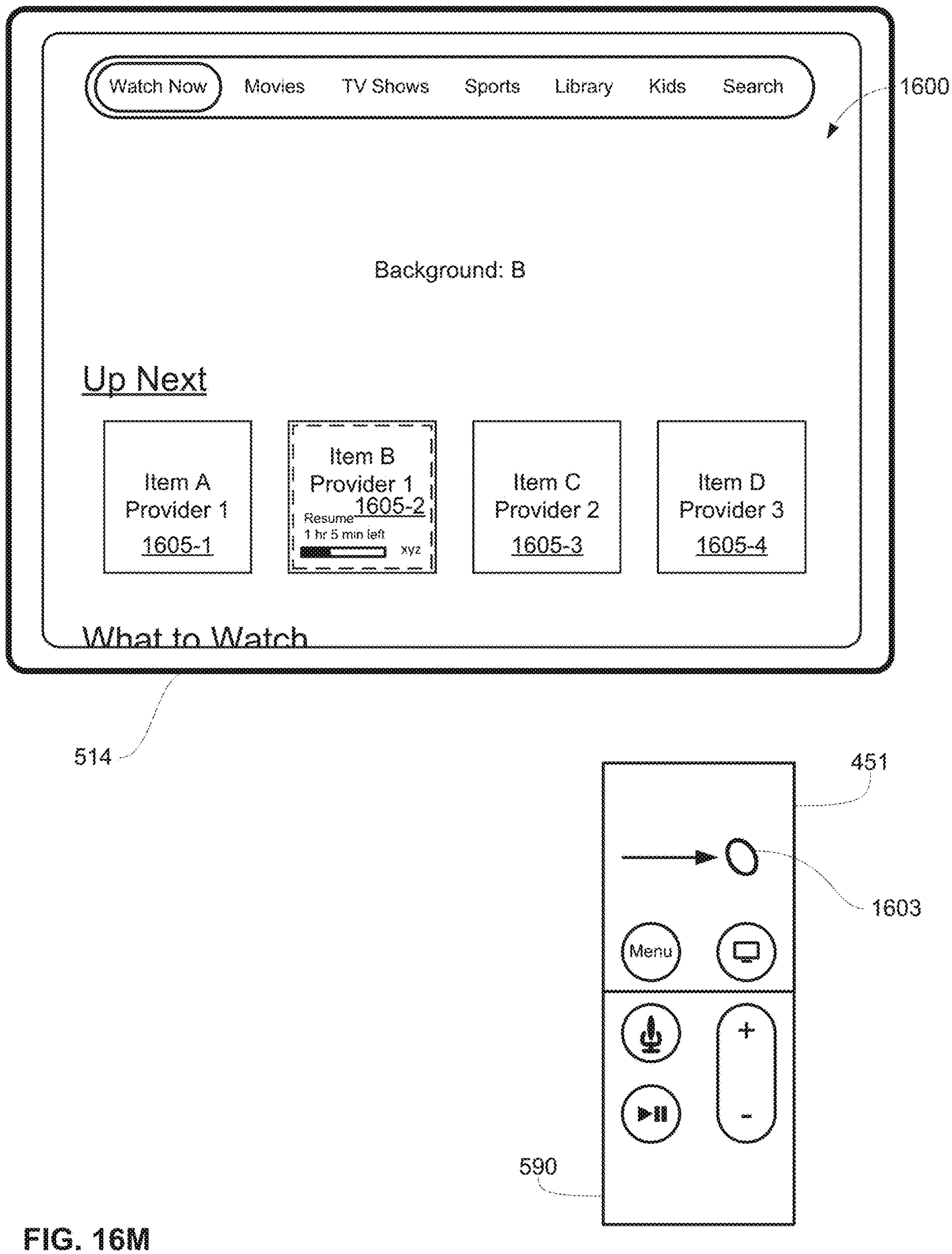
Figure 16N:
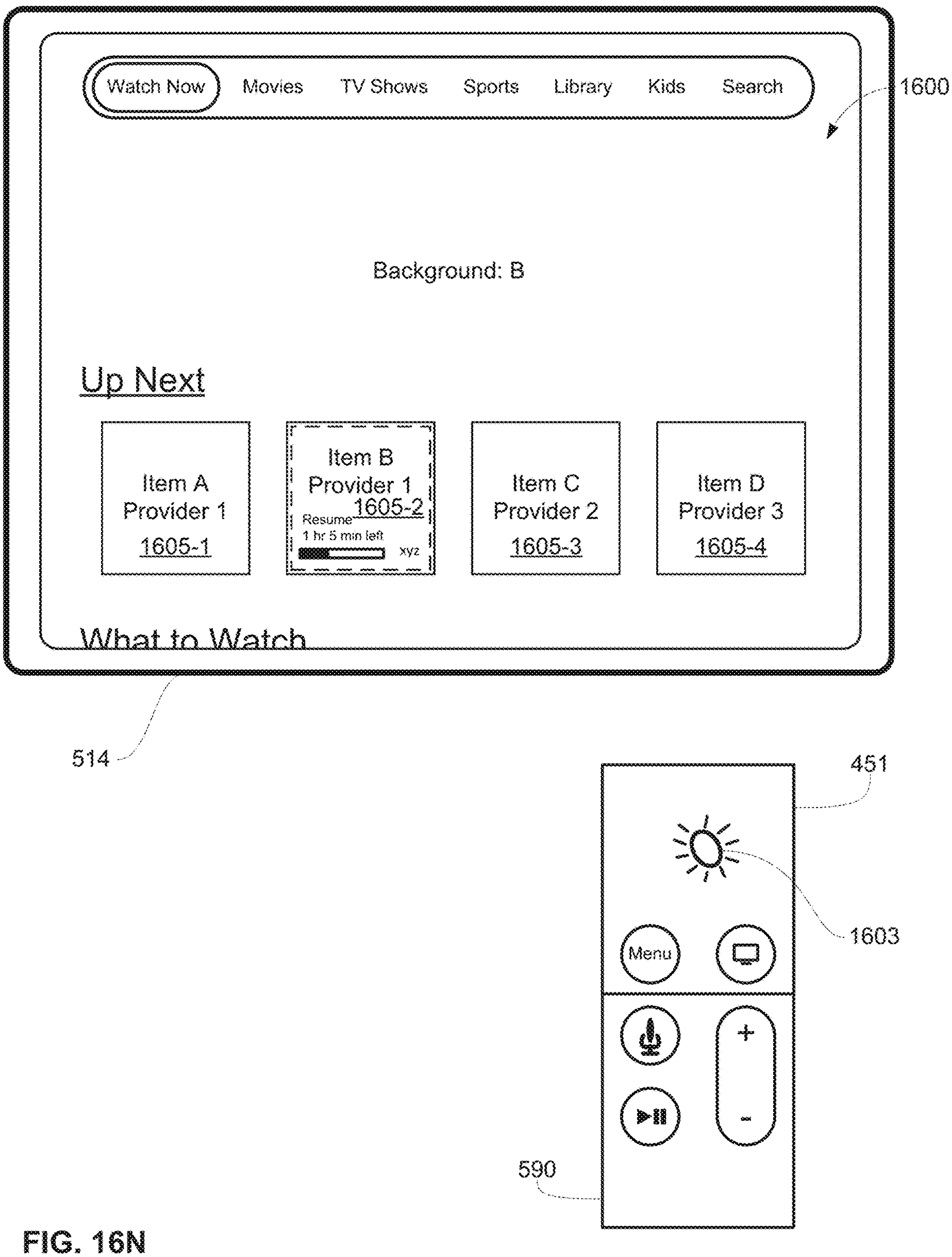
Figure 16O:
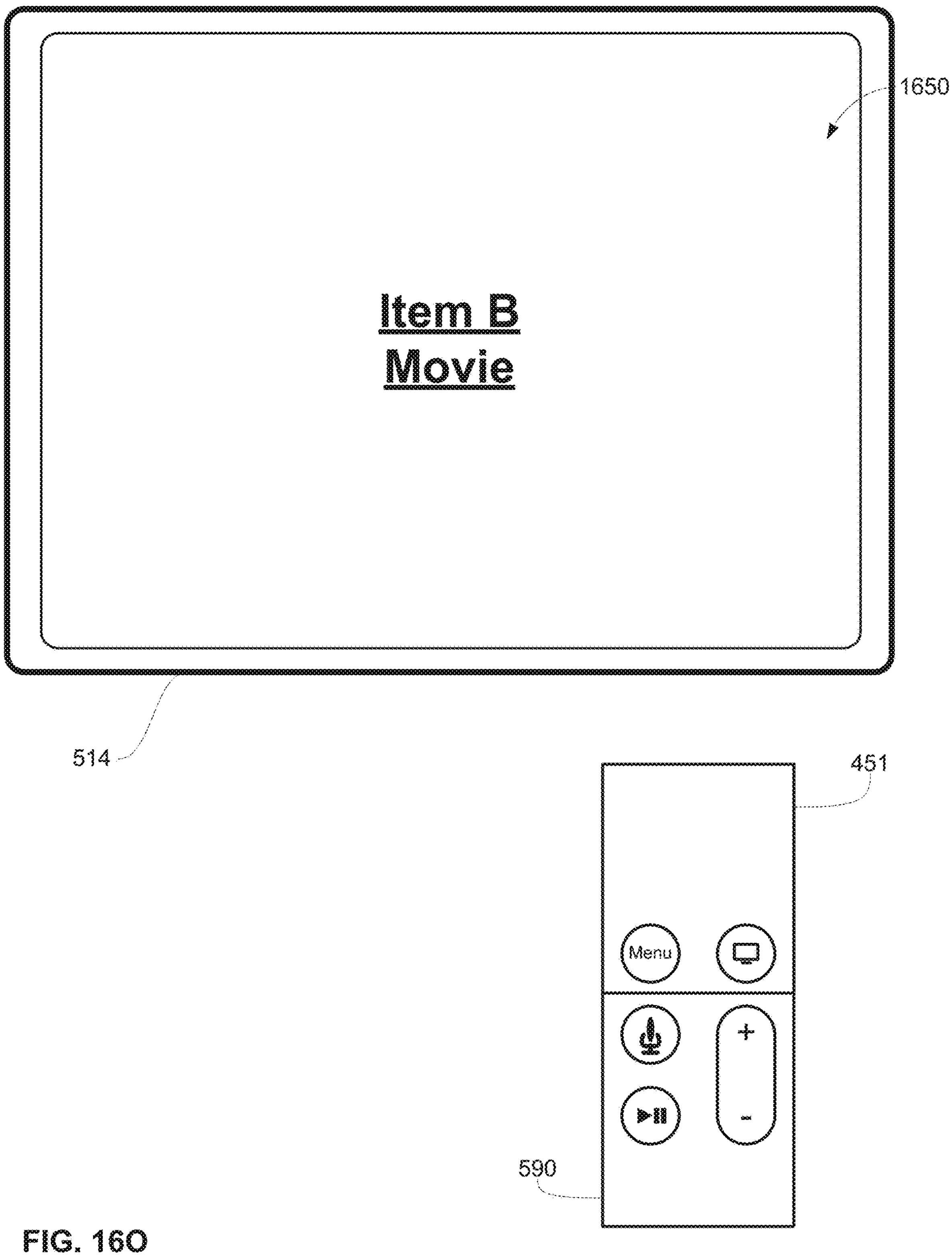
Figure 16P:
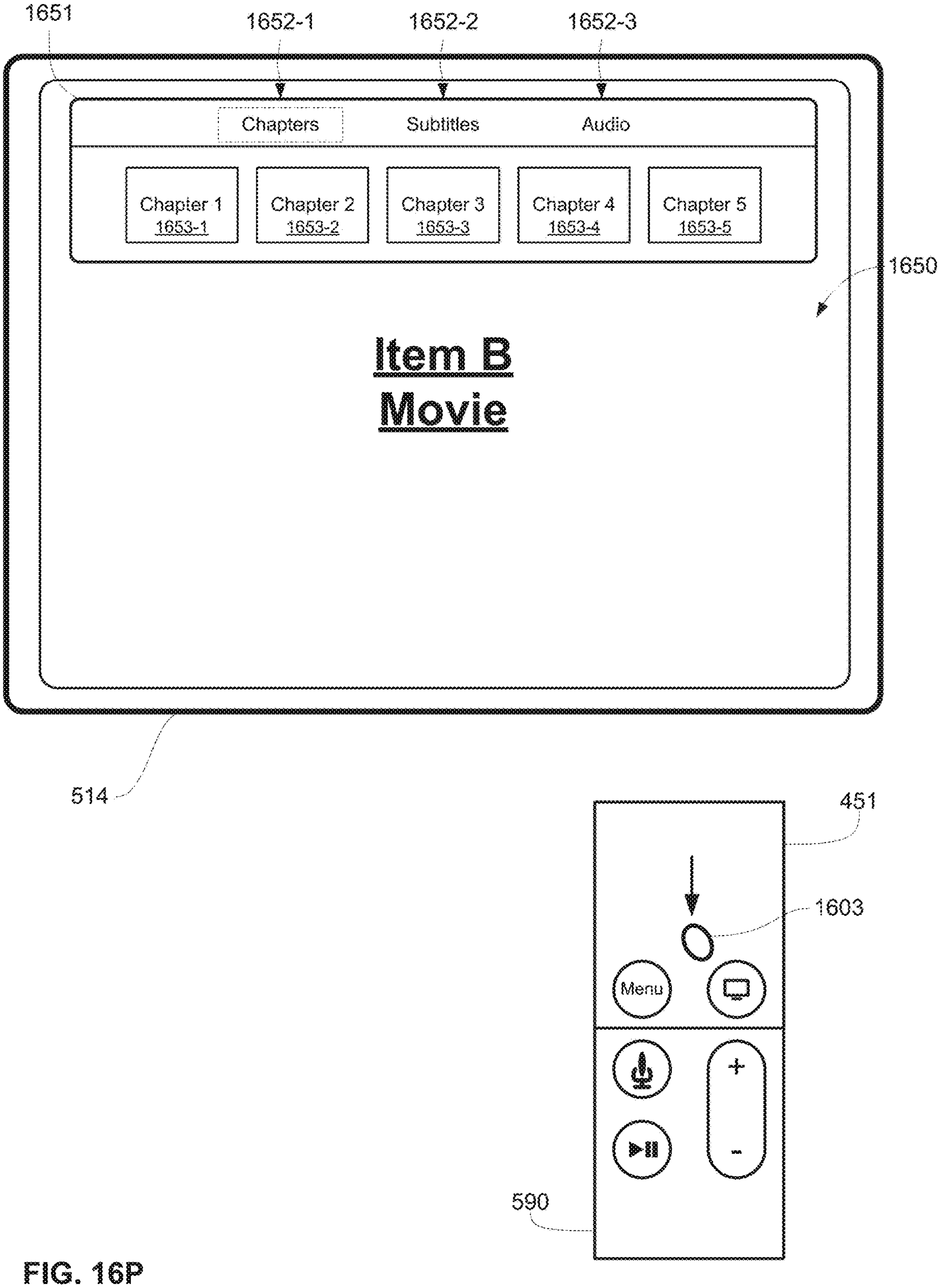
Figure 16Q:
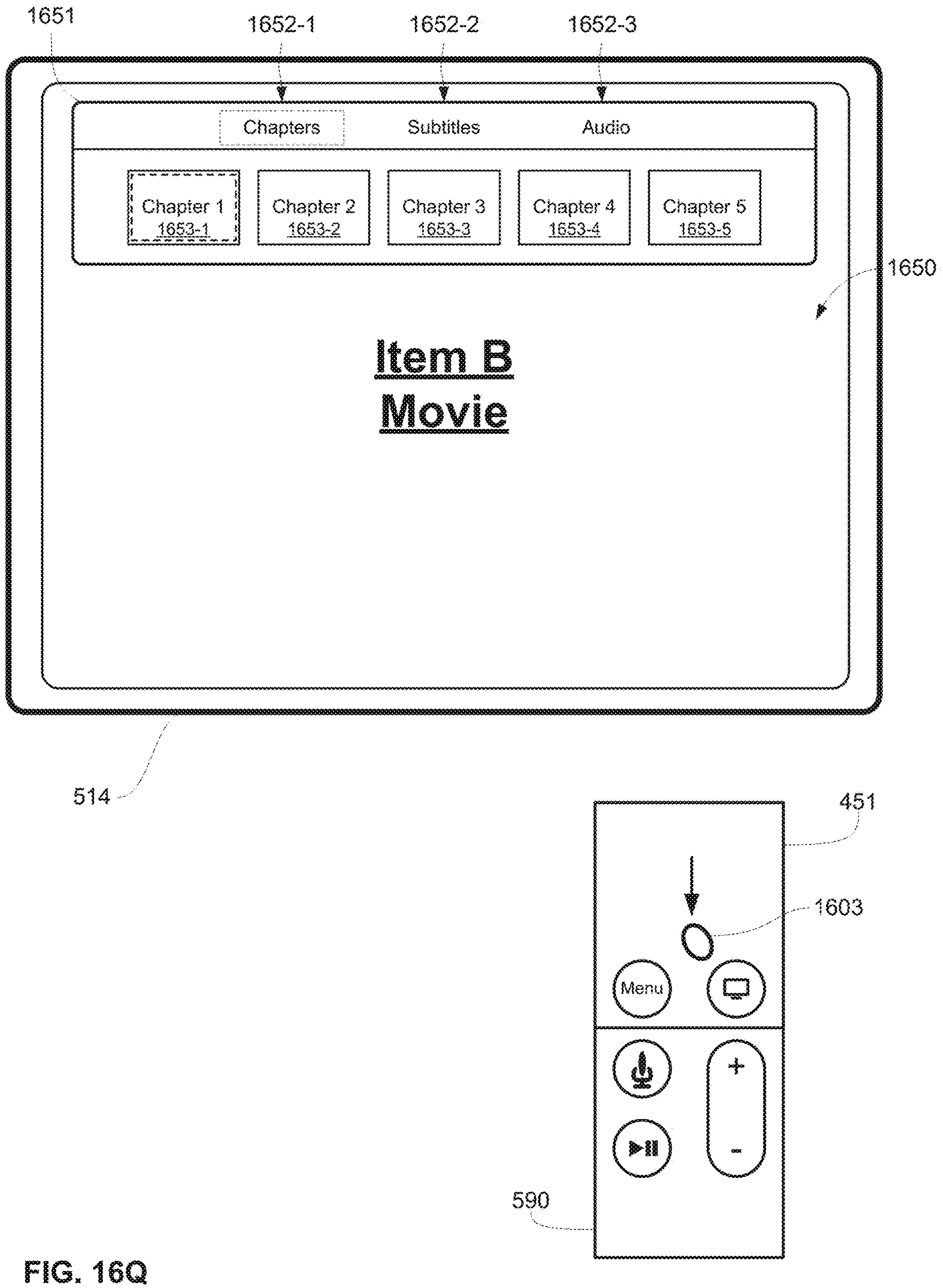
Figure 16R:
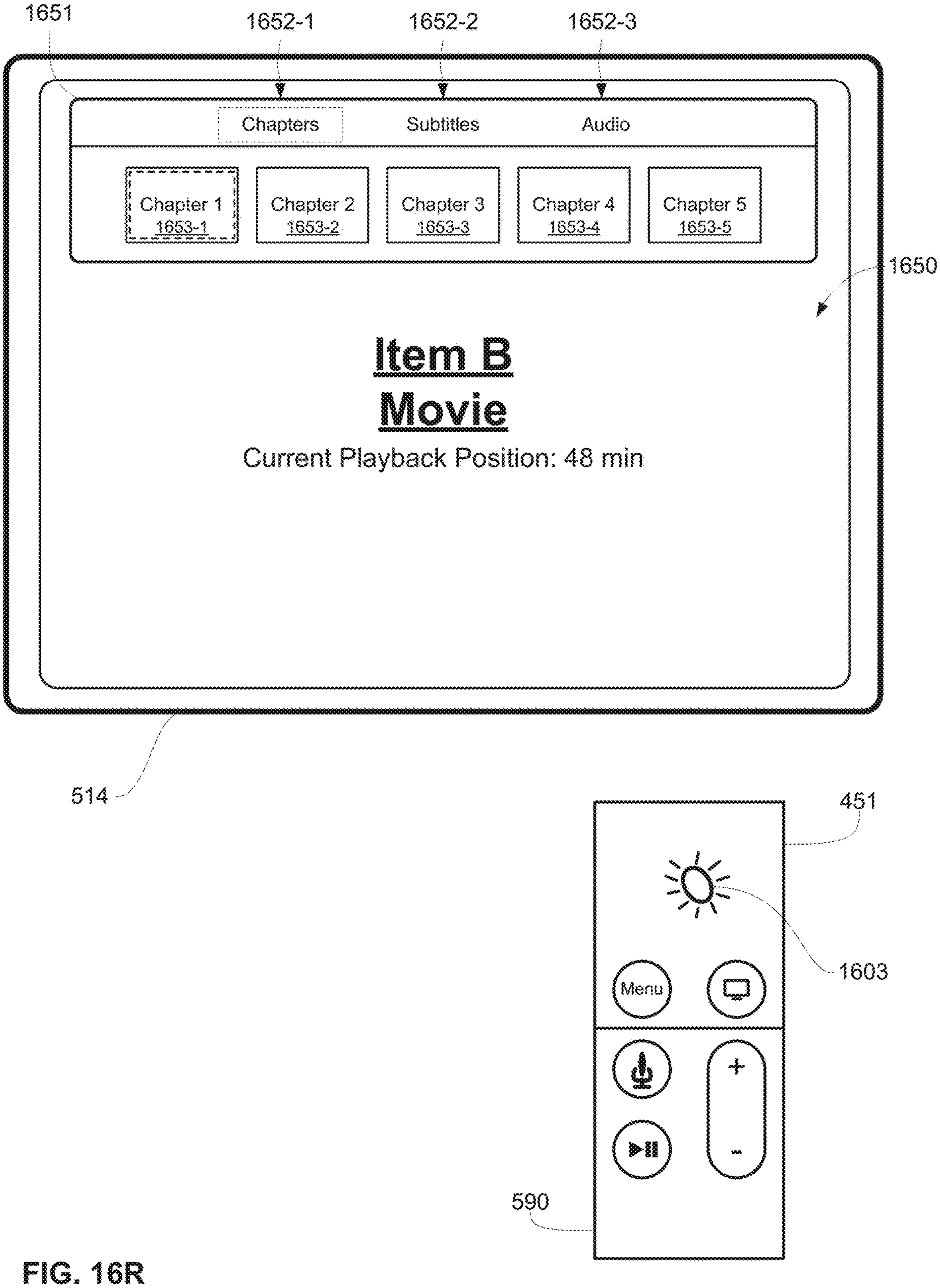
Figure 16S:
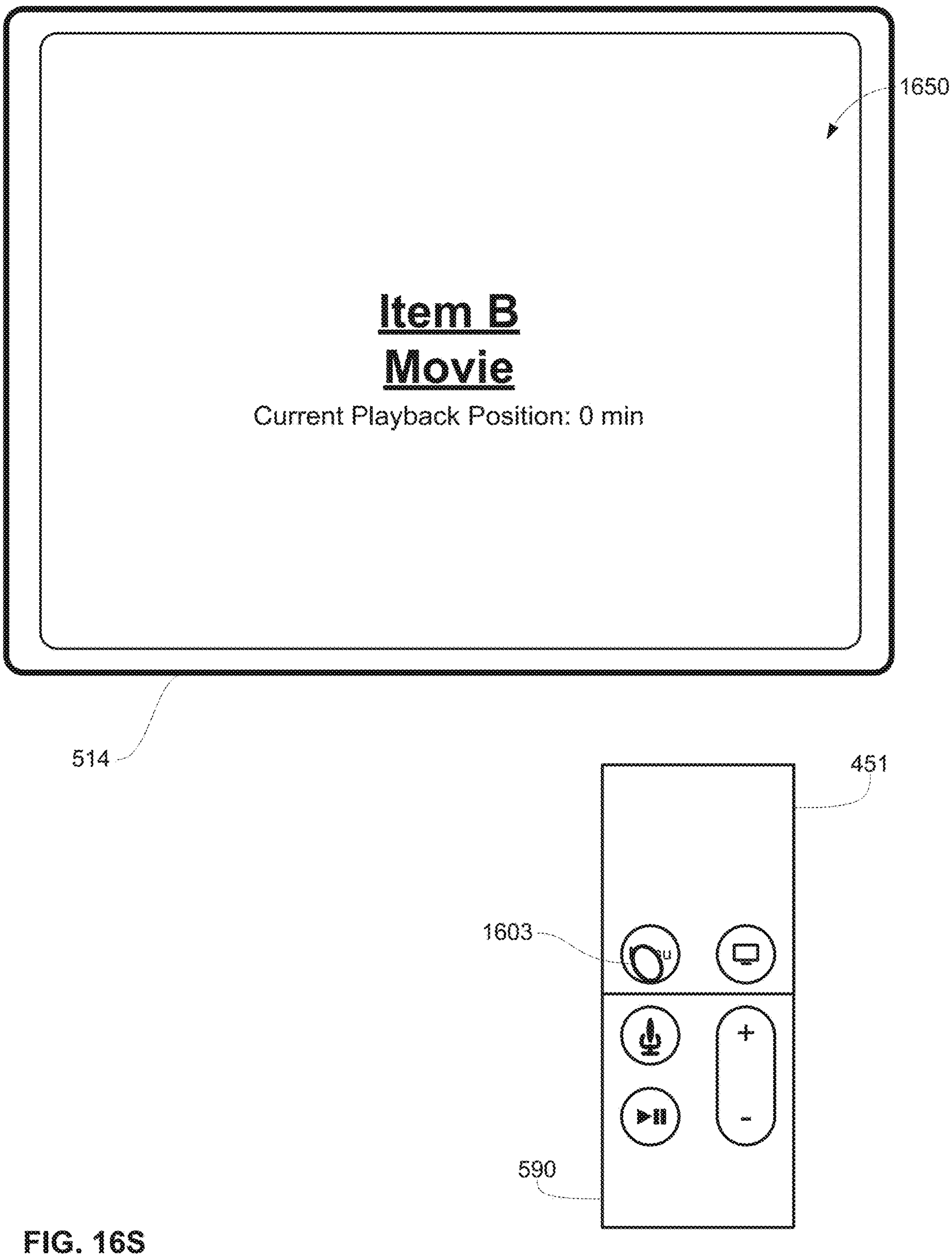
Figure 16T:
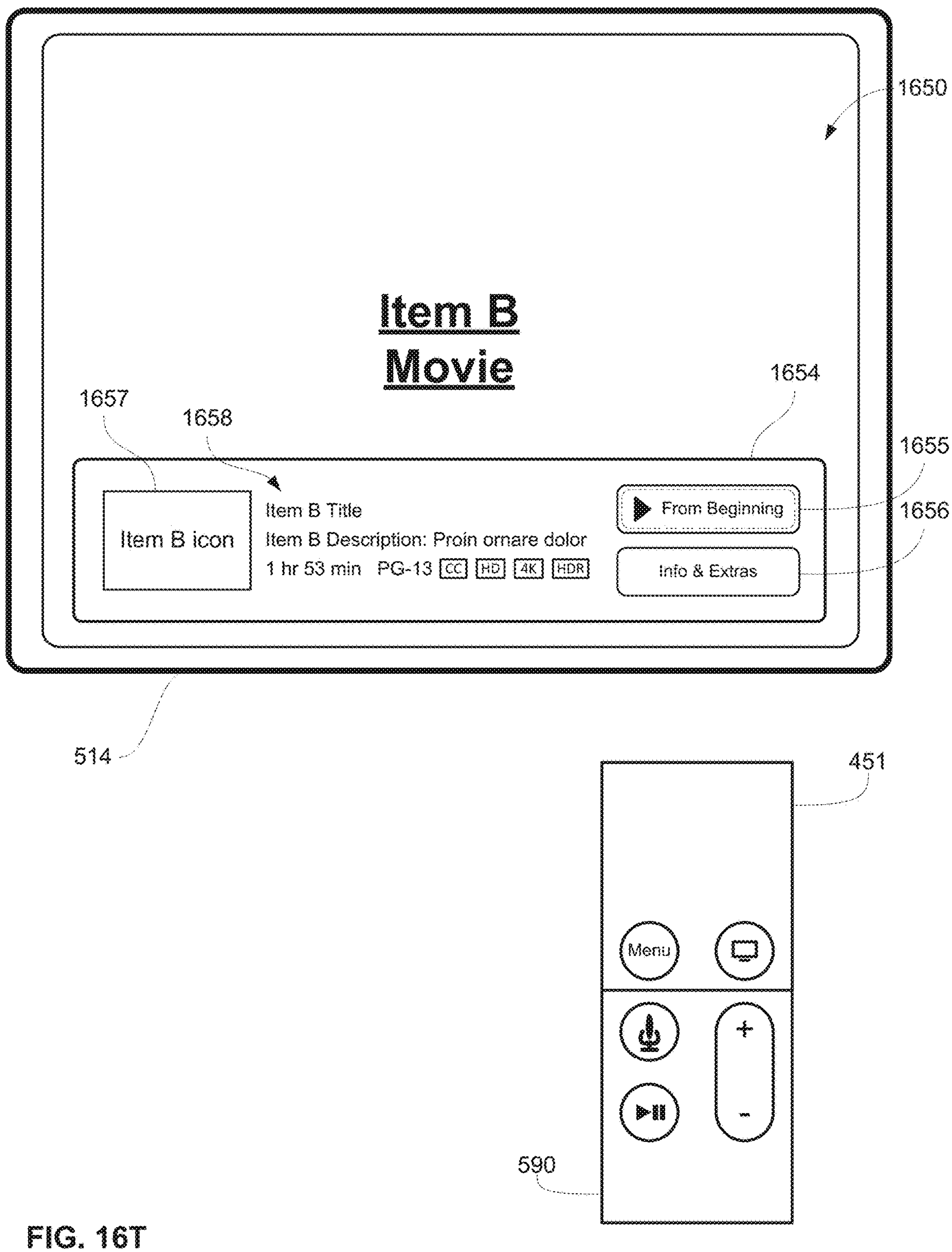
Figure 16U:
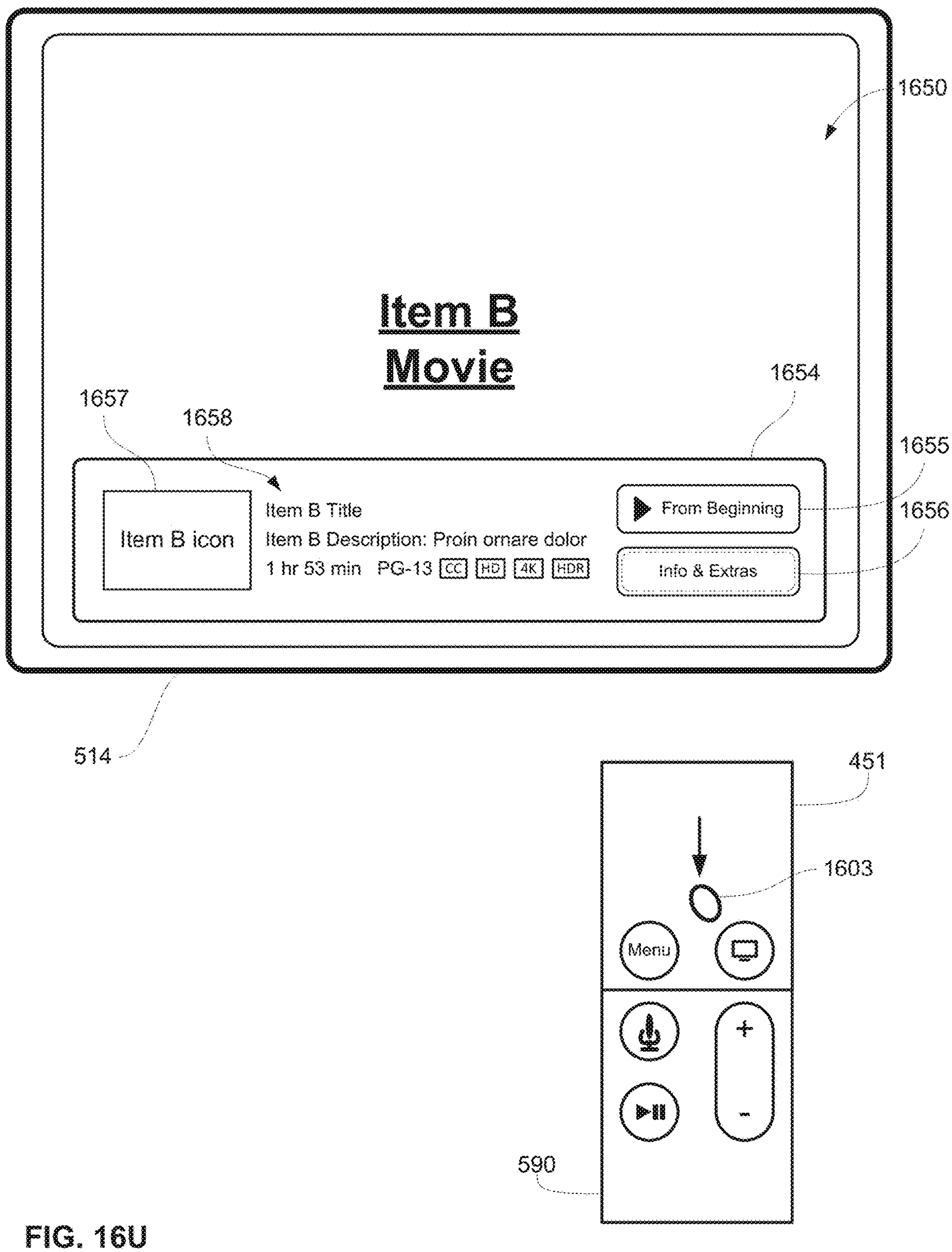
Figure 16V:
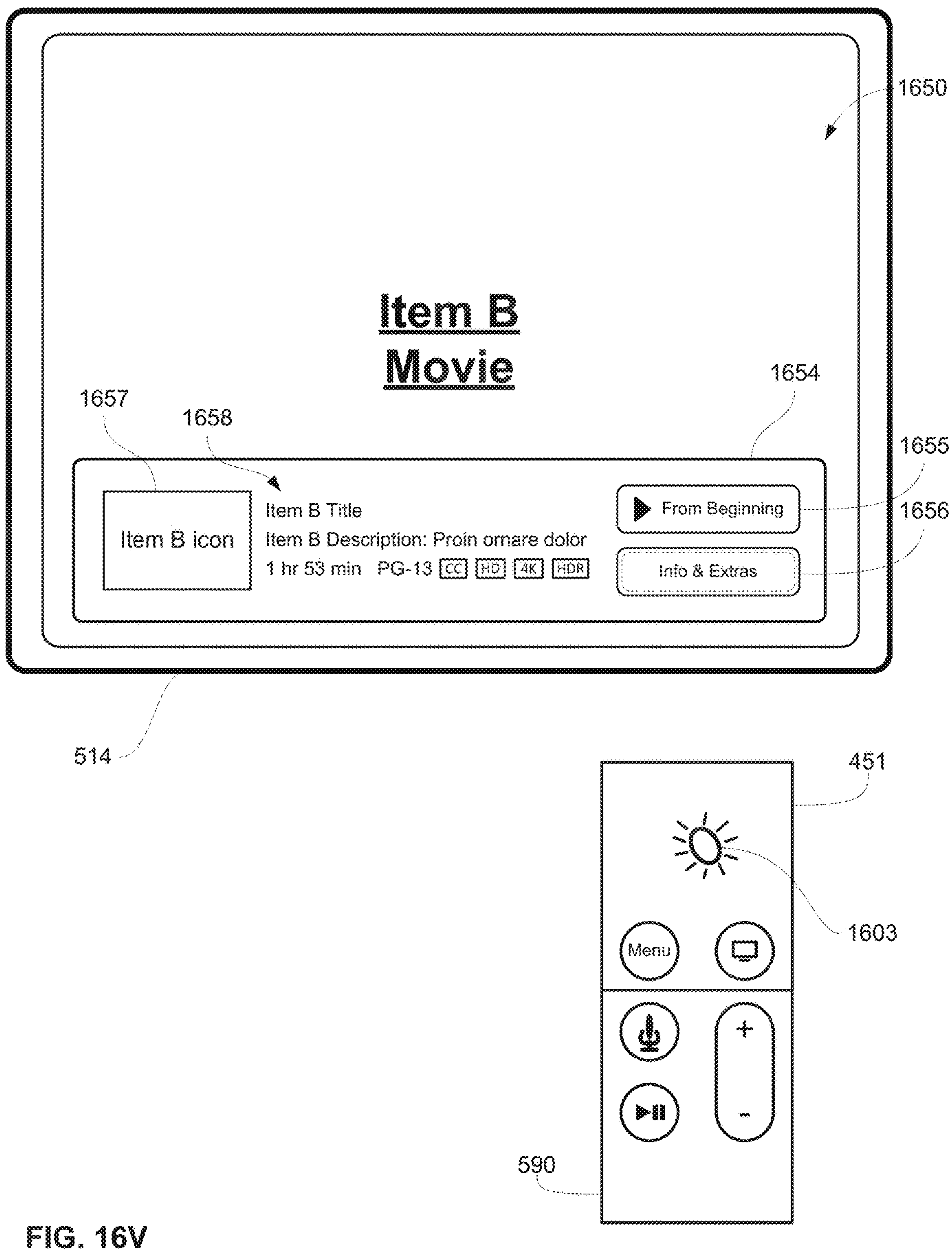
Figure 16W:
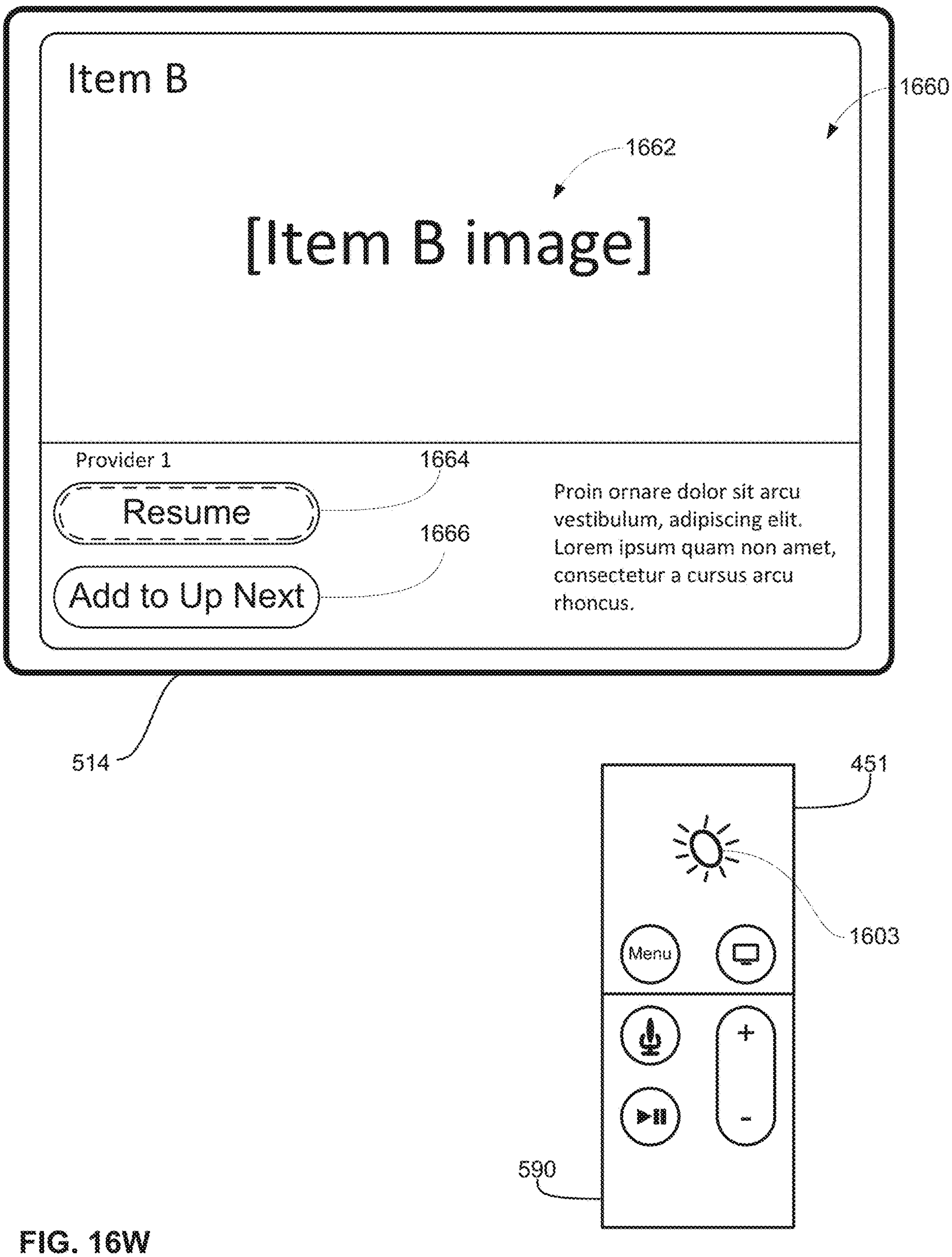
Figure 16X:
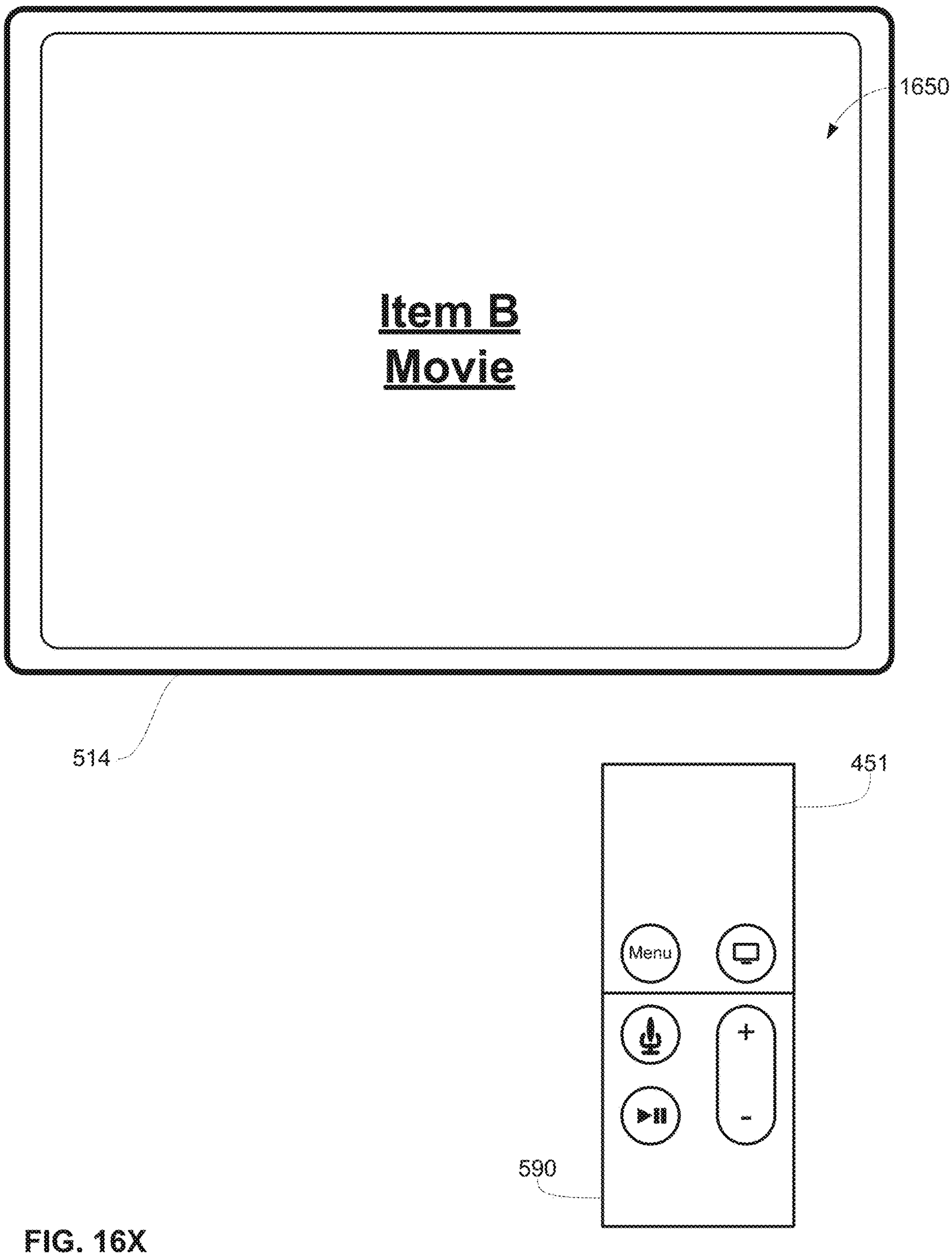
Figure 16Y:
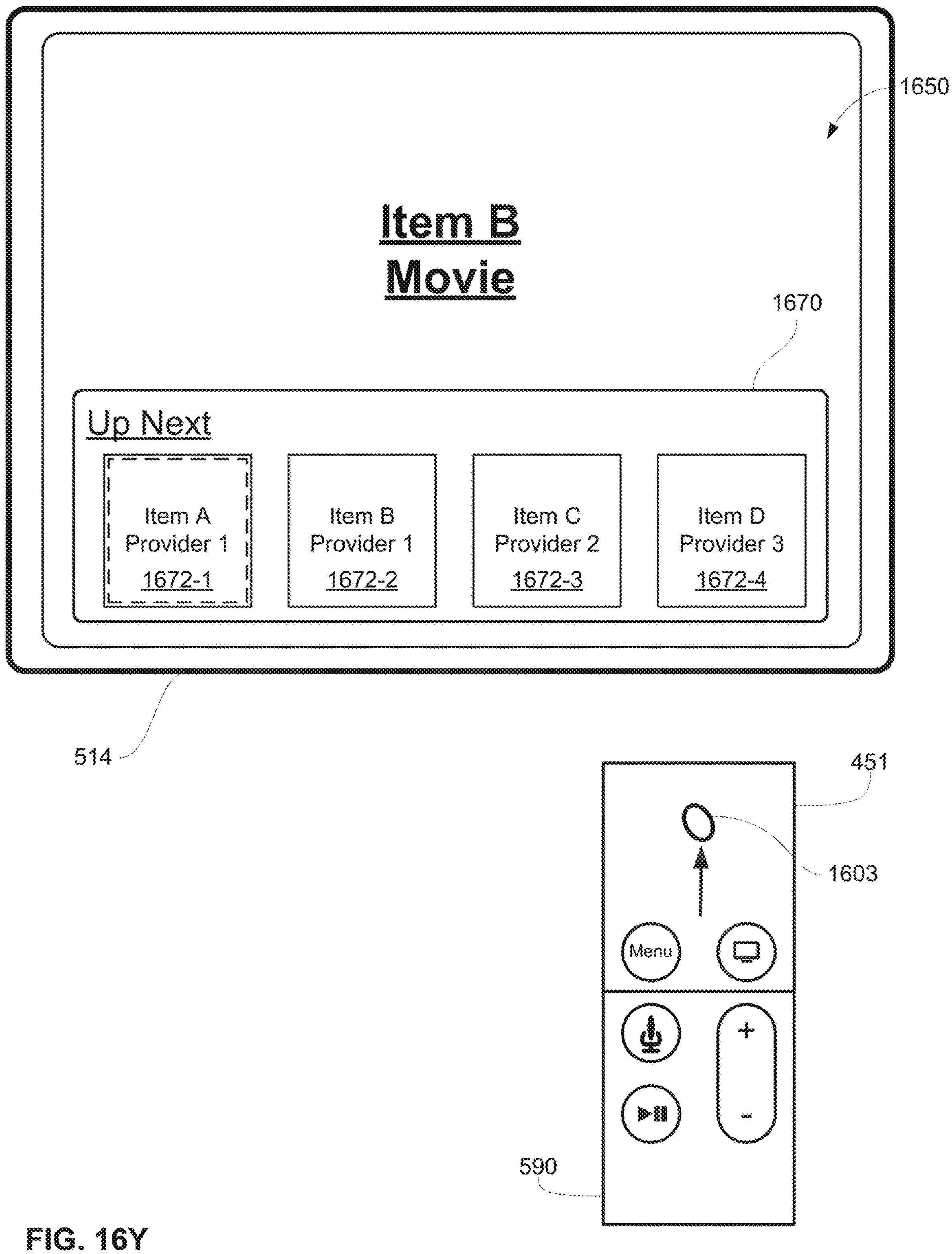
Figure 17A:
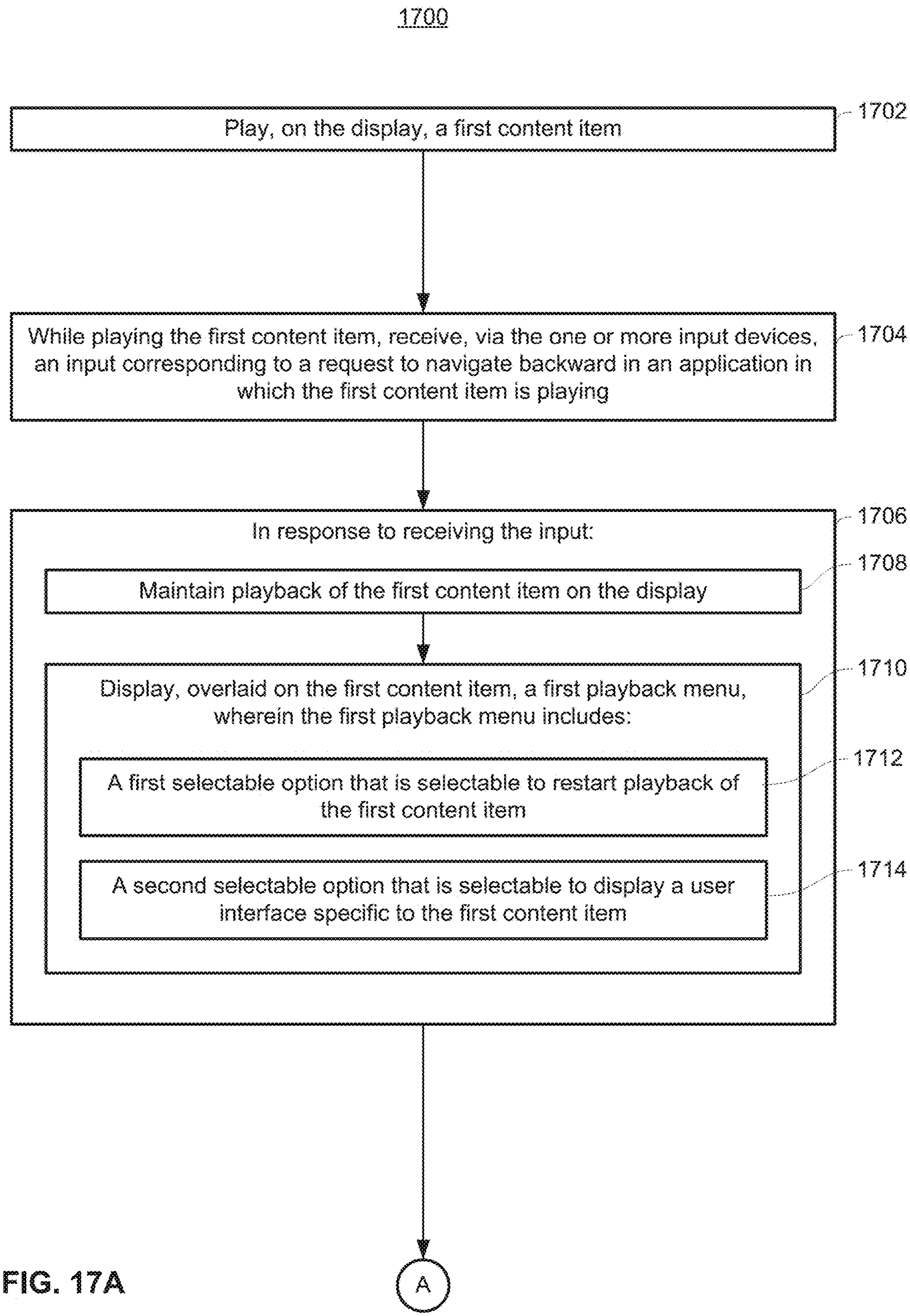
Figure 17B:
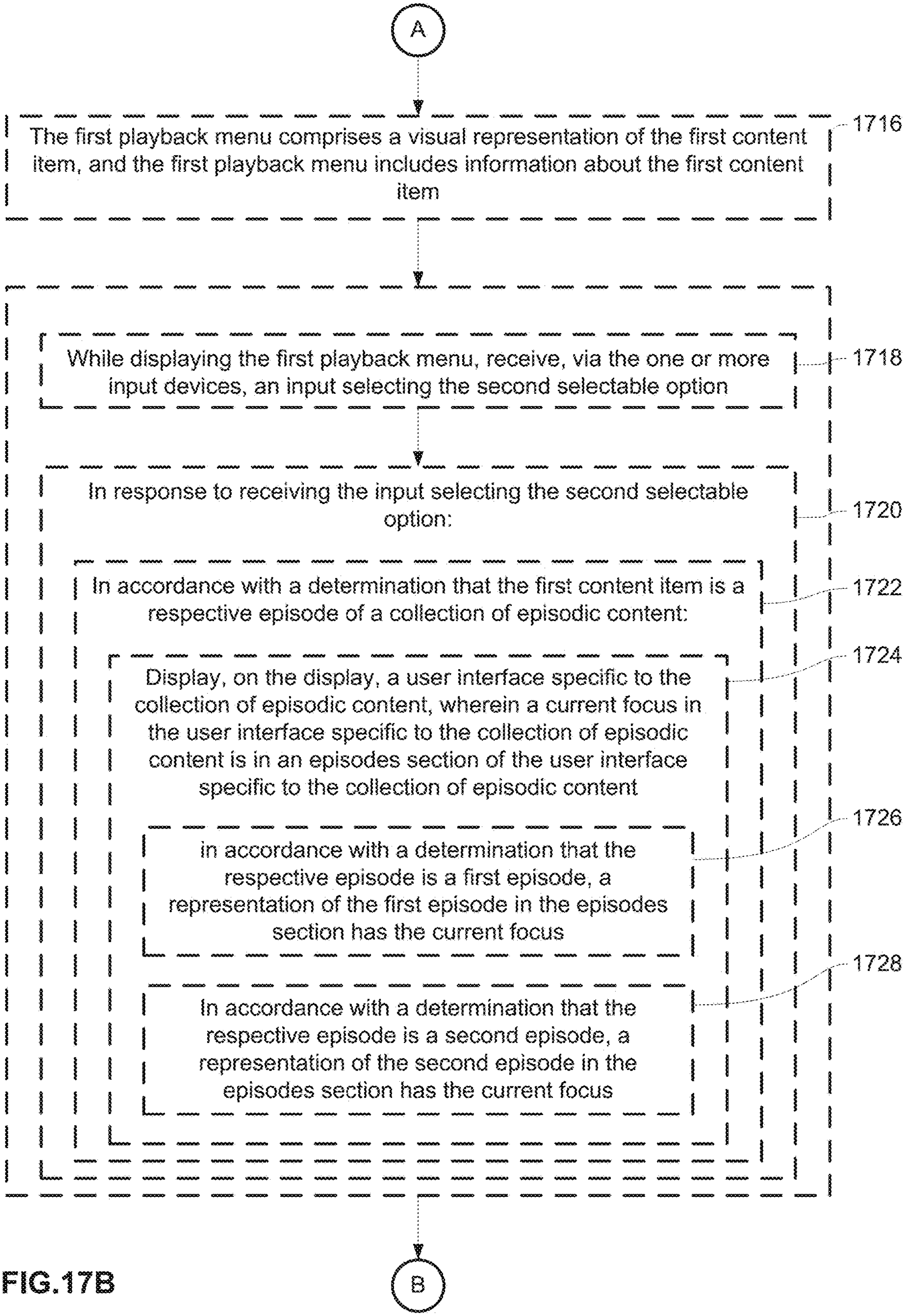
Figure 17D:
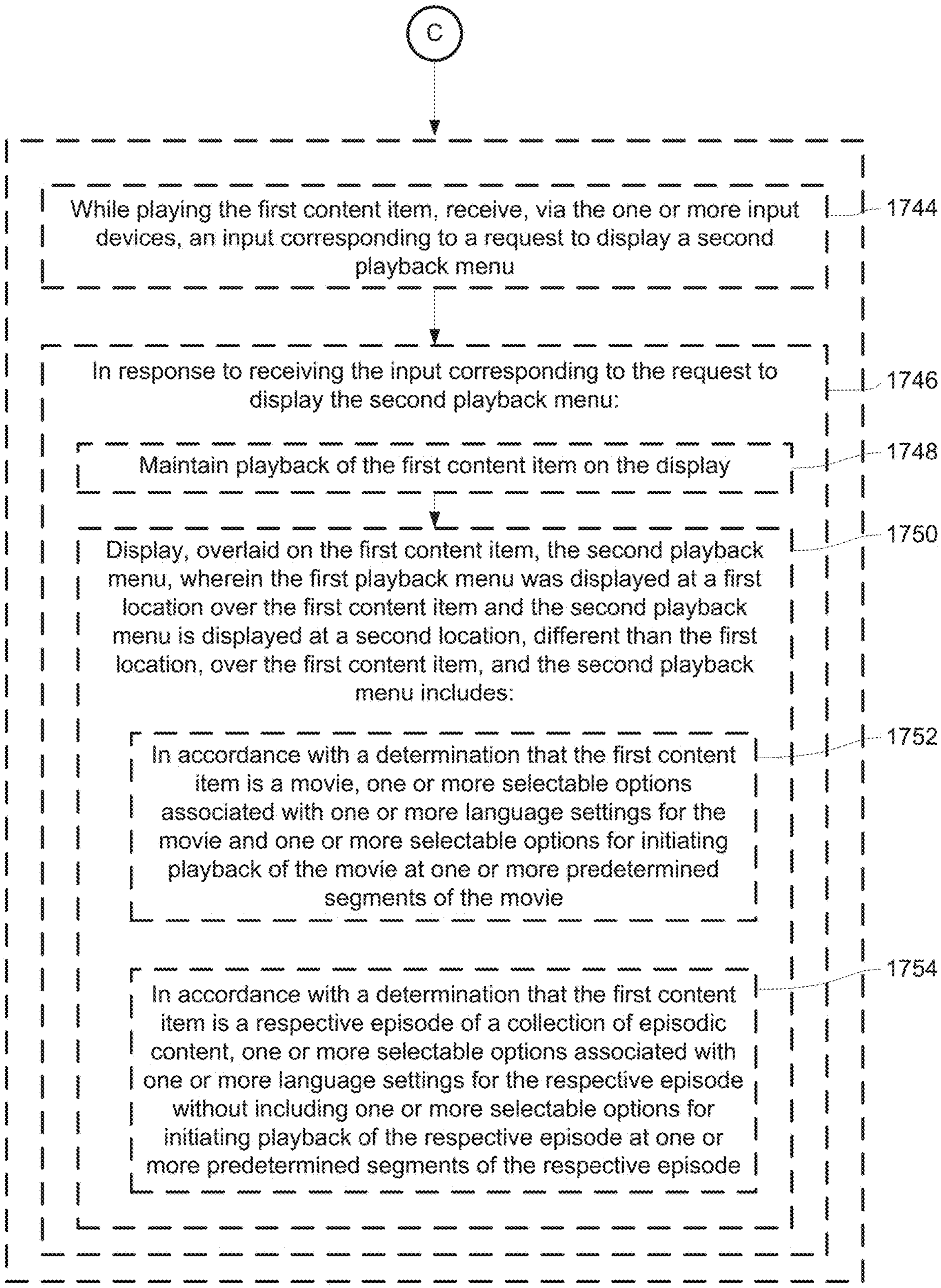

FIGS. 16A-16Y illustrate exemplary ways in which an electronic device presents playback menus during playback of content in a unified media browsing application in accordance with some embodiments of the disclosure. The embodiments in these figures are used to illustrate the processes described below, including the processes described with reference to FIGS. 17A-17D.

FIGS. 16A-16Y illustrate the electronic device 500 presenting playback menus during playback of content in a unified media browsing application. FIG. 16A illustrates user interface 1600 of a media browsing application corresponding to the "Watch Now" page (e.g., similar to user interface 1210, 1010, 810, and 610 described above with respect to FIGS. 12A, 10A, 8A, and 6D, respectively). In some embodiments, user interface 1210 includes rows of content items, including an "Up Next" row of content. Each of icons 1215-1 to 1215-4 are selectable to cause playback of the corresponding content. In some embodiments, only representations in the "Up Next" row are selectable to cause playback of the content. In some embodiments, one or more content in the "Up Next" row are compatible with playback within the unified media browsing application (e.g., and not in a separate application that is launched in response to selection of a content item).

In FIG. 16A, user input 1603 corresponding to a selection input is received while icon 1604-1 has a focus. In some embodiments, item A is a television show and is compatible with playback in the unified media browsing application. In some embodiments, in response to user input 1603, device 500 causes playback of item A within the unified media browsing application, as shown in FIG. 16B.

In FIG. 16C, user input 1603 corresponding to a downward swipe on touch-sensitive surface 451 of remote 590 is detected. In some embodiments, in response to user input 1603, playback menu 1621 is displayed, as shown in FIG. 16C. In some embodiments, playback menu 1621 is displayed overlaid on top of playback of item A. In some embodiments, playback menu 1621 includes selectable options 1622-1 and 1622-2 that are selectable to display different sets of playback options. For example, while selectable option 1622-1 has a focus, subtitle options are displayed. In some embodiments, the subtitle options include selectable option 1623-1 to 1623-5 corresponding to no subtitle, French subtitles, English subtitles, Spanish subtitles, and Chinese subtitles, respectively. In some embodiments, selection of a respective subtitle selectable option causes display of subtitles during playback of item A. In some embodiments, more or fewer subtitle options can be displayed. In some embodiments, the available subtitle options are determined by the content (e.g., provided by the content provider).

FIG. 16D illustrates playback menu 1621 when selectable option 1622-2 has a focus. In some embodiments, when selectable option 1622-2 is selected, different audio playback options are presented. For example, selectable options 1625-1 to 1625-4 present a plurality of playback language options corresponding to English language playback, French language playback, Spanish language playback, and Chinese language playback, respectively. In some embodiments, selection of a playback language option causes playback of the selected language audio track (e.g., the actors and/or characters speak in the English, French, Spanish, or Chinese language, respectively). In some embodiments, more or fewer language options can be displayed. In some embodiments, the available language options are determined by the content (e.g., provided by the content provider). In some embodiments, selectable options 1626-1 and 1626-2 correspond to different audio output settings. For example, selectable option 1626-1 is selectable to play the sound at the full dynamic range quality level. In some embodiments, selectable option 1626-2 is selectable to reduce loud sounds. In some embodiments, more or fewer audio output options can be displayed. In some embodiments, the available audio output options are determined by the content (e.g., provided by the content provider). In some embodiments, further selectable options can be presented to select the audio output device. For example, the audio track of item A can be output through the set-top box, through a Bluetooth device, through another connected mobile device, etc.

FIG. 16E illustrates user input 1603 corresponding to an upward swipe gesture on touch sensitive device 451, which causes the dismissal of playback menu 1621, as shown in FIG. 16E. In FIG. 16F, a user input 1603 selecting the "menu" button on remote 590 is detected. In some embodiments, in response to user input 1603 selecting the "menu" button on remote 590, device 500 displays playback menu 1627, as shown in FIG. 16G. In some embodiments, playback menu 1627 is displayed overlaid on top of playback of item A. In some embodiments, playback menu displays information regarding the content being played. In some embodiments, playback menu 1627 includes icon 1630 representing item A. In some embodiments, icon 1630 is a still image or logo of item A. In some embodiments, playback menu 1627 includes information section 1631, which includes the title of the item, the description of the item, the total duration of the item, and one or more content indicators. In some embodiments, the content indicators indicate the maturity level, the availability of closed captioning, and the video or audio quality of the content.

In some embodiments, playback menu 1627 includes selectable option 1628 and selectable option 1629. In some embodiments, selectable option 1628 is selectable to restart playback from the beginning of item A. In some embodiments, selectable option 1629 is selectable to display a user interface to select more episodes from the same television series, as discussed in further detail below with respect to FIG. 16K-16L. In some embodiments, while playback menu 1627 is displayed, a further user input selecting the "menu" button causes termination of playback and display of the previous user interface that was displayed before playback began (e.g., as discussed above with respect to FIG. 10N-10O).

In FIG. 16G, while item A is at a playback position of 15 minutes, user input 1603 corresponding to a selection input is received while selectable option 1628 has a focus. In some embodiments, as a result of user input 1603 selecting selectable option 1628, playback of item A returns to 0 minutes, as shown in FIG. 16H. In FIG. 16H, while device 500 is playing back item A, a user input 1603 corresponding to a button press on the "menu" button is received. In some embodiments, in response to user input 1603, playback menu 1627 is displayed, as shown in FIG. 16I. In some embodiments, as shown in FIG. 16J, user input 1603 corresponding to a downward swipe is received. In some embodiments, in response to user input 1603, selectable option 1629 receives a focus, as shown in FIG. 16J. In some embodiments, as shown in FIG. 16K, a user input 1603 corresponding to a selection input is received. In some embodiments, in response to user input 1603 selecting selectable option 1629, device 500 displays user interface 1640 corresponding to a product page for item A, as shown in FIG. 16L. In some embodiments, in response to user input 1603 selecting selectable option 1629, user interface 1640 is scrolled downwards or otherwise automatically navigated to the episodes portion of the product page, as shown in FIG. 16L. In some embodiments, the episodes portion of the product page allows a user to browse and select episodes to play back.

FIGS. 16A-16L described above illustrate the display of playback of television items. FIGS. 16M-16Y illustrate the display of playback menus for movie content items.

FIG. 16M illustrates user interface 1600 of a media browsing application corresponding to the "Watch Now" page. In FIG. 16A, user input 1603 corresponding to a selection input is received while icon 1604-2 has a focus. In some embodiments, item B is a movie and is compatible with playback in the unified media browsing application. In some embodiments, in response to user input 1603 selecting item B (as shown in FIG. 16N), device 500 causes playback of item B within the unified media browsing application, as shown in FIG. 16O.

In FIG. 16P, user input 1603 corresponding to a downward swipe on touch-sensitive surface 451 of remote 590 is received. In some embodiments, in response to user input 1603, playback menu 1651 is displayed, as shown in FIG. 16P. In some embodiments, playback menu 1651 is displayed overlaid on top of playback of item B. In some embodiments, playback menu 1651 includes selectable option 1652-1, 1652-2 and 1652-3 that are selectable to display different sets of playback options. In some embodiments, selectable option 1622-2 corresponds to a plurality of subtitle options, similar to those discussed above with respect to FIG. 16C. In some embodiments, selectable option 1622-3 corresponds to a plurality of audio output options, similar to those discussed above with respect to FIG. 16D.

In some embodiments, selectable option 1652-1 is displayed because item B is a movie item and/or because item B has been organized into chapters. In some embodiments, when selectable option 1652-1 has focus, a plurality of chapters 1653-1 to 1653-5 corresponding to different sections of item is displayed. In some embodiments, selection of a respective chapter causes playback to jump forward or backwards to the beginning of the respective chapter. For example, in FIG. 16R, while selectable option 1653-1 corresponding to chapter 1 is selected, user input 1603 corresponding to a selection input is received while item B is at a current playback position of 48 minutes. In some embodiments, in response to user input 1603 selecting chapter 1, playback of item B moves directly to the beginning of chapter 1, as shown in FIG. 16S. In some embodiments, when playback is moved to the beginning of chapter 1, playback menu 1651 is dismissed.

In FIG. 16S, a user input 1603 selecting the "menu" button on remote 590 is detected. In some embodiments, in response to user input 1603 selecting the "menu" button on remote 590, device 500 displays playback menu 1654, as shown in FIG. 16T. In some embodiments, playback menu 1654 is displayed overlaid on top of playback of item B. In some embodiments, playback menu 1654 displays information regarding the content being played. In some embodiments, playback menu 1654 includes icon 1657 representing item B. In some embodiments, icon 1657 is a still image or logo of item B. In some embodiments, playback menu 1654 includes information section 1658, which includes the title of the item, the description of the item, the total duration of the item, and one or more content indicators. In some embodiments, the content indicators indicate the maturity level, the availability of closed captioning, and the video or audio quality of the content.

In some embodiments, playback menu 1654 includes selectable option 1655 and selectable option 1656. In some embodiments, selectable option 1655 is selectable to restart playback from the beginning of item B. In some embodiments, selectable option 1655 is selectable to display a user interface of more information and extra content related to item B. In some embodiments, while playback menu 1654 is displayed, a further user input selecting the "menu" button causes termination of playback and display of the previous user interface that was displayed before playback began (e.g., as discussed above with respect to FIG. 10N-10O).

In FIG. 16U, user input 1603 corresponding to a downward swipe is received, moving the focus to selectable option 1656. In FIG. 16V, user input 1603 corresponding to a selection input is received while selectable option 1656 has a current focus. In some embodiments, in response to user input 1603 selecting selectable option 1656, device 500 displays user interface 1660 corresponding to the product page or canonical page of item B, as shown in FIG. 16W. In some embodiments, user interface 1660 includes an image of item B 1602, the title of item B, description of item B and selectable option 1664 and 1666. In some embodiments, user interface 1660 is scrollable to reveal further content and information associated with item B. In some embodiments, selectable option 1664 is selectable to display user interface 1650 and resume playback of item B. In some embodiments, selectable option 1666 is selectable to add item B to the "Up Next" row of content items described above with respect to FIG. 16A.

In FIG. 16W, user input 1603 corresponding to a selection input (e.g., a click on touch-sensitive surface 451 of remote 590) is received while selectable option 1664 has a focus. In some embodiments, in response to user input 1603, device 500 displays 1650 and resumes playback at the last playback position (e.g., when user interface 1660 was displayed and interrupted playback of item B). In FIG. 16Y, user input 1603 corresponding to an upward swipe is received. In some embodiments, in response to user input 1603, content browsing menu 1670 is displayed, as shown in FIG. 16Y. In some embodiments, content browsing menu 1670 is displayed overlaid on top of the playback of item B. In some embodiments, content browsing menu 1670 includes an "Up Next" row of content items. In some embodiments, the "Up Next" row of content items displayed in content browsing menu 1670 is similar to or shares similar features as the "Up Next" row described above with respect to FIG. 16A. In some embodiments, the "Up Next" row of content items is scrollable (e.g., left/right scroll) to reveal more content items. In some embodiments, selection of any of content items 1672-1 to 1672-4 in the "Up Next" row causes playback of the corresponding content item. Thus, content browsing menu 1670 provides a quick-access interface to browse for and select content. In some embodiments, a downward swipe causes content browsing menu 1670 to be dismissed.

In some embodiments, content browsing menu 1670 is displayed when playback of the respective content item (e.g., Item B) reaches a threshold playback position at or before the end of the content (e.g., at the end of the content, 30 seconds before the end, 60 seconds before the end, 2 minutes before the end, etc.). In some embodiments, content browsing menu 1670 is displayed when playback of the respective content menu reaches a threshold playback position at or before the display of credits at the end of the content (e.g., at the time when credits are displayed, 30 seconds before the display of credits, 60 seconds before the display of credits, 2 minutes before the display of credits, etc.). In some embodiments, content browsing menu 1670 includes items in the user's Up Next row of content items. In some embodiments, additionally or alternatively content browsing menu 1670 includes items that are related or associated with the content item that is currently playing (e.g., Item B). For example, in some embodiments, content browsing menu 1670 can display the next episode of the content item (e.g., if the content item is an episodic content item). In some embodiments, content browsing menu 1670 can include content that is related to the currently playing content (e.g., in the same genre, etc.). In some embodiments, content browsing menu 1670 can include bonus content that is related to or associated with the currently playing content (e.g., extras, bloopers, interviews with cast and crew, etc.).

FIGS. 17A-17D are flow diagrams illustrating a method 1700 of presenting playback menus during playback of content in a unified media browsing application in accordance with some embodiments of the disclosure. The method 1700 is optionally performed at an electronic device such as device 100, device 300, device 500, and device 511 as described above with reference to FIGS. 1A-1B, 2-3, 4A-4B and 5A-5C. Some operations in method 1700 are, optionally combined and/or order of some operations is, optionally, changed.

As described below, the method 1700 provides ways to present playback menus during playback of content in a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices plays (1702), on the display, a first content item, such as in FIG. 16B (e.g., while the first content item is being played in a fullscreen playback mode or otherwise). In some embodiments, the fullscreen playback occurs within the unified media browsing application. In some embodiments, the fullscreen playback occurs within an application separate from the unified media browsing application. In some embodiments, the unified media browsing application launched the separate application in response to the user selecting the first content item.

In some embodiments, while playing the first content item, the electronic device receives (1704), via the one or more input devices, an input corresponding to a request to navigate backward in an application in which the first content item is playing, such as in FIG. 16F (e.g., receiving a user input on a "back" or "menu" button on a remote control device).

In some embodiments, in response to receiving the input (1706): the electronic device maintains (1708) playback of the first content item on the display (e.g., continue playing the first content item in the fullscreen playback mode) and displays (1710), overlaid on the first content item, a first playback menu, such as in FIG. 16G (e.g., display a popup menu with information about the first content item and options for controlling playback of the content item). For example, the popup menu can include an icon, logo, or other representation of the first content item, the title of the content item, a description of the content item and one or more indicators or badges indicating the content's maturity rating, genre, video quality, etc. In some embodiments, the first playback menu includes: a first selectable option that is selectable to restart playback of the first content item (1712), such as in FIG. 16G. In some embodiments, the popup menu includes a button that restarts the playback from the beginning of the content item (e.g., labeled "Play from Beginning"). In some embodiments, the first playback menu includes: a second selectable option that is selectable to display a user interface specific to the first content item (1714), such as in FIG. 16J-16L. In some embodiments, the popup menu includes a button to display the content item's canonical page or product page. In some embodiments, the content item's canonical page includes information about the content item including selectable options to view other content related to the content item (e.g., similar content or other episodes of the same television series, if the first content item is a television show). In some embodiments, if the first content item is a television show, the second selectable option is selectable to show other episodes of the same television series (e.g., labeled "More Episodes"). In some embodiments, if the first content item is not a television show, the second selectable option is selectable to show more information about the first content item (e.g., labeled "Info & Extras"). In some embodiments, the selectable option displays a different textual label based on whether the content item is a television show or a movie (e.g., or otherwise not an episodic content) and displays different portions of the canonical page when selected based on whether the content item is a television show or a movie (e.g., or otherwise not an episodic content).

The above-described manner of displaying playback controls (e.g., by displaying a playback control menu overlaid on top of playing content) allows the electronic device to provide the user with playback controls without distracting from playback of the content (e.g., by displaying the playback menu overlaid on top of content while the content continues playback), which simplifies the interaction between the user and the electronic device and enhances the operability of the electronic device and makes the user-device interface more efficient (e.g., by providing playback controls and information about the currently playing content without interrupting the playback of the content without requiring that the user stop playback and navigate to a separate user interface to perform the same playback control), which additionally reduces power usage and improves battery life of the electronic device by enabling the user to use the electronic device more quickly and efficiency.

In some embodiments, the first playback menu comprises a visual representation of the first content item, and the first playback menu includes information about the first content item (1716), such as in FIG. 16G. In some embodiments, the popup menu includes a logo, icon, or other representation of the first content item. In some embodiments, the representation can be a still image or animated graphic. In some embodiments, if the first content item is a television episode, the representation can be of the particular episode, the particular season, the particular television show, or the particular scene currently being displayed. In some embodiments, the popup menu includes a description of the content item, the title of the content item and/or one or more indicators related to the first content item, such as the content's maturity rating, genre, video quality, etc.

The above-described manner of displaying content information (e.g., by displaying a representation of the currently playing content and information about the currently playing content) allows the electronic device to provide the user with information without distracting from the playback of the content (e.g., by displaying the playback menu overlaid on top of content while the content continues playback and displaying information about the content item in the playback menu), which simplifies the interaction between the user and the electronic device and enhances the operability of the electronic device and makes the user-device interface more efficient (e.g., by providing the user with information about the content item without requiring the user to stop playback or distract from viewing the playback by using another electronic device to obtain the same information), which additionally reduces power usage and improves battery life of the electronic device by enabling the user to use the electronic device more quickly and efficiency.

In some embodiments, while displaying the first playback menu, the electronic device receives (1718), via the one or more input devices, an input selecting the second selectable option, such as in FIG. 16K. In some embodiments, the user selects the option to display the first content item's canonical page. In some embodiments, in response to receiving the input selecting the second selectable option (1720): in accordance with a determination that the first content item is a respective episode of a collection of episodic content (1722): the electronic device displays (1724), on the display, a user interface specific to the collection of episodic content, wherein a current focus in the user interface specific to the collection of episodic content is in an episodes section of the user interface specific to the collection of episodic content, such as in FIG. 16L. In some embodiments, if the first content item is an episode of a television series, the electronic device displays a canonical page for the television series and automatically shows the section of the canonical page for browsing and selecting episodes of the television series. In other words, selection of the second selectable option displays the canonical page and scrolls to the relevant portion of the canonical page (e.g., not necessarily the top of the canonical page). In some embodiments, in accordance with a determination that the respective episode is a first episode, a representation of the first episode in the episodes section has the current focus (1726), such as in FIG. 16L. In some embodiments, after displaying the canonical page for the television series and scrolling to the episodes section of the canonical page, the electronic device highlights the representation of the first content item to indicate to the user which episode was being watched. In some embodiments, in accordance with a determination that the respective episode is a second episode, a representation of the second episode in the episodes section has the current focus (1728), such as in FIG. 16L (e.g., highlighting the episode that was being watched by the user.).

The above-described manner of finding related content (e.g., by providing a selectable option to display different episodes of the television series that is currently playing) allows the electronic device to provide the user with an easy method of beginning playback of other episodes of the same television series (e.g., by displaying the television series' canonical page and navigating to the portion of the page that allows the user to browse for different episodes), which simplifies the interaction between the user and the electronic device and enhances the operability of the electronic device and makes the user-device interface more efficient (e.g., by providing the user with an easy method of launching the television series' canonical page and find other episodes without requiring the user to back out of playback and separately look for a listing of the television series and navigate to the television series' canonical page to find other episodes of the television series), which additionally reduces power usage and improves battery life of the electronic device by enabling the user to use the electronic device more quickly and efficiency.

In some embodiments, in response to receiving the input selecting the second selectable option (1730): in accordance with a determination that the first content item is a movie (1732): the electronic device displays (1734), on the display, a user interface specific to the movie, wherein the user interface specific to the movie includes information and extra content related to the movie, such as in FIG. 16W. In some embodiments, if the first content item is a movie or otherwise not a television series, the second option causes display of the first content item's canonical page that includes more information and more content related to the first content item. In some embodiments, selection of the second content item does not scroll downwards in the canonical page. In some embodiments, selection of the second content item does cause the canonical page to scroll downwards.

The above-described manner of displaying more information and content related to a content item (e.g., by providing a selectable option to display a movie's canonical page with more information about the movie, extra content related to the movie, or other content items related to the movie) allows the electronic device to provide the user with an easy method of viewing additional information related to the content being played (e.g., by displaying the movie's canonical page directly from the playback interface of the movie), which simplifies the interaction between the user and the electronic device and enhances the operability of the electronic device and makes the user-device interface more efficient (e.g., by providing the user with an easy method of launching the movie's canonical page and find more information and content without requiring the user to back out of playback and separately look for a listing of the movie and navigate to the movie's canonical page to find more information and content for the movie), which additionally reduces power usage and improves battery life of the electronic device by enabling the user to use the electronic device more quickly and efficiency.

In some embodiments, while displaying, overlaid on the first content item, the first playback menu, the electronic device receives (1736), via the one or more input devices, a second input corresponding to the request to navigate backward in the application in which the first content item is playing, such as in FIG. 10N (e.g., receiving another user input selecting the "back" or "menu" button on a remote control device). In some embodiments, in response to receiving the second input (1738): the electronic device ceases (1740) display of the first content item and the first playback menu (e.g., stopping playback of the first content item and dismissing the popup menu) and displays (1742), on the display, a user interface of a unified media browsing application from which playback of the first content item was initiated, such as in FIG. 10O (e.g., returning to the previous user interface of the unified media browsing application that was displayed before playback of the first content item began). For example, if playback occurs within the unified media browsing application in response to the user selection of a content item from a respective user interface of the unified media browsing application, then in response to receiving the second input (e.g., clicking a "menu" button twice—the first to display the first playback menu), cease fullscreen playback and return to the respective user interface (e.g., "back" function). If, by contrast, the playback occurs within an application separate from the unified media browsing application (for example, the unified media browsing application launches the separate application to begin playback in response to the user selection of a content item), then selecting the "menu" or "back" button does not cause re-display of the first user interface of the unified media browsing application. In such a case, response to the "menu" or "back" button optionally ceases fullscreen playback and displays a menu or user interface of the separate application (e.g., the "menu" function).

The above-described manner of exiting playback of a content item (e.g., by receiving a second user input requesting backwards navigation and displaying the previous user interface that was displayed before playback began) allows the electronic device to provide the user with an easy method of exiting playback (e.g., by first displaying the playback menu and then exiting playback in response to the user's request to navigate backwards), which simplifies the interaction between the user and the electronic device and enhances the operability of the electronic device and makes the user-device interface more efficient (e.g., by providing the user with an easy method of displaying playback information and exiting playback of the content item using the same input type and without requiring the user to perform a different input or without requiring a remote control device with more input buttons), which additionally reduces power usage and improves battery life of the electronic device by enabling the user to use the electronic device more quickly and efficiency.

In some embodiments, while playing the first content item, the electronic device receives (1744), via the one or more input devices, an input corresponding to a request to display a second playback menu, such as in FIG. 16C (e.g., receiving a gesture (e.g., a downward swipe on a touch sensitive surface of an input device) or button click corresponding to a request to display another popup menu). In some embodiments, the input to display the second playback menu is a different type of input from the input that displays the first playback menu. In some embodiments, the other popup menu includes selectable options for controlling playback of the first content item, such as subtitles and language information. In some embodiments, in response to receiving the input corresponding to the request to display the second playback menu (1746): the electronic device maintains (1748) playback of the first content item on the display, such as in FIG. 16C (e.g., continuing to play the first content item in the fullscreen playback mode) and displays (1750), overlaid on the first content item, the second playback menu, wherein the first playback menu was displayed at a first location over the first content item and the second playback menu is displayed at a second location, different than the first location, over the first content item, such as in FIG. 16C (e.g., displaying a popup menu with options for customizing the playback of the content item). For example, the popup menu can include options for setting the output language, setting the subtitles settings, setting the output audio device, and/or selecting chapters bookmarks to begin playback from. In some embodiments, the second playback menu includes: in accordance with a determination that the first content item is a movie, one or more selectable options associated with one or more language settings for the movie and one or more selectable options for initiating playback of the movie at one or more predetermined segments of the movie (1752), such as in FIG. 16P. In some embodiments, if the first content item is a movie or otherwise not a television show, the electronic device displays different chapters of the movie, selection of which causes playback to move to the beginning of the selected chapter, and language playback settings, selection of which causes the language output of the movie to change to the selected language. In some embodiments, the language options displayed are determined by the content item (e.g., the content item provides different output language options). In some embodiments, the second playback menu includes: in accordance with a determination that the first content item is a respective episode of a collection of episodic content, one or more selectable options associated with one or more language settings for the respective episode without including one or more selectable options for initiating playback of the respective episode at one or more predetermined segments of the respective episode (1754), such as in FIG. 16C (e.g., display language options for changing the output language to the selected option, but do not display a list of chapters). In some embodiments, television content are not organized into chapters due to the duration of the television content. In some embodiments, if a content item is an episode of a collection of episodic content, but the episode is of a certain length, the content item can include different chapters, in which case the second playback menu will display the chapters options.

The above-described manner of displaying playback controls while playing back content (e.g., by displaying a second playback control menu that provides other playback options while continuing playback of the content) allows the electronic device to provide the user with an easy method of controlling playback (e.g., by first a second type of playback control menu for control language, audio, subtitle options, etc. in response to the user's request to display the second type of playback control menu), which simplifies the interaction between the user and the electronic device and enhances the operability of the electronic device and makes the user-device interface more efficient (e.g., by providing the user with a way to invoke different types of playback menus for controlling different aspects of playback using the same input device without requiring the user to navigate to a separate user interface or terminate playback in order to change the playback options and without requiring a larger input device), which additionally reduces power usage and improves battery life of the electronic device by enabling the user to use the electronic device more quickly and efficiency.

It should be understood that the particular order in which the operations in FIGS. 17A-17D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1900, 2100, and 2300) are also applicable in an analogous manner to method 1700 described above with respect to FIGS. 17A-17D. For example, the operation of the electronic device to present playback menus during playback of content in a unified media browsing application described above with reference to method 1700 optionally has one or more of the characteristics of the presentation of content in the unified media browsing application, presentation of information on representations of content items, displaying of content in a unified media browsing application, linking of an account for a primary content provider, and restricting of access to content based on the geographic location of the device, displaying user interfaces specific to a respective content item, displaying content items, etc., described herein with reference to other methods described herein (e.g., methods 700, 900, 1100, 1300, 1500, 1900, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 17A-17D are, optionally, implemented by components depicted in FIGS. 1A-1B. For example, displaying operations 1702, 1708, 1710, 1724, 1734, 1740, 1742, 1748, and 1750, receiving operations 1704, 1718, 1736, and 1744, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Representations of Content in a Unified Media Browsing Application

Users interact with electronic devices in many different manners, including using an electronic device to browse and access content in a media browsing application. In some embodiments, an electronic device aggregates available content in a single unified media browsing application. The embodiments described below provide ways in which an electronic device presents a plurality of representations of content items in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 18A:
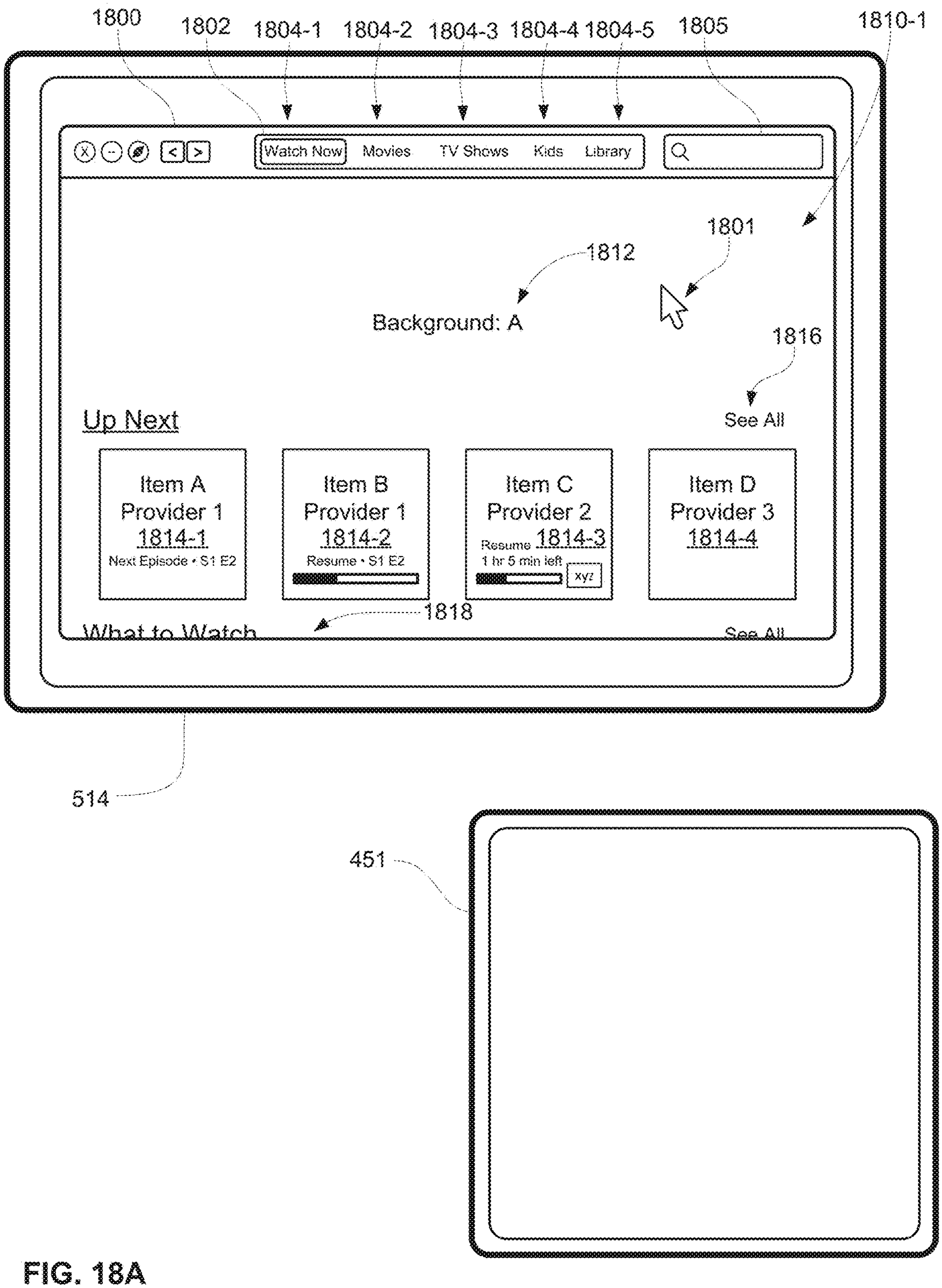
FIGS. 18A-18BBB illustrate exemplary ways in which an electronic device presents a plurality of representations of content items in a unified media browsing application in accordance with some embodiments of the disclosure.
Figure 18B:
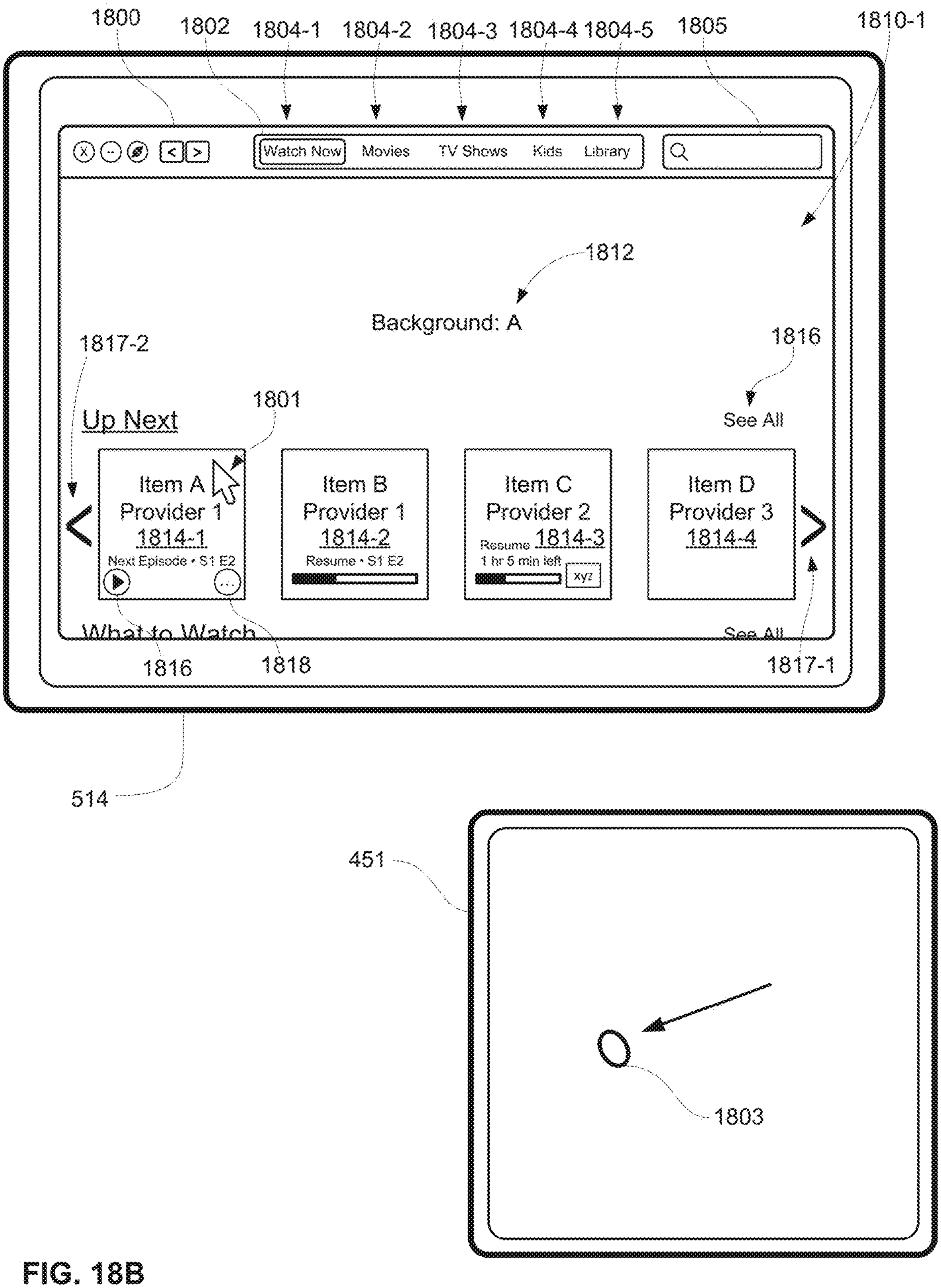

FIGS. 18A-18BBB illustrate exemplary ways in which an electronic device presents a plurality of representations of content items in a unified media browsing application in accordance with some embodiments of the disclosure. The embodiments in these figures are used to illustrate the processes described below, including the processes described with reference to FIGS. 19A-19C.

FIGS. 18A-18BBB illustrate an electronic device 500 presenting a plurality of representations of content items in a unified media browsing application. FIG. 18A illustrates electronic device (such as electronic device 500, not shown) that is in communication with display 514 (e.g., such as a monitor or integrated display) and an input device (e.g., such as touch-sensitive surface 451). It is understood that the disclosure illustrates the use of touch-sensitive surface 451, but the input device can be any suitable pointer device such as a mouse, touchpad, etc.

In some embodiments, device 500 is displaying a unified media browsing application 1800. In some embodiments, unified media browsing application 1800 is an application installed on device 500. In some embodiments, unified media browsing application 1800 is similar to the unified media browsing applications described above, for example, with respect to FIG. 6A.

In some embodiments, unified media browsing application 1800 displays navigation bar 1802, as shown in FIG. 18A. In some embodiments, navigation bar 1802 includes a plurality of selectable options that are selectable to cause display of the user interface corresponding to the selected item (e.g., different user interface "pages" or "tabs"). For example, navigation bar 1802 includes selectable option 1804-1 corresponding to the "Watch Now" page (e.g., which is selectable to display the home screen user interface), selectable option 1804-2 corresponding to the "Movies" page (e.g., which is selectable to display a user interface for movies), selectable option 1804-3 corresponding to the "TV Shows" page (e.g., which is selectable to display a user interface for tv shows), selectable option 1804-4 corresponding to the "Kids" page (e.g., which is selectable to display a user interface for children's items), and selectable option 1804-5 corresponding to the "Library page" (e.g., which is selectable to display a user interface for items to which the user owns access). In some embodiments, unified media browsing application 1800 includes search field 1805 which is selectable to perform a search for content available in the unified media browsing application 1800.

In some embodiments, unified media browsing application 1800 includes one or more selectable options for interacting with unified media browsing application 1800, such as selectable options for closing, minimizing, maximizing the unified media browsing application 1800 window, and selectable options for navigating forward and backwards within the unified media browsing application.

In FIG. 18A, unified media application 1800 displays user interface 1810-1. In some embodiments, user interface 1810-1 is a content browsing user interface. For example, user interface 1810-1 includes one or more representations of content items that are selectable to access the respective content item (e.g., cause playback, display more information, initiate a process to acquire entitlement, etc.), such as representation 1814-1 (e.g., corresponding to Item A), representation 1814-2 (e.g., corresponding to item B), representation 1814-3 (e.g., corresponding to Item C), and representation (e.g., corresponding to Item D). In some embodiments, representations 1814-1 to 1814-4 belong to the "Up Next" row of content items. In some embodiments, the "Up Next" row of content items are content items that are recommended to the user based on the user's viewing activity. For example, representation 1814-1 corresponds to the television series Item A and is selectable to cause playback of season 1, episode 2 of Item A because the user has watched season 1, episode 1 of Item A. In some embodiments, the "Up Next" row of content items are content items that are recommended to the user because the user has added the respective content item to the "Up Next" queue. In some embodiments, each row of content items in user interface 1810-1 is horizontally scrollable to reveal further content items in the row of content items. In some embodiments, user interface 1810-1 is vertically scrollable to reveal further rows of content items corresponding to different categories or collections of content items, such as row 1818 corresponding to the "What to Watch" row of content items.

In some embodiments, the representations of content items include a still image or short video clip representing the content item. In some embodiments, the representation of content items include one or more indicators. In some embodiments, the representation of content items include an indicator that indicates why the content item is recommended for the user and/or what season and episode will be displayed upon user selection. For example, representation 1814-1 includes a "Next Episode S1 E2" indicator indicating that the content item is recommended to the user because it is the next episode of a content item that the user has previously watched and selection of representation 1814-1 will cause playback of episode 2 of season 1. In some embodiments, representation 1814-2 includes an indicator that selection of the content item will resume playback at the previous playback progress position. In some embodiments, representation 1814-2 includes a playback progress indicator that indicates the user's previous (or furthest) playback progress through the respective content item. In some embodiments, representation 1814-3 includes an indicator of how much time is remaining in the content item (e.g., 1 hour 5 minutes left) and an icon (e.g., the name, the content provider's logo, etc.) indicating the content provider that is providing the access to the content item (e.g., content provider XYZ). In some embodiments, any of the representations can have any combination of the above-described representations. In some embodiments, any or all of the indicators described above are not displayed until the user moves pointer 1801 to hover over the respective content item.

In some embodiments, the top of user interface 1810-1 is content preview region 1812. In some embodiments, content preview region 1812 shares similar features as content display region 614 described above. In some embodiments, content preview region 1812 displays a preview of the content item over which pointer 1801 is hovering. In some embodiments, if pointer 1801 is not hovering over any content item, then content preview region 1812 continues displaying a preview of the content item that pointer 1801 was previously hovering over. In some embodiments, if pointer 1801 has not hovered over any content item (such as when unified media browsing application 1800 is initially displayed), then content preview region 1812 displays a preview of the first content item recommended to the user (e.g., Item A). In some embodiments, the first row of content items are displayed overlaid over content preview region 1812 (e.g., optionally over the lower portion of content preview region 1812 as shown in FIG. 18A).

In FIG. 18B, user input 1803 corresponding to a navigation input (e.g., a swipe on a touch sensitive surface 451 or a corresponding movement of a mouse or other pointing device) is received, thus moving pointer 1801 to hover over representation 1814-1 corresponding to Item A. In some embodiments, in response to the user input moving pointer 1801 to hover over representation 1814-1, play icon 1816 (e.g., in the bottom-left corner) and menu icon 1818 (e.g., in the bottom-right corner) are displayed overlaid over representation 1814-1. In some embodiments, play icon 1816 is selectable to cause playback of the respective content item. It is understood that play icons on any representation discussed herein (e.g., FIGS. 18-22) are selectable to cause playback of the respective content item unless otherwise stated. In some embodiments, playback of the respective content item occurs within the unified media browsing application 1800 (e.g., in a playback user interface). In some embodiments, playback of the respective content item occurs in a separate window or separate application. In some embodiments, play icon 1816 is only displayed if the user has entitlement to view the respective content item. In some embodiments, play icon 1816 is displayed even if the user does not have entitlement to view the respective content item and, if the user is not entitled to view the content item, is selectable to initiate a process for acquiring entitlement to the content item. In some embodiments, menu icon 1818 is selectable to cause the display of a menu associated with the content item. It is understood that menu icons on any representation or user interface discussed herein (e.g., FIGS. 18-22) are selectable to cause display of a menu associated with the respective content item unless otherwise stated. In some embodiments, navigational indicators 1817-1 and 1817-2 are displayed on the right and left sides of the row of representations, respectively, indicating that the row of icons are horizontally scrollable to reveal further representations of content items. In some embodiments, navigational indicators 1817-1 and 1817-2 are selectable to cause the row of representations to scroll in a respective direction to reveal further representations of content items. In some embodiments, navigational indicators 1817-1 and 1817-2 are displayed whenever pointer 1801 is within the respective row of representations (e.g., between or to the left and/or right of the representations within the row and not only hovering over a representation in the row).

Figure 18C:
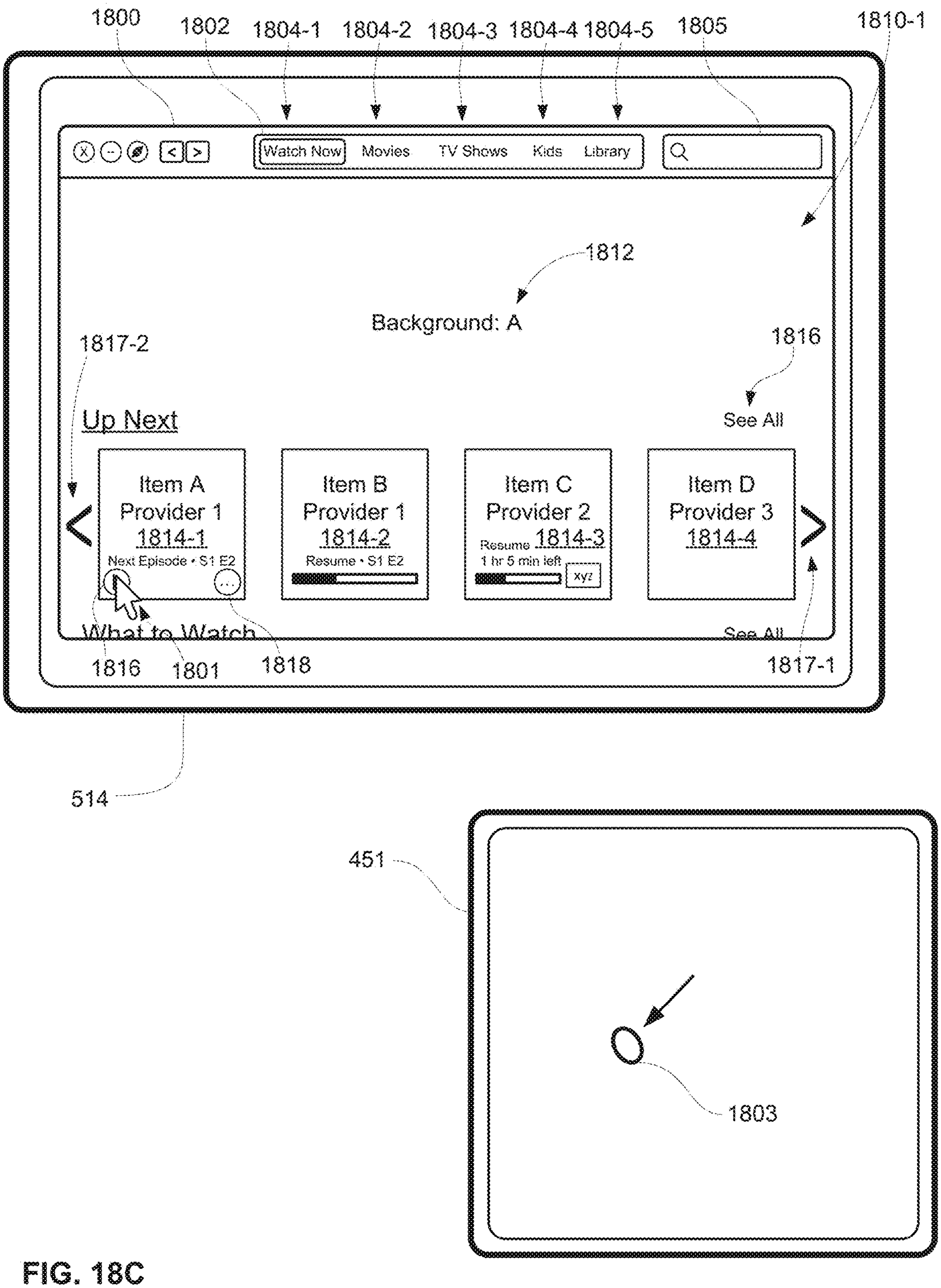
Figure 18D:
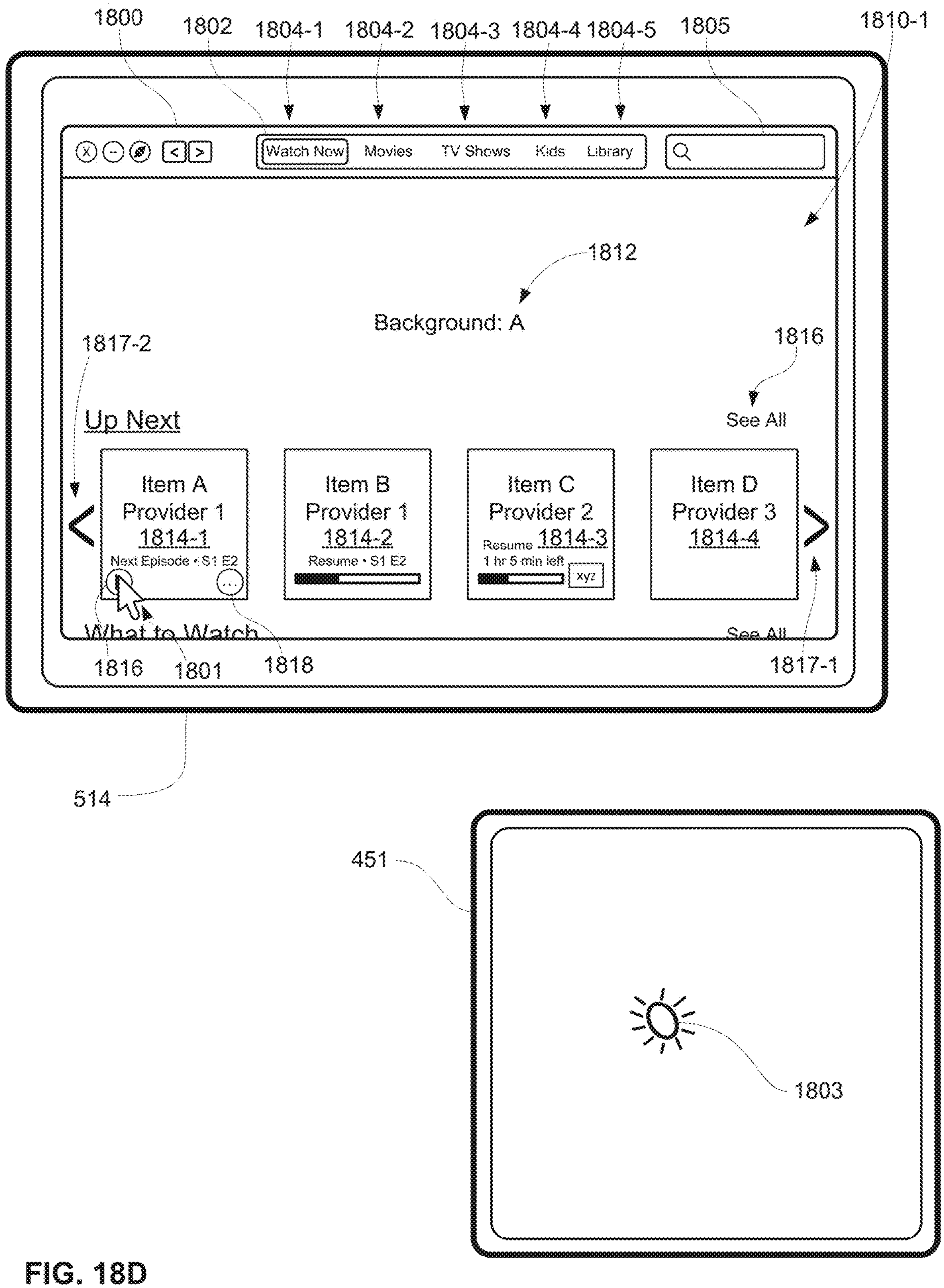
Figure 18E:
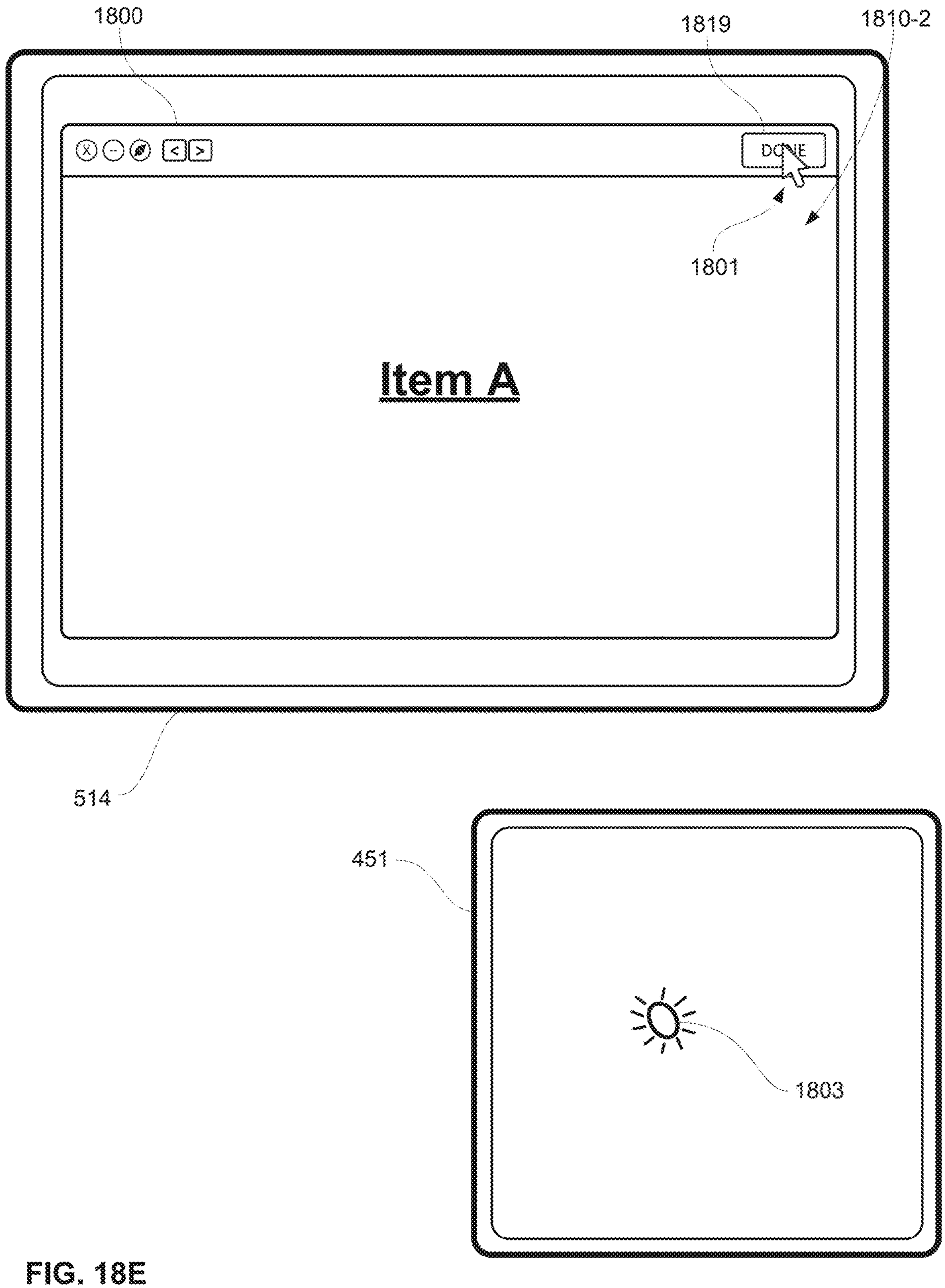

In FIG. 18C, user input 1803 corresponding to a navigation input is received, thus moving pointer 1801 to hover over play icon 1801 of representation 1814-1. In FIG. 18D, user input 1803 corresponding to a selection input (e.g., a contact with greater than threshold intensity (e.g., a click) on a touch sensitive surface 451 or a left-click on a mouse or other pointing device) is received while pointer 1801 is hovering over play icon 1816. In some embodiments, in response to the user input, device 500 causes playback of the respective content item, as shown in FIG. 18E. In some embodiments, playback occurs in a playback user interface 1810-2 within the unified media browsing application 1800. In some embodiments, playback occurs in a separate window of the unified media browsing application 1800. In some embodiments, a separate application (e.g., different from the unified media browsing application) is displayed and playback occurs in the separate application. In some embodiments, during playback, unified media browsing application 1800 no longer displays navigation bar 1802 and search field 1805. In some embodiments, unified media browsing application 1800 includes selectable option 1819 that is selectable to exit content playback and return to the user interface that was displayed before playback began.

In FIG. 18E, user input 1803 corresponding to a selection input is received while pointer 1801 is hovering over selectable option 1819. In some embodiments, in response to the user input, device 500 exits content playback and replaces display of user interface 1810-2 with user interface 1810-1, as shown in FIG. 18F.

Figure 18F:
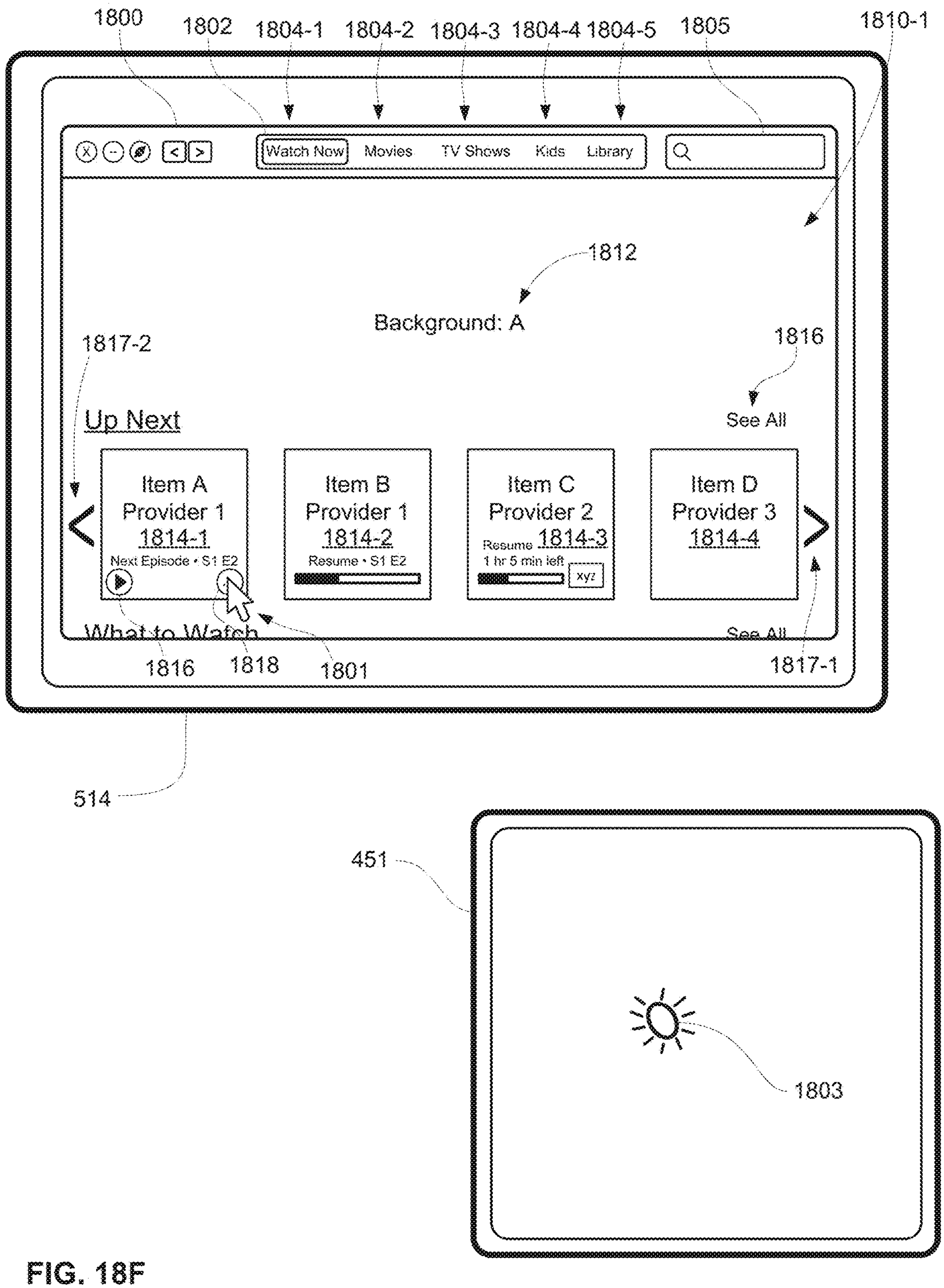
Figure 18G:
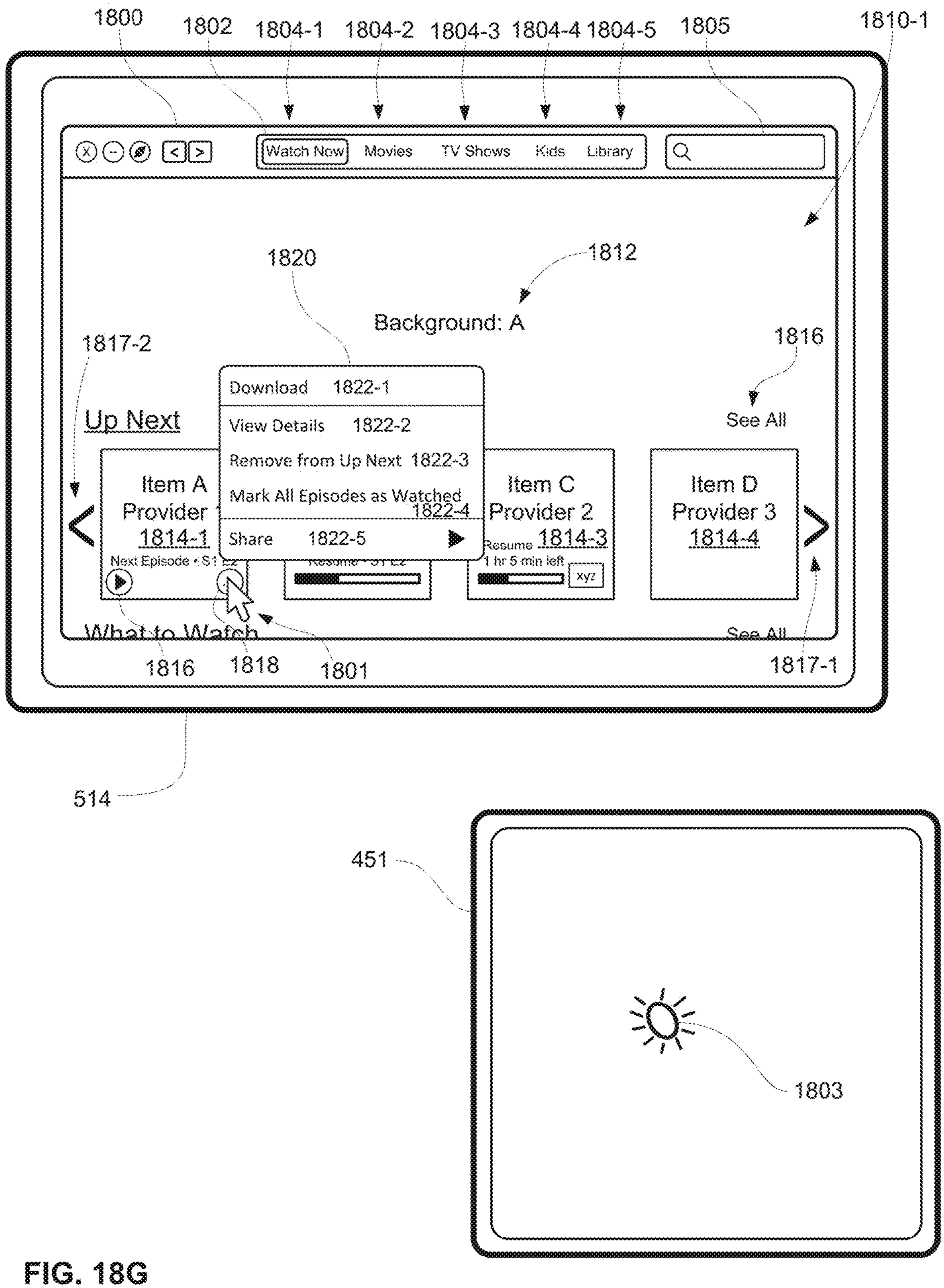

In FIG. 18F, user input 1803 corresponding to a selection input is received while pointer 1801 is hovering over menu icon 1818. In some embodiments, in response to the user input, device 500 displays contextual menu 1820, as shown in FIG. 18G. In some embodiments, contextual menu 1820 includes one or more selectable options associated with the respective content item. In some embodiments, contextual menu 1820 presents different selectable options based on the context (e.g., which user interface the contextual menu is displayed on, whether the user has partially watched the content item, whether the content item is in the Up Next queue, etc.). As shown in FIG. 18G, in some embodiments, contextual menu 1820 includes selectable option 1822-1 that is selectable to download the respective content item (e.g., for offline viewing), selectable option 1822-2 that is selectable to display a product page for the content item, selectable option 1822-3 that is selectable to remove the content item from the Up Next row of content items, selectable option 1822-4 that is selectable to mark all episodes as watched (e.g., such that the next episode is not recommended to the user), and selectable option 1822-5 that is selectable to display a further menu for selecting one or more methods of sharing the content item with another user (e.g., via email, text message, instant messaging service, etc.).

In FIG. 18G, user input 1803 corresponding to a selection input is received while pointer 1801 is hovering over the menu item and while contextual menu 1820 is displayed. In some embodiments, in response to the user input, contextual menu 1820 is dismissed, as shown in FIG. 18H.

Figure 18H:
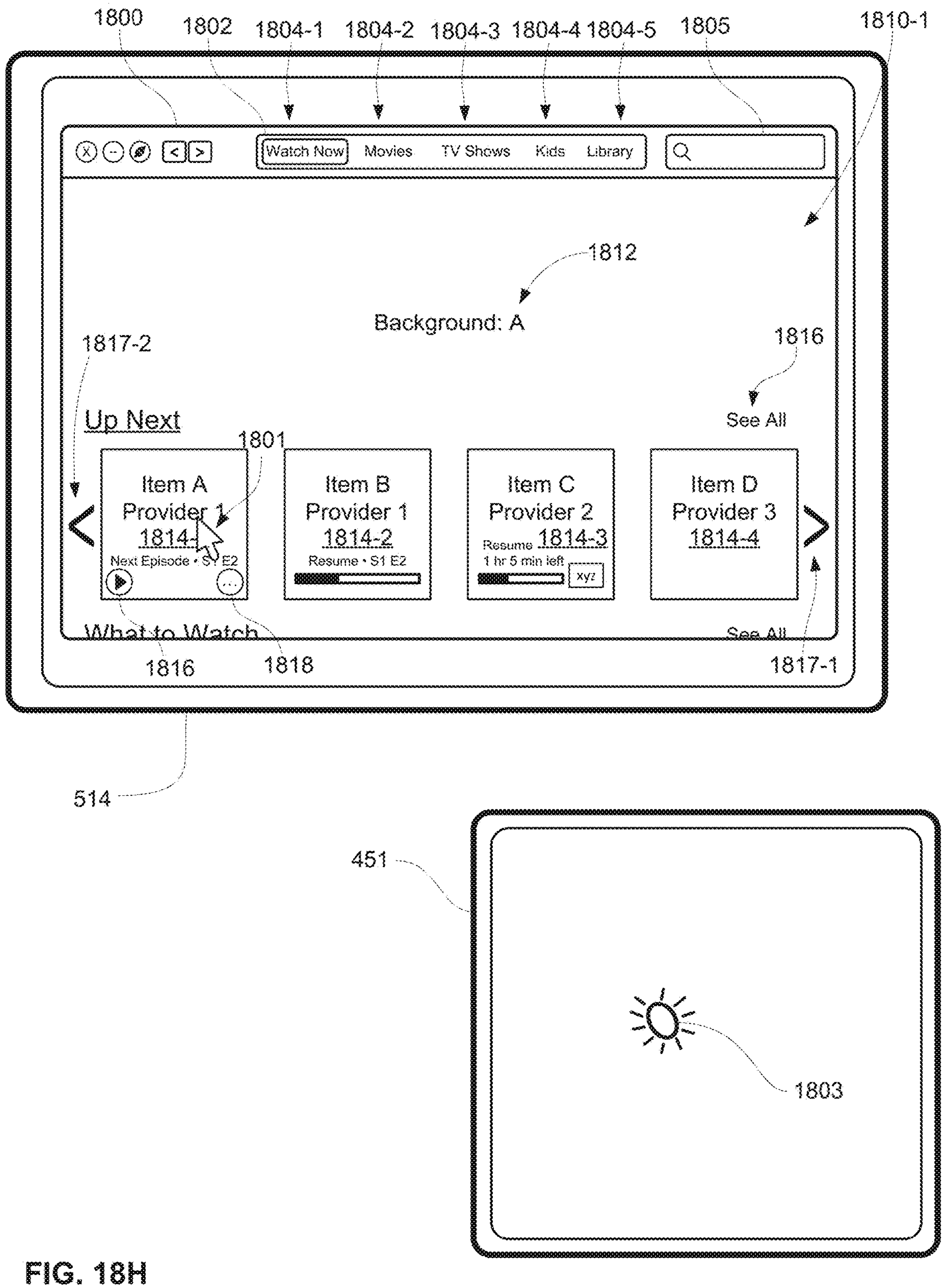
Figure 18I:
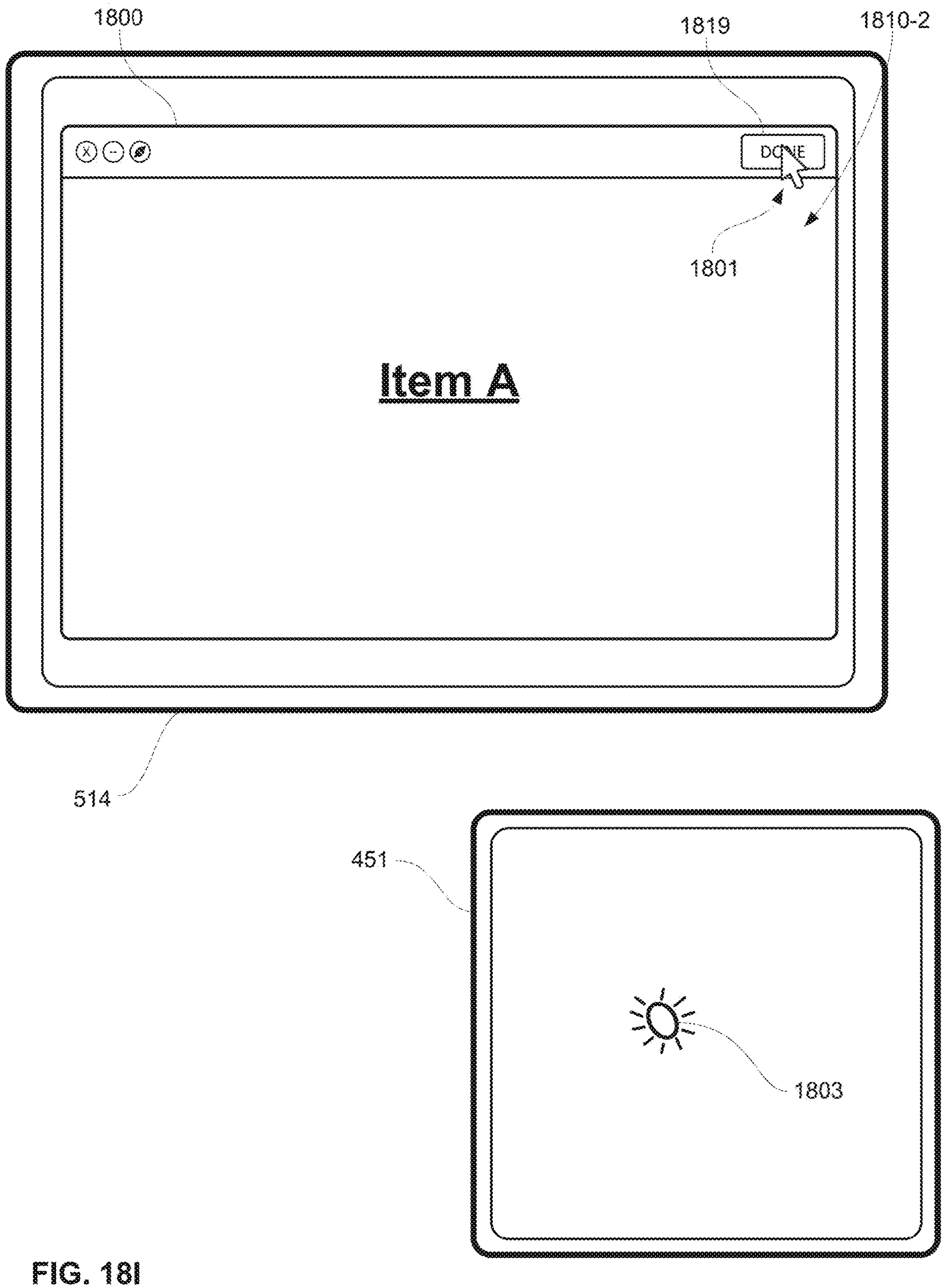

In FIG. 18H, user input 1803 corresponding to a selection input is received while pointer 1801 is hovering over representation 1814-1 outside of the area of play icon 1816 and menu icon 1818. In some embodiments, in response to the user input, device 500 causes playback of Item A, as shown in FIG. 18I. Thus, in some embodiments, for certain content items, such as the content items in the Up Next row of items, selection of anywhere in the representation outside of menu icon 1818 (e.g., including play icon 1816), causes playback of the respective content item.

Figure 18J:
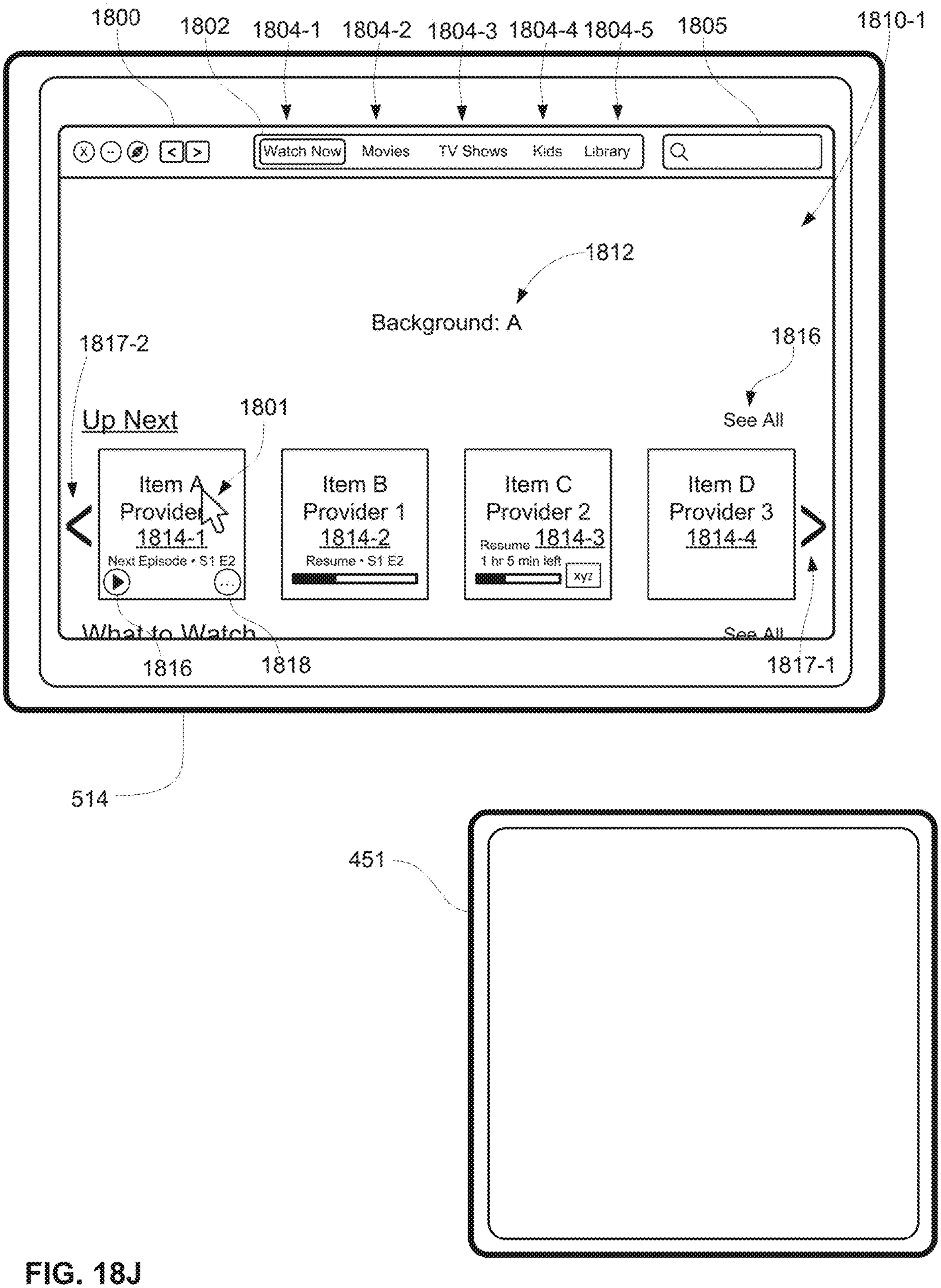

In FIG. 18I, user input 1803 corresponding to a selection input is received while pointer 1801 is hovering over selectable option 1819. In some embodiments, in response to the user input, device 500 exits content playback and displays user interface 1810-1 (e.g., the user interface that was displayed before content playback began), as shown in FIG. 18J.

Figure 18K:
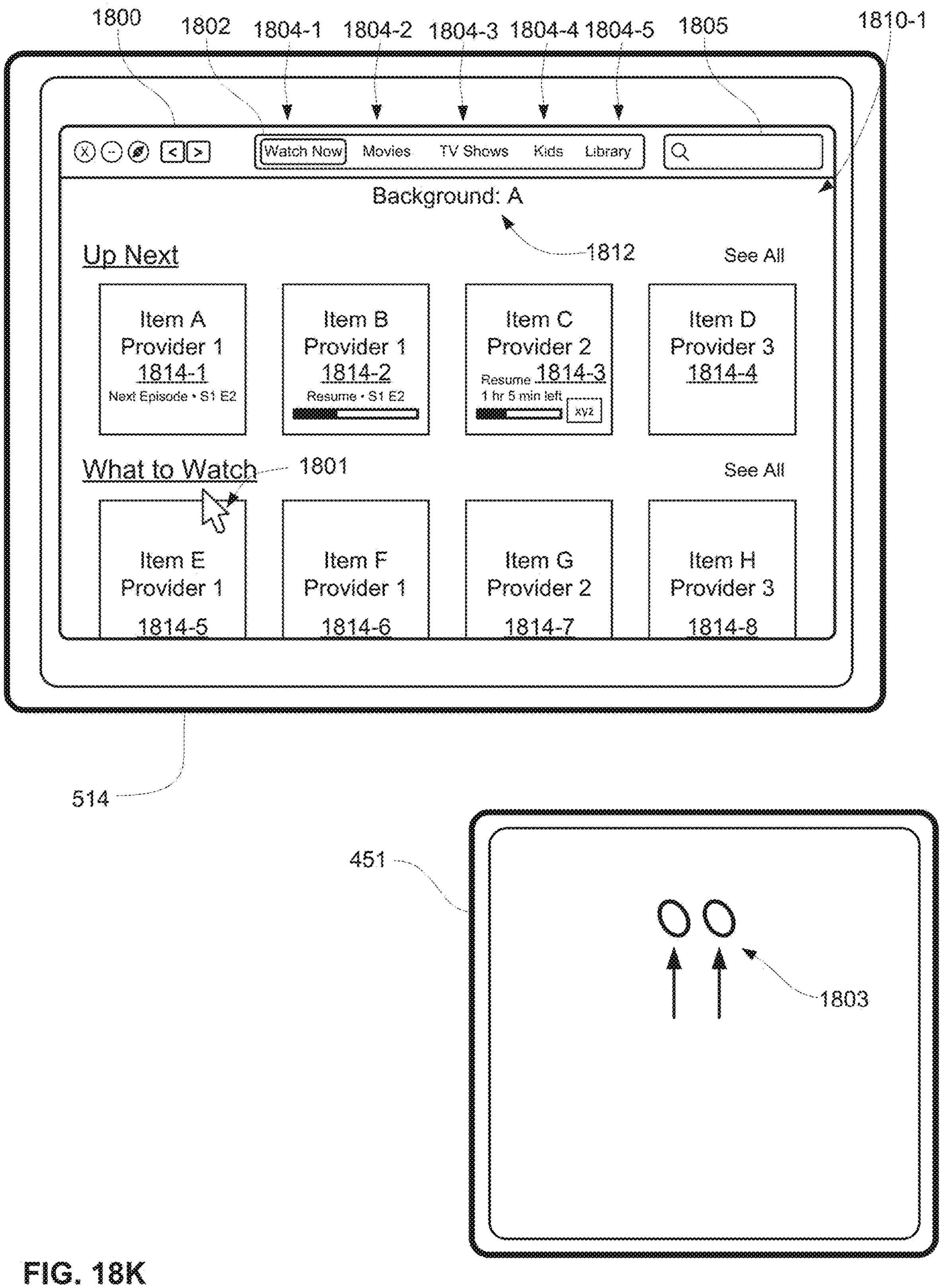

In FIG. 18K, user input 1803 corresponding to a navigation input (e.g., a dual-contact upward (or downward) swipe on a touch sensitive surface 451, an upward (or downward) scroll of a mouse wheel on a mouse or other pointing device, or a downward navigation on a scroll bar (not shown)) is received. In some embodiments, in response to the user input, user interface 1810-1 is scrolled downwards to reveal further rows of content. In some embodiments, the content preview region 1812 is moved upwards (e.g., scrolled upwards). In some embodiments, the lower boundary of the content preview region 1812 is the same as where it was before (e.g., at the bottom of the Up Next row 1814). Thus, in some embodiments, the content preview region 1812 is also scrolled upwards in the same manner that the Up Next row is also scrolled upwards (e.g., a portion of the top of content preview region 1812 is no longer displayed as it is beyond the top of user interface 1810-1). In some embodiments, the content preview region 1812 does not change the content that is being displayed. Thus, in some embodiments, the content preview region 1812 continues displaying content from the previous item over which pointer 1801 was hovering. In some embodiments, if the content preview region 1812 was displaying a video preview, then the video preview is paused (e.g., and if the content preview region 1812 was displaying a slideshow, the slideshow is frozen at a respective photo that was shown at the time the downward input was received).

Figure 18L:
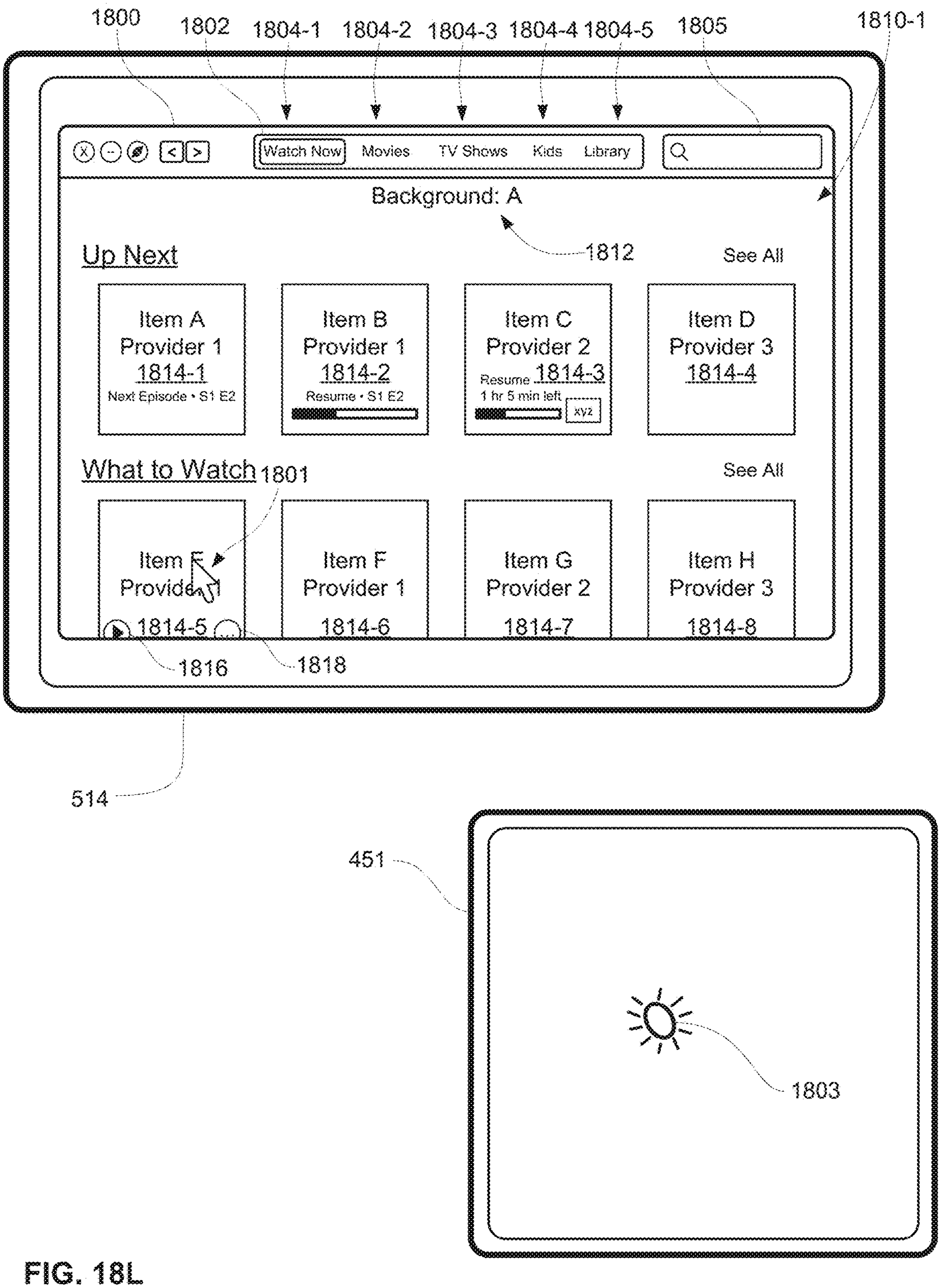
Figure 18M:
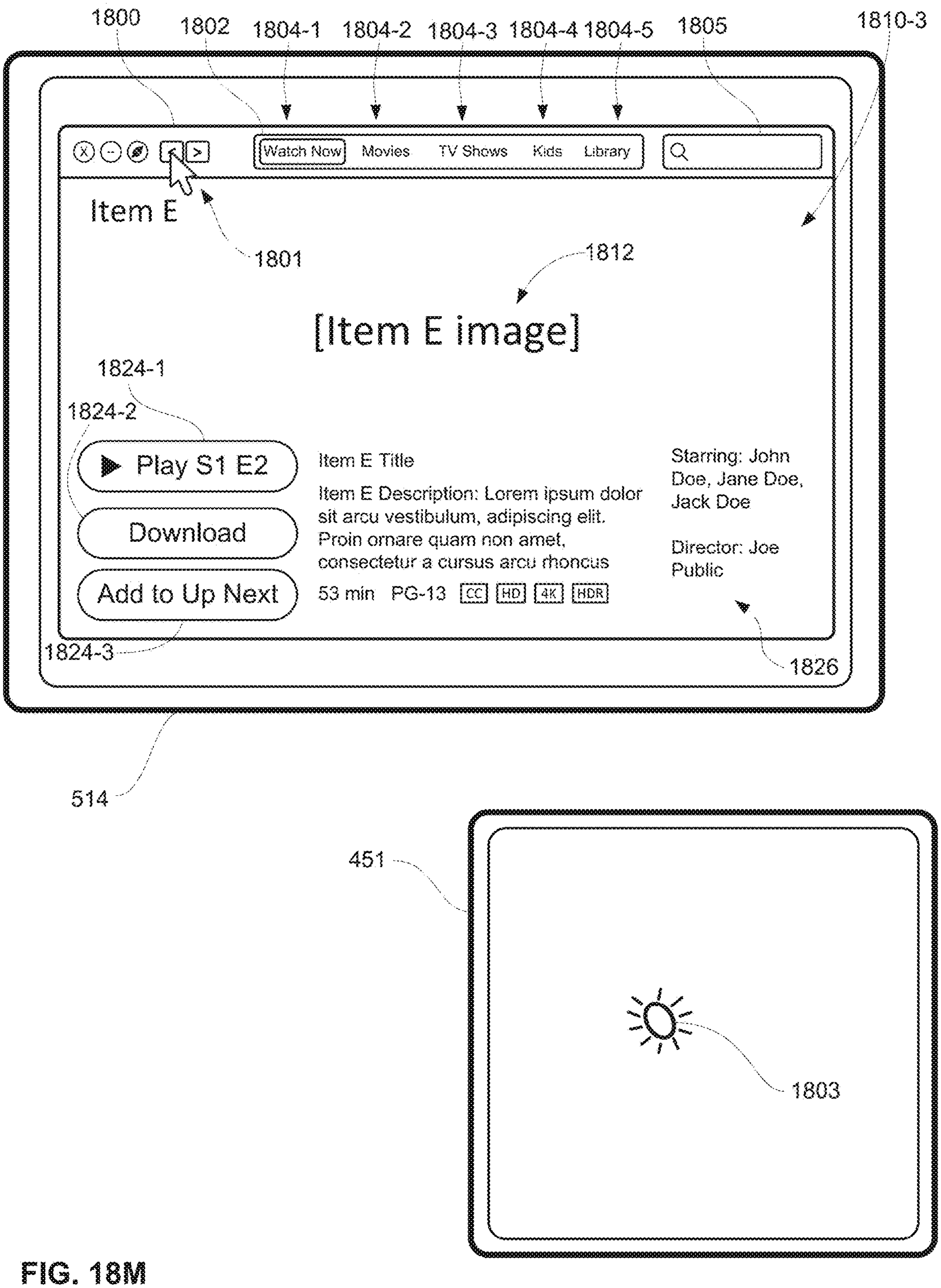

In FIG. 18L, a user input corresponding to a selection input is received while pointer 1801 is hovering over representation 1814-5 corresponding to Item E (e.g., not over play icon 1816 or menu icon 1818, which were displayed in response to the user hovering pointer 1801 over representation 1814-5). In some embodiments, in response to the user input, device 500 replaces display of user interface 1810-1 with user interface 1810-3, as shown in FIG. 18M. In some embodiments, user interface 1810-3 is a user interface for the content item (e.g., a product page of Item E). In some embodiments, user interface 1810-3 includes an image preview 1812 of Item E and one or more selectable options 1824-1 to 1824-3 and information 1826 overlaid over the image preview 1812.

In some embodiments, selectable option 1824-1 is selectable to cause playback of season 1, episode 2 (e.g., the next episode that the user has not yet watched) of Item E. In some embodiments, selectable option 1824-2 is selectable to initiate a process for downloading Item E (e.g., optionally season 1, episode 2 of Item E, every episode of Item E, or display a user interface for selecting which episodes of Item E to download). In some embodiments, selectable option 1824-3 is selectable to add Item E to the Up Next row of items. In some embodiments, if Item E is already in the Up Next row of items, then selectable option 1824-3 is selectable to remove Item E from the Up Next row of items. In some embodiments, information 1826 displays information about the content item such as the title, a synopsis or short description, the duration, certain content format options (e.g., closed captioning features, audio or video quality, etc.), viewer or critics ratings, maturity ratings, information about the director and/or actors in the content item, or a subset or any combination of the foregoing. Further details about the product page will be described below with respect to FIGS. 20B-20T.

Figure 18N:
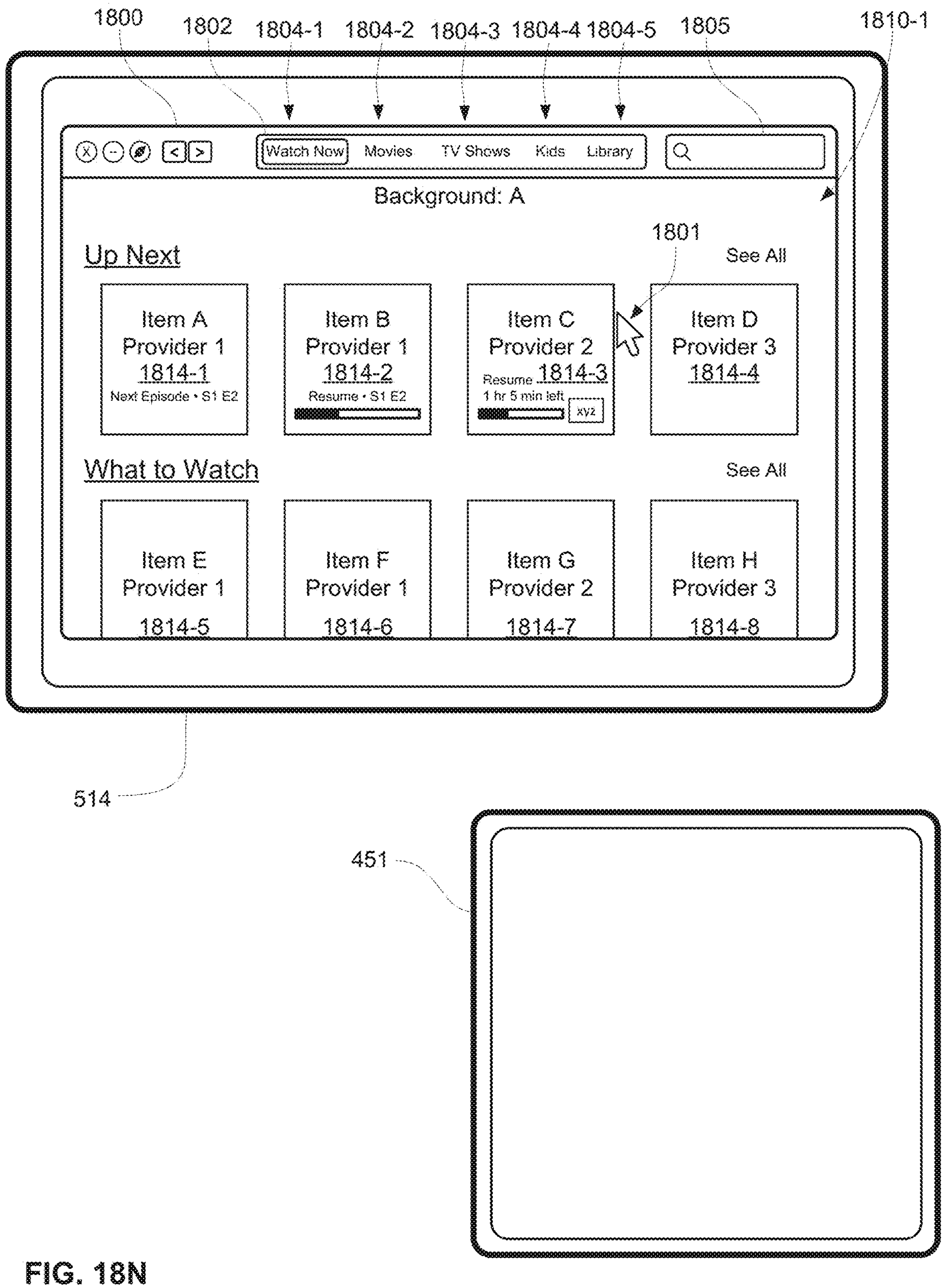

In FIG. 18M, user input 1803 is received while pointer 1801 is hovering over the "back" button. In some embodiments, in response to the user input, device 500 navigates unified media browsing application 1800 to the previously displayed user interface (E.g., user interface 1810-1), as shown in FIG. 18N.

Figure 18O:
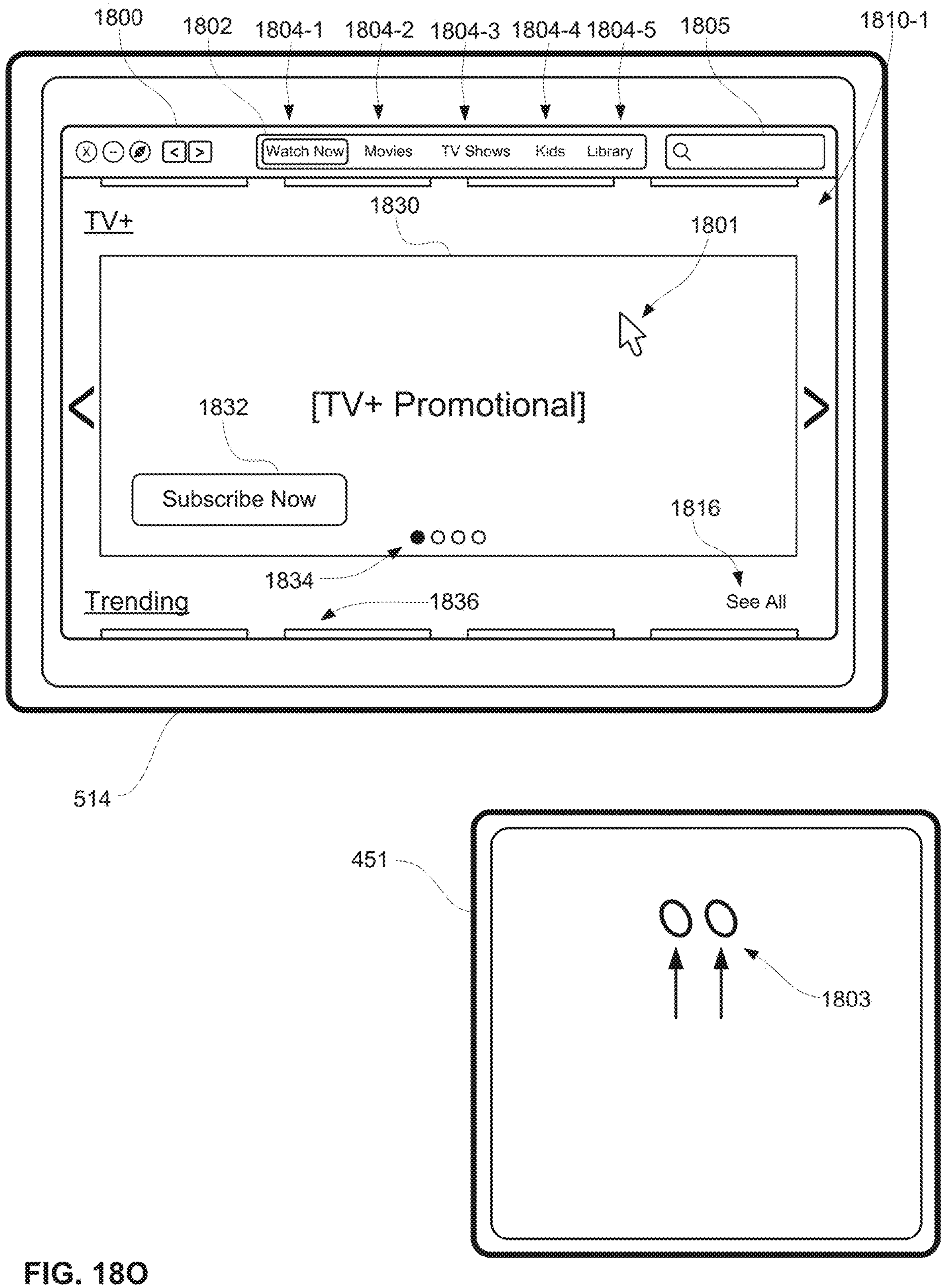

In FIG. 18O, a user input 1803 corresponding to an upward navigation is received. In some embodiments, in response to the user input, user interface 1810-1 is scrolled upward to reveal promotional banner 1801. In some embodiments, promotional banner 1801 promotes a subscription service and includes selectable option 1832 that is selectable to initiate a process for subscribing to the subscription service. In some embodiments, the row including promotional banner 1830 is scrollable to reveal other promotional banners and/or other large representations of content items. In some embodiments, further rows of content items (e.g., the trending row 1836) are displayed below promotional banner 1830. It is understood that the sequence of rows of items shown is merely exemplary and in any arrangement of the rows of content and any additional rows of content are possible without departing from the scope of the disclosure.

Figure 18P:
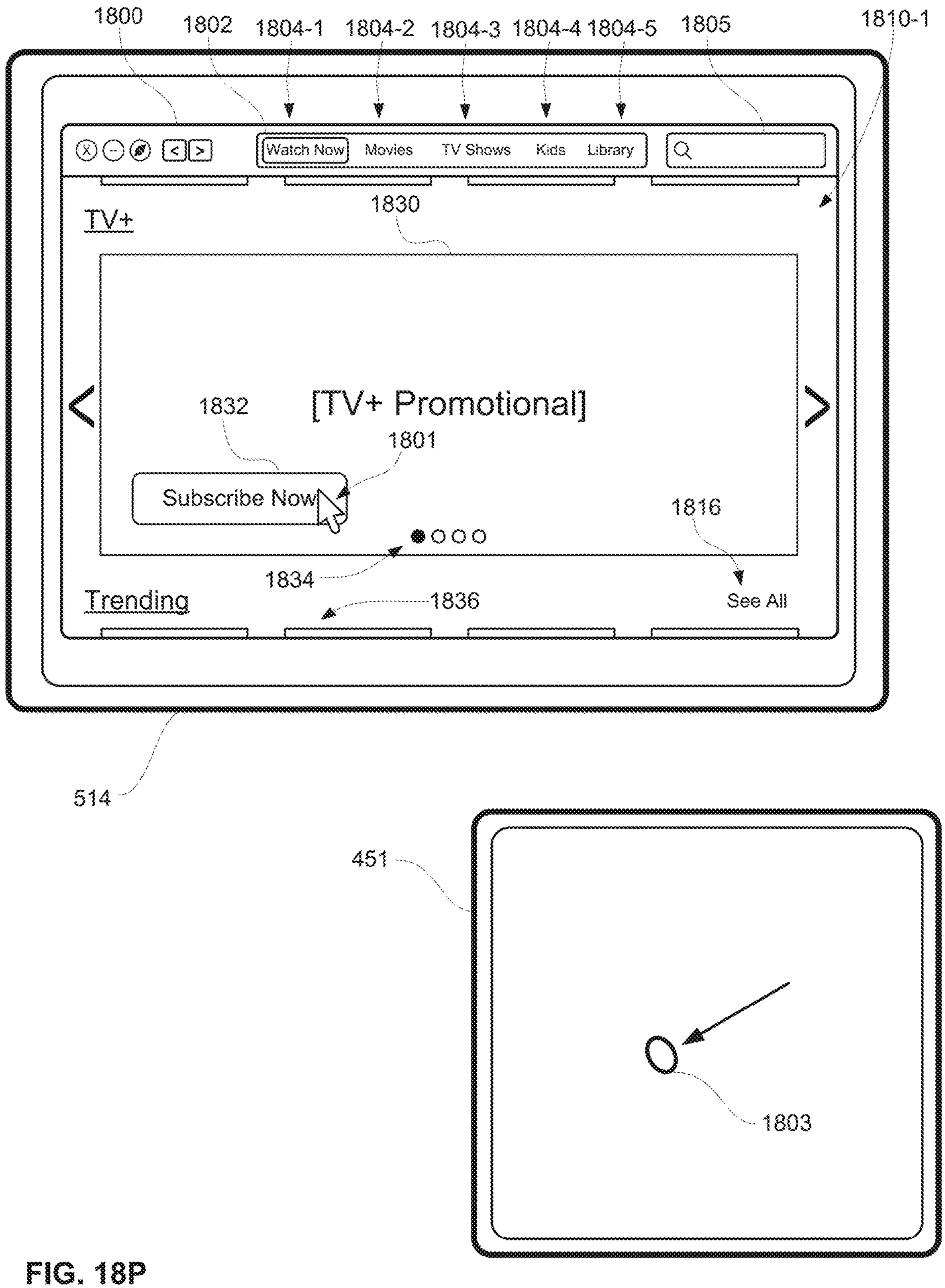
Figure 18Q:
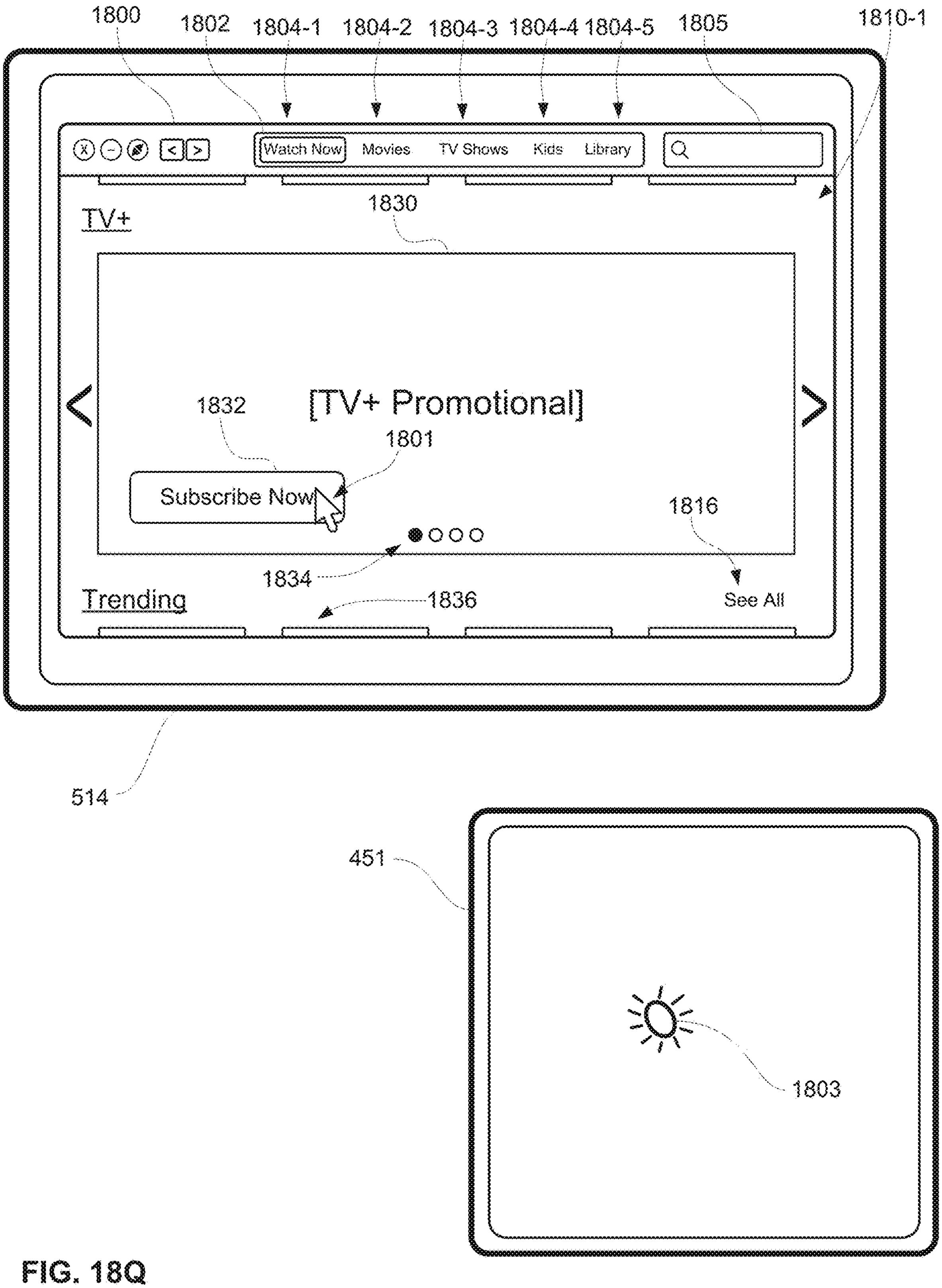
Figure 18R:
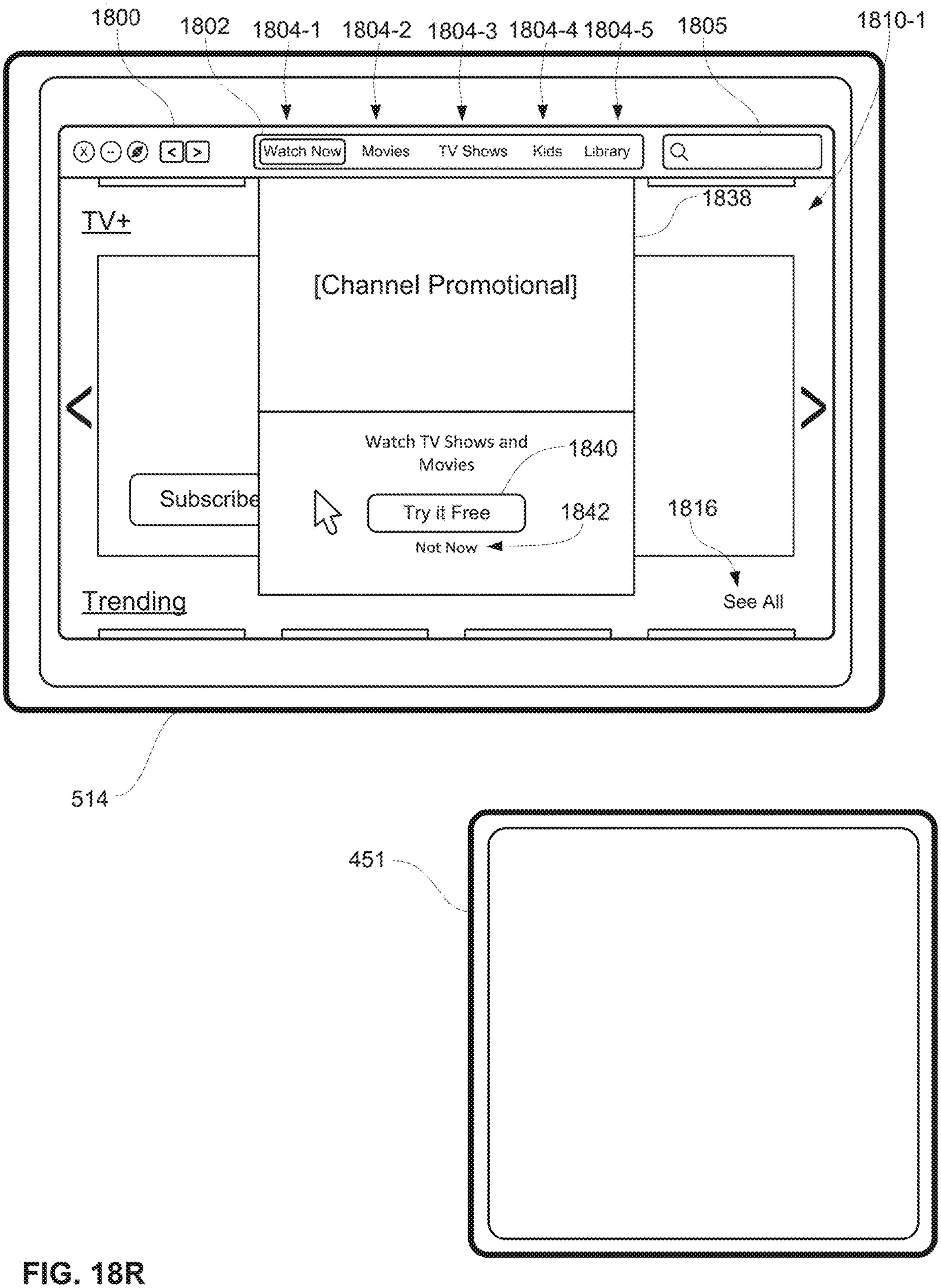

In FIG. 18P-18Q, a user input 1803 navigating to and selecting selectable option 1832. In some embodiments, in response to the user input, subscription card 1838 is displayed, as shown in FIG. 18R. In some embodiments, subscription card 1838 is a user interface element that is displayed overlaid over user interface 1810-1. In some embodiments, subscription card includes a promotional graphic (e.g., image or video) and information about the subscription service (e.g., a subscription service that provides content in the unified media browsing application). In some embodiments, subscription card 1838 includes selectable options 1840 and 1842. In some embodiments, selectable option 1840 is selectable to initiate a process of subscribing to the subscription service (e.g., or activate a free trial, as the case may be). In some embodiments, selectable option 1842 is selectable to dismiss subscription card 1838 without initiating a process for subscribing to the subscription service.

Figure 18S:
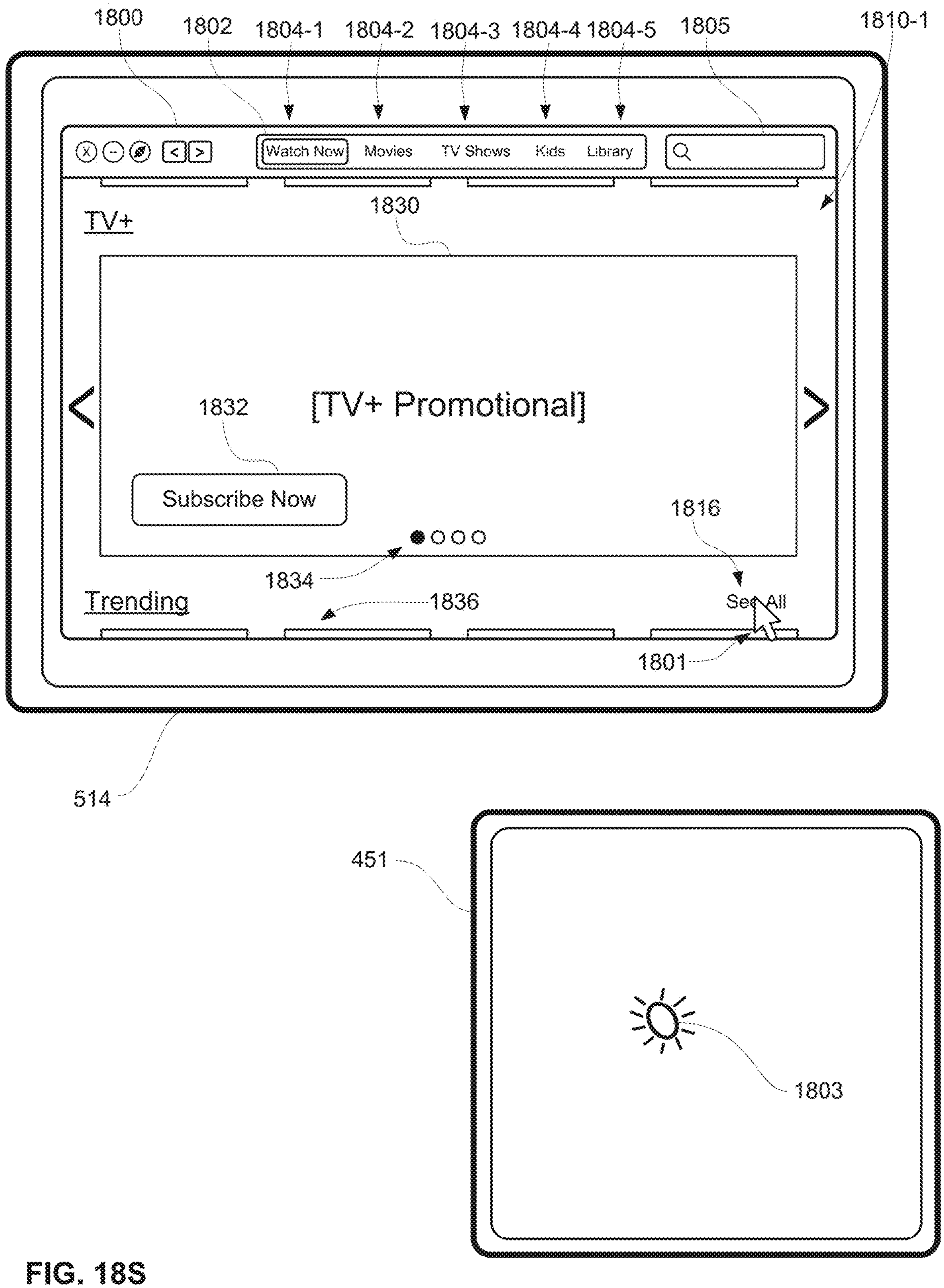
Figure 18T:
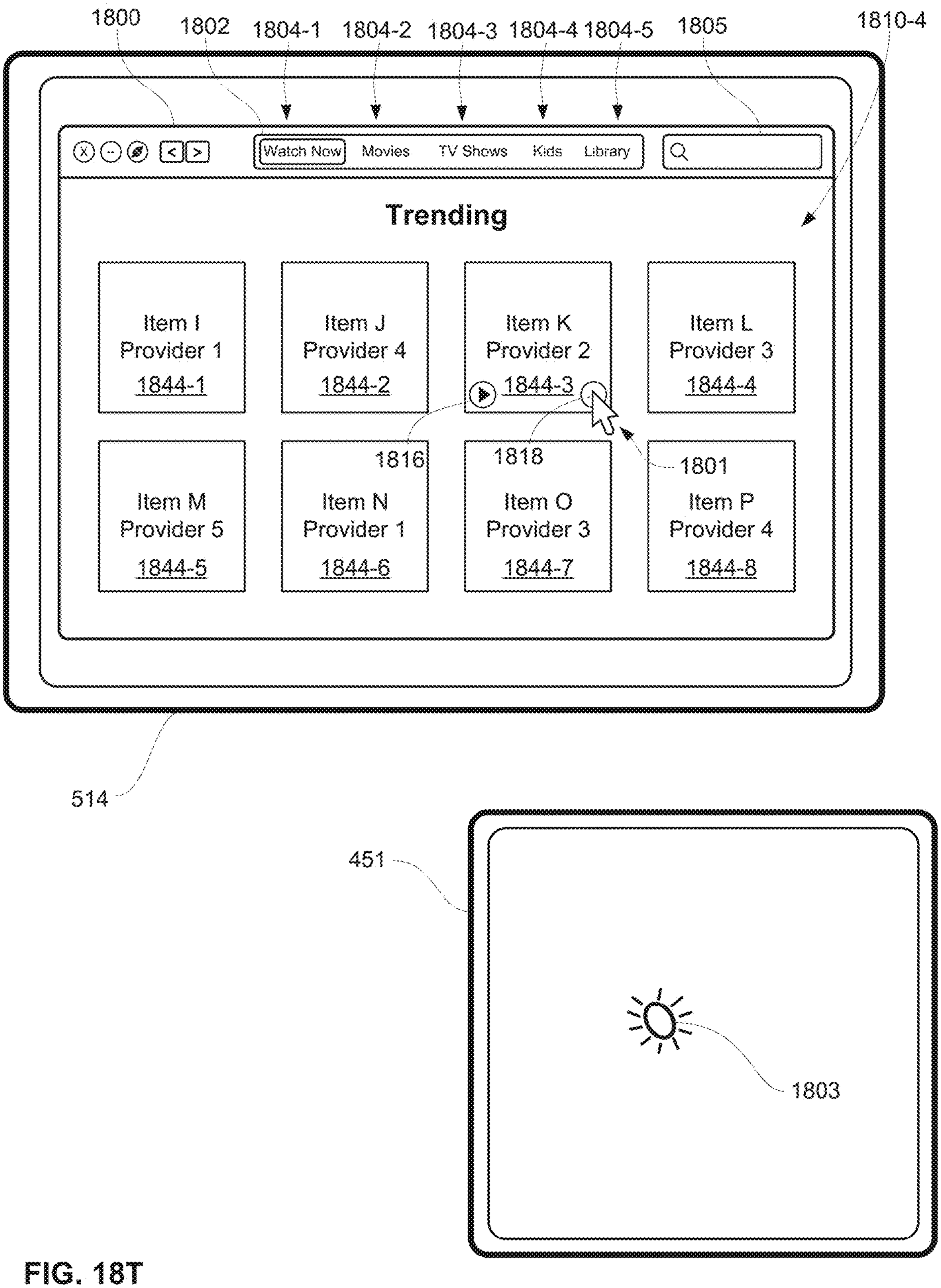

In FIG. 18S, user input 1803 corresponding to a selection input is received while pointer 1801 is hovering over the "See All" selectable option 1816. In some embodiments, in response to the user input, device 500 replaces display of user interface 1810-1 with user interface 1810-4, as shown in FIG. 18T. In some embodiments, user interface 1810-4 displays (representations of) all of the content items included in the respective category of content items (e.g., the Trending category). In some embodiments, user interface 1810-4 is vertically scrollable to reveal further content items in the respective category.

Figure 18U:
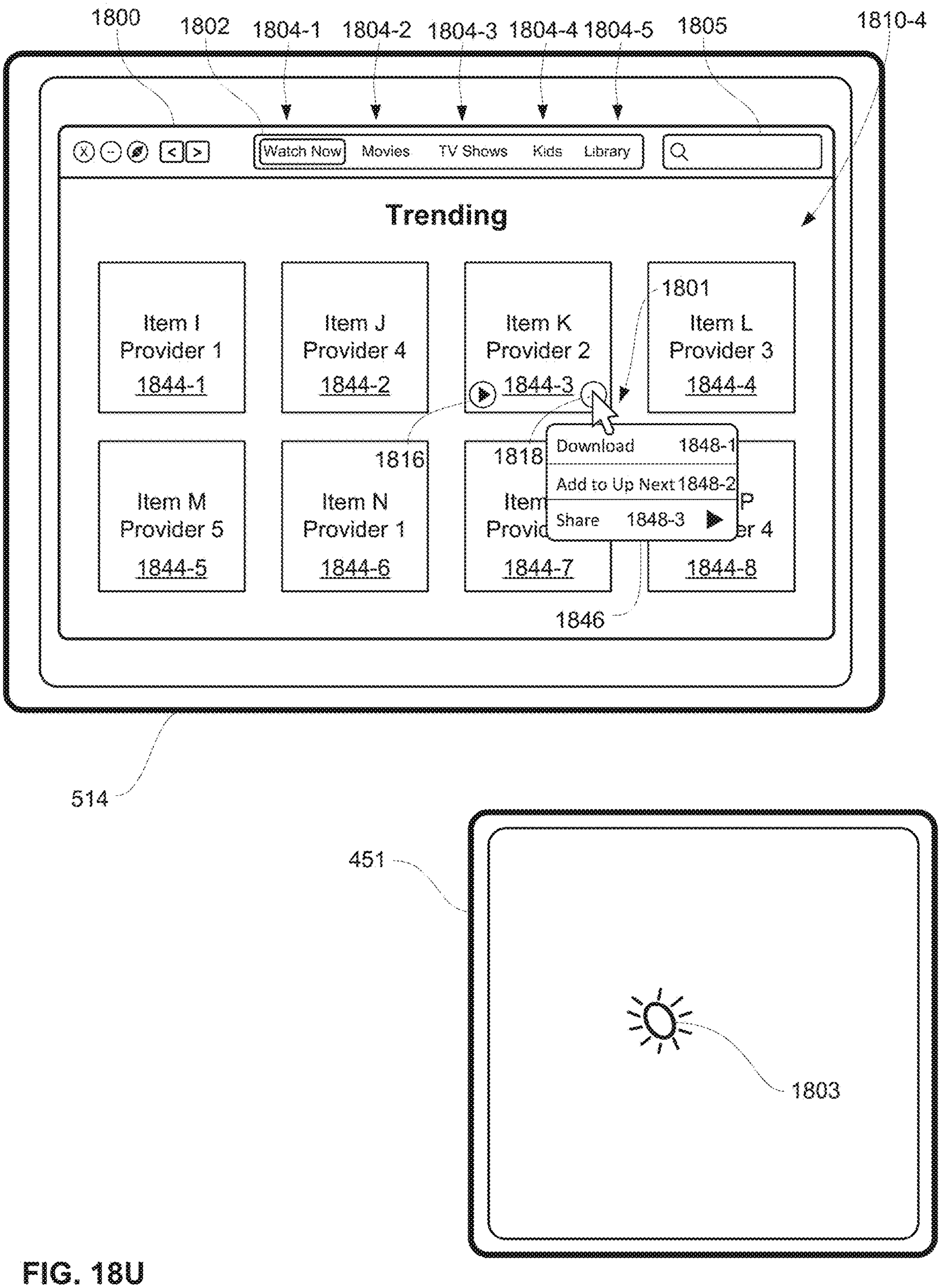

In FIG. 18T, user input 1803 is received selecting the menu icon 1818 of representation 1844-3 (e.g., that was displayed in response to the user hovering pointer 1801 over representation 1844-3). In some embodiments, in response to the user input, contextual menu 1846 is displayed, as shown in FIG. 18U. In some embodiments, contextual menu 1846 includes selectable option 1848-1 that is selectable to download the respective content item. In some embodiments, contextual menu 1846 includes selectable option 1848-2 that is selectable to add the respective content item to the Up Next row of items. In some embodiments, contextual menu 1846 includes selectable option 1848-3 that is selectable to display a further menu for selecting one or more methods of sharing the content item with another user (e.g., via email, text message, instant messaging service, etc.). Thus, in some embodiments, different options are presented in response to the selection of menu icon 1818 depending on the context of respective content item.

In FIG. 18U, user input 1803 corresponding to a selection input is received while pointer 1801 is hovering over menu icon 1818 and while contextual menu 1846 is displayed. In some embodiments, in response to the user input, contextual menu 1846 is dismissed, as shown in FIG. 18V.

Figure 18V:
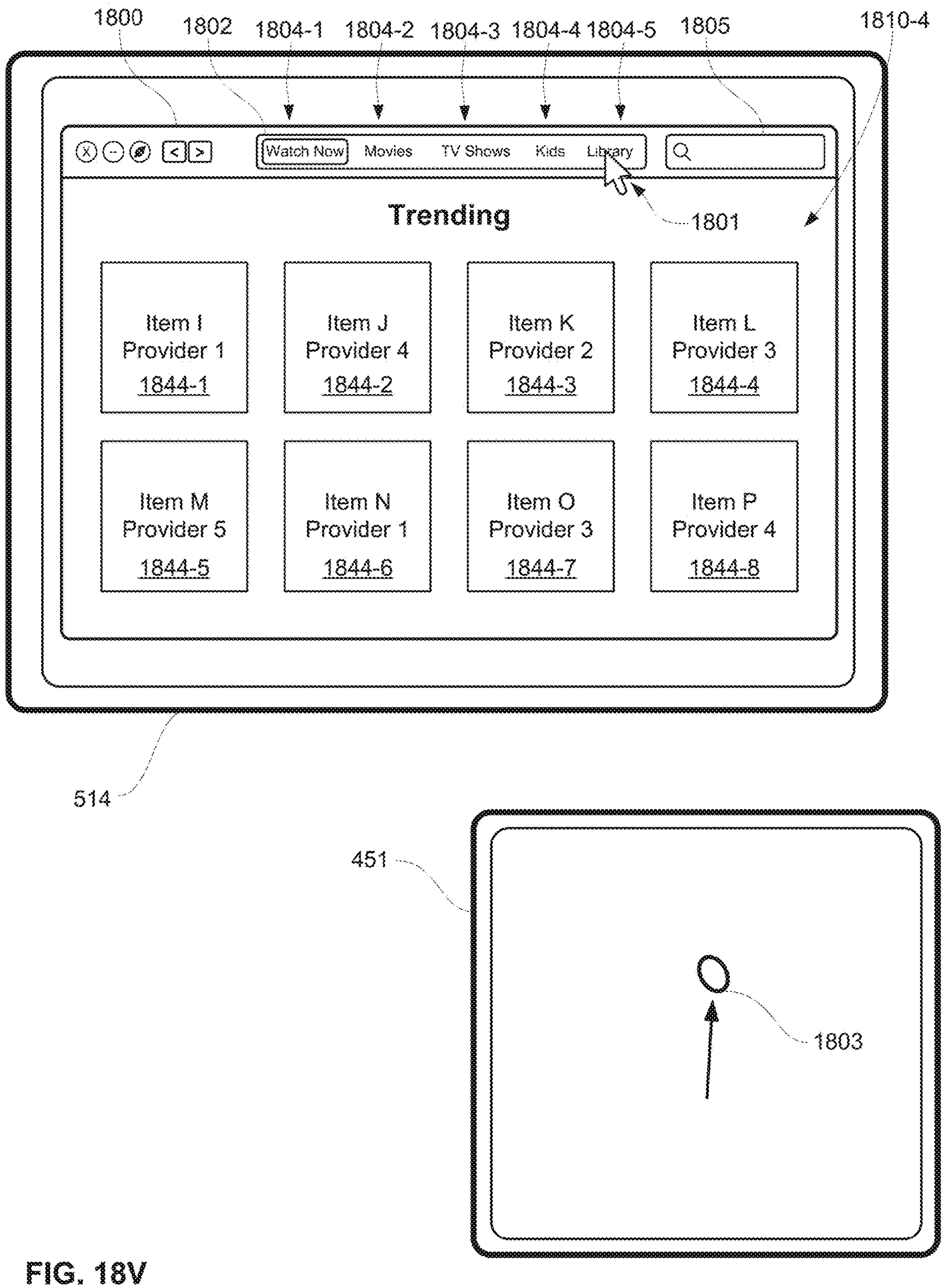
Figure 18W:
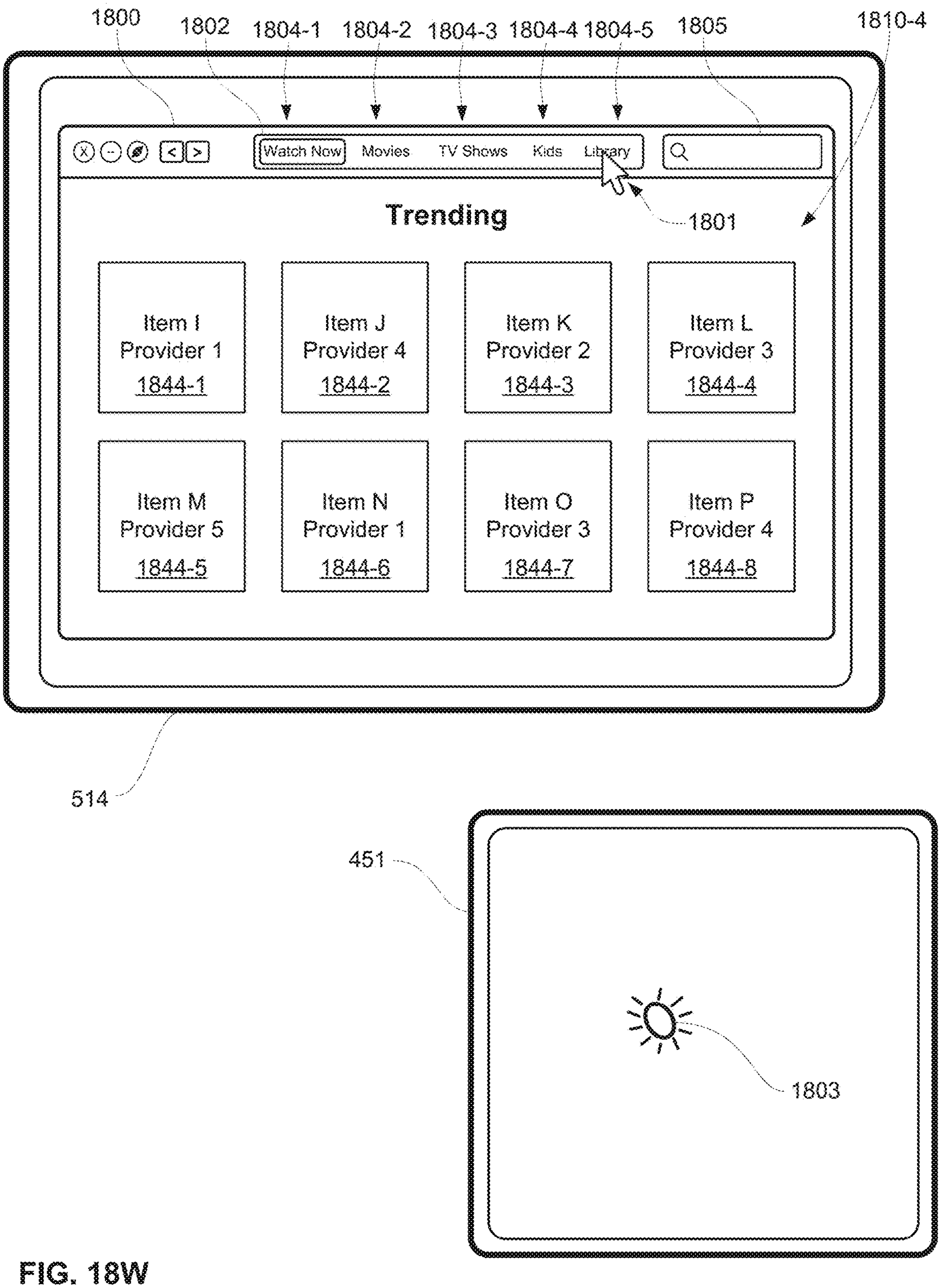

In FIG. 18V, user input 1803 corresponding to a navigation input is received, thus moving pointer 1801 to hover over selectable option 1804-5 on navigation bar 1802 corresponding to the "Library" page of unified media browsing application 1800. In FIG. 18W, user input 1803 corresponding to a selection input is received while pointer 1801 is hovering over selectable option 1804-5. In some embodiments, in response to the user input, device 500 replaces display of user interface 1810-4 with user interface 1810-5. In some embodiments, user interface 1810-5 corresponds to a library user interface, which provides the user with the ability to browse through, interact with, and cause playback of content that the user has purchased access to, downloaded, or are otherwise included in the user's personal library of content.

In some embodiments, user interface 1810-5 includes navigation panel 1850 on the left side of the user interface and a content browse region displayed to the right of navigation panel 1850. In some embodiments, navigation panel 1850 includes one or more categories of items included in the user's personal library, one or more genres of items included in the user's personal library, and one or more playlists in the user's library. In some embodiments, each of the categories of items, genres, and playlists are selectable to cause content browse region to display the content items that correspond to the selected collection. For example, in FIG. 18X, "Recently Added" category is currently active and content browse region includes representations 1858-1 to 1858-7 corresponding to content items that correspond to the "Recently Added" category of items. In some embodiments, the recently added category includes content items that have been recently added to the user's library (e.g., within the last week, within the last month, etc.). In some embodiments, the recently added category includes content items that are rented, such as representation 1858-6 corresponding to Item F, which the user has rented. In some embodiments, a rented item includes expiration badge 1860 that indicates the length of time remaining in the user's rental. In some embodiments, rental badge 1860 can be displayed on representations of any rented items that are displayed on any of the library user interfaces (e.g., while another category in the library is active and the content browsing region is displaying representations of content from other categories). In some embodiments, the categories displayed in the navigation panel 1850 are dynamically updated such that only the categories that contain items are displayed in navigation panel 1850. For example, in some embodiments, if the user has not rented any items, then the rental category 1852-4 is not displayed. Similarly, in some embodiments, if the user's library does not contain any items in the animation genre, then animation category 1854-1 is not displayed on navigation panel 1850. Similarly, in some embodiments, if the user's library does not contain any playlists, then the playlist categories are not displayed on navigation panel 1850.

It is understood that user interfaces for the "Movies" page, "TV Shows" page and "Kids" page share similar features as user interface 1810-1 for the "Watch Now" page, except that the content items displayed within are filtered for the respective category of content (e.g., the Movies page only displays movies, the TV Shows page only displays TV shows, and the Kids page only displays children's content, etc.).

Figure 18X:
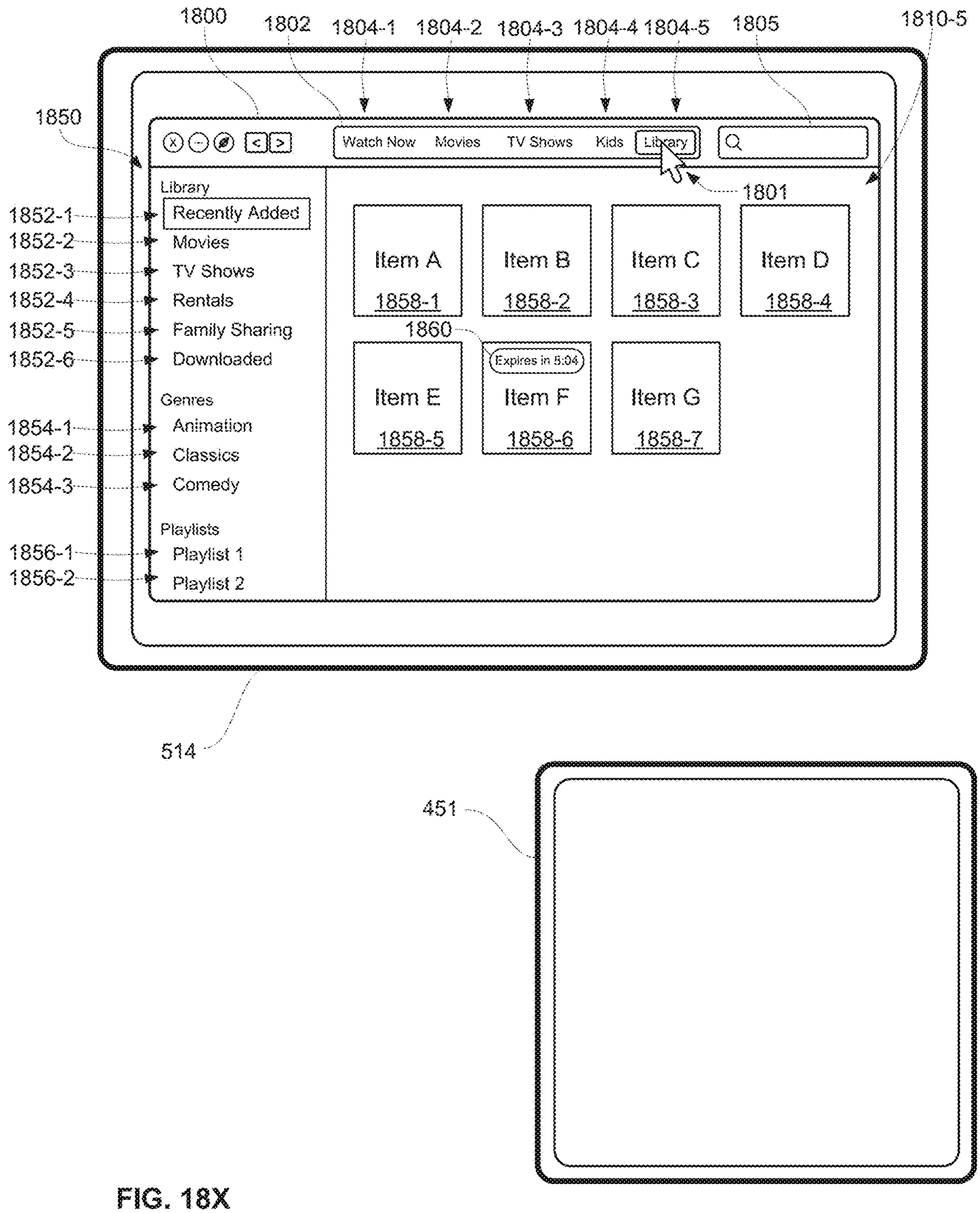
Figure 18Y:
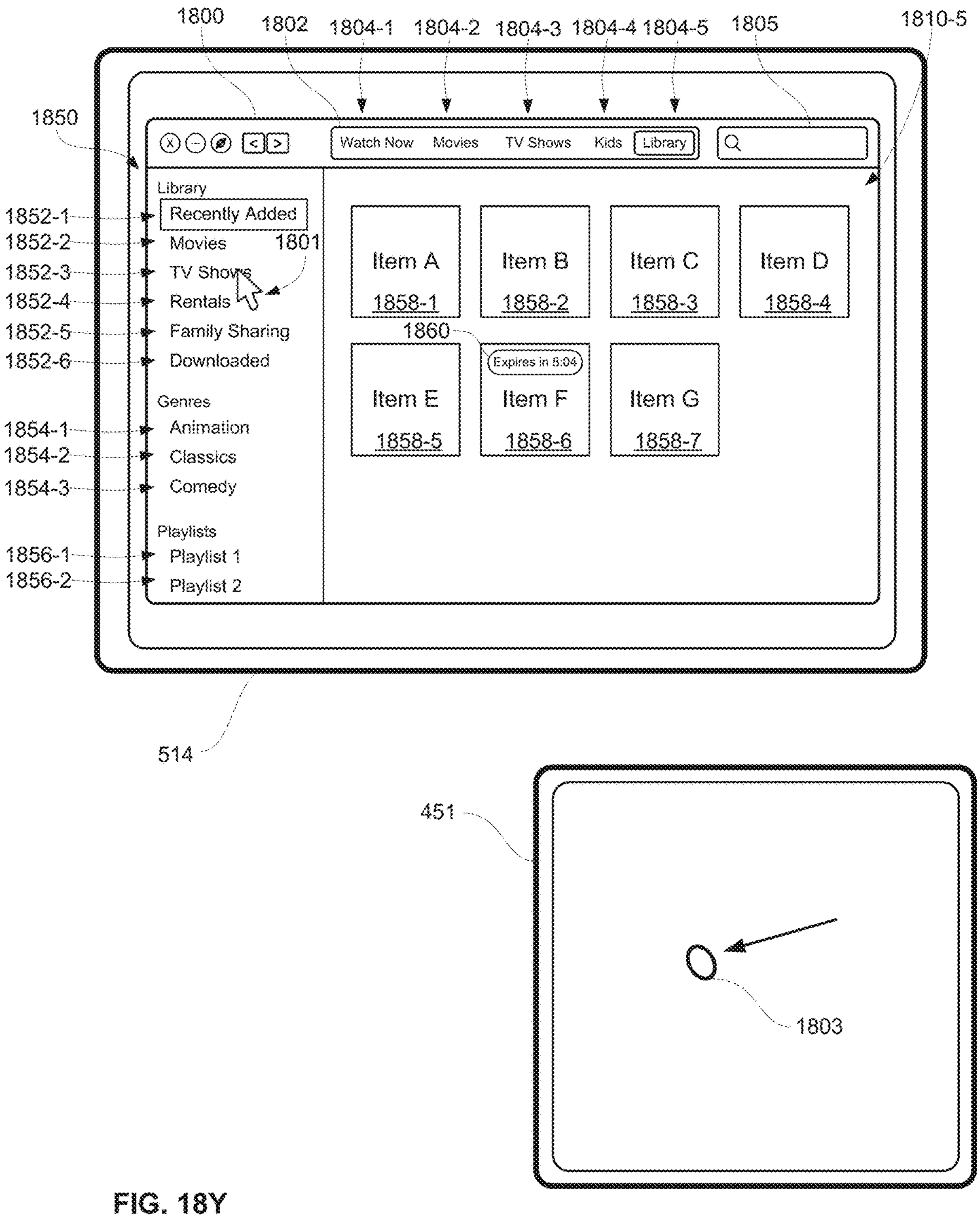
Figure 18Z:
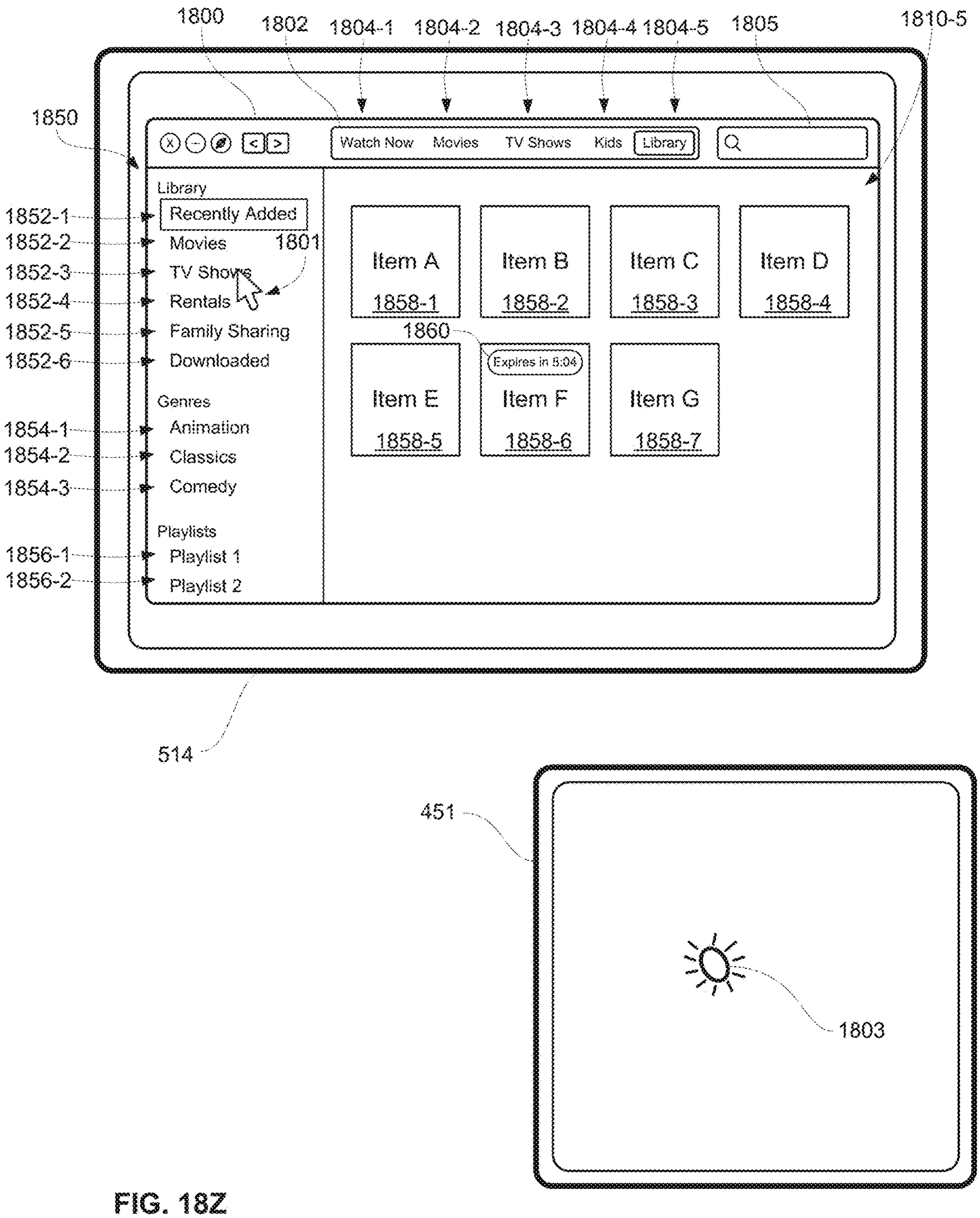
Figure 18A:
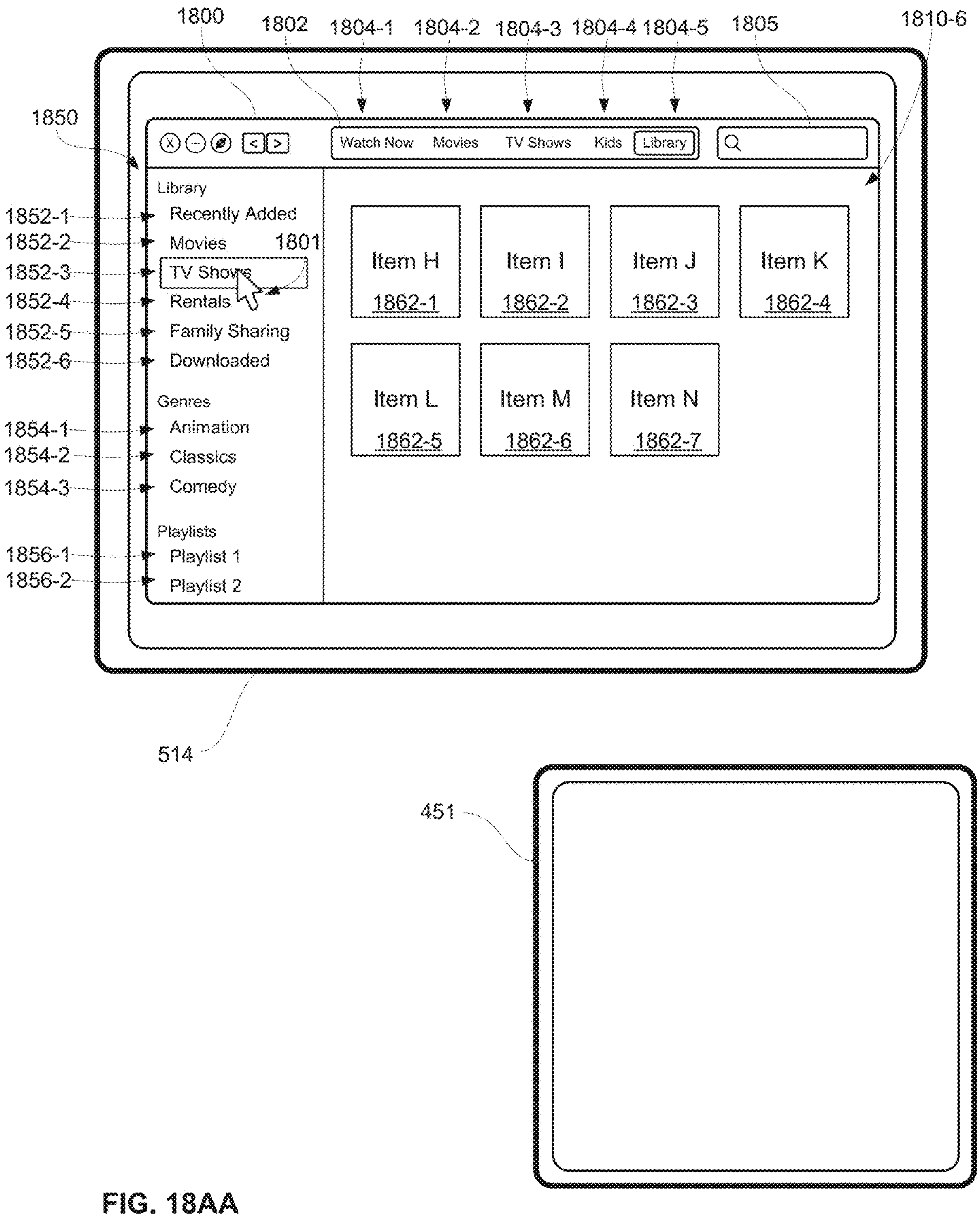
Figure 18B:
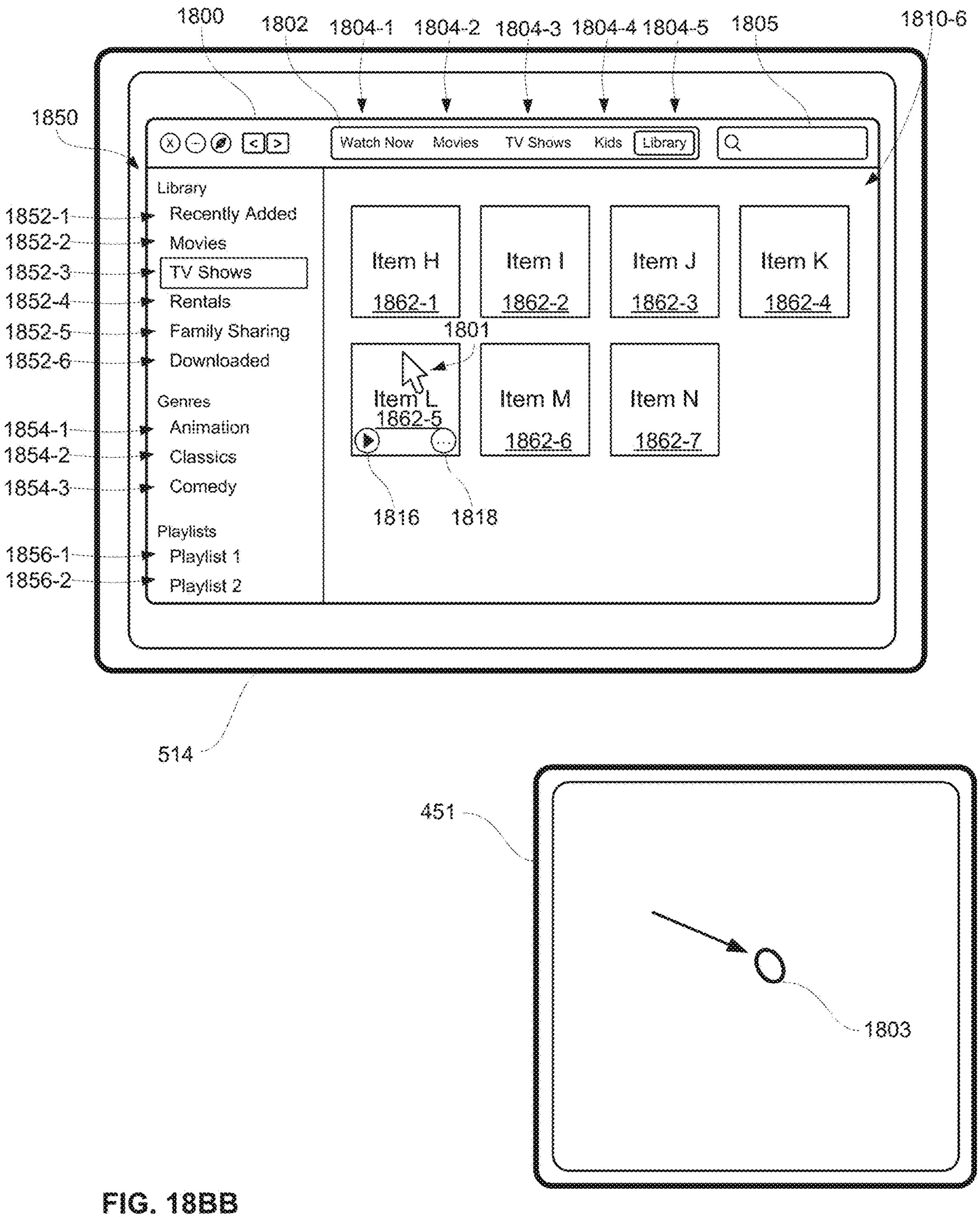
Figure 18C:
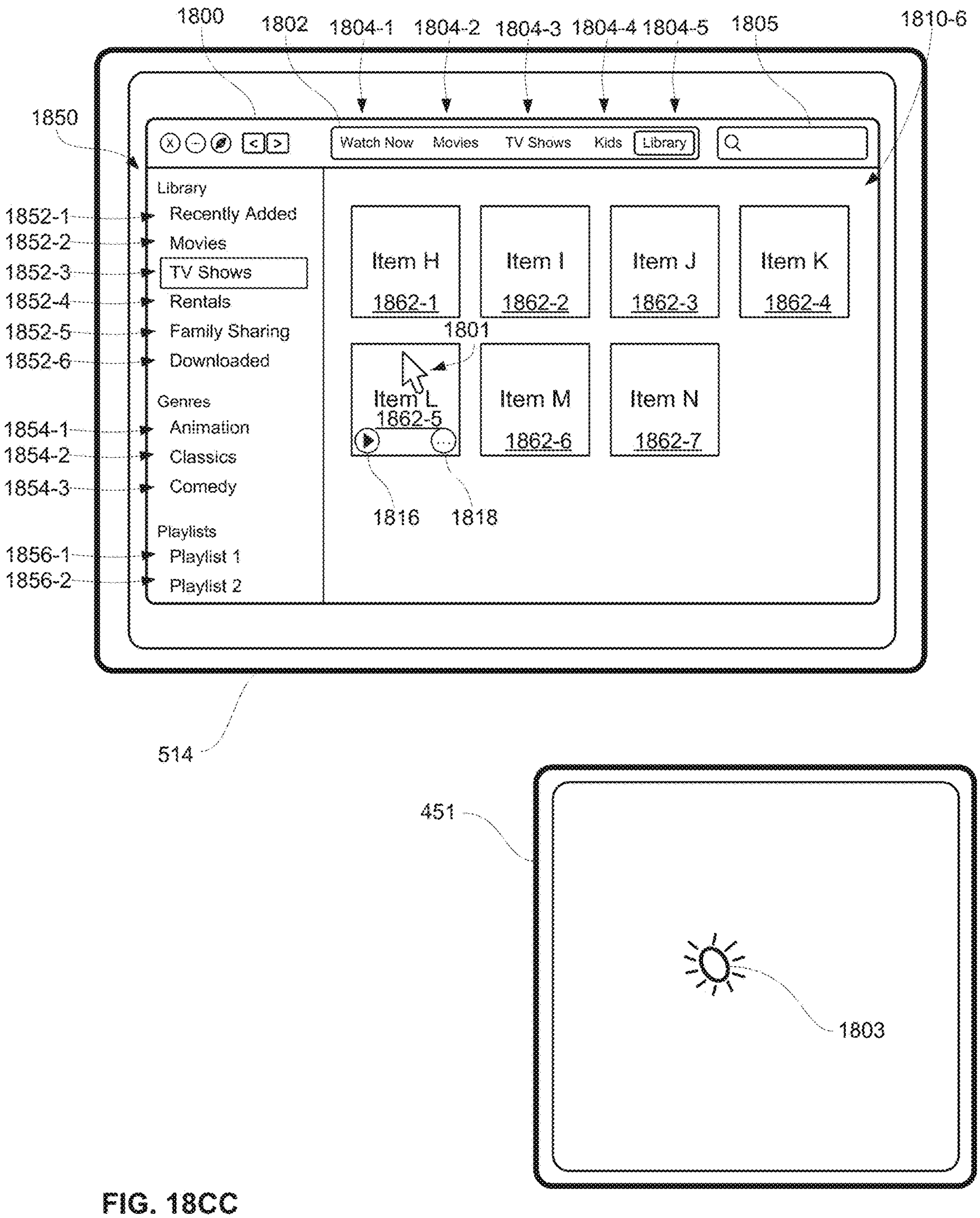
Figure 18D:
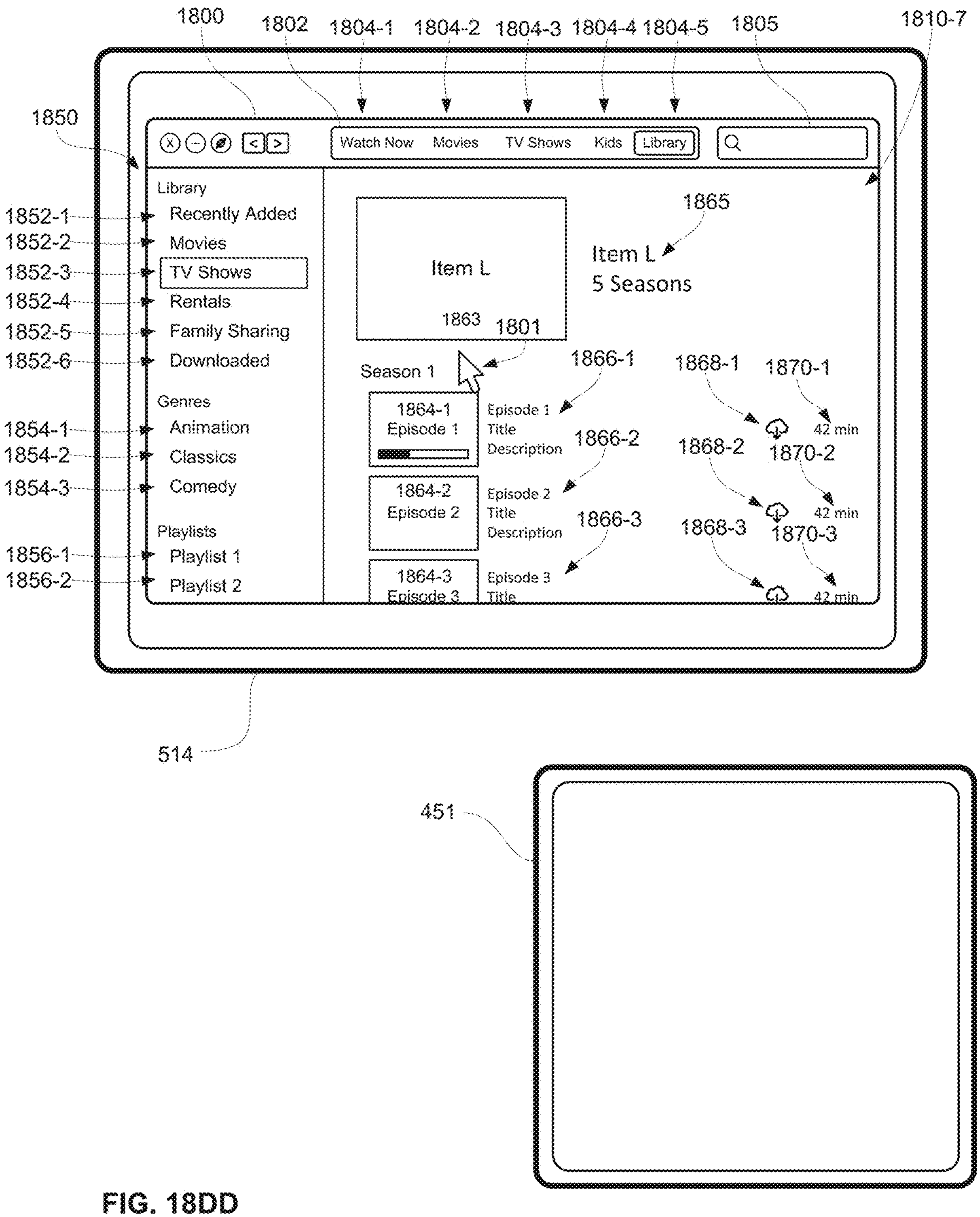
Figure 18E:
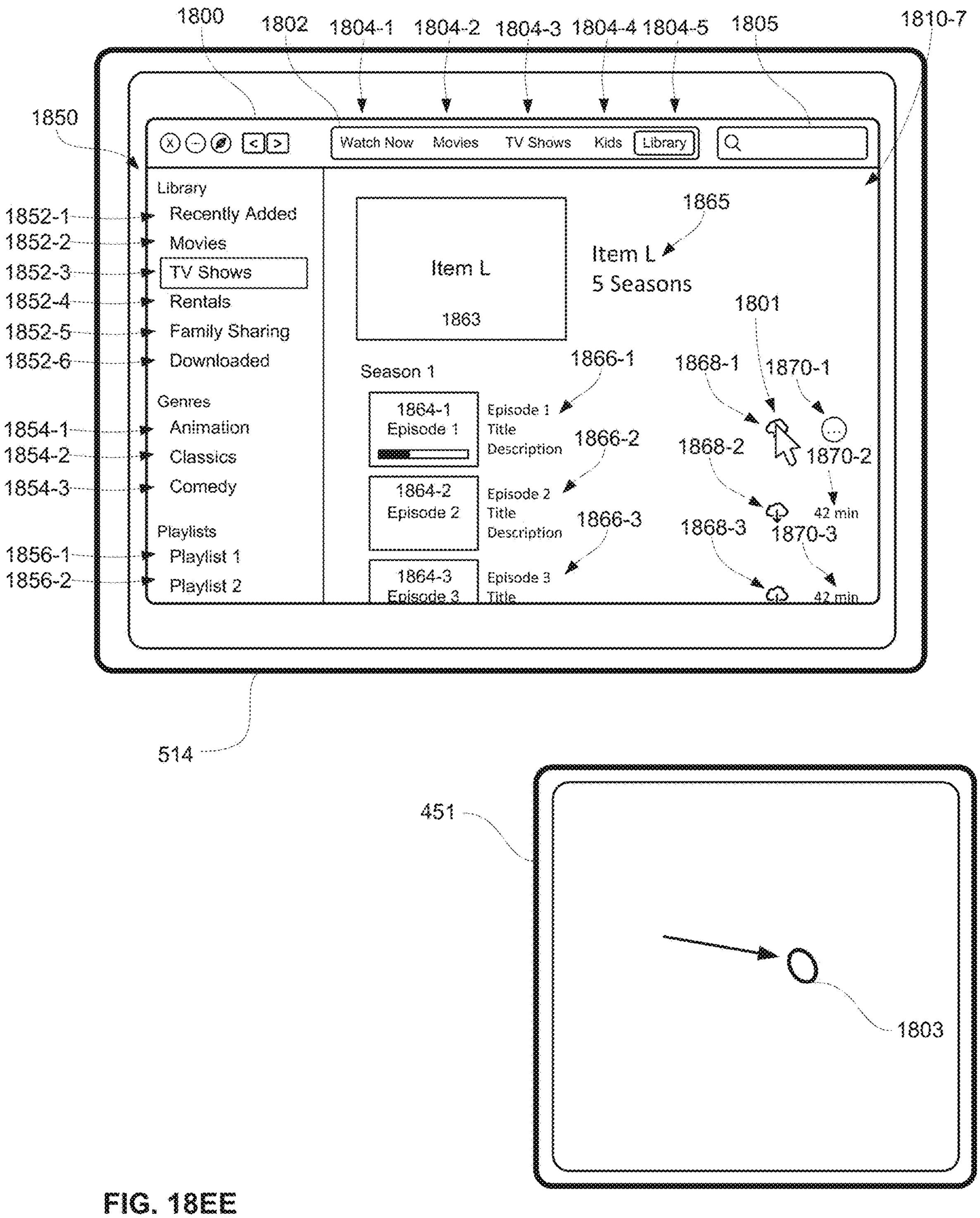
Figure 18F:
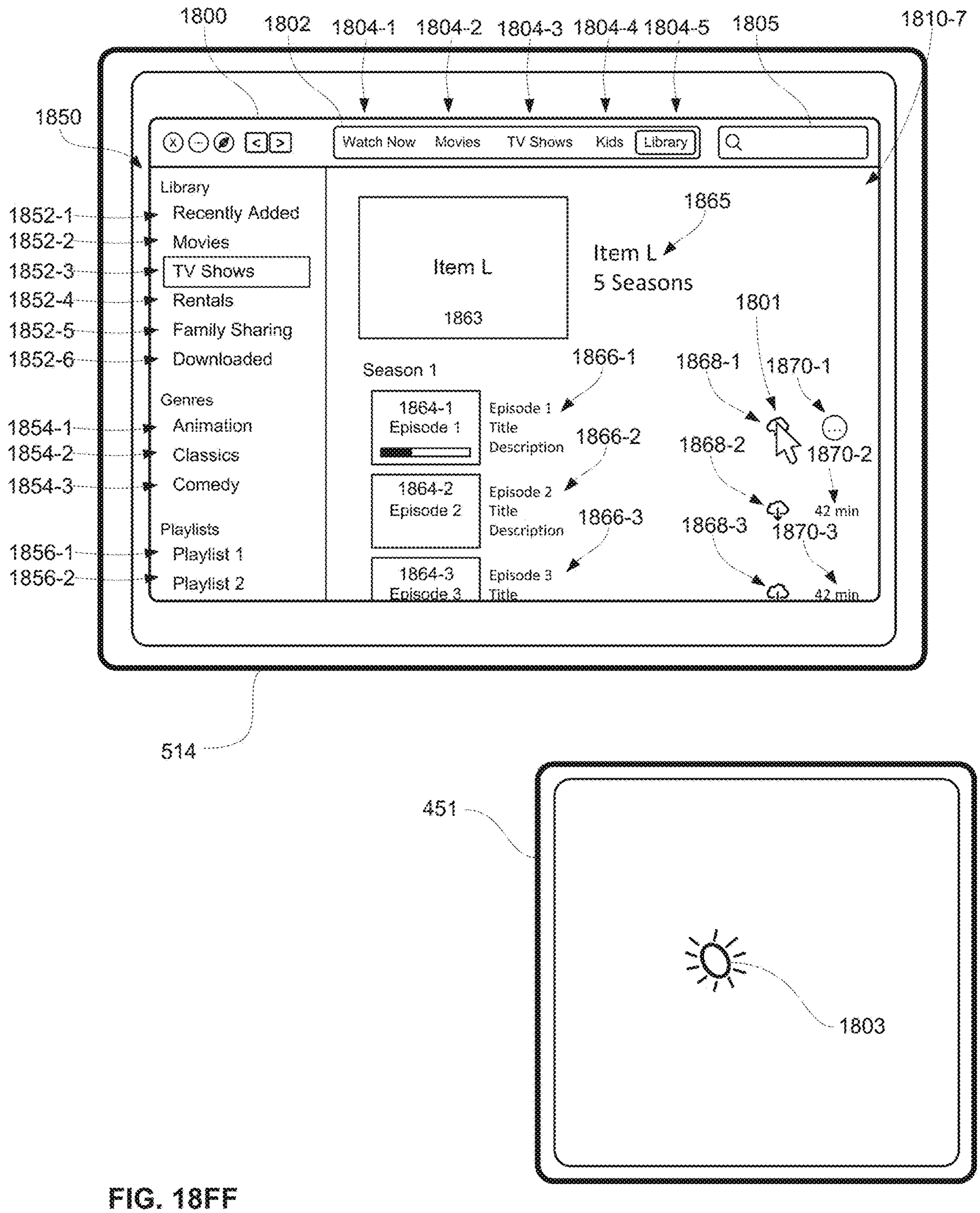
Figure 18G:
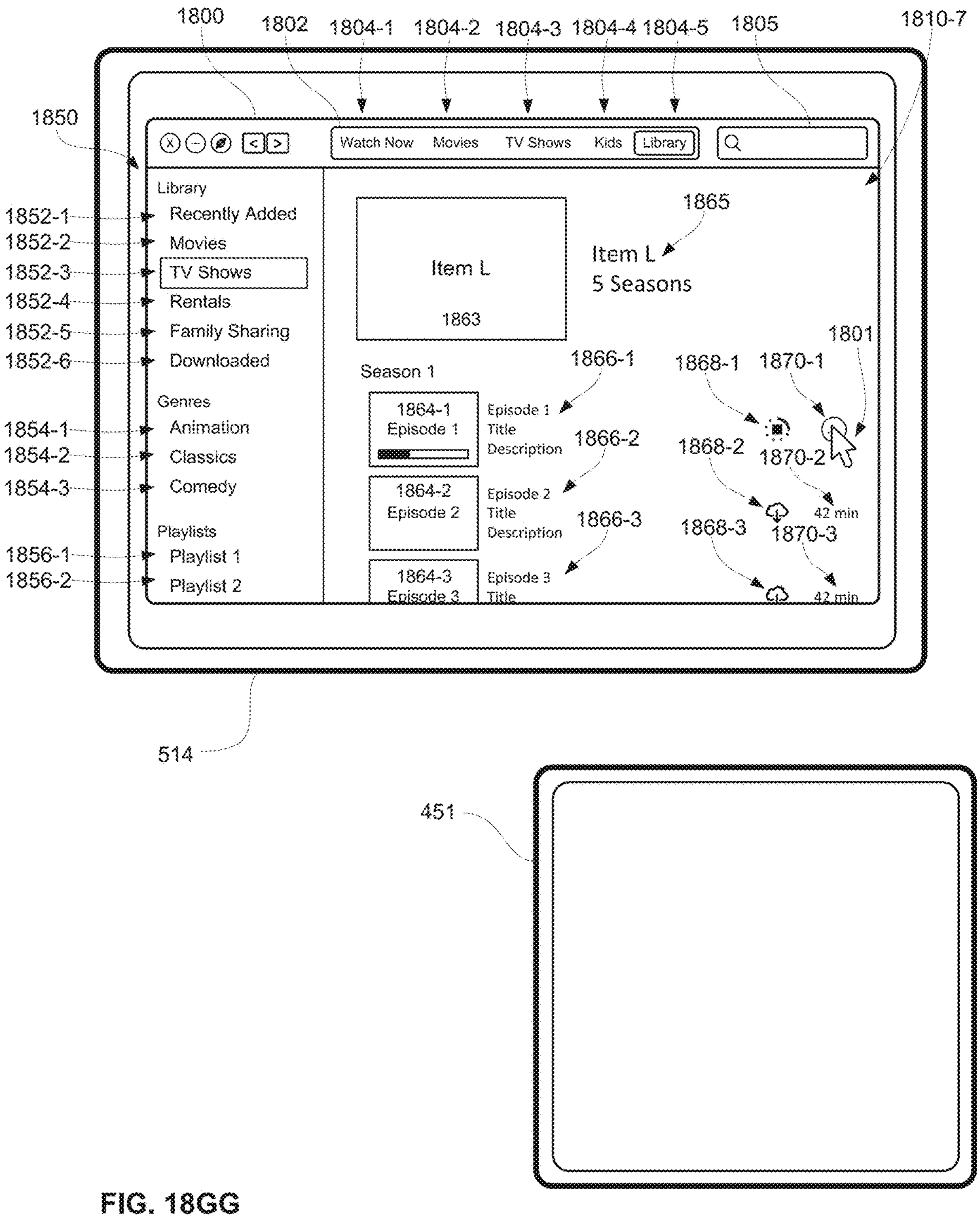
Figure 18H:
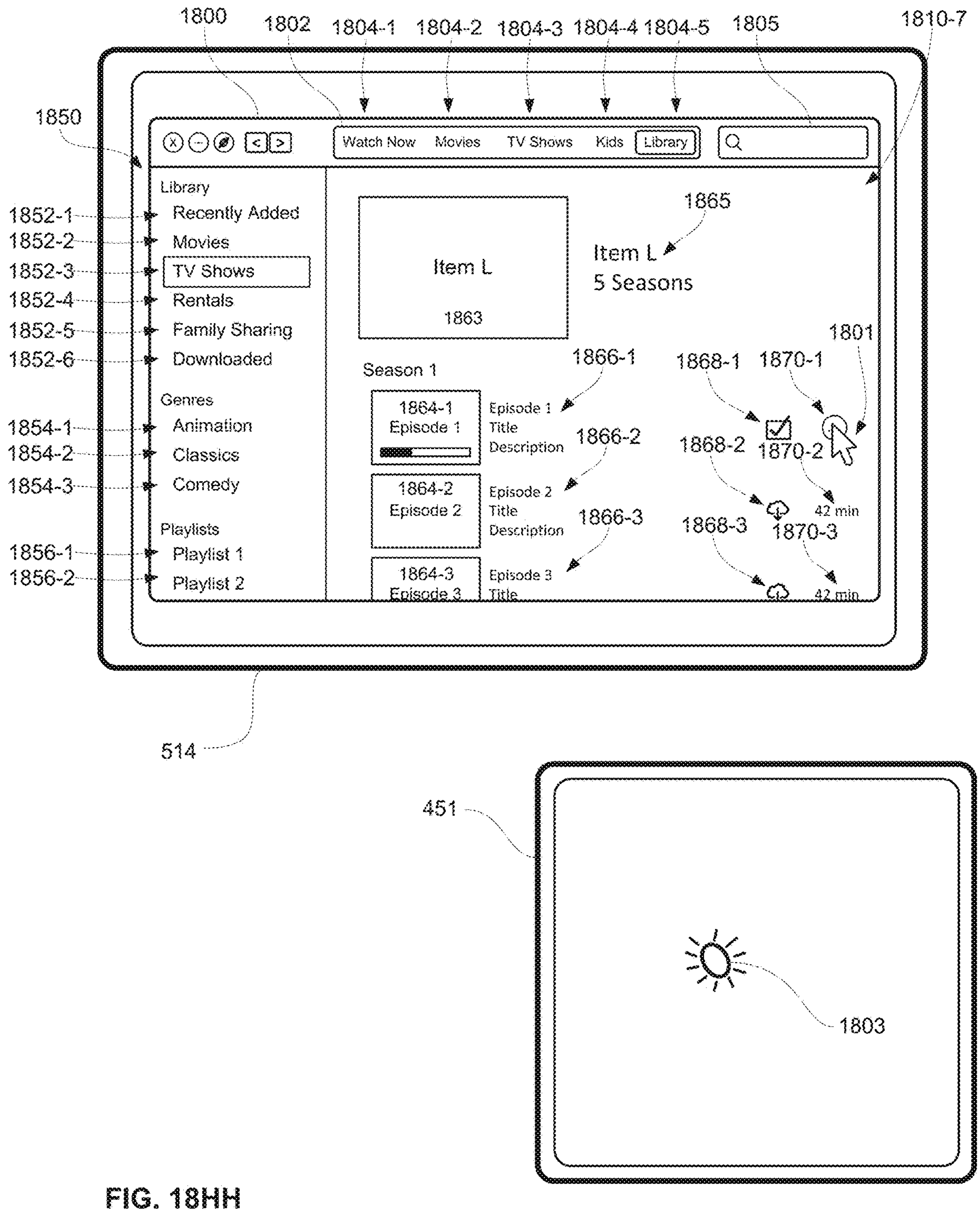
Figure 18I:
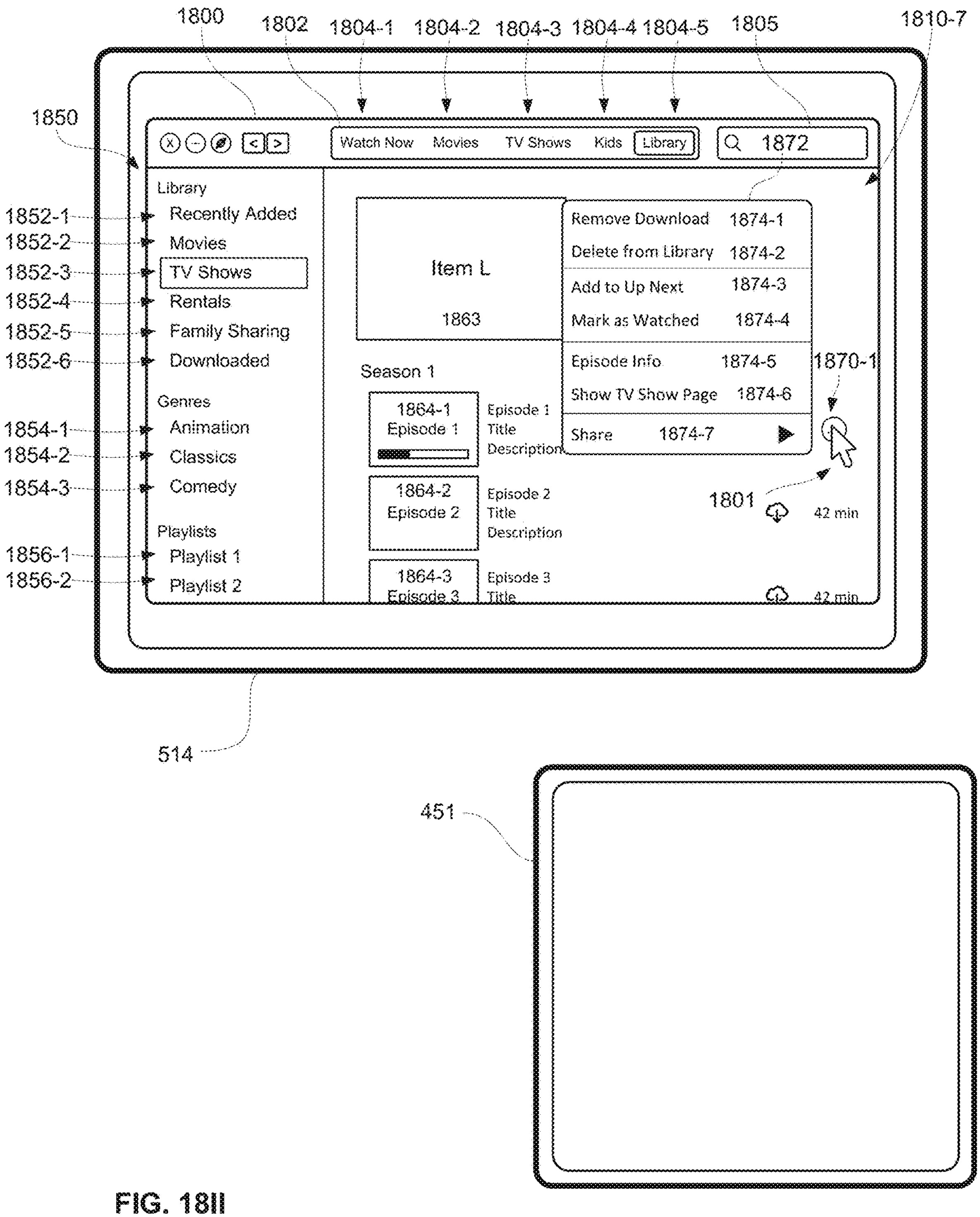
Figure 18J:
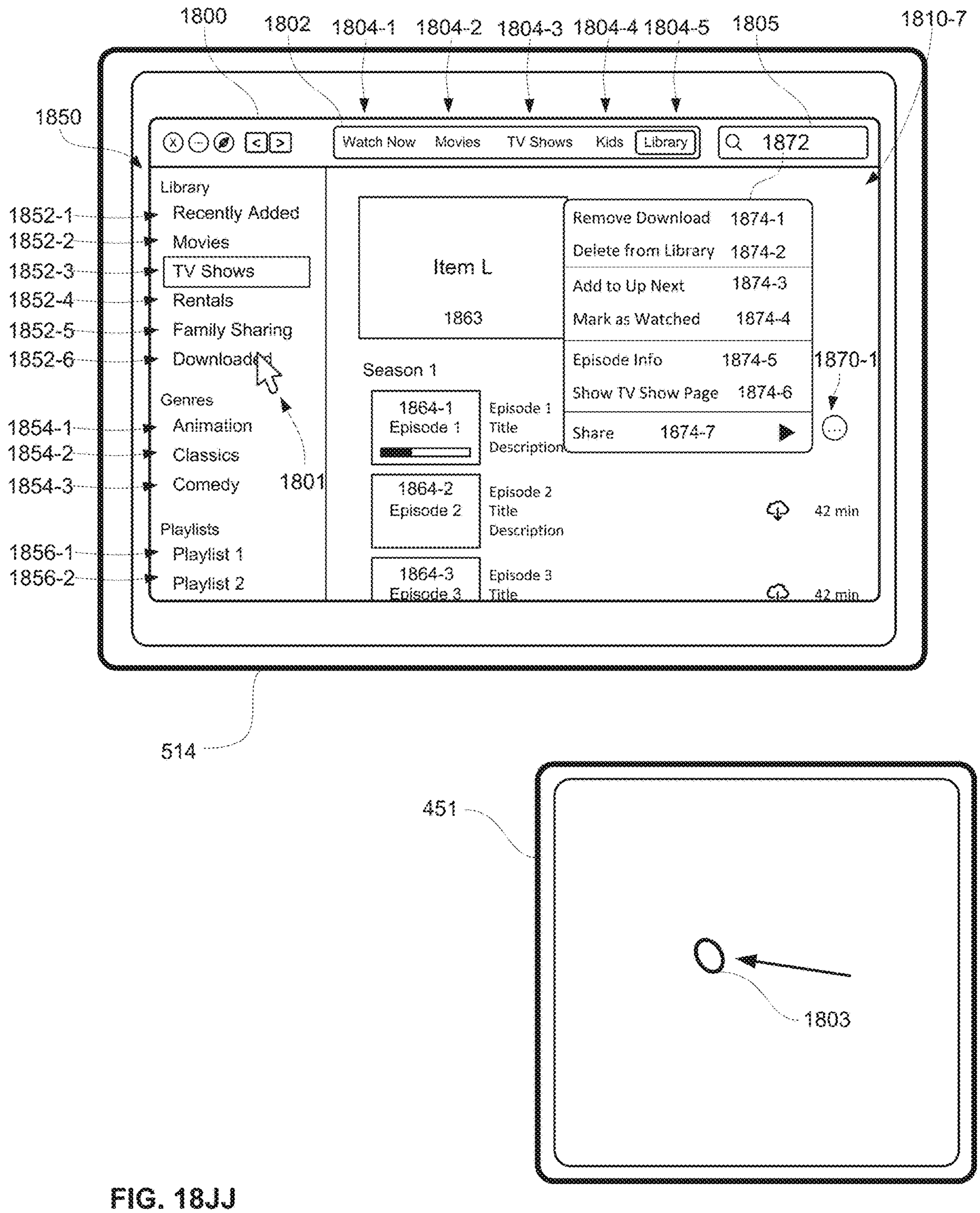
Figure 18K:
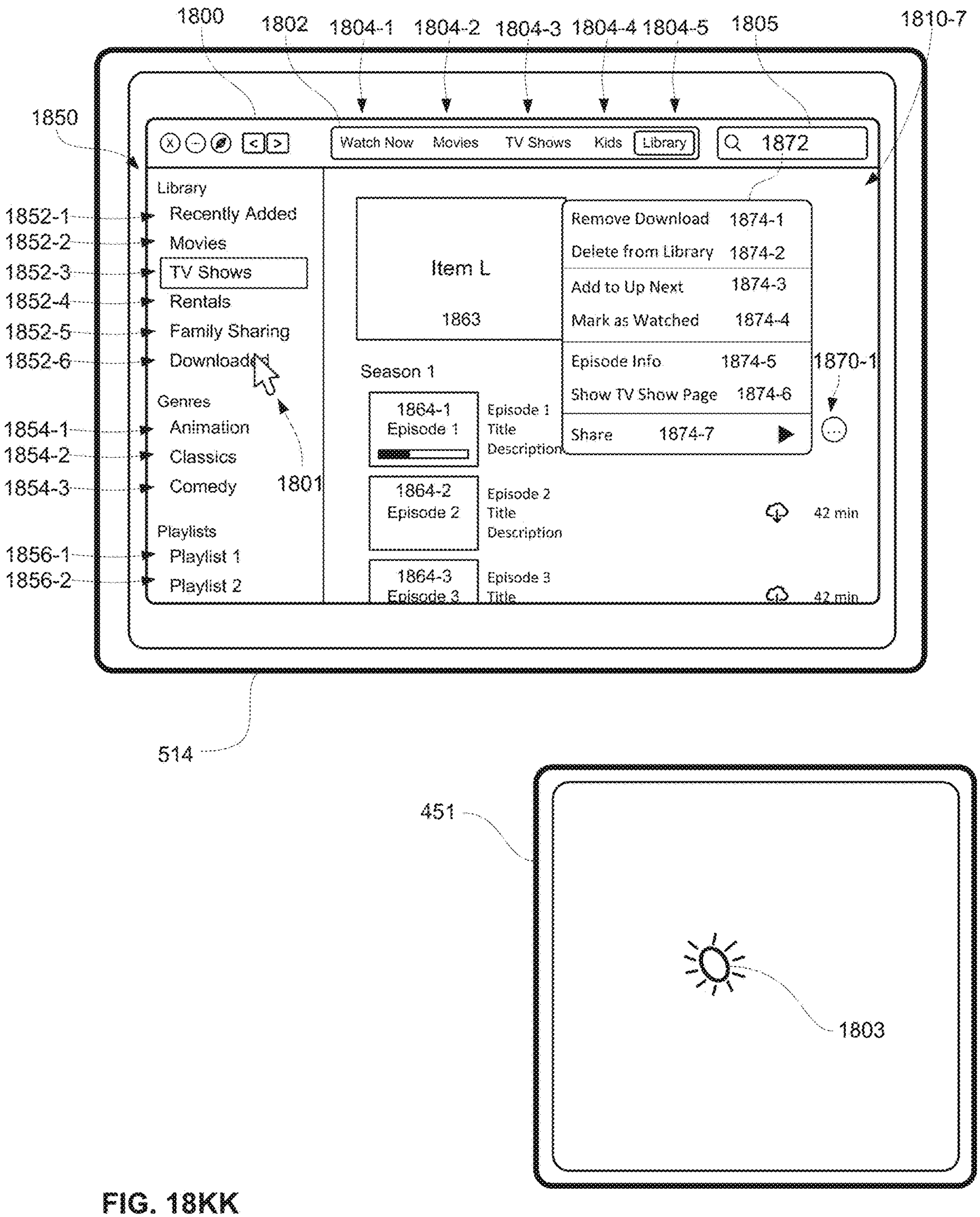
Figure 18L:
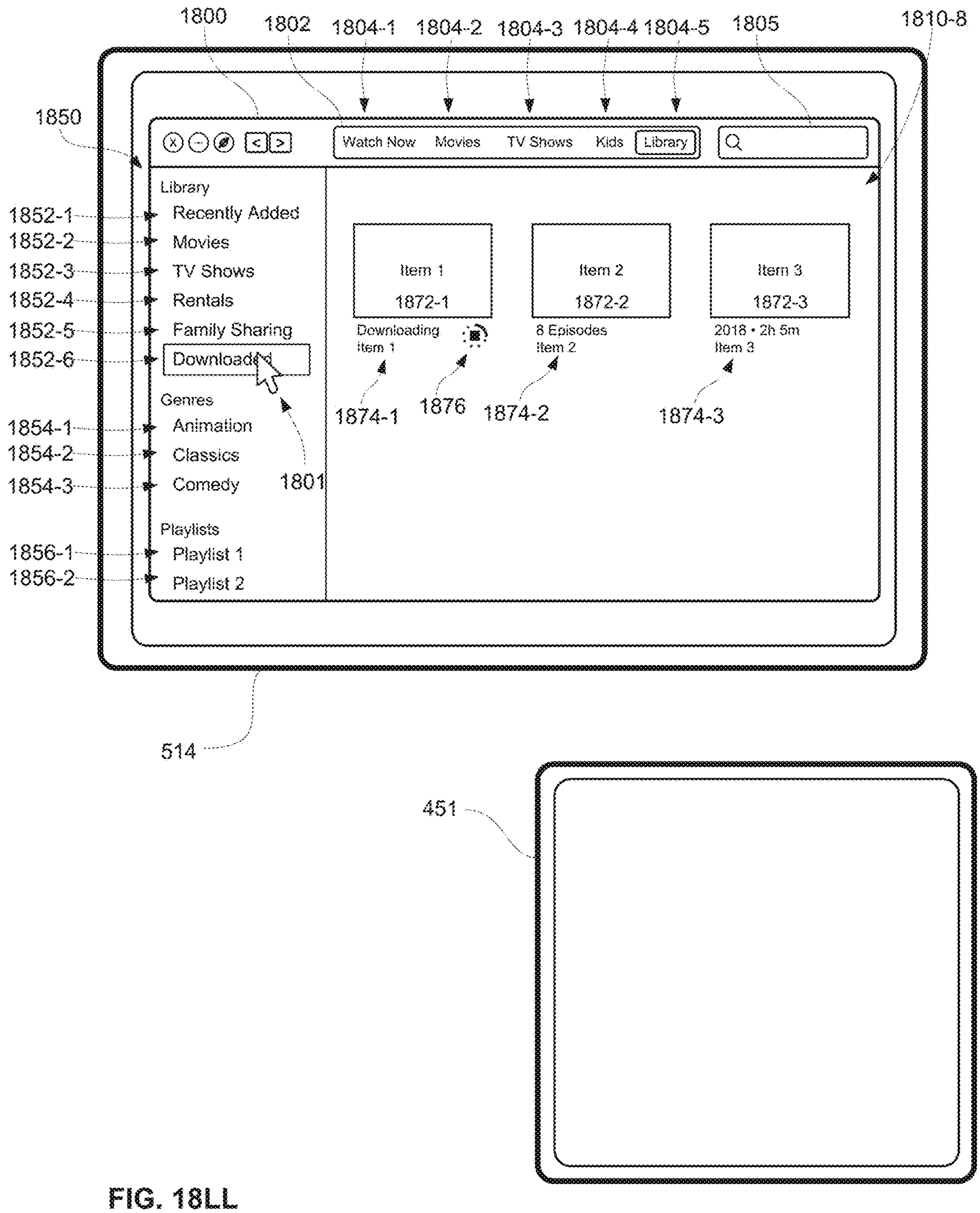
Figure 18M:
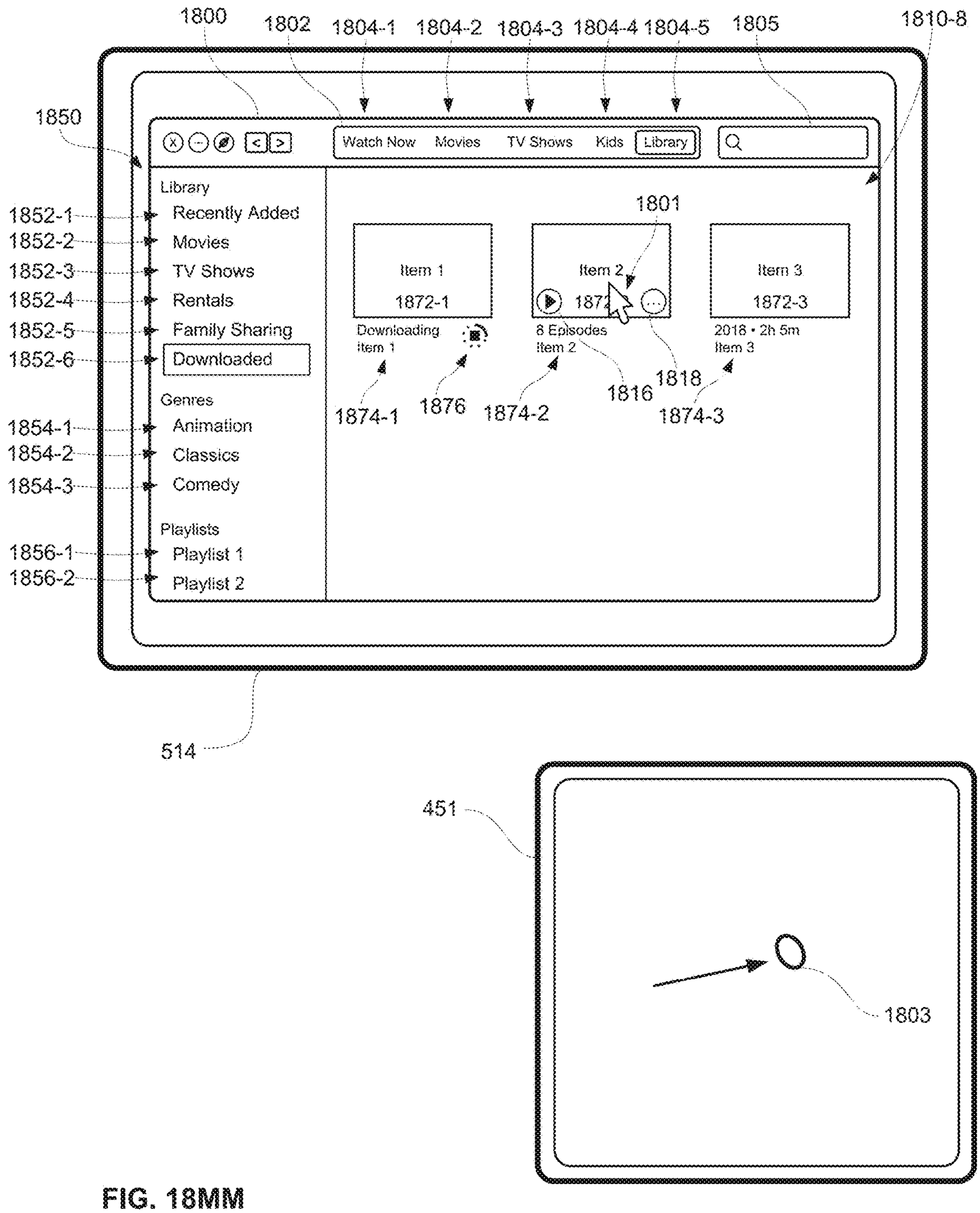
Figure 18N:
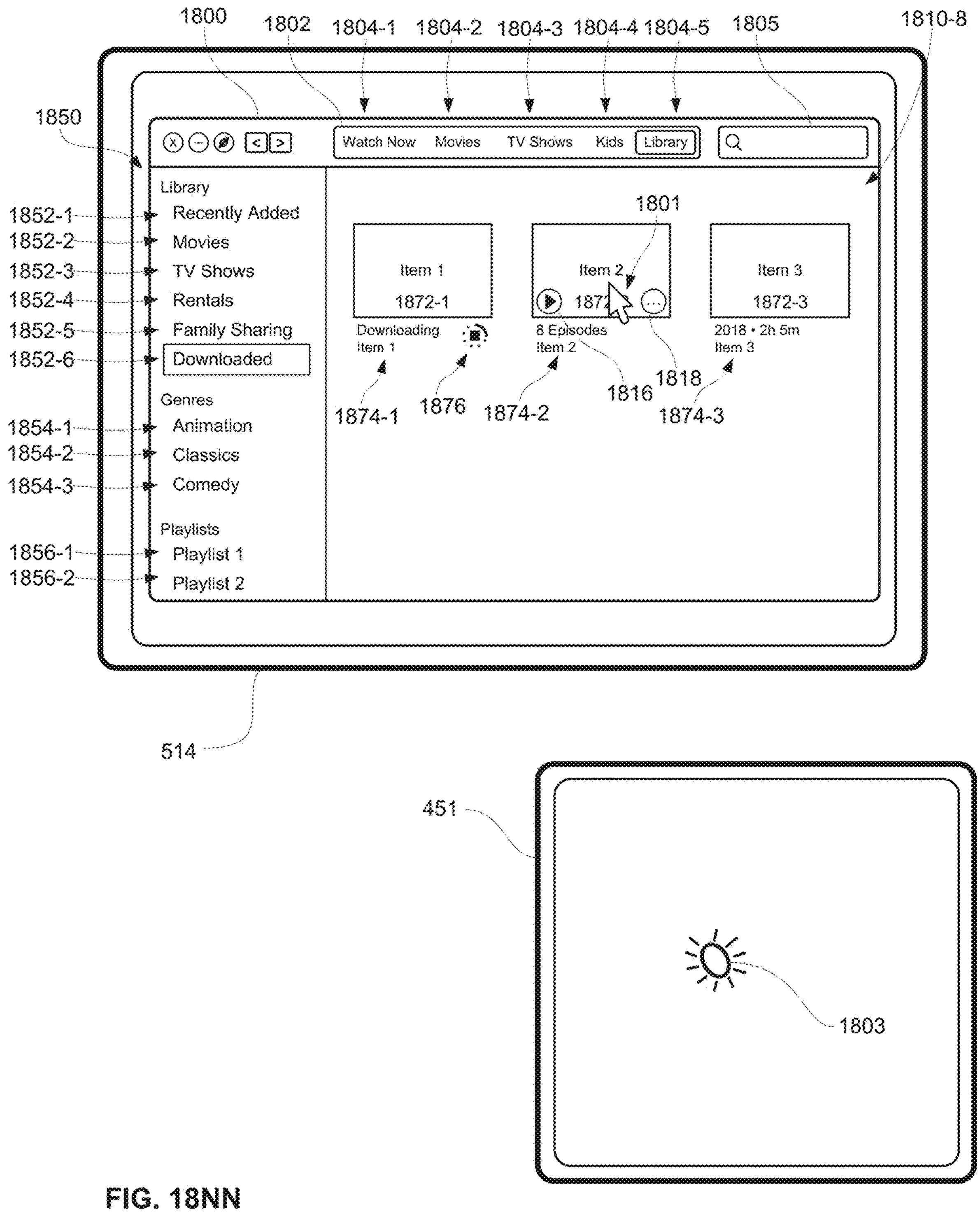
Figure 18O:
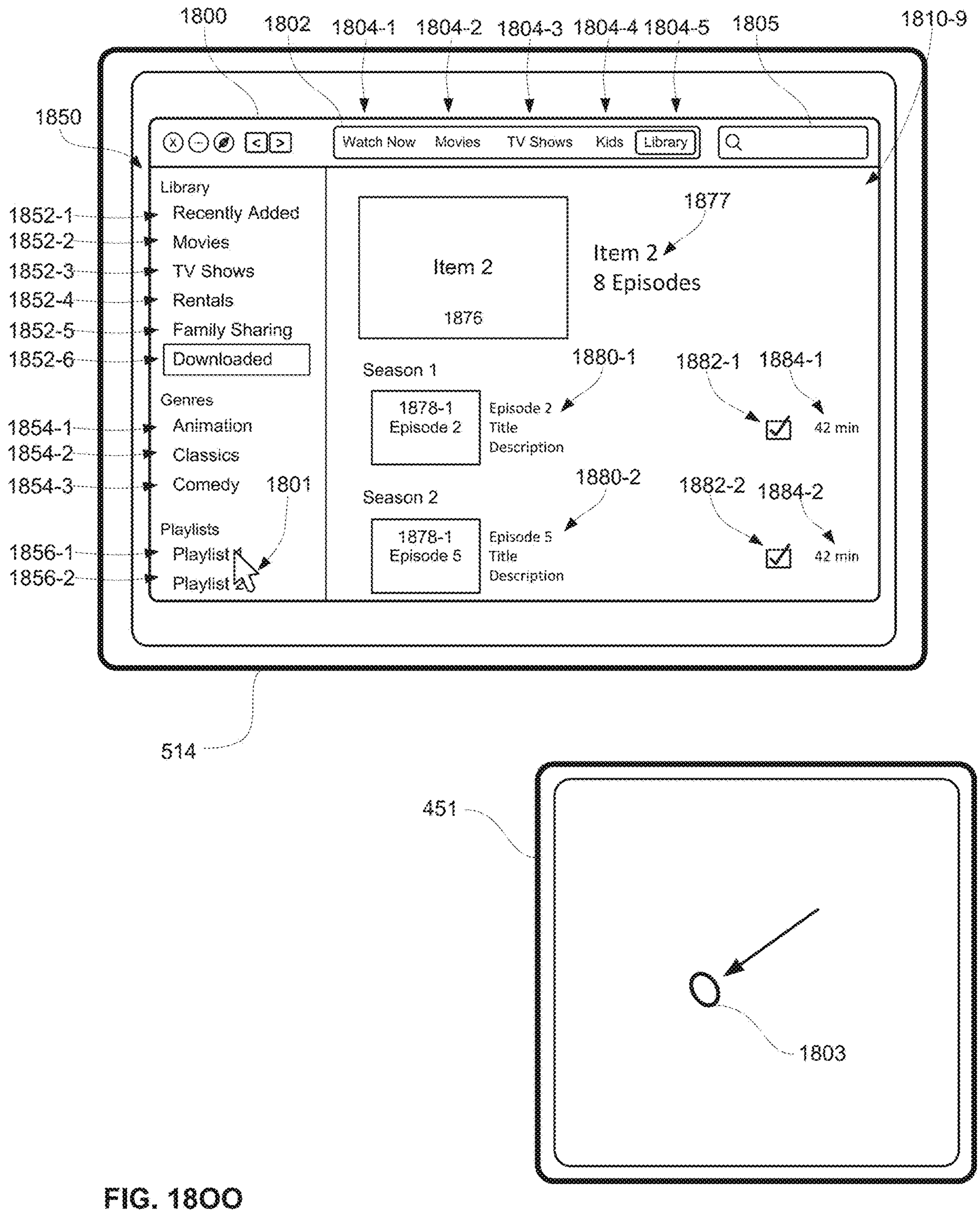
Figure 18P:
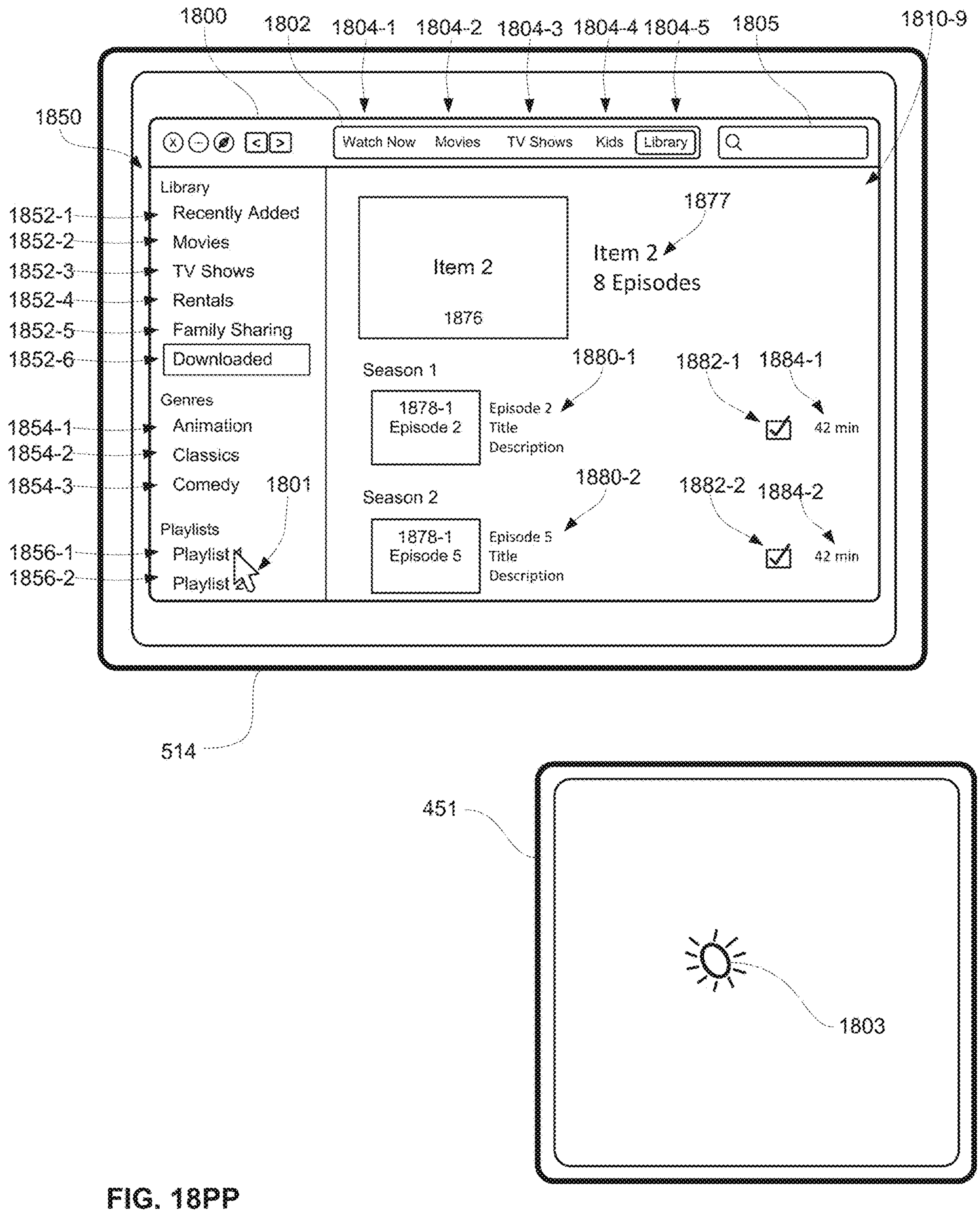
Figure 18Q:
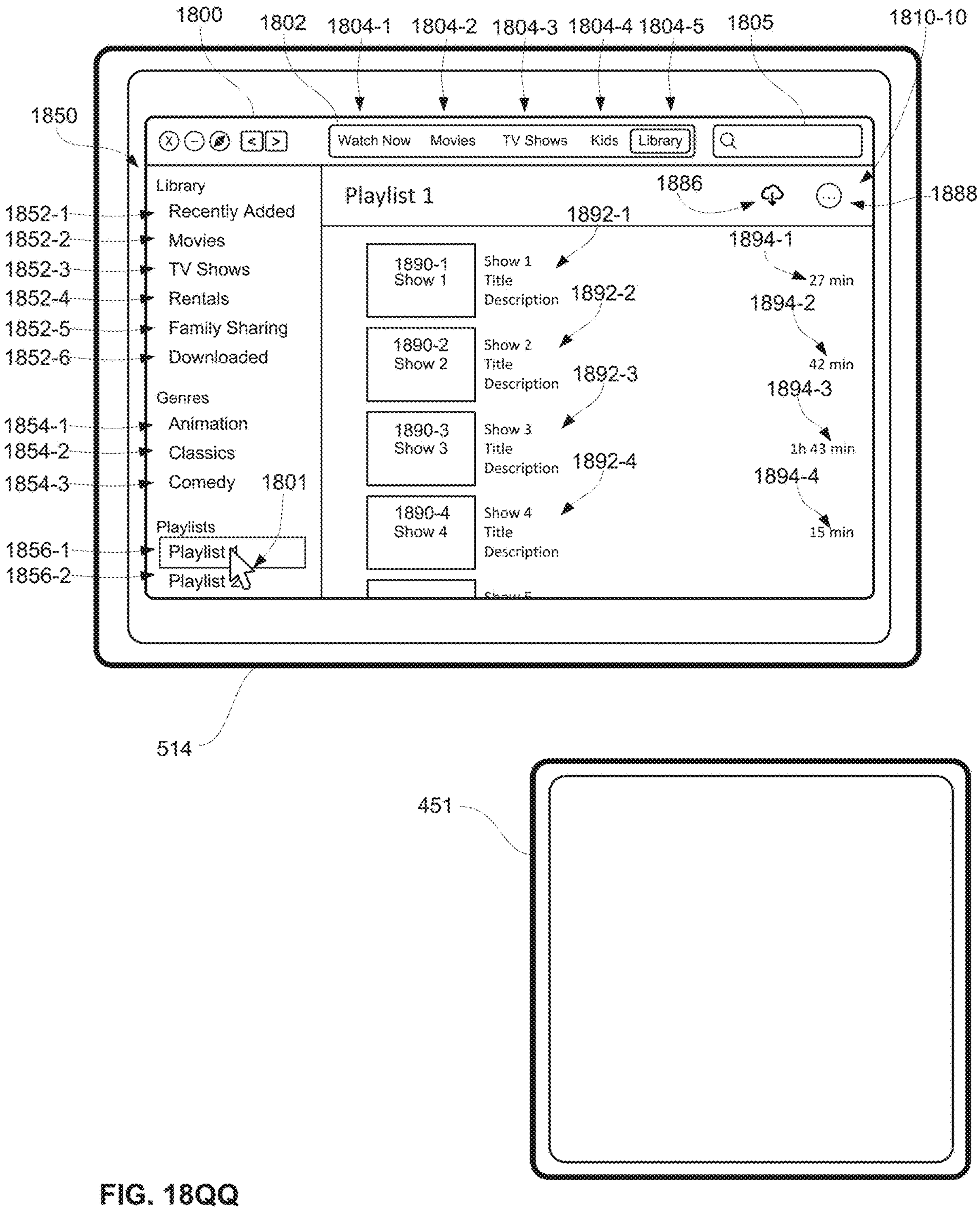
Figure 18R:
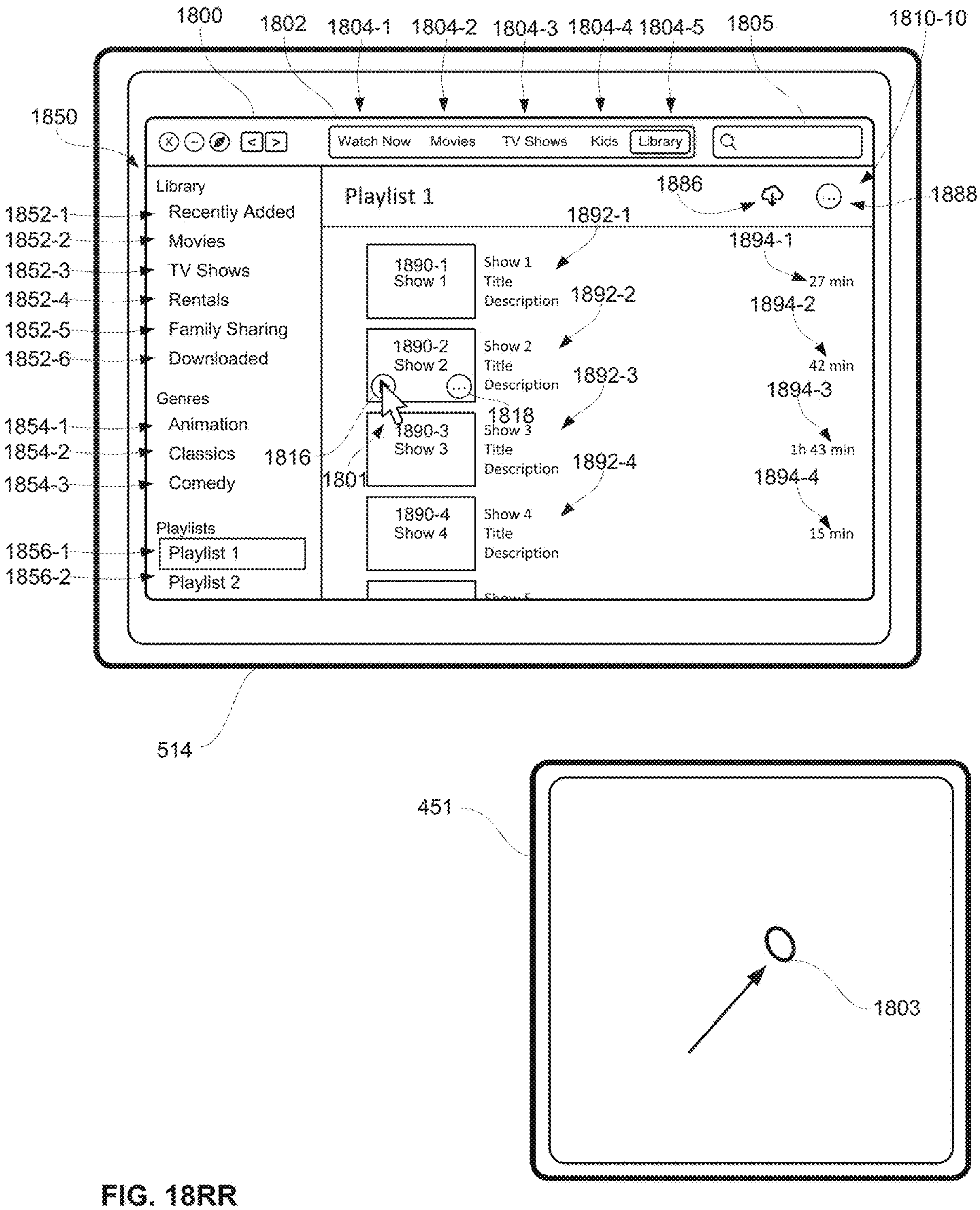
Figure 18S:
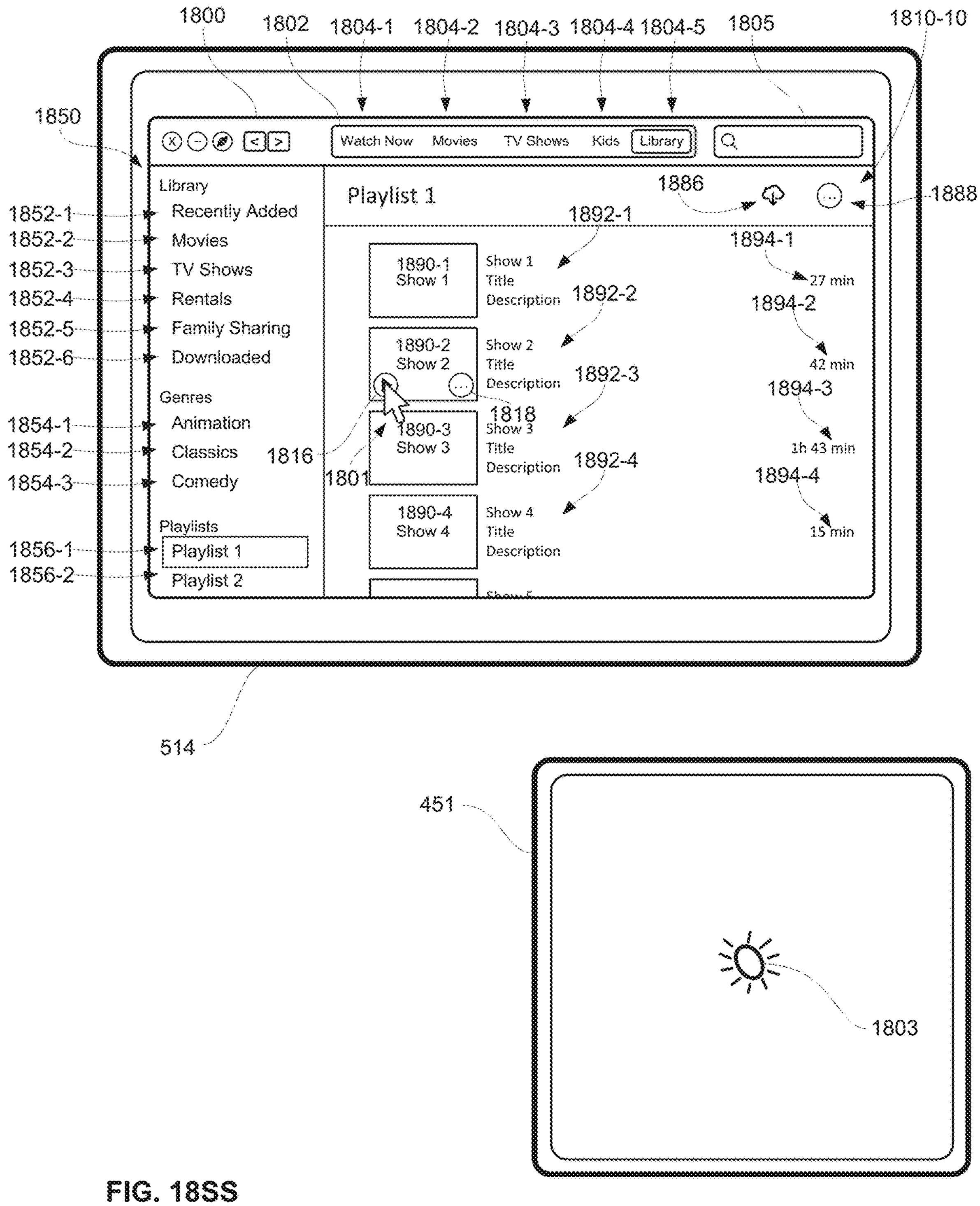
Figure 18T:
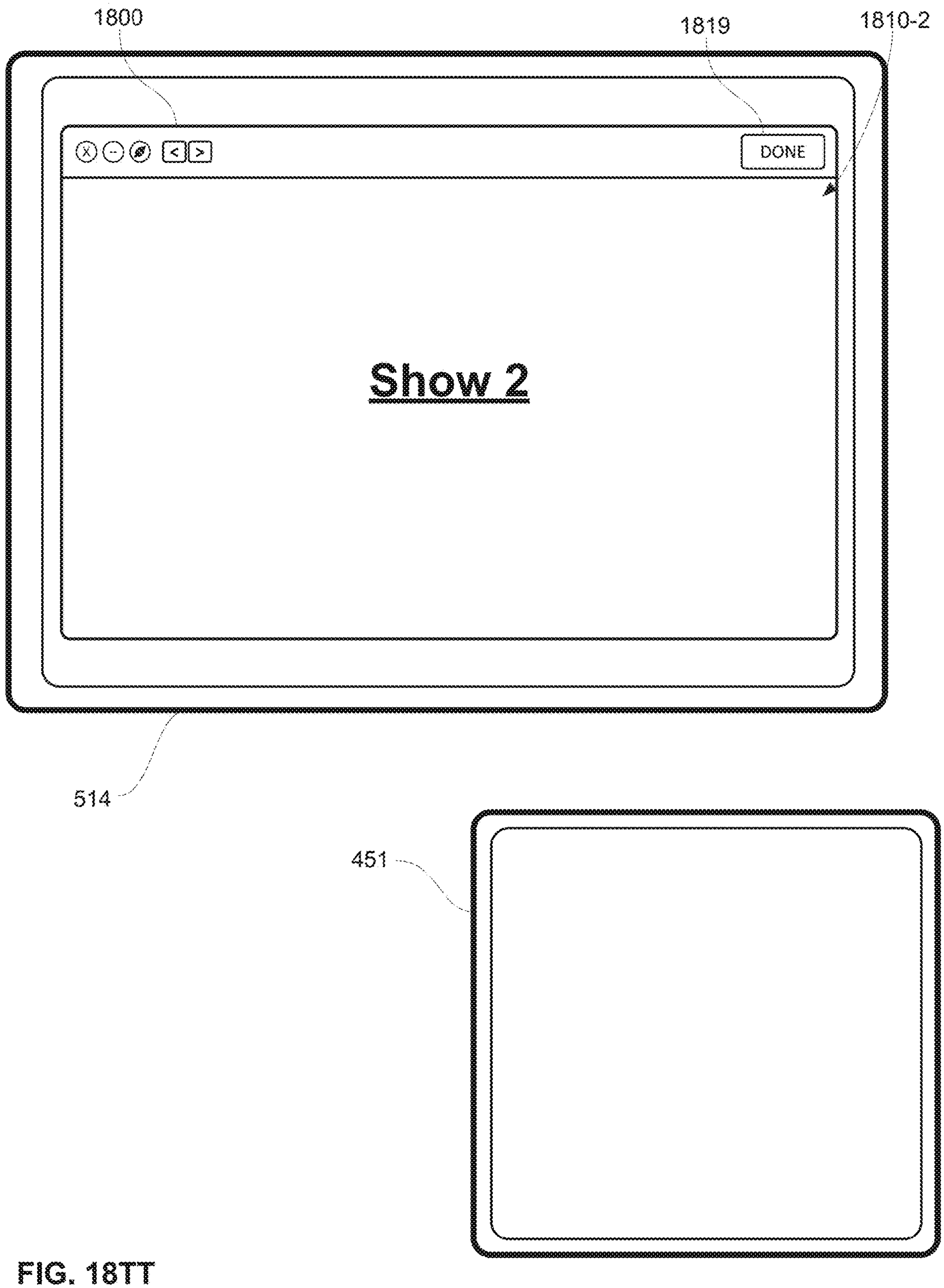
Figure 18U:
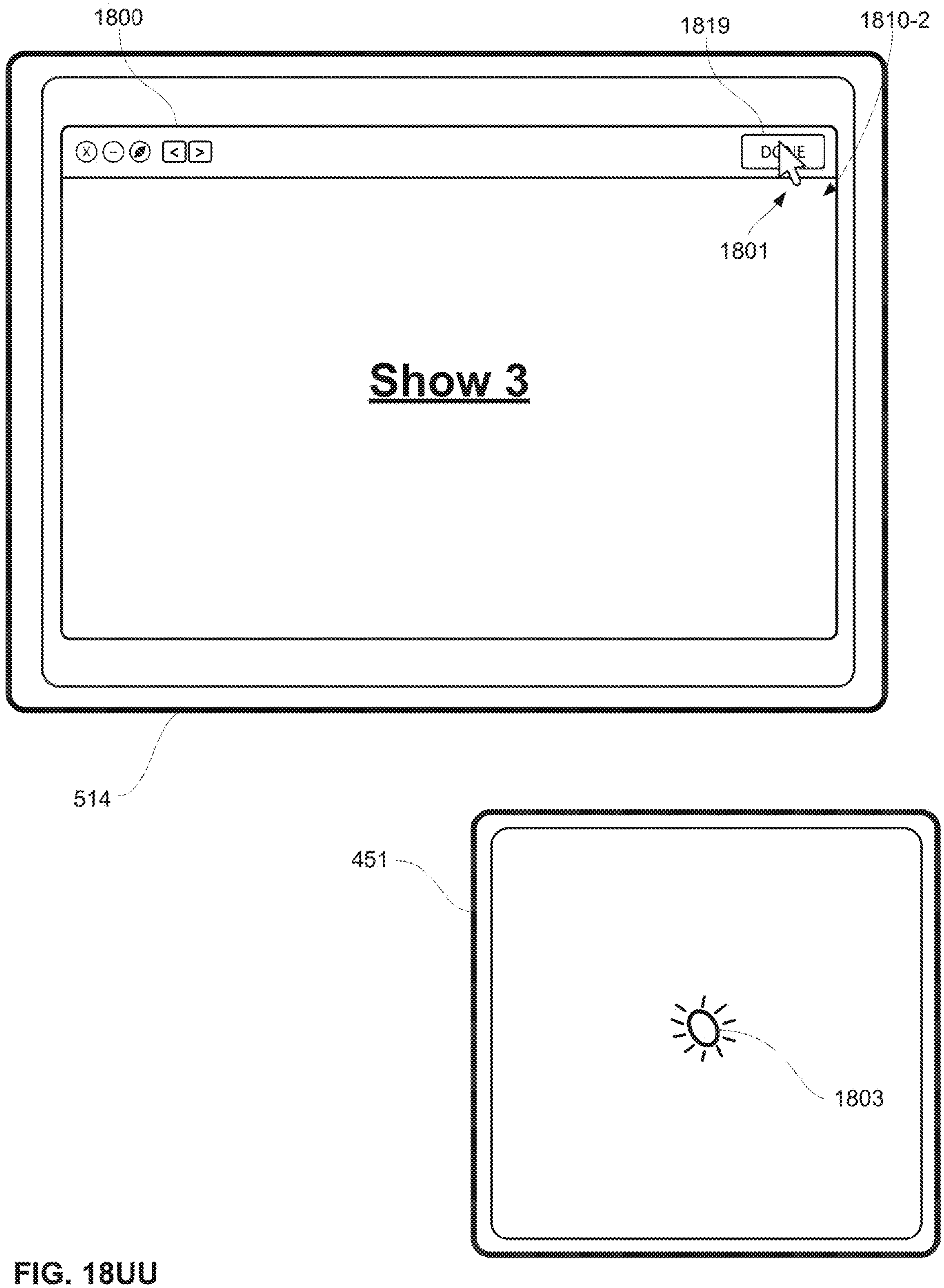
Figure 18V:
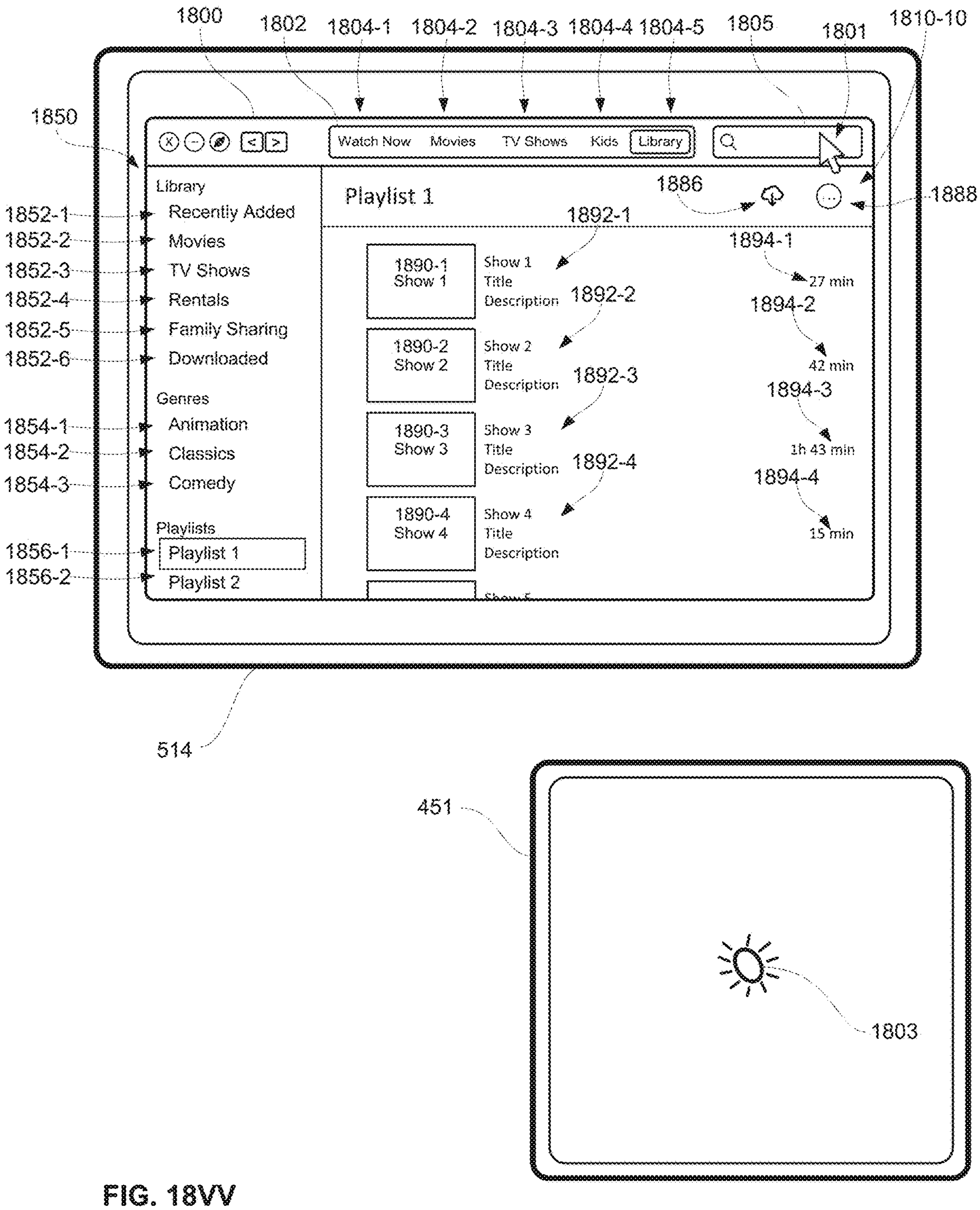
Figure 18W:
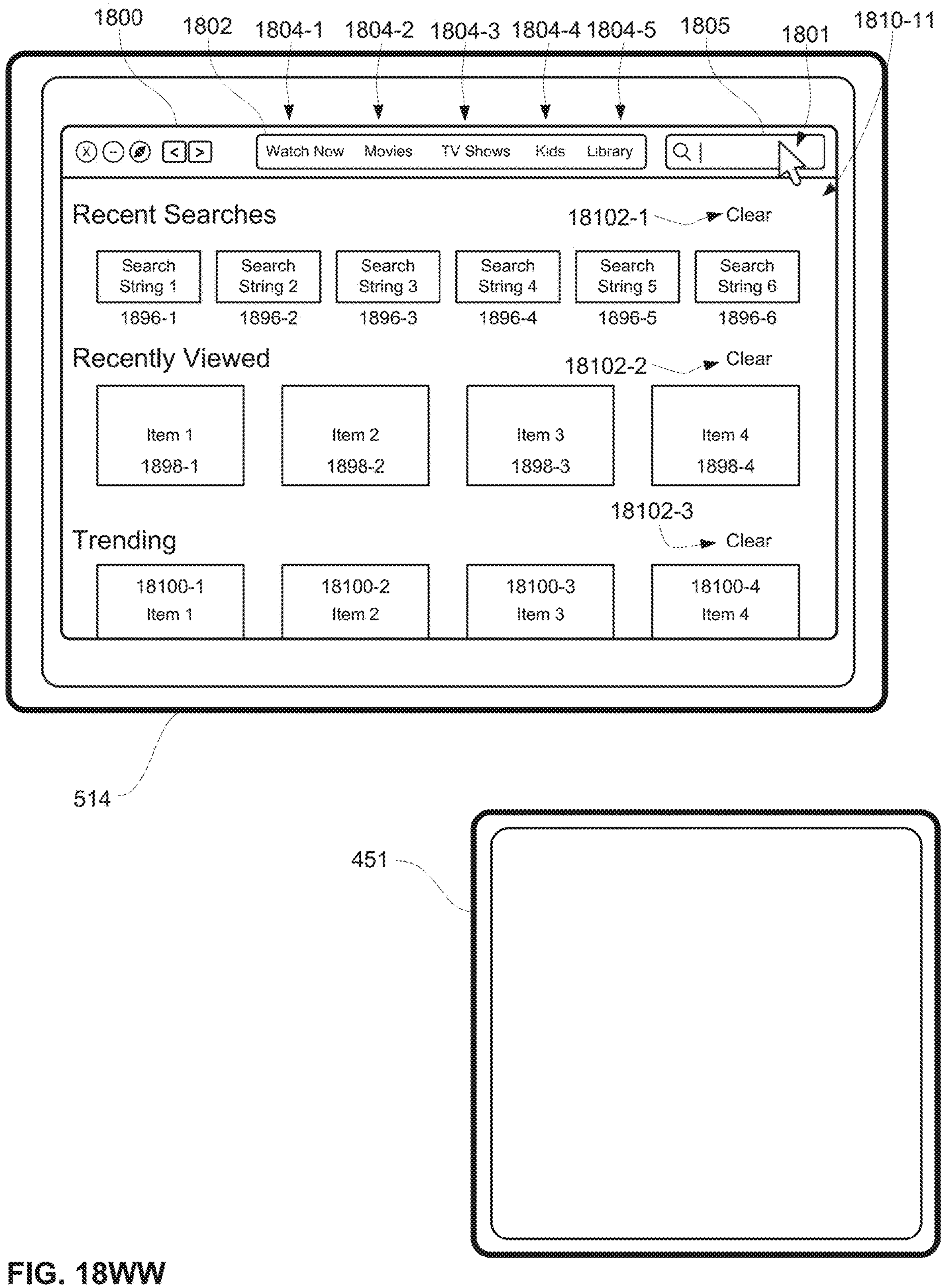
Figure 18X:
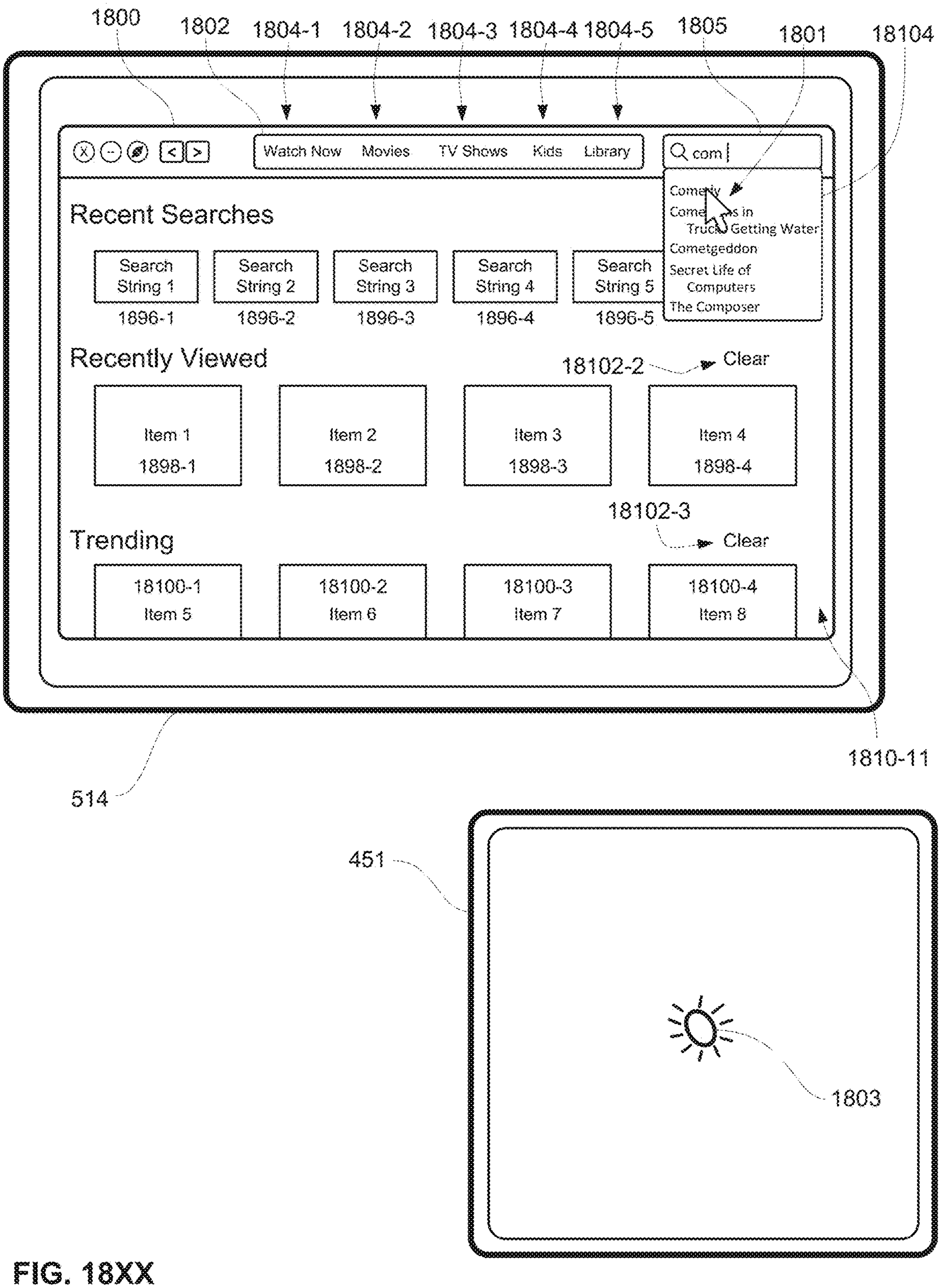
Figure 18Y:
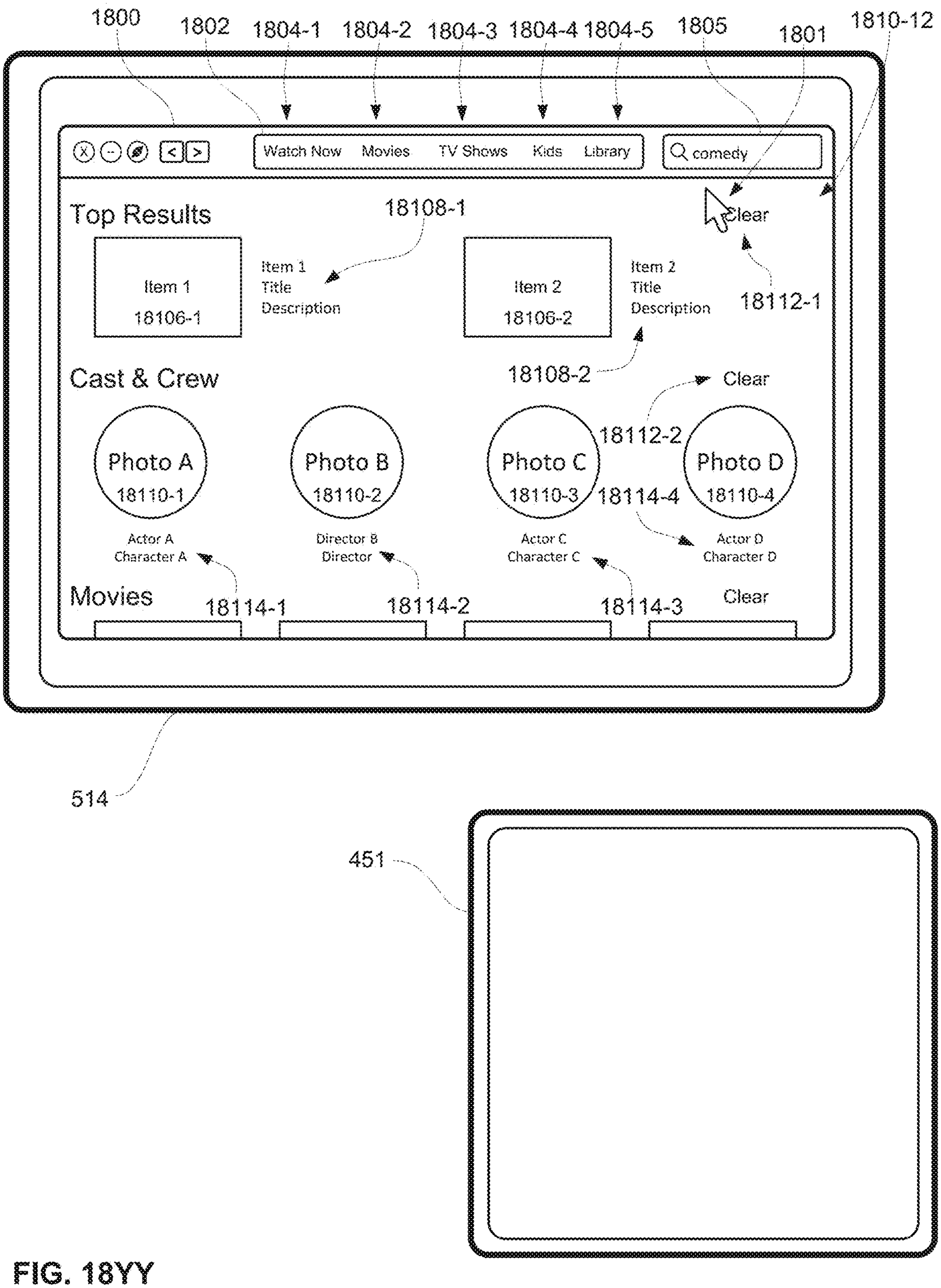
Figure 18Z:
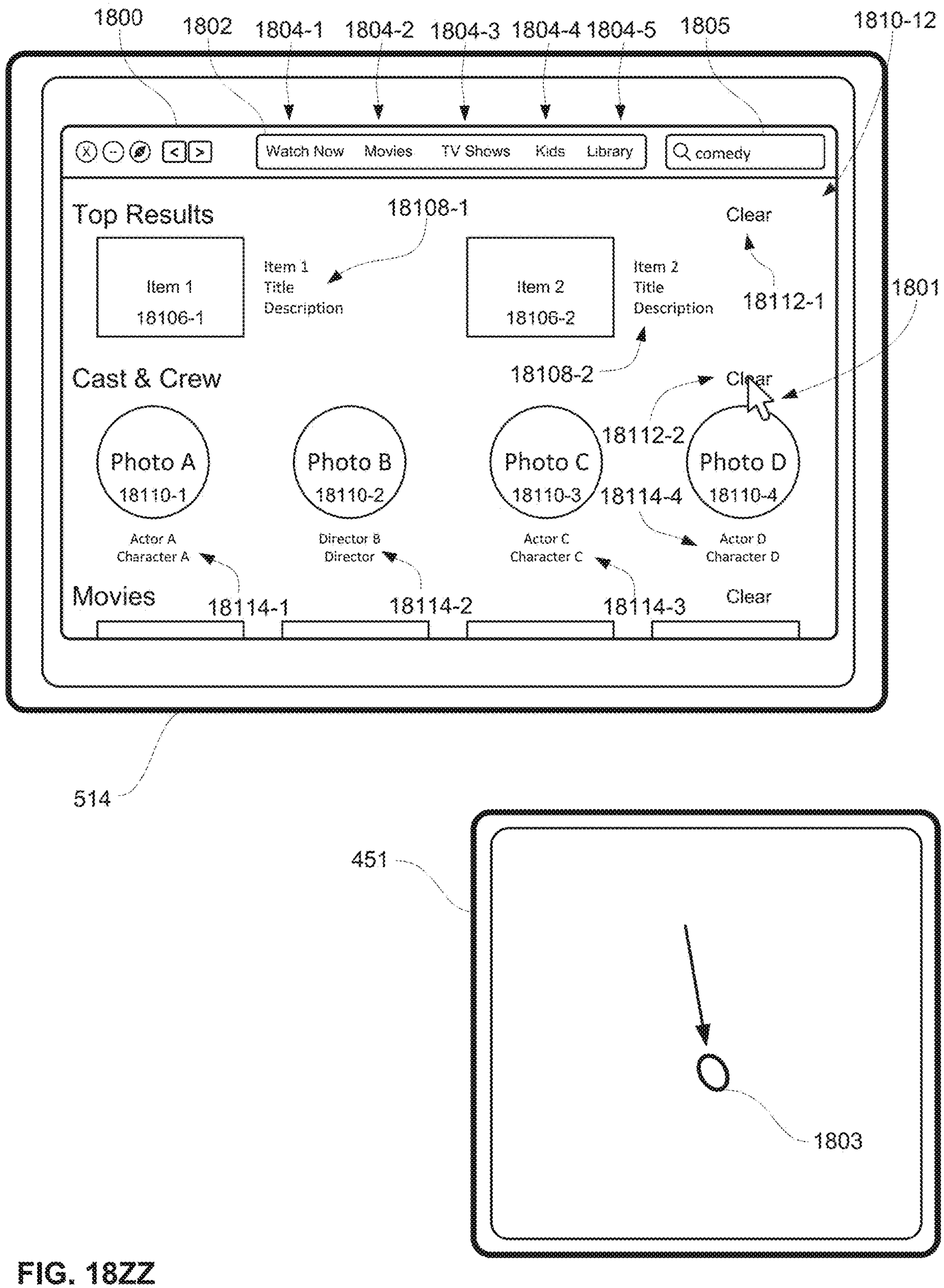

FIGS. 18Y-18Z illustrate a user input 1803 navigating to and selecting selectable option 1852-3 corresponding to the TV Shows category of content items. In some embodiments, in response to the user input, content browse region displays representations of items in the user's library that correspond to the TV Shows category of content items, as shown in FIG. 18AA. For example, as shown in FIG. 18AA, the user's library includes Items H, I, J, K, L, M, and N (e.g., corresponding to representations 1862-1 to 1862-7).

In FIG. 18BB, user input 1803 corresponding to a navigation input is received, thus moving pointer 1801 to hover over representation 1862-5 corresponding to Item L. In some embodiments, in response to the user input, play icon 1816 and menu icon 1818 are displayed, as shown in FIG. 18BB. In FIG. 18CC, user input 1803 corresponding to a selection input is received while pointer 1801 is hovering over representation 1862-5 (e.g., outside of play icon 1816 and menu icon 1818). In some embodiments, in response to the user input, device 500 replaces the content browse region with user interface 1810-7 corresponding to a library product page for the respective television show, as shown in FIG. 18DD. In some embodiments, the library product page is different from the product page discussed above with respect to FIG. 18M.

In some embodiments, user interface 1810-7 includes image 1863 of the television show and information 1865. In some embodiments, information 1865 includes the name of the television show, the number of available seasons, and optionally a short description or synopsis of the television show. In some embodiments, user interface 1810-7 includes one or more listings of episodes of the television show organized by seasons. For example, in FIG. 18DD, Season 1 is displayed with three listings corresponding to three episodes. In some embodiments, user interface 1810-7 is vertically navigable to reveal further listings of episodes and seasons.

In some embodiments, each listing includes a representation of the listing (e.g., an image of the episode), description 1866 (e.g., including which episode the listing is referring to, the title of the episode, and a short description or synopsis of the episode), a download icon 1868 and the duration of the episode 1870. In some embodiments, if the user has partially watched a respective episode, then the representation of the listing includes a playback progress bar indicating the user's playback progress. In some embodiments, selection of a respective listing (e.g., the representation 1864 and/or information 1866) causes playback of the respective content item. In some embodiments, hovering pointer 1801 over a respective listing causes display of a play icon, which is selectable to cause playback of the respective content item. In some embodiments, the user is able to cause playback without first downloading the respective content item (e.g., the content item is streamed to device 500).

In FIG. 18EE, user input 1803 corresponding to a navigation input is received, thus moving pointer 1801 to hover over download icon 1868-1 for Episode 1 of Item L. In some embodiments, in response to the user moving pointer 1801 to hover over the listing for Episode 1 (e.g., anywhere within the listing and not just over download icon 1868-1), duration indicator 1870-1 is changed into a menu icon, as shown in FIG. 18EE. In FIG. 18FF, a user input 1803 corresponding to a selection input is received while pointer is hovering over download icon 1868-1. In some embodiments, in response to the user input, the device initiates download of Episode 1 of Item L, as shown in FIG. 18GG. In some embodiments, when download begins and as download progresses, download icon 1868-1 is updated to display a download indicator that indicates the download progress. In some embodiments, download indicator is selectable to pause or cancel the download process.

In some embodiments, after download completes, download indicator is further updated to display a download completed indicator, as shown in FIG. 18HH (e.g., a box with a check box). In some embodiments, the download completed indicator is selectable to display a selectable option for deleting the downloaded episode (e.g., removing the file from the user's device, but not removing the episode from the library).

In FIG. 18HH, a user input 1803 corresponding to a selection input is received when pointer 1801 is hovering over menu icon 1870-1. In some embodiments, in response to the user input, device 500 displays contextual menu 1872, as shown in FIG. 18II. In some embodiments, contextual menu 1872 includes selectable option 1874-1 that is selectable to download the respective episode, selectable option 1874-2 that is selectable to remove the respective episode from the user's library, selectable option 1874-3 that is selectable to add the respective item (e.g., item L or episode 1 of Item L) to the user's Up Next collection, selectable option 1874-4 that is selectable to mark the respective episode as watched (e.g., such that the Up Next queue does not recommend the respective episode again), selectable option 1874-5 that is selectable to display a user interface specific to the episode, as will be described in more detail below with respect to FIGS. 20M-20O, selectable option 1874-6 that is selectable to display a user interface specific to the item (e.g., item L, similar to user interface 1810-3 described above with respect to FIG. 18M), and selectable option 1874-7 that is selectable to display a further menu for selecting one or more methods of sharing the content item with another user (e.g., via email, text message, instant messaging service, etc.).

FIGS. 18JJ-18KK illustrate a user input 1803 navigating to and selecting selectable option 1852-6 corresponding to the Downloaded category of content items. In some embodiments, in response to the user input, device updates the content browsing region to display user interface 1810-8. In some embodiments, user interface 1810-8 includes one or more items in the user's library that has been downloaded onto device 500. For example, in FIG. 18LL, the user has downloaded item 2 (e.g., representation 1872-2), item 3 (representation 1872-3), and is currently downloading item 1 (representation 1872-1). In some embodiments, each representation includes an indicator of how many episodes have been downloaded (e.g., if the item is a television show, such as with indicator 1874-2 for representation 1872-1), the title of the item, and the year of release and duration of the item (e.g., if the item is a movie or non-episodic content item, such as with indicator 1874-3 for representation 1872-1). In some embodiments, if the content item is currently being downloaded, then the indicator (e.g., indicator 1874-1 for representation 1872-1) indicates that the item is currently being downloaded, the title of the content item, and a download icon 1876 that indicates the current download progress.

In FIG. 18MM, a user input 1803 corresponding to a navigation input is received, thus moving pointer 1801 to hover over representation 1872-2 corresponding to Item 2. In FIG. 18NN, a user input 1803 corresponding to a selection input is received while pointer 1801 is hovering over representation 1872-2 (e.g., outside of play icon 1816 and menu icon 1818 that were displayed in response to the user moving pointer 1801 to hover over representation 1872-2). In some embodiments, in response to the user input, device 500 replaces the content browse region with user interface 1810-9, as shown in FIG. 18OO. In some embodiments, user interface 1810-9 is a library product page similar to user interface 1810-7 described above with respect to FIG. 18DD, except that the listings are limited only to the items that have been downloaded to device 500. Thus, as shown in FIG. 18OO, the user has downloaded eight episodes of Item 2 and user interface 1810-9 includes eight listings corresponding to the eight downloaded episodes. In some embodiments, the listings are organized by season. In some embodiments, each listing includes a download completed indicator 1822 indicating that the respective episode has been downloaded onto device 500. In some embodiments, selection of a respective listing (e.g., the representation 1878 and/or information 1880) causes playback of the respective content item. In some embodiments, hovering pointer 1801 over a respective listing causes display of a play icon, which is selectable to cause playback of the respective content item.

FIGS. 18OO-18PP illustrate a user input 1803 navigating to and selecting selectable option 1856-1 corresponding to Playlist 1 from the user's library. In some embodiments, in response to the user input, device 500 replaces content browsing region with user interface 1810-10, as shown in FIG. 18QQ. In some embodiments, user interface 1810-10 includes one or more listings of content items in the respective playlist. In some embodiments, user interface 1810-10 includes selectable option 1886 that is selectable to download every item in the playlist and selectable option 1888 that is selectable to display a contextual menu associated with the playlist (e.g., providing options to download the playlist, share the playlist, add the items in the playlist to the Up Next queue, etc.). In some embodiments, each listing on user interface 1810-10 includes a representation 1890 (e.g., an image) of the respective content item, information 1892 about the respective item (e.g., including the name of the show, the position of the item in the playlist, and/or a short description or synopsis of the respective content item), and the duration 1894 of the respective content item.

In some embodiments, causing playback of any content item in the playlist causes playback of the playlist such that the next content item in the playlist is automatically played after playback of the previous content item completes. For example, in FIGS. 18RR-18SS, the user navigates to and causes playback of Show 2 (e.g., by selecting play icon 1816 that is displayed in response to the user moving pointer 1801 to hover over representation 1890-2), as shown in FIG. 18TT. In some embodiments, after playback of Show 2 (e.g., the second item in Playlist 1) completes, device 500 automatically causes playback of Show 3 (e.g., the third item in Playlist 1), as shown in FIG. 18UU.

In FIG. 18UU, user input 1803 corresponding to a selection input is received while pointer 1801 is hovering over selectable option 1819. In some embodiments, in response to the user input, device 500 exits content playback mode and replaces user interface 1810-2 with user interface 1810-10 (e.g., the user interface that was displayed before content playback began), as shown in FIG. 18VV In FIG. 18VV, a user input 1803 corresponding to a selection input is received while pointer 1801 is hovering over search field 1805. In some embodiments, device 500 replaces display of navigation panel 1850 and content browsing region with user interface 1810-11. In some embodiments, user interface 1810-11 corresponds to a search user interface for searching for content available in the unified media browsing application 1800. Thus, in some embodiments, without the user beginning to input characters into text field 1805, device 500 displays user interface 1810-11 suggesting one or more search terms or content items to the user. For example, in FIG. 18WW, user interface 1810-11 includes one or more recent search strings (e.g., search string 1896-1 to 1896-6). In some embodiments, selection of any of the recent search strings causes the performance of a search for content with the respective search string.

In some embodiments, user interface 1810-11 includes a row of content items corresponding to content items that have been recently viewed by the user (e.g., representations 1898-1 to 1898-4). In some embodiments, each of the representation of recently viewed items are selectable to cause playback of the respective recently viewed content item (e.g., optionally from the beginning of the content item). In some embodiments, user interface 1810-11 includes additional rows of content items corresponding to different categories of content items, such as trending content items (e.g., representations 18100-1 to 18100-4), popular items, etc.

In some embodiments, each row of items (e.g., content items and search strings) includes a selectable option 18102 (e.g., selectable option 18102-1 to 18102-3) that is selectable to remove the respective row from user interface 1810-11, as will be described in further detail below with respect to FIGS. 18ZZ-18BBB.

In FIG. 18XX, the user has provided text into text field 1805 (e.g., "com"). In some embodiments, in response to receiving text into text field 1805, device 500 displays drop-down 18104. In some embodiments, drop-down 18104 displays one or more suggested search strings based on the text that the user has entered into text field 1805. In some embodiments, each entry on drop-down 18104 is selectable to perform a search using the respective search string. In some embodiments, device 500 does not execute a search and user interface 1810-11 is not updated until the user selects an item from drop-down 18104 or executes the search (e.g., by selecting the enter button on a keyboard). Thus, in FIG. 18XX, device 500 maintains display of user interface 1810-11 despite the user entering text into text field 1804.

In FIG. 18XX, user input 1803 corresponding to a selection input is received when pointer 1801 is hovering over the "Comedy" item in drop-down 18104. In some embodiments, in response to the user input, device 500 executes a search for content items in the unified media browsing application 1800 for a match of the search term "Comedy", and displays user interface 1810-12, as shown in FIG. 18YY. In some embodiments, user interface 1810-12 is a search results user interface and displays one or more rows of content items that match the search string (e.g., "Comedy"). In some embodiments, the first row displayed on user interface 1810-12 includes the top results of the search. In some embodiments, the top results comprise item 1 and item 2. In some embodiments, user interface 1810-12 displays a predetermined number (e.g., 2, 3, 4) of top results consisting of the content items that best match the search term. In some embodiments, the row of top results includes representation 18106-1 (e.g., an image) and information 18108-1 corresponding to the top result (e.g., Item 1). In some embodiments, information 18108-1 includes the name of the item and a short description or synopsis of the item. In some embodiments, the row of top results includes representation 18106-2 and information 18108-2 corresponding to the second top result (e.g., Item 2).

In some embodiments, user interface 1810-12 includes a row of cast and crew members that match the user's search string. In some embodiments, each item in the cast and crew row includes a representation 18110 (e.g., a photo of the cast or crew member), the name of the respective cast or crew member, and the respective person's position (e.g., optionally the character that the respective person played). Thus, in FIG. 18YY, the cast and crew row includes representation 18110-1 and information 18114-1 (e.g., Actor A playing as Character A) corresponding to Actor A, representation 18110-2 and information 18114-2 (e.g., Director B with the position of Director) corresponding to Director B, representation 18110-3 and information 18114-3 (e.g., Actor C playing as Character C) corresponding to Actor C, and representation 18110-4 and information 18114-4 (e.g., Actor D playing as Character D) corresponding to Actor D. In some embodiments, user interface 1810-12 includes further rows of content items that are optionally organized by category (e.g., the user interface is vertically scrollable to reveal the further rows of content items). For example, in FIG. 18YY, a row of movies are displayed below the row of cast & crew members.

In some embodiments, each row of items include selectable option 18112 (e.g., selectable option 18112-1 and 18112-2) to dismiss the respective row of search results. For example, FIGS. 18ZZ-18AAA illustrate the user navigating to and selecting selectable option 18112-2 corresponding to a request to clear the Cast & Crew row of search results. In some embodiments, in response to the user input, device 500 ceases display of the Cast & Crew row of search results and optionally moves all other rows of search results upwards to populate the space vacated by the cast & crew row, as shown in FIG. 18BBB. In FIG. 18BBB, user interface 18110-12 now displays the row of top results, a row of movie search results, and a row of television search results. It is understood that other categories of search results are possible and that the order of categories displayed is merely exemplary and the rows of results can be any order or organization scheme.

Figure 19A:
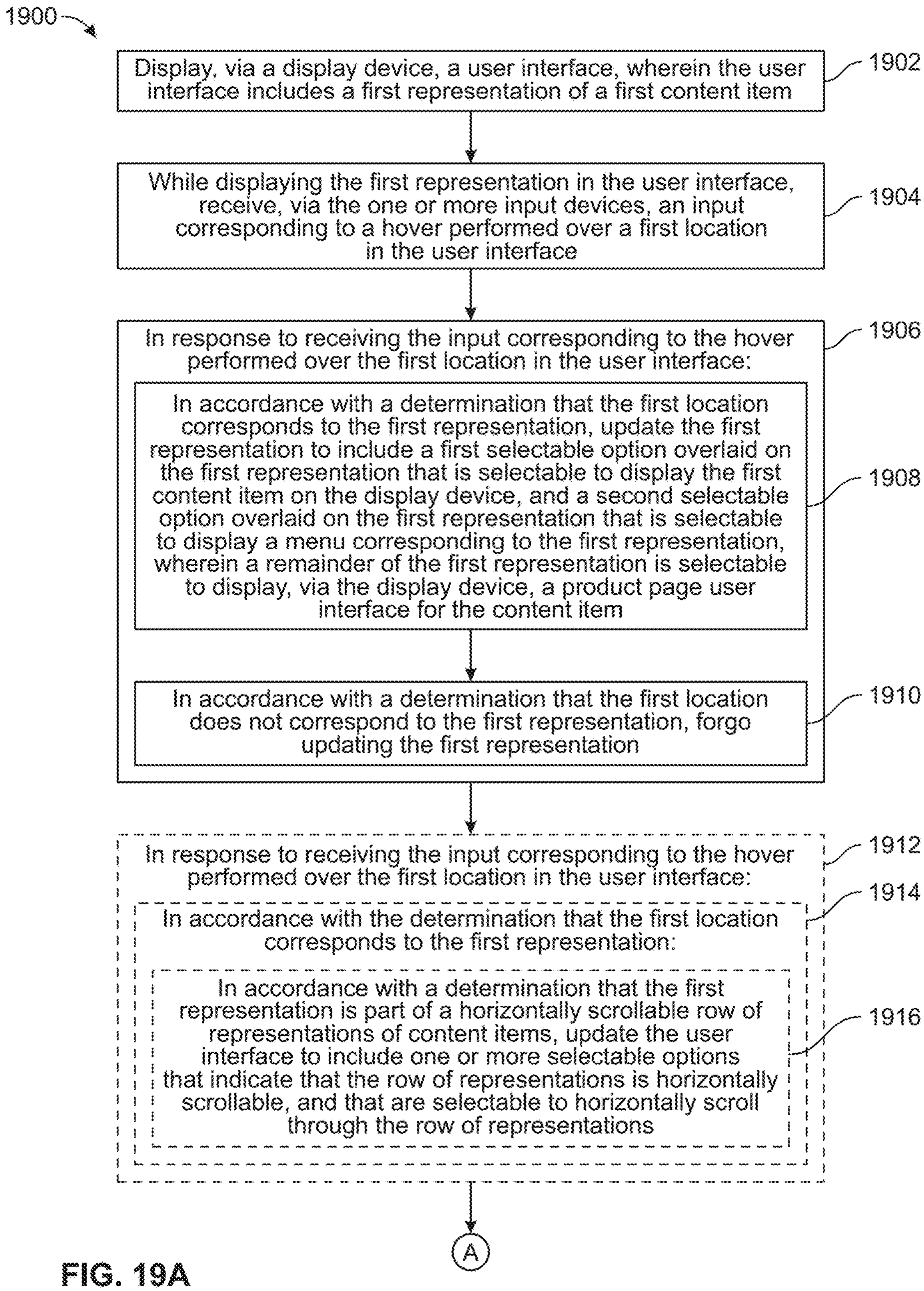
FIGS. 19A-19C are flow diagrams illustrating a method of presenting a plurality of representations of content items in a unified media browsing application in accordance with some embodiments of the disclosure.
Figure 19B:
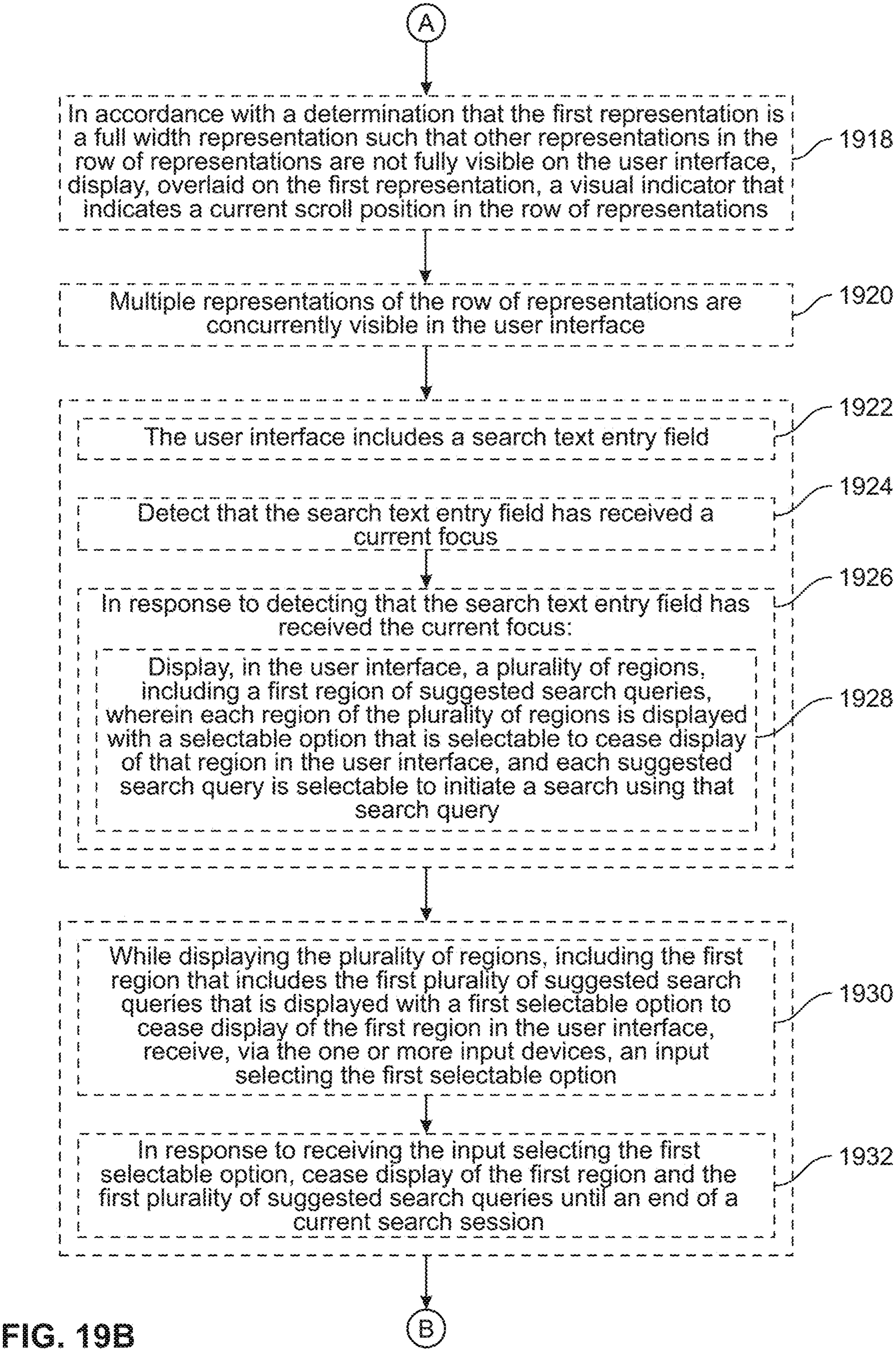
Figure 19C:
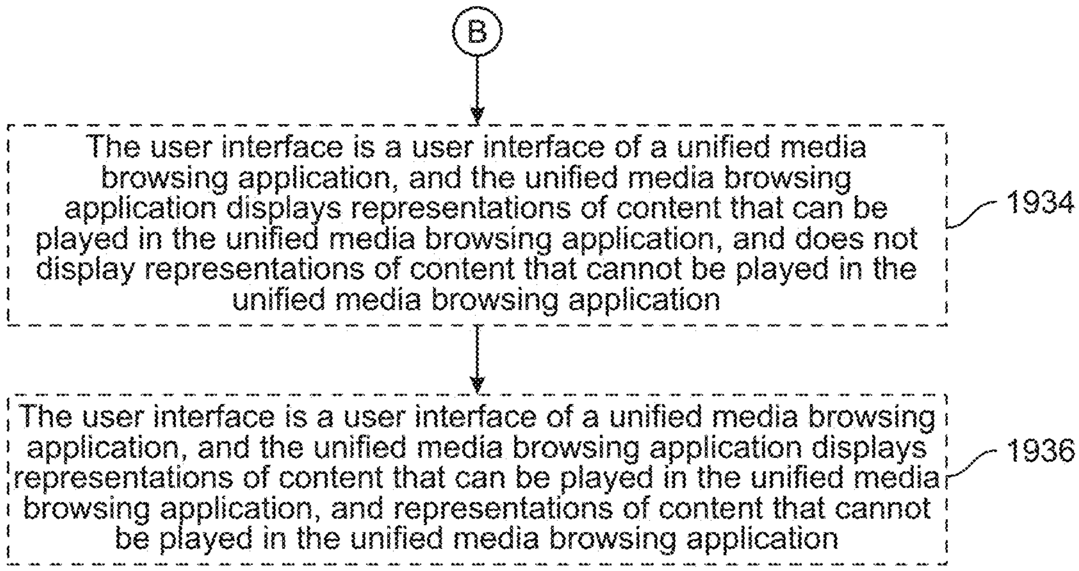

FIGS. 19A-19C are flow diagrams illustrating a method 1900 of presenting a plurality of representations of content items in a unified media browsing application in accordance with some embodiments of the disclosure. The method 1900 is optionally performed at an electronic device such as device 100, device 300, device 500, and device 511 as described above with reference to FIGS. 1A-1B, 2-3, 4A-4B and 5A-5C. Some operations in method 1900 are, optionally combined and/or order of some operations is, optionally, changed.

As described below, the method 1900 provides ways to present a plurality of representations of content items in a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 18A, an electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), displays (1902), via a display device, a user interface, wherein the user interface includes a first representation of a first content item, such as in FIG. 18A (e.g., a content browsing user interface that includes icons of content items that are accessible on the electronic device). In some embodiments, accessing a content item includes beginning playback of the content item. In some embodiments, playback can begin within the same application that is displaying the user interface. In some embodiments, another application is launched and playback begins in the other application. In some embodiments, accessing a content item includes displaying further information about the content item such as displaying a canonical page. In some embodiments, the application displaying the user interface is a unified media browsing application. In some embodiments, the unified media browsing application provides a centralized location for browsing, searching, viewing, or otherwise accessing content on the electronic device. The unified media browsing application optionally receives content viewing information from multiple content providers (e.g., CBS, Fox, ESPN, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the unified media browsing application is able to receive user viewing activity and/or the availability of content from another electronic device which the user has logged into the same account as the account used for the unified media browsing application. In some embodiments, the unified media browsing application is able to receive data from another unified media browsing application that is installed on another electronic device (e.g., installed onto another computer, another set-top box, another mobile device, etc.).

In some embodiments, while displaying the first representation in the user interface, the electronic device 500 receives (1904), via the one or more input devices, an input corresponding to a hover performed over a first location in the user interface, such as in FIG. 18B (e.g., receiving a user input from an input device (e.g., a mouse, a trackpad, etc.) moving a cursor over the first location or receiving a user input on a touch screen device hovering over the first location).

In some embodiments, in response to receiving the input corresponding to the hover performed over the first location in the user interface (1906), in accordance with a determination that the first location corresponds to the first representation (e.g., a cursor placed over the first representation without a corresponding click, or a finger hovering over the first representation without touching down on the first representation), the electronic device 500 updates (1908) the first representation to include a first selectable option overlaid on the first representation that is selectable to display the first content item on the display device, and a second selectable option overlaid on the first representation that is selectable to display a menu corresponding to the first representation, such as in FIG. 18B (e.g., displaying two selectable options overlaid on the icon of the first content item). In some embodiments, the first selectable option is a "play" option that is selectable to cause playback of the respective content item. In some embodiments, the second selectable option is a menu option that is selectable to cause the display of a contextual menu associated with the respective content item). Optionally, a remainder of the first representation (e.g., outside of the first and second selectable options) is selectable to display, via the display device, a product page user interface for the content item (e.g., the rest of the area of the icon of the first content item outside of the area of the first and second selectable option is selectable to display a user interface associated with the content item (e.g., a user interface dedicated to the content item which displays more information about the content item).

In some embodiments, in response to receiving the input corresponding to the hover performed over the first location in the user interface (1906), in accordance with a determination that the first location does not correspond to the first representation, the electronic device 500 forgoes (1910) updating the first representation, such as in FIG. 18A (e.g., if the user input does not correspond to a hover over the icon for the first content item, then do not display the first and second selectable options on the icon for the first content item).

The above-described manner of displaying selectable options on the representation of a content item (e.g., by displaying selectable options on the representation of a content item when receiving a user input hovering over the representation) allows the electronic device to provide the user with options for interacting with the content item when the user has indicated an intent to interact with the content item (e.g., by hovering over the content item) while hiding the selectable options when the user has not shown an intent to interact with the content item, which simplifies the interaction between the user and the electronic device and enhances the operability of the electronic device and makes the user-device interface more efficient (e.g., by only displaying options when the user is likely to want to perform the functions associated with the options), which additionally reduces power usage and improves battery life of the electronic device by enabling the user to use the electronic device more quickly and efficiency.

In some embodiments, in response to receiving the input corresponding to the hover performed over the first location in the user interface (1912), in accordance with the determination that the first location corresponds to the first representation (1914) (e.g., the hover is over the representation of the content item), in accordance with a determination that the first representation is part of a horizontally scrollable row of representations of content items (e.g., the row includes multiple representations of content items), the electronic device 500 updates (1916) the user interface to include one or more selectable options that indicate that the row of representations is horizontally scrollable, and that are selectable to horizontally scroll through the row of representations, such as in FIG. 18B. In some embodiments, multiple representations (e.g., 3, 5, 7) are displayed concurrently, and the user is able to scroll through them horizontally to move from one to the next and/or to bring further representations into the user interface that were originally not displayed in the user interface because of overflow. In some embodiments, only one representation in the row is visible at a time in the user interface (the other representations in the row are overflowed, off the user interface), and scrolling from one representation to the next results in the currently display representation to cease to be displayed, and the next representation to start to be displayed in the user interface. For example, in addition to the buttons that are displayed overlaid on the representation of the content, if the representation of the content is part of a horizontally scrollable row of representations, a left-scroll option is displayed at the left edge of the user interface at the position of the row in the user interface, and a right-scroll option is displayed at the right edge of the user interface at the position of the row. The options are optionally selectable to cause on-screen to off-screen scrolling of the representations in the row, as described above. In some embodiments, the one or more selectable options are displayed when the input corresponds to a hover between representations on a row and/or to the left or right of representations on the row (e.g., if the hover is at any point on the row of representations).

The above-described manner of displaying selectable options for scrolling allows the electronic device to provide a convenient indication of scroll-ability and a convenient manner for performing the scrolling, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, in accordance with a determination that the first representation is a full width representation such that other representations in the row of representations are not fully visible on the user interface (e.g., each representation in the row, when that representation is displayed in the user interface, is displayed to span from the left edge to the right edge of the user interface such that only a single representation of the row of representations is visible at a time), the electronic device displays (1918), overlaid on the first representation, a visual indicator that indicates a current scroll position in the row of representations, such as in FIG. 18O. For example, a bar that includes a number of dots that corresponds to the number of representations in the row, with the dot corresponding to the currently-displayed representation displayed with a different value for a characteristic (e.g., color) than the other dots in the bar.

The above-described manner of displaying a scroll position indicator allows the electronic device to provide a convenient indication of scroll-ability and a convenient indication of the current scroll position, which avoids the user having to provide inputs to identify the current scroll position, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, multiple representations of the row of representations are concurrently visible in the user interface (1920), such as in FIG. 18O. For example, the number of representations in the row that are visible at one time in the user interface is two, three, five, etc. In some embodiments, additional representations are in the row, but are "off-screen," but will come "on-screen" in response to scrolling input (e.g., horizontal scrolling input).

The above-described manner of displaying multiple representations concurrently allows the electronic device to provide access to multiple representations without the need for the user to provide scrolling input to the device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the user interface includes a search text entry field (1922), such as in FIG. 18A. In some embodiments, the electronic device 500 detects (1924) that the search text entry field has received a current focus, such as in FIG. 18WW (e.g., receiving a click input on the search text entry field such that a text insertion cursor is displayed in the search text entry field, or receiving a tap input on the search text entry field in the case of a touch screen implementation).

In some embodiments, in response to detecting that the search text entry field has received the current focus (1926), the electronic device 500 displays (1928), in the user interface, a plurality of regions (e.g., rows), including a first region that includes a first plurality of suggested search queries (e.g., suggested search queries based on the user's past search activity, other users' search activity, the user's past content viewing activity, other users' content viewing activity, etc.), wherein each region of the plurality of regions is displayed with a selectable option that is selectable to cease display of that region in the user interface (e.g., a "clear" button that is selectable to clear that row of representations from the user interface), and each suggested search query is selectable to initiate a search using that search query, such as in FIG. 18WW. For example, selection of a "basketball movies" suggested search query optionally causes a search to be initiated for basketball movies. In some embodiments, in addition to the suggested search queries row, the user interface is also populated with other rows, including a row of representations of recently viewed content items by the user (selectable to initiate playback of the selected content item), and a row of representations of trending content items (selectable to initiate playback of the selected content item) based on what is popular with other users. In some embodiments, in response to receiving search terms into the search text entry field, the electronic device displays suggested autocomplete search terms (e.g., in the user interface in which the rows of suggested search queries were displayed, replacing those rows, or in a new overlay window displayed adjacent the search text entry field. In some embodiments, in response to the user selecting a suggested autocomplete search term, or confirming entry of the user's inputted search terms (e.g., by hitting the "enter" key on a keyboard), the user interface where the suggested search queries were displayed is replaced by the search results for the selected autocomplete search term or the search term(s) entered by the user.

The above-described manner of displaying suggested search queries and/or suggested content items allows the electronic device to provide a convenient set of options to choose from without requiring search input from the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while displaying the plurality of regions, including the first region that includes the first plurality of suggested search queries that is displayed with a first selectable option to cease display of the first region in the user interface, the electronic device 500 receives (1930), via the one or more input devices, an input selecting the first selectable option, such as in FIG. 18AAA.

In some embodiments, in response to receiving the input selecting the first selectable option, the electronic device 500 ceases (1932) display of the first region and the first plurality of suggested search queries until an end of a current search session, such as in FIG. 18BBB. For example, selection of the "clear" button for a given row takes that row (and its representations) out of the user interface for the current search session. In some embodiments, the next time the user navigates to the search user interface (e.g., by giving the search text entry field the current focus), that row (e.g., suggested search queries, trending content items, recently viewed content items) is displayed again in the user interface, though the representations that populate that row may be different based on what has transpired since the user last viewed the search user interface.

The above-described manner of ceasing display of suggested rows of representations allows the electronic device to save computing/display resources when not needed (e.g., by not displaying the cleared out rows), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the user interface is a user interface of a unified media browsing application and the unified media browsing application displays representations of content that can be played in the unified media browsing application, and does not display representations of content that cannot be played in the unified media browsing application (1934), such as in FIG. 18A (e.g., the unified media browsing application provides a centralized location for browsing, viewing, or otherwise accessing content on the electronic device). The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate HBO application, etc.) and aggregates the shared information into a catalog of available content. In some embodiments, the content provider applications have access to content from a specific provider, such as a primary or secondary content provider. In some embodiments, a primary content provider is a content provider (e.g., Comcast, Time Warner, etc.) that provides the user access to a plurality of secondary content providers (e.g., CBS, Fox, HBO, etc.). For example, the only items that can be played in the unified media browsing application itself are displayed. Other content items that might be playable on the electronic device, but through other applications on the electronic device (e.g., content-provider specific applications that only provide content for that particular content provider on the electronic device) are optionally not included in the unified media browsing application user interfaces. Thus, in this configuration, selection of a given representation to cause playback of the corresponding content item results in the corresponding content item to be displayed from within the unified media browsing application without the need to launch/display another application in which to display the content item.

The above-described manner of displaying content items only viewable in the unified media browsing application allows the electronic device to avoid the need to launch/display other applications in response to user input to view a content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the user interface is a user interface of a unified media browsing application, and the unified media browsing application displays representations of content that can be played in the unified media browsing application, and representations of content that cannot be played in the unified media browsing application (1936), such as in FIG. 18A (e.g., an application that provides a centralized location for browsing, viewing, or otherwise accessing content on the electronic device). For example, the unified media browsing application displays both representations of content that can be played in the unified media browsing application and representations of content that cannot be played in the unified media browsing application. Thus, selection of a given representation of content to initiate playback of that representation of content optionally results in the content being played back within the unified media browsing application (if the unified media browsing application can play that content), or the display of another application in which the content can be played (and the ceasing of the display of the unified media browsing application) if the content can't be played in the unified media browsing application and instead must be played in another application (e.g., a content-provider specific application, as previously described).

The above-described manner of displaying both content that can be displayed in the unified media browsing application and content that cannot be displayed in the unified media browsing application allows the electronic device to automatically direct the user to/open the correct separate application in which the content item is to be displayed upon selection of that content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 19A-19C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1700, 2100, and 2300) are also applicable in an analogous manner to method 1900 described above with respect to FIGS. 19A-19C. For example, the operation of the electronic device to present content in the unified media browsing application described above with reference to method 1900 optionally has one or more of the characteristics of the presentation of information on representations of content items, displaying of content in a unified media browsing application, linking of an account for a primary content provider, restricting of access to content based on the geographic location of the device, presentation of playback menus during playback of content in a unified media browsing application, displaying user interfaces specific to a respective content item, displaying content items, etc., described herein with reference to other methods described herein (e.g., methods 700, 900, 1100, 1300, 1500, 1700, 2100, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 19A-19C are, optionally, implemented by components depicted in FIGS. 1A-1B. For example, displaying operations 1902, 1918, and 1928, receiving operations 1904, and 1930, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces Specific to a Respective Content Item

Users interact with electronic devices in many different manners, including using an electronic device to browse and access content in a media browsing application. The embodiments described below provide ways in which an electronic device displays user interfaces that are specific to respective content items in a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 20A:
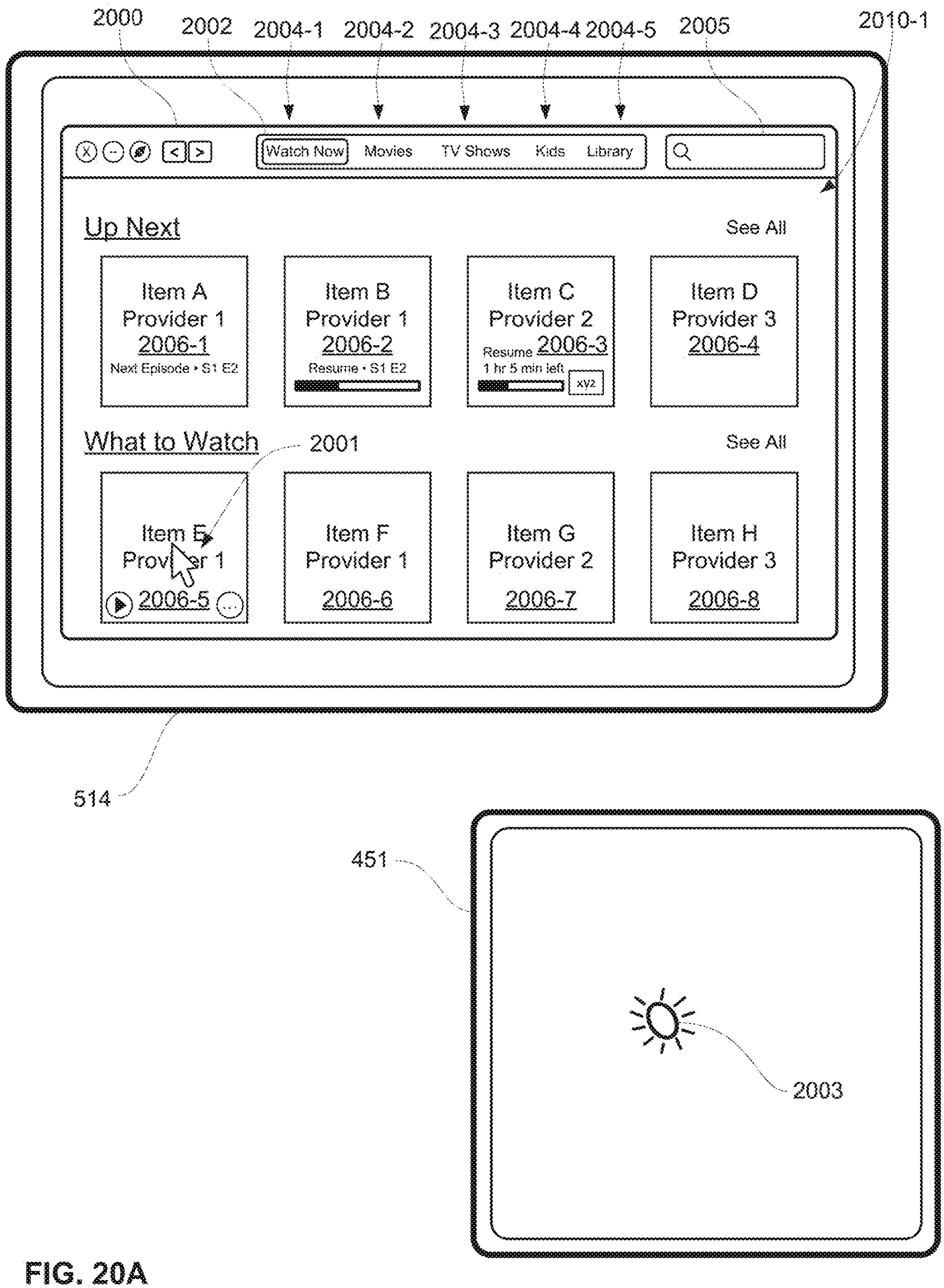
FIGS. 20A-20T illustrate exemplary ways in which an electronic device displays user interfaces specific to respective content items in accordance with some embodiments of the disclosure.
Figure 20B:
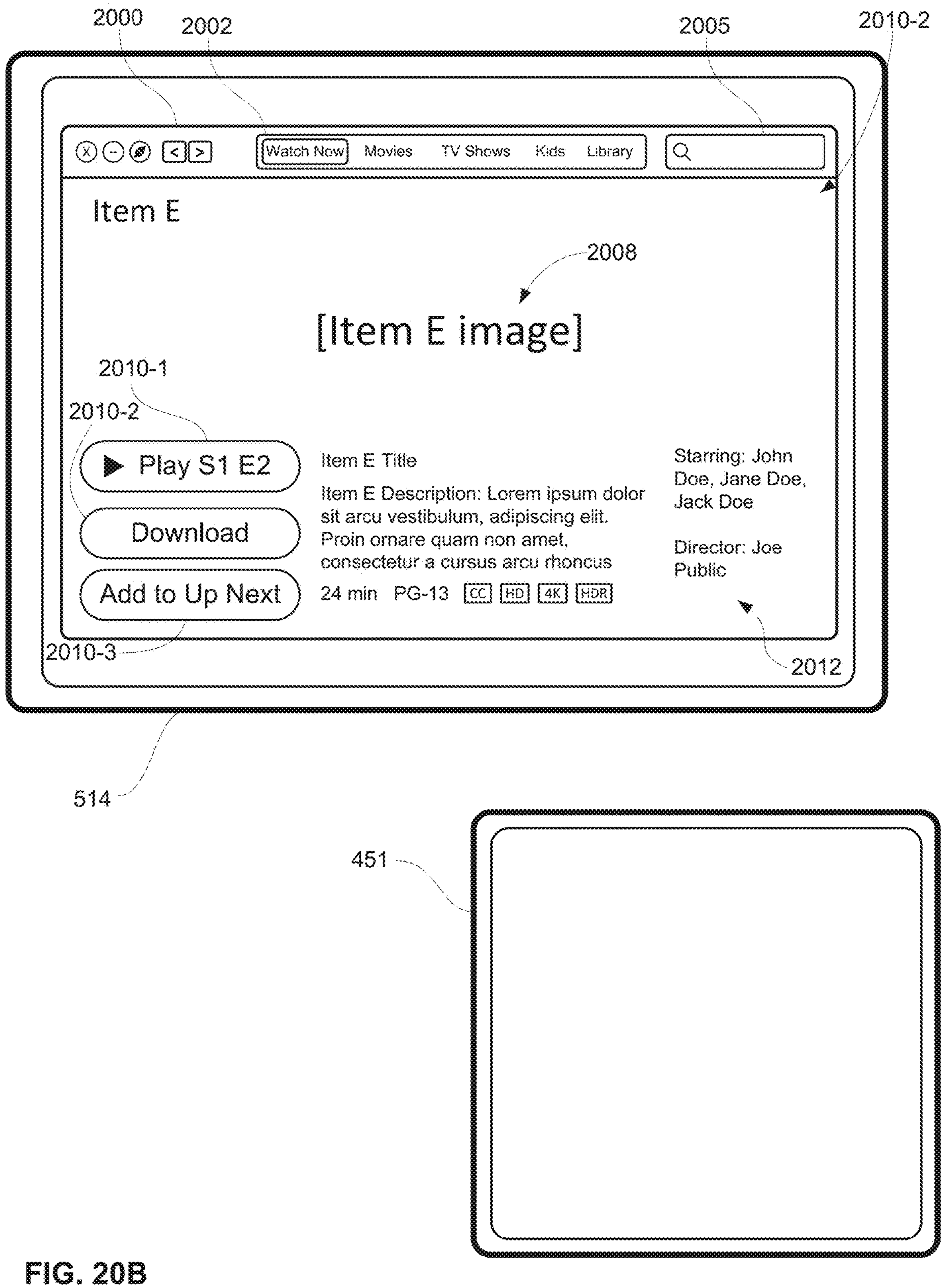
Figure 20C:
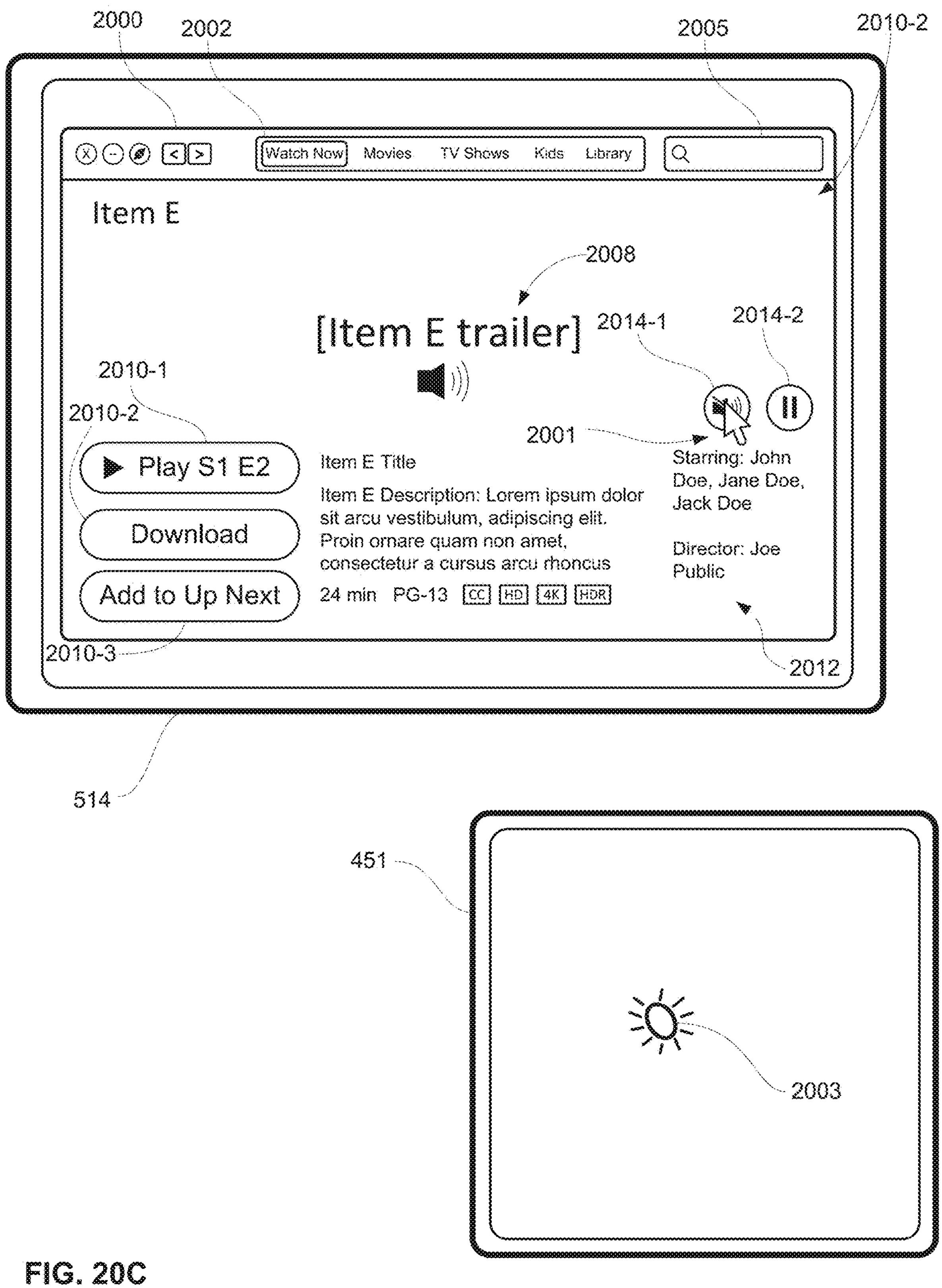
Figure 20D:
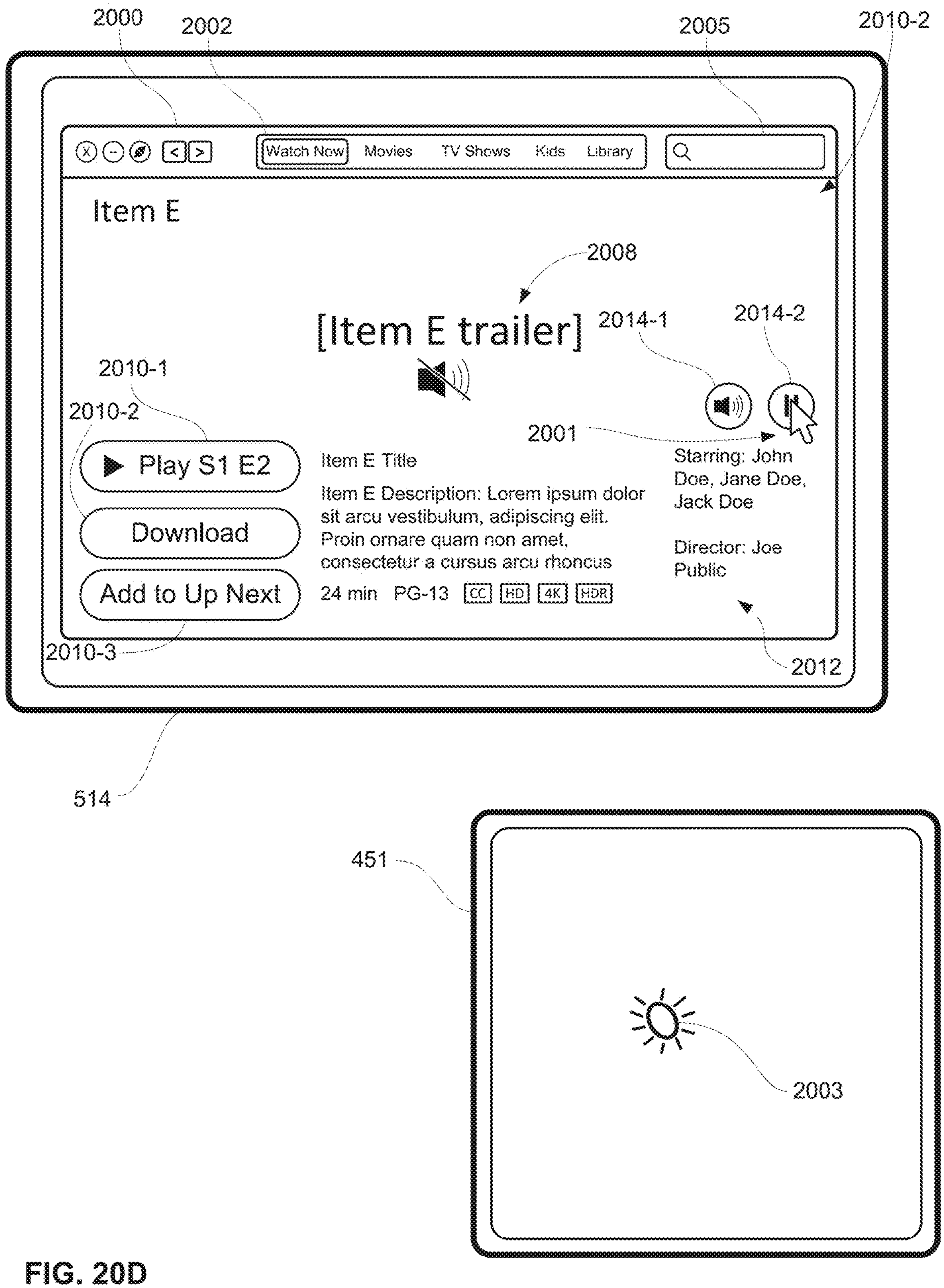
Figure 20E:
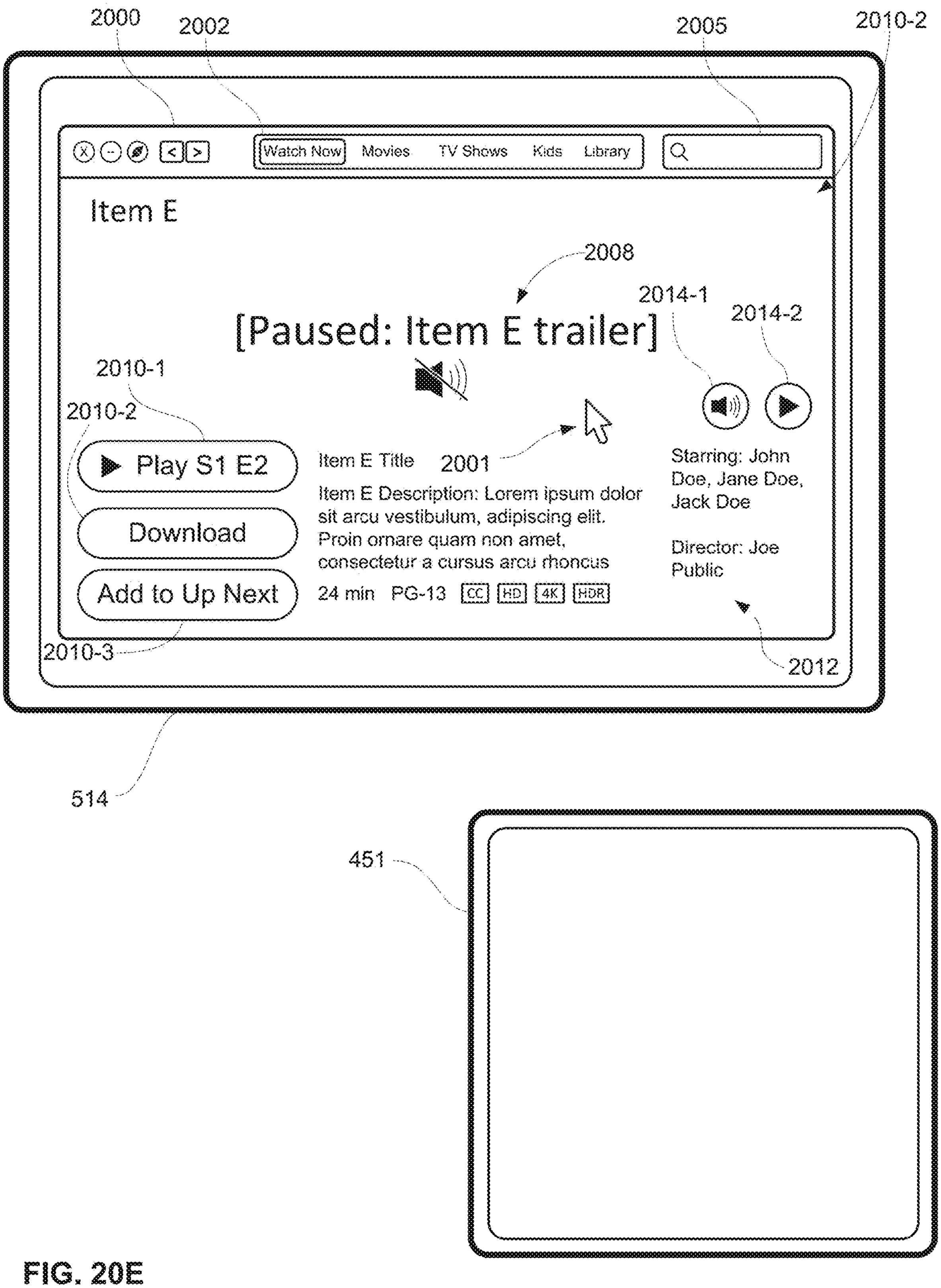
Figure 20F:
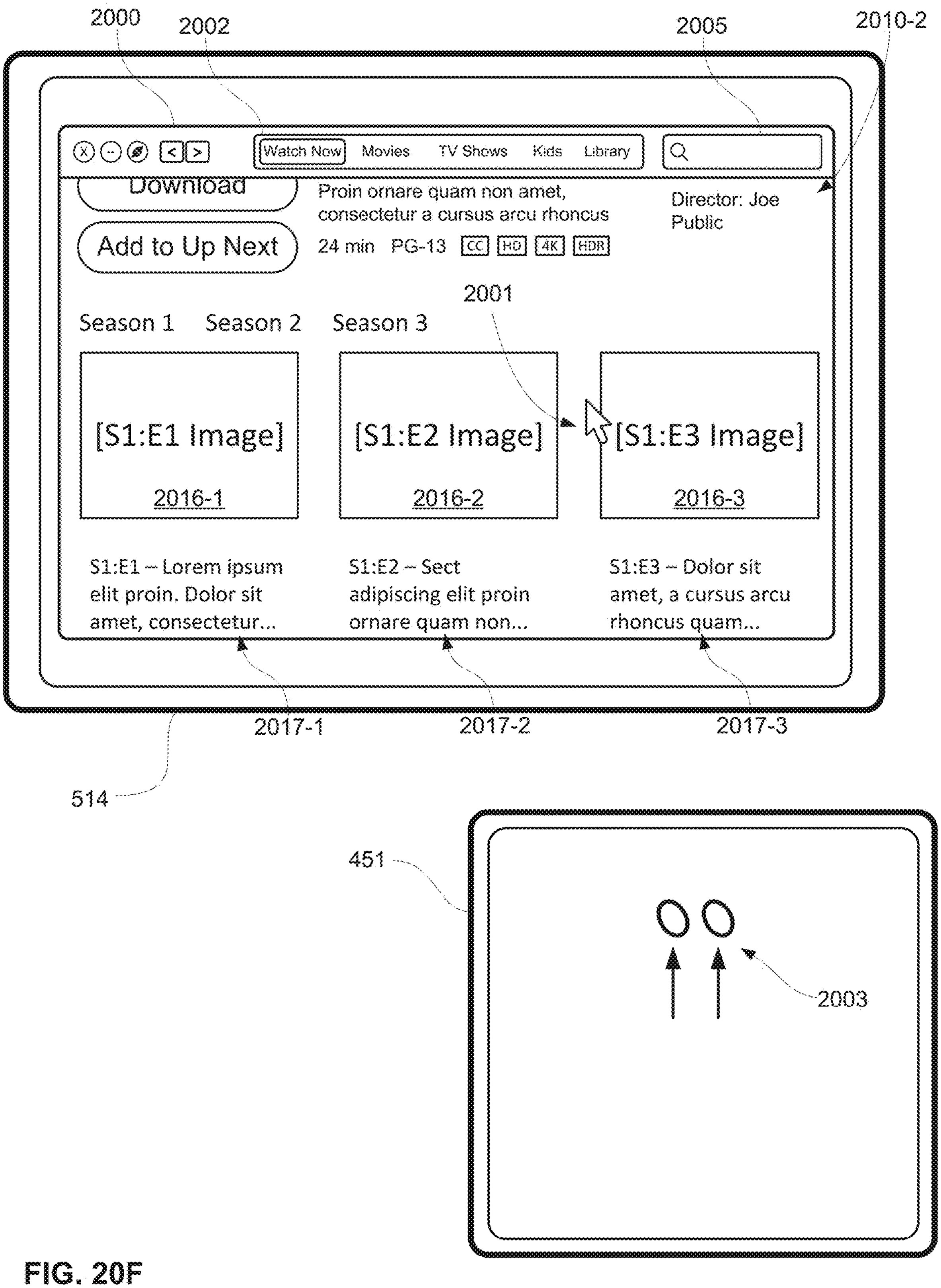
Figure 20G:
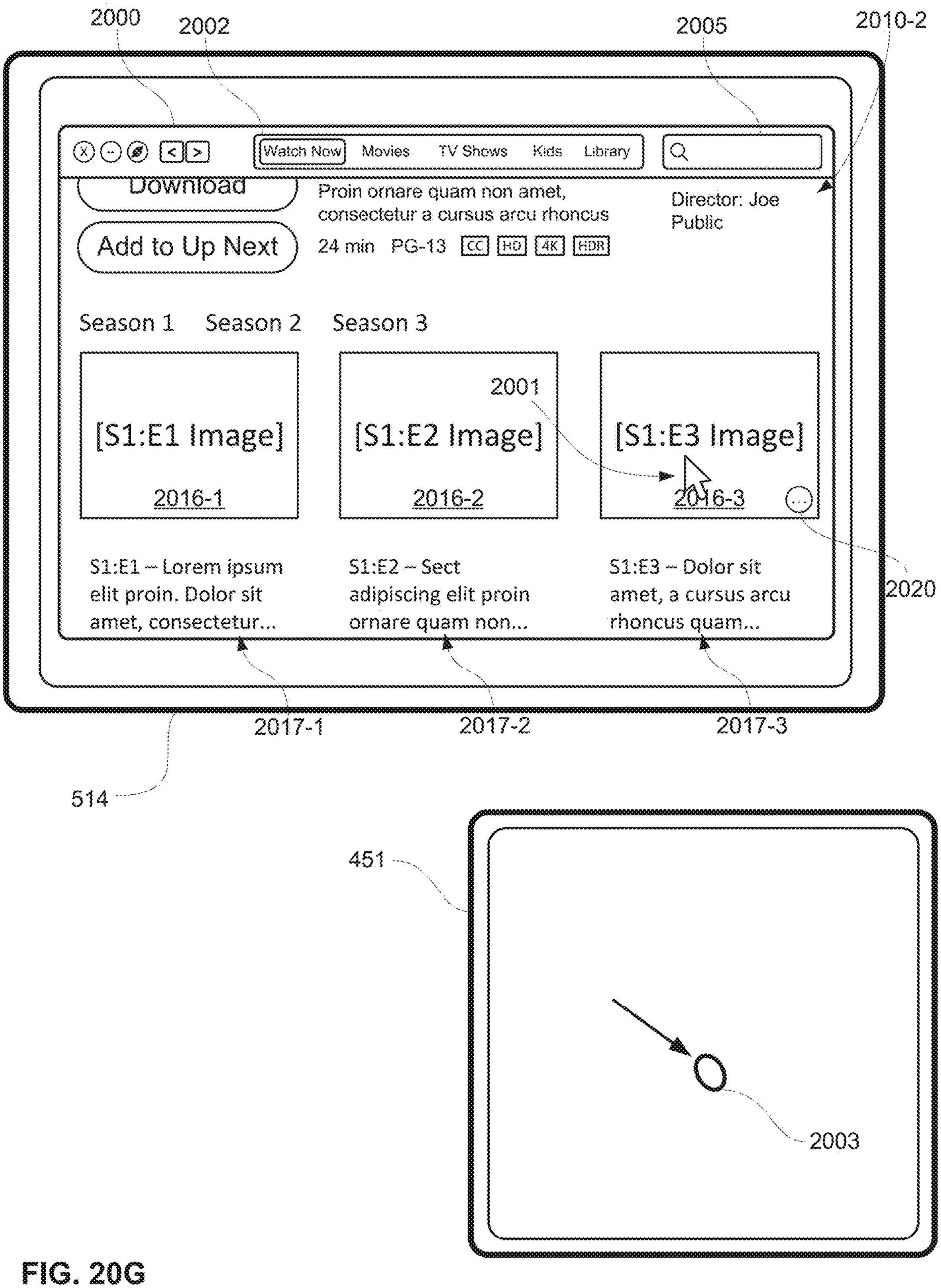
Figure 20H:
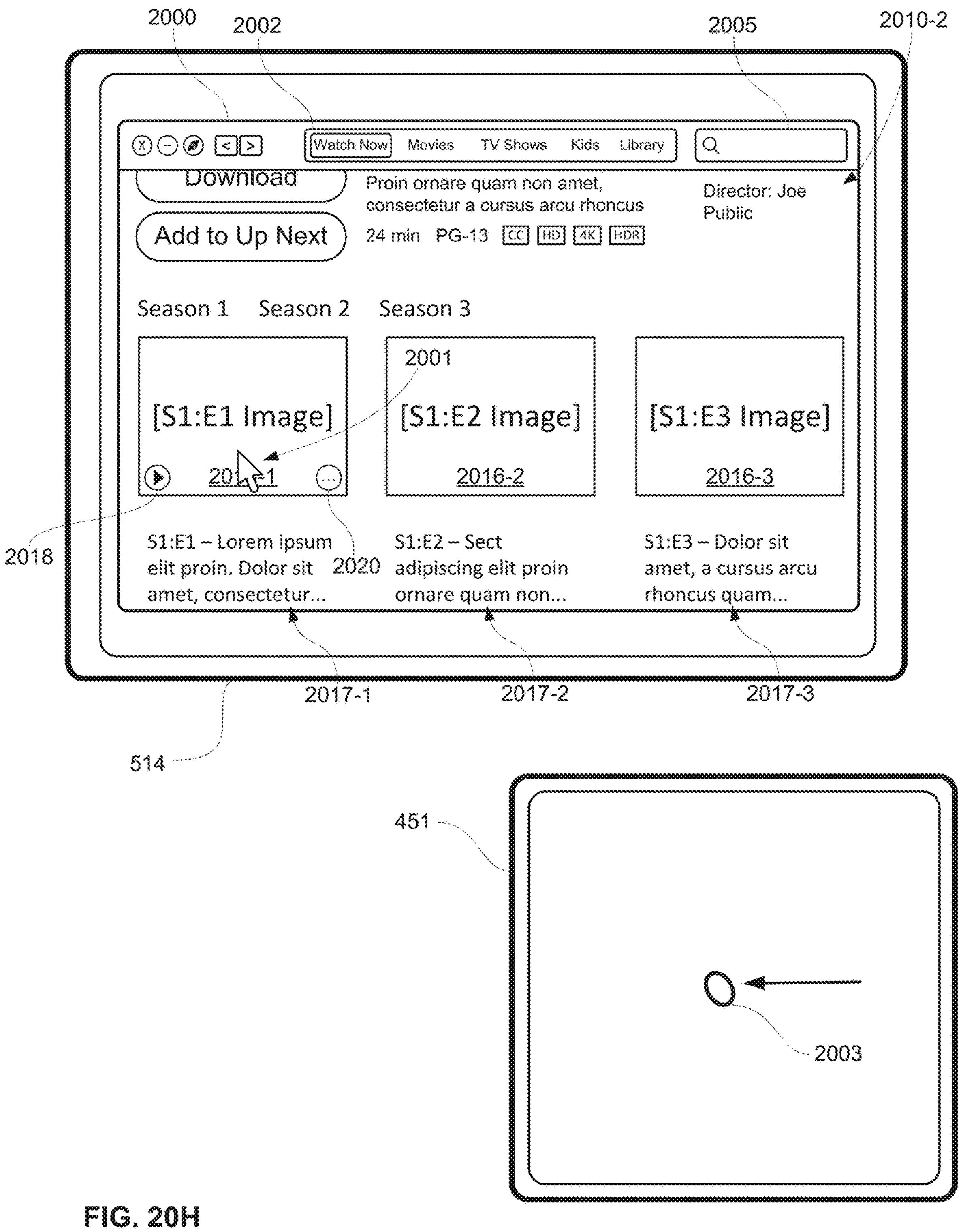
Figure 20I:
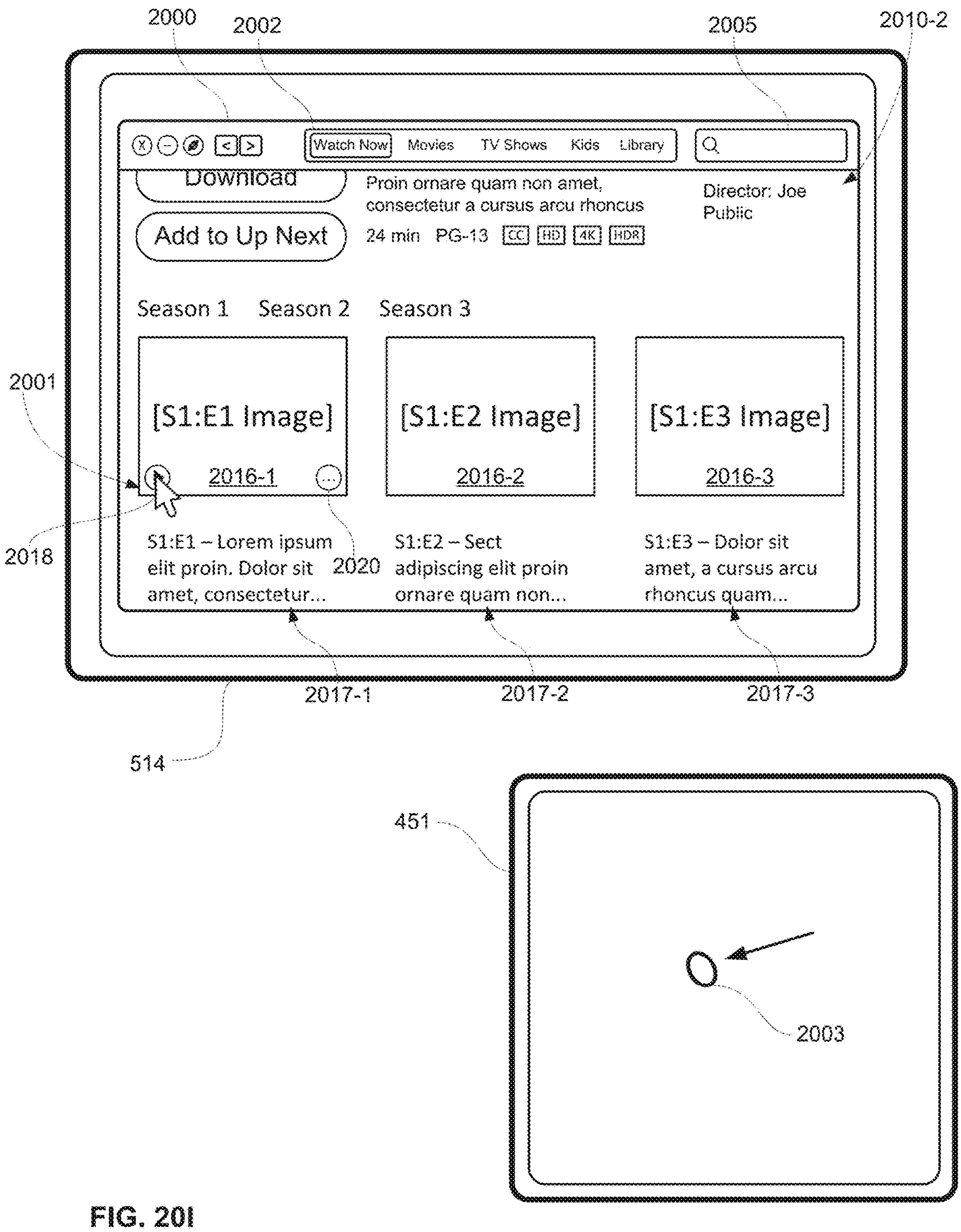
Figure 20J:
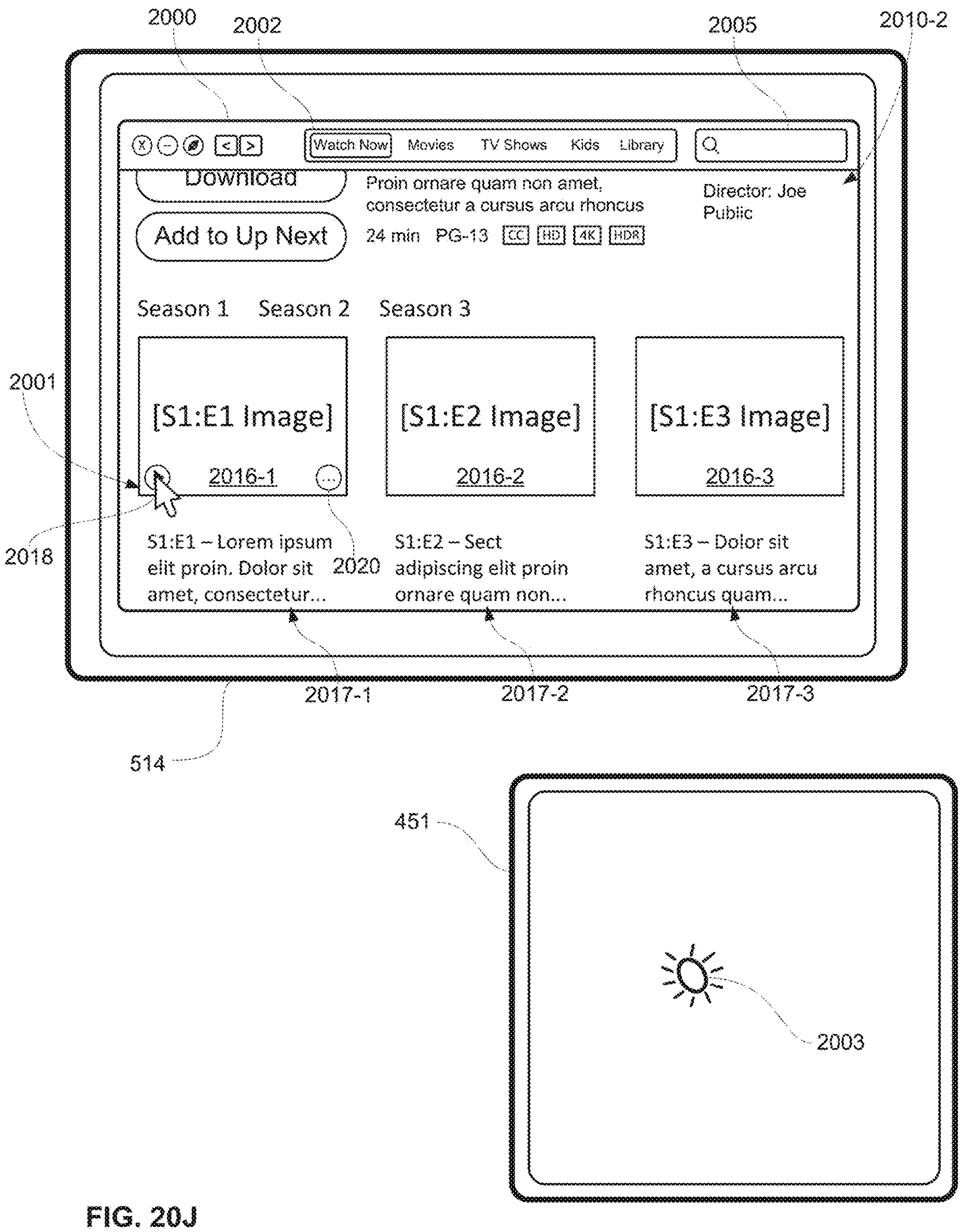
Figure 20K:
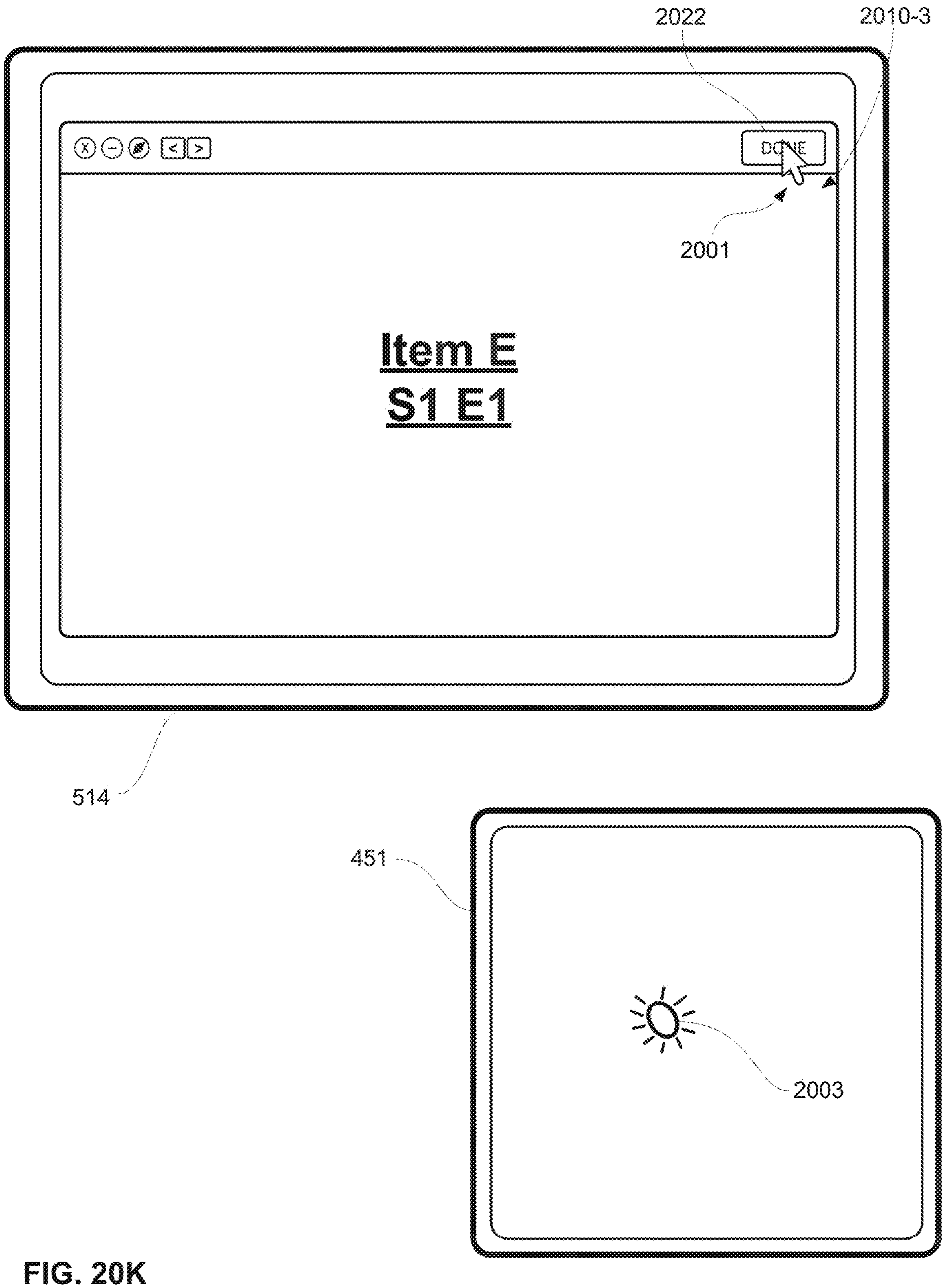
Figure 20L:
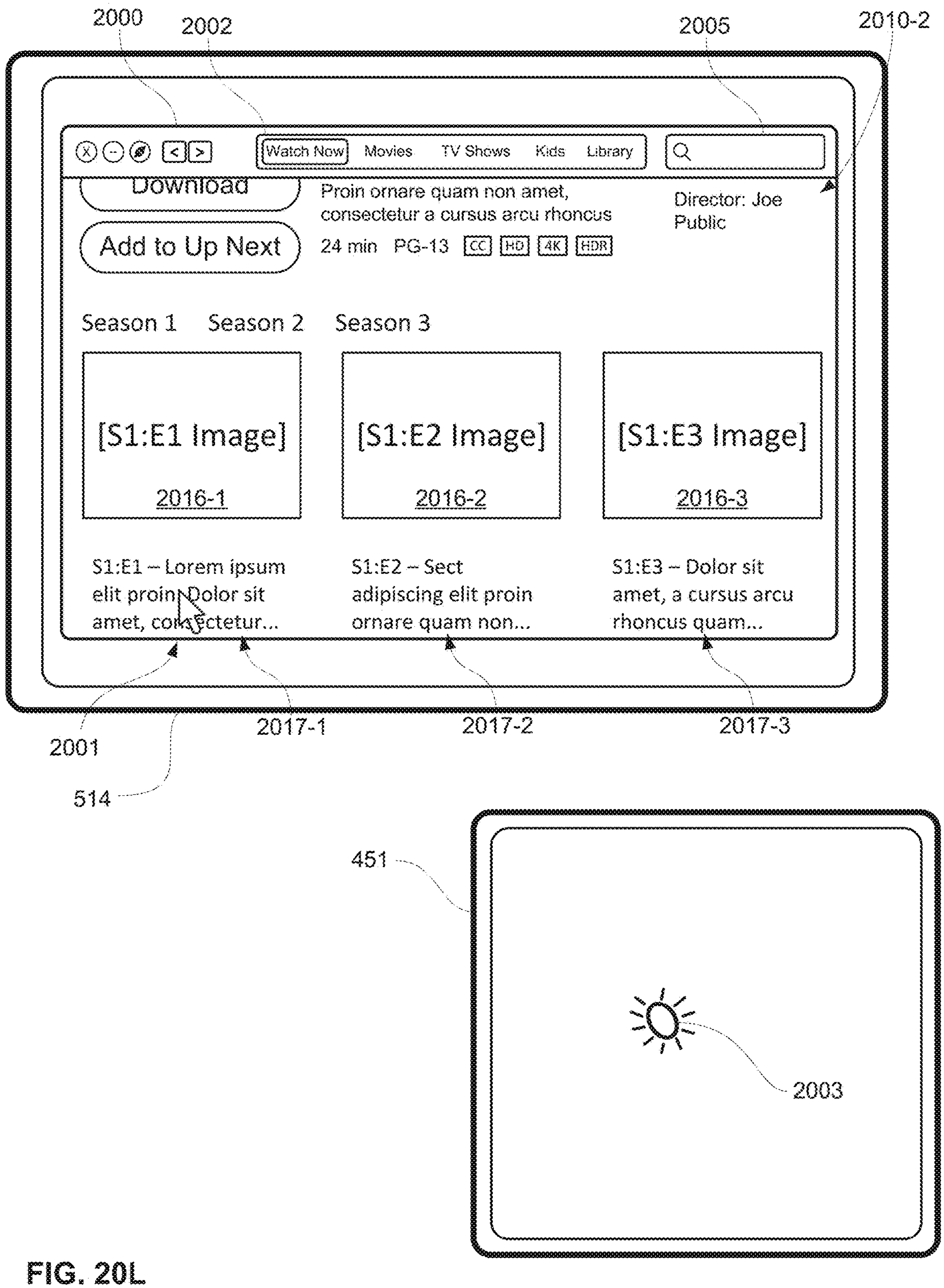
Figure 20M:
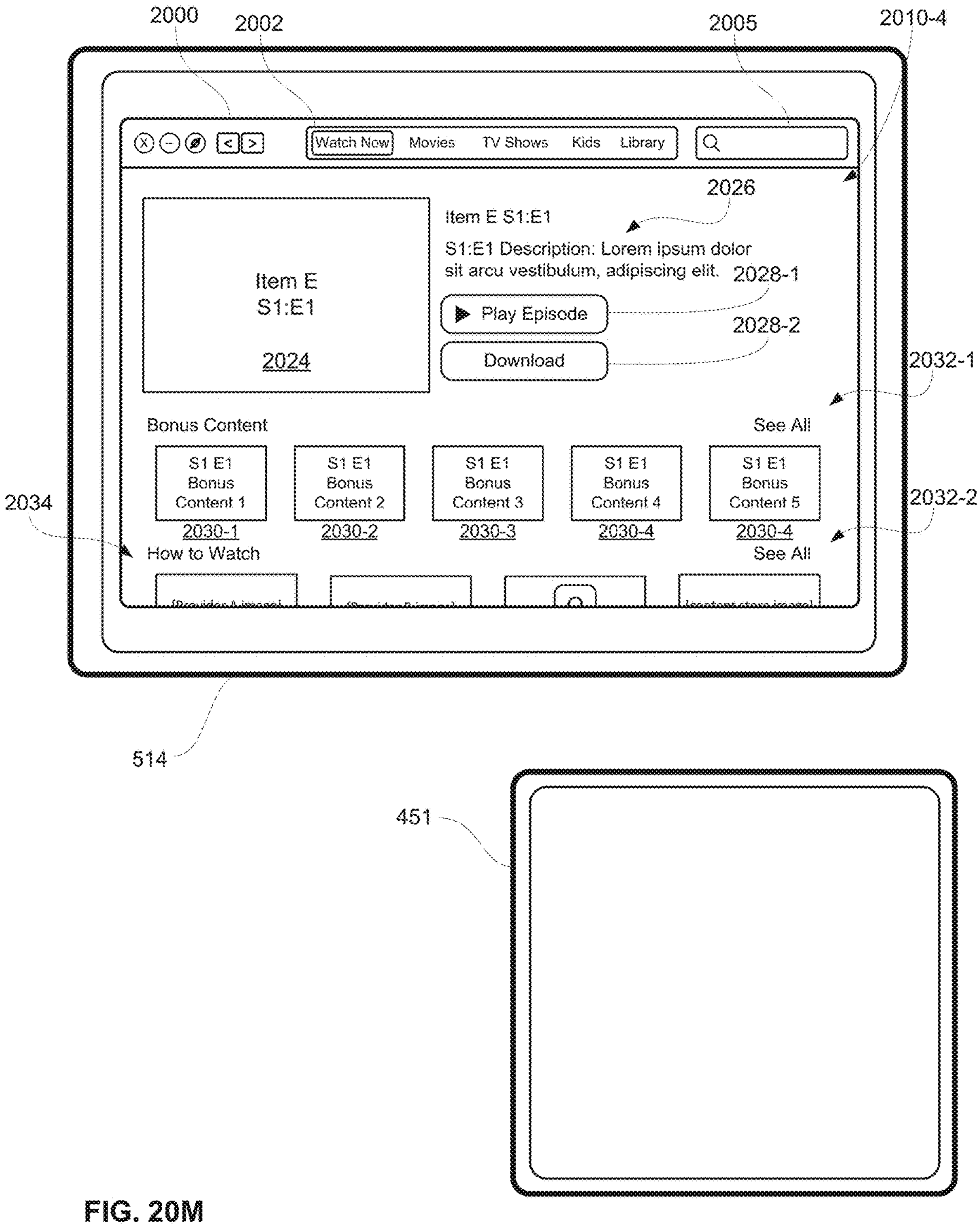
Figure 20N:
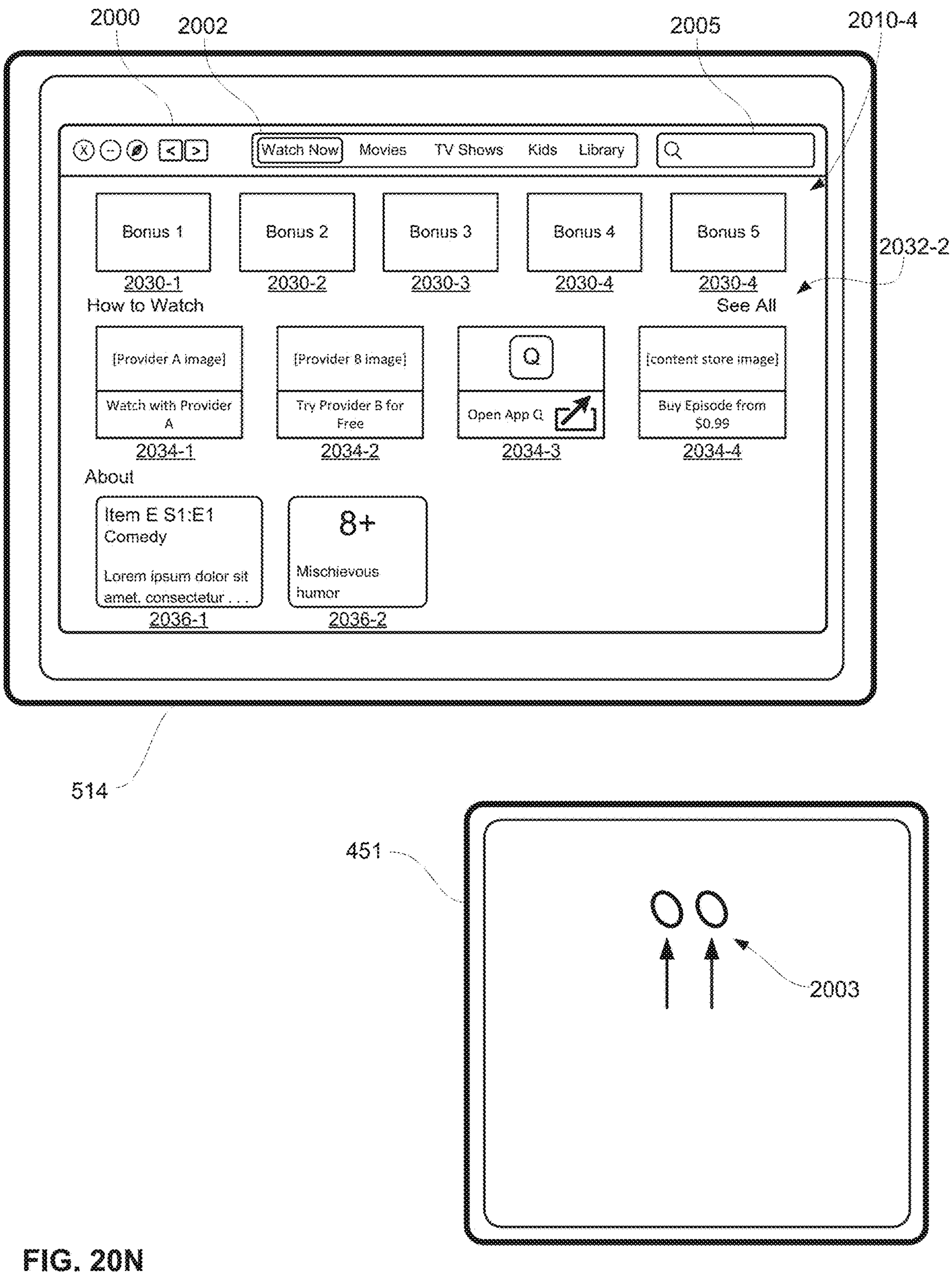
Figure 20O:
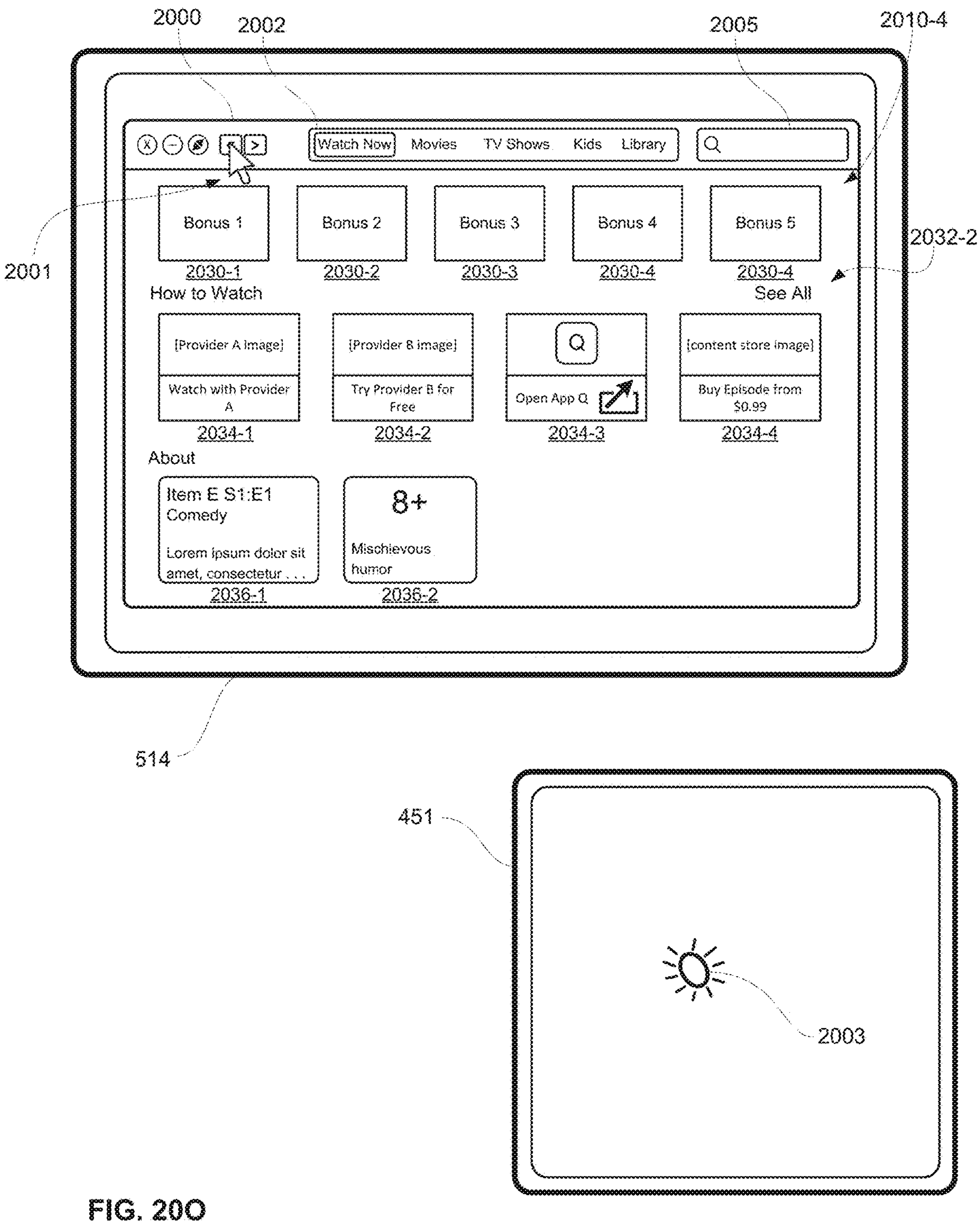
Figure 20P:
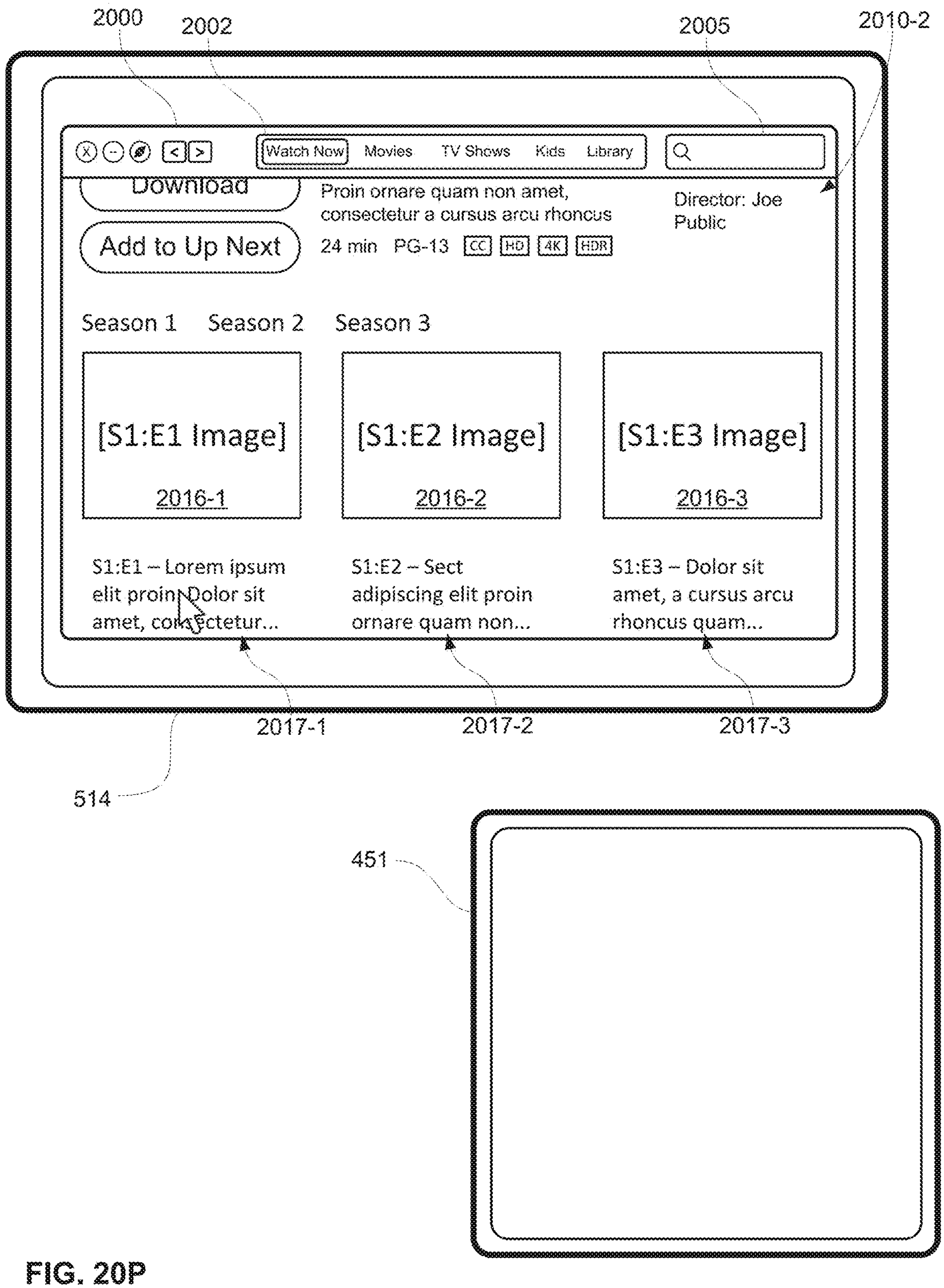
Figure 20Q:
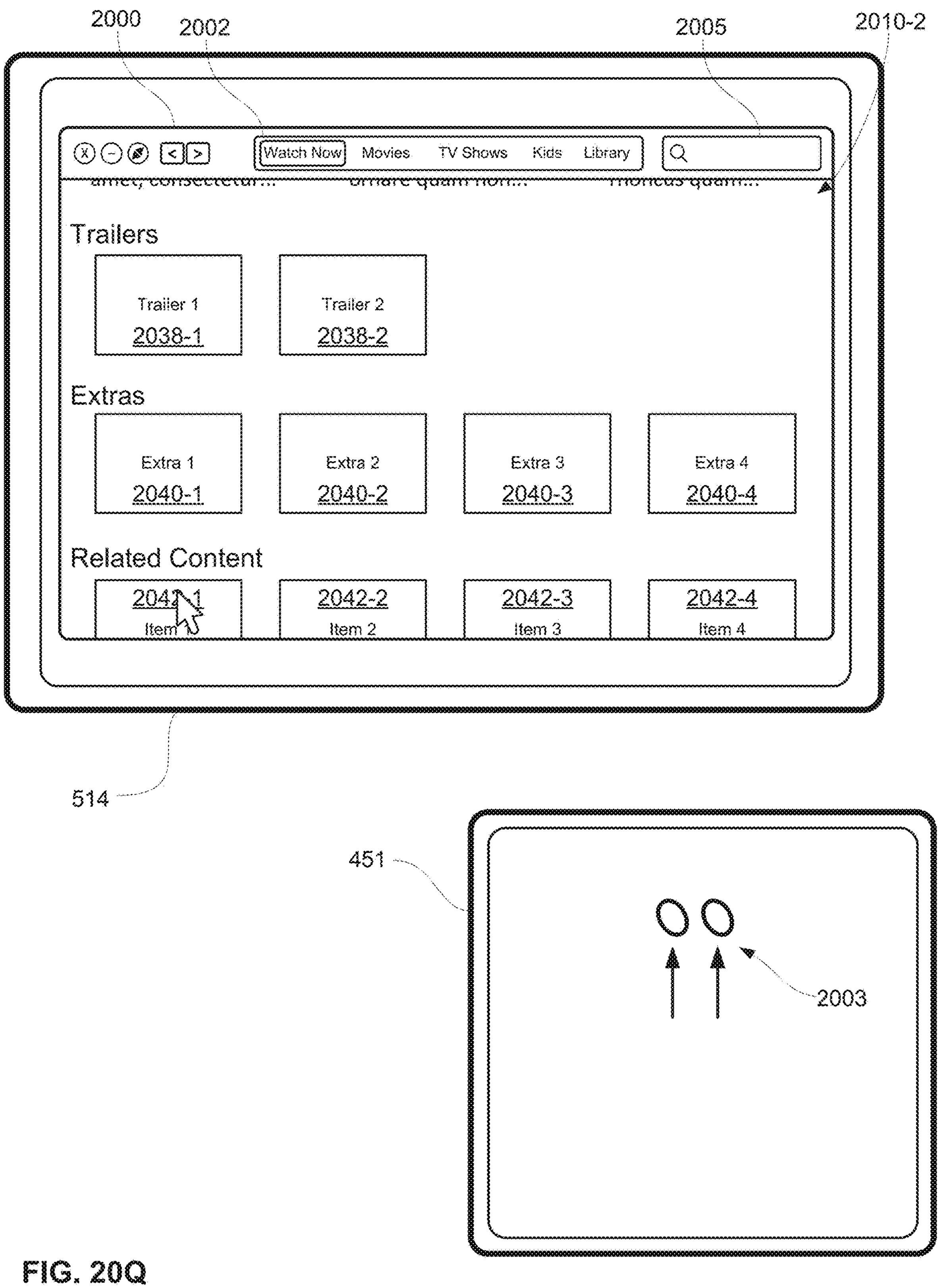
Figure 20R:
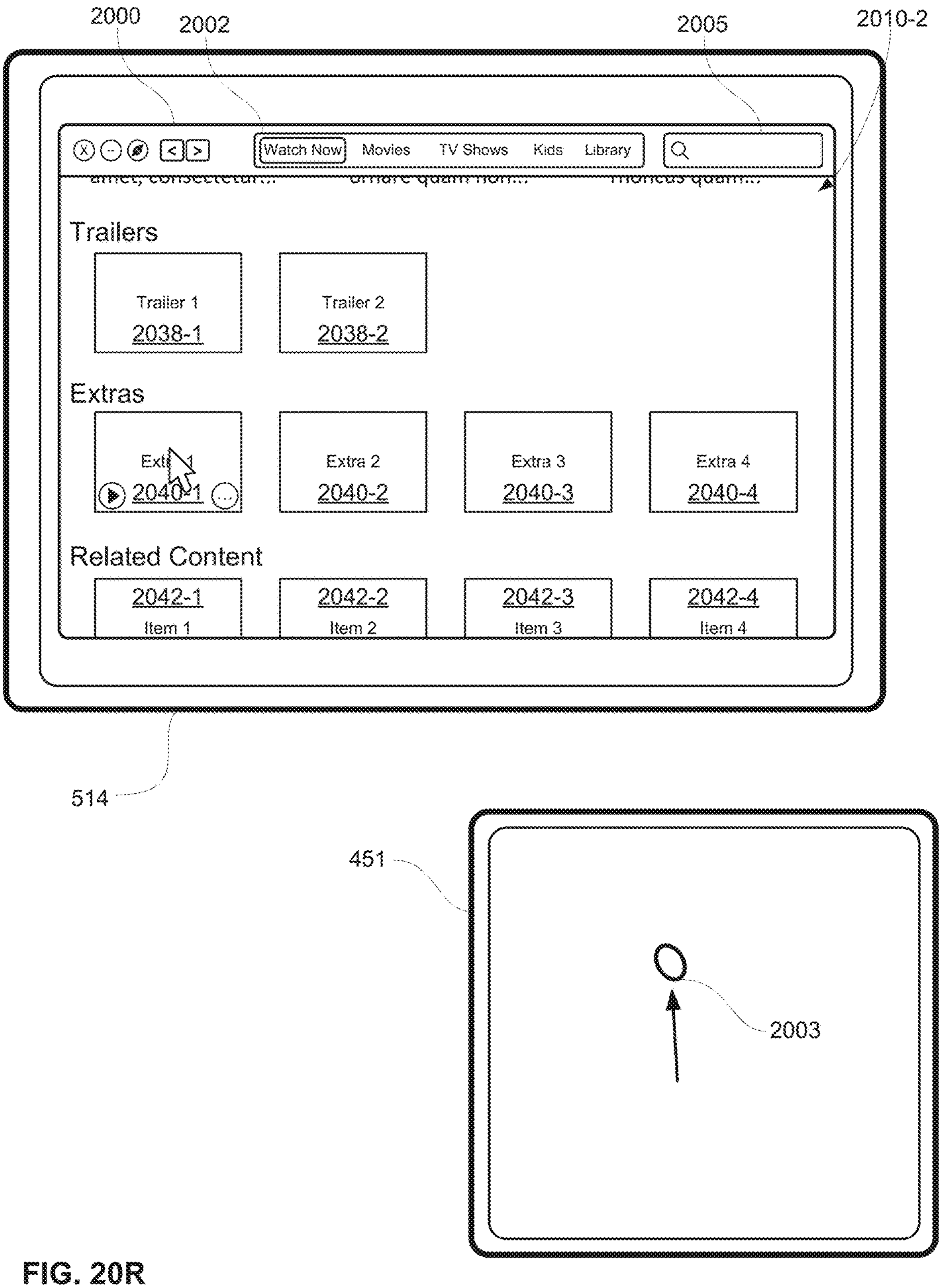
Figure 20S:
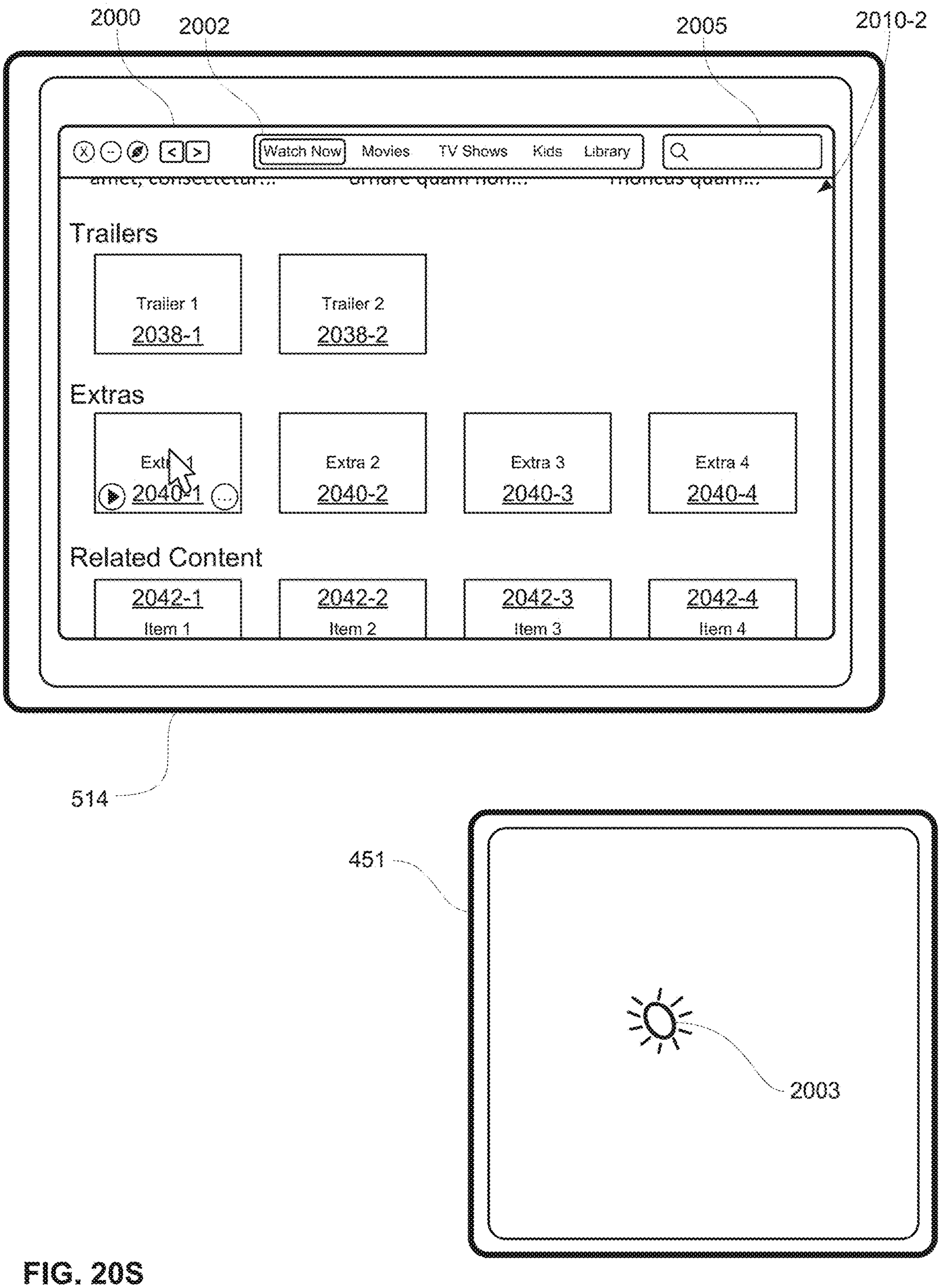
Figure 20T:
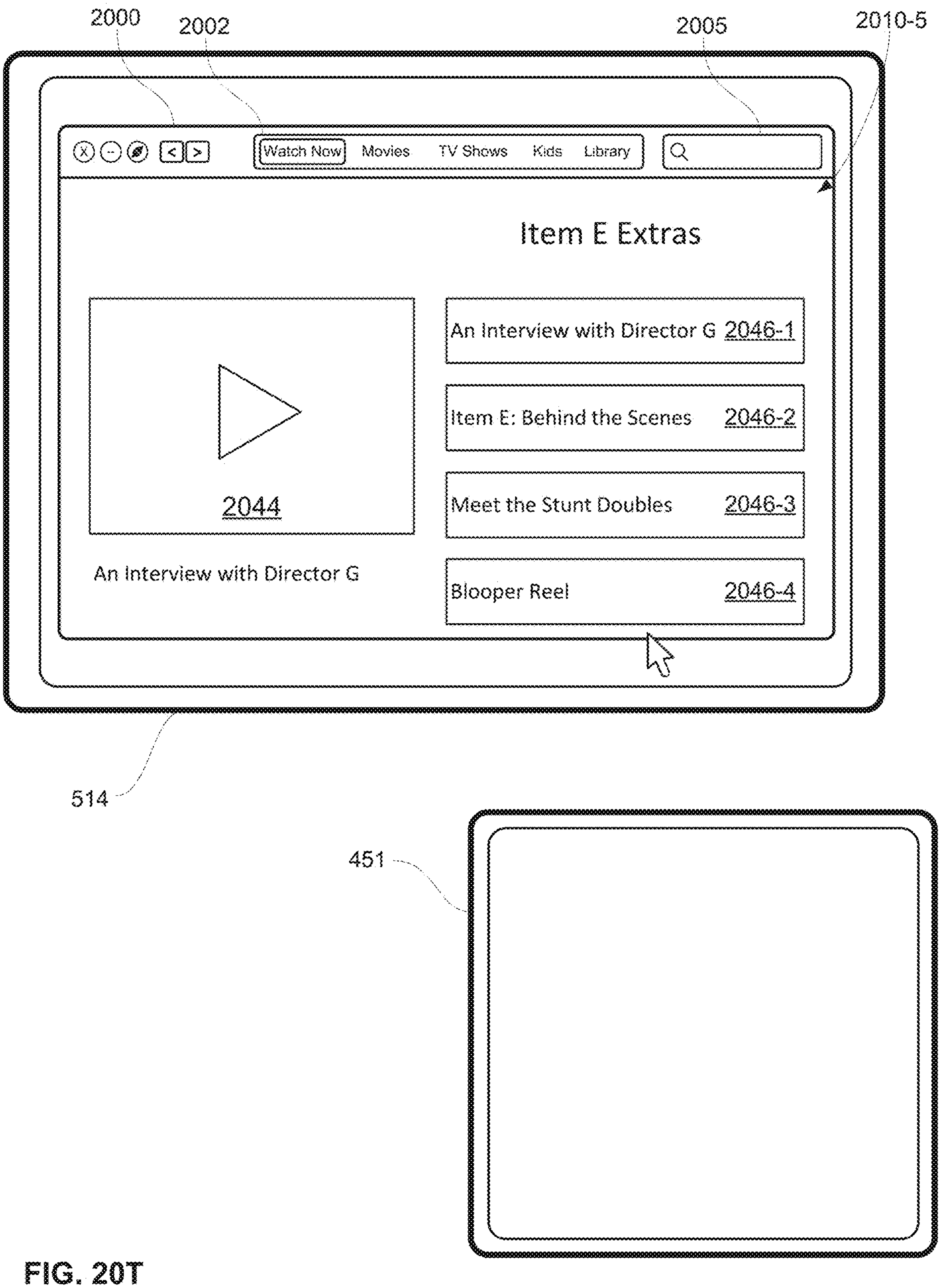
Figure 21A:
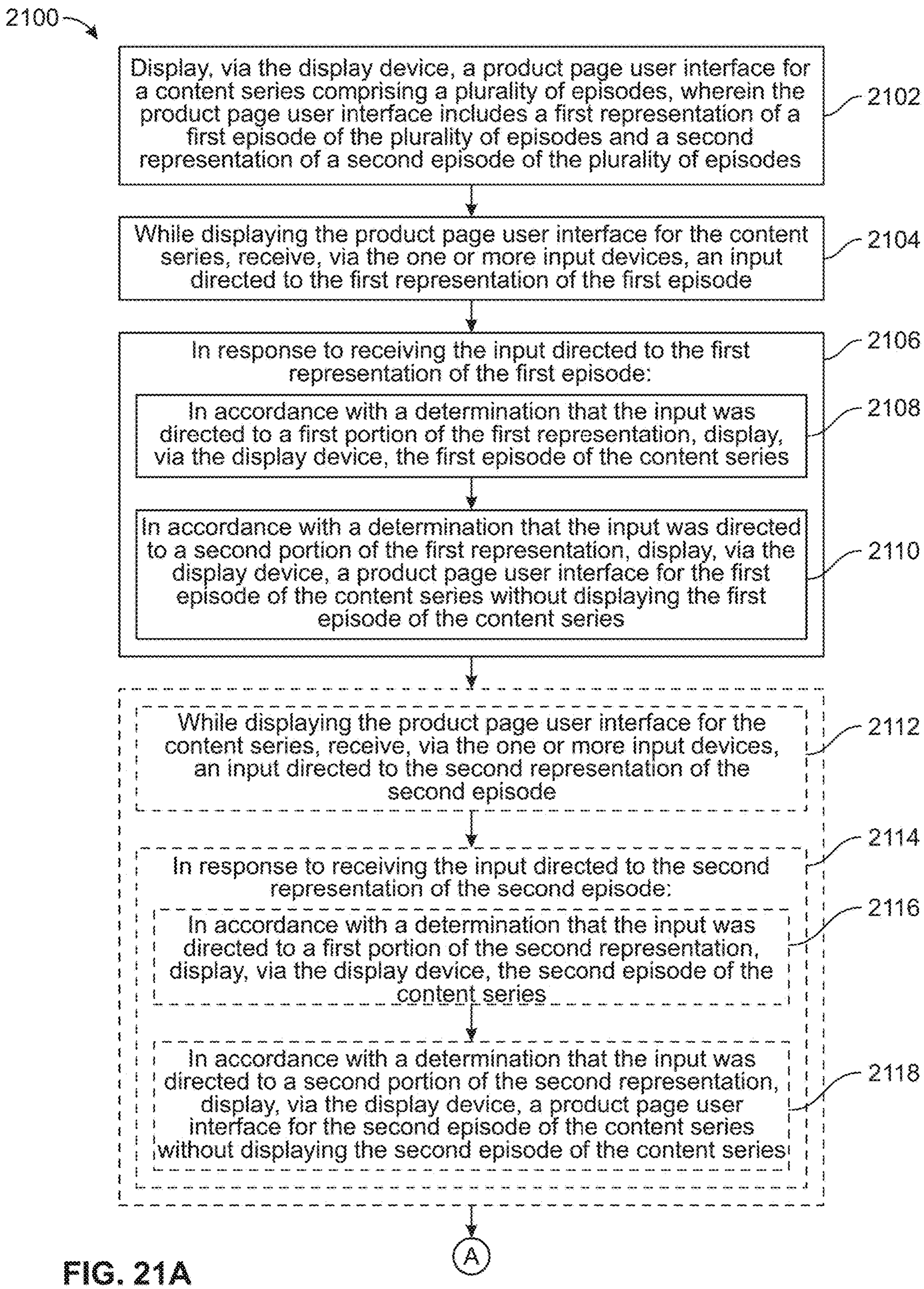
FIGS. 21A-21D are flow diagrams illustrating a method of displaying user interfaces specific to respective content items in accordance with some embodiments of the disclosure.
Figure 21B:
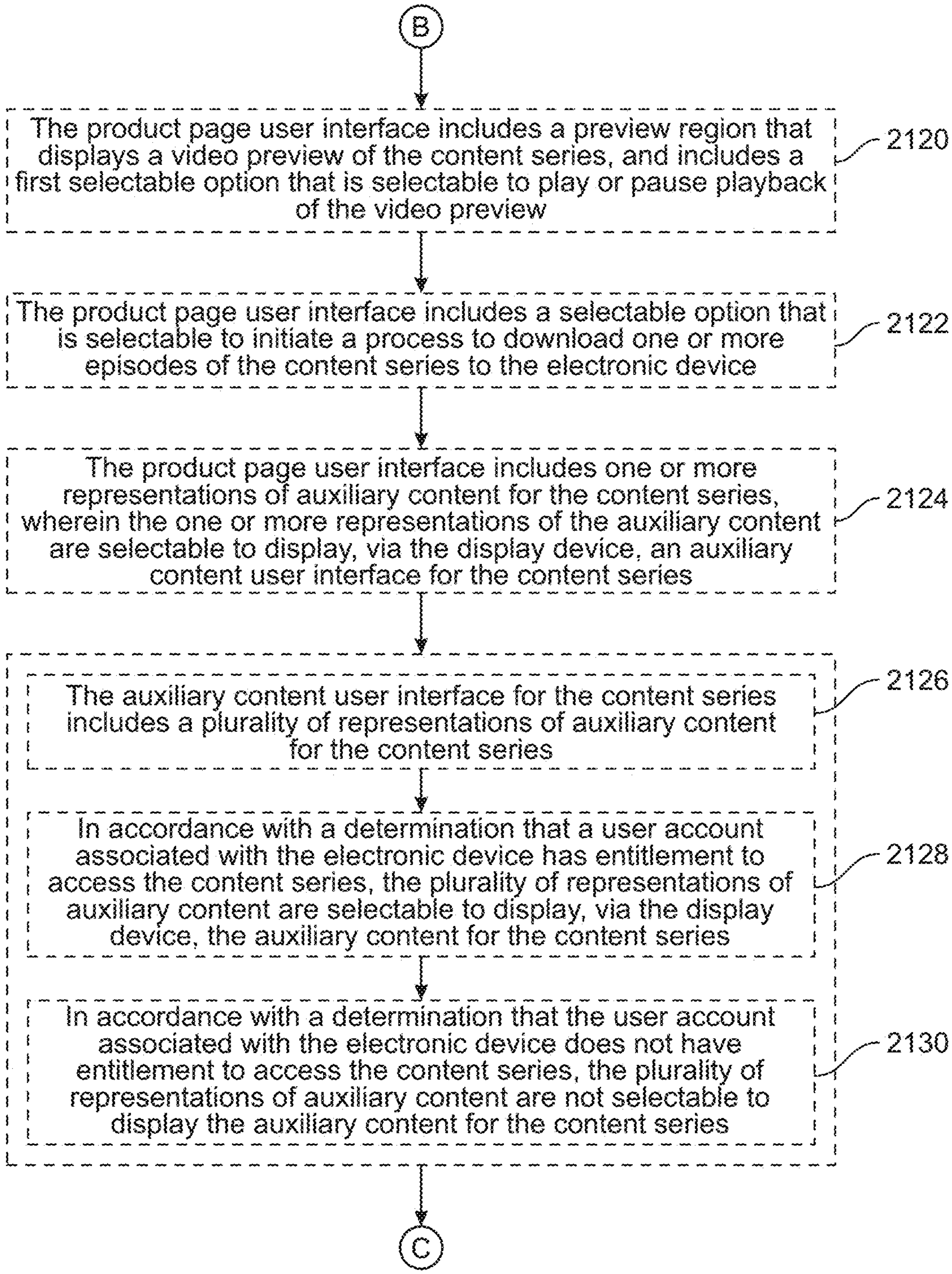
Figure 21C:
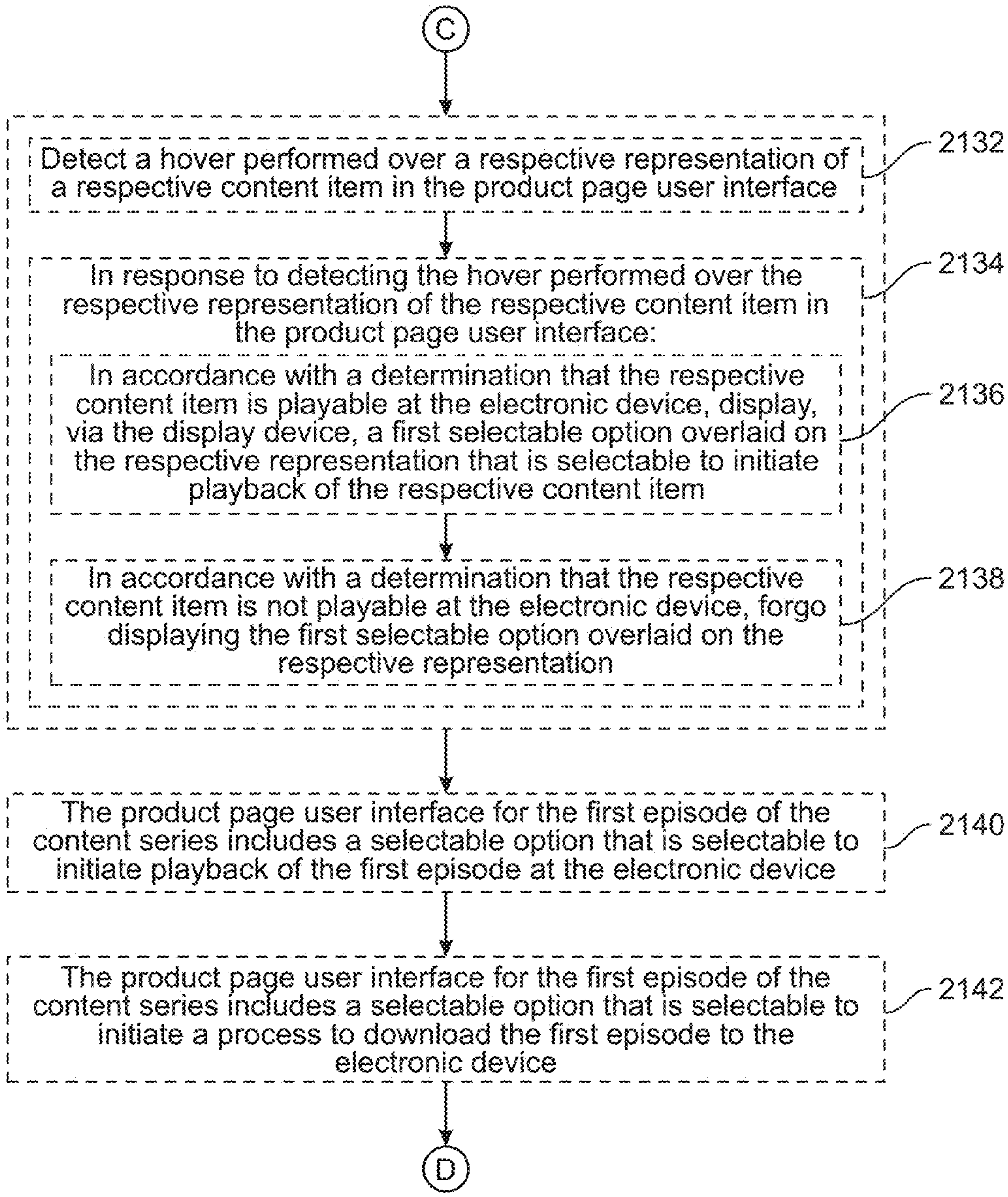
Figure 21D:
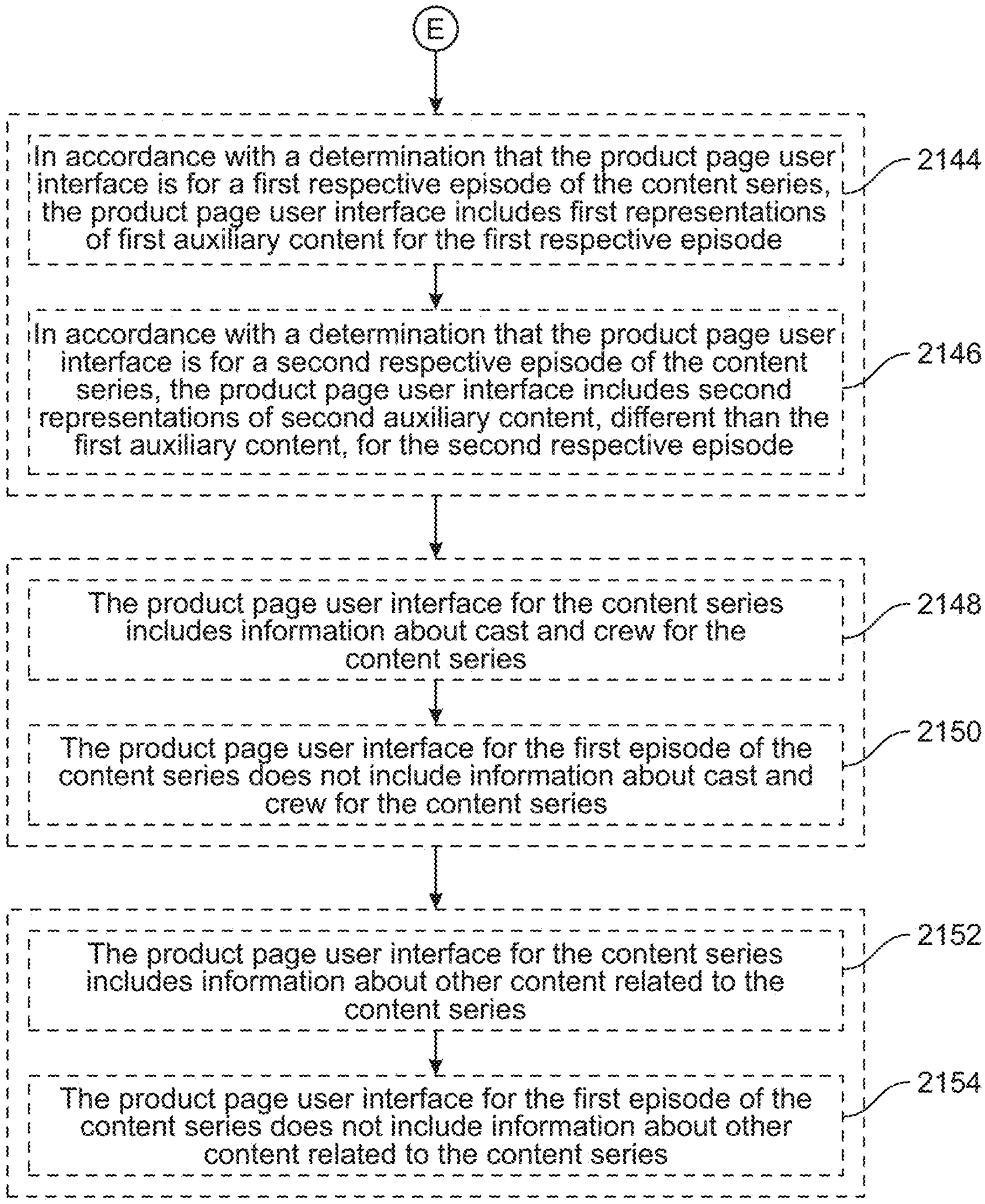

FIGS. 20A-20T illustrate exemplary ways in which an electronic device displays user interfaces specific to respective content items in accordance with some embodiments of the disclosure. The embodiments in these figures are used to illustrate the processes described below, including the processes described with reference to FIGS. 21A-21D.

FIGS. 20A-20T illustrate an electronic device 500 presenting user interfaces specific to respective content items. FIG. 20A illustrates electronic device (such as electronic device 500, not shown) that is in communication with display 514 (e.g., such as a monitor or integrated display) and an input device (e.g., such as touch-sensitive surface 451). It is understood that the disclosure illustrates the use of touch-sensitive surface 451, but the input device can be any suitable pointer device such as a mouse, touchpad, etc.

In some embodiments, device 500 is displaying a unified media browsing application 2000. In some embodiments, unified media browsing application 2000 is an application installed on device 500. In some embodiments, unified media browsing application 2000 is similar to unified media browsing application 1800, described above with respect to FIGS. 18A-18BBB. In some embodiments, unified media browsing application 2000 is presenting user interface 2010-1 similar to user interface 1810-1 described above with respect to FIG. 18K.

In FIG. 20A, pointer 2001 is hovering over representation 2006-5. In some embodiments, user input 2003 corresponding to a selection input is received while pointer 2001 is hovering over representation 2006-4, outside of the play and menu button overlays on representation 2006-4 (e.g., corresponding to a selection of representation 2006-5). In some embodiments, in response to the user input, unified media browsing application 2000 displays user interface 2010-2. In some embodiments, user interface 2010-2 is similar to user interface 1810-3 described above with respect to FIG. 18M.

In FIG. 20B, user interface 2010-2 is displaying an image of Item E in the background 2008. In some embodiments, after a threshold amount of time (e.g., 10 seconds, 30 seconds, 1 minute), background 2008 is changed from displaying a still image to displaying a trailer of Item E, as shown in FIG. 20C. In some embodiments, in response to background 2008 displaying a video (e.g., trailer optionally with audio), user interface 2010-2 displays selectable options 2014-1 and 2014-2. In some embodiments, selectable option 2014-1 is selectable to mute the background video (e.g., the trailer). In some embodiments, selectable option 2014-2 is selectable to pause the background video (e.g., the trailer).

In FIG. 20C, user input 2003 corresponding to a selection input is received when pointer 2001 is hovering over selectable option 2014-1. In some embodiments, in response to the user input, the trailer playing in background 2008 is muted, as shown in FIG. 20D. In FIG. 20D, user input 2003 corresponding to a selection input is received when pointer 2001 is hovering over selectable option 2014-2. In some embodiments, in response to the user input, the trailer playing in background 2008 is paused, as shown in FIG. 20E. In some embodiments, while the trailer is muted, selection of selectable option 2014-1 causes the trailer to be unmuted. In some embodiments, while the trailer is paused, selection of selectable option 2014-2 causes the trailer to resume playing.

In FIG. 20F, a user input 2003 corresponding to an upward navigation (e.g., scrolling downwards) is received. In some embodiments, in response to the user input, user interface 2010-2 is scrolled upwards to reveal further rows of content on user interface 2010-2. In some embodiments, as shown in FIG. 20F, user interface 2010-2 includes listings of multiple seasons of Item E (e.g., season 1, season 2, season 3), multiple representations of episodes from a respective season (e.g., season 1) of Item E (e.g., representations 2016-1 to 2016-3, which are optionally still images or short clips), and descriptions of the respective episodes (e.g., descriptions 2017-1 to 2017-3).

In FIG. 20G, the user navigates pointer 2001 to hover over representation 2016-3 corresponding to S1 E3 of Item E. In some embodiments, the user does not have entitlement to view season 1 episode 3 of Item E. In such embodiments, in response to hovering pointer 2001 over representation 2016-3, menu icon 2020 is displayed overlaid on representation 2016-3, but play icon is not displayed overlaid on representation 2016-3. Thus, in some embodiments, user selection of representation 2016-3 does not cause playback of season 1, episode 3 of Item E (nor is the user able to select a play icon because it is not shown) and optionally initiates a process for the user to acquire entitlement to season 1 episode 3 of Item E.

In FIG. 20H, the user moves pointer 2001 to hover over representation 2016-1. In some embodiments, the user has entitlement to view season 1 episode 1 of Item E. In such embodiments, in response to hovering pointer 2001 over representation 2016-1, menu icon 2020 and play icon 2018 are displayed overlaid on representation 2016-3. Thus, in some embodiments, play icon 2018 is selectable to cause playback of season 1, episode 1 of Item E.

FIGS. 20I-20J illustrate the user navigating to and selecting play icon 2018 corresponding to representation 2016-1 (e.g., for season 1 episode 1). In some embodiments, in response to the user's selection of play icon 2018, unified media browsing application 2000 begins playback of the respective content item and displays user interface 2010-3 corresponding to a content playback user interface, as shown in FIG. 20K.

In FIG. 20K, user input 2003 corresponding to a selection input is received while pointer 2001 is hovering over selectable option 2022. In some embodiments, in response to the user input, unified media browsing application 2000 exits content playback mode and dismisses user interface 2010-3 and displays user interface 2010-2 (e.g., the user interface that was displayed before device 500 began content playback), as shown in FIG. 20L.

In FIG. 20L, user input 2003 corresponding to a selection input is received while pointer 2001 is hovering over description 2017-1 for season 1 episode 1 of Item E. In some embodiments, in response to the user input, unified media browsing application 2000 displays user interface 2010-4, as shown in FIG. 20M. In some embodiments, user interface 2010-4 is a user interface specific to the selected episode (e.g., an episode page, as opposed to a product page for a content series). In some embodiments, user interface 2010-4 displays information specific to the selected episode and is different from user interface 2010-2 that displays information specific for the content item as a whole (e.g., the series as opposed to the episode).

In FIG. 20M, user interface 2010-4 includes representation 2024 (e.g., a still image, a video, a short clip, etc.) of episode 1 of season 1. In some embodiments, user interface 2010-4 includes description 2026 of the episode (e.g., title and short synopsis). In some embodiments, user interface 2010-4 includes selectable option 2028-1 and 2028-2. In some embodiments, selectable option 2028-1 is selectable to cause playback of episode 1. In some embodiments, selectable option 2028-2 is selectable to download episode 1 onto device 500. In some embodiments, user interface 2010-4 includes a row of bonus content 2030-1 to 2030-4 (e.g., images, videos, or short clip representing the respective bonus content) that is specific to the respective episode (e.g., as opposed to the series). In some embodiments, bonus content 2030-1 to 2030-4 are selectable to cause display of the respective bonus content. In some embodiments, if the user is not entitled to view episode 1 of item E, then one or more of the bonus content is not selectable to cause display of the respective bonus content (e.g., optionally some of the bonus content is still selectable to cause display of the respective bonus content). In some embodiments, user interface 2010-4 includes row 2034 that displays different methods of accessing episode 1 (e.g., via different providers, purchasing or renting, etc.). In some embodiments, selecting a respective representation in row 2034 initiates a process of watching or acquiring access to watch episode 1 via the respective method.

In FIG. 20N, user input 2003 is received scrolling user interface 2010-4 downwards to reveal further rows of content. In FIG. 20N, user interface 2010-4 includes representations 2034-1 to 2034-4 corresponding to different methods of accessing episode 1 (e.g., via Provider A, Provider B, using App Q, via purchasing the item from a content store, etc.). As discussed above, representations 2034-1 to 2034-4 are selectable to access episode 1 or initiate a process for accessing episode 1 via the selected method. In some embodiments, user interface 2010-4 includes information 2036-1 that displays information about episode 1 (e.g., genre, short synopsis, etc.). In some embodiments, information 2036-1 is selectable to display a pop-up card with the full description. In some embodiments, user interface 2010-4 includes information 2036-2 that displays the maturity rating of episode 1. In some embodiments, information 2036-2 is selectable to display more information about the rating for episode 1 and/or about the respective maturity rating system. It is understood that the rows of content described above can be in any order and more or fewer rows of content can be displayed on user interface 2010-4.

In FIG. 20O, user input 2003 corresponding to a selection input is received while pointer 2001 is hovering over the back button of unified media browsing application 2000. In some embodiments, in response to the user input, unified media browsing application 2000 navigates backwards and displays unified media browsing application 2010-2 (e.g., the previously displayed user interface), as shown in FIG. 20P. In FIG. 20Q, user input 2003 is received scrolling user interface 2010-2 downwards. In some embodiments, in response to the user input, user interface 2010-2 scrolls downwards to reveal further rows of content, as shown in FIG. 20Q.

In FIG. 20Q, user interface 2010-2 includes a row of trailers (e.g., representations 2038-1 and 2038-2). In some embodiments, representations 2038-1 and 2038-1 are selectable to display the trailer. In some embodiments, user interface 2010-2 includes a row of extras content (e.g., representations 2040-1 to 2040-4) that are selectable to view the respective extras content. In some embodiments, similarly to described above, one or more of the bonus content items are not selectable to view the respective content item if the user does not have entitlement to view Item E. In some embodiments, user interface 2010-2 includes a row of related content (e.g., representations 2042-1 to 2042-4) that are selectable to display the respective related content.

FIGS. 20R-20S illustrate the user navigating to and selecting representation 2040-1 corresponding to Extras Content 1. In some embodiments, in response to the user input, unified media browsing application displays user interface 2010-5, as shown in FIG. 20T. In some embodiments, user interface 2010-5 is a user interface for bonus content and displays one or more representations of bonus content (e.g., representations 2046-1 to 2046-4) and a bonus content player 2044. In some embodiments, the respective bonus content is played and/or displayed in bonus content player 2044 (e.g., by clicking the bonus content player 2044 to begin or pause playback). In some embodiments, representations 2046-1 to 2046-4 are selectable to cause bonus content player 2044 to begin playing the respective bonus content.

FIGS. 21A-21D are flow diagrams illustrating a method 2100 of presenting a plurality of representations of content items in a unified media browsing application in accordance with some embodiments of the disclosure. The method 2100 is optionally performed at an electronic device such as device 100, device 300, device 500, and device 511 as described above with reference to FIGS. 1A-1B, 2-3, 4A-4B and 5A-5C. Some operations in method 2100 are, optionally combined and/or order of some operations is, optionally, changed.

As described below, the method 2100 provides ways to display user interfaces specific to respective content items. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 20F, an electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), displays (2102), via the display device, a product page user interface for a content series comprising a plurality of episodes (e.g., a user interface associated and/or dedicated to the content series. In some embodiments, the product page includes a plurality of content items associated with the content series (e.g., episodes, trailers, bonus content, etc.). In some embodiments, the product page includes information for the content series.), wherein the product page user interface includes a first representation of a first episode of the plurality of episodes and a second representation of a second episode of the plurality of episodes, such as in FIG. 20F (e.g., the product page includes a plurality of icons corresponding to a plurality of episodes of the content series). In some embodiments, the icons are selectable to cause playback of the respective episode. In some embodiments, the icons are selectable to cause display of a user interface associated with the respective episode (e.g., an episode page dedicated to the respective episode). In some embodiments, one or more of the plurality of episodes of the content series are accompanied by text descriptions of the respective episode (e.g., season and episode information, episode title, episode description, etc.).

In some embodiments, while displaying the product page user interface for the content series, the electronic device 500 receives (2104), via the one or more input devices, an input directed to the first representation of the first episode, such as in FIG. 20J (e.g., a user input selecting the icon corresponding to the first episode of the content series).

In some embodiments, in response to receiving the input directed to the first representation of the first episode (2106), in accordance with a determination that the input was directed to a first portion of the first representation, the electronic device 500 displays (2108), via the display device, the first episode of the content series, such as in FIG. 20K (e.g., if the user input is a selection of the icon corresponding to the first episode, then cause playback of the first episode). In some embodiments, when the cursor hovers over the representation of the first episode (e.g., the icon and/or text description), a selectable option is displayed on or near the representation of the first episode that is selectable to cause playback of the first episode.

In some embodiments, in response to receiving the input directed to the first representation of the first episode (2106), in accordance with a determination that the input was directed to a second portion of the first representation, the electronic device 500 displays (2110), such as in FIG. 20L, via the display device, a product page user interface for the first episode of the content series without displaying the first episode of the content series, such as in FIG. 20M (e.g., if the user input is a selection of the text description of the first episode, then instead of causing playback of the first episode, display a user interface specific for the first episode (e.g., an episode page or a product page for the first episode), different from the user interface specific for the content series. For example, the episode page is a page that displays information and/or content that is specific to the respective episode and is different from the product page that displays information and/or content that is specific to the content series (e.g., television show).).

The above-described manner of interacting with a representation of an episode (e.g., by causing playback when the user selects a respective section of the representation of the episode and by displaying an episode page when he user selects another section of the representation of the episode) allows the electronic device to provide the user with the ability to view more information or cause playback of the episode from the same representation of the episode, which simplifies the interaction between the user and the electronic device and enhances the operability of the electronic device and makes the user-device interface more efficient (e.g., without requiring that the user navigate to a separate user interface or perform additional inputs to either cause playback or display an episodes page for the respective episode), which additionally reduces power usage and improves battery life of the electronic device by enabling the user to use the electronic device more quickly and efficiency.

In some embodiments, while displaying the product page user interface for the content series, the electronic device 500 receives (2112), via the one or more input devices, an input directed to the second representation of the second episode, such as in FIG. 20J (e.g., a user input selecting the icon corresponding to the second episode of the content series).

In some embodiments, in response to receiving the input directed to the second representation of the second episode (2114), such as in FIG. 20J, in accordance with a determination that the input was directed to a first portion of the second representation, the electronic device 500 displays (2116), via the display device, the second episode of the content series, such as in FIG. 20K (e.g., if the user input is a selection of the icon corresponding to the second episode, then cause playback of the second episode). In some embodiments, when the cursor hovers over the representation of the second episode (e.g., the icon and/or text description), a selectable option is displayed on or near the representation of the second episode that is selectable to cause playback of the first episode.

In some embodiments, in response to receiving the input directed to the second representation of the second episode (2114), such as in FIG. 20L, in accordance with a determination that the input was directed to a second portion of the second representation, the electronic device 500 displays (2118), via the display device, a product page user interface for the second episode of the content series without displaying the second episode of the content series, such as in FIG. 20M. For example, if the user input is a selection of the text description of the first episode, then instead of causing playback of the first episode, display a user interface specific for the first episode (e.g., an episode page or a product page for the first episode), different from the user interface specific for the content series.

The above-described manner of responding in the same manner for different episodes allows the electronic device to provide consistent navigational response to user input, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface includes a preview region that displays a video preview of the content series (e.g., at the top of the product page user interface), and includes a first selectable option that is selectable to play or pause playback of the video preview (2120), such as in FIG. 20C (and a second selectable option that is selectable to mute or unmute the video preview). In some embodiments, the first and second selectable options are displayed overlaid on the preview at the top of the product page user interface. In some embodiments, the preview automatically starts to play when the product page user interface is displayed. In some embodiments, the first and second selectable options are only displayed while the preview is playing, and are not displayed before the preview starts playing and/or after the preview has ended playback (at which point the preview is optionally replaced by a still image corresponding to the content). In some embodiments, the preview begins to play after a threshold amount of time (e.g., 5 seconds, 10 seconds, 15 seconds), at which point the selectable options are then displayed. In some embodiments, before the preview begins, the preview region displays a still image preview of the content series or the first frame of the video preview. In some embodiments, before the preview begins, the selectable options are not displayed.

The above-described manner of displaying selectable options for pausing playback of the preview allows the electronic device to provide convenient control/method for pausing the playback, and saving on playback resources when playback is not needed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface includes a selectable option that is selectable to initiate a process to download one or more episodes of the content series to the electronic device (2122), such as in FIG. 20B. In some embodiments, the download button is greyed out/unresponsive to a selection input if all of the episodes of the content series are already downloaded to the electronic device, and/or if the user account associated with the electronic device does not have entitlement to access/download the episodes of the content series. In some embodiments, selection of the download button causes display of a second user interface from which the user is able to select which seasons and/or which episodes of the content series to download. In some embodiments, selection of the download button causes downloading of all episodes of all seasons to the electronic device. In some embodiments, selection of the download button causes display of a user interface to select respective episodes of the content item to download.

The above-described manner of displaying a selectable option for downloading episodes allows the electronic device to provide a convenient manner of downloading the episodes (e.g., avoiding the need for the user to provide separate input to navigate to the correct user interfaces for each episode to then provide additional input to download the episodes), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface includes one or more representations of auxiliary content for the content series (e.g., extra or bonus content for the content series that is not standalone content that can be otherwise accessed directly (e.g., in the unified media browsing application or a content store) other than via the content series), wherein the one or more representations of the auxiliary content are selectable to display, via the display device, an auxiliary content user interface for the content series (2124), such as in FIG. 20Q. For example, the auxiliary content representations include images of various auxiliary content available for the content series, and text descriptions of those piece of auxiliary content. Selection of any of the representations optionally causes display of another user interface-a user interface dedicated to the auxiliary content for the content series—that includes selectable representations/options that are selectable to play the auxiliary content via the display device.

The above-described manner of displaying an auxiliary content user interface from which the auxiliary content is accessible allows the electronic device to provide a centralized user interface from which the auxiliary content is available, avoiding the need for the user to navigate to different user interfaces to display the auxiliary content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the auxiliary content user interface for the content series includes a plurality of representations of auxiliary content for the content series (2126) (e.g., interviews with cast, director commentary, bonus/deleted scenes, etc.).

In some embodiments, in accordance with a determination that a user account associated with the electronic device has entitlement to access the content series (e.g., the user account has a subscription with a content provider that provides the content series to the electronic device, or the user account has purchased the content series), the plurality of representations of auxiliary content are selectable to display, via the display device, the auxiliary content for the content series (2128), such as in FIG. 20T (e.g., selection of a first representation causes display of first auxiliary content, and selection of a second representation causes display of second auxiliary content).

In some embodiments, in accordance with a determination that the user account associated with the electronic device does not have entitlement to access the content series (e.g., the user account has not purchased the content series, or does not have a subscription to the content provider that provides the content series to the electronic device), the plurality of representations of auxiliary content are not selectable to display the auxiliary content for the content series (2130), such as in FIG. 20G. For example, selection of the representations does not cause any action to occur. In some embodiments, the representations are displayed with a visual indication that the user account does not have access to the auxiliary content (and are displayed differently, such as without the visual indication, if the user account does have access to the auxiliary content). In some embodiments, a user input corresponding to a hover over the representation of the auxiliary content causes display of a selectable icon (e.g., play icon and/or play button) that is selectable to cause display of the respective auxiliary content. In some embodiments, if the user does not have entitlement to view the content item (e.g., and thus does not have the entitlements to view the auxiliary content), then the selectable icon that is selectable to cause display of the respective auxiliary content is not displayed in response to the user input corresponding to a hover.

The above-described manner of entitlement-based behavior allows the electronic device to automatically operate in accordance user entitlement, avoiding user errors with respect to entitlement, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the electronic device 500 detects (2132) a hover performed over a respective representation of a respective content item in the product page user interface, such as in FIG. 20G (e.g., receiving a user input from an input device (e.g., a mouse, a trackpad, etc.) moving a cursor over the respective representation, or receiving a user input on a touch screen device hovering over the respective representation).

In some embodiments, in response to detecting the hover performed over the respective representation of the respective content item in the product page user interface (2134), in accordance with a determination that the respective content item is playable at the electronic device (e.g., the respective content item is currently available for viewing (e.g., has been released), the user account associated with the electronic device has entitlement to view the respective content item), the electronic device 500 displays (2136), via the display device, a first selectable option overlaid on the respective representation that is selectable to initiate playback of the respective content item, such as in FIG. 20J (e.g., overlaying a play button over the respective representation).

In some embodiments, in response to detecting the hover performed over the respective representation of the respective content item in the product page user interface (2134), in accordance with a determination that the respective content item is not playable at the electronic device (e.g., the respective content item is not currently available for viewing (e.g., has not been released), the user account associated with the electronic device does not have entitlement to view the respective content item), the electronic device 500 forgoes (2138) displaying the first selectable option overlaid on the respective representation, such as in FIG. 20G.

The above-described manner of entitlement-based behavior allows the electronic device to automatically operate in accordance user entitlement, avoiding user errors with respect to entitlement, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface for the first episode of the content series includes a selectable option that is selectable to initiate playback of the first episode at the electronic device (2140), such as in FIG. 20B. For example, a "Play Episode 3" button that is selectable to play episode 3 of the content series via the display device. In some embodiments, if the content series/episode can be played within the unified media browsing application, playback of the episode occurs within the unified media browsing application. If the content series/episode cannot be played within the unified media browsing application, and must instead be played in a separate application (e.g., a content provider-specific application that provides content from a particular content provider), that separate application is displayed and the episode is played within that separate application.

The above-described manner of providing for a selectable option for viewing the episode allows the electronic device to provide a convenient manner to access the episode without the need for the user to provide other input to navigate to another user interface to access the episode, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface for the first episode of the content series includes a selectable option that is selectable to initiate a process to download the first episode to the electronic device (2142), such as in FIG. 20B. For example, a "Download Episode 3" button that is selectable to download episode 3 of the content series to the electronic device. In some embodiments, if episode 3 of the content series is already downloaded to the electronic device, the download button is optionally not displayed or is greyed out/not respective to selection and/or displays a visual indication that episode 3 is already downloaded.

The above-described manner of providing for a selectable option for downloading the episode allows the electronic device to provide a convenient manner to download the episode without the need for the user to provide other input to navigate to another user interface to download the episode or to save on storage/downloading resources if the user only wants to download this particular episode to the electronic device (as opposed to all/multiple episode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, in accordance with a determination that the product page user interface is for a first respective episode of the content series, the product page user interface includes first representations of first auxiliary content for the first respective episode (2144), such as in FIG. 20M (e.g., selectable to display the selected first auxiliary content).

In some embodiments, in accordance with a determination that the product page user interface is for a second respective episode of the content series, the product page user interface includes second representations of second auxiliary content, different than the first auxiliary content, for the second respective episode (2146), such as in FIG. 20M (e.g., selectable to display the selected second auxiliary content). Thus, in some embodiments, each episode of a content series has its own auxiliary/bonus content that is playable from that episode's product page user interface.

The above-described manner of providing episode-specific auxiliary content allows the electronic device to provide a convenient manner to access the auxiliary content for a particular episode without the need for the user to provide other input to navigate to another user interface to try to find the episode-specific auxiliary content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface for the content series includes information about cast and crew for the content series (2148), such as in FIG. 20Q (e.g., images/names of actors, directors, etc. for the content series as a whole).

In some embodiments, the product page user interface for the first episode of the content series does not include information about cast and crew for the content series (2150), such as in FIGS. 20M-20N. For example, the episode product page user interface optionally does not include any information about/images of cast or crew. In some embodiments, the episode product page includes information about/images of cast and crew just for that episode, and not necessarily for the content series as a whole.

The above-described manner of not including cast and crew information on the episode user interface allows the electronic device to save on computing/display resources when inclusion of such information may not be useful, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the product page user interface for the content series includes information about other content related to the content series (2152), such as in FIG. 20Q (e.g., representations of other content items, such as movies, television shows, etc., that are related to the content series (e.g., because they are the same genre, or because a like for the current content series is likely to result in a like for the other content) and that are selectable to display the selected other content items or display product page user interfaces for those other content items).

In some embodiments, the product page user interface for the first episode of the content series does not include information about other content related to the content series (2154), such as in FIGS. 20M-20N. For example, the episode product page user interface optionally does not include any information/representations of other content items that might be related to the episode or the content series as a whole. In some embodiments, the episode product page includes selectable representations for other content that is related to that episode in particular, but not necessarily the content series as a whole.

The above-described manner of not including related content information on the episode user interface allows the electronic device to save on computing/display resources when inclusion of such information may not be useful, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 21A-21D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1700, 1900, and 2300) are also applicable in an analogous manner to method 2100 described above with respect to FIGS. 21A-21D. For example, the operation of the electronic device displaying user interfaces specific to a respective content item described above with reference to method 2100 optionally has one or more of the characteristics of presenting content in the unified media browsing application, presenting information on representations of content items, displaying of content in a unified media browsing application, linking of an account for a primary content provider, restricting of access to content based on the geographic location of the device, and presentation of playback menus during playback of content in a unified media browsing application, displaying content items, etc., described herein with reference to other methods described herein (e.g., methods 700, 900, 1100, 1300, 1500, 1700, 1900, and 2300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 21A-21D are, optionally, implemented by components depicted in FIGS. 1A-1B. For example, displaying operations 2102, 2108, 2110, 2116, 2118, and 2136, receiving operations 2104, and 2112, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Content Player for a Unified Media Browsing Application

Users interact with electronic devices in many different manners, including using an electronic device to browse and access content in a media browsing application. The embodiments described below provide ways in which an electronic device displays a content item in a content player for a unified media browsing application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 22A:
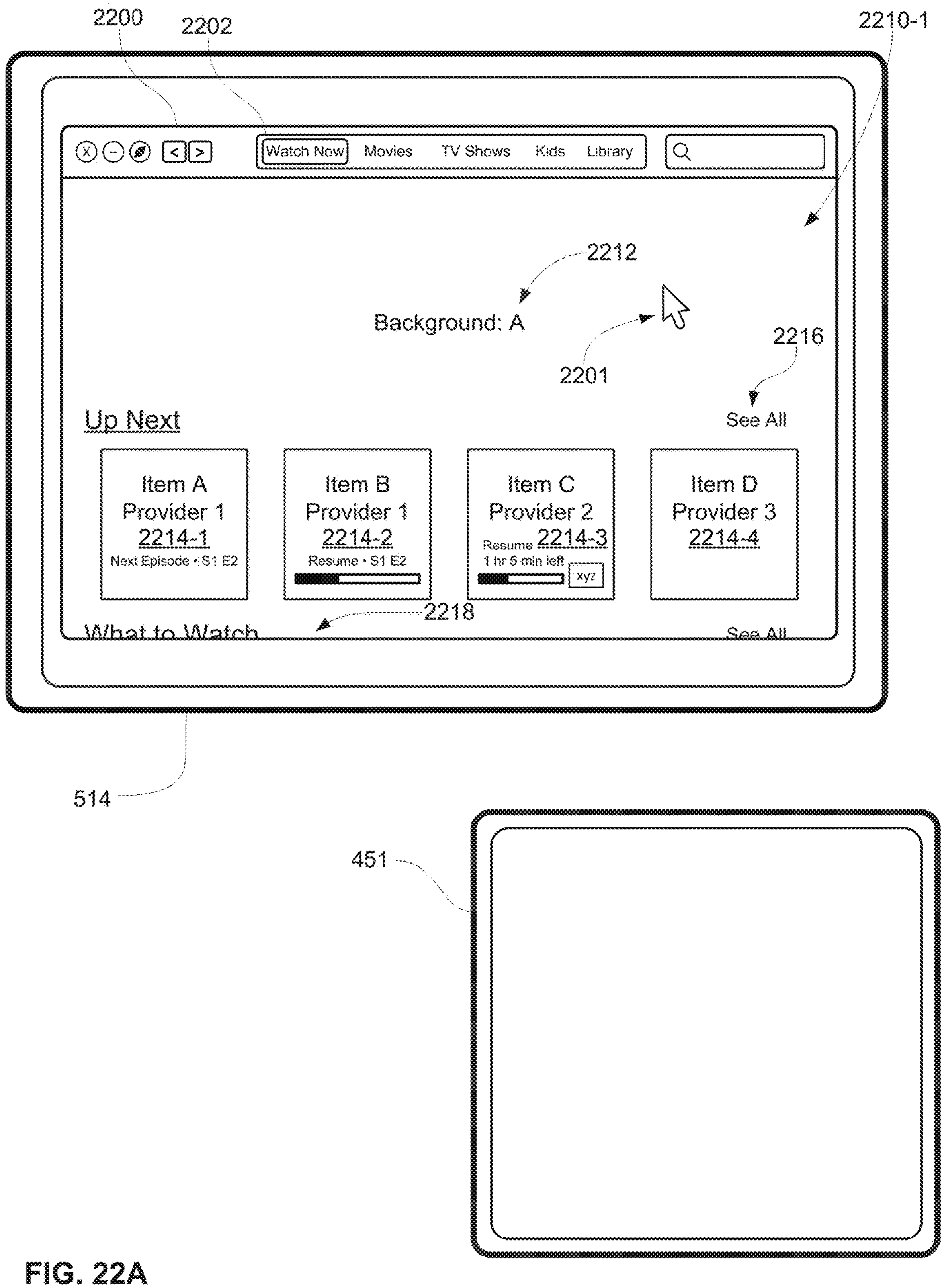
FIGS. 22A-22AA illustrate exemplary ways in which an electronic device displays content items in accordance with some embodiments of the disclosure.

FIGS. 22A-22AA illustrate exemplary ways in which an electronic device displays content items in accordance with some embodiments of the disclosure. The embodiments in these figures are used to illustrate the processes described below, including the processes described with reference to FIGS. 23A-23D.

FIGS. 22A-22AA illustrate an electronic device 500 displaying content items. FIG. 22A illustrates electronic device (such as electronic device 500, not shown) that is in communication with display 514 (e.g., such as a monitor or integrated display) and an input device (e.g., such as touch-sensitive surface 451). It is understood that the disclosure illustrates the use of touch-sensitive surface 451, but the input device can be any suitable pointer device such as a mouse, touchpad, etc.

In some embodiments, device 500 is displaying a unified media browsing application 2200. In some embodiments, unified media browsing application 2200 is an application installed on device 500. In some embodiments, unified media browsing application 2200 is similar to unified media browsing application 1800, described above with respect to FIGS. 18A-18BBB. In some embodiments, unified media browsing application 2200 is presenting user interface 2210-1 similar to user interface 1810-1 described above with respect to FIG. 18A.

Figure 22B:
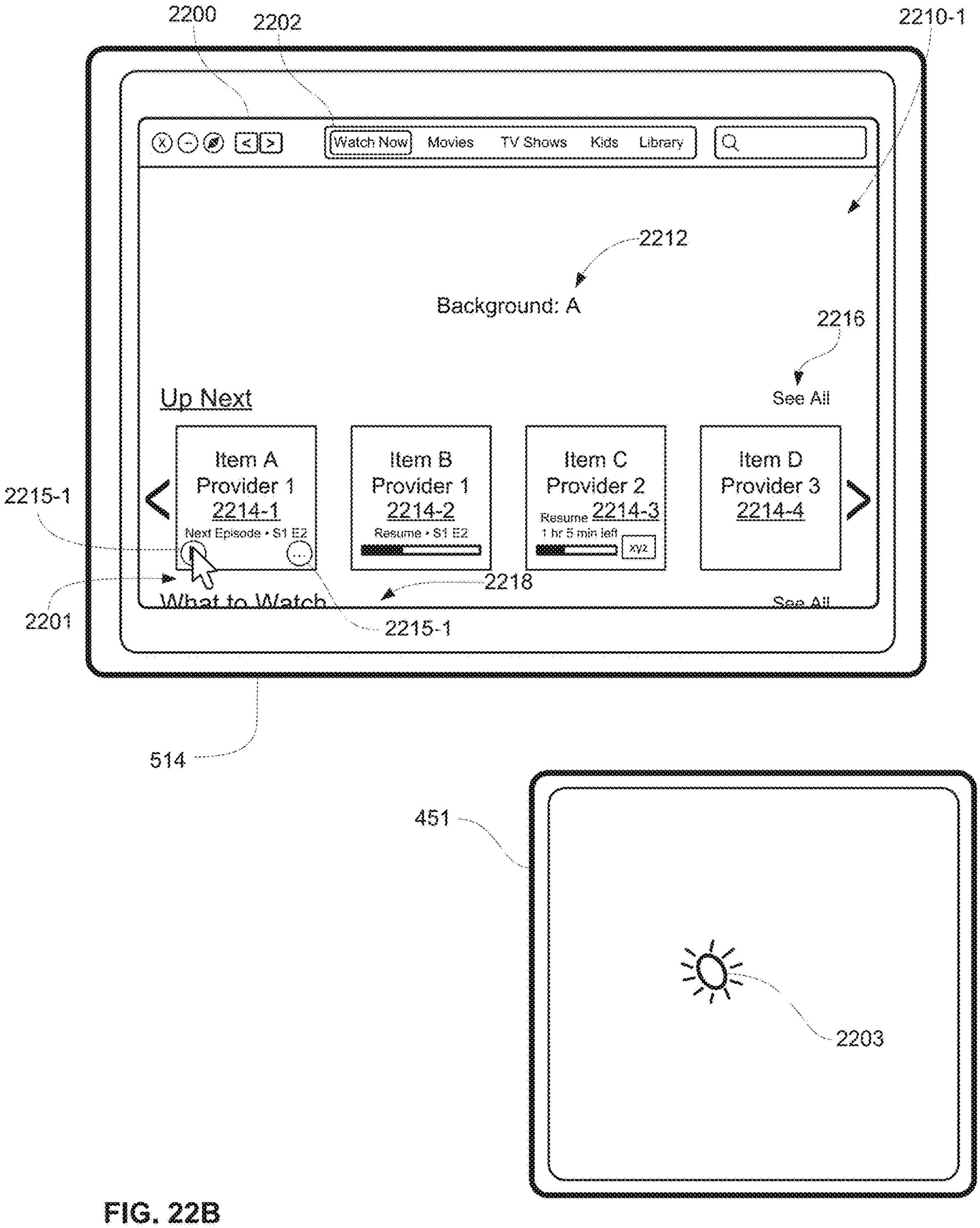

In FIG. 22B, user input 2203 is received selecting play icon 2215-1 corresponding to representation 2214-1. In some embodiments, in response, unified media browsing application 2200 displays user interface 2210-2. In some embodiments, user interface 2210-2 is a content player user interface for playing back the selected content item (e.g., episode 2 of season 1 of item A). In some embodiments, unified media browsing application 2200 includes selectable option 2204 that is selectable to exit content playback mode and dismiss user interface 2210-2 (e.g., and return to user interface 2210-1).

Figure 22C:
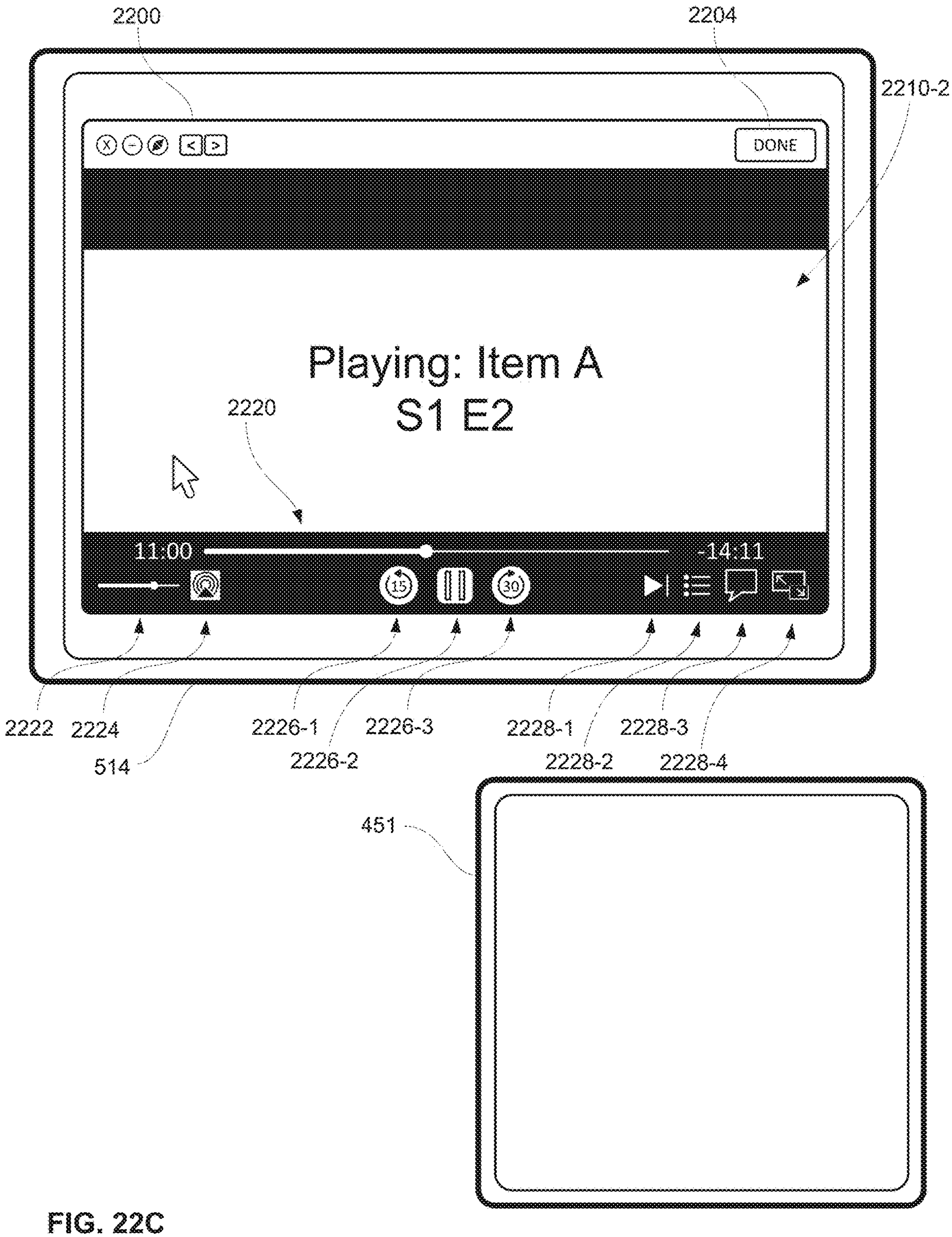

In FIG. 22C, user interface 2210-2 contains black bars above and below playback of the content item (e.g., to ensure that the aspect ratio of the playback is the recommended aspect ratio). In some embodiments, user interface 2210-2 does not contain the black bars, as illustrated below with respect to FIG. 22R. In some embodiments, user interface 2210-2 includes one or more elements in the black bar region for interacting with the content playback. For example, scrubber bar 2220 is interactable to scrub through the content item. In some embodiments, volume control 2222 is interactable to control the volume of the playback. In some embodiments, volume control 2222 controls the system volume of device 500. In some embodiments, volume control 222 controls the volume of the playback in the unified media browsing application 2200 and not the system volume of device 500. In some embodiments, selectable option 2224 is selectable to change the video and/or audio output destination (e.g., route the video and/or audio to another device). In some embodiments, selectable option 2226-1 is selectable to cause the playback to rewind by a threshold amount of time (e.g., 15 seconds, 30 seconds, etc.). In some embodiments, selectable option 2226-2 is selectable pause and/or resume playback of the content item. In some embodiments, selectable option 2226-3 is selectable to fast-forward the playback by a threshold amount of time (e.g., 15 seconds, 30 seconds, etc.). In some embodiments, selectable option 2228-1 is selectable to begin playback of the next episode in the series (and is optionally only displayed if the currently playing content item is an episode in a content series that has a next episode available). In some embodiments, selectable option 2228-2 is selectable to cause display of a list of episodes in the series (optionally, only if the content that is currently playing is an episode of a content series). In some embodiments, selectable option 2228-3 is selectable to adjust the language and subtitles playback options. In some embodiments, selectable option 2228-4 is selectable to enter into a picture-in-picture mode. In some embodiments, any of the selectable options are displayed only in response to detecting the user moving the pointer or otherwise interacting with device 500. In some embodiments, any of the selectable options are hidden when device 500 does not receive any user inputs for a threshold amount of time (e.g., 10 seconds, 20 seconds, 30 seconds).

Figure 22D:
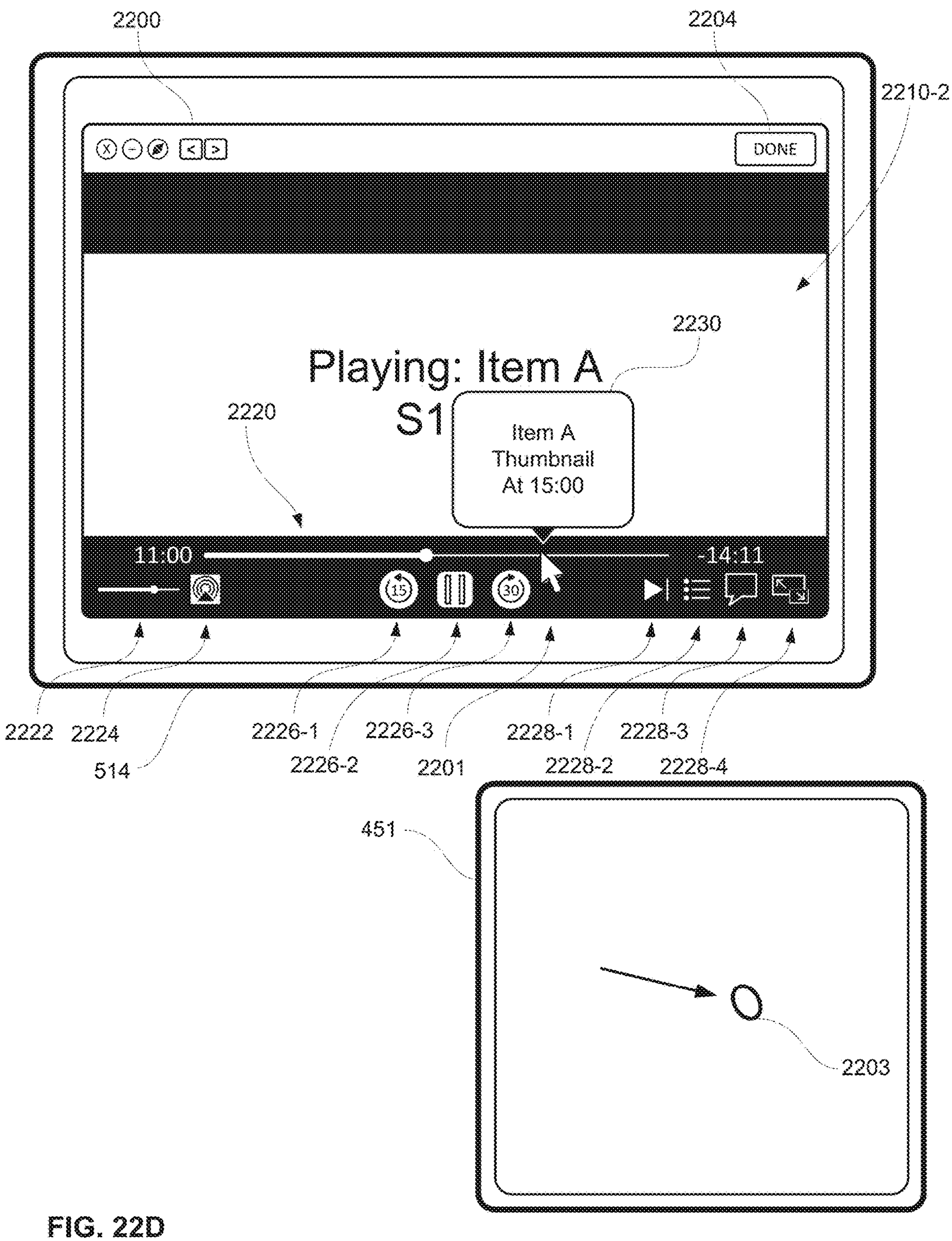
Figure 22E:
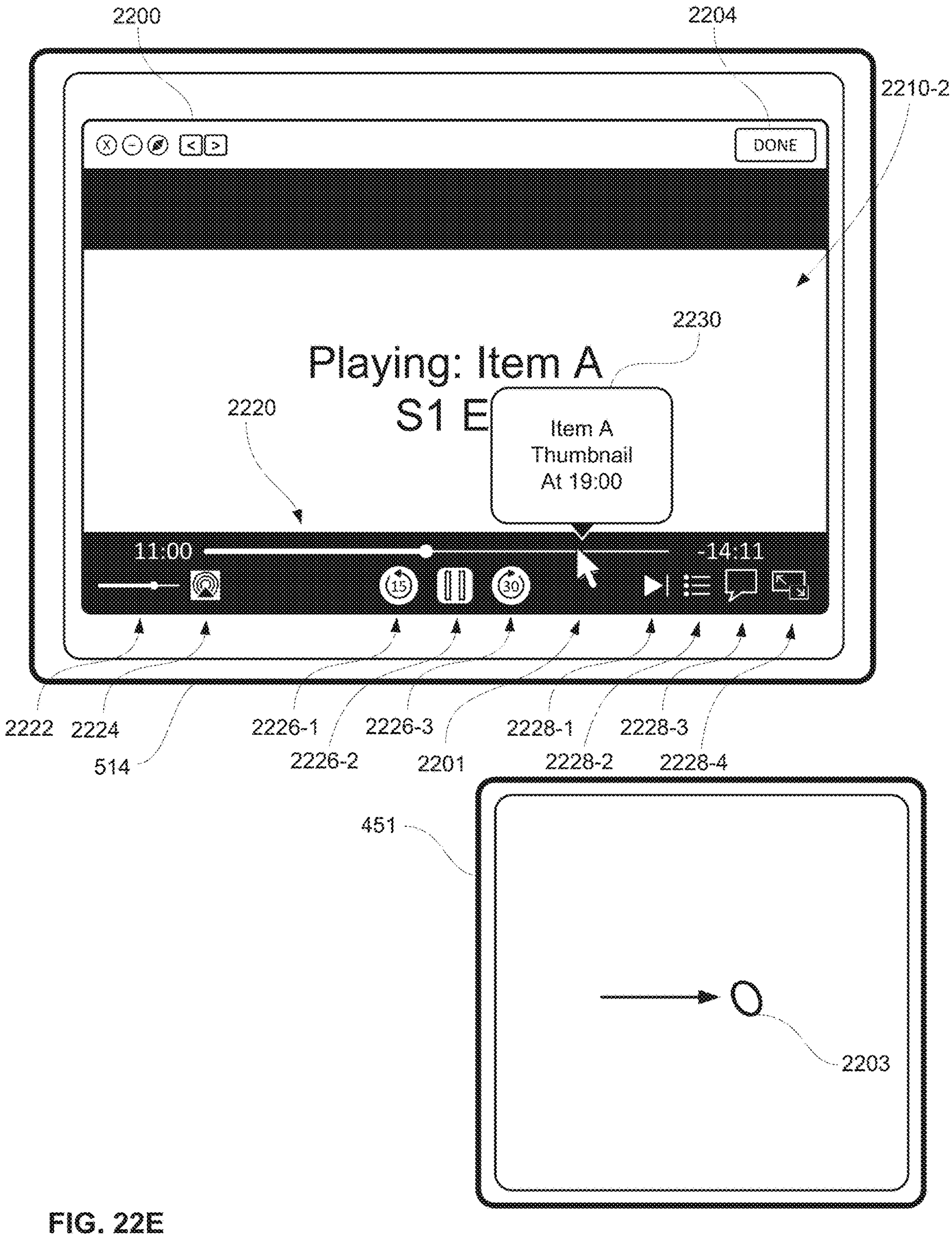

In FIG. 22D, the user navigates pointer 2201 to hover over scrubber bar 2220. In some embodiments, in response to the user navigation, user interface 2210-2 displays thumbnail 2230 overlaid over the content being played back. In some embodiments, thumbnail 2230 displays a screenshot (e.g., a preview) of the content at the location in the content associated with the location on the scrubber bar 2220 that pointer 2201 is hovering over. For example, in FIG. 22D, thumbnail 2230 is displaying a screenshot of the content item at 15:00 (e.g., corresponding to the location of pointer 2201 on scrubber bar 2220) and in FIG. 22E, thumbnail 2230 is displaying a screenshot of the content item at 19:00 (e.g., corresponding to the new location of pointer 2201 on scrubber bar 2220). In some embodiments, while thumbnail 2230 is displayed, user interface 2210-2 continues playback of the respective content item (e.g., content playback is not paused unless the user paused the playback by selecting selectable option 2226-2 or clicking on the item playback itself).

Figure 22F:
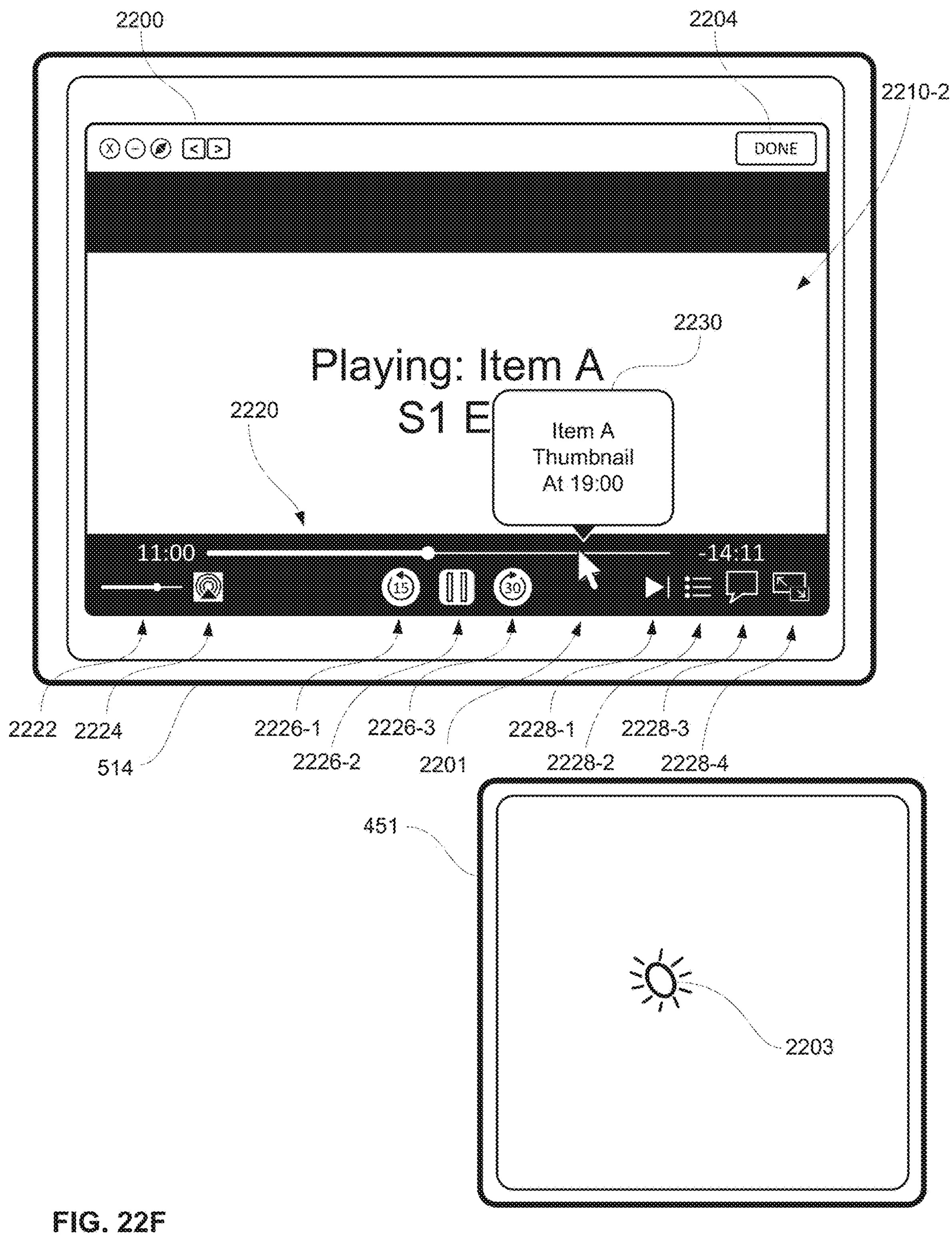
Figure 22G:
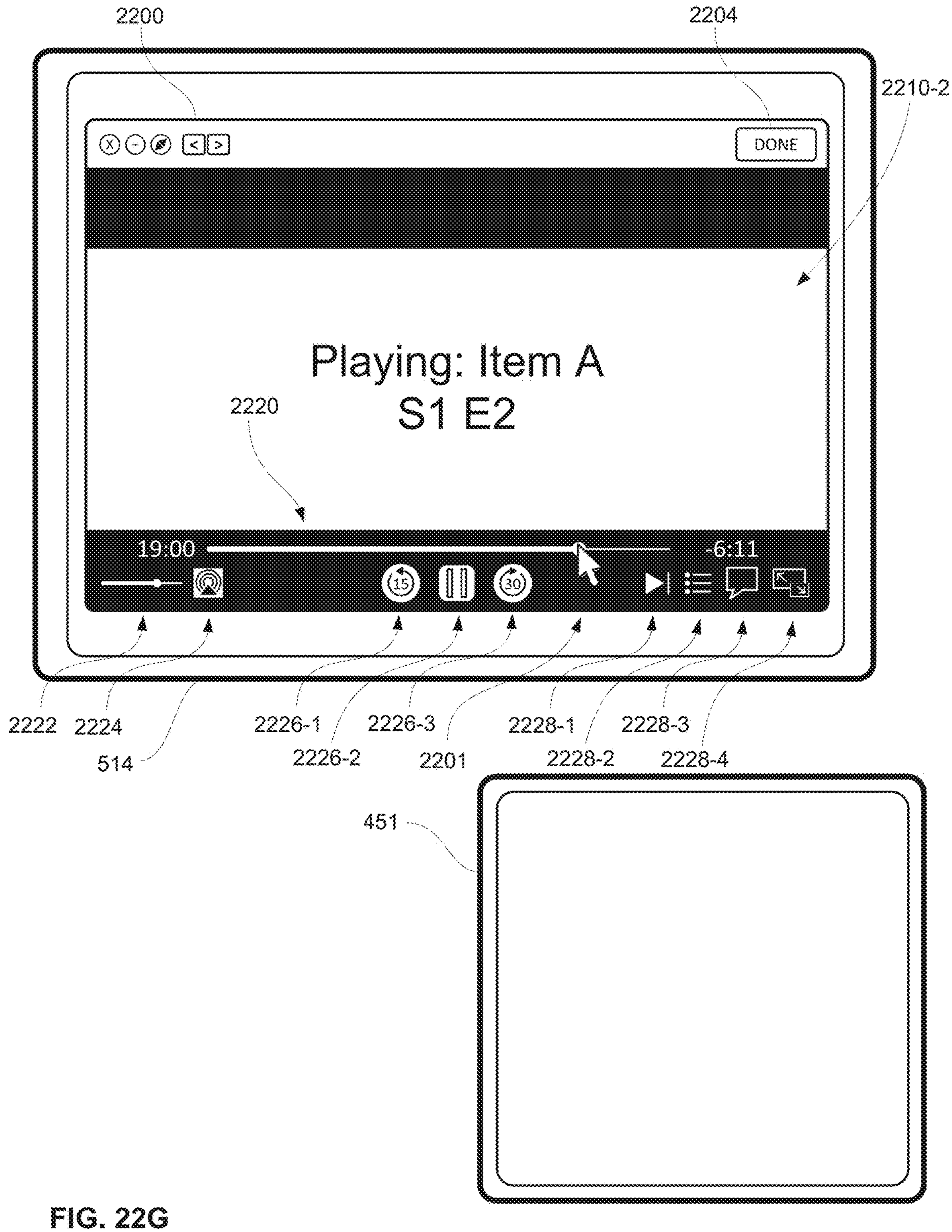

In FIG. 22F, user input 2203 corresponding to a selection of a respective location on scrubber bar 2220 is received. In some embodiments, in response to the user input, playback of the content item is immediately moved to the location associated with the user's selection (e.g., 19:00), as shown in FIG. 22G.

Figure 22H:
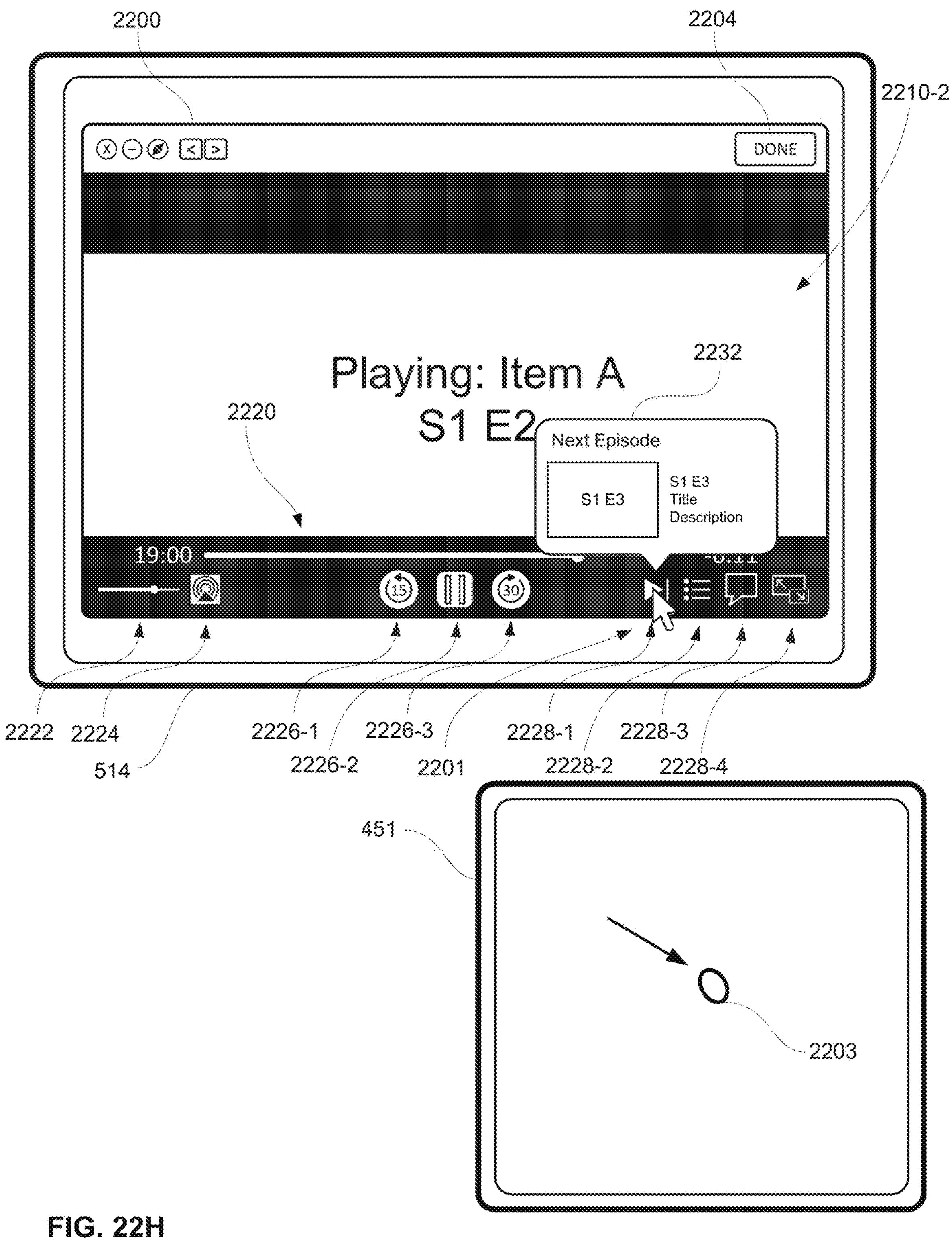

In FIG. 22H, the user has moved pointer 2201 to hover over selectable option 2228-1. In some embodiments, in response to hovering pointer 2201 over selectable option 2228-1, next episode preview 2232 is displayed. In some embodiments, next episode preview 2232 is a pop-up that is overlaid over the content preview and displays information about the next episode in the series. In some embodiments, selectable option 2228-1 is not displayed if the playback is of a non-episodic content item, such as a movie. In some embodiments, next episode preview 2232 includes a representation (e.g., image or short video) of the next episode, a label that the item is the next episode, a label of what season and episode the respective content item is, the title of the episode, and/or a short description or synopsis of the next episode (e.g., or any combination of the above). In some embodiments, while next episode preview 2232 is displayed, user interface 2210-2 continues playback of the respective content item (e.g., content playback is not paused unless the user paused the playback by selecting selectable option 2226-2 or clicking on the item playback itself).

Figure 22I:
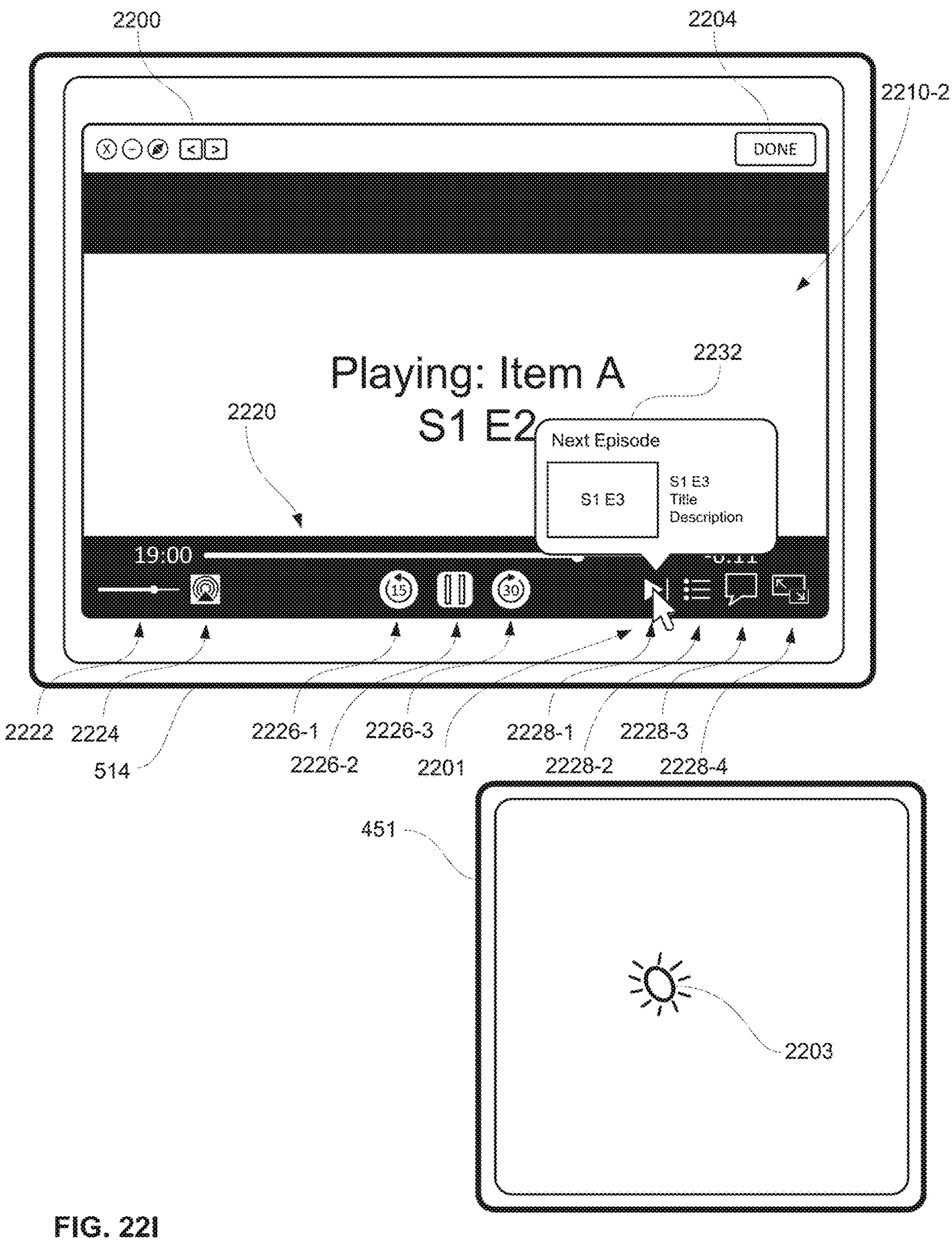
Figure 22J:
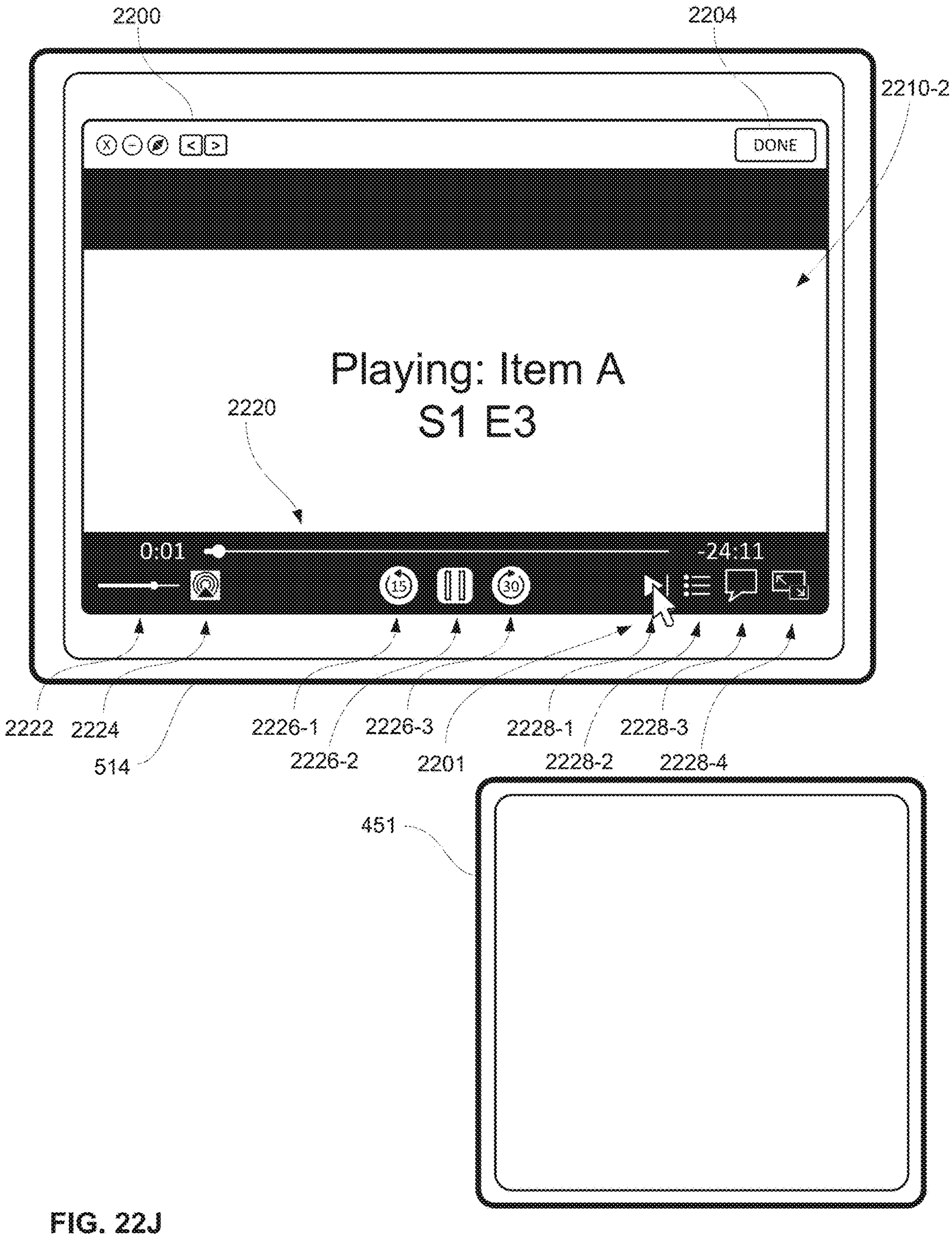

In FIG. 22I, a user input 2203 corresponding to a selection input is received while pointer 2201 is hovering over selectable option 2228-1. In some embodiments, in response to the user input, device 500 begins playback of the next episode (e.g., episode 3) in user interface 2210-2 (e.g., playback of episode 2 is terminated), as shown in FIG. 22J.

Figure 22K:
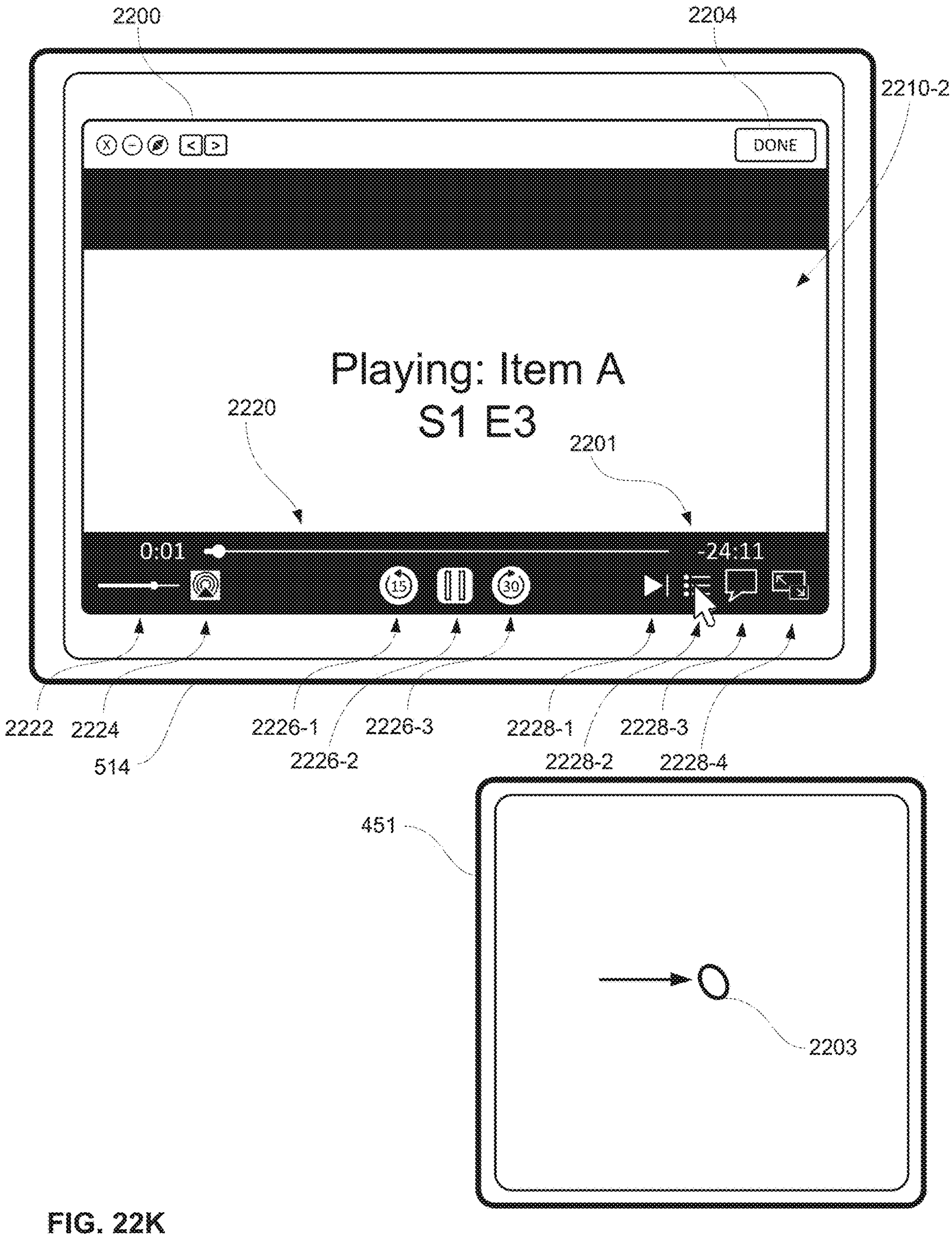
Figure 22L:
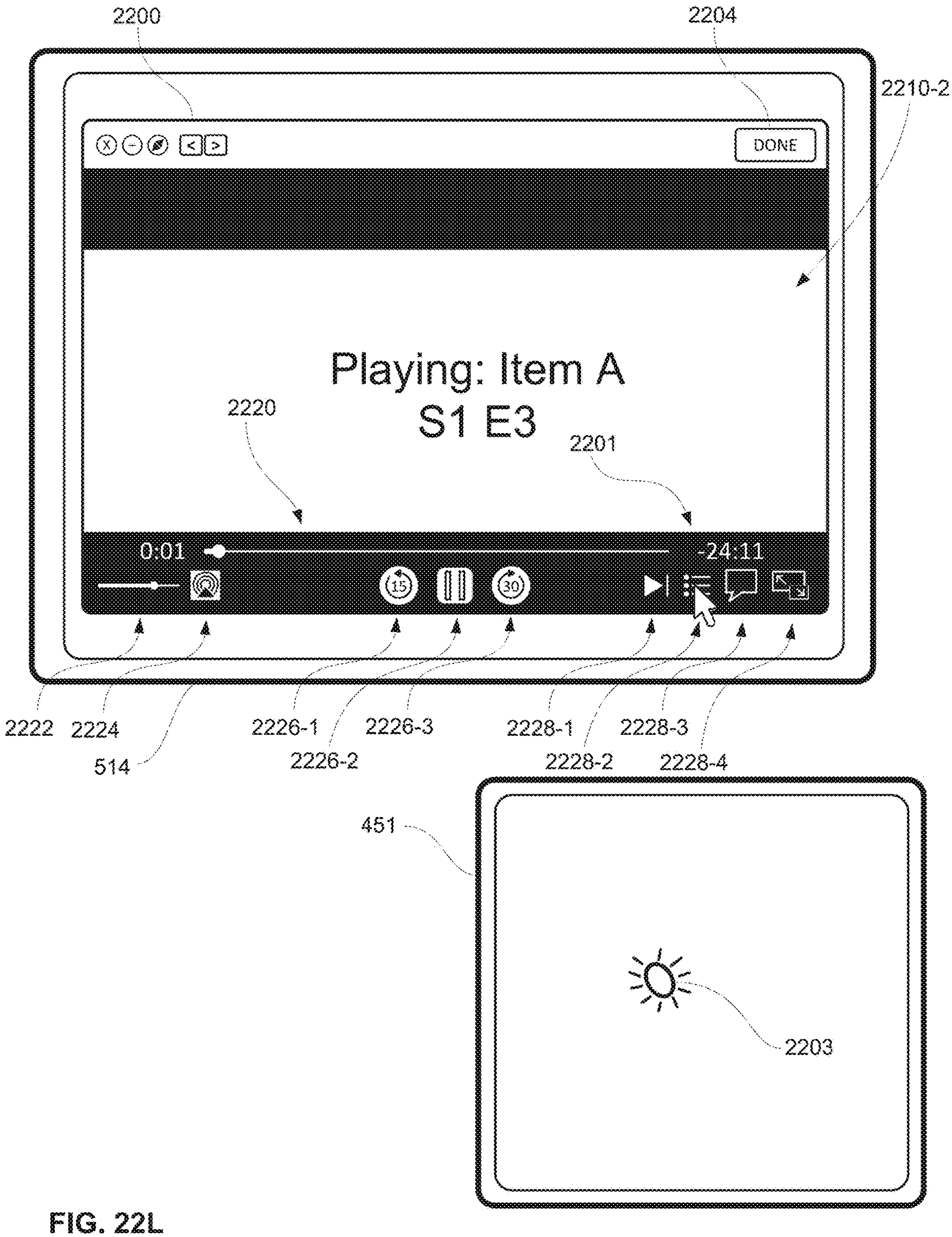
Figure 22M:
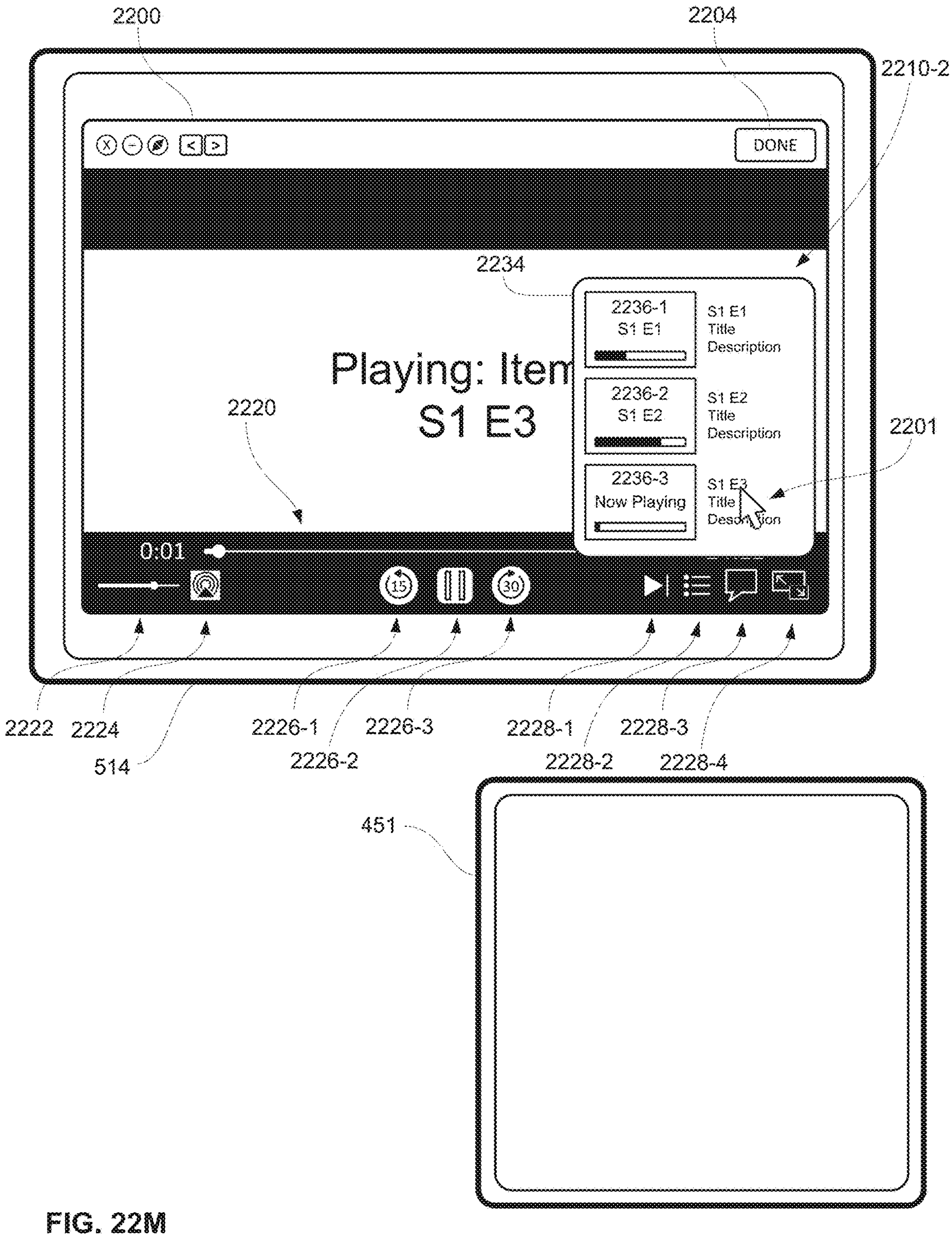

FIGS. 22K-22L illustrate the user navigating to and selecting selectable option 2228-2. In some embodiments, in response to the user selecting selectable option 2228-2, user interface 2210-2 displays episodes list 2234 overlaid over the content playback, as shown in FIG. 22M (e.g., optionally content playback is not paused). In some embodiments, episodes list 2234 displays a predetermined amount of episodes (e.g., 2, 3, 4, 5). In some embodiments, episodes list displays episodes before, episodes after, and the current episode being played. In some embodiments, episodes list 2234 is vertically scrollable to reveal further episodes. In some embodiments, each episode in episode list 2234 includes a representation (e.g., image), a title, description, and a label of what season and episode the episode is associated with (e.g., or any combination of the above). In some embodiments, if the user has partially viewed a respective content item, then the representations include a playback progress bar indicating the furthest progress reached by the user. In some embodiments, if the user has not previously watched the respective episode, then the representation does not include a playback progress bar. In some embodiments, if the user has completed watching a respective episode, a playback progress bar with playback displayed as full. In some embodiments, if the user has completed watching a respective episode, then the playback progress bar is not displayed. In some embodiments, the representation corresponding to the episode that is currently playing in user interface 2210-2 includes an indicator overlaid over the representation indicating that the episode is the currently playing episode (e.g., a "Now Playing" label).

Figure 22N:
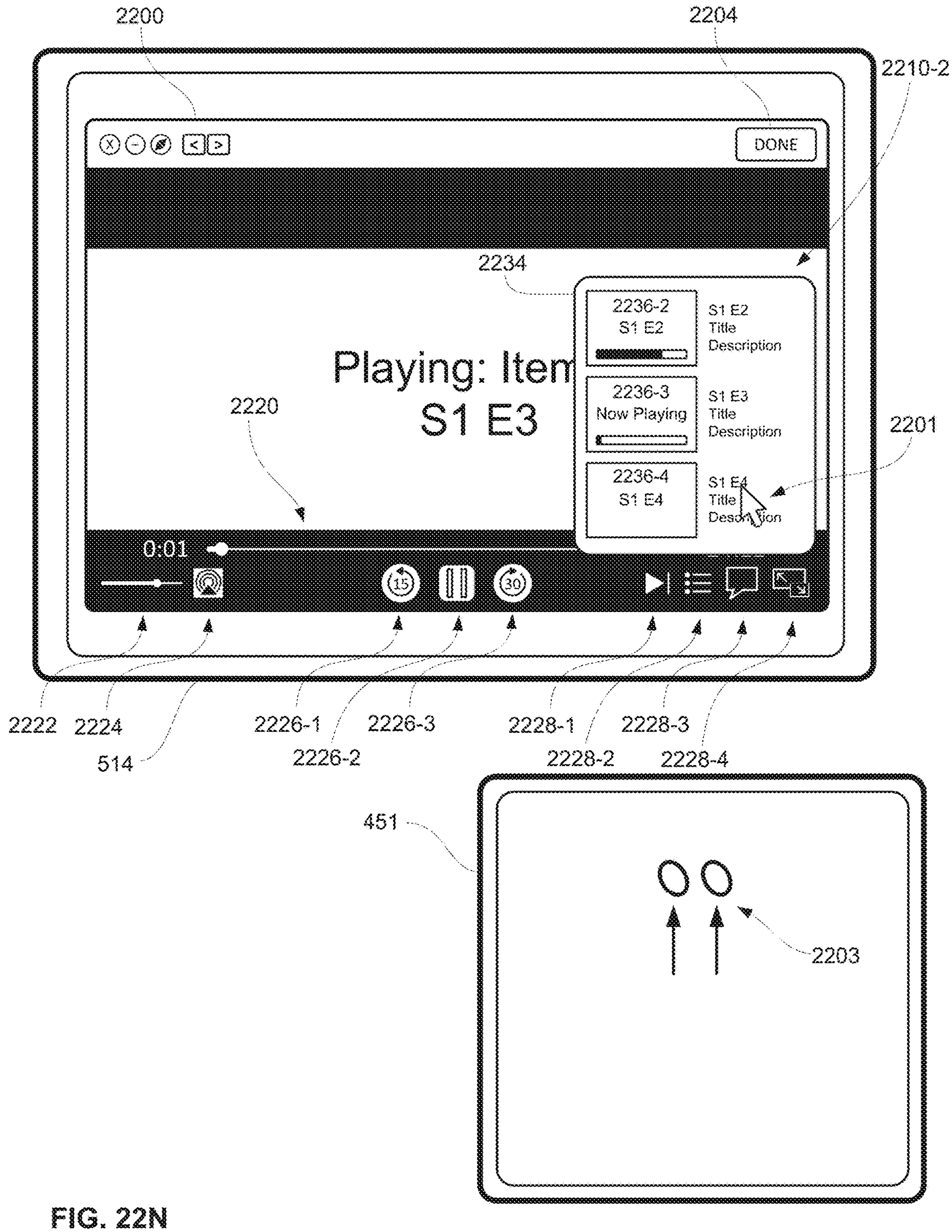

In FIG. 22N, the user performs an upward scrolling gesture. In some embodiments, in response to the user input, episode list 2234 scrolls upwards to reveal further episodes in the content item (e.g., episode 4 is now displayed). In some embodiments, the user has not watched episode 4 or has completed watching episode 4 such that representation 2236-4 does not include a playback progress bar. In some embodiments, any representation in episode list 2234 is selectable to cause playback of the respective episode. In some embodiments, playback begins from the beginning of the respective episode. In some embodiments, if the user has partially watched the respective episode, playback resumes at the playback position where playback ended (e.g., the furthest playback position).

Figure 22O:
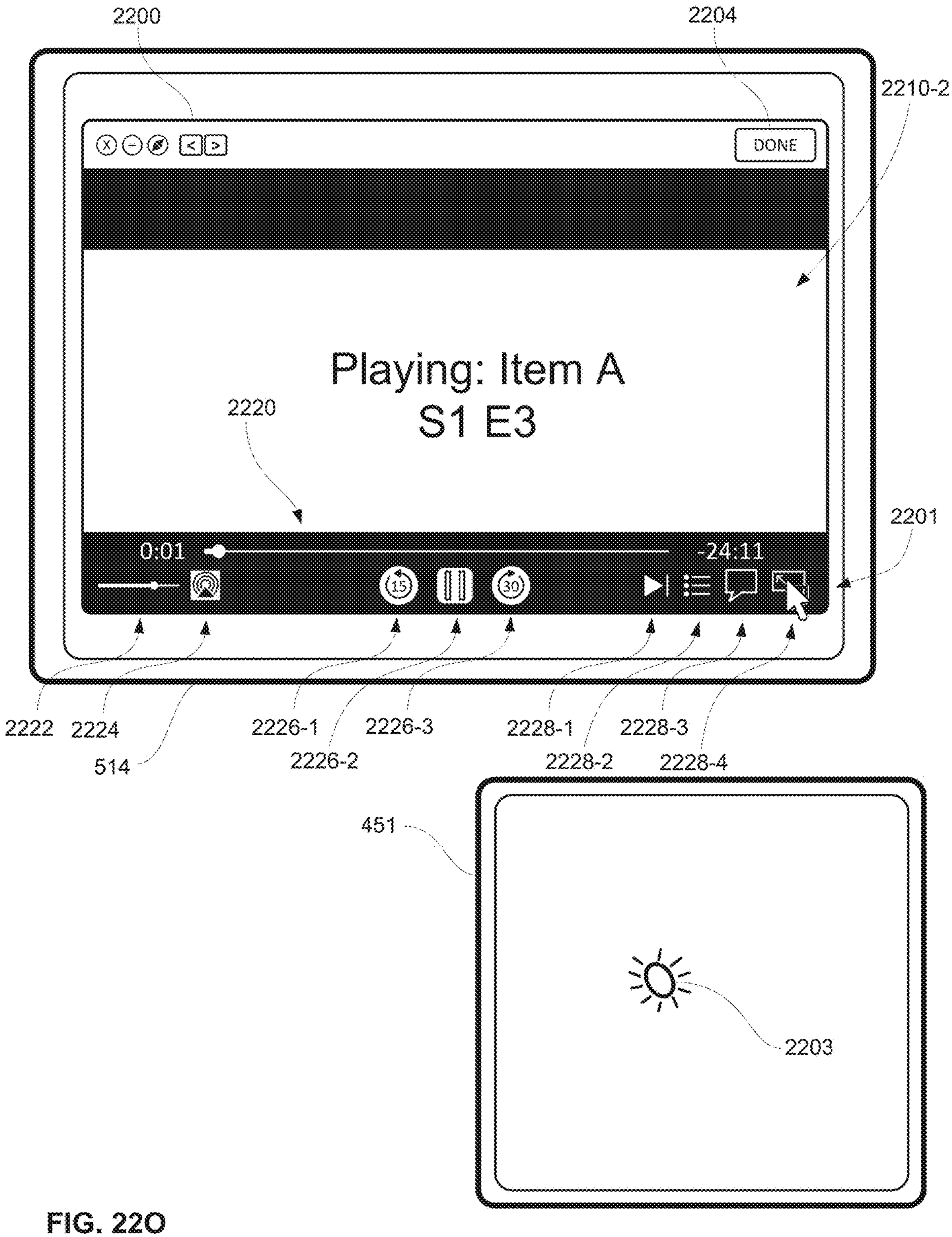
Figure 22P:
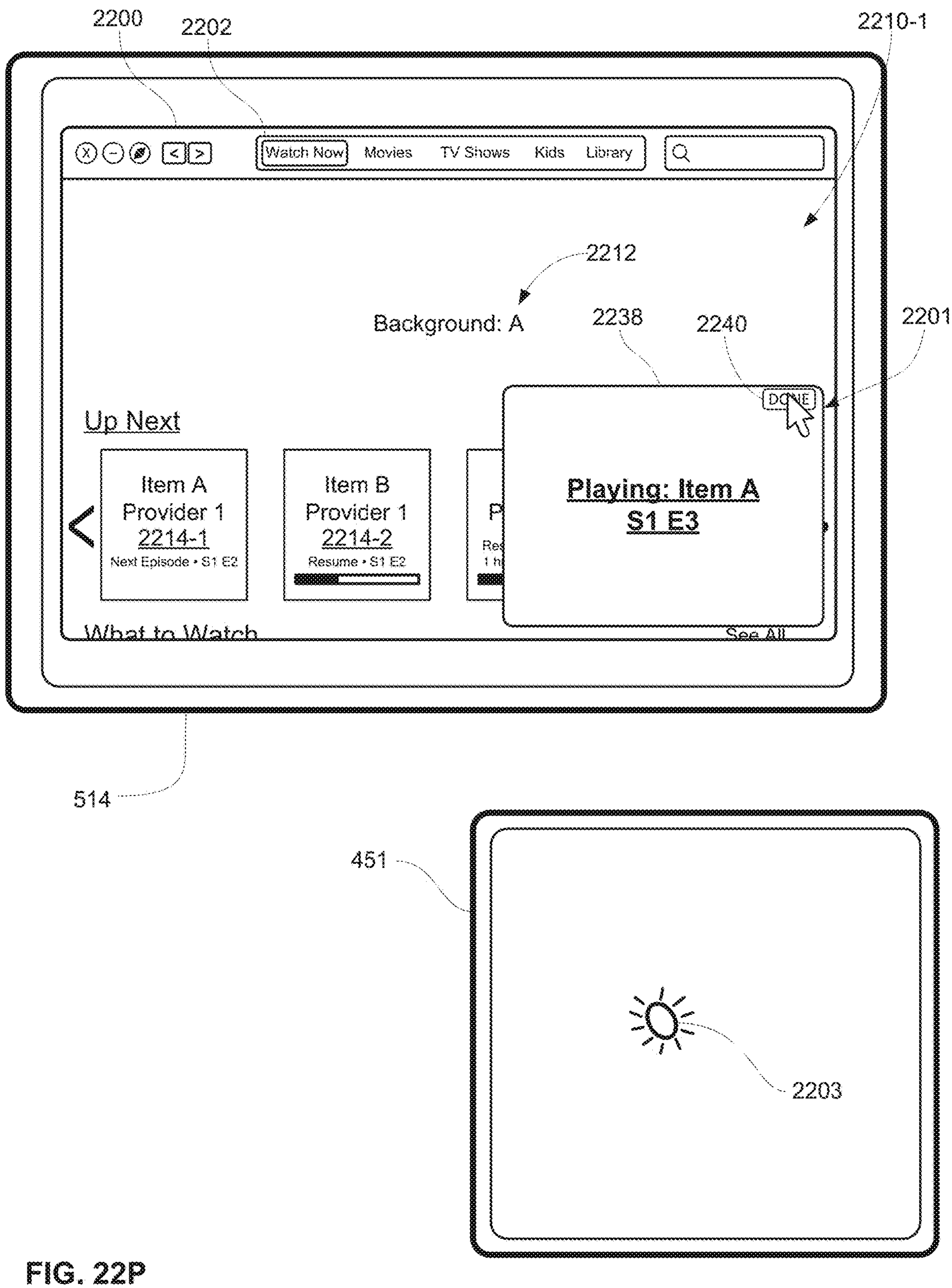

In FIG. 22O, user input 2203 corresponding to a selection input is received while pointer 2201 is hovering over selectable option 2228-4. In some embodiments, in response to the user input, device 500 enters into picture-in-picture mode, as shown in FIG. 22P. In some embodiments, in picture-in-picture mode, picture-in-picture overlay 2238 is displayed overlaid over user interface 2210-1 (e.g., the user interface that was displayed before content playback began). In some embodiments, picture-in-picture overlay 2238 is displayed within the unified media browsing application 2200 (e.g., is not a separate window or separate application). In some embodiments, picture-in-picture overlay 2238 continues playback of the content item that was previously displayed (e.g., episode 3). In some embodiments, picture-in-picture overlay 2238 includes selectable option 2240 that is selectable to dismiss picture-in-picture overlay 2238 (e.g., thus exiting picture-in-picture mode). Thus, while picture-in-picture overlay 2238 is displayed, the user is able to cause playback of a content item in user interface 2210-1 that is displayed below picture-in-picture overlay 2238. In some embodiments, the user is able to interact with picture-in-picture overlay 2238 to move picture-in-picture overlay 2238 to another location within user interface 2210-1 (e.g., by clicking and dragging picture-in-picture overlay 2238 to another location).

In FIG. 22P, user input 2203 is received selecting selectable option 2240. In some embodiments, in response to the user input, device 500 exits picture-in-picture mode and dismisses picture-in-picture overlay 2238, as shown in FIG. 22Q.

Figure 22Q:
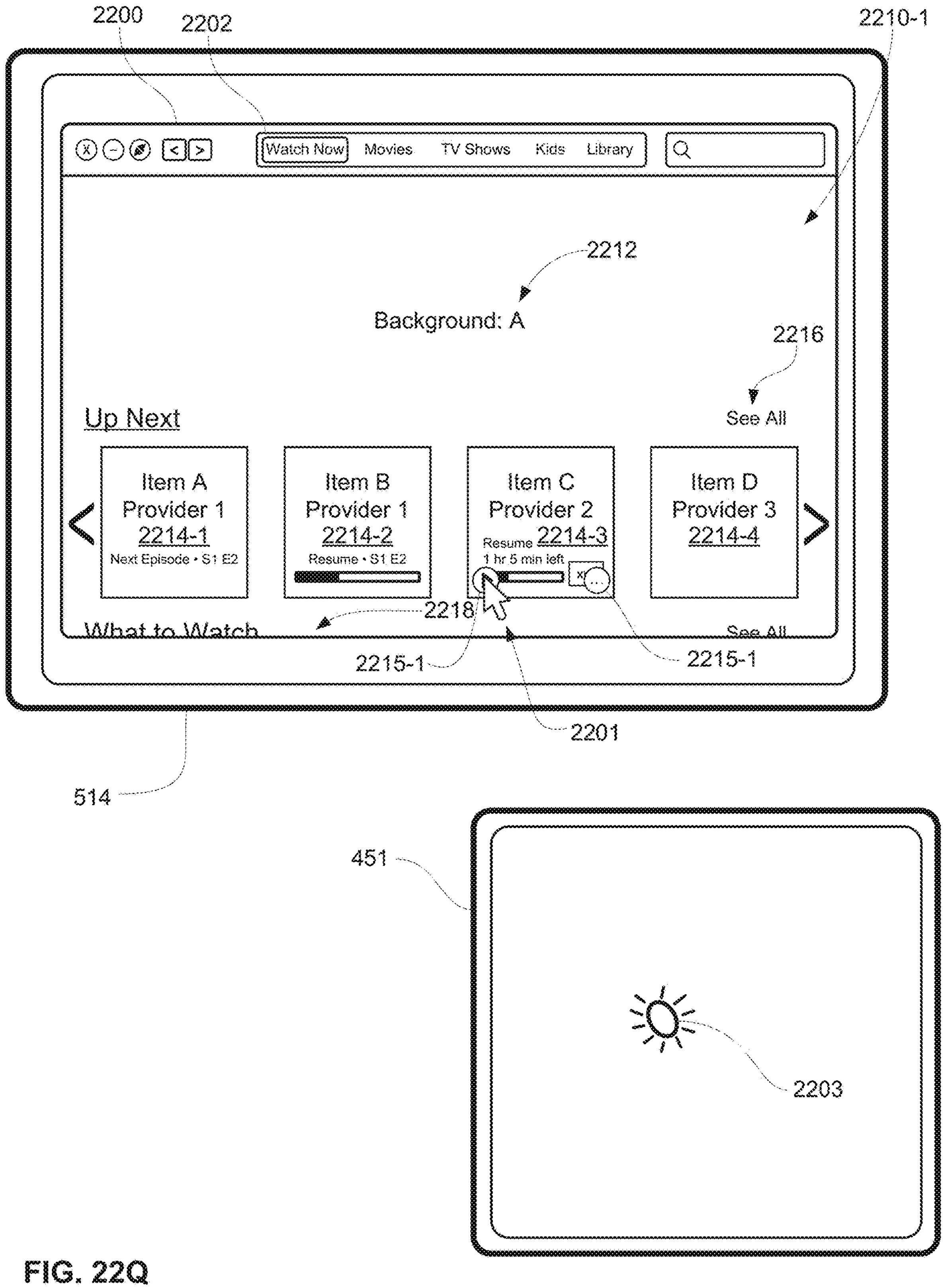

FIGS. 22Q-22AA illustrate an alternative embodiment in which content is displayed in a window separate from the unified media browsing application. It is understood that any features described in FIGS. 22Q-22AA can be combined with or replace features on the content player discussed above with respect to FIGS. 22C-22P. Similarly, any features described above with respect to FIGS. 22C-22P can be combined with or replace features of the content player described below with respect to FIGS. 22Q-22AA. In some embodiments, features in FIGS. 22Q-22A that are similar to features discussed above with respect to FIGS. 22C-22P will not be repeated for brevity.

Figure 22R:
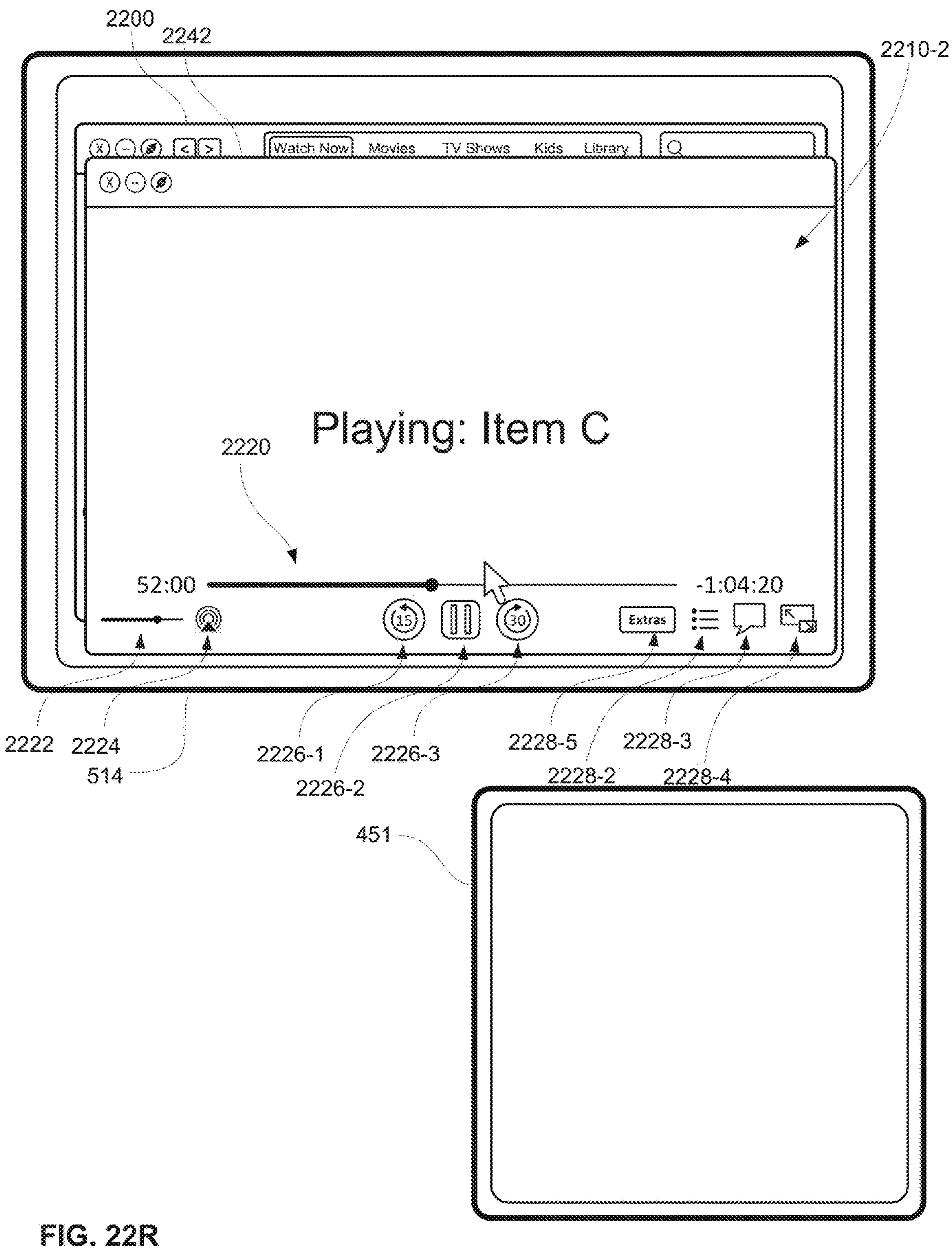

In FIG. 22Q, user input 2203 is received selecting play icon for representation 2214-3 corresponding to Item C. In some embodiments, Item C is a movie (e.g., as opposed to an episodic content item such as Item A described above). In some embodiments, in response to the user input, unified media browsing application displays content playback window 2242, as shown in FIG. 22R. In some embodiments, content playback window 2242 is a window for an application different from the unified media browsing application 2200 (e.g., a dedicated content playback application or a content playback user interface of another application). In some embodiments, window 2242 is a window of the unified media browsing application (e.g., a content playback specific window). In some embodiments, window 2242 displays user interface 2210-2 and displays playback of the selected content item (e.g., Item C). In some embodiments, window 2242 does not include "black bars" above or below the content item. In some embodiments, window 2242 includes one or more elements for interacting with the playback overlaid over the content item. For example, window 2242 includes scrubber bar 2220, selectable option 2222, selectable option 2224, selectable options 2226-1 to 2226-3, and selectable options 2228-2 to 2228-4 that are similar to the similarly labeled selectable options described above with respect to FIG. 22C. In some embodiments, instead of selectable option 2228-1, window 2242 includes selectable option 2228-5 because the currently playing content item is a movie (e.g., not an episodic content item). In some embodiments, any of the selectable options are displayed only in response to detecting the user moving the pointer or otherwise interacting with device 500. In some embodiments, any of the selectable options are hidden when device 500 does not receive any user inputs for a threshold amount of time (e.g., 10 seconds, 20 seconds, 30 seconds).

Figure 22S:
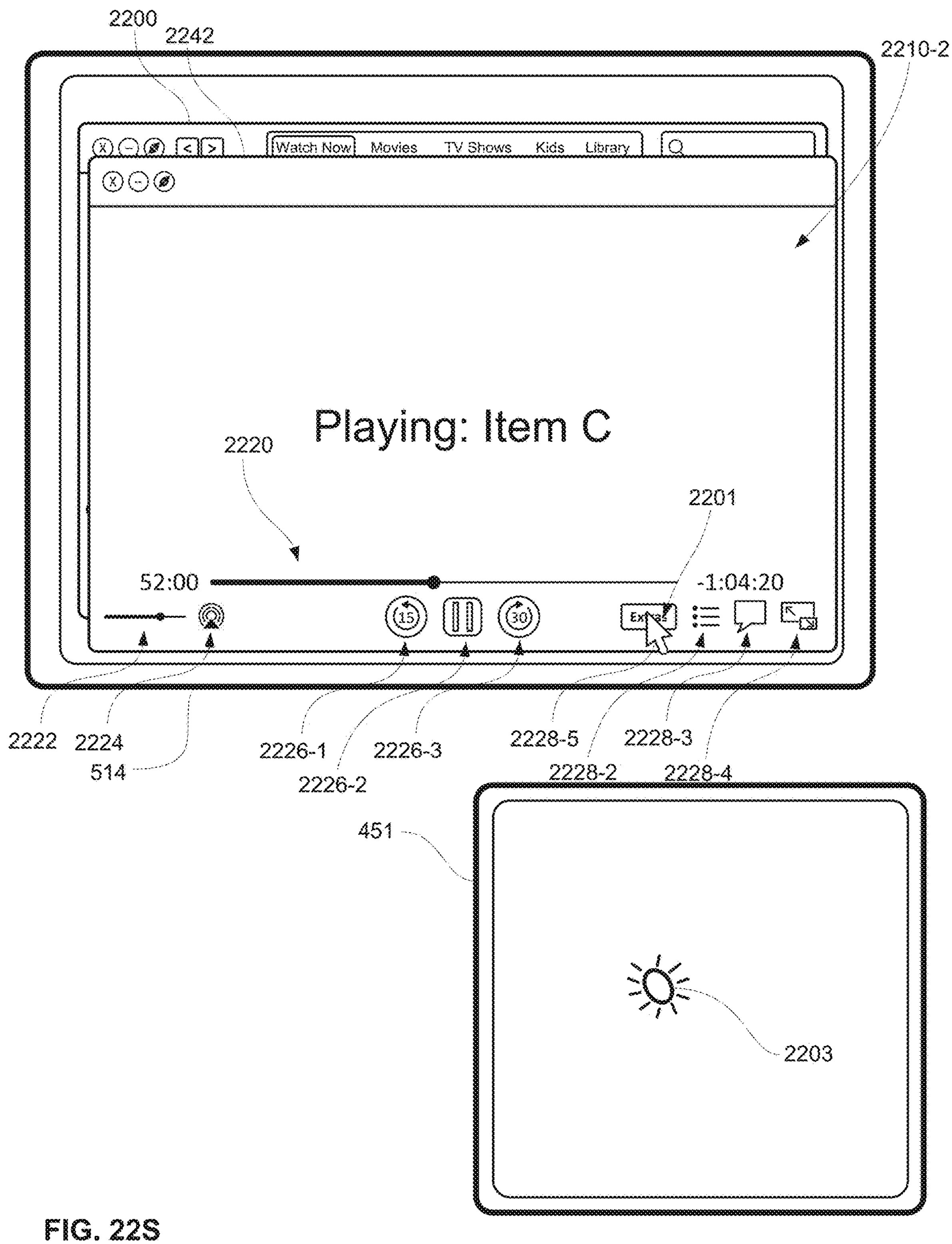
Figure 22T:
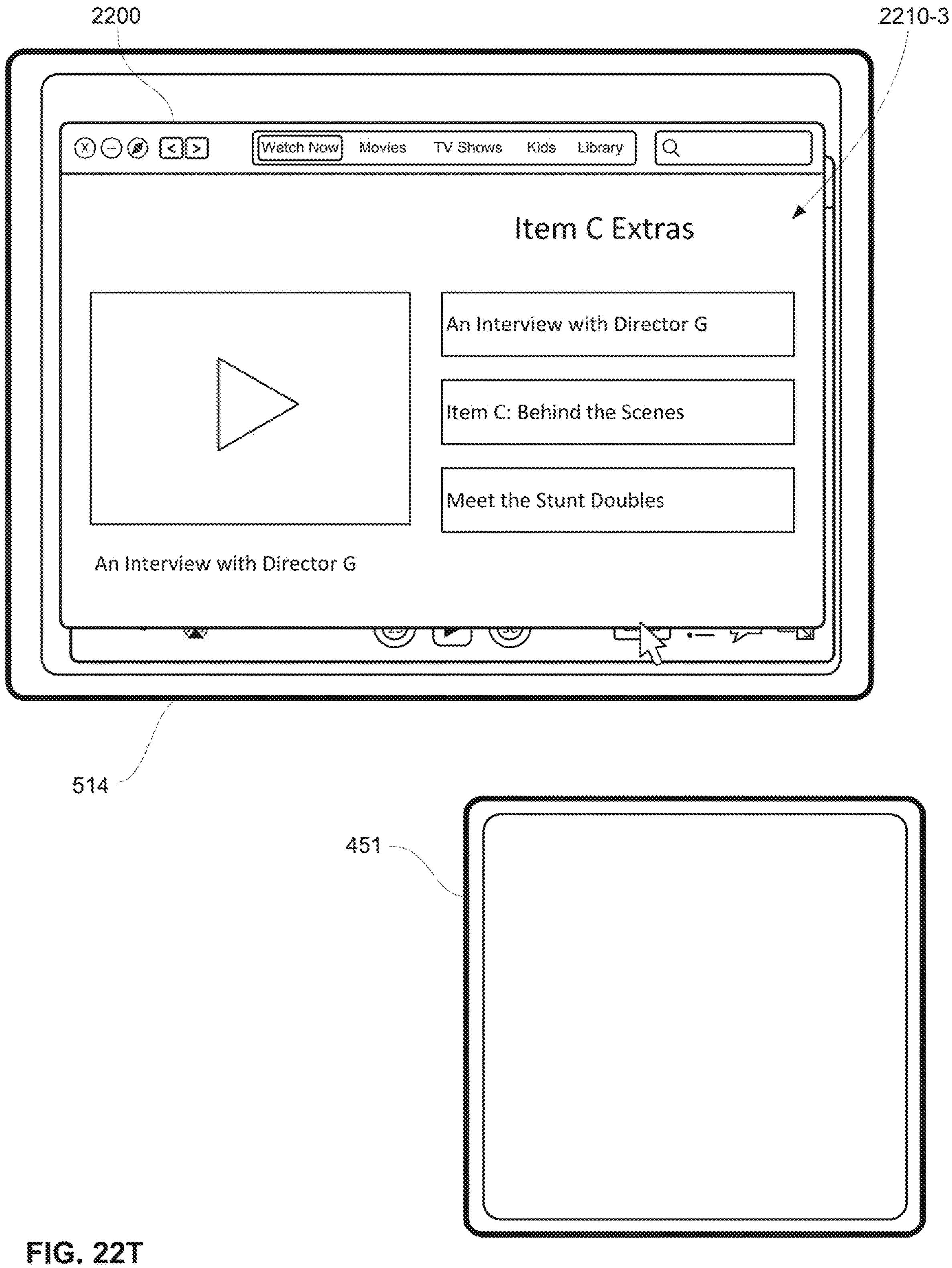

In FIG. 22S, user input 2203 is received selecting selectable option 2228-5. In some embodiments, in response to the user input, device 500 displays user interface 2210-3 corresponding to an extras user interface (e.g., similar to user interface 2010-5 discussed above with respect to FIG. 20T). In some embodiments, if playback occurred in a separate window (e.g., such as window 2242), then selection of selectable option 2228-5 causes unified media browsing application 2200 to display user interface 2210-3 (e.g., playback in window 2242 is optionally paused, and the playback window is optionally displayed behind the unified media browsing application window). In some embodiments, if playback occurred in a separate window (e.g., such as window 2242), then selection of selectable option 2228-5 causes window 2242 to terminate playback and display user interface 2210-3. In some embodiments, if playback occurred in the unified media browsing application 2200 (e.g., similar to described above with respect to FIG. 22C), then unified media browsing application 2200 replaces the content playback user interface with user interface 2210-3.

Figure 22U:
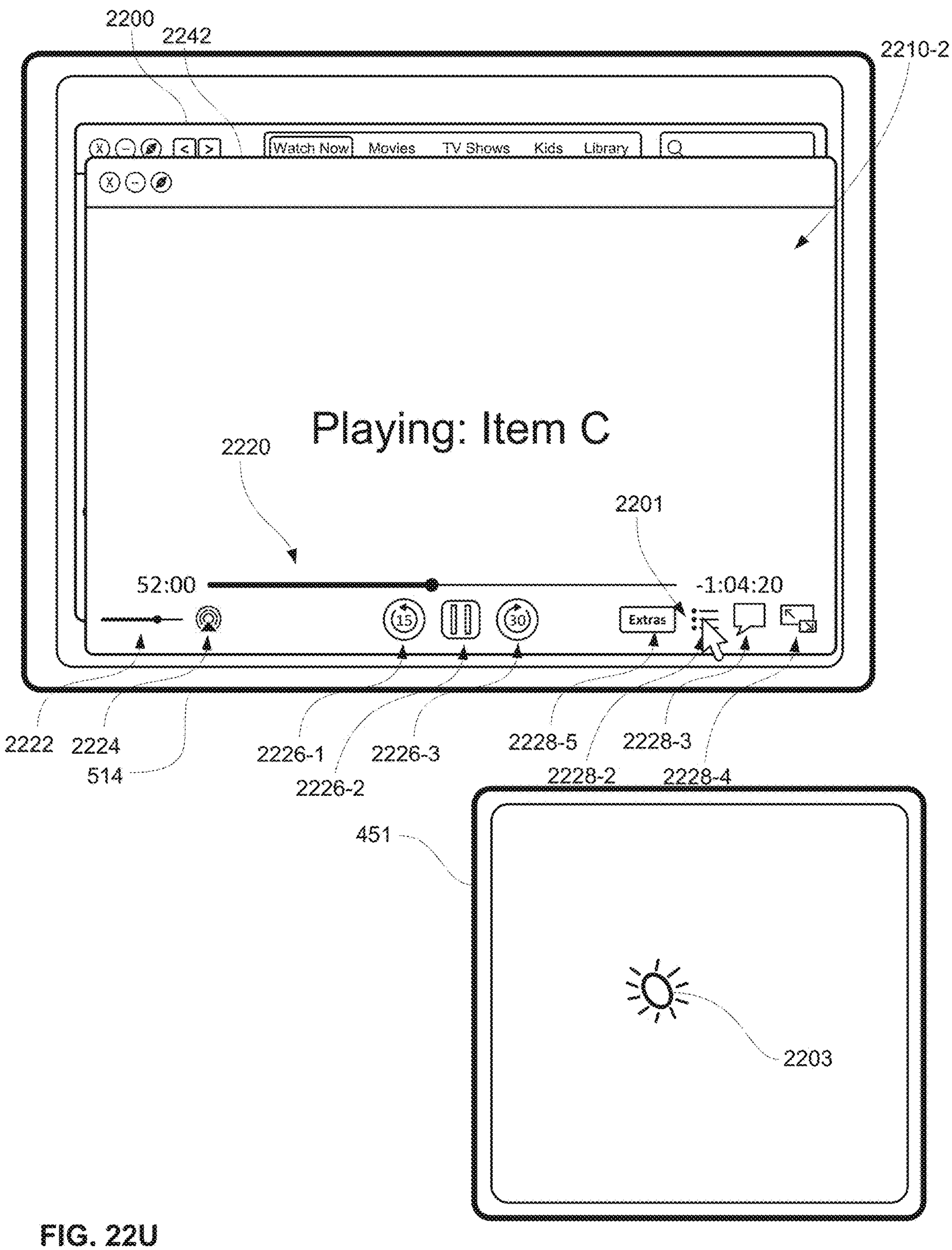

In FIG. 22U, user input 2203 is received selecting selectable option 2228-2. In some embodiments, selectable option 2228-2 is the same selectable option 2228-2 described above with respect to FIGS. 22L-22N. In some embodiments, in response to the user input, window 2242 displays chapters list 2246 overlaid over the content playback (e.g., content playback optionally continues without pausing). In some embodiments, chapters list 2246 is displayed instead of episodes list 2234 because the currently playing content item is not an episodic content item and/or is divided into a plurality of chapters.

In some embodiments, each chapter in chapters list 2246 includes a representation (e.g., image), a label of which chapter the chapter is referring to, the title of the chapter and/or a short description of the status (e.g., or any combination of the above). In some embodiments, each representation of the chapter includes a playback progress bar to indicate the playback progress of the user. In some embodiments, the representations of the chapters are not displayed with playback progress bars even if the user has partially or completely watched the respective chapter. In some embodiments, the chapter that is currently being displayed is displayed with a "Now Playing" label over the representation (e.g., such as in representation 2248-3). In some embodiments, chapters list 2246 is vertically scrollable to reveal further chapters in the content. In some embodiments, each chapter in chapters list 2246 is selectable to cause playback of the content item to jump to the selected chapter. In some embodiments, playback begins at the beginning of the chapter. In some embodiments, playback begins at the furthest playback progress in the chapter if the user has partially viewed the respective chapter.

Figure 22V:
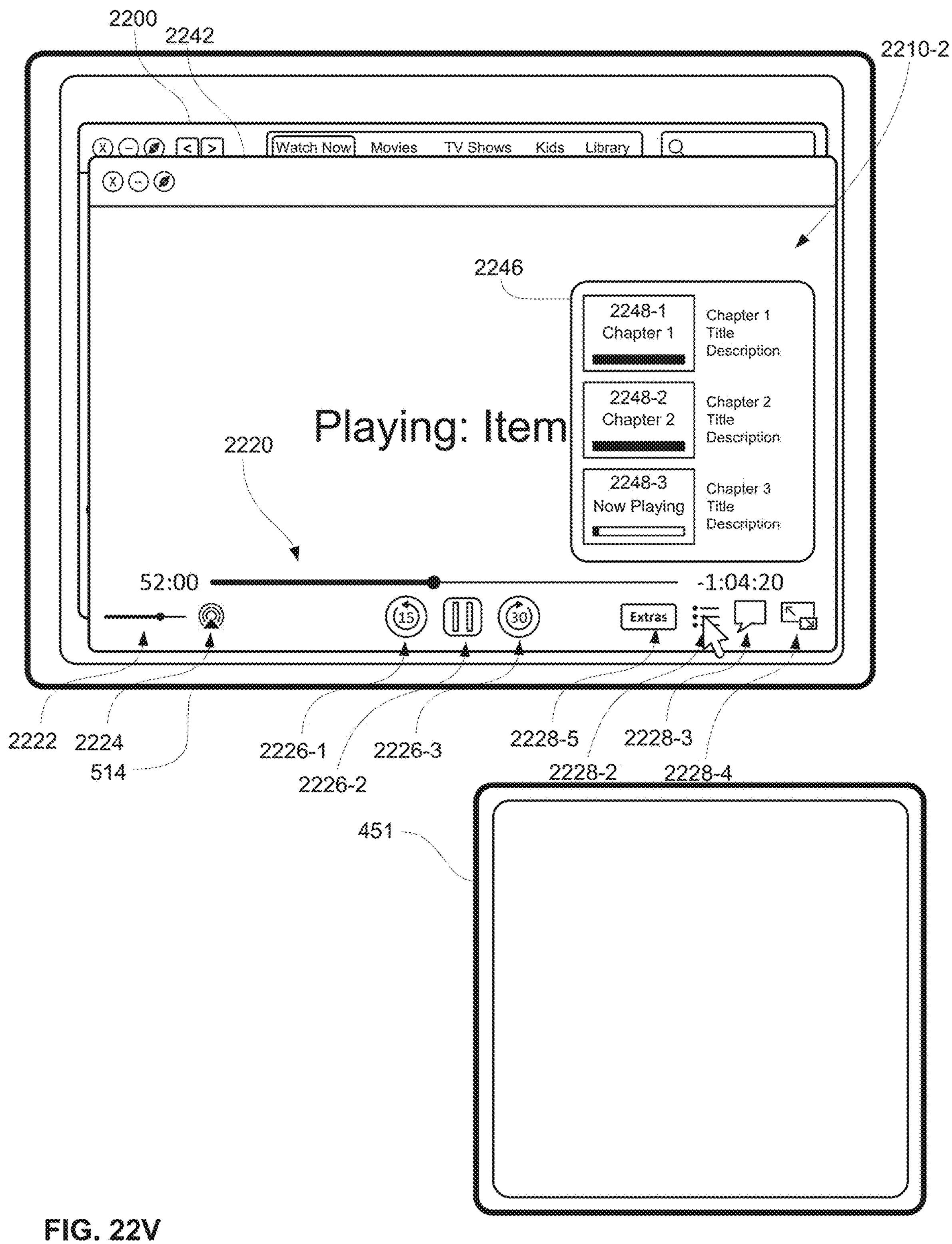
Figure 22W:
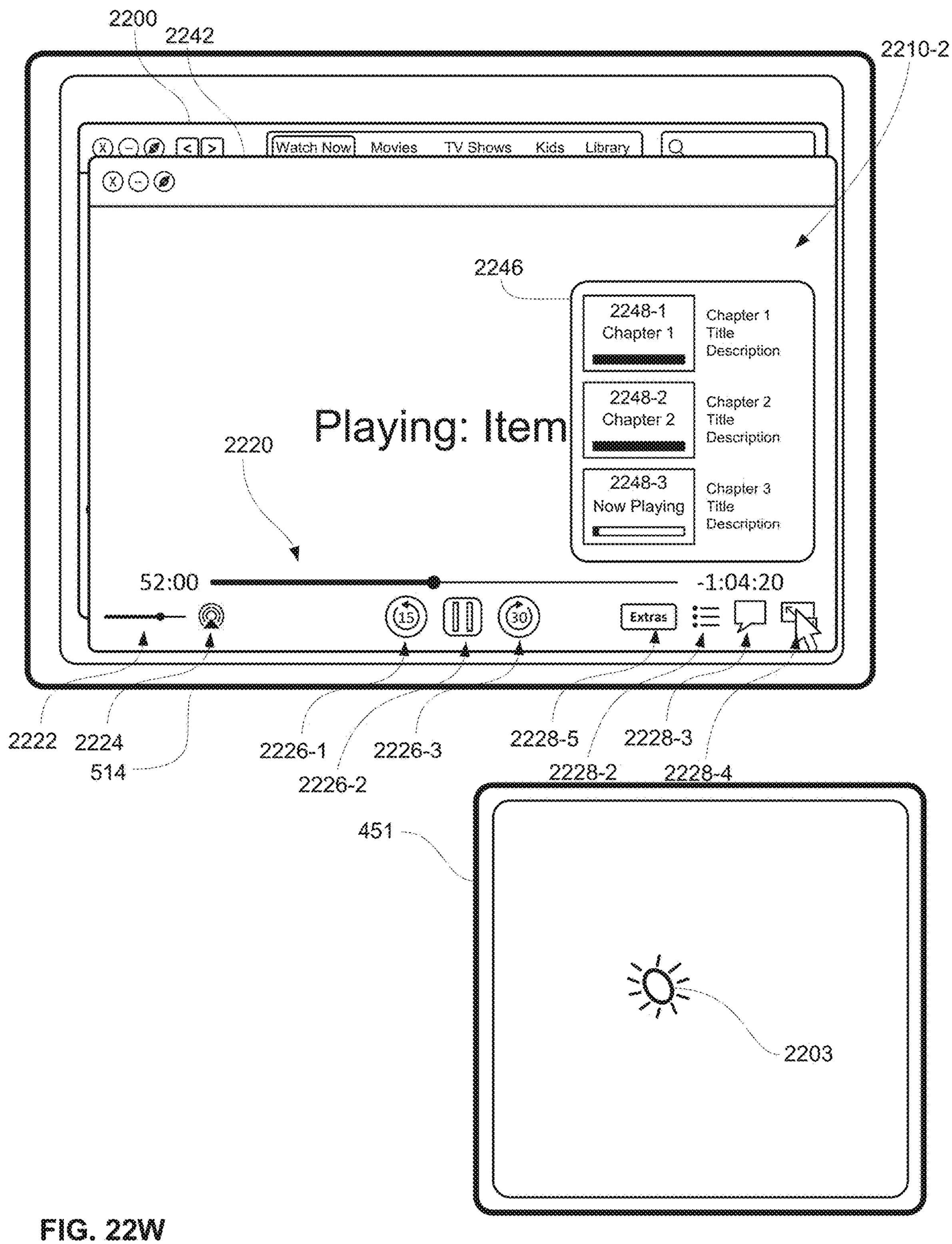
Figure 22X:
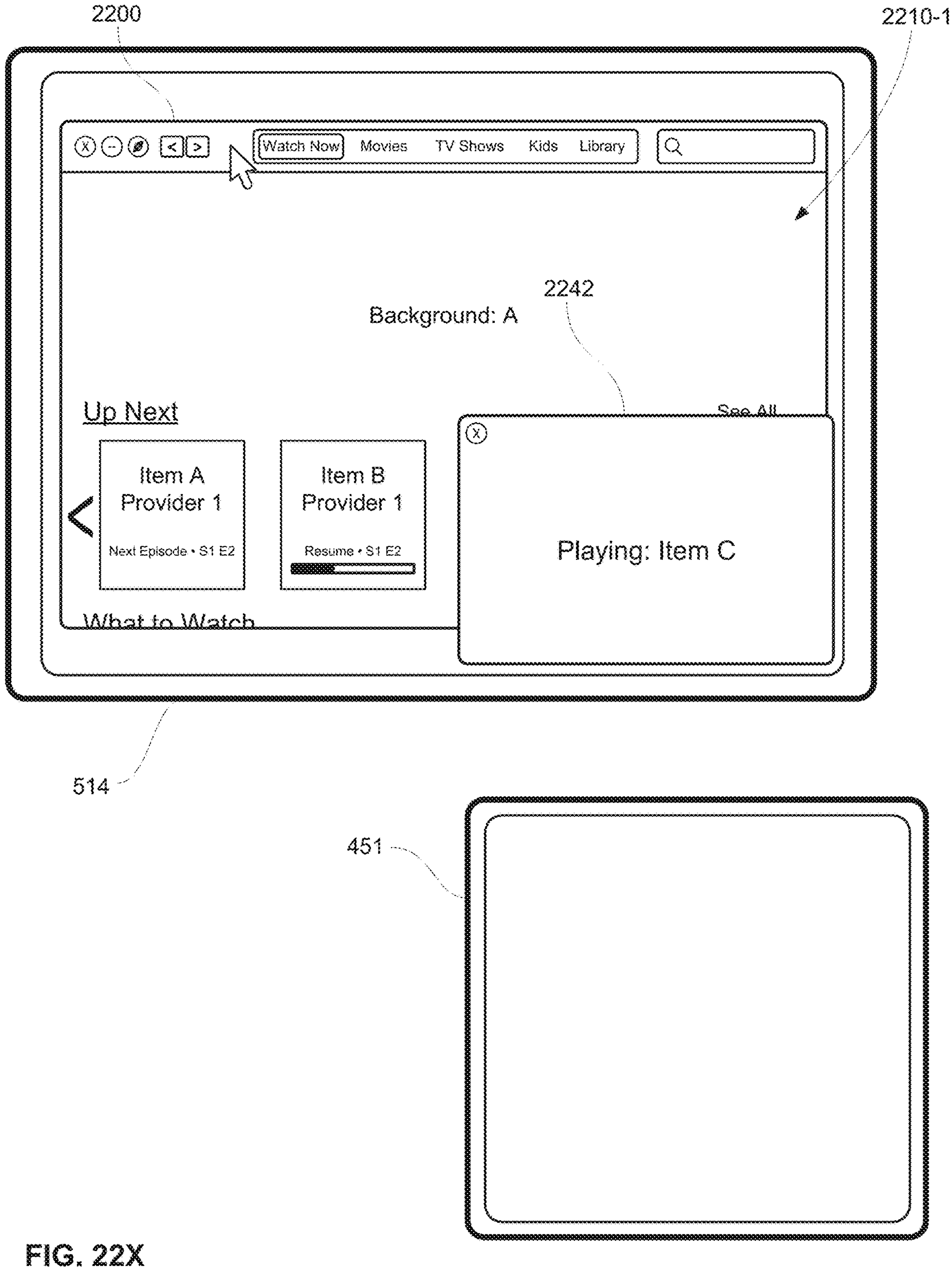
Figure 22Y:
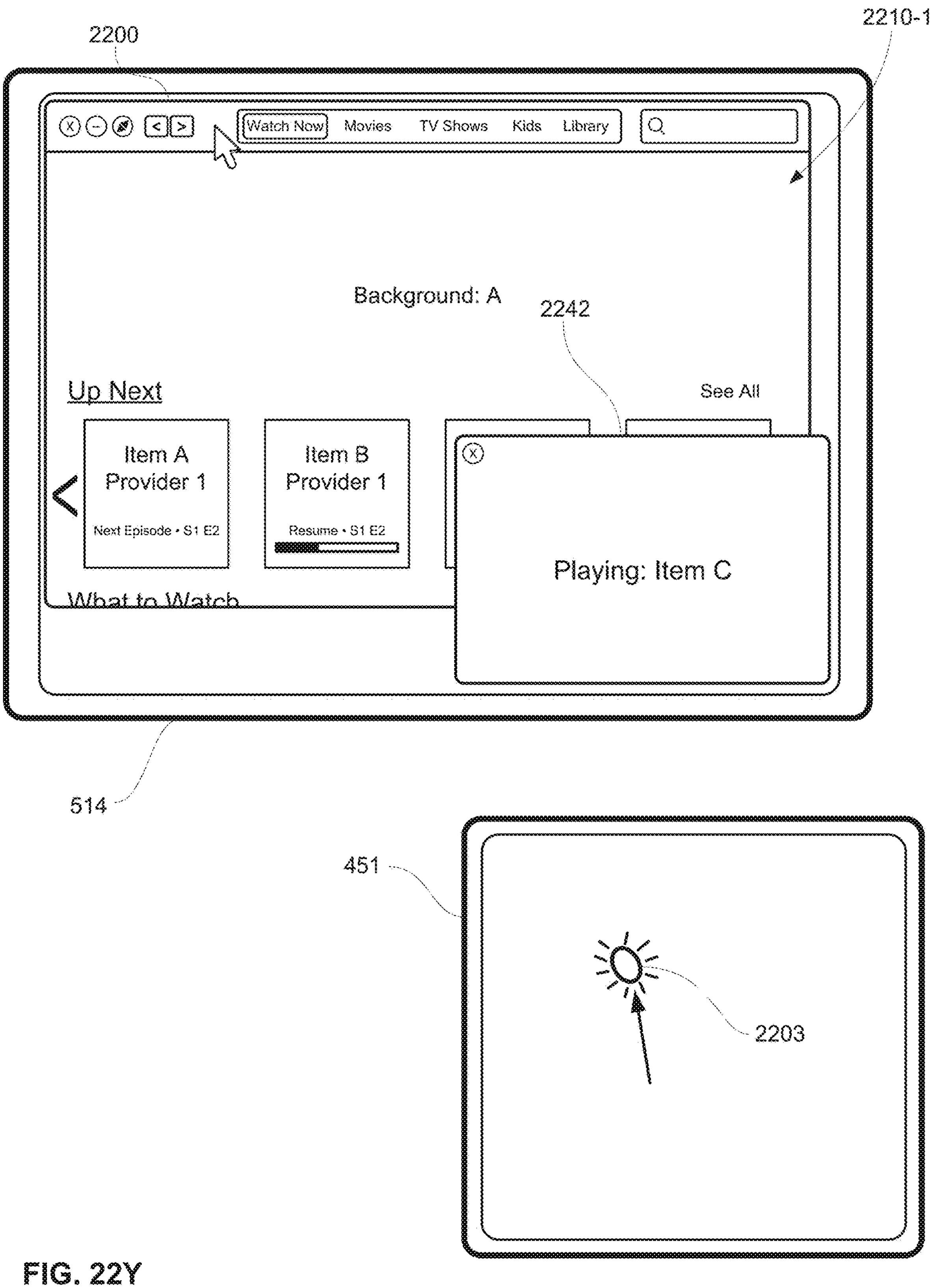

In FIG. 22W, user input 2203 is received selecting selectable option 2228-4. In some embodiments, in response to the user input, device 500 enters into picture-in-picture mode, as shown in FIG. 22X. In some embodiments, because content playback was occurring in a dedicated window 2242, window 2242 is modified to become the picture-in-picture window. In some embodiments, the content continues playback within window 2242. In some embodiments, window 2242 is resized to a predetermined size and receives an always-on-top characteristic. In some embodiments, having an always-on-top characteristic means that other windows on device 500 will not be displayed over window 2242 (until picture-in-picture mode is ended). For example, in FIG. 22Y, a user input 2203 is received selecting and moving unified media browsing application 2200. In some embodiments, the unified media browsing application 2200 window is moved in accordance to the user's input, but the unified media browsing application 2200 does not cover window 2242. Thus, as shown, window 2242 is always shown at the top of the display.

Figure 22Z:
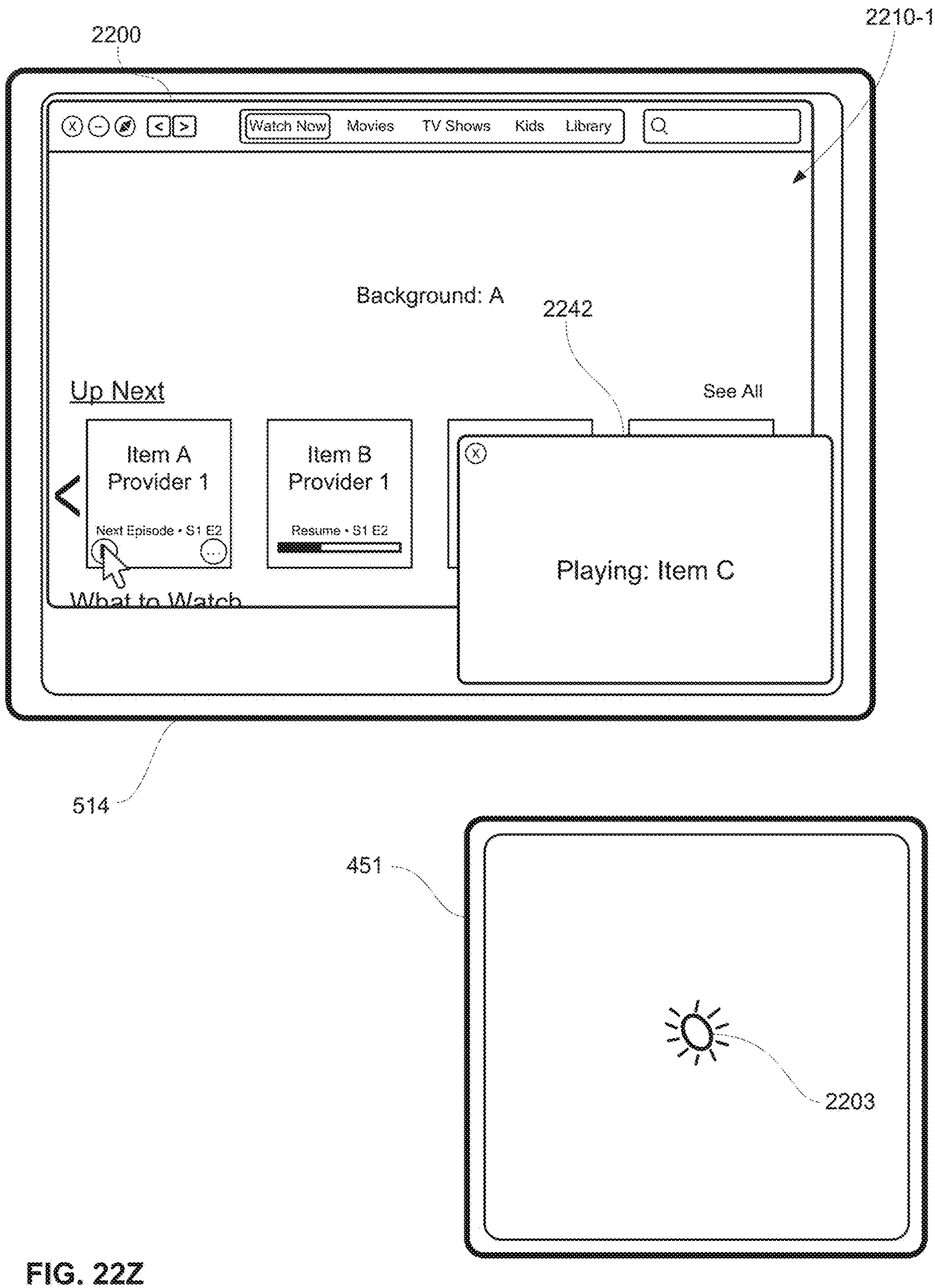
Figure 22A:
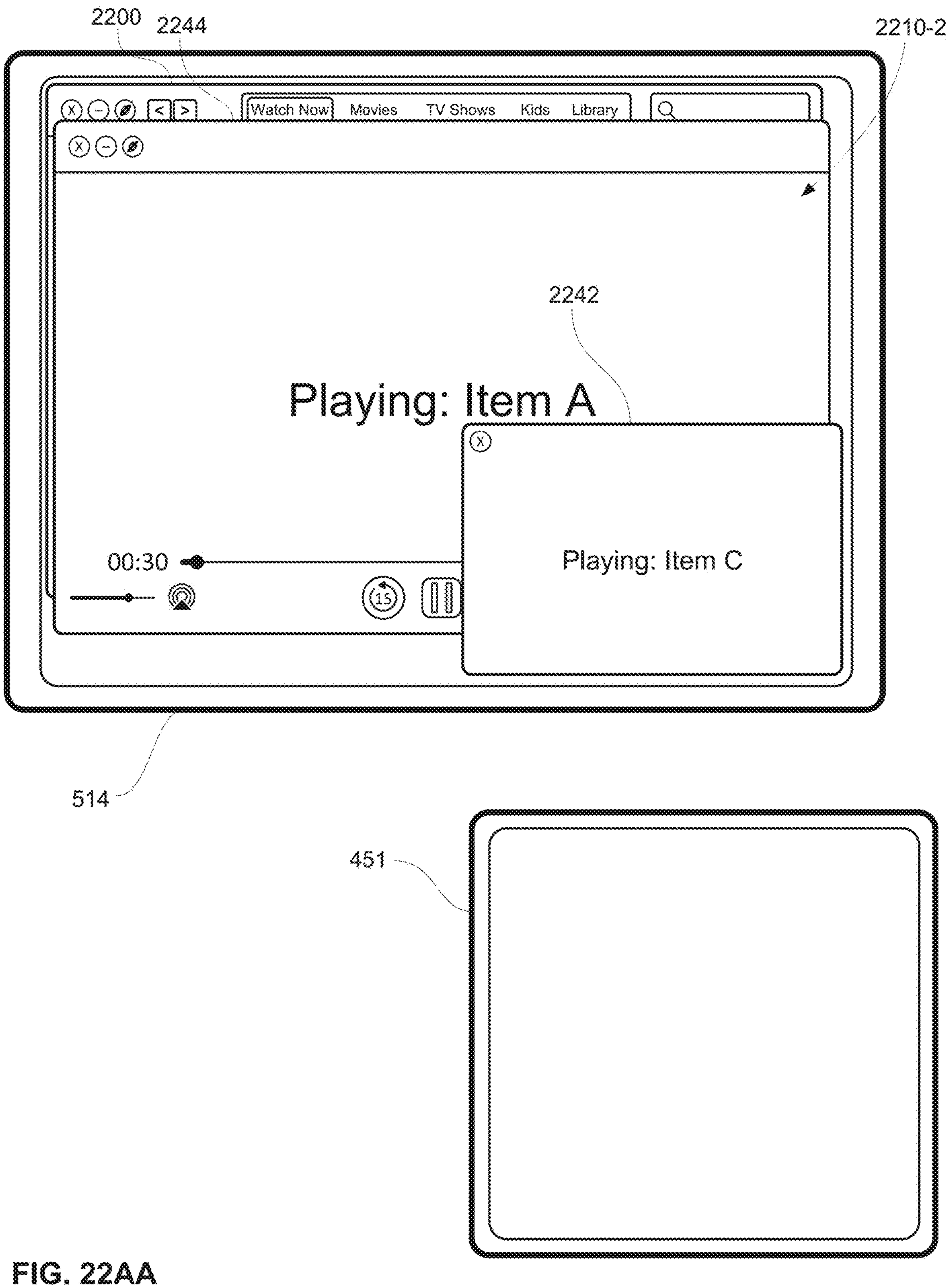
Figure 23A:
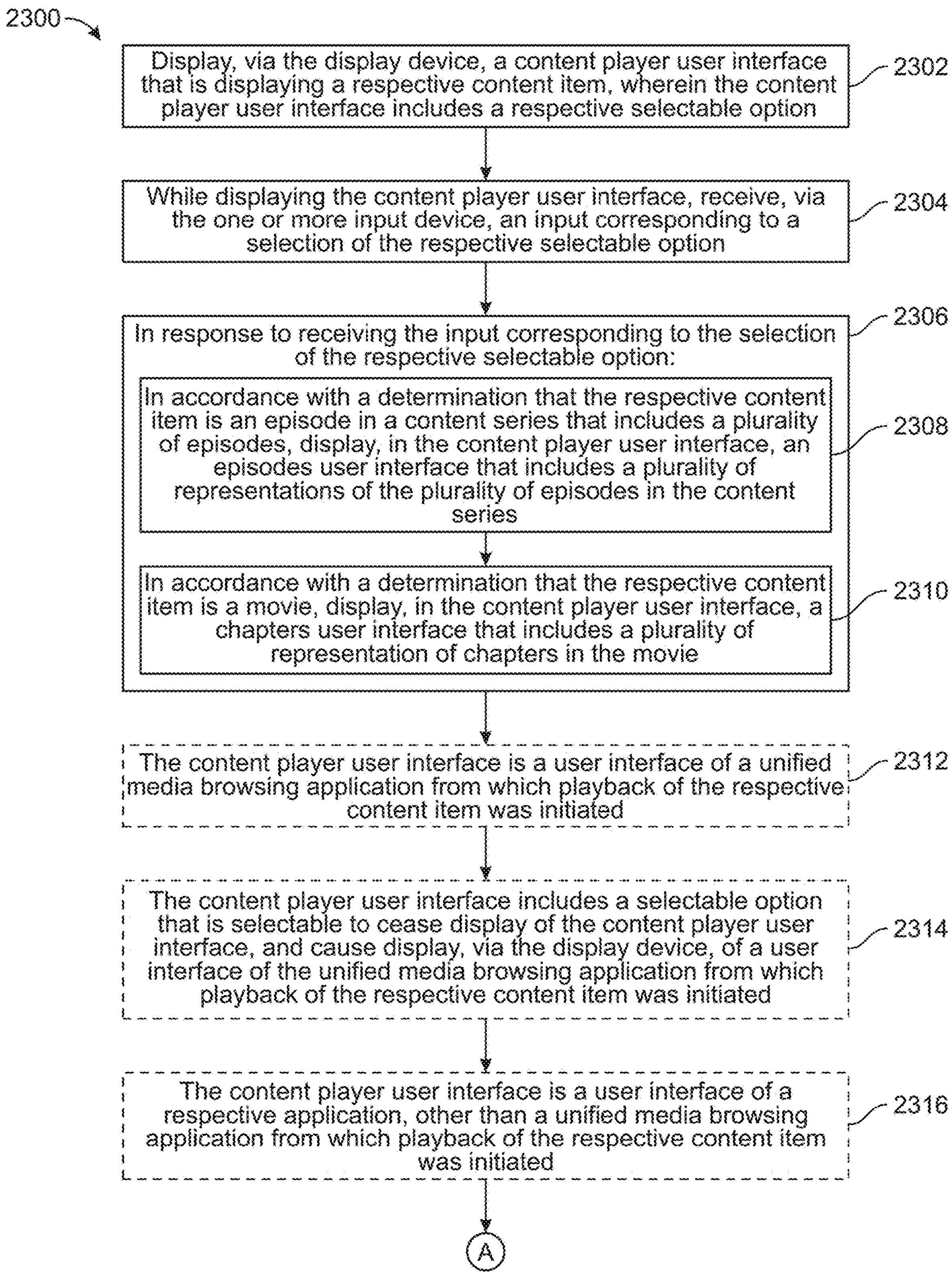
FIGS. 23A-23D are flow diagrams illustrating a method of displaying content items in accordance with some embodiments of the disclosure.
Figure 23B:
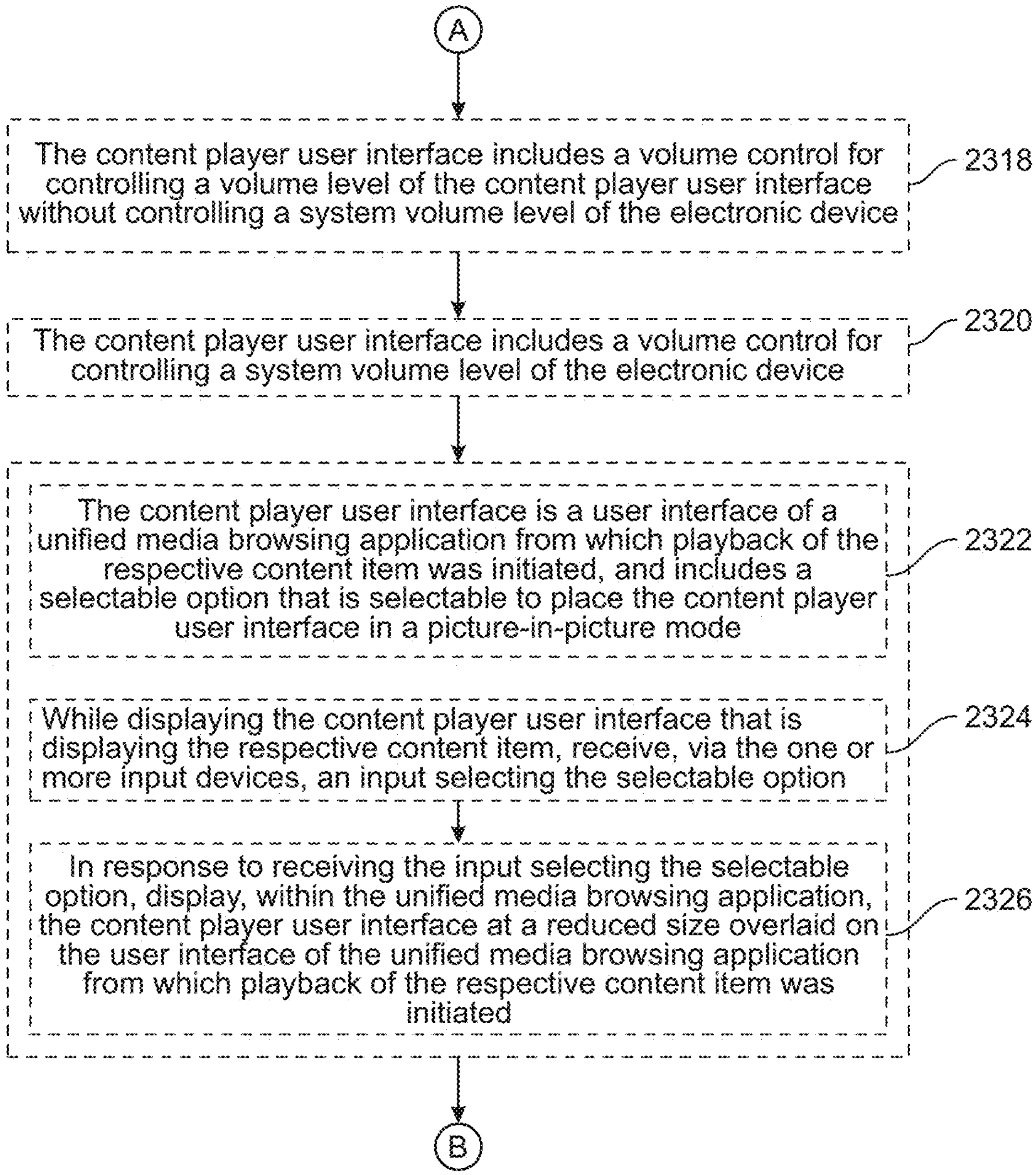
Figure 23C:
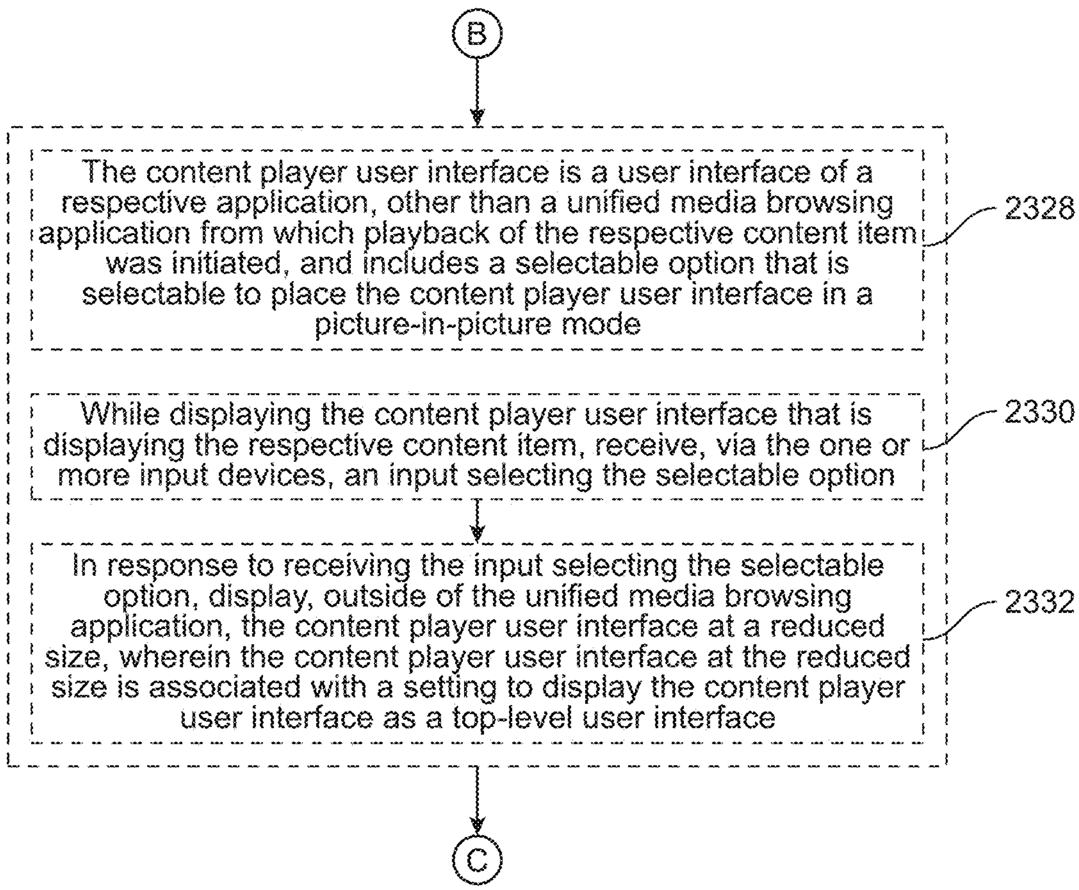
Figure 23D:
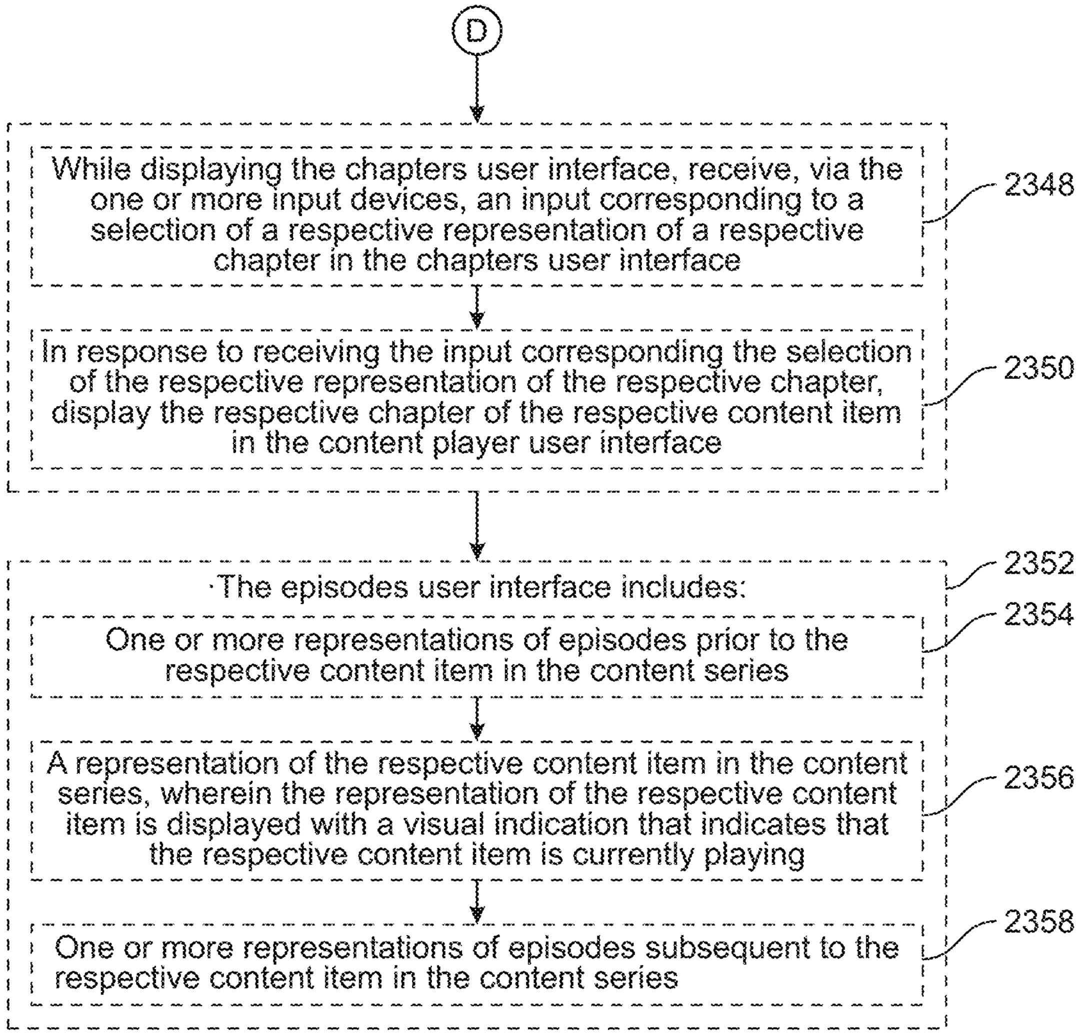

In FIG. 22Z, user input 2203 is received causing playback of a respective content item from the unified media browsing application 2200. In some embodiments, in response to the user input, content playback begins in a second dedicated window 2244 (e.g., similar to window 2242), as shown in FIG. 22AA. In some embodiments, while content is displayed (e.g., playing) in window 2244, because window 2242 is the picture-in-picture window and has an always-on-top characteristic, window 2242 remains above window 2244 even though window 2244 is also playing content.

FIGS. 23A-23D are flow diagrams illustrating a method 2300 of displaying content items in accordance with some embodiments of the disclosure. The method 2300 is optionally performed at an electronic device such as device 100, device 300, device 500, and device 511 as described above with reference to FIGS. 1A-1B, 2-3, 4A-4B and 5A-5C. Some operations in method 2300 are, optionally combined and/or order of some operations is, optionally, changed.

As described below, the method 2300 provides ways to display content items. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 22C, an electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), the electronic device 500 displays (2302), via the display device, a content player user interface that is displaying a respective content item, wherein the content player user interface includes a respective selectable option, such as in FIG. 22C (e.g., a playback user interface that is currently displaying (e.g., actively playing back, or displaying a paused content item) a respective content item). For example, a content player application or a content player sub-application (e.g., plugin, page, etc.) of a media browsing application. In some embodiments, the playback user interface is displayed in response to a user selection of a content item in a media browsing application. In some embodiments, the playback user interface is a user interface of the media browsing application. In some embodiments, the playback user interface is not a user interface of the media browsing application (e.g., a standalone application). Optionally, a selectable option is selectable to display a user interface for selecting media to display in the content player user interface.

In some embodiments, while displaying the content player user interface, the electronic device 500 receives (2304), via the one or more input devices, an input corresponding to a selection of the respective selectable option, such as in FIG. 22L (e.g., a click input or touchdown input on the respective selectable option).

In some embodiments, in response to receiving the input corresponding to the selection of the respective selectable option (2306), in accordance with a determination that the respective content item is an episode in a content series that includes a plurality of episodes (e.g., the content player user interface is currently displaying an episode of a content series (e.g., television show, miniseries, etc.).), the electronic device 500 displays (2308), in the content player user interface, an episodes user interface that includes a plurality of representations of the plurality of episodes in the content series, such as in FIG. 22M (e.g., displaying a pop-up or a dialog box overlaid over the playback of the respective content item. In some embodiments, the pop-up includes one or more representations of the episodes in the content series). In some embodiments, the pop-up is a scrollable list that is scrollable to display more representations of more episode in the content series. In some embodiments, the representations of the episodes include an icon of the episode (e.g., including an image or other graphic representing the respective episode) and a description of the episode (e.g., which season and episode, the title, and a short description or synopsis of the episode). In some embodiments, the icon includes a playback progress bar (e.g., overlaid over the image or graphic) that indicates the previous playback position of the respective episode (e.g., furthest playback position, playback position of the most recent playback, etc.). In some embodiments, the icon includes a text indicator or graphical indicator that indicates that the respective episode is the currently playing content item (e.g., a "Currently Playing" textual overlay). In some embodiments, the representations of episodes are selectable to cause playback of the respective episode in the content player user interface (e.g., stop playback of the respective content item and begin playback of the respective episode). In some embodiments, playback of the respective episode begins from the beginning. In some embodiments, playback of the respective episode resumes from the previous playback position (if any).

In some embodiments, in response to receiving the input corresponding to the selection of the respective selectable option (2306), in accordance with a determination that the respective content item is a movie, the electronic device 500 displays (2310), in the content player user interface, a chapters user interface that includes a plurality of representation of chapters in the movie, such as in FIG. 22V (e.g., displaying a pop-up or a dialog box overlaid over the playback of the respective content item). In some embodiments, if the content that is being played in the content player user interface is a movie (e.g., or otherwise not episodic content), then the pop-up includes one or more representations of chapters in the content item (e.g., as opposed to episodes). In some embodiments, the chapters correspond to predetermined sections of the content item (e.g., determined by an editor or producer of the content item, or automatically determined based on the recognition of the end and/or beginning of a scene, etc.). In some embodiments, the representations of chapters include an icon of the episode (e.g., an image or other graphic representing the chapter) and a description of the chapter (e.g., title of the chapter and a short description or synopsis of the chapter). In some embodiments, the icon includes a playback progress bar and/or a text indicator or graphical indicator that indicates that the respective chapter is the currently playing chapter. In some embodiments, the representations are selectable to cause playback of the chapter (e.g., from the beginning of the chapter) in the content player user interface.). In some embodiments, the content player user interface includes a button that is selectable to change a destination display device/audio device on which the content is playing (e.g., selectable to display a menu of available display and/or audio devices where the content that is playing can be wirelessly streamed to and played by the electronic device.

The above-described manner of displaying items for playback in a content playback user interface (e.g., by displaying an episodes user interface with a list of episodes in response to the user input selecting a respective selectable option if the content item being played back is an episodic content item and displaying a chapters user interface with a list of chapters if the content item being played back is a non-episodic content item) allows the electronic device to provide the user with a consistent user interface with the same selectable option that displays different content items based on the content that is being displayed by the content playback user interface, which simplifies the interaction between the user and the electronic device and enhances the operability of the electronic device and makes the user-device interface more efficient (e.g., without requiring that the user navigate to a separate user interface or select different selectable options to display episodes when playing episodic content and to display chapters when playing non-episodic content), which additionally reduces power usage and improves battery life of the electronic device by enabling the user to use the electronic device more quickly and efficiency.

In some embodiments, the content player user interface is a user interface of a unified media browsing application (e.g., the unified media browsing application provides a centralized location for browsing, viewing, or otherwise accessing content on the electronic device) from which playback of the respective content item was initiated (2312), such as in FIG. 22C. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate HBO application, etc.) and aggregates the shared information into a catalog of available content. In some embodiments, the content provider applications have access to content from a specific provider, such as a primary or secondary content provider. In some embodiments, a primary content provider is a content provider (e.g., Comcast, Time Warner, etc.) that provides the user access to a plurality of secondary content providers (e.g., CBS, Fox, HBO, etc.).) Thus, in some embodiments, the unified media browsing application itself displays the content player user interface (e.g., within the window in which the content player user interface displays representations of content items available for playback and selectable to initiate playback). In some embodiments, the content player user interface is displayed in a separate window than the window in which the unified media browsing application displays representations of content, but that window is still a window of the unified media browsing application rather than being a window of a separate application.

The above-described manner of displaying the content player in the unified media browsing application allows the electronic device to avoid launching/displaying another application to display content, which optionally saves on computing resources, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface includes a selectable option that is selectable to cease display of the content player user interface, and cause display, via the display device, of a user interface of the unified media browsing application from which playback of the respective content item was initiated (2314), such as in FIG. 22C. For example, a "done" button displayed in the content player user interface window that, when selected, causes the content player window to cease to be displayed and the unified media browsing application user interface in which representations of available content are displayed to be displayed. In some embodiments, the content player user interface takes up an entirety of the window in which the unified media browsing application is displayed, and selection of the "done" button causes the unified media browsing application representations to become visible after the content player user interface ceases to be displayed. In some embodiments, the content player user interface is displayed in a separate window of the unified media browsing application, and selection of the "done" button causes that separate window to cease to be displayed.

The above-described manner of providing for a button to cease display of the content player user interface allows the electronic device to provide a convenient manner of ceasing display of the content player, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface is a user interface of a respective application, other than a unified media browsing application from which playback of the respective content item was initiated (2316), such as in FIG. 22R. For example, the content player application is a dedicated application for playing content on the electronic device that is not the unified media browsing application. In some embodiments, the separate application window in which the content player user interface is displayed includes buttons that any other application window might include (e.g., a close button, a minimize button, a maximize button), but optionally does not include a "done" button (as does the content player user interface that is displayed by the unified media browsing application, as described above).

The above-described manner of displaying the content player in a separate application allows the electronic device to use a dedicated content player application for displaying content, which is optionally optimized for content playback and saves computing resources, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface includes a volume control for controlling a volume level of the content player user interface without controlling a system volume level of the electronic device (2318), such as in FIG. 22C. For example, a volume bar that is user-adjustable that controls the volume of the content player itself, without affecting a system volume of the electronic device. Thus, changing this volume optionally does not affect the volume of sounds generated by other applications on the electronic device.

The above-described manner of providing a content player-specific volume control allows the electronic device to avoid user error in changing volume levels unknowingly for other applications for which the volume level set for the content player user interface may not be correct, which avoids requiring the user to provide additional input to then correct such volume levels, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface includes a volume control for controlling a system volume level of the electronic device (2320), such as in FIG. 22C. For example, a volume bar that is user-adjustable that controls a system volume of the electronic device (and thus also a volume of the content player). Thus, changing this volume optionally does affect the volume of sounds generated by other applications on the electronic device.

The above-described manner of providing a system volume control allows the electronic device to provide a single volume control that applies system-wide, avoiding the need for the user to provide separate volume input control for each application on the electronic device or to provide input accounting for the interaction between application-specific volume and system-level volume, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface is a user interface of a unified media browsing application (e.g., the unified media browsing application provides a centralized location for browsing, viewing, or otherwise accessing content on the electronic device) from which playback of the respective content item was initiated, and includes a selectable option that is selectable to place the content player user interface in a picture-in-picture mode (2322), such as in FIG. 22C. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate HBO application, etc.) and aggregates the shared information into a catalog of available content. In some embodiments, the content provider applications have access to content from a specific provider, such as a primary or secondary content provider. In some embodiments, a primary content provider is a content provider (e.g., Comcast, Time Warner, etc.) that provides the user access to a plurality of secondary content providers (e.g., CBS, Fox, HBO, etc.)) (e.g., a mode in which the content playing in the content player is shown within and/or auxiliary to other content that is displayed by the unified media browsing application or otherwise).

In some embodiments, while displaying the content player user interface that is displaying the respective content item, the electronic device 500 receives (2324), via the one or more input devices, an input selecting the selectable option, such as in FIG. 22O. In some embodiments, in response to receiving the input selecting the selectable option, the electronic device 500 displays (2326), within the unified media browsing application, the content player user interface at a reduced size overlaid on the user interface of the unified media browsing application from which playback of the respective content item was initiated, such as in FIG. 22P (e.g., as the content continues playing). For example, displaying the content in a corner of the unified media browsing application window, overlaid on what is being displayed by the unified media browsing application below it. In some embodiments, other content is able to be displayed in the unified media browsing application (e.g., in a full screen content player user interface) while the corner-displayed content is overlaid on that other content. In some embodiments, the unified media browsing application displays representations of available content items in the user interface over which the corner-displayed content is overlaid.

The above-described manner of providing a PIP button allows the electronic device to provide a convenient and easy way to continue display of the content while viewing other information/content via the display device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content player user interface is a user interface of a respective application, other than a unified media browsing application from which playback of the respective content item was initiated (e.g., the unified media browsing application cannot play back the content, and instead the content is played back in a separate application) and includes a selectable option that is selectable to place the content player user interface in a picture-in-picture mode (2328), such as in FIG. 22R (e.g., a mode in which the content playing in the content player is shown within and/or auxiliary to other content that is displayed by the unified media browsing application or otherwise). In some embodiments, the unified media browsing application can play back the content, but the content player user interface is a separate window from content browsing user interface of the unified media browsing application (e.g., a content player window of the unified media browsing application is displayed).

In some embodiments, while displaying the content player user interface that is displaying the respective content item, the electronic device 500 receives (2330), via the one or more input devices, an input selecting the selectable option, such as in FIG. 22W. In some embodiments, in response to receiving the input selecting the selectable option, the electronic device 500 displays (2332), outside of the unified media browsing application, the content player user interface at a reduced size (e.g., in a corner of the display device, independent of the position of the unified media browsing application in the display area of the display device), wherein the content player user interface at the reduced size is associated with a setting to display the content player user interface as a top-level user interface, such as in FIG. 22X. For example, the window of the separate application (or of the unified media browsing application) in which the content is displayed in the corner of the display device has an "always on top" setting enabled when in picture mode, which causes the content player window to always be displayed above other windows displayed by the display device, even if those other windows are given the current focus (e.g., by a click input directed to one of the windows), which optionally brings the selected window in front of other windows on the display device, but not in front of the content player window in the picture-in-picture mode In some embodiments, when the content player window is not in the picture-in-picture mode, the content player window is able to be behind other windows displayed by the display device.

The above-described manner of providing a PIP button allows the electronic device to provide a convenient and easy way to continue display of the content while viewing other information/content via the display device without obscuring display of the PIP content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, in accordance with a determination that the respective content item is a respective episode of a content series, the electronic device 500 displays (2334), in the content player user interface, a first selectable option, such as in FIG. 22C. In some embodiments, if the content item is not an episode of a content series, the first selectable option is not displayed in the content player user interface. In some embodiments, if the content item is an episode of a content series, but is the last episode in the content series, the first selectable option is not displayed in the content player user interface.

In some embodiments, while displaying the first selectable option in the content player user interface, the electronic device 500 detects (2336) a hover performed over the first selectable option, such as in FIG. 22H (e.g., receiving a user input from an input device (e.g., a mouse, a trackpad, etc.) moving a cursor over the first selectable option, or receiving a user input on a touch screen device hovering over the first selectable option).

In some embodiments, in response to detecting the hover performed over the first selectable option, the electronic device 500 displays (2338), overlaid on the content player user interface, information about a next episode in the content series, such as in FIG. 22H (e.g., in an overlay window adjacent to the first selectable option, display a title of, a length of, a season/episode number of, an image of and/or a short description or synopsis of the next episode in the content series).

In some embodiments, while displaying the information about the next episode in the content series, the electronic device 500 receives (2340), via the one or more input devices, a selection of the first selectable option, such as in FIG. 22I (e.g., after hovering over the first selectable option which causes the overlay of the information about the next episode, detecting a click input/touchdown on the first selectable option).

In some embodiments, in response to receiving the selection of the first selectable option, the electronic device 500 displays (2342), in the content player user interface, the next episode of the content series, such as in FIG. 22J. Thus, in some embodiments, hovering over the first selectable option causes display of information about the next episode in the content series, while clicking the first selectable option causes playback of the next episode in the content series.

The above-described manner of providing a next episode button allows the electronic device to provide a convenient and easy way to achieve playback of the next episode of the content series without the need for the user to provide additional input to navigate to the correct user interface from which playback of the next episode can be initiated, avoiding user error in doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while displaying the episodes user interface, the electronic device 500 receives (2344), via the one or more input devices, an input corresponding to a selection of a respective representation of a respective episode in the episodes user interface, such as in FIG. 22M (e.g., a click input or touchdown input on the respective representation of the respective episode).

In some embodiments, in response to receiving the input corresponding the selection of the respective representation of the respective episode, the electronic device 500 displays (2346) the respective episode in the content player user interface, such as in FIG. 22C. For example, selection of a different episode optionally causes display of that different episode rather than the respective episode.

The above-described manner of providing selectable episode representations allows the electronic device to provide a convenient and easy way to achieve playback of other episodes of the content series without the need for the user to provide additional input to navigate to the correct user interface from which playback of the other episodes can be initiated, avoiding user error in doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while displaying the chapters user interface, the electronic device 500 receives (2348), via the one or more input devices, an input corresponding to a selection of a respective representation of a respective chapter in the chapters user interface, such as in FIG. 22V (e.g., a click input or touchdown input on the respective representation of the respective episode).

In some embodiments, in response to receiving the input corresponding the selection of the respective representation of the respective chapter, the electronic device 500 displays (2350) the respective chapter of the respective content item in the content player user interface, such as in FIG. 22R. For example, selection of a different chapter optionally causes display of that different chapter rather than the respective chapter. In some embodiments, these representations include progress bars that indicate how much of the chapter has been displayed be the electronic device or have been played by the user account associated with the electronic device (if any—if not partially watched, the representations optionally do not include progress bars). In some embodiments, the image for the current chapter is overlaid with a visual indication that the chapter is currently playing in the content player user interface, such as "currently playing" overlaid on the image.

The above-described manner of providing selectable chapter representations allows the electronic device to provide a convenient and easy way to achieve playback of specific chapters of the content without the need for the user to provide additional input to navigate to the correct user interface from which playback of the chapters can be initiated or the need to manually skip through the content to find the desired chapter, avoiding user error in doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the episodes user interface includes (2352) one or more representations of episodes prior to the respective content item in the content series (2354), such as in FIG. 22M (e.g., selectable to display the selected episode in the content player user interface). In some embodiments, these representations include images/titles/lengths/episode/description and/or season numbers/etc. for the episodes. In some embodiments, these representations include progress bars that indicate how much of the episodes have been displayed be the electronic device or have been viewed by the user account associated with the electronic device (if any—if not partially watched, the representations optionally do not include progress bars).

In some embodiments, the episodes user interface includes (2352) a representation of the respective content item in the content series, wherein the representation of the respective content item is displayed with a visual indication that indicates that the respective content item is currently playing (2356), such as in FIG. 22M (e.g., an image/title/length/episode/description and/or season number, etc. for the currently playing episode in the content series). In some embodiments, the image for the current episode is overlaid with a visual indication that the episode is currently playing in the content player user interface, such as "currently playing" overlaid on the image.

In some embodiments, the episodes user interface includes (2352) one or more representations of episodes subsequent to the respective content item in the content series (2358), such as in FIG. 22N (e.g., selectable to display the selected episode in the content player user interface). In some embodiments, these representations include images/titles/lengths/episode and/or season numbers/etc. for the episodes. In some embodiments, these representations include progress bars that indicate how much of the episodes have been displayed be the electronic device or have been played by the user account associated with the electronic device (if any—if not partially watched, the representations optionally do not include progress bars).

The above-described manner of providing selectable episode representations allows the electronic device to provide a convenient and easy way to achieve playback of other episodes of the content series without the need for the user to provide additional input to navigate to the correct user interface from which playback of the other episodes can be initiated, avoiding user error in doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 23A-23D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1700, 1900, and 2100) are also applicable in an analogous manner to method 2300 described above with respect to FIGS. 23A-23D. For example, the operation of the electronic device displaying content items described above with reference to method 2300 optionally has one or more of the characteristics of presenting content in the unified media browsing application, presenting information on representations of content items, displaying of content in a unified media browsing application, linking of an account for a primary content provider, restricting of access to content based on the geographic location of the device, presentation of playback menus during playback of content in a unified media browsing application, and displaying user interfaces specific to a respective content item, etc., described herein with reference to other methods described herein (e.g., methods 700, 900, 1100, 1300, 1500, 1700, 1900, and 2100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIGS. 23A-23D are, optionally, implemented by components depicted in FIGS. 1A-1B. For example, displaying operations 2302, 2308, 2310, 2326, 2332, 2334, 2338, 2342, 2346, and 2350, receiving operations 2304, 2324, 2330, 2340, 2344, and 2348, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display device and one or more input devices:

displaying, via the display device, a user interface, wherein the user interface includes a first representation of a first content item;

while displaying the first representation in the user interface, receiving, via the one or more input devices, an input corresponding to a hover performed over a first location in the user interface; and in response to receiving the input corresponding to the hover performed over the first location in the user interface:

in accordance with a determination that the first location corresponds to the first representation and the first representation corresponds to a first region of the user interface, updating the first representation to include a first selectable option overlaid on the first representation that is selectable to display the first content item on the display device, and a second selectable option overlaid on the first representation that is selectable to display a menu corresponding to the first representation;

in accordance with a determination that the first location corresponds to the first representation and the first representation corresponds to a second region of the user interface different than the first region of the user interface:

forgoing updating the first representation to include the first selectable option overlaid on the first representation that is selectable to display the first content item on the display device, and forgoing updating the second selectable option overlaid on the first representation that is selectable to display the menu corresponding to the first representation; and in accordance with a determination that the first location does not correspond to the first representation, forgoing updating the first representation.

2. The method of claim 1, further comprising:

in response to receiving the input corresponding to the hover performed over the first location in the user interface:

in accordance with the determination that the first location corresponds to the first representation:

in accordance with a determination that the first representation is part of a horizontally scrollable row of representations of content items, updating the user interface to include one or more selectable options that indicate that the row of representations is horizontally scrollable, and that are selectable to horizontally scroll through the row of representations.

3. The method of claim 2, further comprising in accordance with a determination that the first representation is a full width representation such that other representations in the row of representations are not fully visible on the user interface, displaying, overlaid on the first representation, a visual indicator that indicates a current scroll position in the row of representations.

4. The method of claim 2, wherein multiple representations of the row of representations are concurrently visible in the user interface.

5. The method of claim 1, wherein the user interface includes a search text entry field, the method further comprising:

detecting that the search text entry field has received a current focus; and in response to detecting that the search text entry field has received the current focus:

displaying, in the user interface, a plurality of regions, including a first region that includes a first plurality of suggested search queries, wherein each region of the plurality of regions is displayed with a selectable option that is selectable to cease display of that region in the user interface, and each suggested search query is selectable to initiate a search using that search query.

6. The method of claim 5, further comprising:

while displaying the plurality of regions, including the first region that includes the first plurality of suggested search queries that is displayed with a first selectable option to cease display of the first region in the user interface, receiving, via the one or more input devices, an input selecting the first selectable option; and in response to receiving the input selecting the first selectable option, ceasing display of the first region and the first plurality of suggested search queries until an end of a current search session.

7. The method of claim 1, wherein the user interface is a user interface of a unified media browsing application, and the unified media browsing application displays representations of content that is playable in the unified media browsing application, and does not display representations of content that is not playable in the unified media browsing application.

8. The method of claim 1, wherein the user interface is a user interface of a unified media browsing application, and the unified media browsing application displays representations of content that is playable in the unified media browsing application, and representations of content that is not playable in the unified media browsing application.

9. An electronic device, comprising:

one or more processors;

memory; and one or more programs, wherein the one or more programs are stored in the memory and configured to be executed by the one or more processors, the one or more programs including instructions for:

displaying, via a display device, a user interface, wherein the user interface includes a first representation of a first content item;

while displaying the first representation in the user interface, receiving, via one or more input devices, an input corresponding to a hover performed over a first location in the user interface; and in response to receiving the input corresponding to the hover performed over the first location in the user interface:

in accordance with a determination that the first location corresponds to the first representation and the first representation corresponds to a first region of the user interface, updating the first representation to include a first selectable option overlaid on the first representation that is selectable to display the first content item on the display device, and a second selectable option overlaid on the first representation that is selectable to display a menu corresponding to the first representation;

in accordance with a determination that the first location corresponds to the first representation and the first representation corresponds to a second region of the user interface different than the first region of the user interface:

forgoing updating the first representation to include the first selectable option overlaid on the first representation that is selectable to display the first content item on the display device, and forgoing updating the second selectable option overlaid on the first representation that is selectable to display the menu corresponding to the first representation; and in accordance with a determination that the first location does not correspond to the first representation, forgoing updating the first representation.

10. A non-transitory computer readable storage medium storing one or more programs, the one or more programs comprising instructions, which when executed by one or more processors of an electronic device, cause the electronic device to:

display, via a display device, a user interface, wherein the user interface includes a first representation of a first content item;

while displaying the first representation in the user interface, receive, via one or more input devices, an input corresponding to a hover performed over a first location in the user interface; and in response to receiving the input corresponding to the hover performed over the first location in the user interface:

in accordance with a determination that the first location corresponds to the first representation and the first representation corresponds to a first region of the user interface, update the first representation to include a first selectable option overlaid on the first representation that is selectable to display the first content item on the display device, and a second selectable option overlaid on the first representation that is selectable to display a menu corresponding to the first representation;

in accordance with a determination that the first location corresponds to the first representation and the first representation corresponds to a second region of the user interface different than the first region of the user interface:

forgo updating the first representation to include the first selectable option overlaid on the first representation that is selectable to display the first content item on the display device, and forgo updating the second selectable option overlaid on the first representation that is selectable to display the menu corresponding to the first representation; and in accordance with a determination that the first location does not correspond to the first representation, forgo updating the first representation.

11. The electronic device of claim 9, wherein the one or more programs further include instructions for:

in response to receiving the input corresponding to the hover performed over the first location in the user interface:

in accordance with the determination that the first location corresponds to the first representation:

in accordance with a determination that the first representation is part of a horizontally scrollable row of representations of content items, updating the user interface to include one or more selectable options that indicate that the row of representations is horizontally scrollable, and that are selectable to horizontally scroll through the row of representations.

12. The electronic device of claim 11, wherein the one or more programs further include instructions for:

in accordance with a determination that the first representation is a full width representation such that other representations in the row of representations are not fully visible on the user interface, displaying, overlaid on the first representation, a visual indicator that indicates a current scroll position in the row of representations.

13. The electronic device of claim 11, wherein multiple representations of the row of representations are concurrently visible in the user interface.

14. The electronic device of claim 9, wherein the user interface includes a search text entry field, wherein the one or more programs further include instructions for:

detecting that the search text entry field has received a current focus; and in response to detecting that the search text entry field has received the current focus:

displaying, in the user interface, a plurality of regions, including a first region that includes a first plurality of suggested search queries, wherein each region of the plurality of regions is displayed with a selectable option that is selectable to cease display of that region in the user interface, and each suggested search query is selectable to initiate a search using that search query.

15. The electronic device of claim 14, wherein the one or more programs further include instructions for:

while displaying the plurality of regions, including the first region that includes the first plurality of suggested search queries that is displayed with a first selectable option to cease display of the first region in the user interface, receiving, via the one or more input devices, an input selecting the first selectable option; and in response to receiving the input selecting the first selectable option, ceasing display of the first region and the first plurality of suggested search queries until an end of a current search session.

16. The electronic device of claim 9, wherein the user interface is a user interface of a unified media browsing application, and the unified media browsing application displays representations of content that is playable in the unified media browsing application, and does not display representations of content that is not playable in the unified media browsing application.

17. The electronic device of claim 9, wherein the user interface is a user interface of a unified media browsing application, and the unified media browsing application displays representations of content that is playable in the unified media browsing application, and representations of content that is not playable in the unified media browsing application.

18. The non-transitory computer readable storage medium of claim 10, the one or more programs comprising instructions that further cause the electronic device to:

in response to receiving the input corresponding to the hover performed over the first location in the user interface:

in accordance with the determination that the first location corresponds to the first representation:

in accordance with a determination that the first representation is part of a horizontally scrollable row of representations of content items, update the user interface to include one or more selectable options that indicate that the row of representations is horizontally scrollable, and that are selectable to horizontally scroll through the row of representations.

19. The non-transitory computer readable storage medium of claim 18, the one or more programs comprising instructions that further cause the electronic device to:

in accordance with a determination that the first representation is a full width representation such that other representations in the row of representations are not fully visible on the user interface, display, overlaid on the first representation, a visual indicator that indicates a current scroll position in the row of representations.

20. The non-transitory computer readable storage medium of claim 18, wherein multiple representations of the row of representations are concurrently visible in the user interface.

21. The non-transitory computer readable storage medium of claim 10, wherein the user interface includes a search text entry field, the one or more programs comprising instructions that further cause the electronic device to:

detect that the search text entry field has received a current focus; and in response to detecting that the search text entry field has received the current focus:

display, in the user interface, a plurality of regions, including a first region that includes a first plurality of suggested search queries, wherein each region of the plurality of regions is displayed with a selectable option that is selectable to cease display of that region in the user interface, and each suggested search query is selectable to initiate a search using that search query.

22. The non-transitory computer readable storage medium of claim 21, the one or more programs comprising instructions that further cause the electronic device to:

while displaying the plurality of regions, including the first region that includes the first plurality of suggested search queries that is displayed with a first selectable option to cease display of the first region in the user interface, receive, via the one or more input devices, an input selecting the first selectable option; and in response to receiving the input selecting the first selectable option, cease display of the first region and the first plurality of suggested search queries until an end of a current search session.

23. The non-transitory computer readable storage medium of claim 10, wherein the user interface is a user interface of a unified media browsing application, and the unified media browsing application displays representations of content that is playable in the unified media browsing application, and does not display representations of content that is not playable in the unified media browsing application.

24. The non-transitory computer readable storage medium of claim 10, wherein the user interface is a user interface of a unified media browsing application, and the unified media browsing application displays representations of content that is playable in the unified media browsing application, and representations of content that is not playable in the unified media browsing application.

* * * * *